US012104552B2

(12) United States Patent
Langenfeld et al.

(10) Patent No.: US 12,104,552 B2
(45) Date of Patent: Oct. 1, 2024

(54) STIRLING CYCLE MACHINE

(71) Applicant: New Power Concepts LLC, Manchester, NH (US)

(72) Inventors: Christopher C. Langenfeld, Nashua, NH (US); Michael J. Slate, Merrimack, NH (US); Prashant Bhat, Bedford, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 195 days.

(21) Appl. No.: 17/393,355

(22) Filed: Aug. 3, 2021

(65) Prior Publication Data

US 2022/0026118 A1 Jan. 27, 2022

Related U.S. Application Data

(63) Continuation of application No. 15/790,790, filed on Oct. 23, 2017, now Pat. No. 11,079,145, which is a
(Continued)

(51) Int. Cl.
*F02G 1/043* (2006.01)
*F02B 75/18* (2006.01)
(Continued)

(52) U.S. Cl.
CPC .............. *F02G 1/043* (2013.01); *F02B 75/18* (2013.01); *F02B 75/1896* (2013.01);
(Continued)

(58) Field of Classification Search
CPC ........ F25B 9/14; F02B 75/18; F02B 75/1896; F02B 2075/1808; F02F 3/0023;
(Continued)

(56) References Cited

U.S. PATENT DOCUMENTS 124,805 A 3/1872 Fryer
971,583 A 10/1910 Bell
(Continued)

FOREIGN PATENT DOCUMENTS

FR 2459371 1/1981
GB 2249131 5/1992
(Continued)

OTHER PUBLICATIONS

International Search Report with Written Opinion, dated Oct. 15, 2008, received in international patent application PCT/US2008/060827.

(Continued)

*Primary Examiner* — Wesley G Harris
(74) *Attorney, Agent, or Firm* — Michael George Norris

(57) ABSTRACT

A Stirling cycle machine. The machine includes at least one rocking drive mechanism which includes: a rocking beam having a rocker pivot, at least one cylinder and at least one piston. The piston is housed within a respective cylinder and is capable of substantially linearly reciprocating within the respective cylinder. Also, the drive mechanism includes at least one coupling assembly having a proximal end and a distal end. The linear motion of the piston is converted to rotary motion of the rocking beam. Also, a crankcase housing the rocking beam and housing a first portion of the coupling assembly is included. The machine also includes a working space housing the at least one cylinder, the at least one piston and a second portion of the coupling assembly. An airlock is included between the workspace and the crankcase and a seal is included for sealing the workspace from the airlock and crankcase. A burner and burner control system is also included for heating the machine and controlling ignition and combustion in the burner.

17 Claims, 187 Drawing Sheets

Related U.S. Application Data continuation of application No. 14/319,214, filed on Jun. 30, 2014, now Pat. No. 9,797,340, which is a continuation of application No. 12/829,329, filed on Jul. 1, 2010, now Pat. No. 8,763,391, which is a continuation-in-part of application No. 12/105,854, filed on Apr. 18, 2008, now Pat. No. 8,474,256.

(60) Provisional application No. 61/222,361, filed on Jul. 1, 2009, provisional application No. 60/925,818, filed on Apr. 23, 2007, provisional application No. 60/925,814, filed on Apr. 23, 2007.

(51) Int. Cl.

| | |
|---|---|
| ***F02F 3/00*** | (2006.01) |
| ***F02G 1/044*** | (2006.01) |
| ***F02G 1/055*** | (2006.01) |
| ***F16H 21/12*** | (2006.01) |
| ***F16H 21/34*** | (2006.01) |
| ***F16H 35/18*** | (2006.01) |
| ***F25B 9/14*** | (2006.01) |

(52) U.S. Cl.

CPC .......... *F02F 3/0023* (2013.01); *F02G 1/0435* (2013.01); *F02G 1/0445* (2013.01); *F02G 1/055* (2013.01); *F16H 21/12* (2013.01); *F16H 21/34* (2013.01); *F16H 35/18* (2013.01); *F25B 9/14* (2013.01); *F02B 2075/1808* (2013.01); *F02G 2244/08* (2013.01); *F02G 2253/08* (2013.01); *F02G 2253/80* (2013.01); *F02G 2254/10* (2013.01); *F02G 2255/00* (2013.01); *F02G 2257/00* (2013.01); *F02G 2270/005* (2013.01); *F02G 2270/85* (2013.01); *Y02W 10/37* (2015.05); *Y10T 74/18392* (2015.01)

(58) Field of Classification Search

CPC ...... F02G 1/043; F02G 1/0435; F02G 1/0445; F02G 1/055; F02G 2244/08; F02G 2253/08; F02G 2253/80; F02G 2254/10; F02G 2255/00; F02G 2257/00; F02G 2270/005; F02G 2270/85; F16H 21/12; F16H 21/34; F16H 35/18; Y02W 10/37; Y10T 74/18392; F04B 49/022

See application file for complete search history.

(56) References Cited

U.S. PATENT DOCUMENTS

| | | | | |
|---|---|---|---|---|
| 1,389,728 A | | 9/1921 | Akimoff | |
| 2,067,049 A | | 1/1937 | Goldberg | |
| 3,134,306 A | | 5/1964 | Schmidt | |
| 3,277,795 A | | 10/1966 | Adriaan | |
| 3,559,398 A | | 2/1971 | Meijer et al. | |
| 3,568,436 A | * | 3/1971 | Heffner et al. | F02G 1/0535 277/504 |
| 3,620,652 A | | 11/1971 | Hendrik | |
| 3,662,654 A | | 5/1972 | Bax | |
| 3,667,348 A | * | 6/1972 | Neelen | F02G 1/0535 60/517 |
| 3,667,349 A | * | 6/1972 | Siebert | F16J 15/56 60/517 |
| 3,783,745 A | | 1/1974 | Meijer | |
| 3,798,895 A | | 3/1974 | Meijer | |
| 3,959,971 A | | 6/1976 | Mekari | |
| 4,138,897 A | | 2/1979 | Ross | |
| 4,215,660 A | | 8/1980 | Finley | |
| 4,255,929 A | | 3/1981 | Frosch | |
| 4,257,230 A | | 3/1981 | Lundholm | |
| 4,305,349 A | | 12/1981 | Zimmerly | |
| 4,335,884 A | | 6/1982 | Darche | |
| 4,381,648 A | | 5/1983 | Balas, Jr. | |
| 4,415,171 A | | 11/1983 | Edwards | |
| 4,419,969 A | | 12/1983 | Bundrick, Jr. | |
| 4,439,169 A | | 3/1984 | Meijer et al. | |
| 4,481,771 A | | 11/1984 | Meijer et al. | |
| 4,522,030 A | | 6/1985 | Corey | |
| 4,523,636 A | | 6/1985 | Meijer et al. | |
| 4,532,819 A | | 8/1985 | Ross | |
| 4,532,855 A | | 8/1985 | Meijer et al. | |
| 4,579,046 A | | 4/1986 | Meijer et al. | |
| 4,615,261 A | | 10/1986 | Meijer | |
| 4,620,418 A | * | 11/1986 | Fujiwara | F02G 1/0535 60/517 |
| 4,632,179 A | | 12/1986 | Meijer et al. | |
| 4,669,736 A | | 6/1987 | Meijer | |
| 4,703,796 A | | 11/1987 | Meijer et al. | |
| 4,707,990 A | | 11/1987 | Meijer | |
| 4,712,378 A | | 12/1987 | Nakayama | |
| 4,715,183 A | | 12/1987 | Meijer et al. | |
| 4,738,105 A | | 4/1988 | Ross et al. | |
| 4,751,819 A | | 6/1988 | Eder | |
| 4,769,992 A | * | 9/1988 | Harada | F16J 15/52 60/520 |
| 4,785,633 A | | 11/1988 | Meijer et al. | |
| 4,785,875 A | | 11/1988 | Meijer et al. | |
| 4,824,149 A | | 4/1989 | Reuchlein | |
| 4,825,814 A | | 5/1989 | Meijer et al. | |
| 4,836,094 A | | 6/1989 | Meijer et al. | |
| 4,885,980 A | | 12/1989 | Meijer et al. | |
| 4,897,997 A | | 2/1990 | Meijer et al. | |
| 4,901,790 A | | 2/1990 | Meijer | |
| 4,911,144 A | | 3/1990 | Godett et al. | |
| 4,977,742 A | | 12/1990 | Meijer | |
| 4,994,004 A | | 2/1991 | Meijer et al. | |
| 4,996,841 A | | 3/1991 | Meijer et al. | |
| 5,029,562 A | | 7/1991 | Kamo | |
| 5,074,114 A | | 12/1991 | Meijer et al. | |
| 5,146,749 A | | 9/1992 | Wood et al. | |
| 5,388,409 A | | 2/1995 | Meijer | |
| 5,394,700 A | | 3/1995 | Steele | |
| 5,557,934 A | | 9/1996 | Beach | |
| 5,611,201 A | | 3/1997 | Houtman | |
| 5,706,659 A | | 1/1998 | Houtman et al. | |
| 5,722,239 A | | 3/1998 | Houtman | |
| 5,735,262 A | | 4/1998 | Houtman | |
| 5,751,069 A | | 5/1998 | Rajashekara et al. | |
| 5,758,938 A | | 6/1998 | Osterwisch | |
| 5,771,694 A | | 6/1998 | Houtman et al. | |
| 5,813,229 A | | 9/1998 | Gaiser | |
| 5,822,964 A | | 10/1998 | Kerpays, Jr. | |
| 5,836,846 A | | 11/1998 | Hewko et al. | |
| 5,864,770 A | | 1/1999 | Ziph et al. | |
| 5,865,091 A | | 2/1999 | Domanski et al. | |
| 5,884,481 A | | 3/1999 | Johansson et al. | |
| 5,921,764 A | | 7/1999 | Marchionna et al. | |
| 5,938,207 A | | 8/1999 | Marchionna et al. | |
| 6,155,240 A | | 12/2000 | Amano | |
| 6,282,895 B1 | | 9/2001 | Johansson et al. | |
| 6,904,888 B1 | | 6/2005 | Heifets | |
| 6,922,908 B1 | | 8/2005 | Raudales | |
| 7,051,527 B2 | | 5/2006 | Schmid | |
| 7,067,933 B2 | | 6/2006 | Bassett | |
| 7,194,858 B2 | | 3/2007 | Ziph et al. | |
| 7,279,800 B2 | | 10/2007 | Bassett | |
| 2002/0035834 A1 | | 3/2002 | Cammack | |
| 2005/0142005 A1 | | 6/2005 | Traylor | |
| 2006/0032957 A1 | | 2/2006 | Kolbet | |
| 2007/0227139 A1 | | 10/2007 | Withrow | |
| 2008/0314356 A1 | | 4/2008 | Kamen et al. | |

FOREIGN PATENT DOCUMENTS

| | | |
|---|---|---|
| JP | 52131241 | 11/1977 |
| JP | 57 18443 | 1/1982 |
| JP | 61 025901 | 2/1986 |
| JP | 61 040450 | 2/1986 |
| JP | 61 079849 | 4/1986 |

(56) References Cited

FOREIGN PATENT DOCUMENTS

| | | |
|---|---|---|
| JP | 1008346 | 1/1989 |
| JP | 03151546 | 6/1991 |
| WO | WO9209812 | 6/1992 |

OTHER PUBLICATIONS

International Preliminary Report on Patentability, dated Nov. 5, 2009, received in the international patent application No. PCT/US2008/060827.

* cited by examiner

READY FOR START OF COMPRESSION STROKE

END OF COMPRESSION STROKE

READY FOR START OF EXPANSION STROKE

END OF EXPANSION STROKE

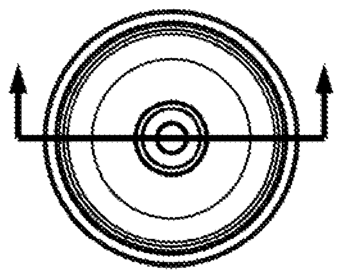
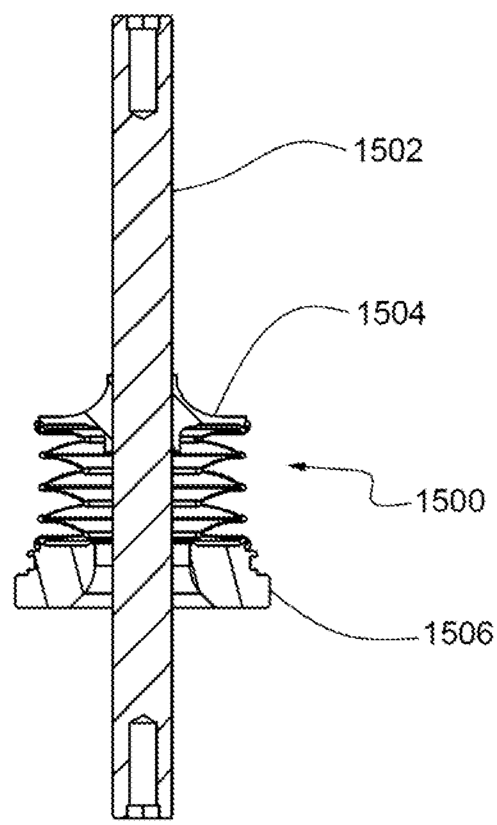
FIG. 15A

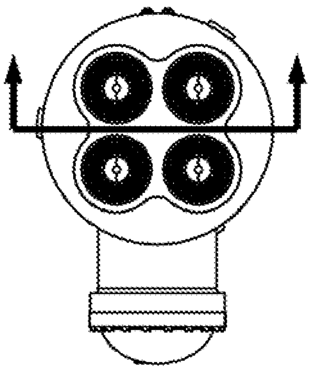
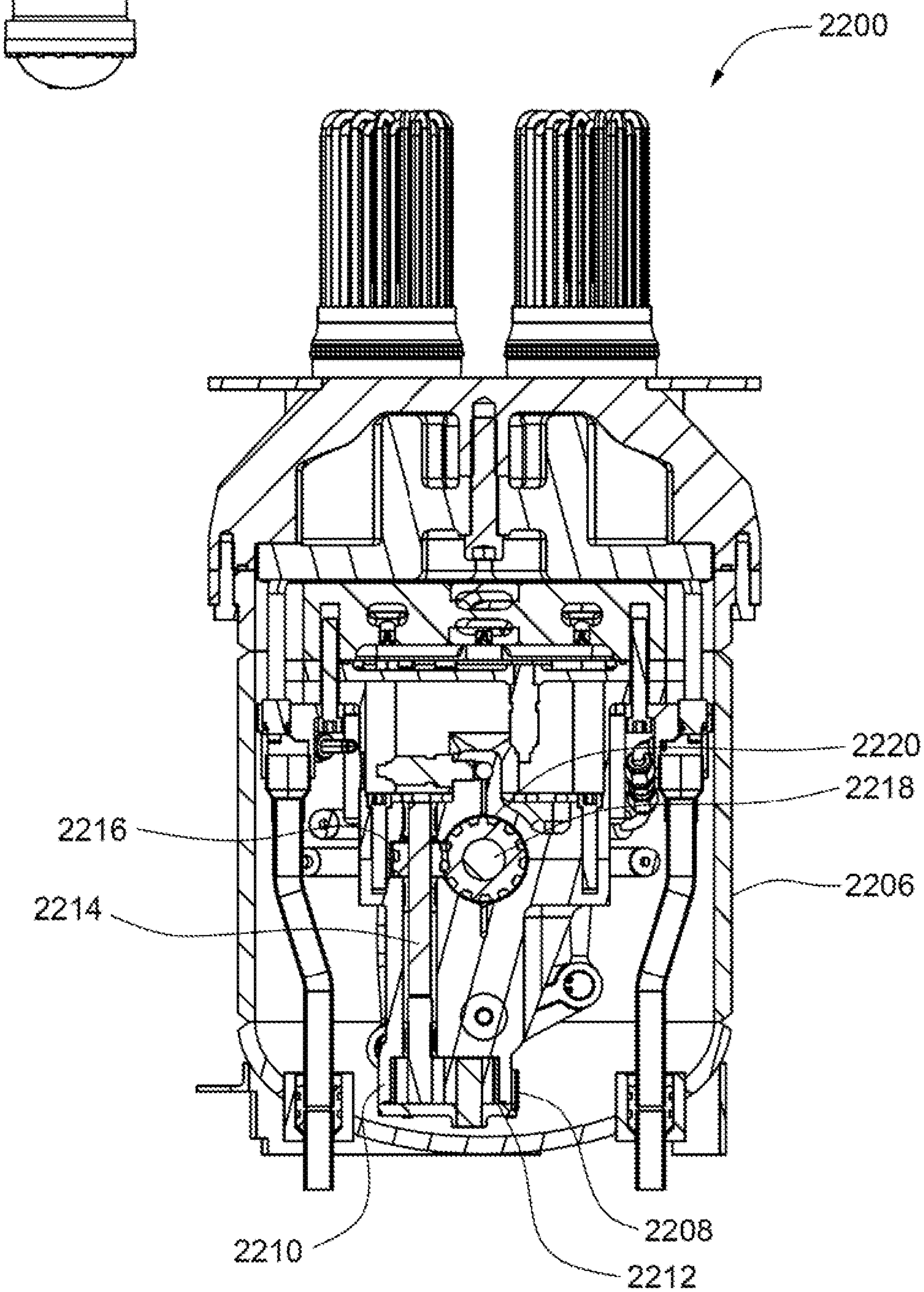
FIG. 23A

Temperature Distribution (with pinch valves)

| | diverted air % | $P_{He}$/ N (psig/rpm) | Power (w) | $T_{MAX}$-$T_{AVG}$ (°C) | Head 1 (max/avg) | Head 2 (max/avg) | Head 3 (max/avg) | Head 4 (max/avg) |
|---|---|---|---|---|---|---|---|---|
| A | 0% | 624 / 2005 | 1168 | 85 | 921 / 892 | 978 / 926 | 938 / 868 | 908 / 887 |
| B | 13.7% | 614 / 2008 | 1098 | 63 | 909 / 869 | 910 / 878 | 934 / 868 | 891 / 872 |
| C | 15.4% | 617 / 2009 | 1250 | 47 | 967 / 933 | 983 / 946 | 982 / 909 | 981 / 957 |

(UV tube plugged, extended prechamber, cleaned spray nozzle, tightened bleed port)
(*080129_G2iB Testing.xls*)
•A--no diverting air applied, burner/engine allowed to reach steady state
•B--diverting applied to heads 1, 2, and 4 (Labview command of 1.5, 10, and 2)
•C--fuel mass flow rate increased; diverting applied to heads 2 and 3 (Labview command of 5.5 and 1.0), burner/engine running at a relatively steady state

FIG. 127

STIRLING CYCLE MACHINE

CROSS REFERENCE TO RELATED APPLICATIONS

This application is a Continuation Application of U.S. patent application Ser. No. 15/790,790, filed Oct. 23, 2017 and entitled Stirling Cycle Machine, now U.S. Pat. No. 11,079,145, issued Aug. 23, 2021, which is a Continuation Application of U.S. patent application Ser. No. 14/319,214, filed Jun. 30, 2014 and entitled Stirling Cycle Machine, now U.S. Pat. No. 9,797,340, issued Oct. 24, 2017, which is a Continuation Application of U.S. patent application Ser. No. 12/829,329, filed Jul. 1, 2010 and entitled Stirling Cycle Machine, now U.S. Pat. No. 8,763,391, issued Jul. 1, 2014 which is a Continuation-In-Part Applications of prior U.S. patent application Ser. No. 12/105,854, filed Apr. 18, 2008 and entitled Stirling Cycle Machine, which is now U.S. Pat. No. 8,474,256, issued Jul. 2, 2013, which claims the benefit of U.S. Provisional Application No. 60/925,818, filed Apr. 23, 2007 and entitled Four Cylinder Stirling Engine and U.S. Provisional Application No. 60/925,814 filed Apr. 23, 2007 and entitled Rocking Beam Drive, all of which are hereby incorporated herein by reference in their entireties.

U.S. patent application Ser. No. 12/829,329 also claims the benefit of U.S. Provisional Application No. 61/222,361 filed Jul. 1, 2009 and entitled Stirling Cycle Machine, which is hereby incorporated herein by reference in its entirety.

TECHNICAL FIELD

The present invention relates to machines and more particularly, to a Stirling cycle machine and components thereof.

BACKGROUND INFORMATION

Many machines, such as internal combustion engines, external combustion engines, compressors, and other reciprocating machines, employ an arrangement of pistons and drive mechanisms to convert the linear motion of a reciprocating piston to rotary motion. In most applications, the pistons are housed in a cylinder. A common problem encountered with such machines is that of friction generated by a sliding piston resulting from misalignment of the piston in the cylinder and lateral forces exerted on the piston by linkage of the piston to a rotating crankshaft. These increased side loads increase engine noise, increase piston wear, and decrease the efficiency and life of the engine. Additionally, because of the side loads, the drive requires more power to overcome these frictional forces, thus reducing the efficiency of the machine.

Improvements have been made on drive mechanisms in an attempt to reduce these side loads, however, many of the improvements have resulted in heavier and bulkier machines.

Accordingly, there is a need for practical machines with minimal side loads on pistons.

SUMMARY

In accordance with one aspect of the present invention, a rocking beam drive mechanism for a machine is disclosed. The drive mechanism includes a rocking beam having a rocker pivot, at least one cylinder and at least one piston. The piston is housed within a respective cylinder. The piston is capable of substantially linearly reciprocating within the respective cylinder. Also, the drive mechanism includes at least one coupling assembly having a proximal end and a distal end. The proximal end is connected to the piston and the distal end is connected to the rocking beam by an end pivot. The linear motion of the piston is converted to rotary motion of the rocking beam.

Some embodiments of this aspect of the present invention include one or more of the following: where the rocking beam is coupled to a crankshaft by way of a connecting rod. In this embodiment, the rotary motion of the rocking beam is transferred to the crankshaft. Also, where the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means is located beneath the linear bearing. Also, where the drive mechanism also includes a seal, where the seal is sealably connected to the piston rod. Also, where the seal is a rolling diaphragm. Also, in some embodiments, the coupling means is a flexible joint. In some embodiments, the coupling means is a roller bearing. In some embodiments, the coupling means is a hinge. In some embodiments, the coupling means is a flexure. In some embodiments, the coupling means is a journal bearing joint.

In accordance with another aspect of the present invention, a Stirling cycle machine is disclosed. The machine includes at least one rocking drive mechanism where the rocking drive mechanism includes: a rocking beam having a rocker pivot, at least one cylinder and at least one piston. The piston is housed within a respective cylinder. The piston is capable of substantially linearly reciprocating within the respective cylinder. Also, the drive mechanism includes at least one coupling assembly having a proximal end and a distal end. The proximal end is connected to the piston and the distal end is connected to the rocking beam by an end pivot. The linear motion of the piston is converted to rotary motion of the rocking beam. Also, a crankcase housing the rocking beam and housing a first portion of the coupling assembly is included. A crankshaft coupled to the rocking beam by way of a connecting rod is also included. The rotary motion of the rocking beam is transferred to the crankshaft. The machine also includes a working space housing the at least one cylinder, the at least one piston and a second portion of the coupling assembly. A seal is included for sealing the workspace from the crankcase.

Some embodiments of this aspect of the present invention include one or more of the following: where the seal is a rolling diaphragm. Also, the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means may be located beneath the linear bearing. Also, the machine may also include a lubricating fluid pump in the crankcase. In some embodiments, the lubricating fluid pump is a mechanical lubricating fluid pump driven by a pump drive assembly, the pump drive assembly being connected to and driven by the crankshaft. In some embodiments, the lubricating fluid pump is an electric lubricating fluid pump. The machine may also include a motor connected to the crankshaft. The machine may also include a generator connected to the crankshaft.

In accordance with another aspect of the present invention, a Stirling cycle machine is disclosed. The machine includes at least two rocking drive mechanisms. The rocking drive mechanisms each include a rocking beam having a rocker pivot, two cylinders, and two pistons. The pistons each housed within a respective cylinder. The pistons are capable of substantially linearly reciprocating within the respective cylinder. Also, the drive mechanisms include two coupling assemblies having a proximal end and a distal end, the proximal end being connected to the piston and the distal end being connected to the rocking beam by an end pivot. The linear motion of the piston is converted to rotary motion of the rocking beam. The machine also includes a crankcase housing the rocking beam and housing a first portion of the coupling assemblies. Also, a crankshaft coupled to the rocking beam by way of a connecting rod. The rotary motion of the rocking beam is transferred to the crankshaft. The machine also includes a lubricating fluid pump in the crankcase for pumping lubricating fluid to lubricate the crankshaft and the rocking beam and the first portion of the coupling assemblies. Also, a working space housing the cylinders, the pistons and the second portion of the coupling assemblies. A rolling diaphragm for sealing the workspace from the crankcase is also included.

Some embodiments of this aspect of the present invention include one or more of the following: where the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means may be located beneath the linear bearing. Also, where the coupling means is a flexible joint. In some embodiments, also disclosed is where the coupling means is a roller bearing.

Other embodiments of this aspect of the present invention relate to one or more of a rocking beam drive mechanism for a machine comprising a rocking beam having a rocker pivot, at least one cylinder, at least one piston, the piston housed within a respective cylinder whereby the piston is capable of substantially linearly reciprocating within the respective cylinder, and at least one coupling assembly having a proximal end and a distal end, the proximal end being connected to the piston and the distal end being connected to the rocking beam by an end pivot and linear motion of the piston is converted to rotary motion of the rocking beam.

A still further embodiment of the invention relate to one or more embodiments of a Stirling cycle machine comprising at least one rocking drive mechanism comprising a rocking beam having a rocker pivot, at least one cylinder, at least one piston, the piston housed within a respective cylinder whereby the piston is capable of substantially linearly reciprocating within the respective cylinder and at least one coupling assembly having a proximal end and a distal end, the proximal end being connected to the piston and the distal end being connected to the rocking beam by an end pivot, whereby linear motion of the piston is converted to rotary motion of the rocking beam, a crankcase housing the rocking beam and housing a first portion of the coupling assembly, a crankshaft coupled to the rocking beam by way of a connecting rod, whereby the rotary motion of the rocking beam is transferred to the crankshaft, a working space housing the at least one cylinder, the at least one piston and a second portion of the coupling assembly, and an airlock space separating the crankcase and the working space for maintaining a pressure differential between the crankcase housing and the working space housing.

A still further embodiment of the invention relate to one or more embodiments of an external combustion engine comprising at least two rocking drive mechanisms comprising a rocking beam having a rocker pivot, at least two cylinders, at least two pistons, the pistons each housed within a respective cylinder whereby the pistons are capable of substantially linearly reciprocating within the respective cylinder and two coupling assemblies having a proximal end and a distal end, the proximal end being connected to the piston and the distal end being connected to the rocking beam by an end pivot, whereby linear motion of the piston is converted to rotary motion of the rocking beam, a crankcase housing the rocking beam and housing a first portion of the coupling assemblies, a crankshaft coupled to the rocking beam by way of a connecting rod, whereby the rotary motion of the rocking beam is transferred to the crankshaft, a lubricating fluid pump in the crankcase for pumping lubricating fluid to lubricate the crankshaft and the rocking beam and the first portion of the coupling assemblies, a working space housing the cylinders, the pistons and the second portion of the coupling assemblies, an airlock space separating the crankcase and the working space for maintaining a pressure differential between the crankcase housing and the working space housing, a heating element comprising a burner having at least one burner head for igniting and maintaining a heating flame in a combustion chamber adjacent the at least one heater head, and an electronic control unit managing the heating element according to operational data of the engine obtained from at least one of the rocking drive mechanisms, lubricating fluid pump, the crankcase, the working space, crankshaft, heating element and the airlock.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein:

FIG. 15A shows a view of a metal bellows and accompanying piston rod and pistons in accordance with one embodiment;

FIG. 23A shows a view of an engine in accordance with one embodiment;

FIG. 67A-1 is a detailed view of a cooler for an engine in accordance with one embodiment;

FIG. 67B-1 is a detailed view of a cooler for an engine in accordance with one embodiment;

FIG. 77 shows a schematic of another embodiment of the burner with temperature sensor and engine speed control loop;

FIG. 78 shows a schematic of yet another embodiment of the burner with temperature sensor and oxygen sensor control loop;

FIG. 79 shows an alternative embodiment of the ejector wherein the fuel is fed directly into the ejector;

FIG. 80 is a block diagram showing a system for controlling a pressurized combustion chamber of an engine according to an embodiment;

FIG. 81 shows a piston pump according to one embodiment;

FIG. 82 shows an alternating current waveform suitable for driving the piston pump of FIG. 81;

FIG. 83 shows a pulse-width-modulated direct current waveform suitable for driving the piston pump of FIG. 81, according to one embodiment;

FIG. 84 is schematic diagram of a diaphragm pump according to one embodiment;

FIG. 85 is a schematic diagram of a center-tapped coil for a diaphragm pump according to one embodiment;

FIGS. 86A and 86B shows pulse-width-modulated direct current waveforms suitable for driving the center-tapped coil of FIG. 85, according to some embodiments;

FIGS. 87A-87D show embodiments of including a filter between the fuel pump and combustion chamber;

FIG. 88 shows a view of an engine in accordance with one embodiment;

Figure 89A:
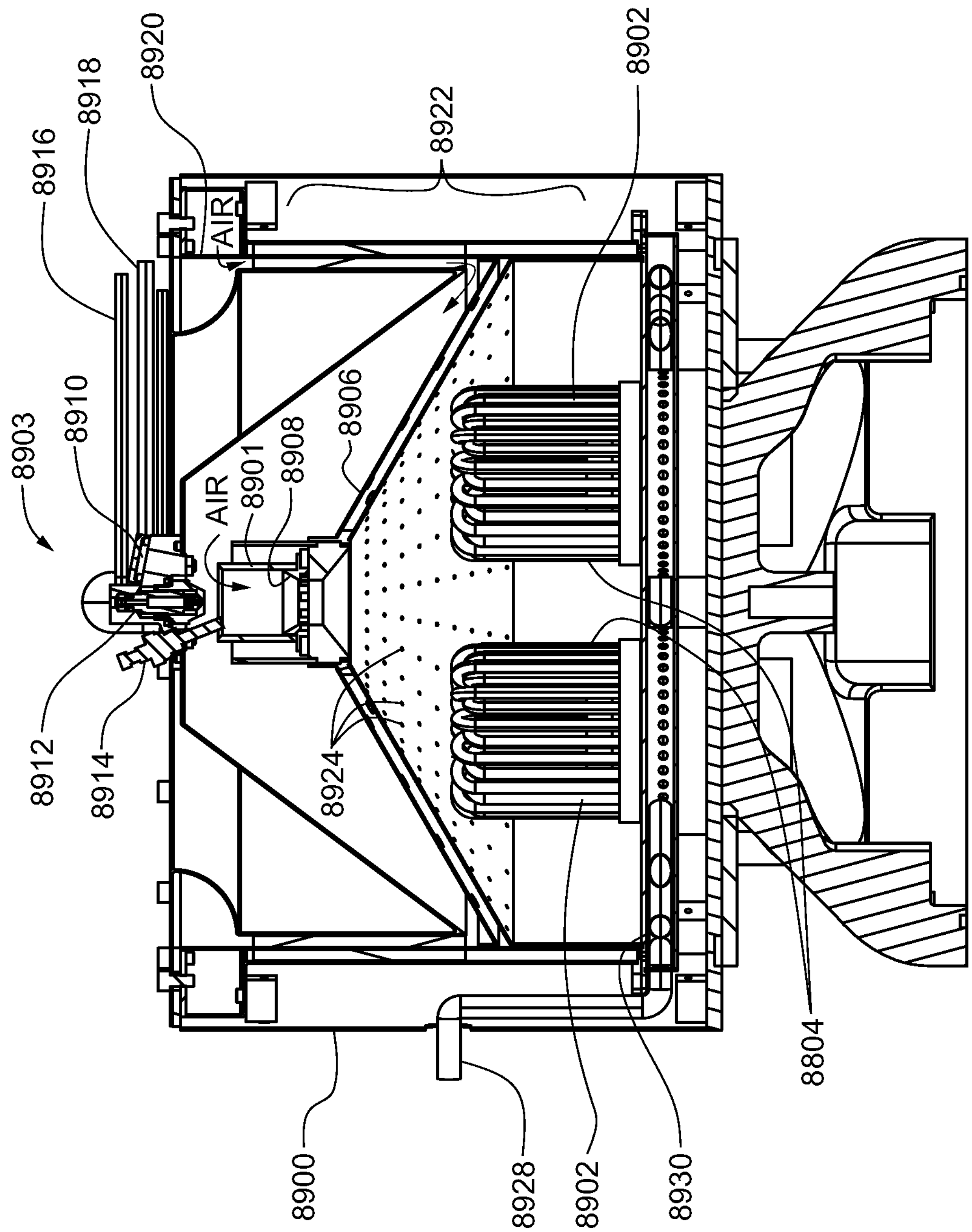
Figure 89B:
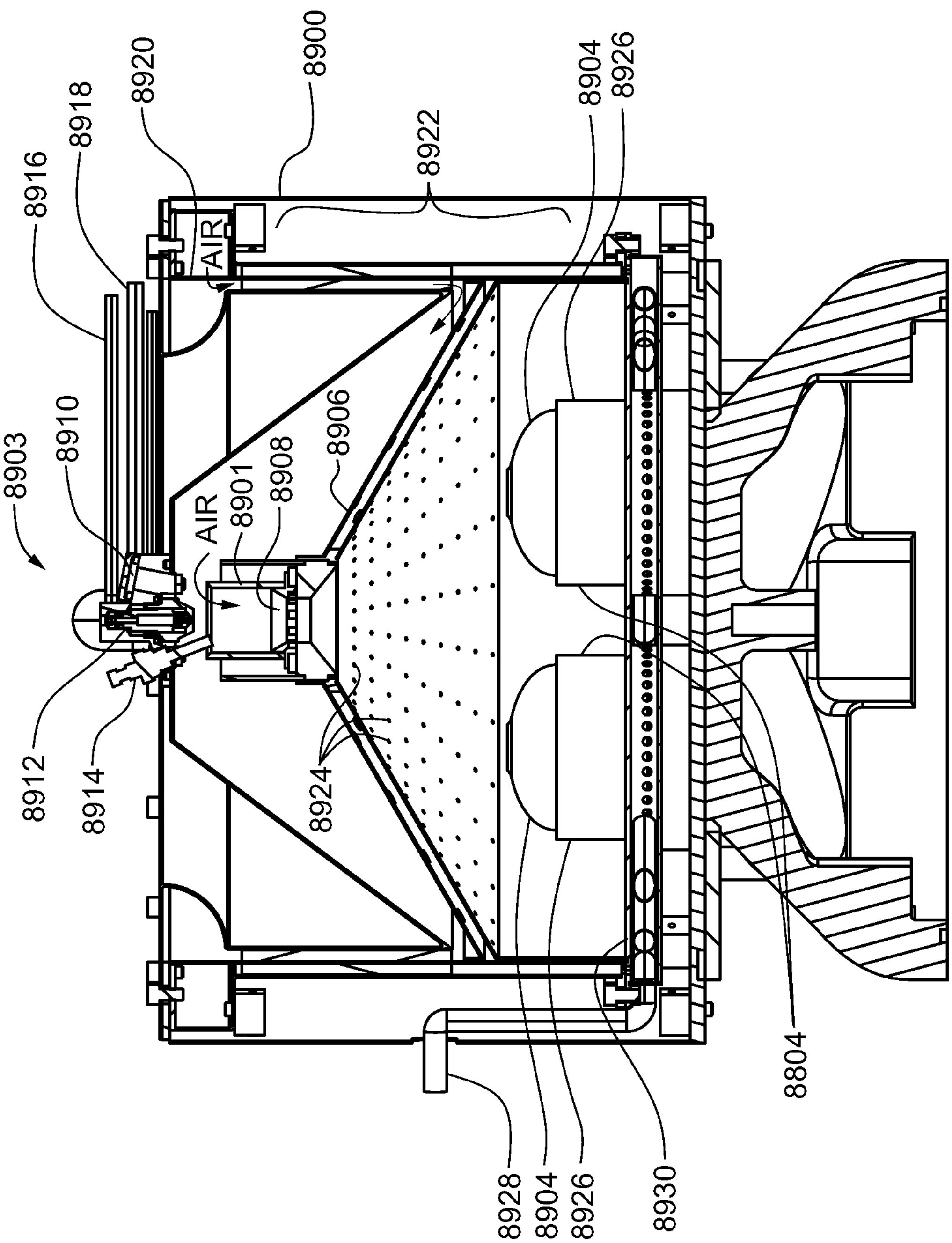
Figure 89C:
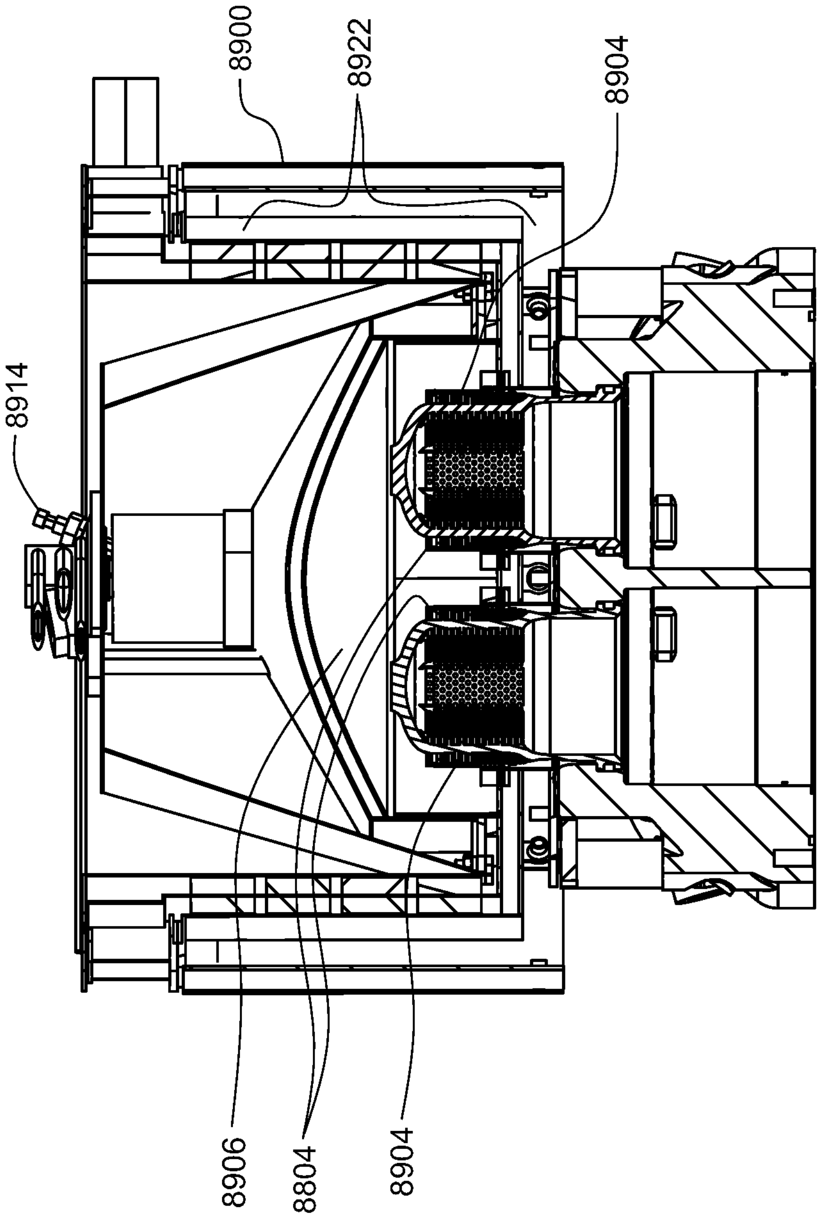
Figure 90:
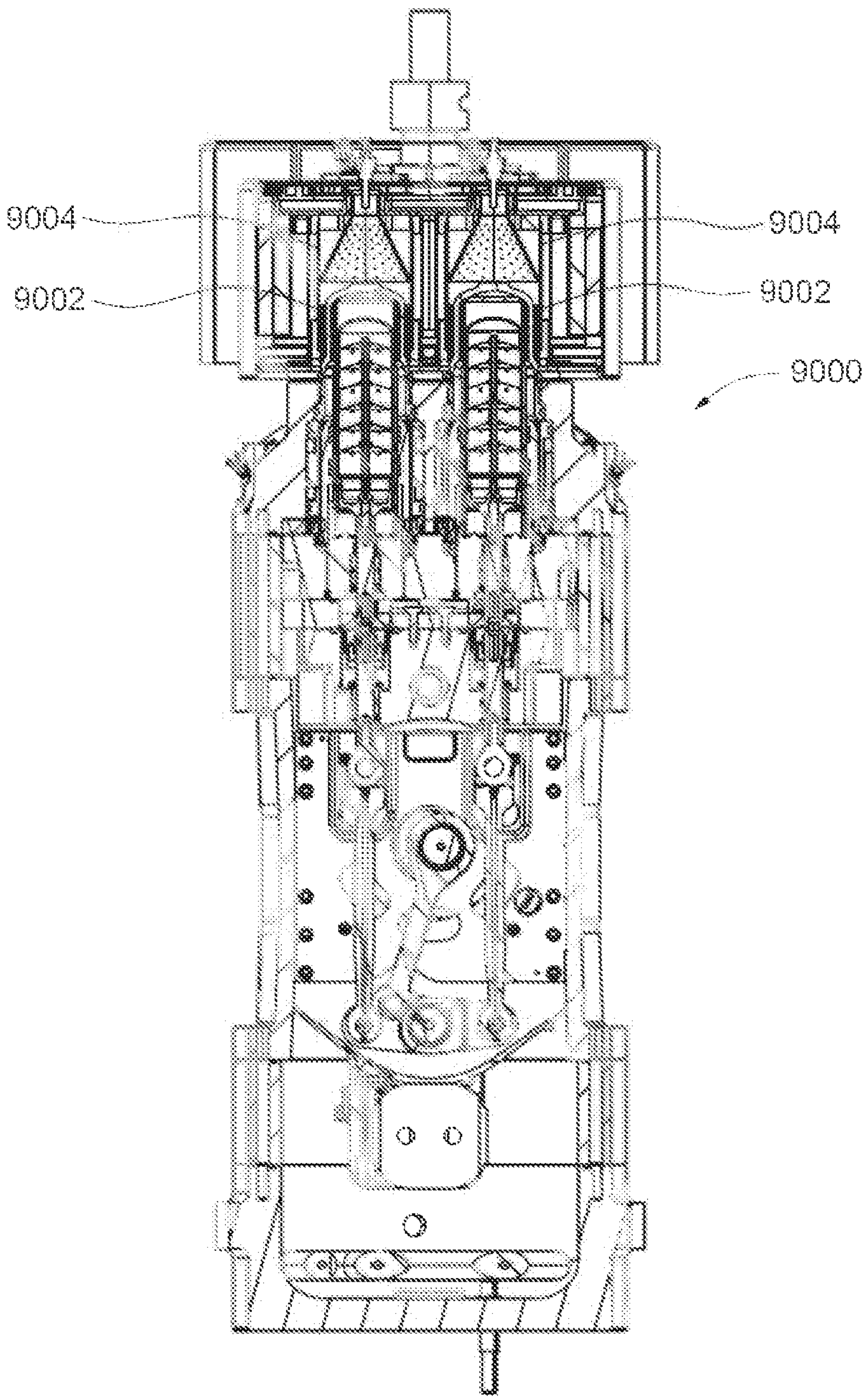
Figure 91A:
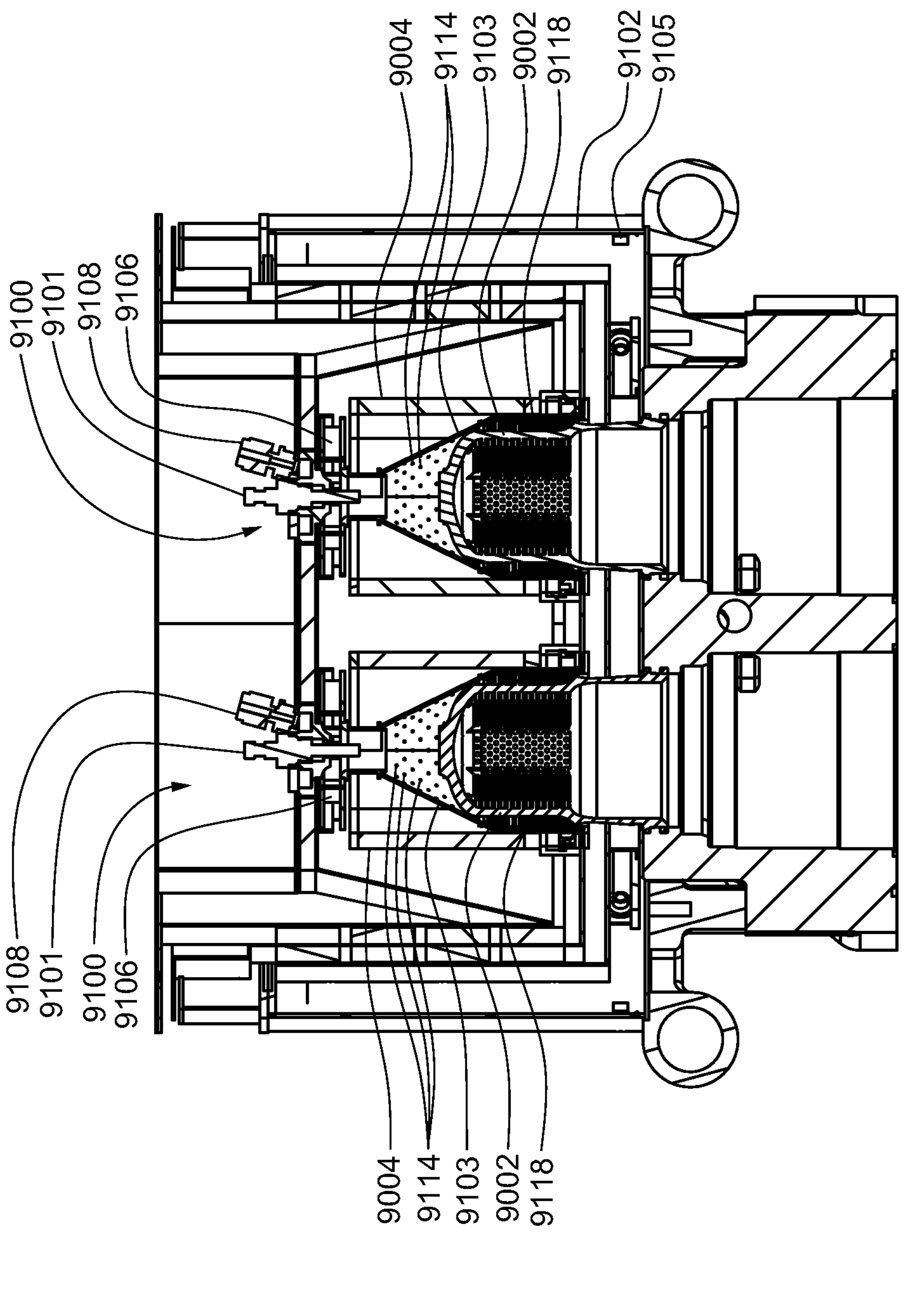
Figure 91B:
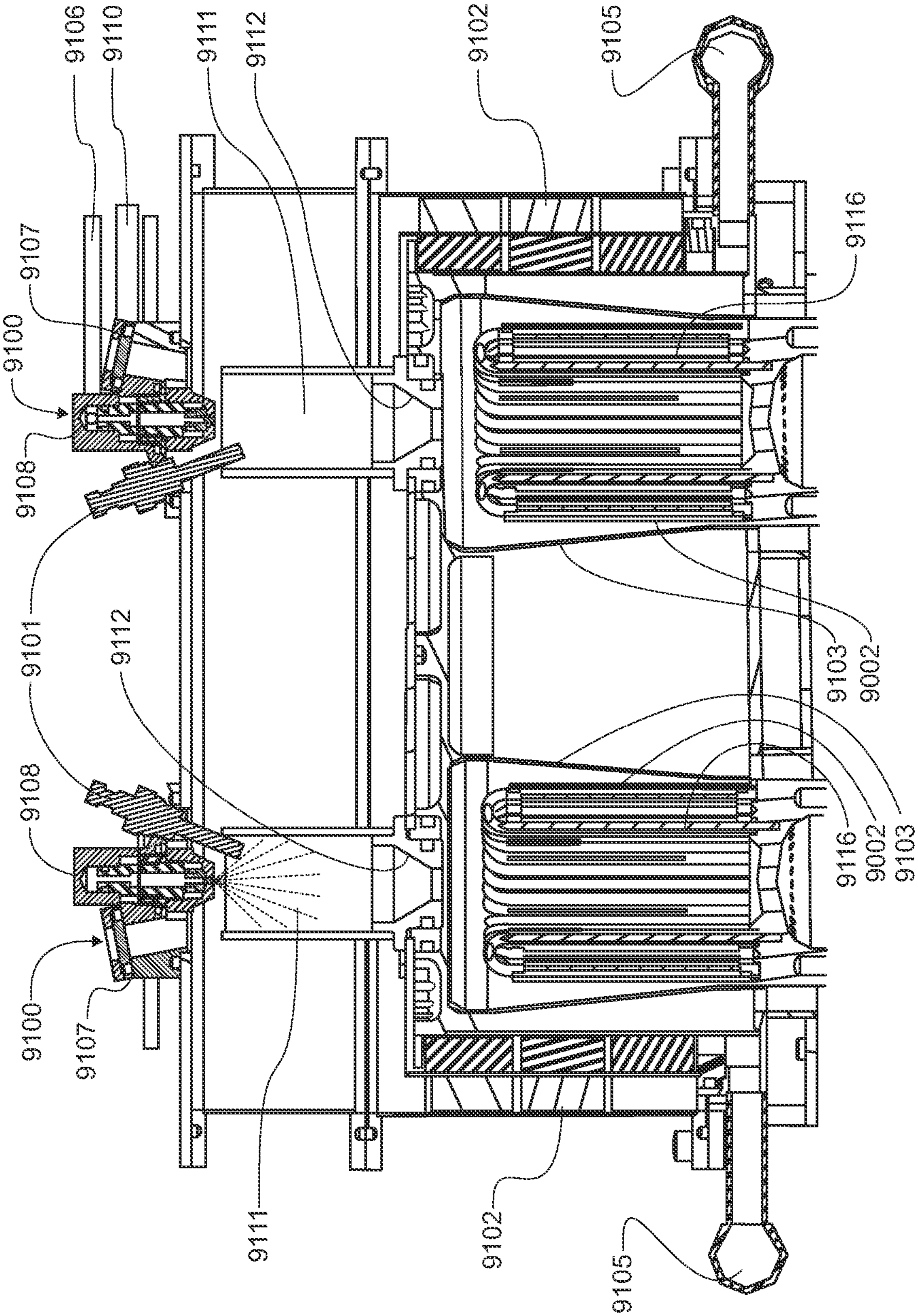
Figure 91C:
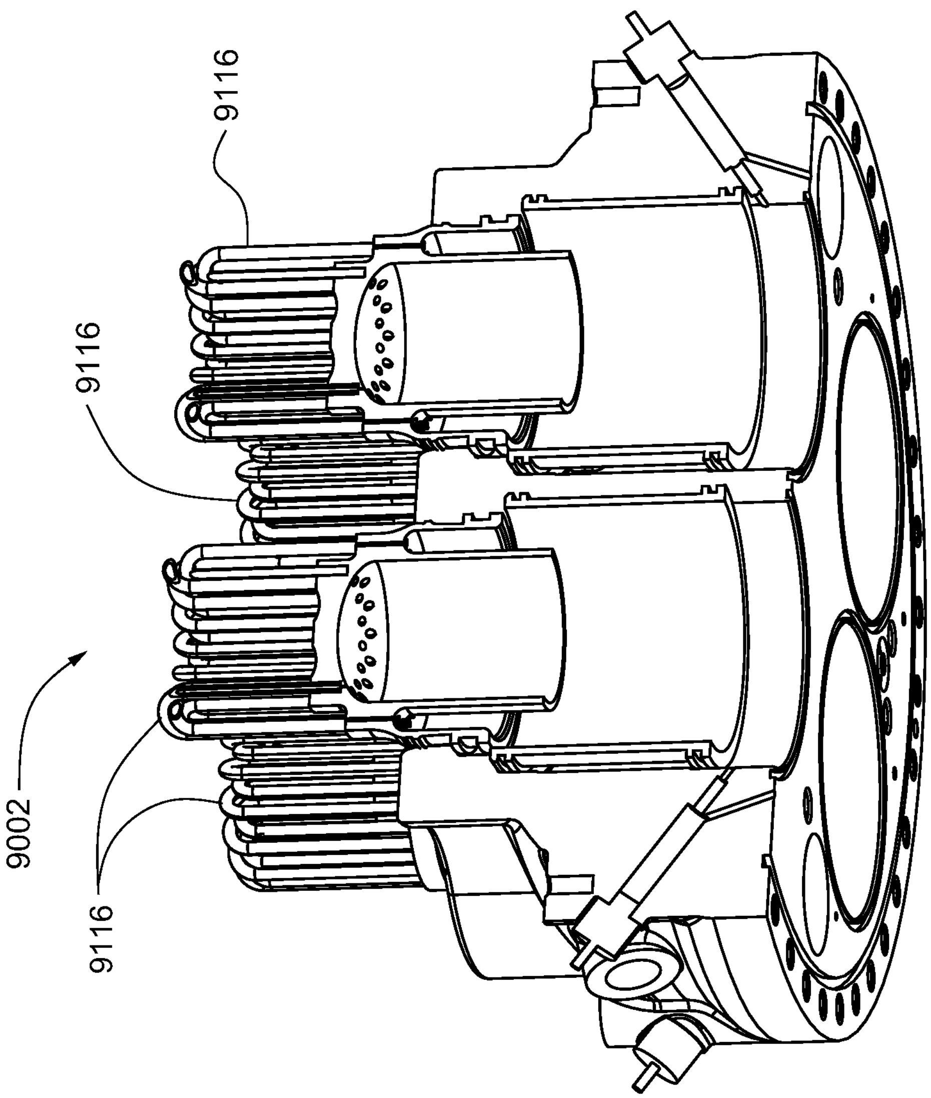
Figure 91D:
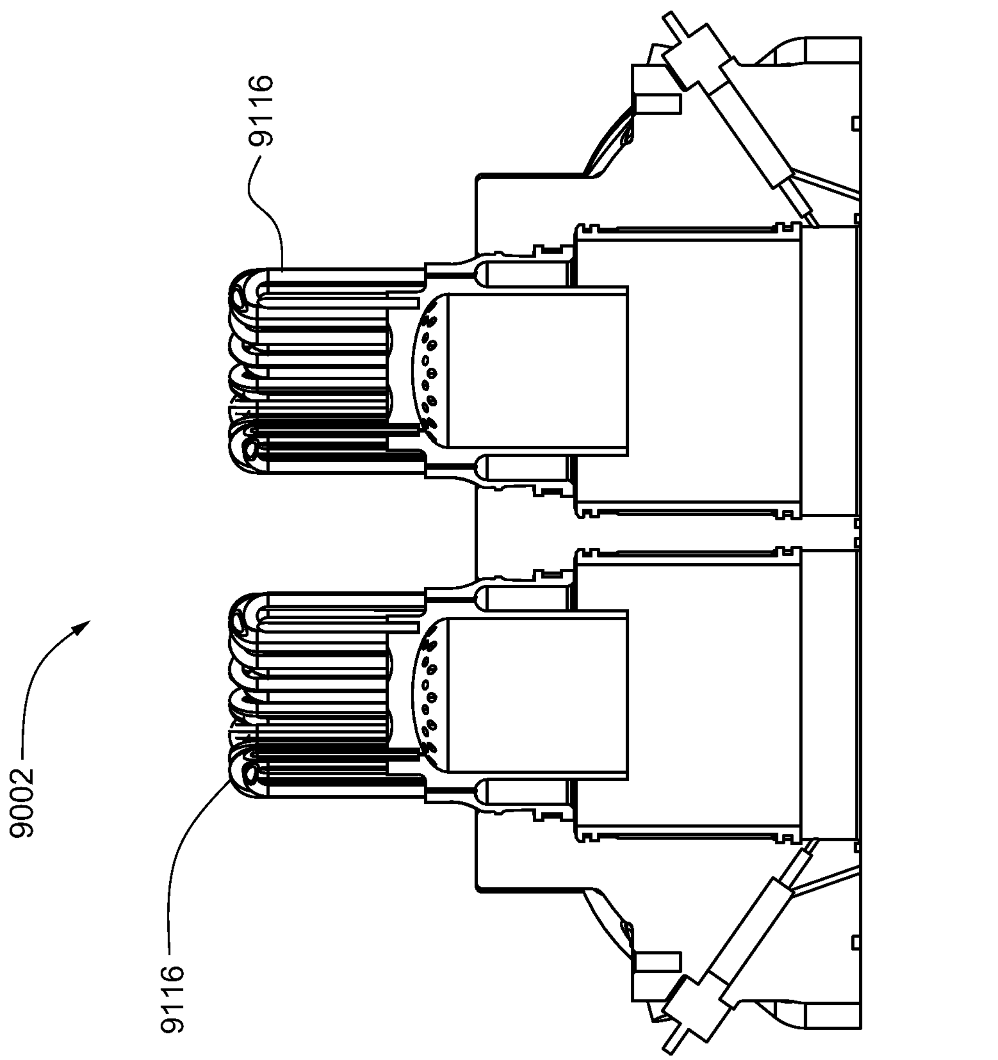
Figure 92:
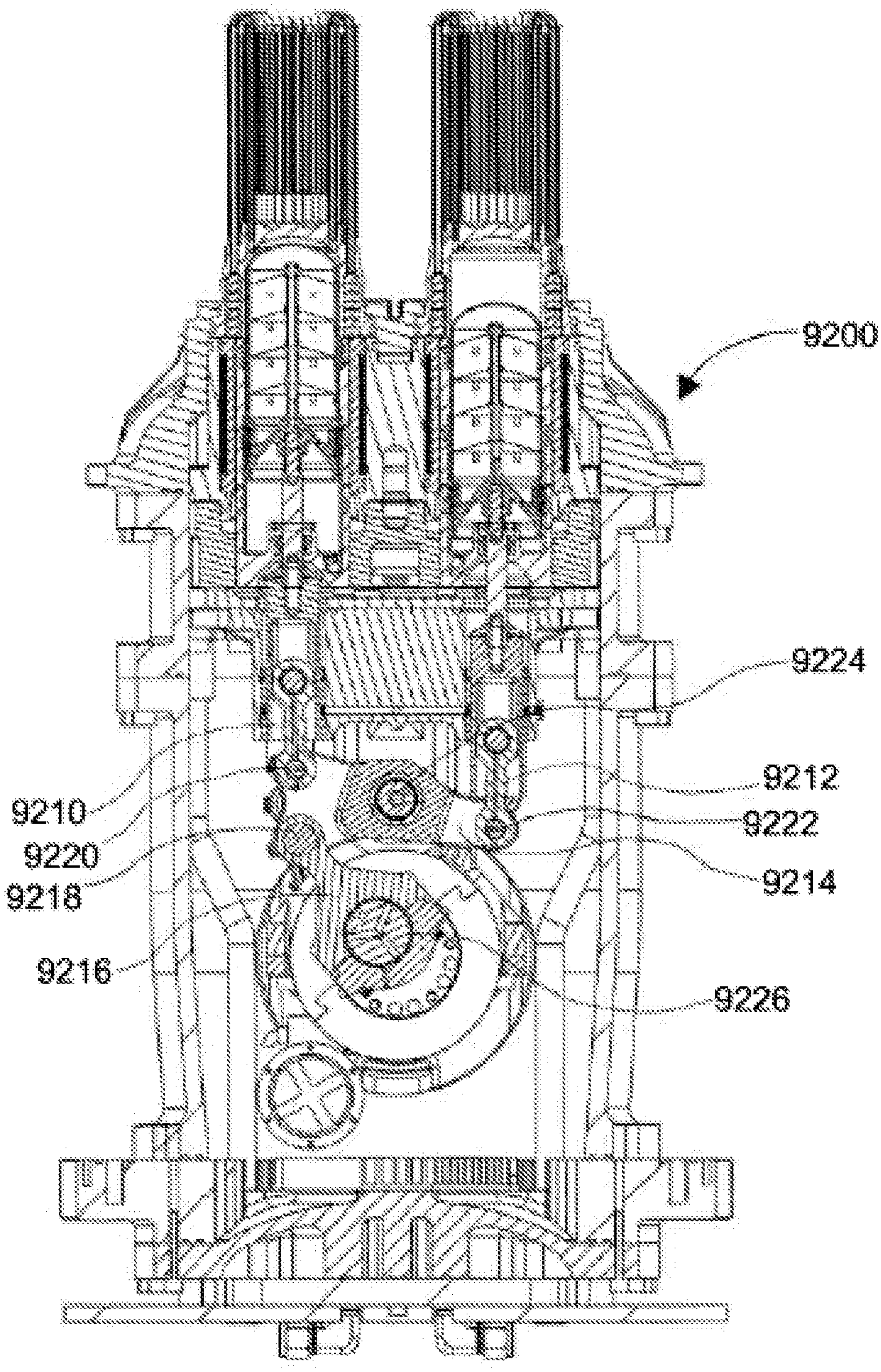
Figure 93B:
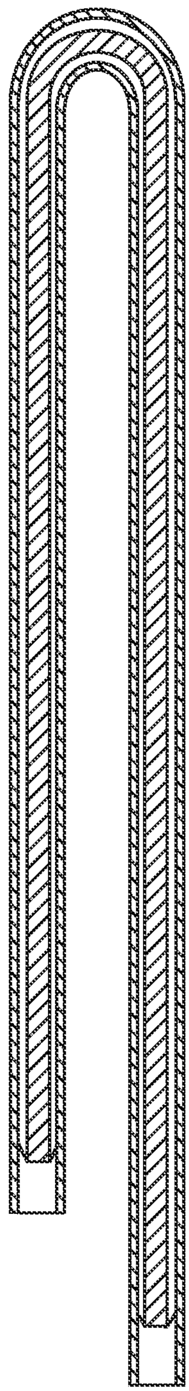
Figure 93A:
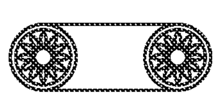
Figure 94B:
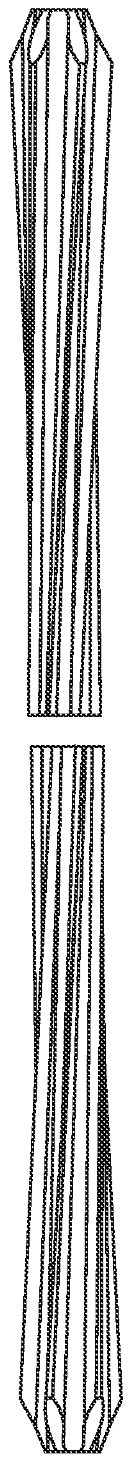
Figure 94A:
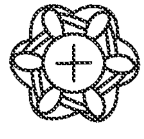
Figure 95B:
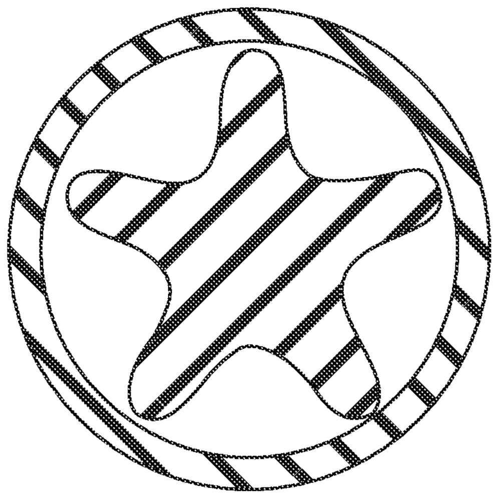
Figure 95A:
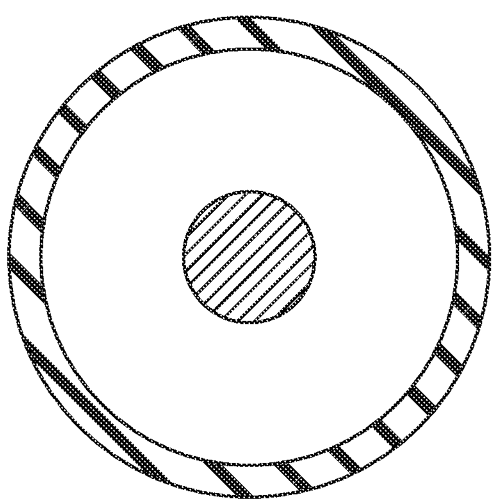

FIGS. 89A-89C show views of a burner for an engine in accordance with various embodiments;

FIG. 90 shows a view of an engine with multiple burners in accordance with yet another embodiment of the invention;

FIGS. 91A and 91B show views of multiple burners for an engine in accordance with various embodiments;

FIG. 91C shows a view of a tube heater head in accordance with one embodiment;

FIG. 91D shows a cross section of the tube heater head depicted in FIG. 91C;

FIG. 92 shows a cross section of an engine in accordance with one embodiment;

FIG. 93A-B shows views of a heater tube with an insert;

FIG. 94A-B shows an embodiment of a helical heater tube insert;

FIG. 95A-B show cross sectional views of two embodiments of a heater tube insert in a heater tube.

Figure 96A:
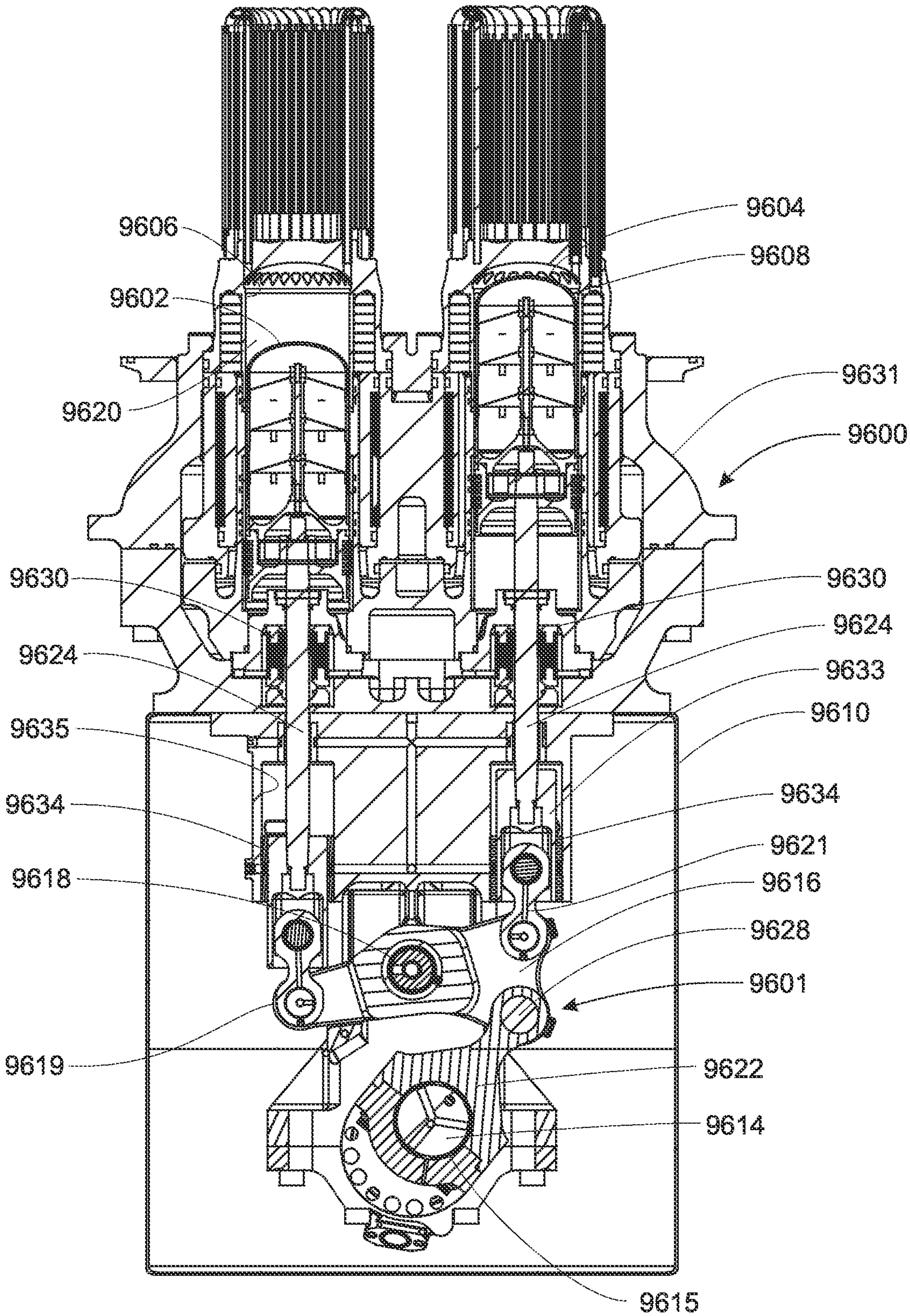
Figure 96B:
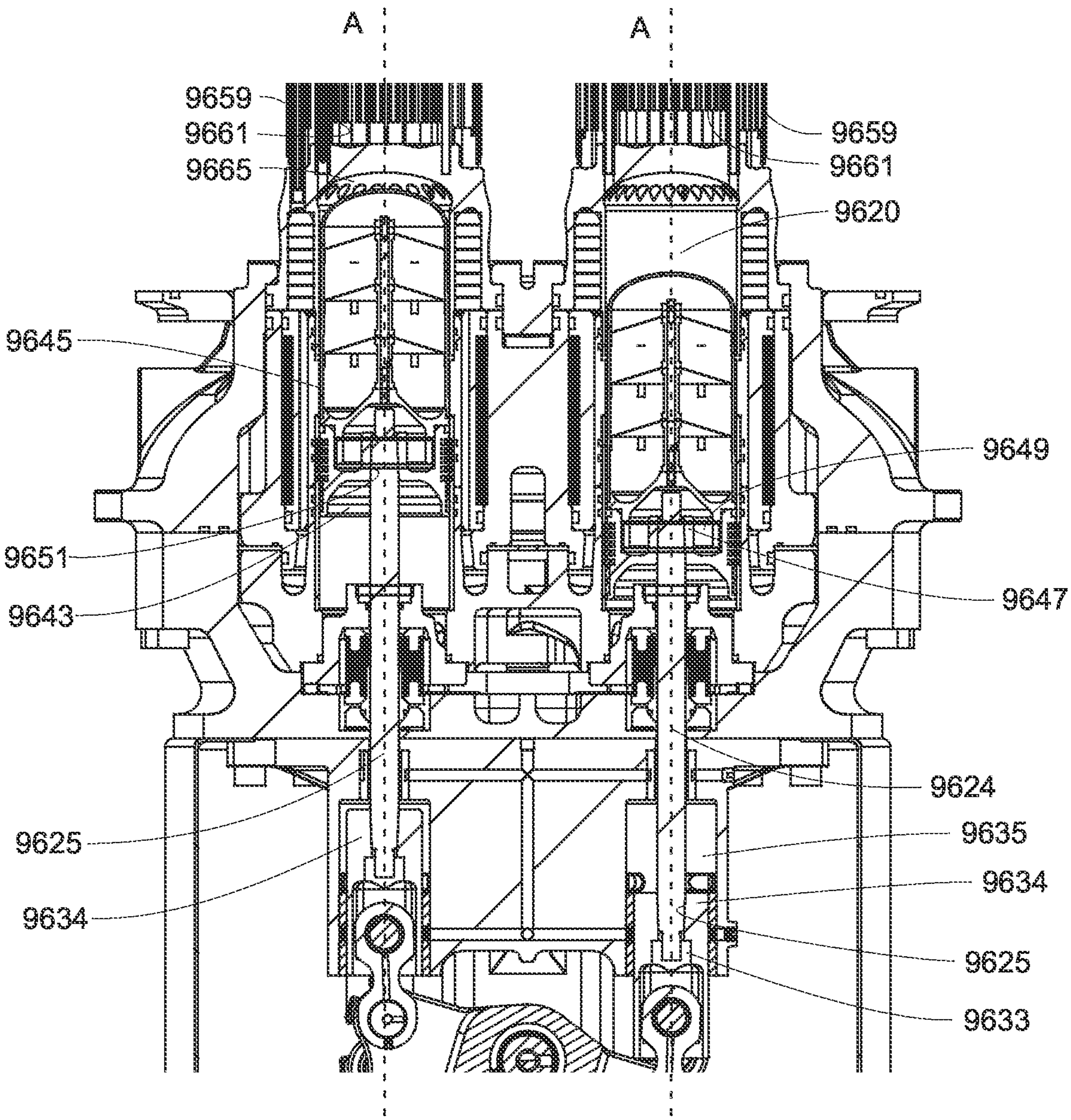
Figure 96D:
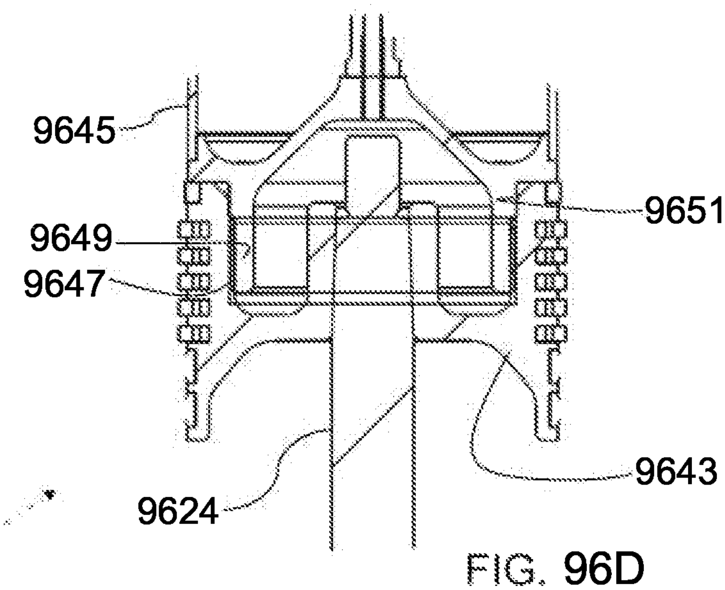
Figure 96C:
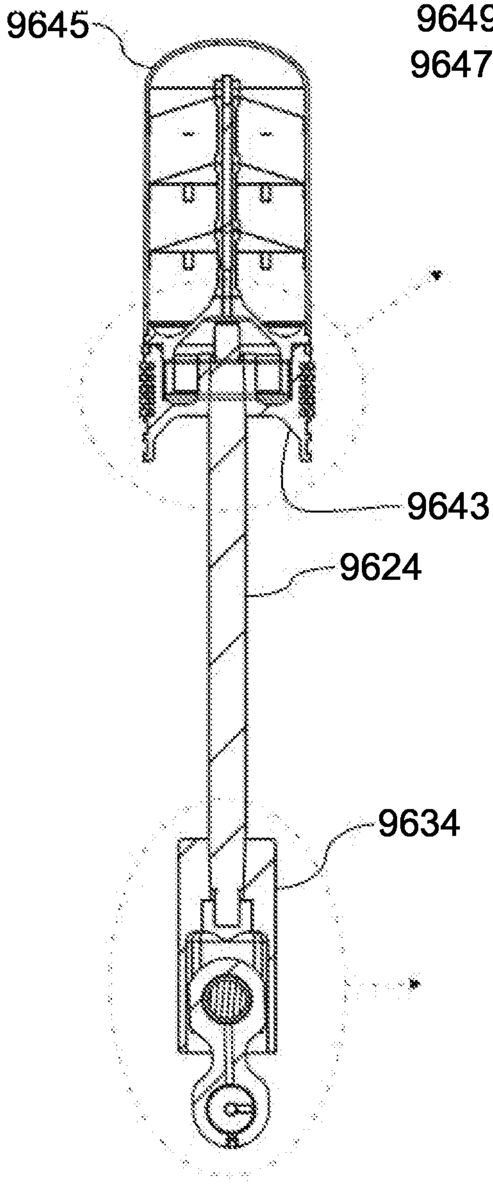
Figure 96E:
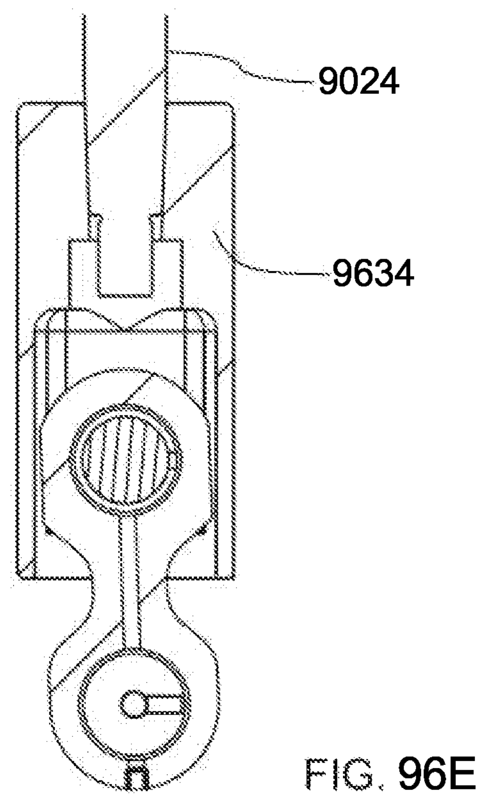
Figure 96F:
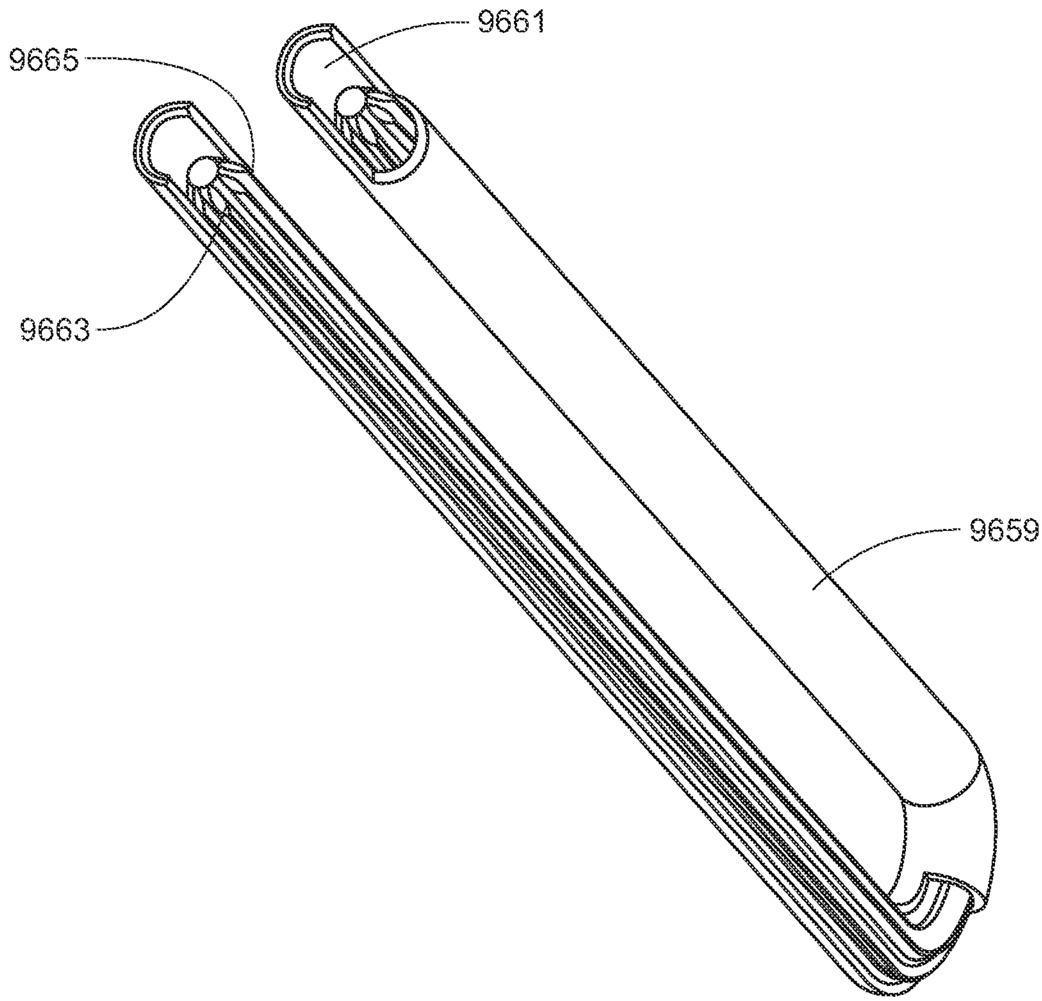
Figure 97A:
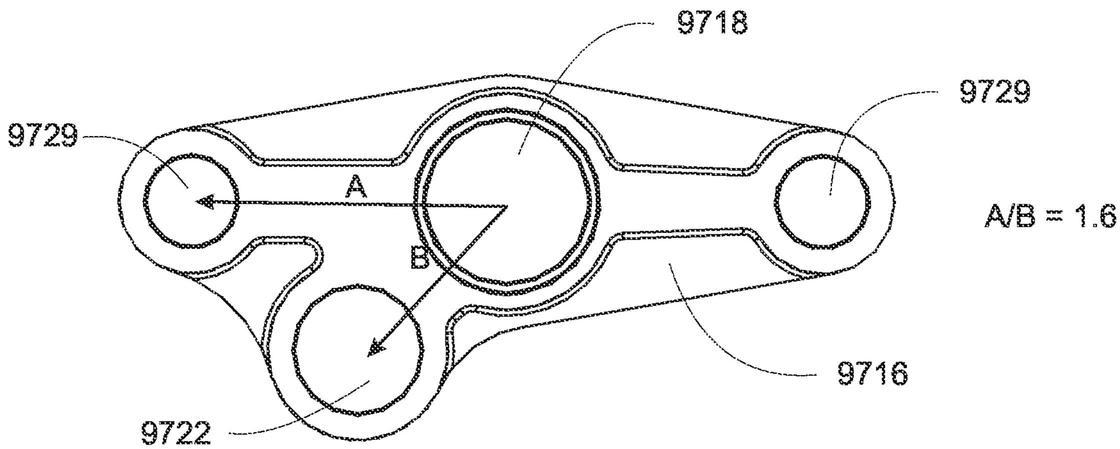
Figure 97B:
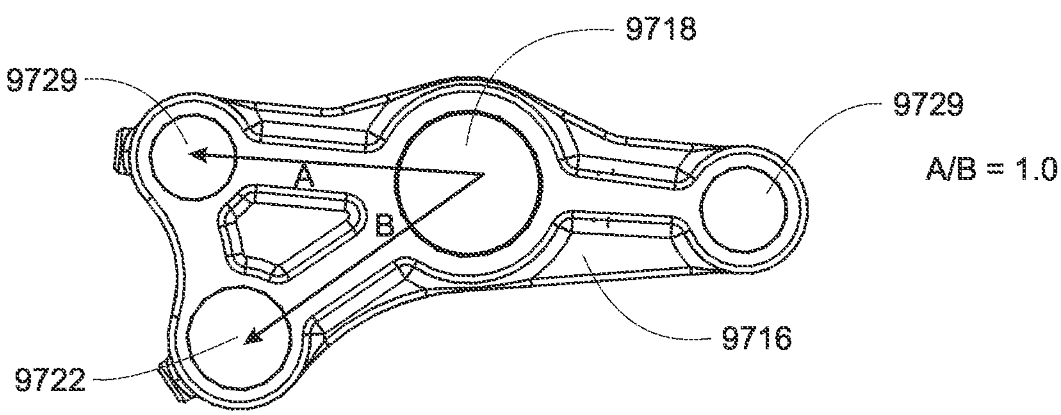
Figure 98B:
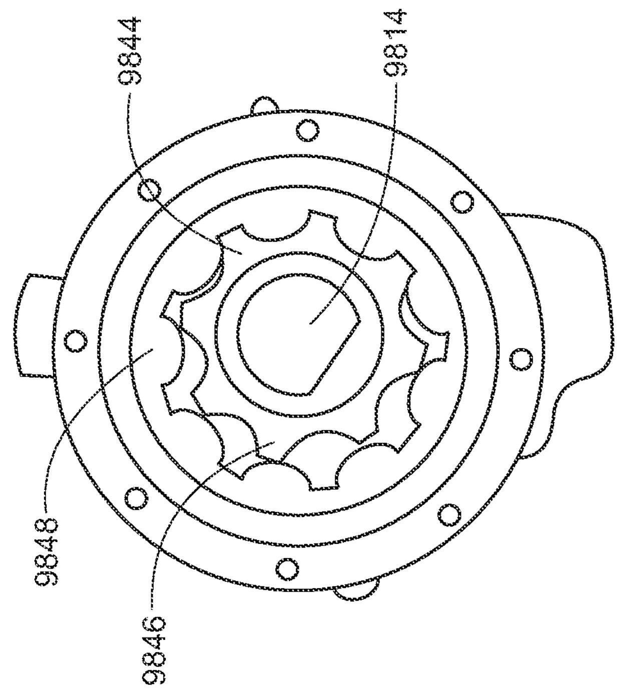
Figure 98A:
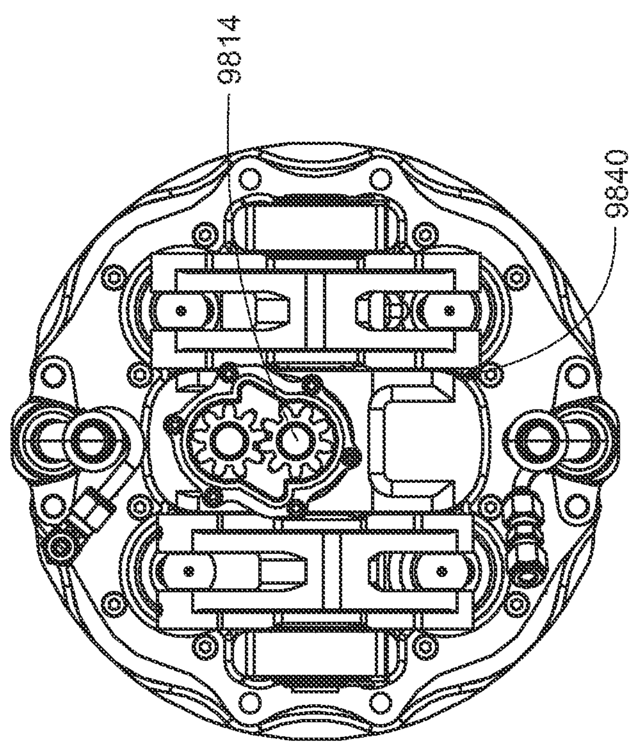
Figure 99A:
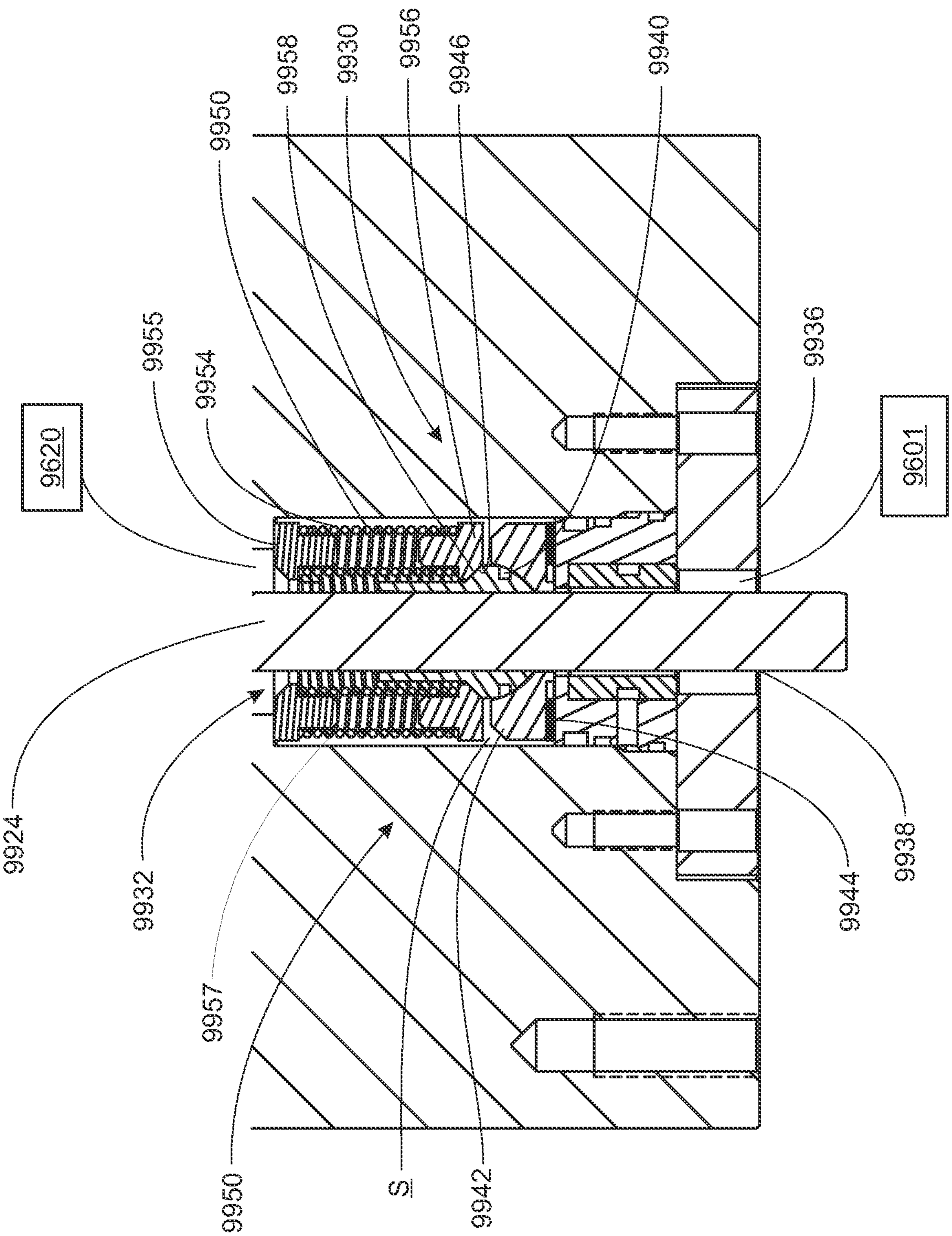
Figure 99B:
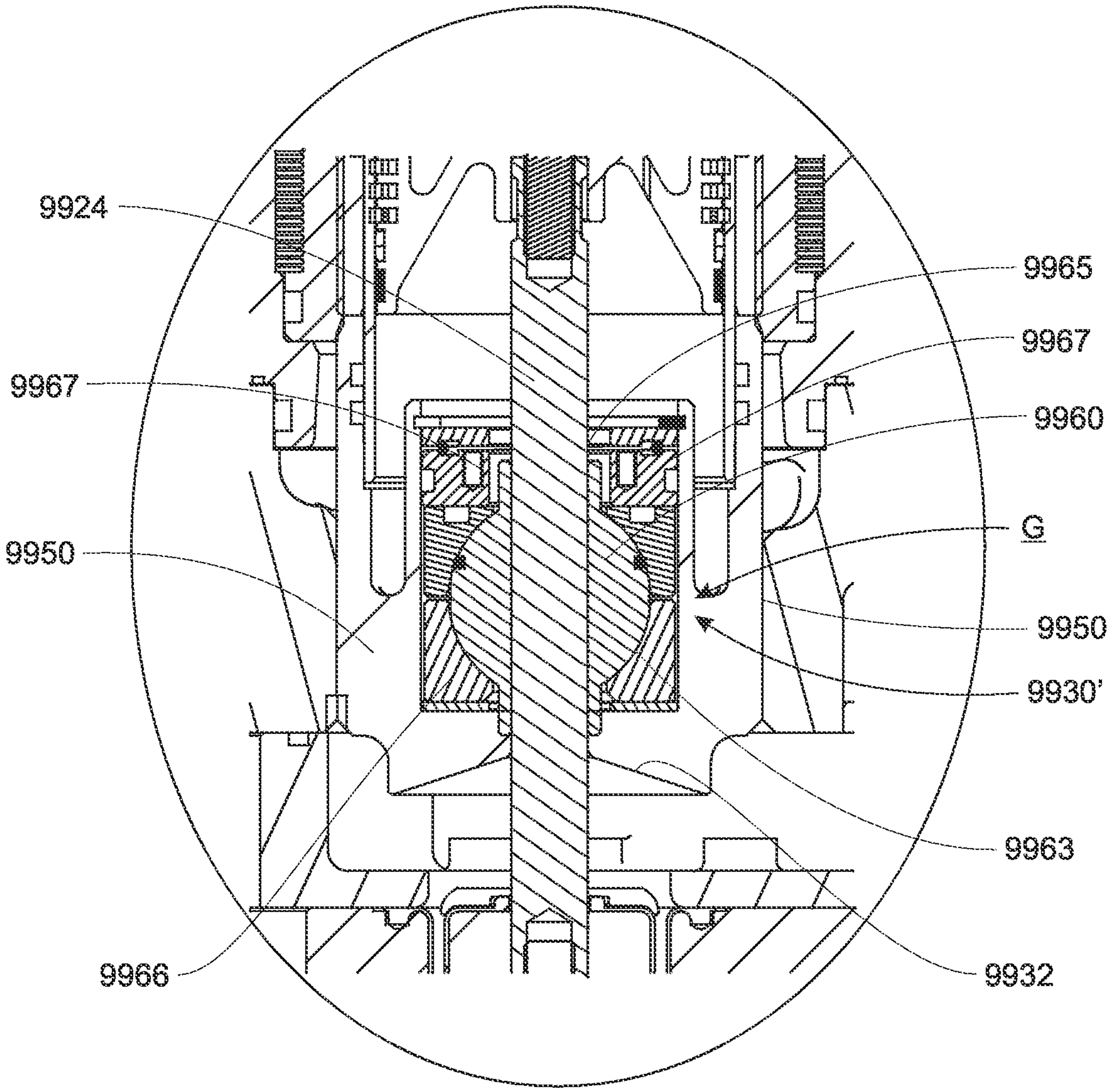
Figure 100A:
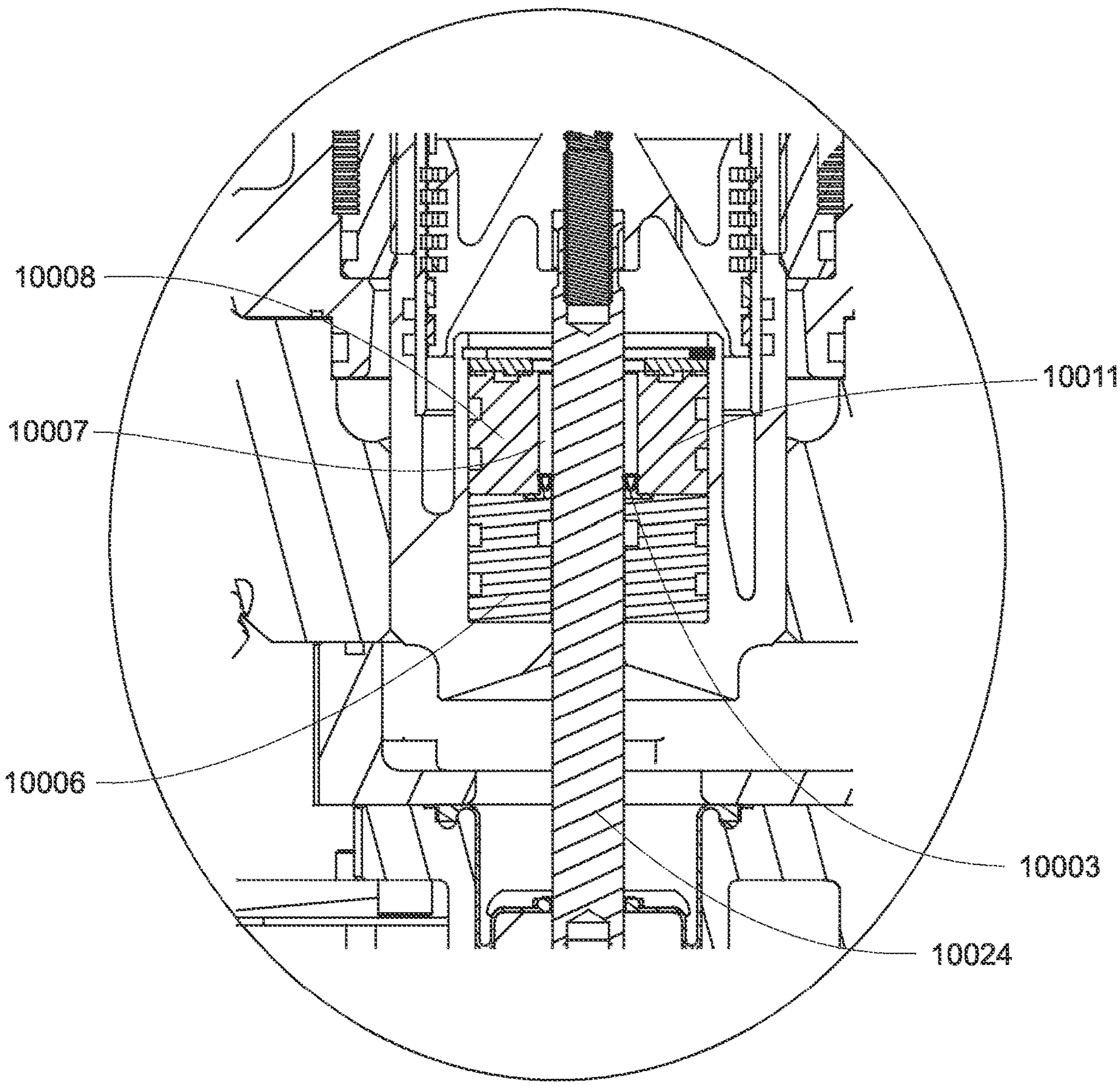
Figure 100B:
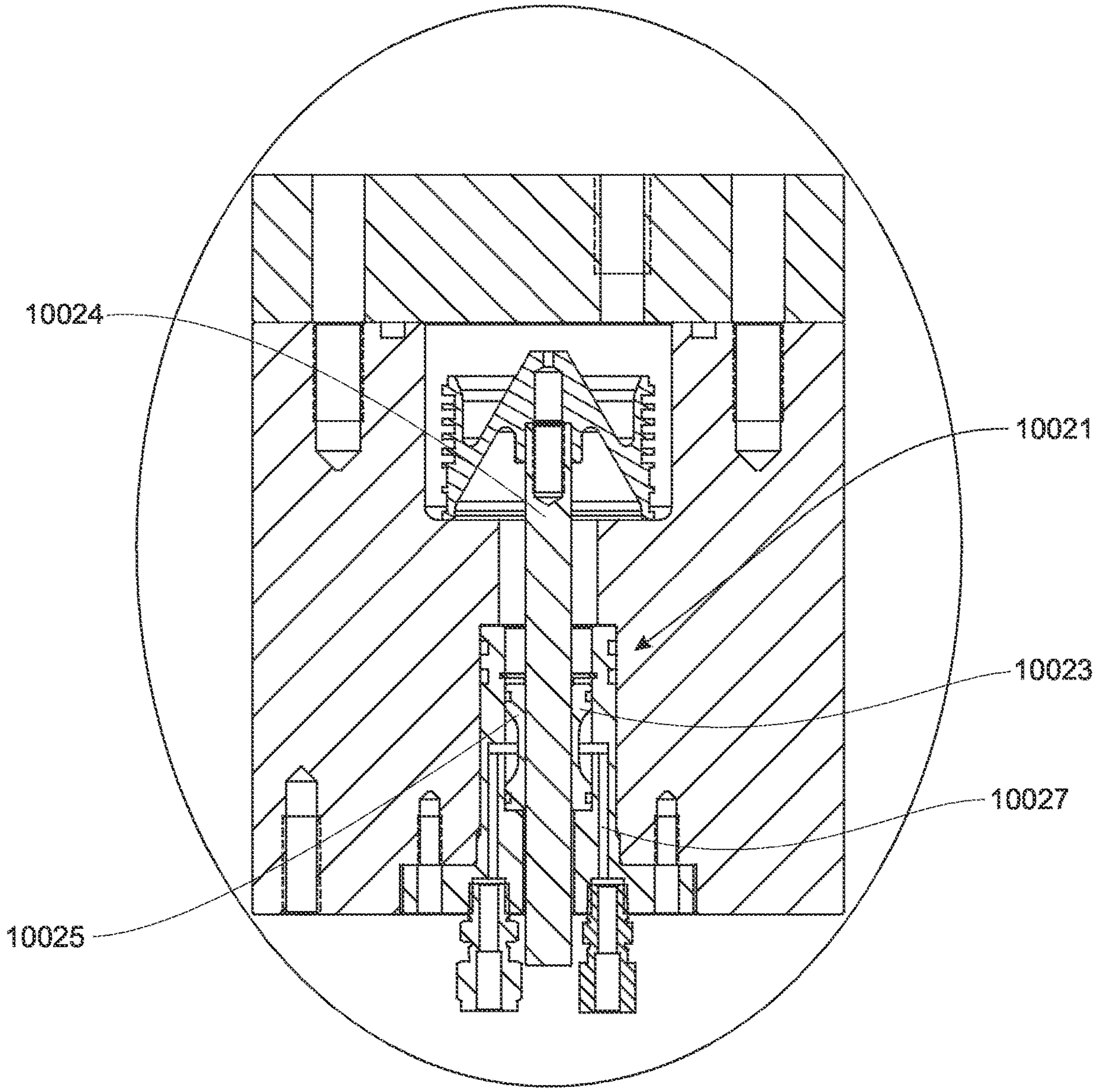
Figure 101A:
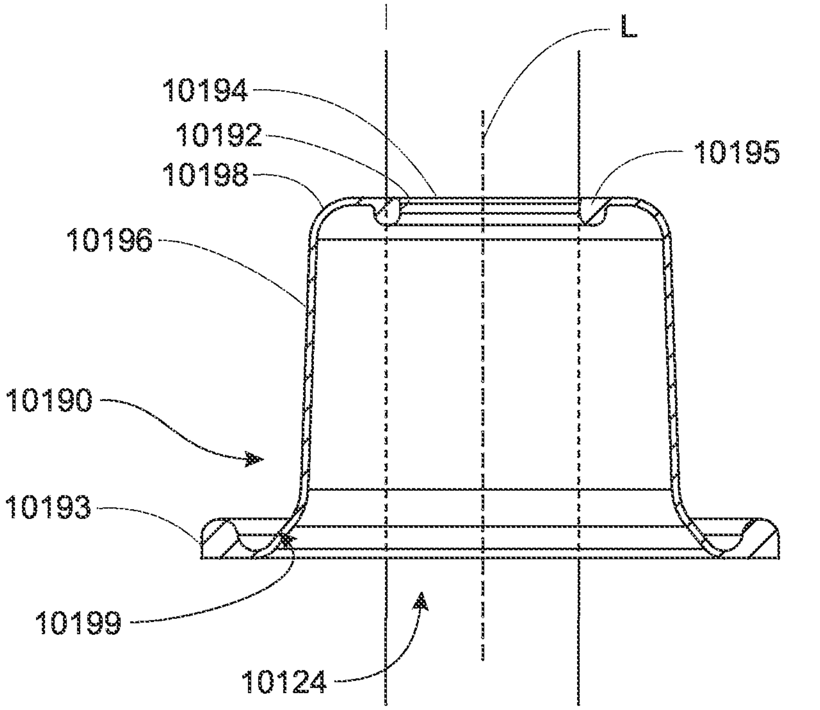
Figure 101B:
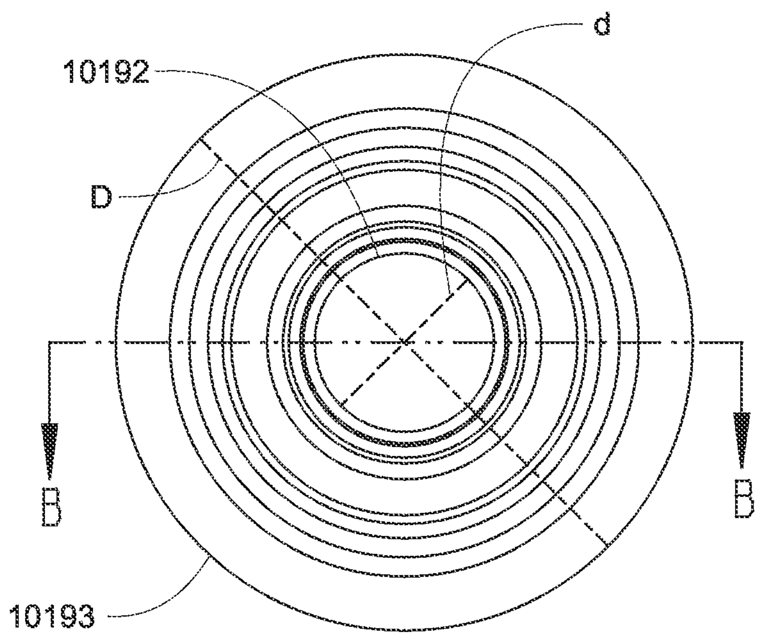
Figure 102A:
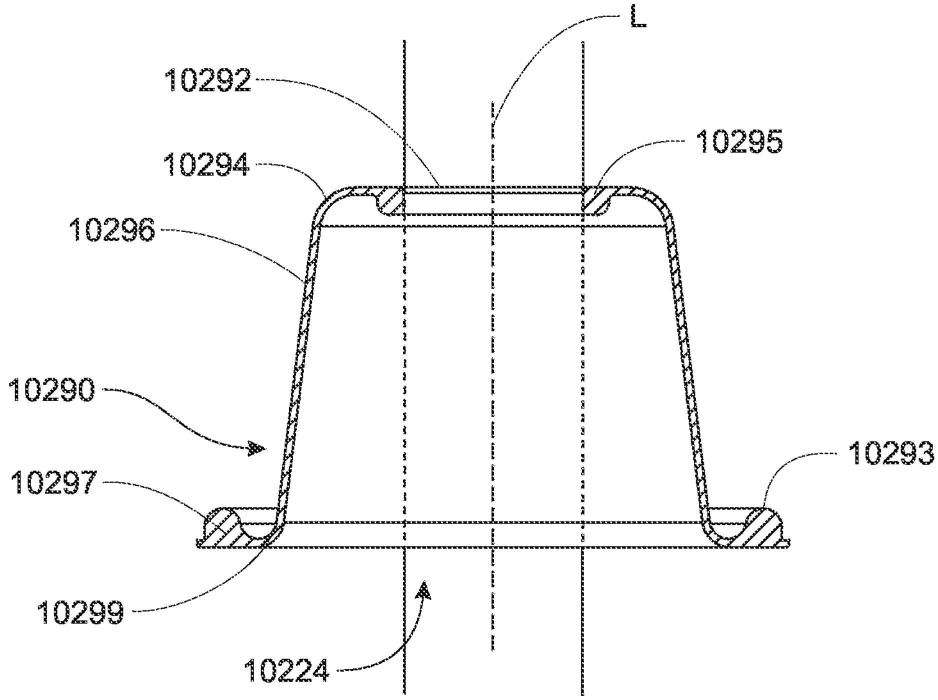
Figure 102B:
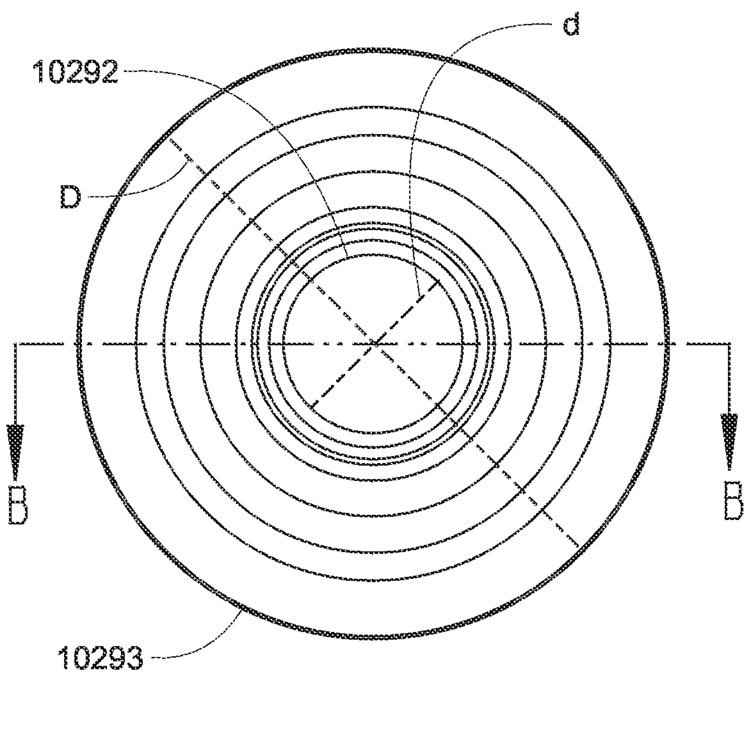
Figure 103:
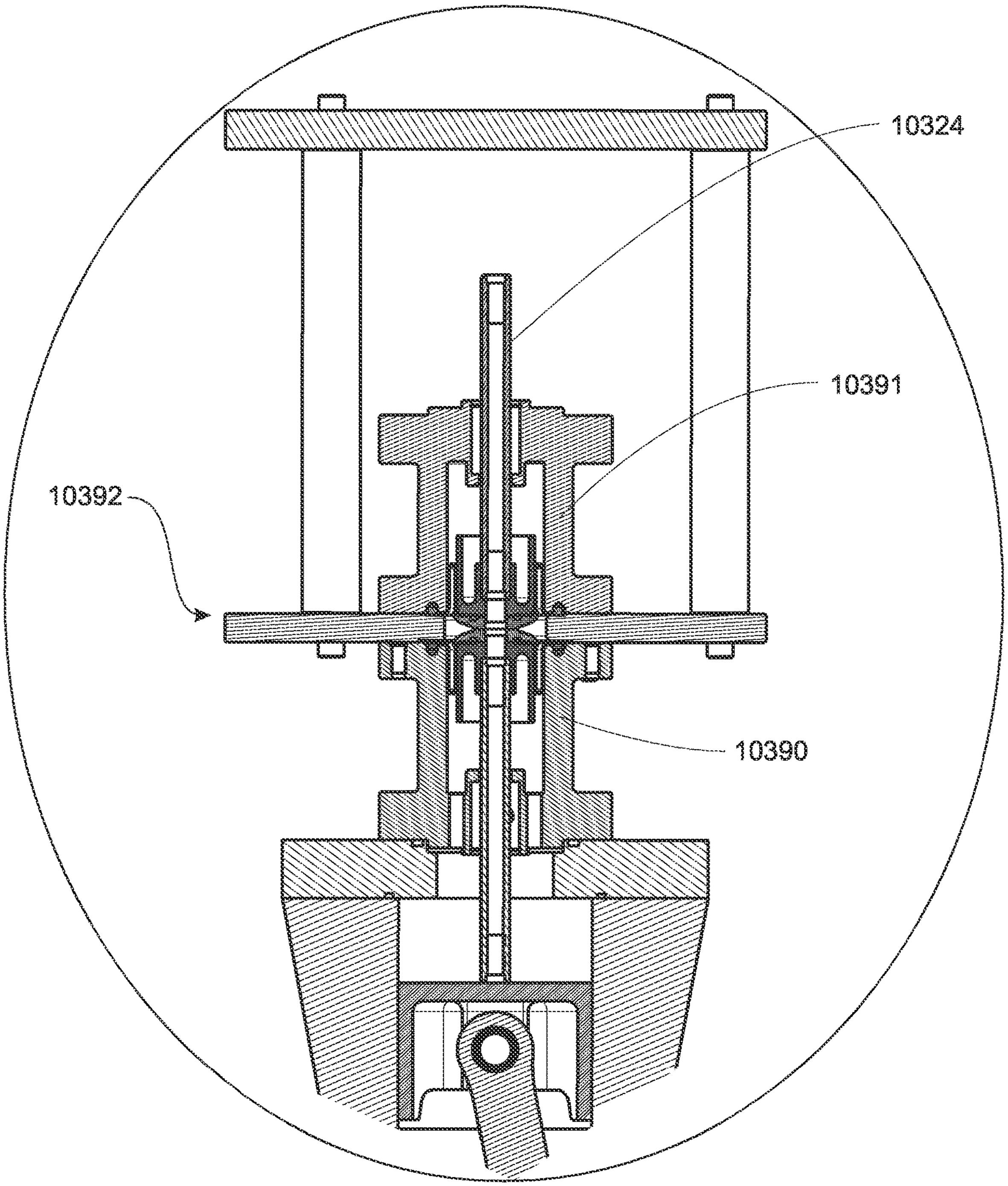
Figure 104A:
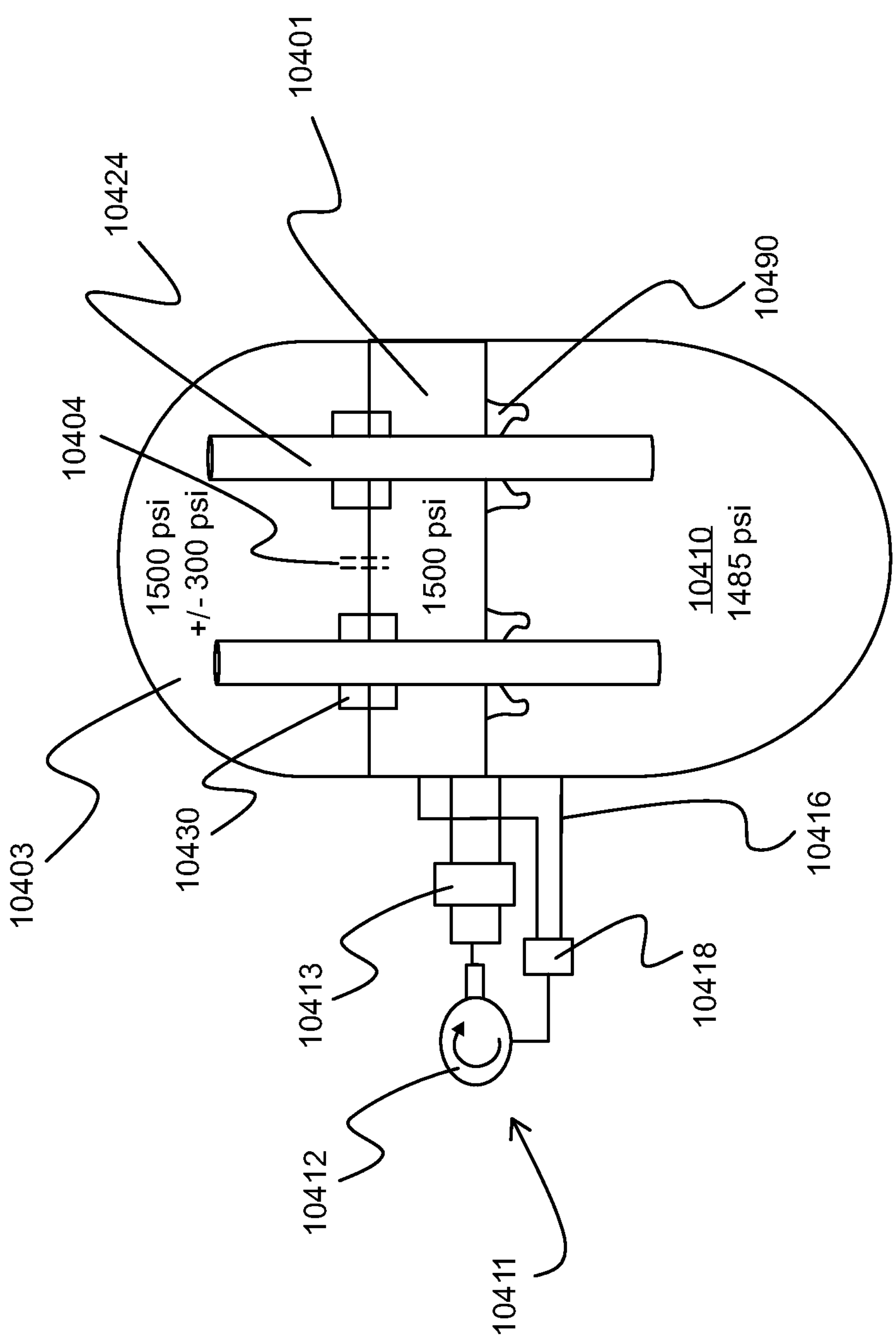
Figure 104B:
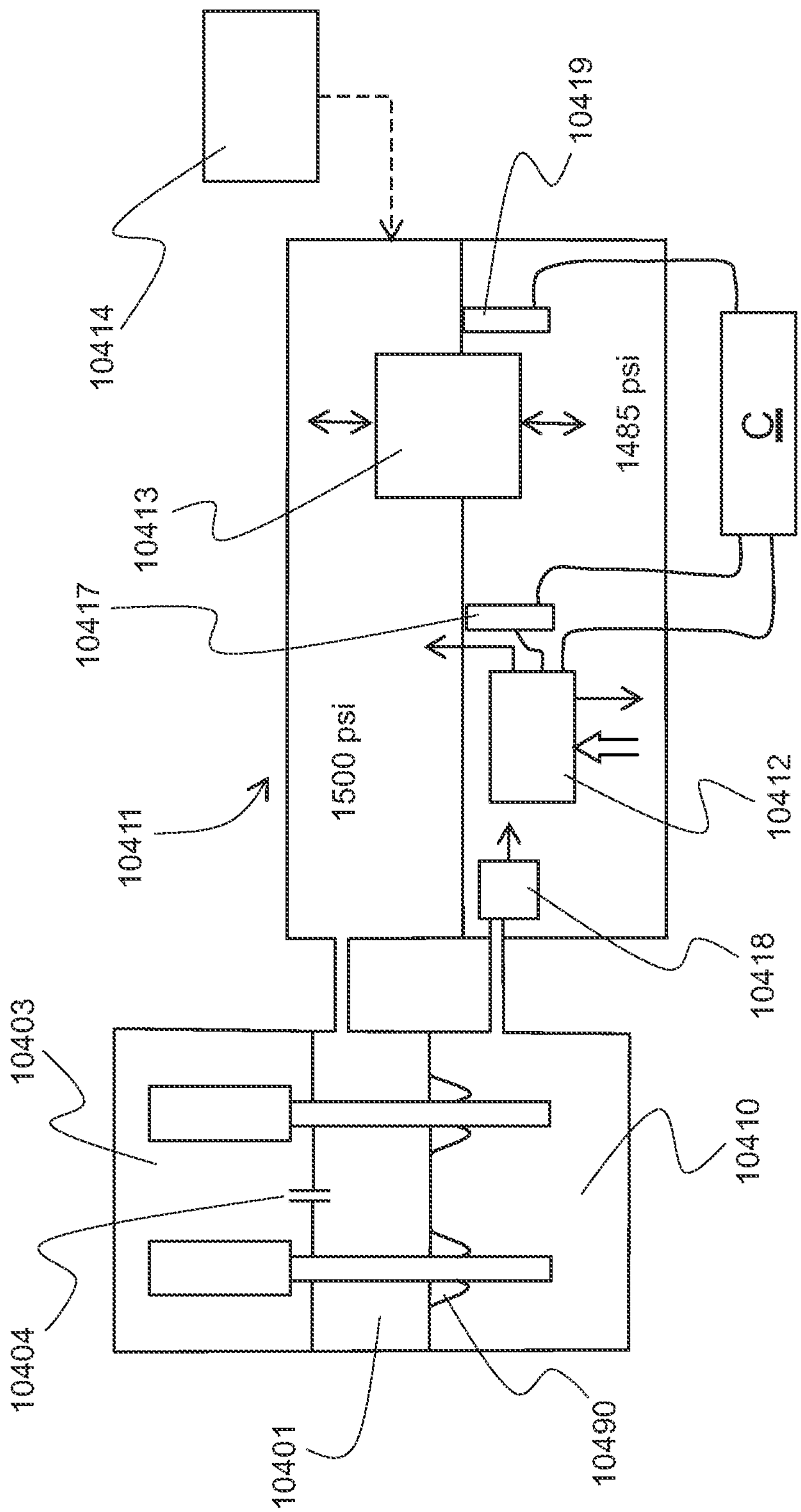
Figure 104C:
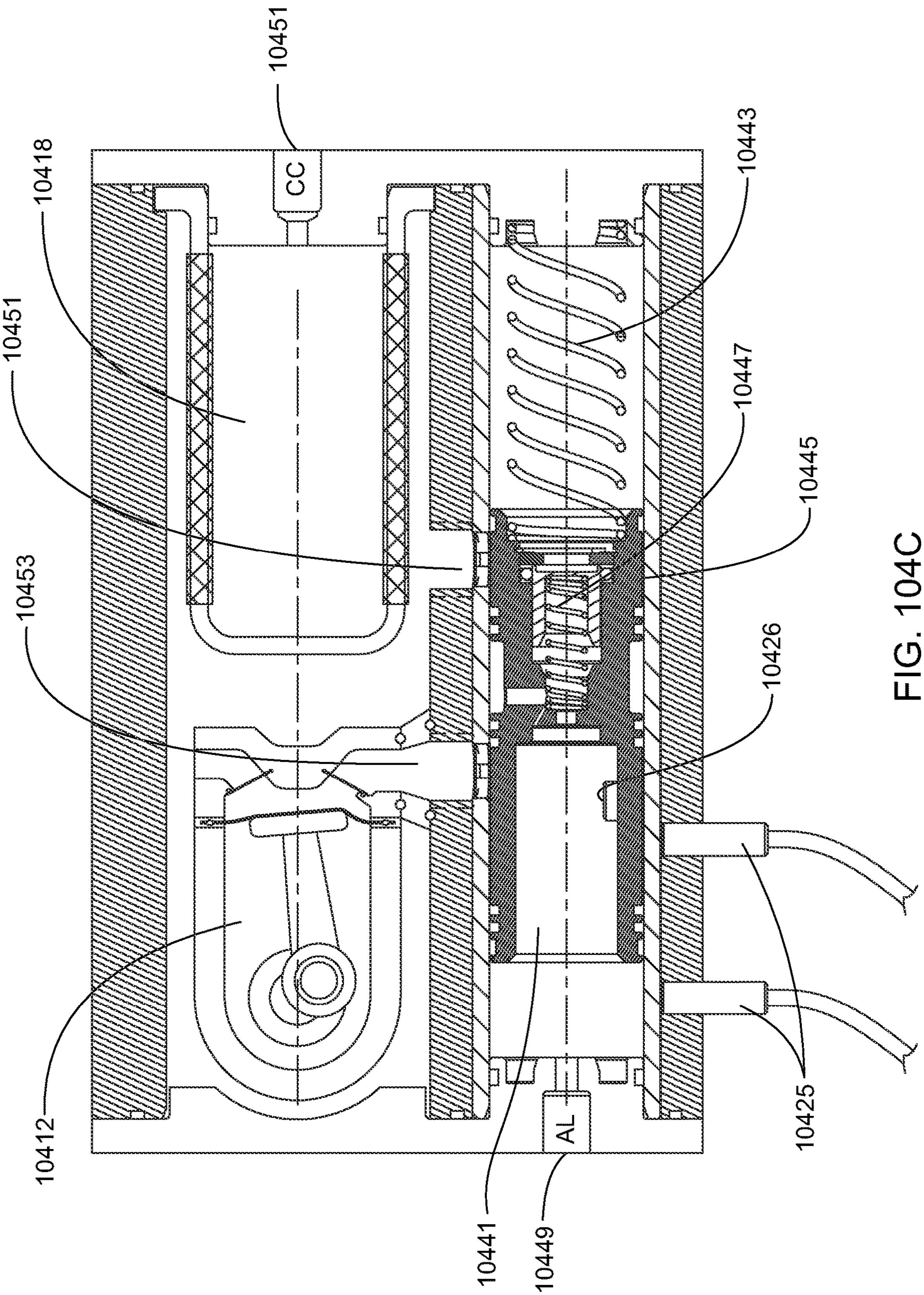
Figures 1, 104D:
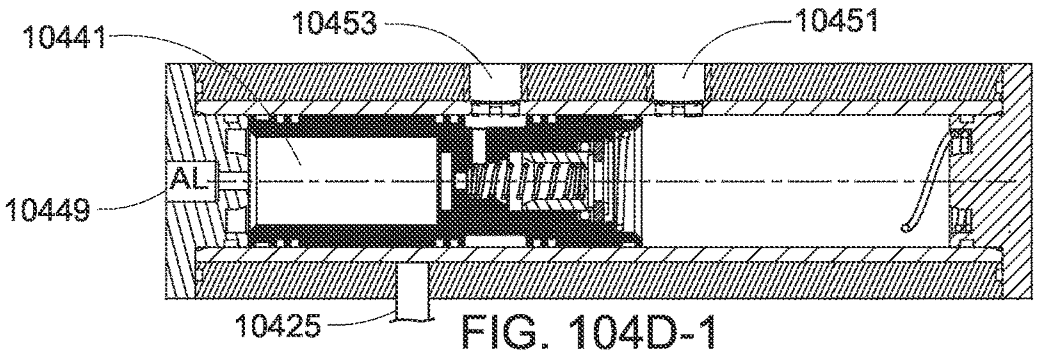
Figures 2, 104D:
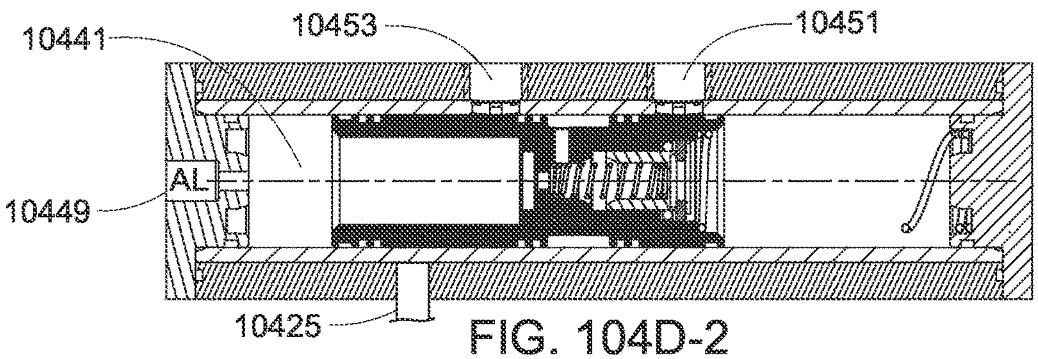
Figures 3, 104D:
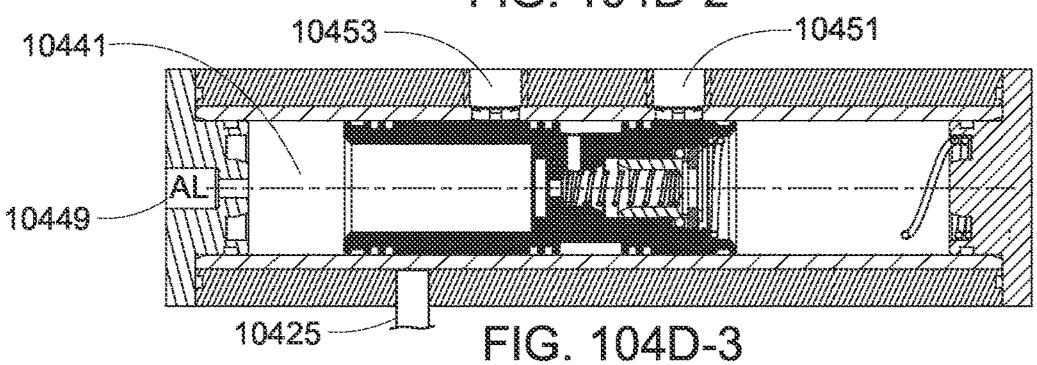
Figures 4, 104D:
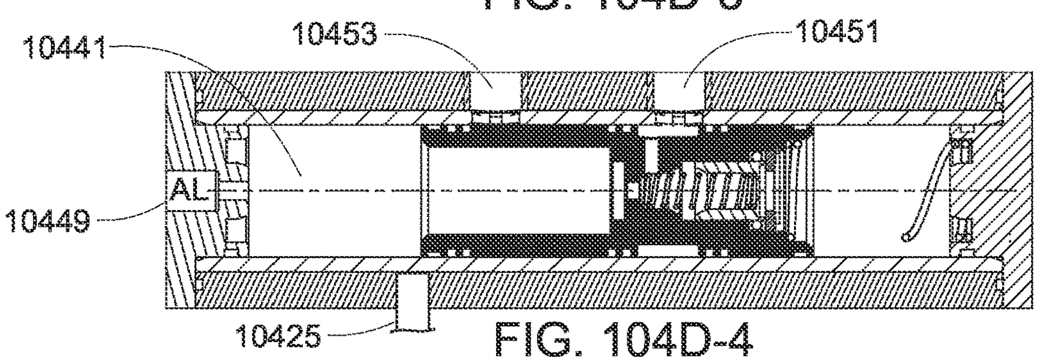
Figures 5, 104D:
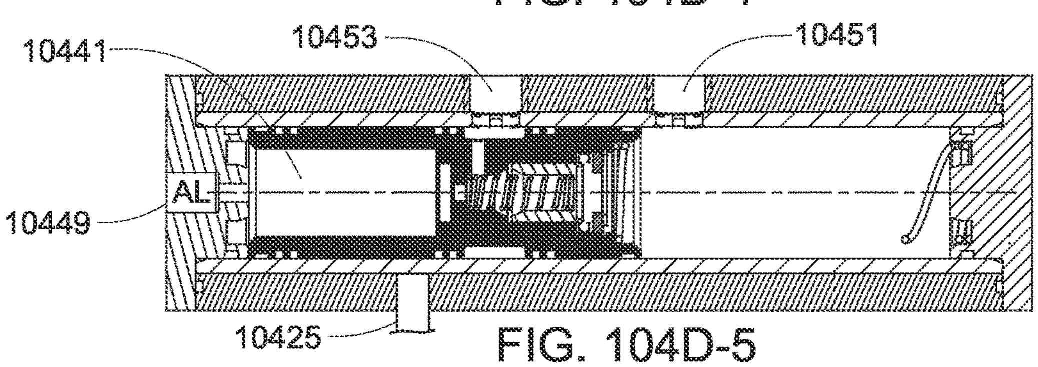
Figure 104E:
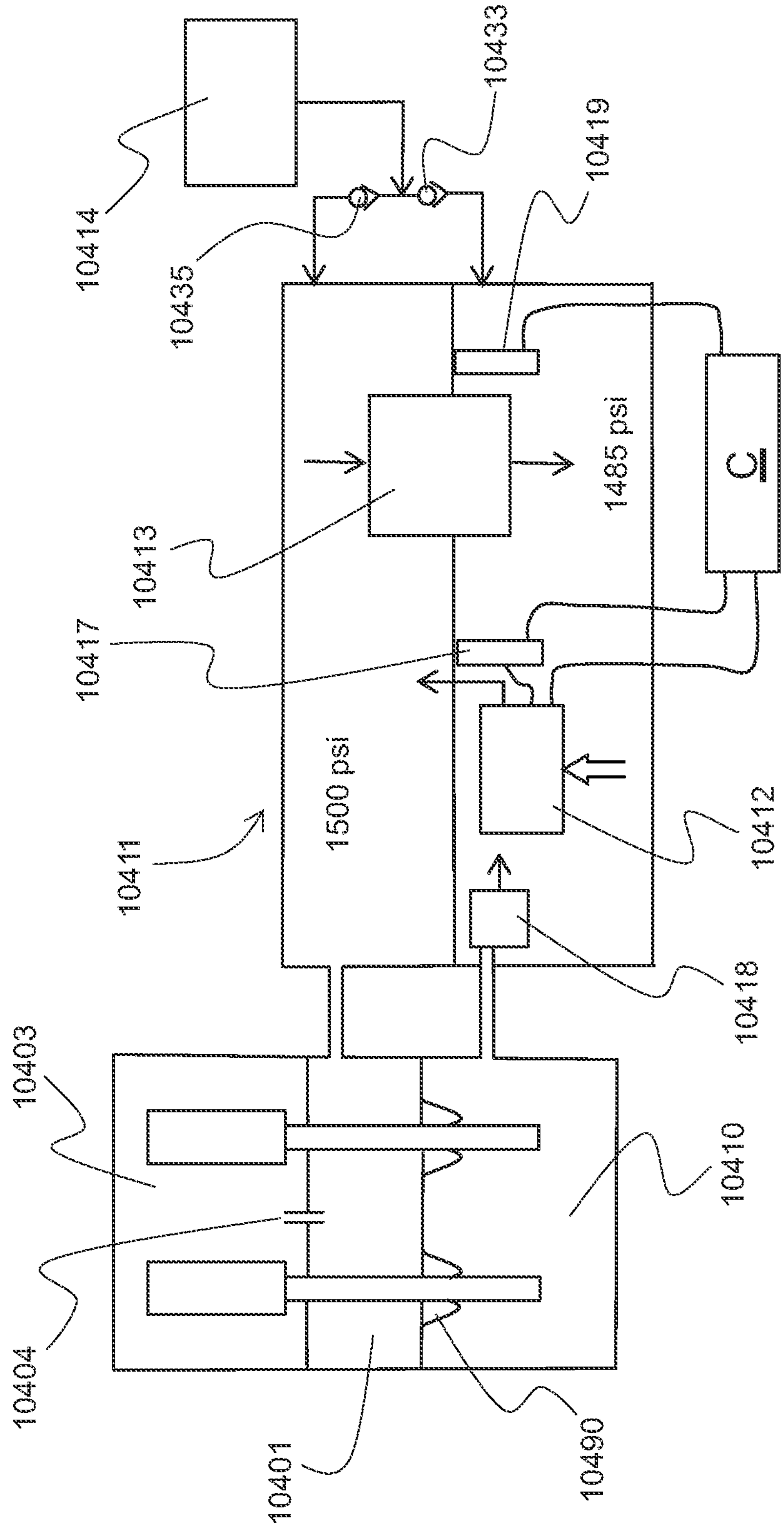
Figure 105:
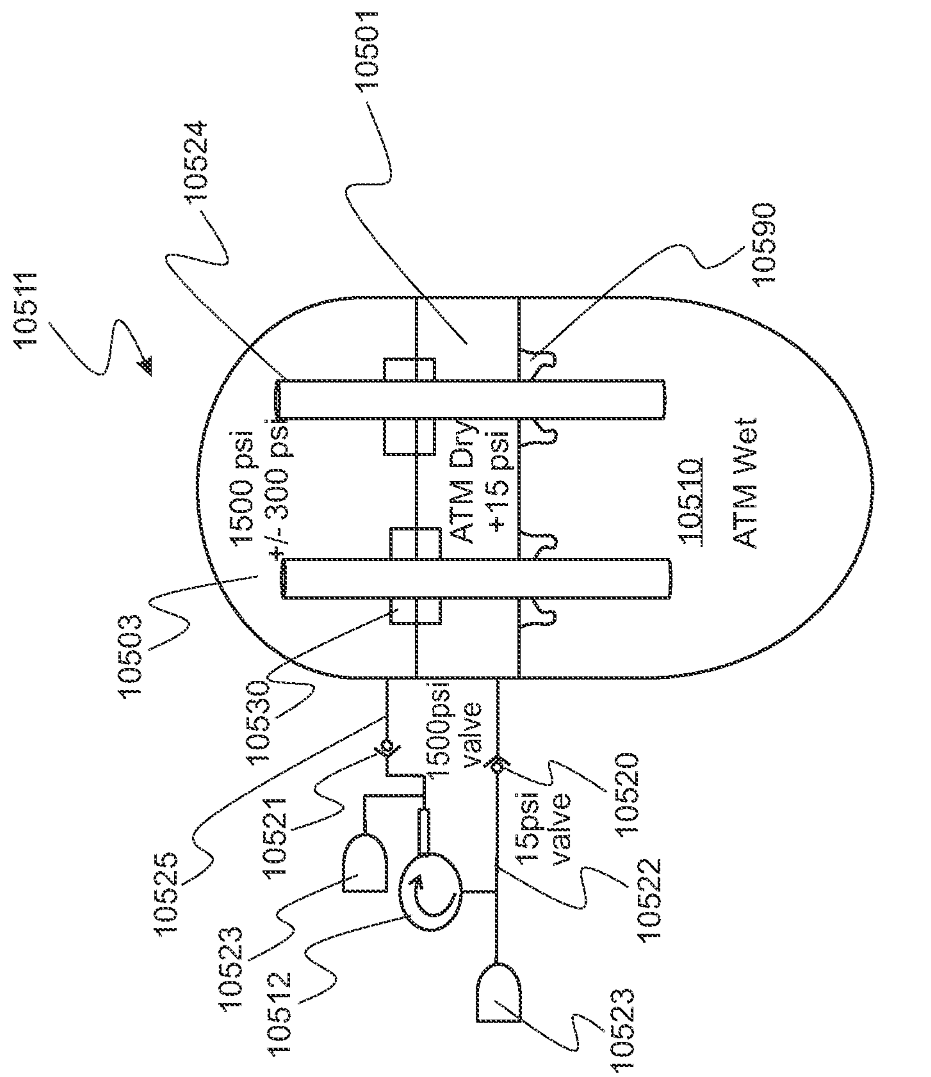
Figure 106:
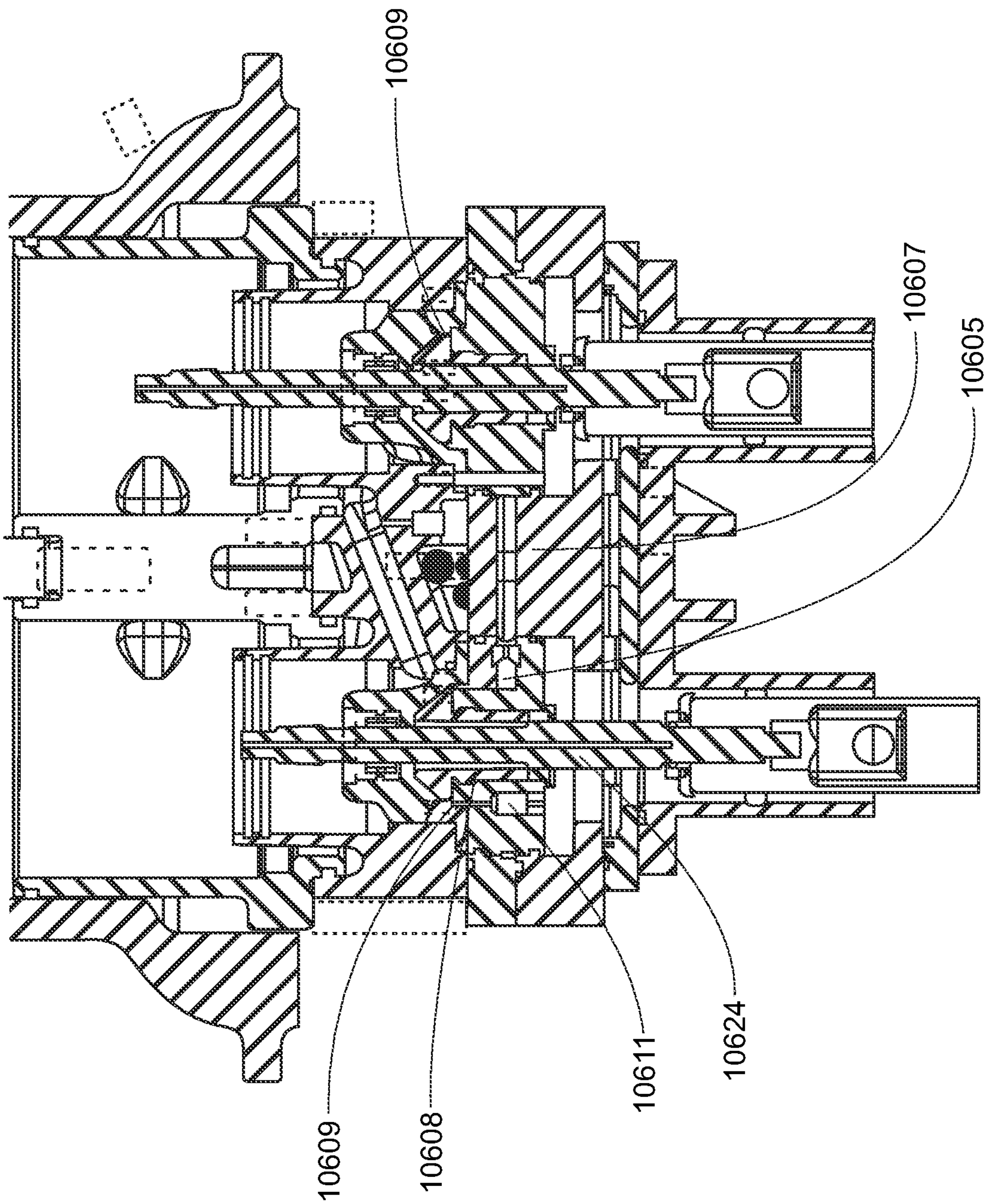
Figure 107A:
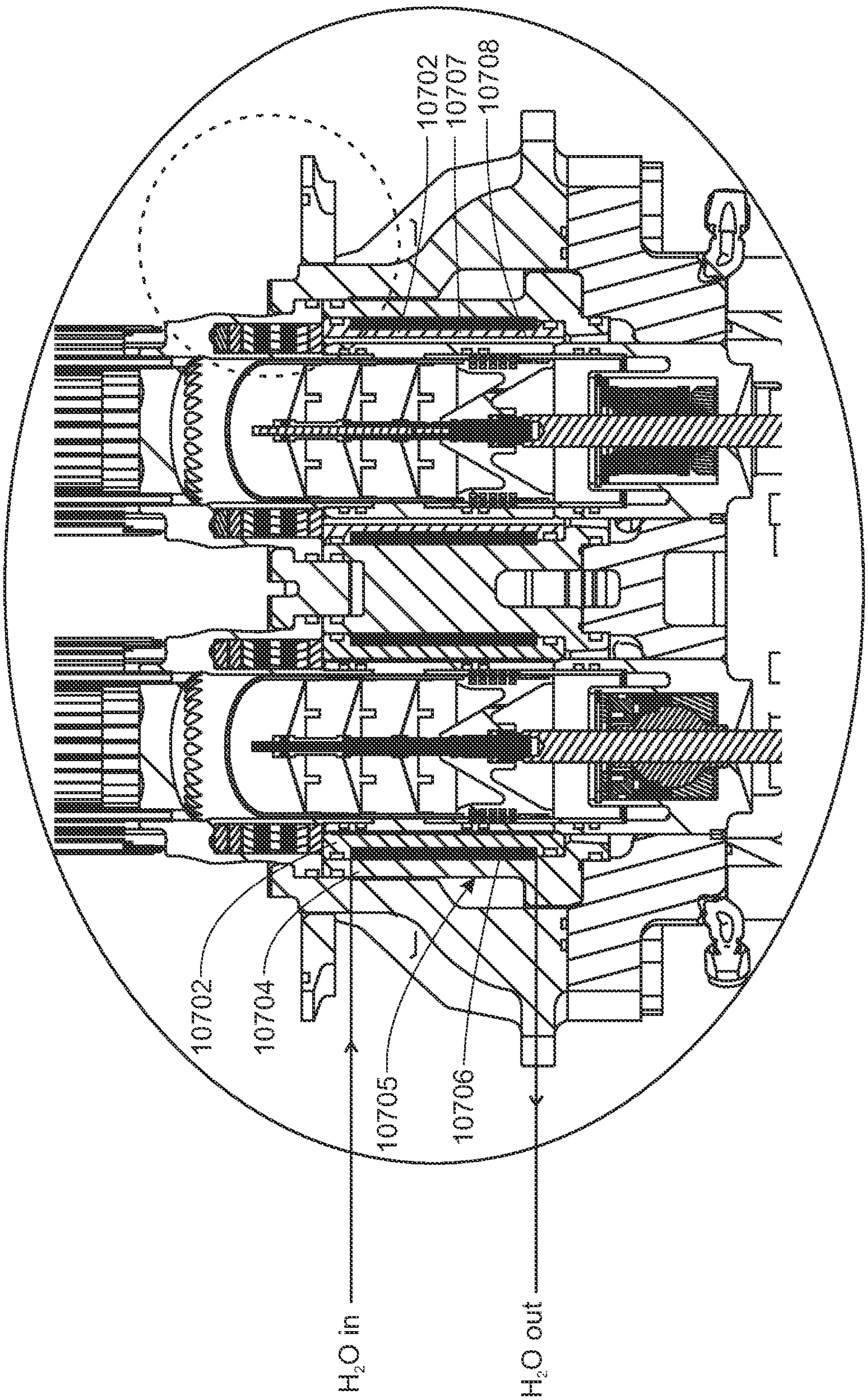
Figure 107B:
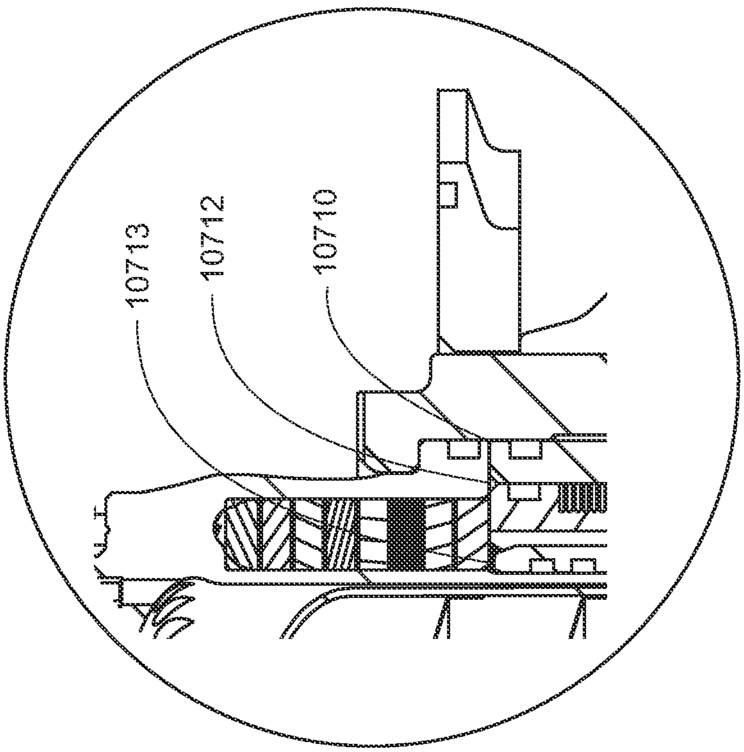
Figure 108A:
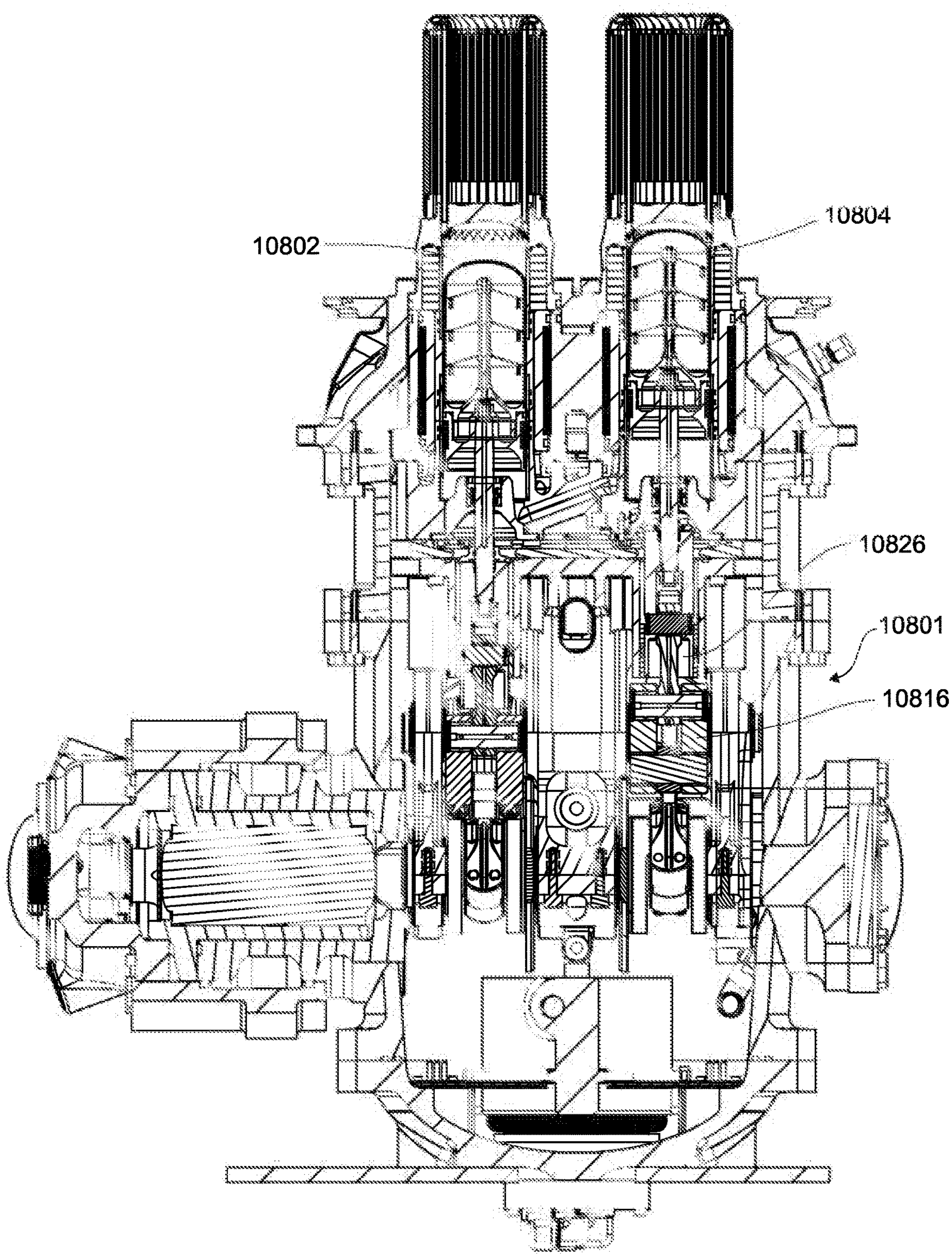
Figure 108B:
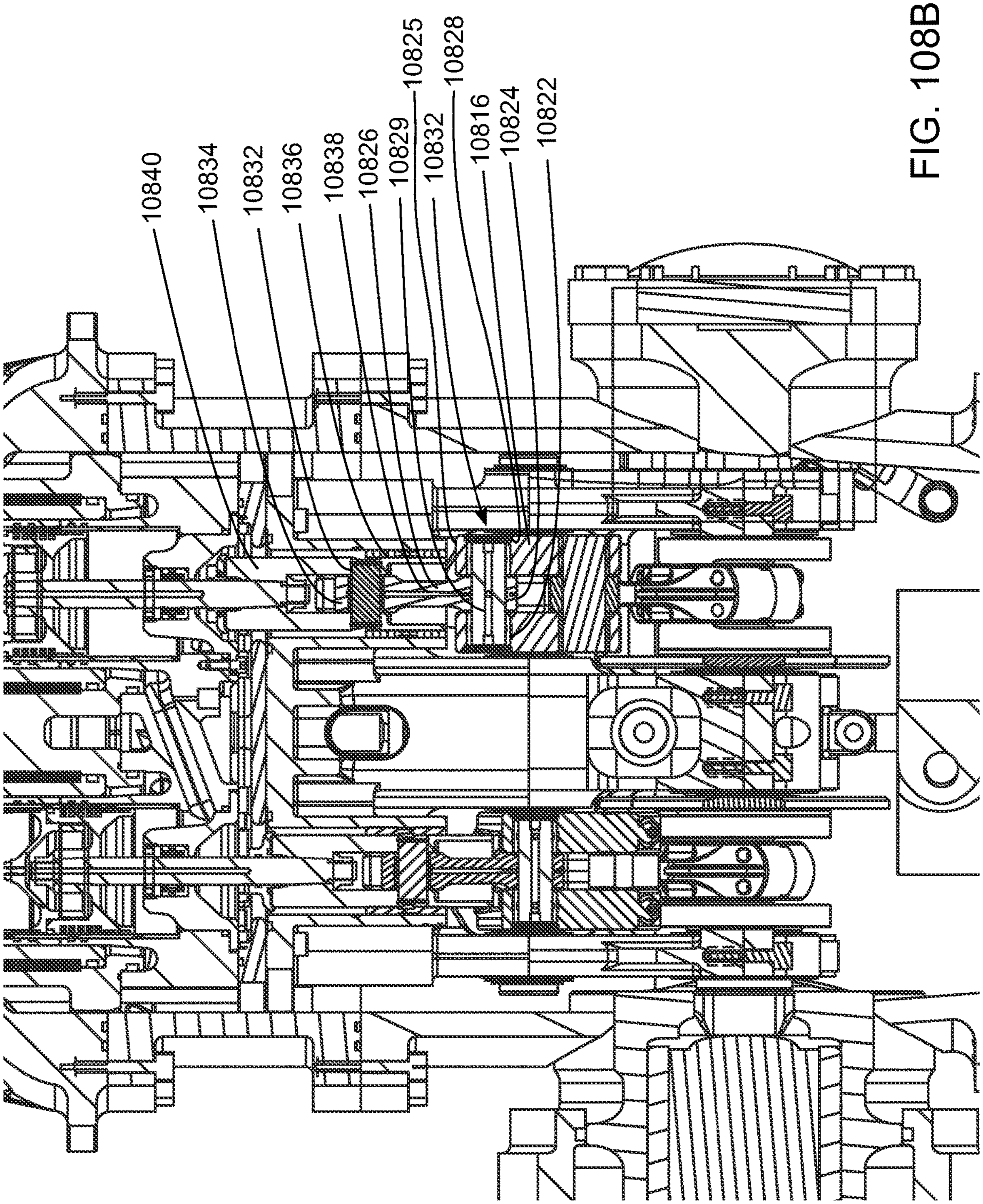
Figure 109A:
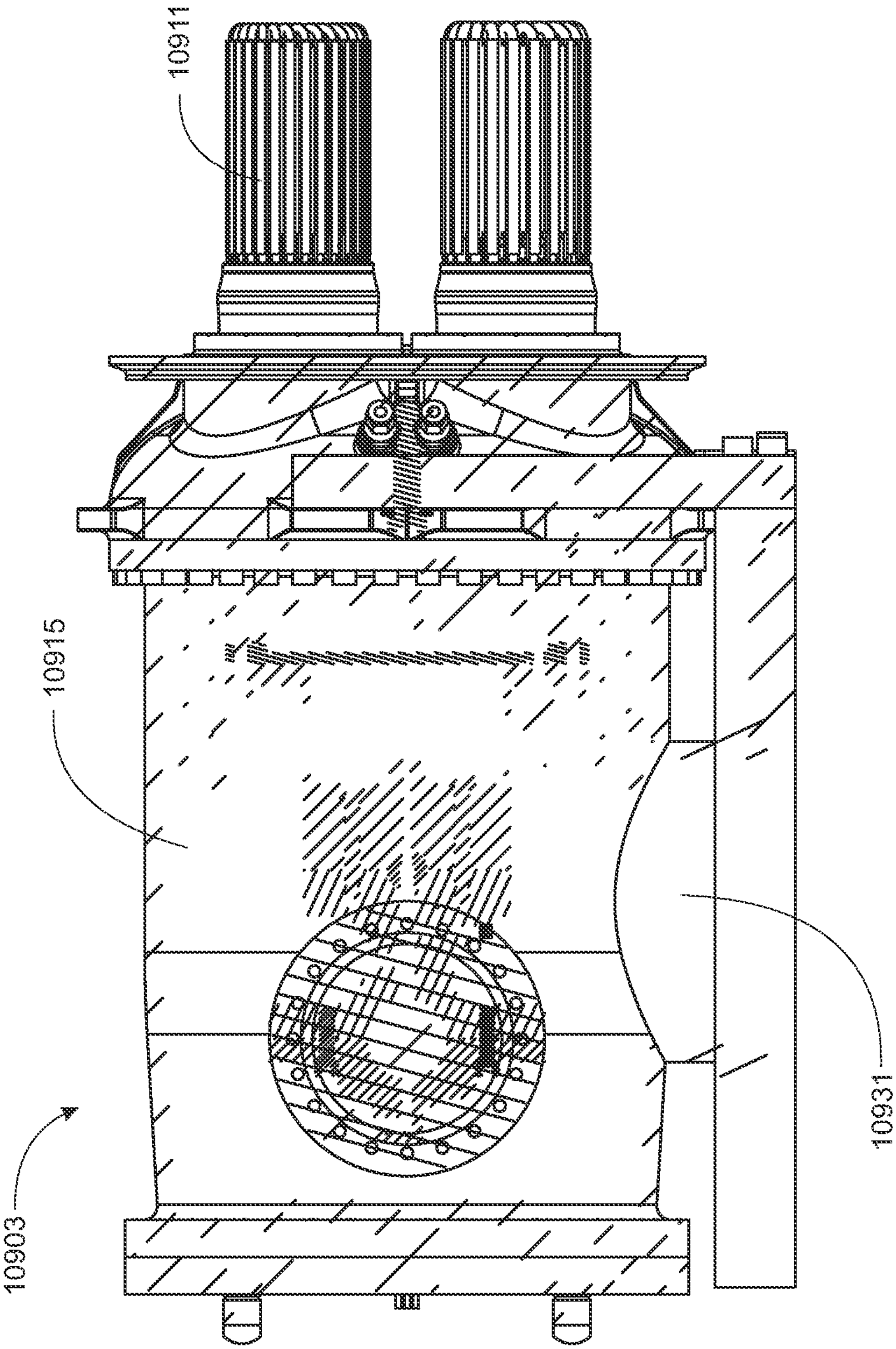
Figure 109B:
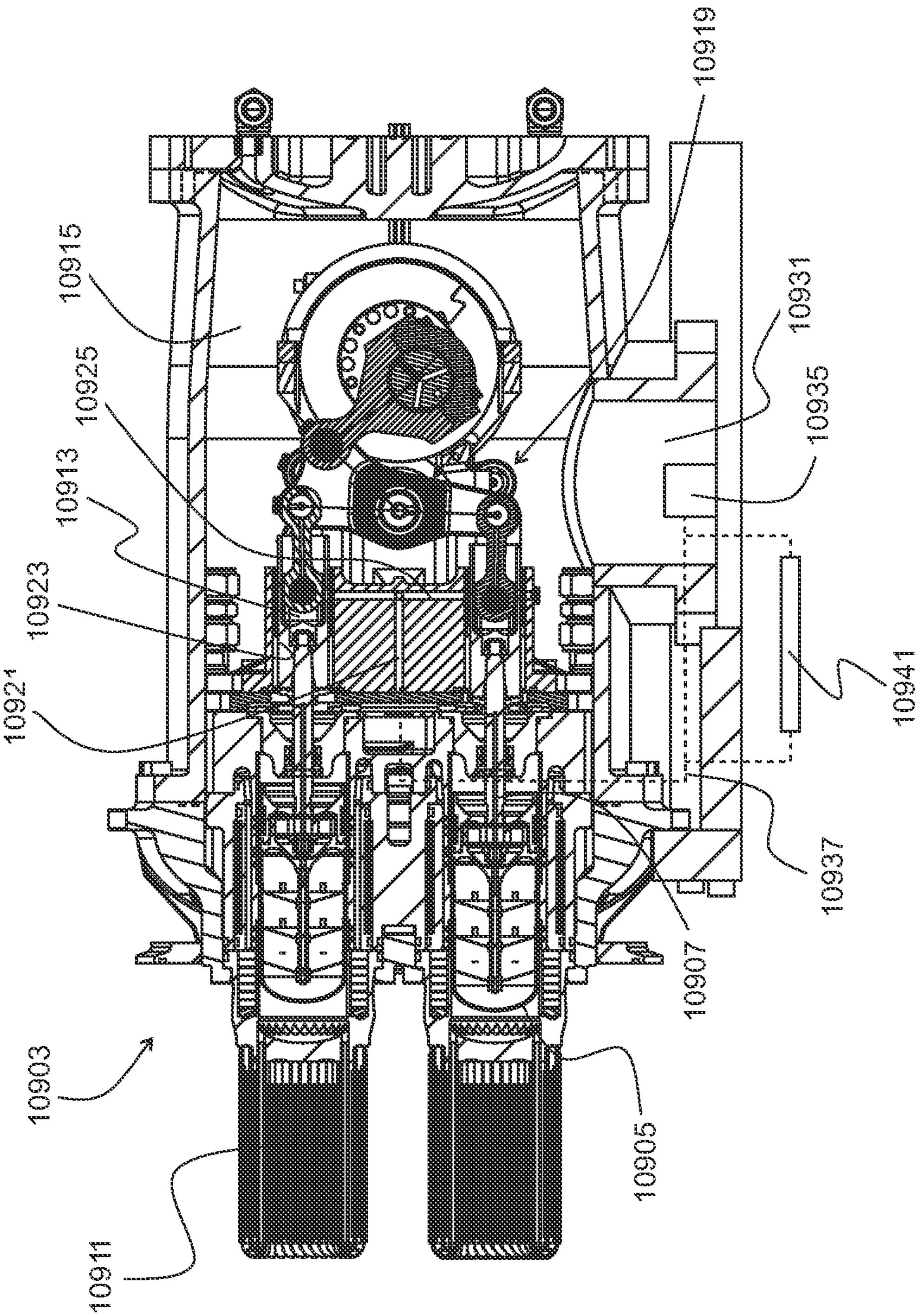
Figure 110B:
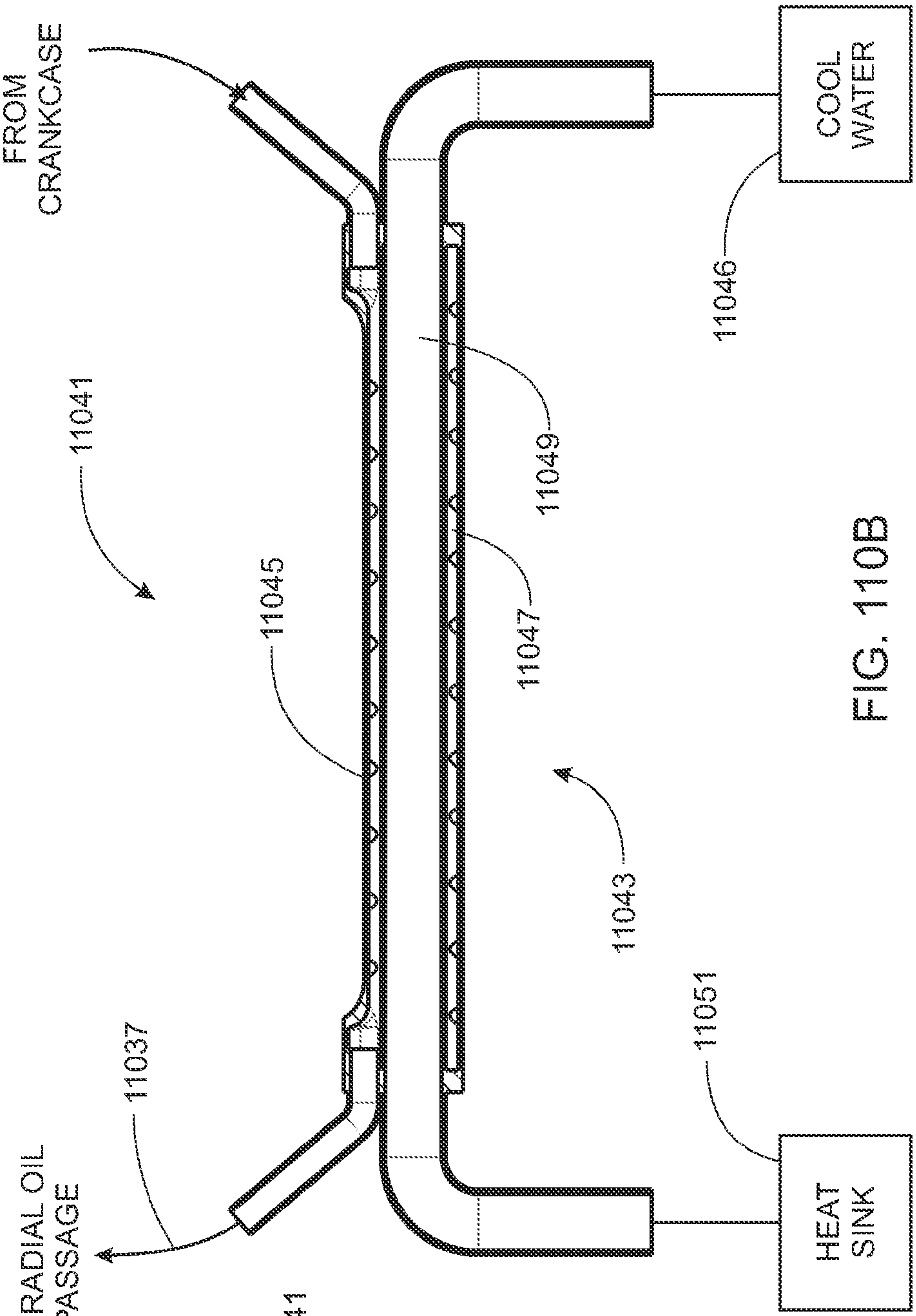
Figure 110A:
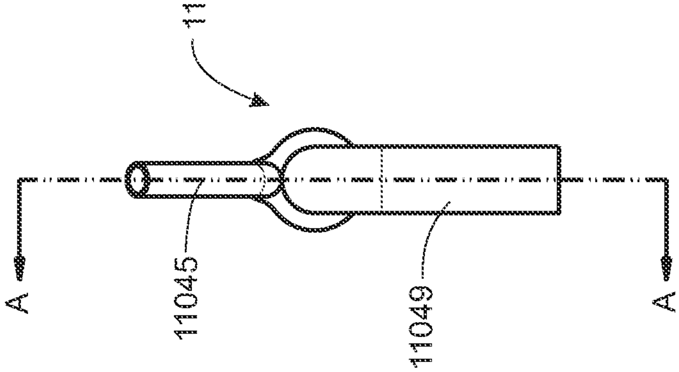
Figure 111B:
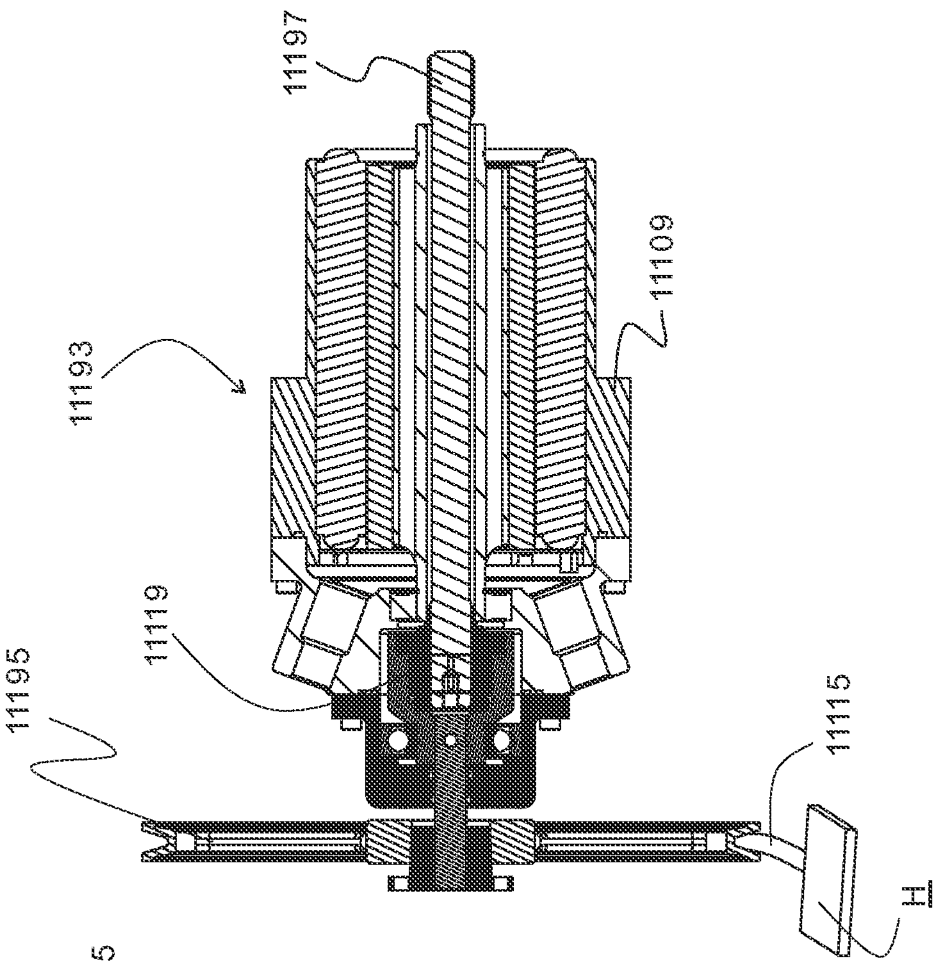
Figure 111A:
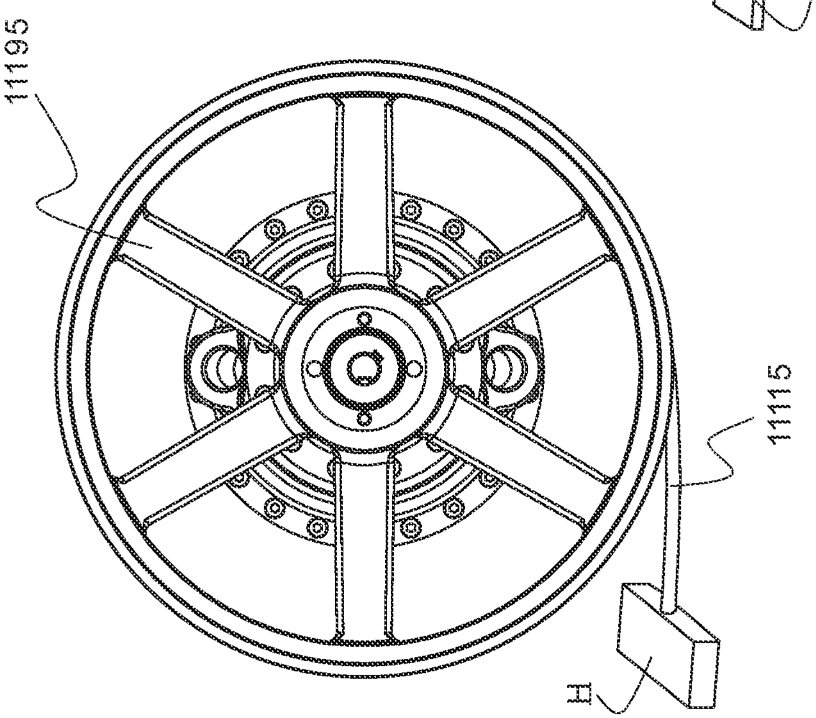
Figure 111C:
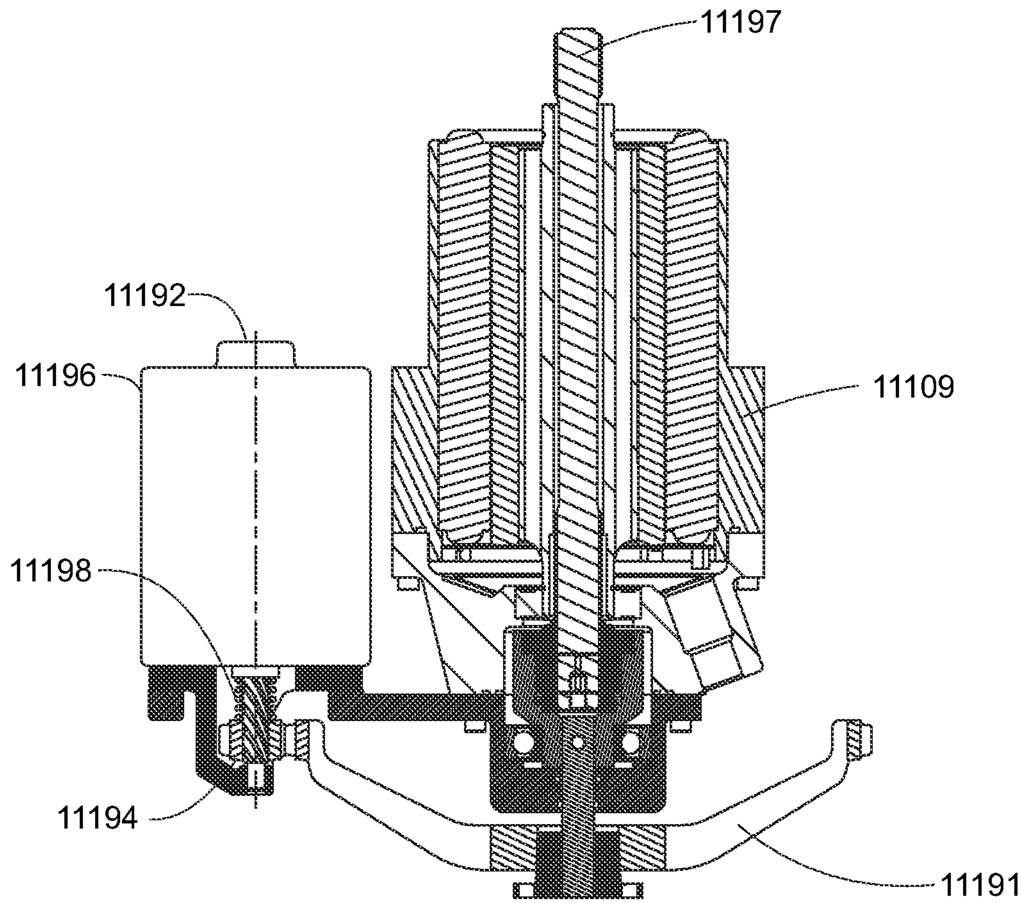
Figure 111D:
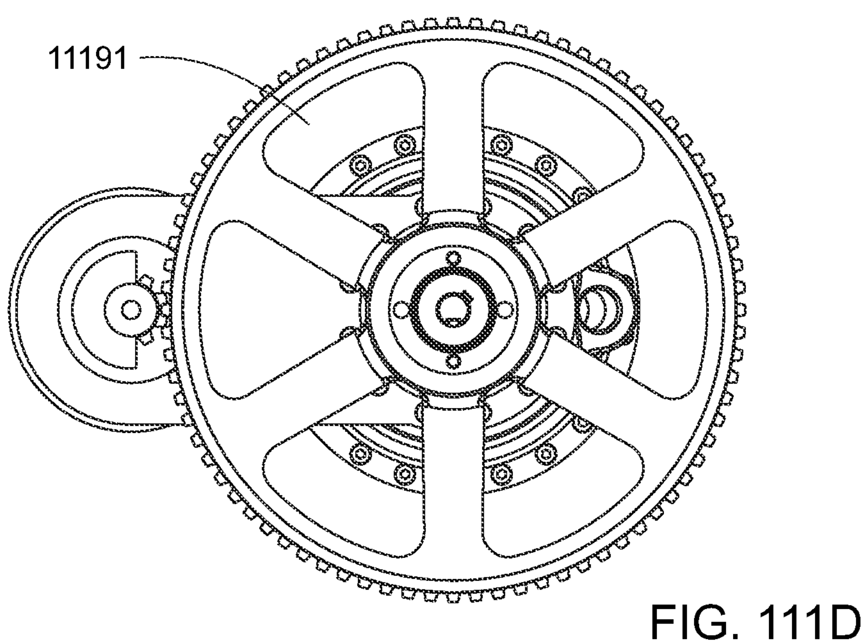
Figure 118A:
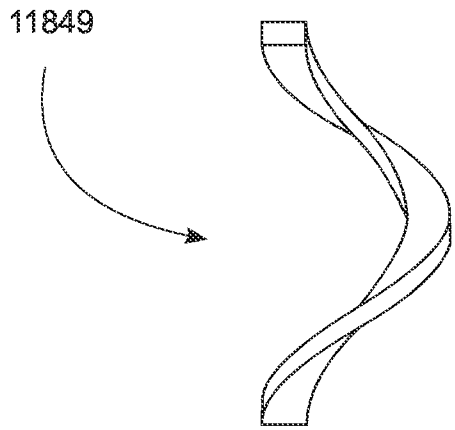
Figure 118B:
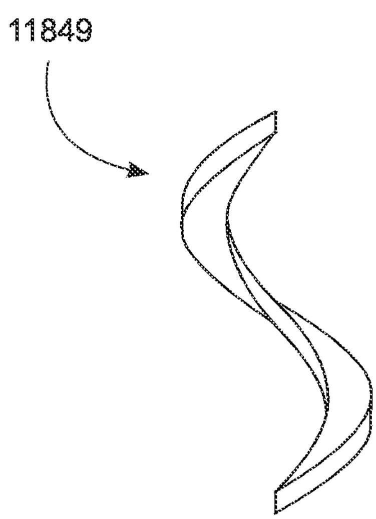
Figure 118C:
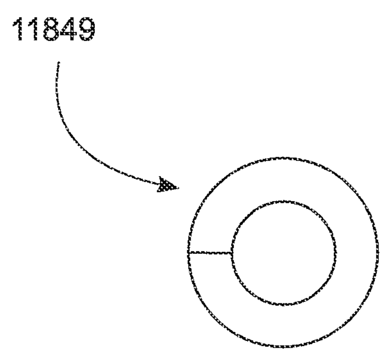
Figure 118D:
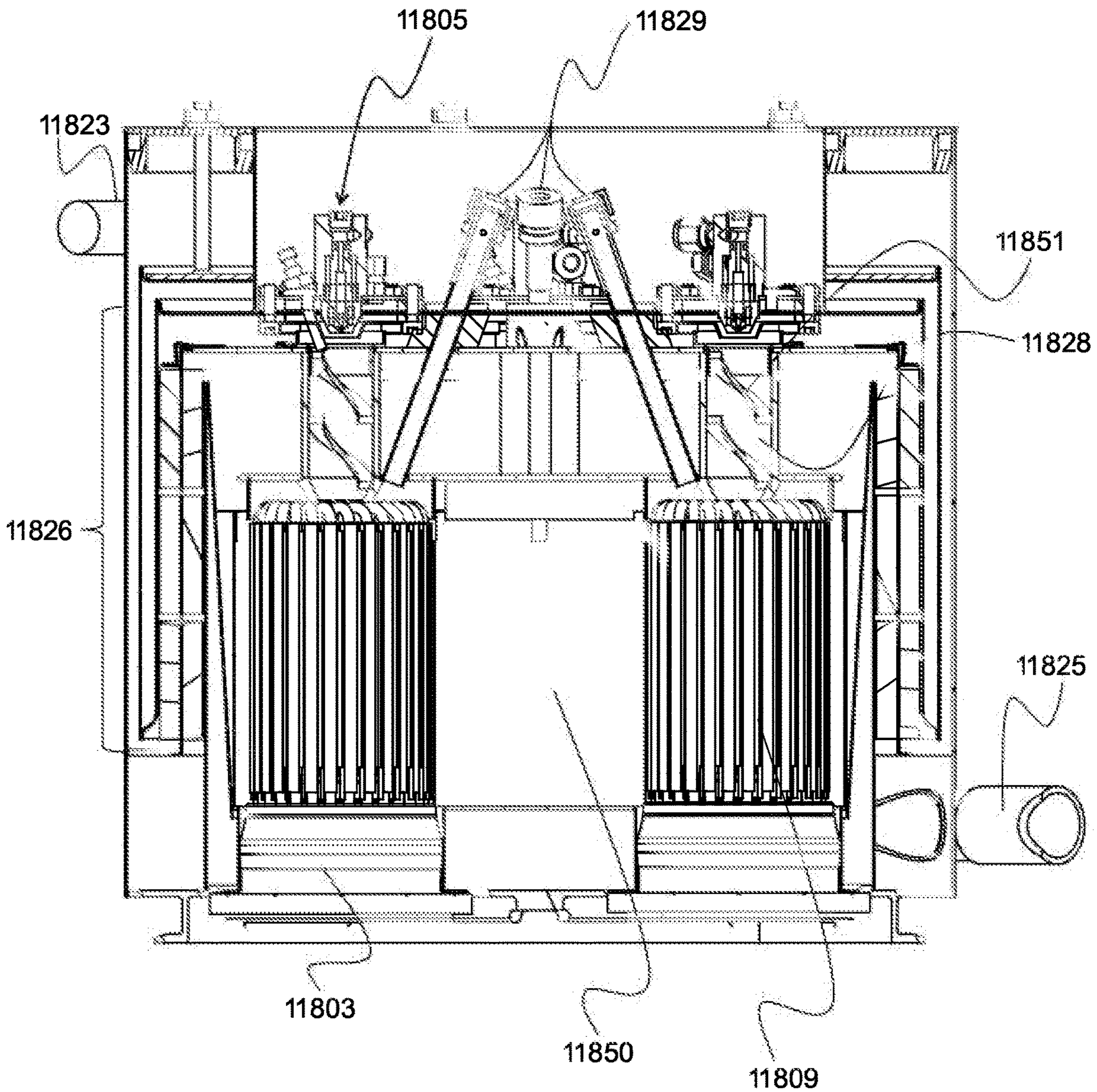
Figure 119:
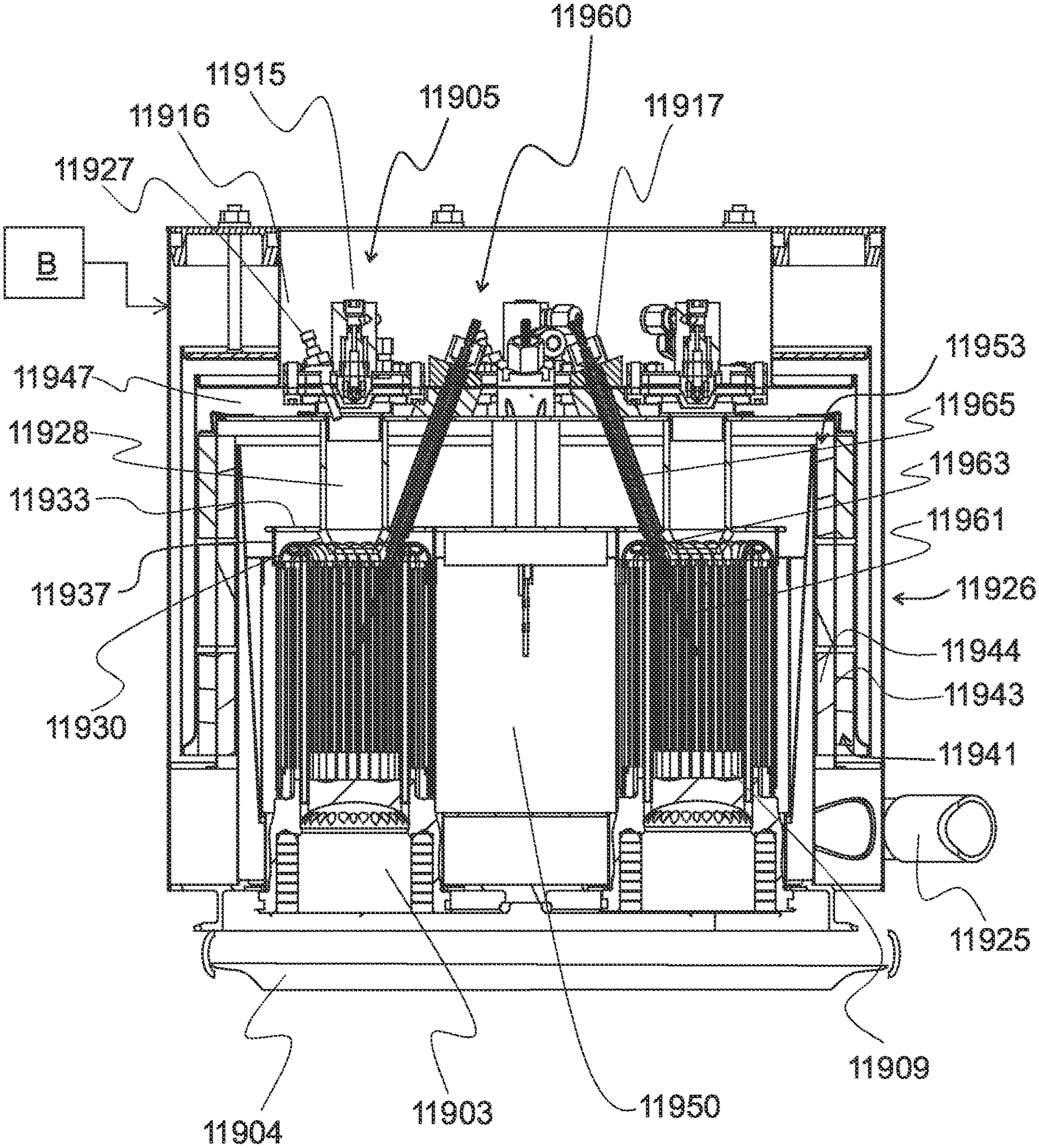
Figure 120:
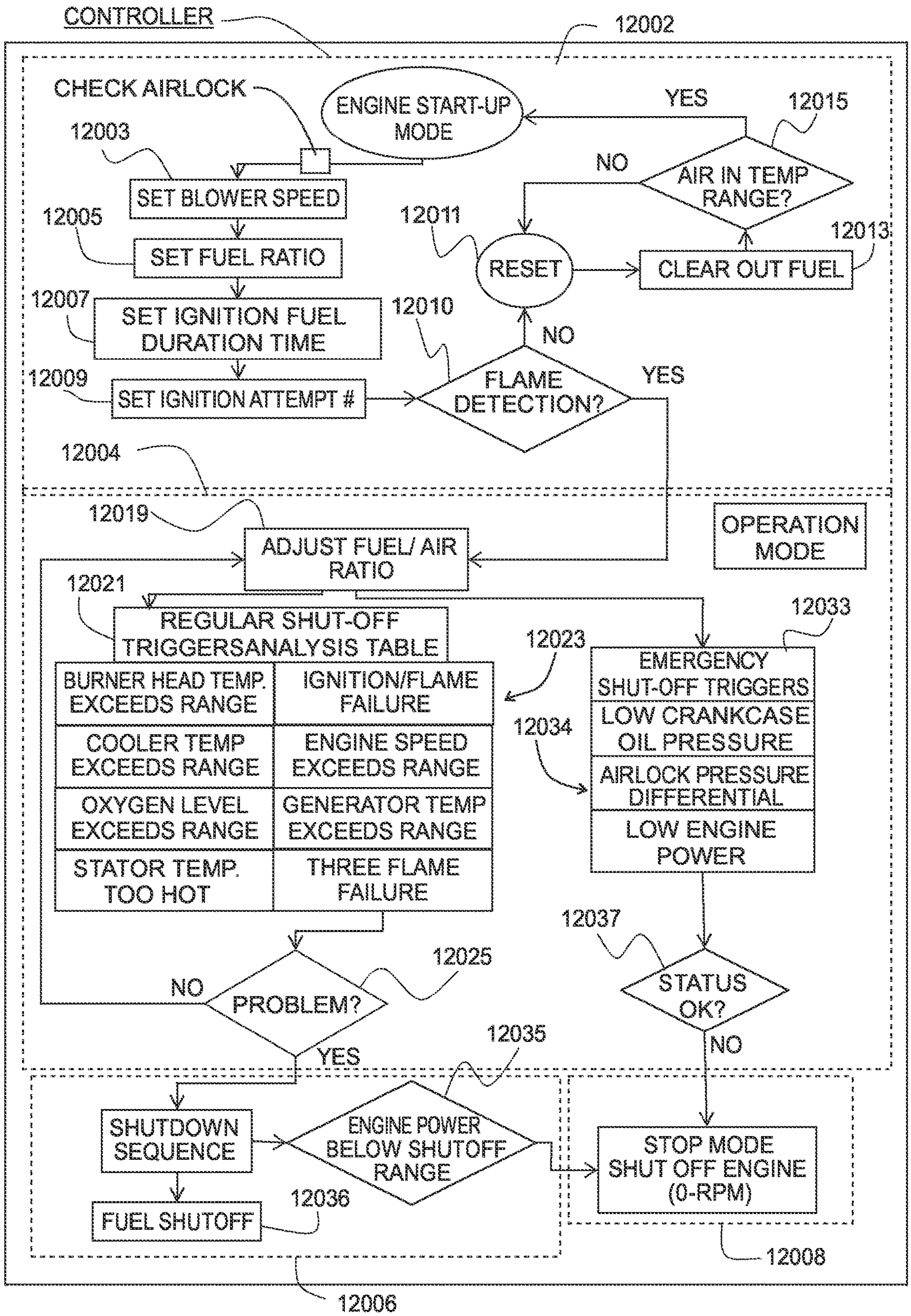
Figure 121:
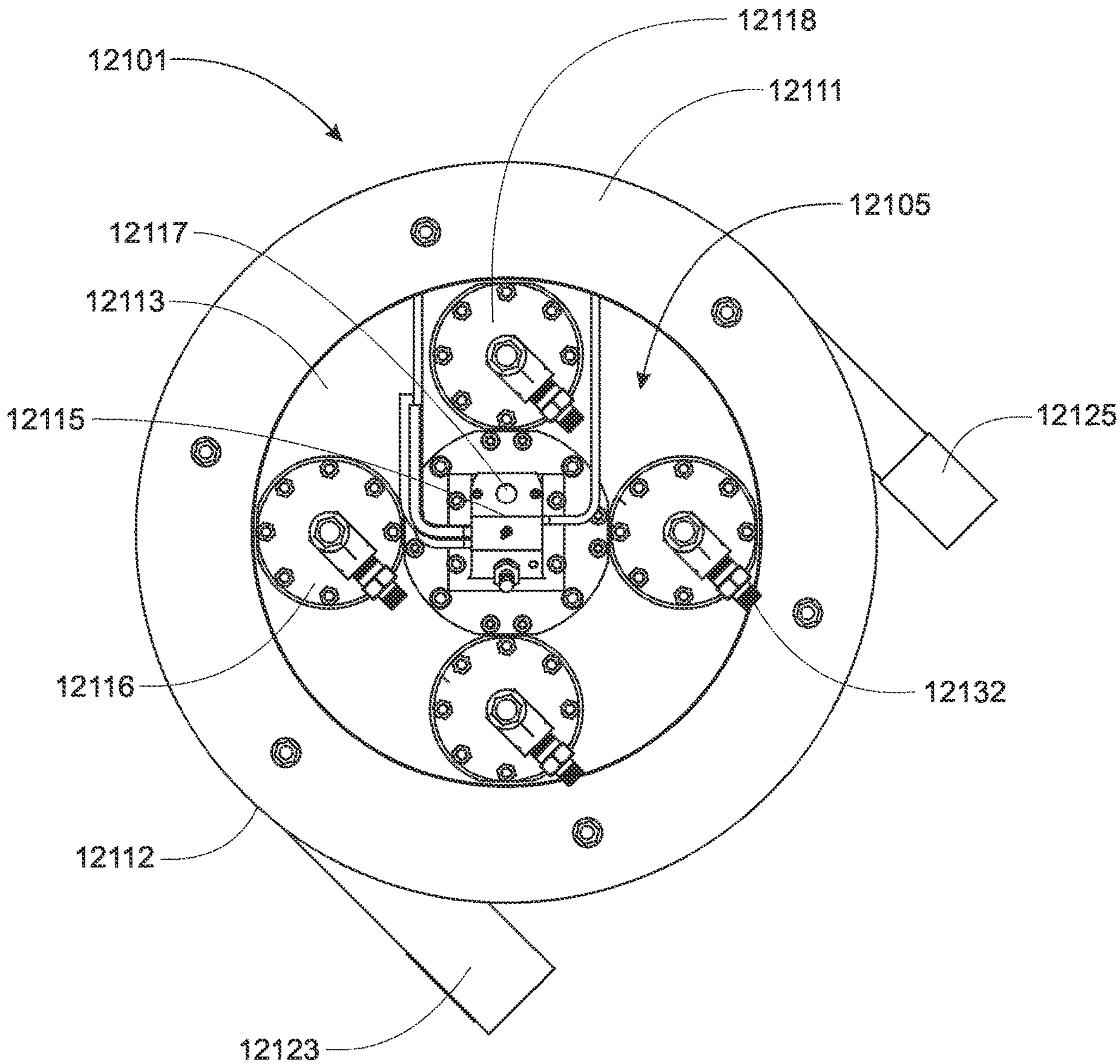
Figure 122:
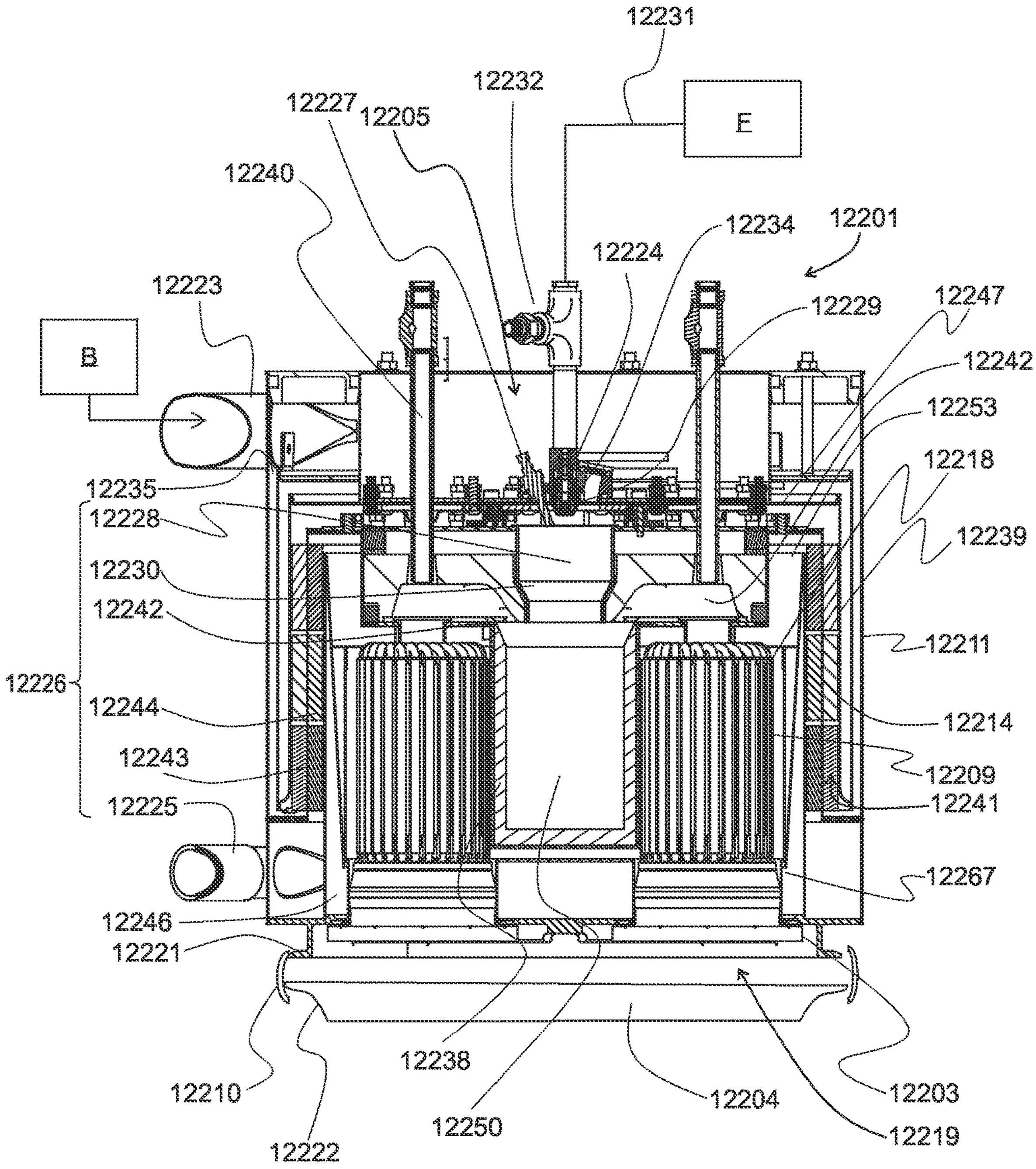
Figure 123:
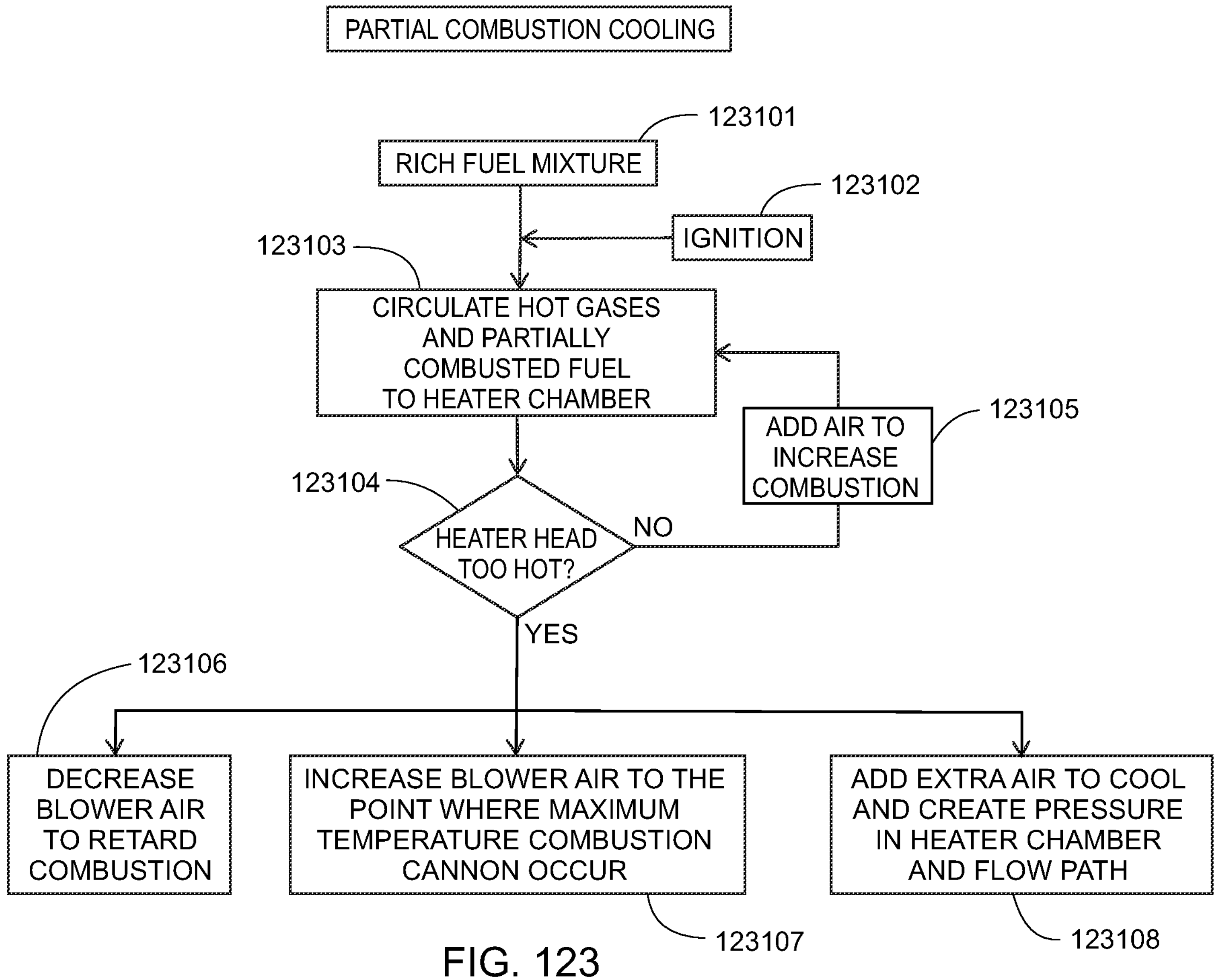
Figure 124:
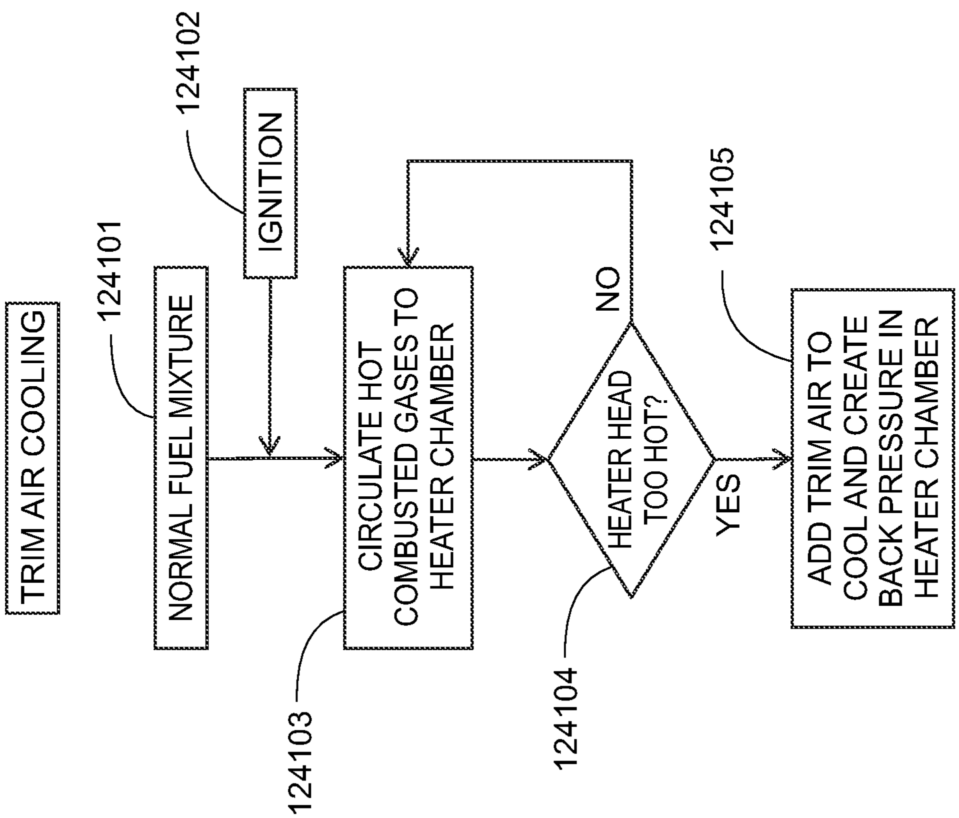
Figure 125A:
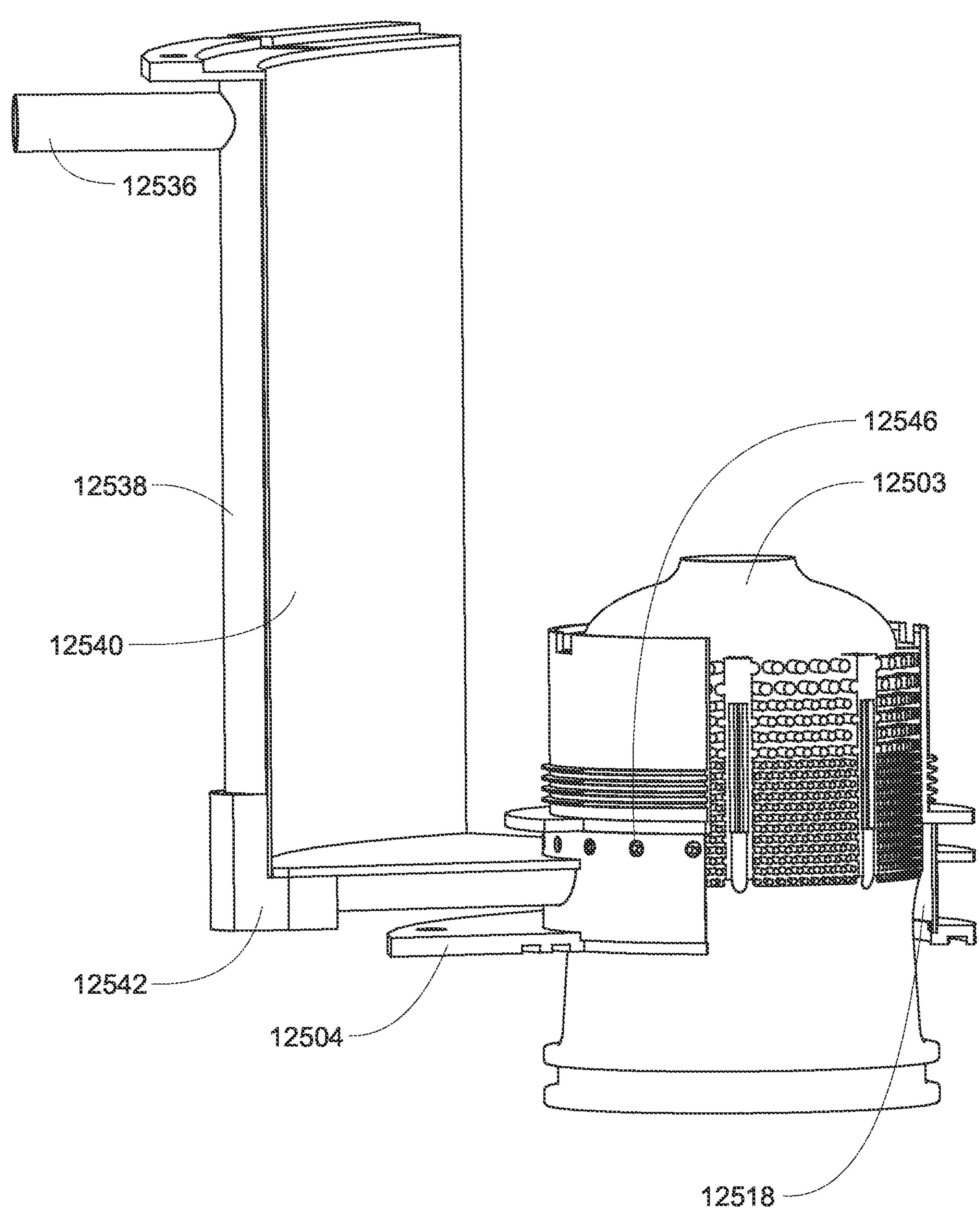
Figure 125B:
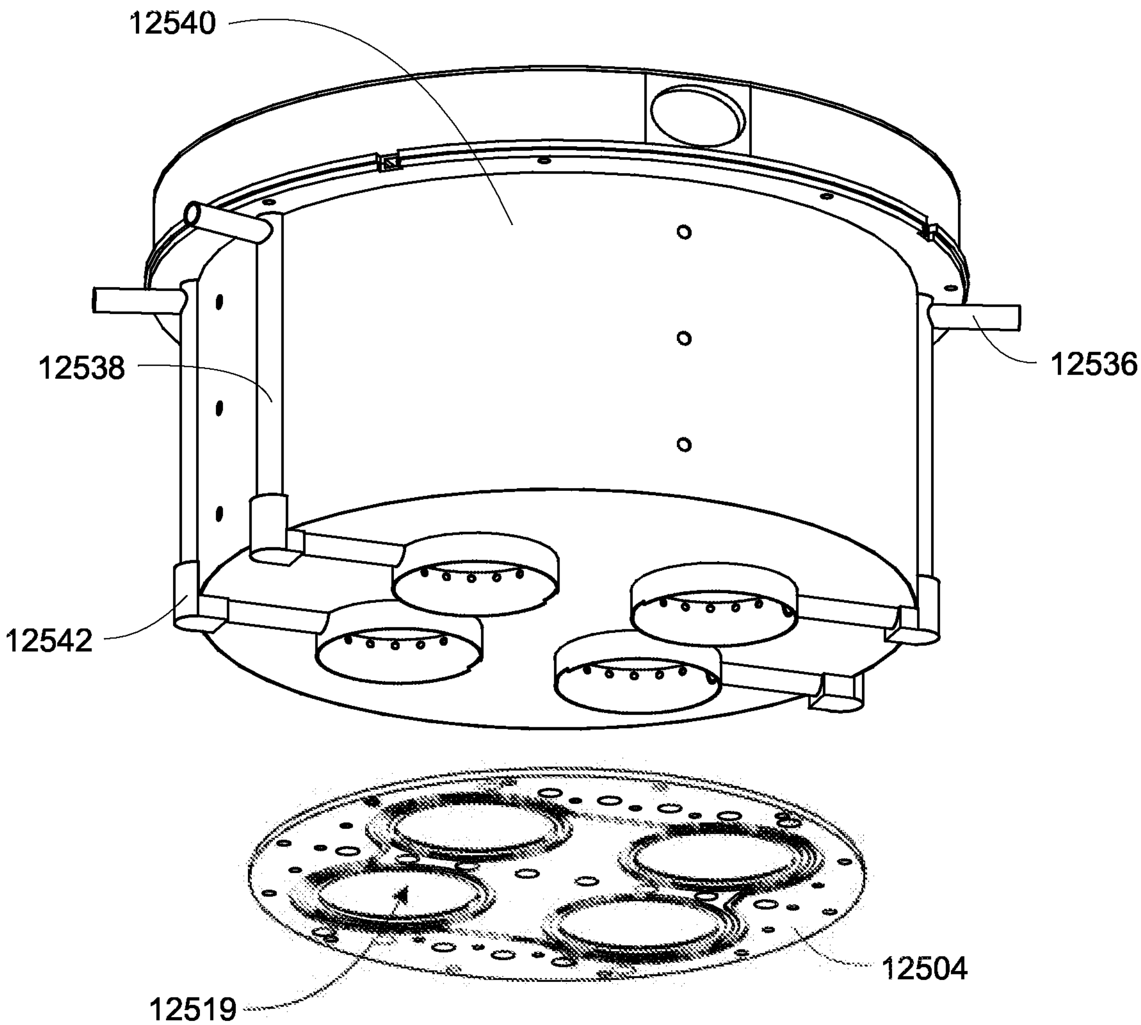
Figure 126:
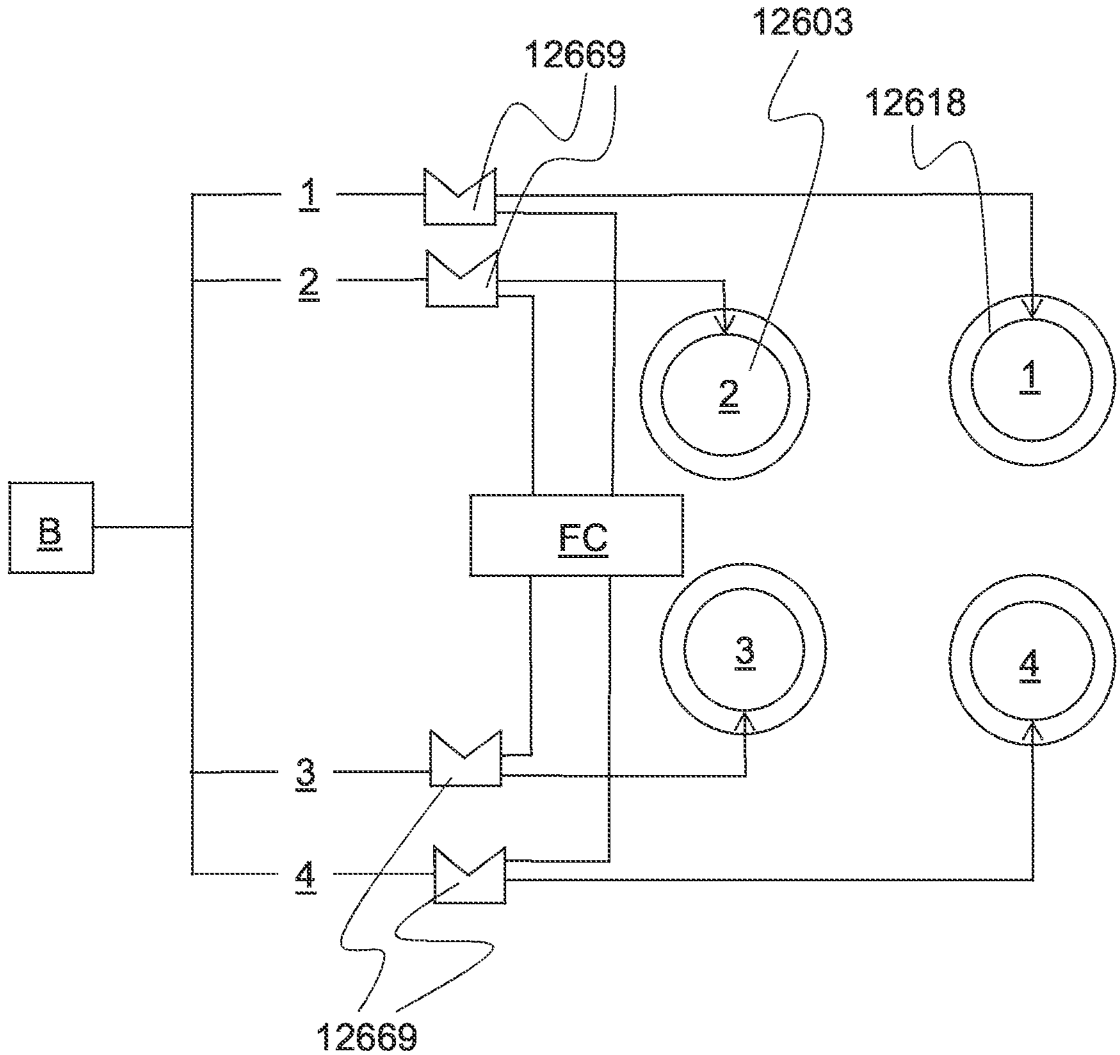
Figure 128:
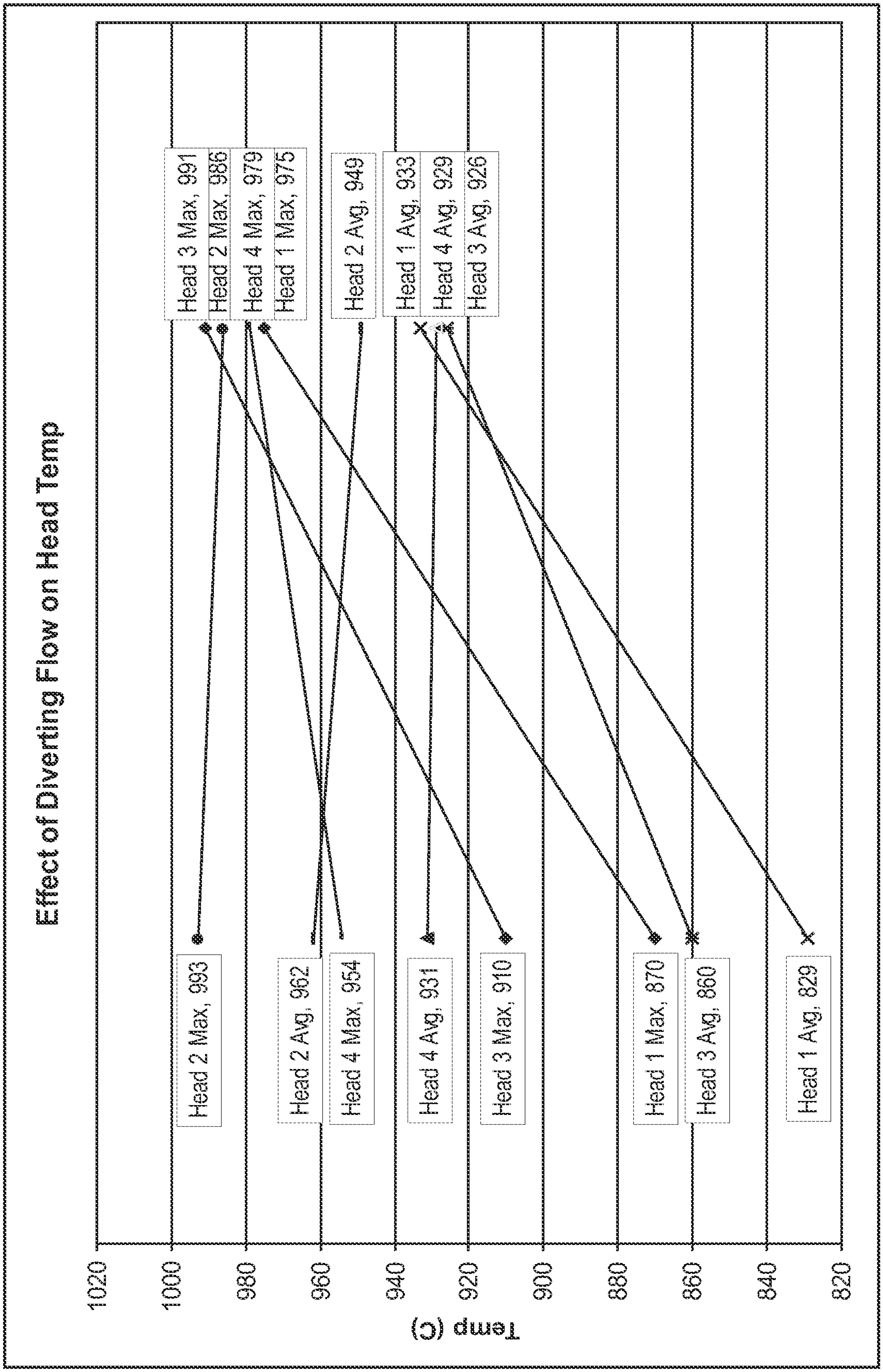

FIGS. 96A and 96B show a cross-sectional view of a Stirling cycle machine having an inverted rocking beam design in accordance with one embodiment;

FIGS. 96C-96E show various views of a piston and piston rod assembly in accordance with one embodiment;

FIG. 96F shows a view of a heater tube in accordance with one embodiment;

FIG. 97A shows a view of an embodiment of the rocking beam with a conrod bearing ratio of 1.6;

FIG. 97B shows a view of an embodiment of the rocking beam with a conrod bearing ratio of 1.0;

FIG. 98A shows an oil pump according to one embodiment;

FIG. 98B shows a Gerotor displacement pumping unit according to one embodiment;

FIG. 99A shows a test rig assembly of a high pressure rod seal according to one embodiment;

FIG. 99B shows an embodiment of a high pressure rod seal;

FIG. 100A shows another embodiment of a high pressure rod seal including a spring energized lip seal;

FIG. 100B is a hydraulic high pressure piston rod seal set inside the rod seal cavity of a test rig according to one embodiment;

FIGS. 101A and 101B show views of a rolling diaphragm in accordance with one embodiment;

FIGS. 102A and 102B show views of a rolling diaphragm in accordance with another embodiment;

FIG. 103 shows a view of a double bellows system in accordance with one embodiment;

FIGS. 104A and 104B show views of an airlock pressure regulation system in accordance with one embodiment;

FIG. 104C shows a bidirectional regulator according to one embodiment;

FIGS. 104D(1)-104D(5) show various positions of a spool valve in a bidirectional regulator in accordance with various embodiments;

FIG. 104E shows a view of an airlock pressure regulation system in accordance with one embodiment;

FIG. 105 shows a view of an airlock pressure regulation system in accordance with one embodiment;

FIG. 106 shows a view of a mechanical pump for regulating airlock pressure in accordance with one embodiment;

FIGS. 107A and 107B show views of a heat exchanger in accordance with one embodiment;

FIGS. 108A and 108B show views of a rocking beam mechanism in accordance with one embodiment;

FIGS. 109A and 109B show views of a horizontally supported Stirling cycle engine in accordance with one embodiment;

FIGS. 110A and 110B show views of a tube-in-tube heat exchanger according to one embodiment;

FIGS. 111A and 111B show views of a pull-cord start system in accordance with one embodiment;

FIGS. 111C and 111D show views of an electric starter motor in accordance with one embodiment;

FIGS. 112-117 show various views of a burner in accordance with one embodiment;

FIGS. 118A-118C show various configurations of a fletching in accordance with various embodiments;

FIGS. 118D and 119 show views of a burner in accordance with one embodiment;

FIG. 120 is a diagram of a control burner scheme in accordance with one embodiment;

FIGS. 121 and 122 show views of a burner in accordance with one embodiment;

FIG. 123 shows a diagram of a partial combustion cooling process in accordance with one embodiment;

FIG. 124 shows a diagram of a trim air cooling process in accordance with one embodiment;

FIG. 125A shows a cutaway view of a restricting flow apparatus in accordance with one embodiment;

FIG. 125B shows an isometric view of a burner housing in accordance with the restricting flow apparatus in accordance with one embodiment;

FIG. 126 shows a control scheme in accordance with one embodiment;

FIG. 127 is a temperature distribution chart in accordance with one embodiment of the restrictive flow apparatus; and FIG. 128 is an example of a result graph in accordance with one embodiment of the restrictive flow apparatus.

DETAILED DESCRIPTION OF THE PREFERRED EMBODIMENTS

Stirling cycle machines, including engines and refrigerators, have a long technological heritage, described in detail in Walker, Stirling Engines, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. Additional background regarding aspects of Stirling cycle machines and improvements thereto is discussed in Hargreaves, The Phillips Stirling Engine (Elsevier, Amsterdam, 1991), which is herein incorporated by reference.

The principle of operation of a Stirling cycle machine is readily described with reference to FIGS. 1A-1E, wherein identical numerals are used to identify the same or similar parts. Many mechanical layouts of Stirling cycle machines are known in the art, and the particular Stirling cycle machine designated generally by numeral 10 is shown merely for illustrative purposes. In FIGS. 1A to 1D, piston 12 and a displacer 14 move in phased reciprocating motion within the cylinders 16 which, in some embodiments of the Stirling cycle machine, may be a single cylinder, but in other embodiments, may include greater than a single cylinder. A working fluid contained within cylinders 16 is constrained by seals from escaping around piston 12 and displacer 14. The working fluid is chosen for its thermodynamic properties, as discussed in the description below, and is typically helium at a pressure of several atmospheres, however, any gas, including any inert gas, may be used, including, but not limited to, hydrogen, argon, neon, nitrogen, air and any mixtures thereof. The position of the displacer 14 governs whether the working fluid is in contact with the hot interface 18 or the cold interface 20, corresponding, respectively, to the interfaces at which heat is supplied to and extracted from the working fluid. The supply and extraction of heat is discussed in further detail below. The volume of working fluid governed by the position of the piston 12 is referred to as the compression space 22.

Figure 1A:
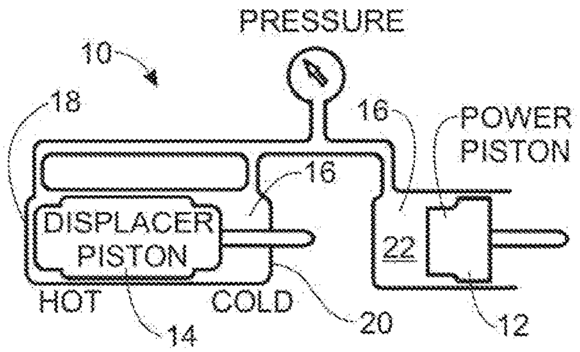
FIGS. 1A-1E depict the principle of operation of a prior art Stirling cycle machine.
Figure 1B:
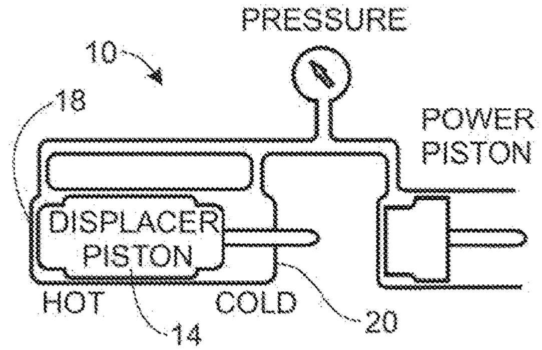
Figure 1C:
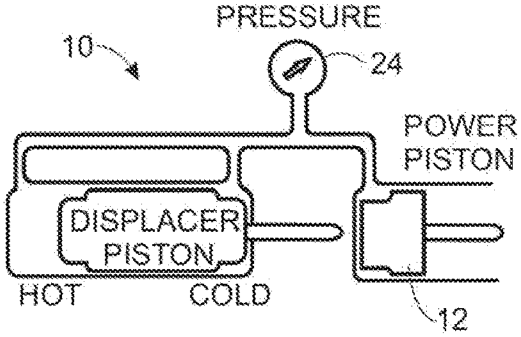

During the first phase of the Stirling cycle, the starting condition of which is depicted in FIG. 1A, the piston 12 compresses the fluid in the compression space 22. The compression occurs at a substantially constant temperature because heat is extracted from the fluid to the ambient environment. The condition of the Stirling cycle machine 10 after compression is depicted in FIG. 1B. During the second phase of the cycle, the displacer 14 moves in the direction of the cold interface 20, with the working fluid displaced from the region of the cold interface 20 to the region of the hot interface 18. This phase may be referred to as the transfer phase. At the end of the transfer phase, the fluid is at a higher pressure since the working fluid has been heated at constant volume. The increased pressure is depicted symbolically in FIG. 1C by the reading of the pressure gauge 24.

Figure 1D:
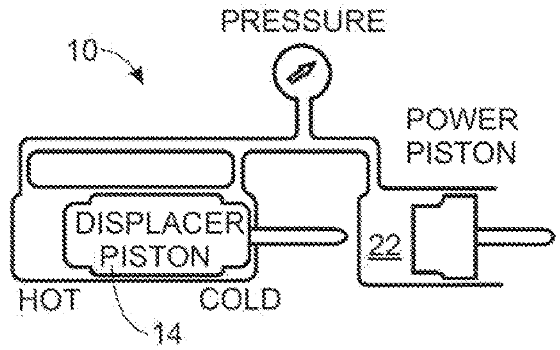
Figure 1E:
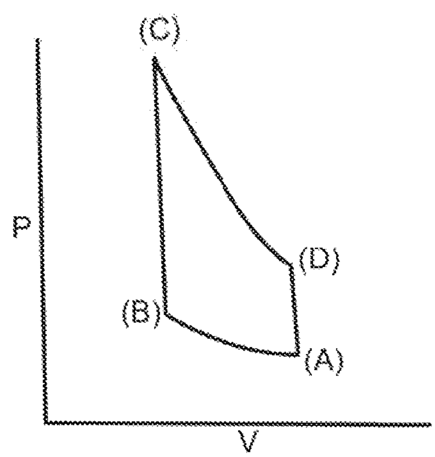

During the third phase (the expansion stroke) of the Stirling cycle machine, the volume of the compression space 22 increases as heat is drawn in from outside the Stirling cycle machine 10, thereby converting heat to work. In practice, heat is provided to the fluid by means of a heater head (not shown) which is discussed in greater detail in the description below. At the end of the expansion phase, the compression space 22 is full of cold fluid, as depicted in FIG. 1D. During the fourth phase of the Stirling cycle machine 10, fluid is transferred from the region of the hot interface 18 to the region of the cold interface 20 by motion of the displacer 14 in the opposing sense. At the end of this second transfer phase, the fluid fills the compression space 22 and cold interface 20, as depicted in FIG. 1A, and is ready for a repetition of the compression phase. The Stirling cycle is depicted in a P-V (pressure-volume) diagram as shown in FIG. 1E.

Additionally, on passing from the region of the hot interface 18 to the region of the cold interface 20. In some embodiments, the fluid may pass through a regenerator (shown as 408 in FIG. 4). A regenerator is a matrix of material having a large ratio of surface area to volume which serves to absorb heat from the fluid when it enters from the region of the hot interface 18 and to heat the fluid when it passes from the region of the cold interface 20.

Stirling cycle machines have not generally been used in practical applications due to several daunting challenges to their development. These involve practical considerations such as efficiency and lifetime. Accordingly, there is a need for more Stirling cycle machines with minimal side loads on pistons, increased efficiency and lifetime.

The principle of operation of a Stirling cycle machine or Stirling engine is further discussed in detail in U.S. Pat. No. 6,381,958, issued May 7, 2002, to Kamen et al., which is herein incorporated by reference in its entirety.

Rocking Beam Drive

Figure 2:
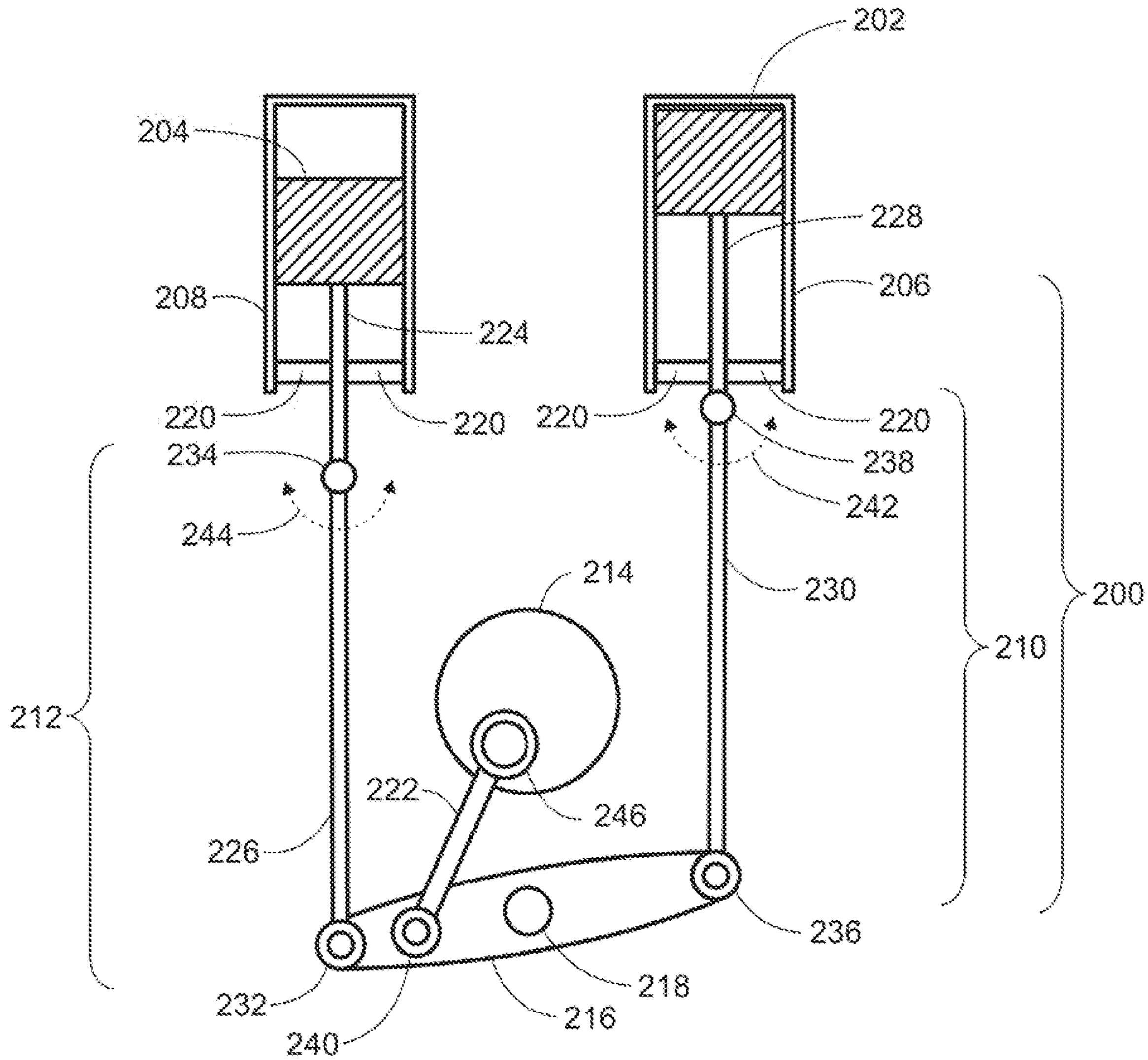
FIG. 2 shows a view of a rocking beam drive in accordance with one embodiment.
Figure 3:
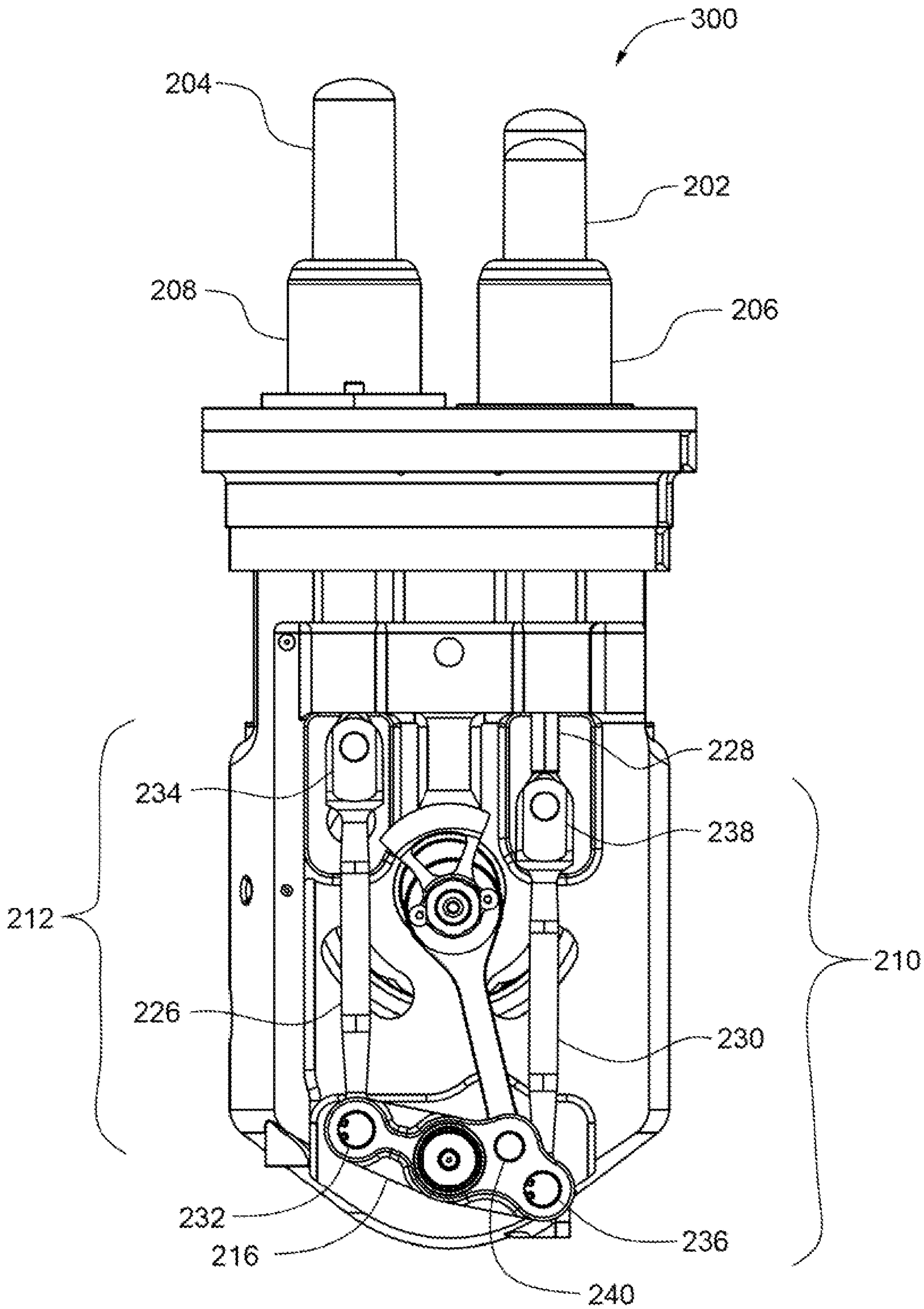
FIG. 3 shows a view of a rocking beam drive in accordance with one embodiment.
Figure 4:
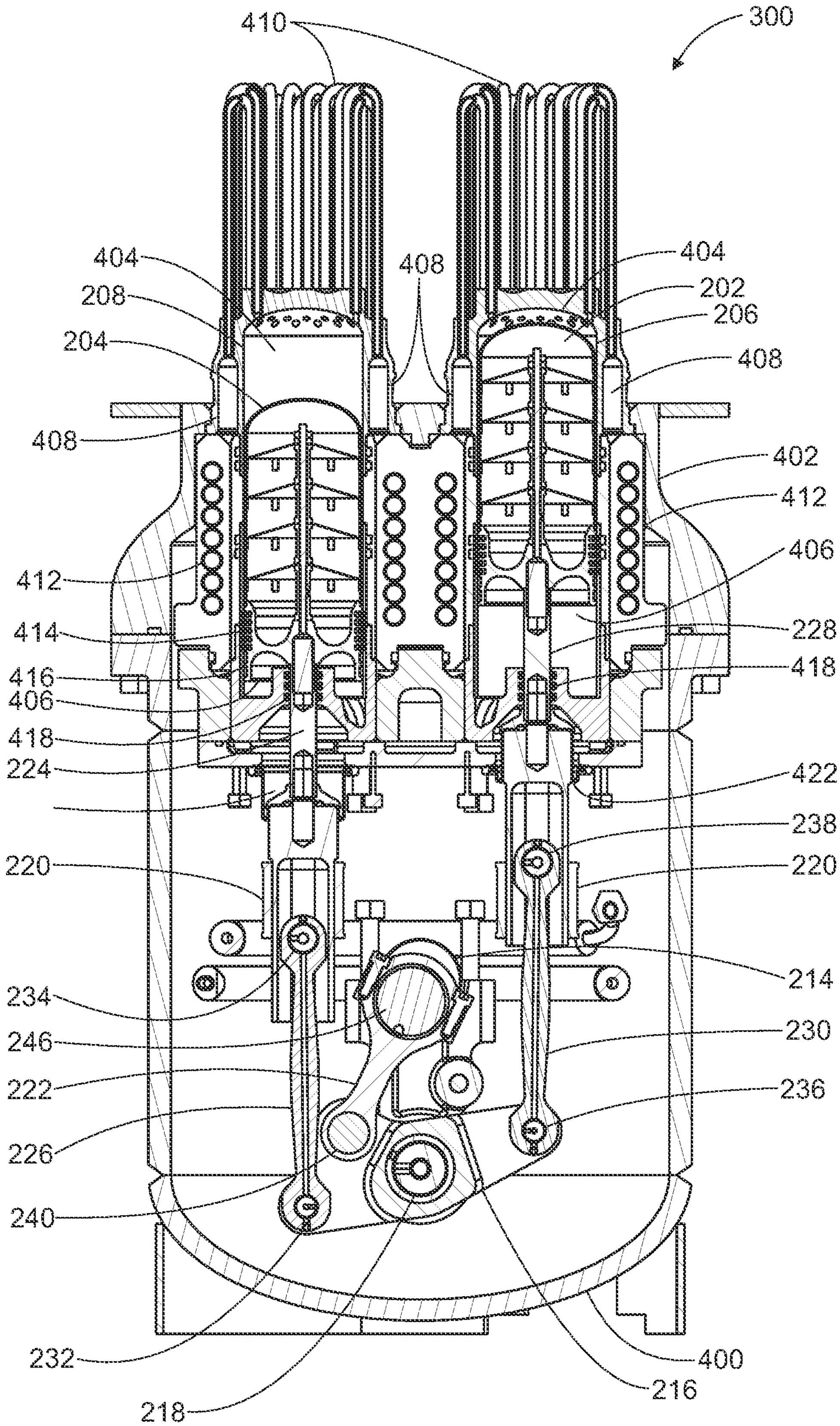
FIG. 4 shows a view of an engine in accordance with one embodiment.

Referring now to FIGS. 2-4, embodiments of a Stirling cycle machine, according to one embodiment, are shown in cross-section. The engine embodiment is designated generally by numeral 300. While the Stirling cycle machine will be described generally with reference to the Stirling engine 300 embodiments shown in FIGS. 2-4, it is to be understood that many types of machines and engines, including but not limited to refrigerators and compressors may similarly benefit from various embodiments and improvements which are described herein, including but not limited to, external combustion engines and internal combustion engines.

FIG. 2 depicts a cross-section of an embodiment of a rocking beam drive mechanism 200 (the term "rocking beam drive" is used synonymously with the term "rocking beam drive mechanism") for an engine, such as a Stirling engine, having linearly reciprocating pistons 202 and 204 housed within cylinders 206 and 208, respectively. The cylinders include linear bearings 220. Rocking beam drive 200 converts linear motions of pistons 202 and 204 into the rotary motion of a crankshaft 214. Rocking beam drive 200 has a rocking beam 216, rocker pivot 218, a first coupling assembly 210, and a second coupling assembly 212. Pistons 202 and 204 are coupled to rocking beam drive 200, respectively, via first coupling assembly 210 and second coupling assembly 212. The rocking beam drive is coupled to crankshaft 214 via a connecting rod 222.

In some embodiments, the rocking beam and a first portion of the coupling assembly may be located in a crankcase, while the cylinders, pistons and a second portion of the coupling assembly is located in a workspace.

In FIG. 4 a crankcase 400 most of the rocking beam drive 200 is positioned below the cylinder housing 402. Crankcase 400 is a space to permit operation of rocking beam drive 200 having a crankshaft 214, rocking beam 216, linear bearings 220, a connecting rod 222, and coupling assemblies 210 and 212. Crankcase 400 intersects cylinders 206 and 208 transverse to the plane of the axes of pistons 202 and 204. Pistons 202 and 204 reciprocate in respective cylinders 206 and 208, as also shown in FIG. 2. Cylinders 206 and 208 extend above crankshaft housing 400. Crankshaft 214 is mounted in crankcase 400 below cylinders 206 and 208.

Figure 6:
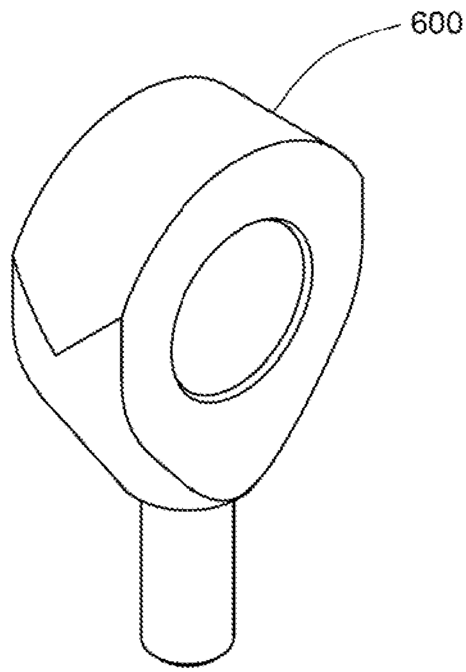
FIG. 6 shows a bearing style rod connector in accordance with one embodiment.
Figure 7A:
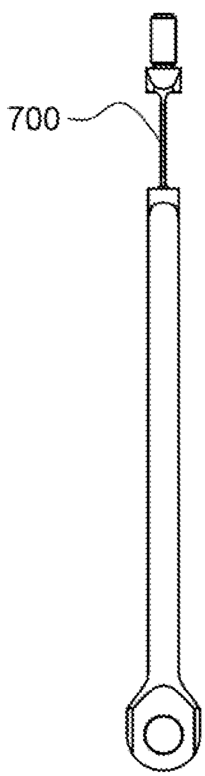
FIGS. 7A-7B show a flexure in accordance with one embodiment.
Figure 7B:
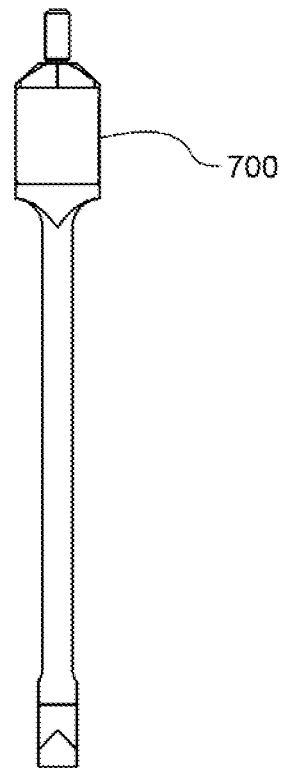

FIG. 2 shows one embodiment of rocking beam drive 200. Coupling assemblies 210 and 212 extend from pistons 202 and 204, respectively, to connect pistons 202 and 204 to rocking beam 216. Coupling assembly 212 for piston 204, in some embodiments, may comprise a piston rod 224 and a link rod 226. Coupling assembly 210 for piston 202, in some embodiments, may comprise a piston rod 228 and a link rod 230. Piston 204 operates in the cylinder 208 vertically and is connected by the coupling assembly 212 to the end pivot 232 of the rocking beam 216. The cylinder 208 provides guidance for the longitudinal motion of piston 204. The piston rod 224 of the coupling assembly 212 attached to the lower portion of piston 204 is driven axially by its link rod 226 in a substantially linear reciprocating path along the axis of the cylinder 208. The distal end of piston rod 224 and the proximate end of link rod 226, in some embodiments, may be jointly hinged via a coupling means 234. The coupling means 234, may be any coupling means known in the art, including but not limited to, a flexible joint, roller bearing element, hinge, journal bearing joint (shown as 600 in FIG. 6), and flexure (shown as 700 in FIGS. 7A and 7B). The distal end of the link rod 226 may be coupled to one end pivot 232 of rocking beam 216, which is positioned vertically and perpendicularly under the proximate end of the link rod 226. A stationary linear bearing 220 may be positioned along coupling assembly 212 to further ensure substantially linear longitudinal motion of the piston rod 224 and thus ensuring substantially linear longitudinal motion of the piston 204. In an exemplary embodiment, link rod 226 does not pass through linear bearing 220. This ensures, among other things, that piston rod 224 retains a substantially linear and longitudinal motion.

In the exemplary embodiment, the link rods may be made from aluminum, and the piston rods and connecting rod are made from D2 Tool Steel. Alternatively, the link rods, piston rods, connecting rods, and rocking beam may be made from 4340 steel. Other materials may be used for the components of the rocking beam drive, including, but not limited to, titanium, aluminum, steel or cast iron. In some embodiments, the fatigue strength of the material being used is above the actual load experienced by the components during operation.

Still referring to FIGS. 2-4, piston 202 operates vertically in the cylinder 206 and is connected by the coupling assembly 210 to the end pivot 236 of the rocking beam 216.

The cylinder 206 serves, amongst other functions, to provide guidance for longitudinal motion of piston 202. The piston rod 228 of the coupling assembly 210 is attached to the lower portion of piston 202 and is driven axially by its link rod 230 in a substantially linear reciprocating path along the axis of the cylinder 206. The distal end of the piston rod 228 and the proximate end of the link rod 230, in some embodiments, is jointly hinged via a coupling means 238. The coupling means 238, in various embodiments may include, but are not limited to, a flexure (shown as 700 in FIGS. 7A and 7B, roller bearing element, hinge, journal bearing (shown as 600 in FIG. 6), or coupling means as known in the art. The distal end of the link rod 230, in some embodiments, may be coupled to one end pivot 236 of rocking beam 216, which is positioned vertically and perpendicularly under the proximate end of link rod 230. A stationary linear bearing 220 may be positioned along coupling assembly 210 to further ensure linear longitudinal motion of the piston rod 228 and thus ensuring linear longitudinal motion of the piston 202. In an exemplary embodiment, link rod 230 does not pass through linear bearing 220 to ensure that piston rod 228 retains a substantially linear and longitudinal motion.

Figure 5A:
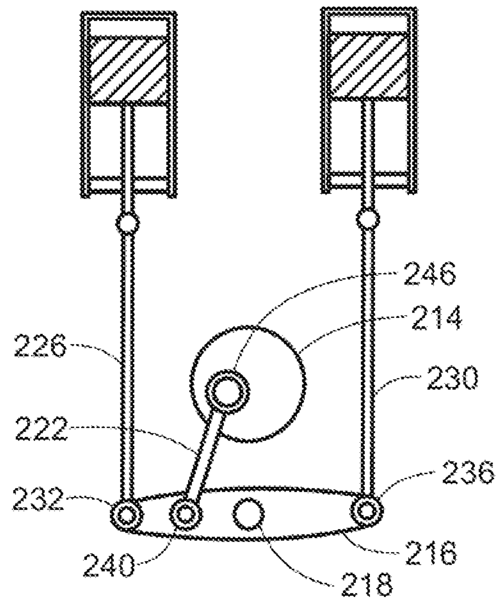
FIGS. 5A-5D depicts various views of a rocking beam drive in accordance with one embodiment.
Figure 5B:
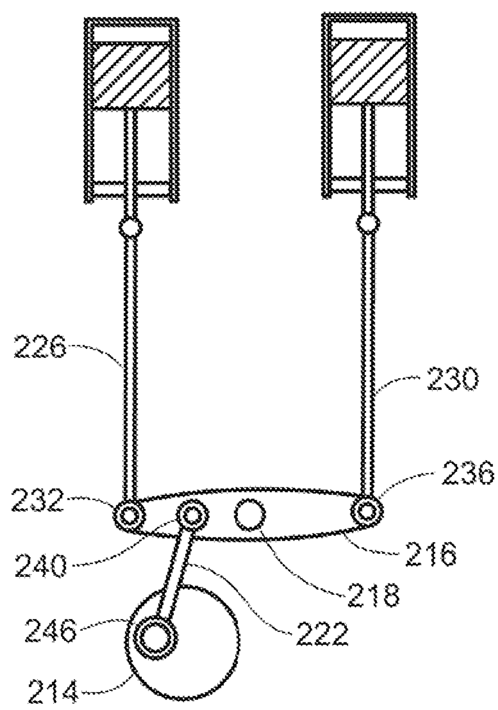

The coupling assemblies 210 and 212 change the alternating longitudinal motion of respective pistons 202 and 204 to oscillatory motion of the rocking beam 216. The delivered oscillatory motion is changed to the rotational motion of the crankshaft 214 by the connecting rod 222, wherein one end of the connecting rod 222 is rotatably coupled to a connecting pivot 240 positioned between an end pivot 232 and a rocker pivot 218 in the rocking beam 216, and another end of the connecting rod 222 is rotatably coupled to crankpin 246. The rocker pivot 218 may be positioned substantially at the midpoint between the end pivots 232 and 236 and oscillatory support the rocking beam 216 as a fulcrum, thus guiding the respective piston rods 224 and 228 to make sufficient linear motion. In the exemplary embodiment, the crankshaft 214 is located above the rocking beam 216, but in other embodiments, the crankshaft 214 may be positioned below the rocking beam 216 (as shown in FIGS. 5B and 5D) or in some embodiments, the crankshaft 214 is positioned to the side of the rocking beam 216, such that it still has a parallel axis to the rocking beam 216.

Still referring to FIGS. 2-4, the rocking beam oscillates about the rocker pivot 218, the end pivots 232 and 236 follow an arc path. Since the distal ends of the link rods 226 and 230 are connected to the rocking beam 216 at pivots 232 and 236, the distal ends of the link rods 226 and 230 also follow this arc path, resulting in an angular deviation 242 and 244 from the longitudinal axis of motion of their respective pistons 202 and 204. The coupling means 234 and 238 are configured such that any angular deviation 244 and 242 from the link rods 226 and 230 experienced by the piston rods 224 and 228 is minimized. Essentially, the angular deviation 244 and 242 is absorbed by the coupling means 234 and 238 so that the piston rods 224 and 228 maintain substantially linear longitudinal motion to reduce side loads on the pistons 204 and 202. A stationary linear bearing 220 may also be placed inside the cylinder 208 or 206, or along coupling assemblies 212 or 210, to further absorb any angular deviation 244 or 242 thus keeping the piston push rod 224 or 228 and the piston 204 or 202 in linear motion along the longitudinal axis of the piston 204 or 202.

Therefore, in view of reciprocating motion of pistons 202 and 204, it is necessary to keep the motion of pistons 202 and 204 as close to linear as possible because the deviation 242 and 244 from longitudinal axis of reciprocating motion of pistons 202 and 204 causes noise, reduction of efficiency, increase of friction to the wall of cylinder, increase of side-load, and low durability of the parts. The alignment of the cylinders 206 and 208 and the arrangement of crankshaft 214, piston rods 224 and 228, link rods 226 and 230, and connecting rod 222, hence, may influence on, amongst other things, the efficiency and/or the volume of the device. For the purpose of increasing the linearity of the piston motion as mentioned, the pistons (shown as 202 and 204 in FIGS. 2-4) are preferably as close to the side of the respective cylinders 206 and 208 as possible.

In another embodiment reducing angular deviation of link rods, link rods 226 and 230 substantially linearly reciprocate along longitudinal axis of motion of respective pistons 204 and 202 to decrease the angular deviation and thus to decrease the side load applied to each piston 204 and 202. The angular deviation defines the deviation of the link rod 226 or 230 from the longitudinal axis of the piston 204 or 202. Numerals 244 and 242 designate the angular deviation of the link rods 226 and 230, as shown in FIG. 2. Therefore, the position of coupling assembly 212 influences the angular displacement of the link rod 226, based on the length of the distance between the end pivot 232 and the rocker pivot 218 of the rocking beam 216. Thus, the position of the coupling assemblies may be such that the angular displacement of the link rod 226 is reduced. For the link rod 230, the length of the coupling assembly 210 also may be determined and placed to reduce the angular displacement of the link rod 230, based on the length of the distance between the end pivot 236 and the rocker pivot 218 of the rocking beam 216. Therefore, the length of the link rods 226 and 230, the length of coupling assemblies 212 and 210, and the length of the rocking beam 216 are significant parameters that greatly influence and/or determine the angular deviation of the link rods 226 and 230 as shown in FIG. 2.

The exemplary embodiment has a straight rocking beam 216 having the end points 232 and 236, the rocker pivot 218, and the connecting pivot 240 along the same axis. However, in other embodiments, the rocking beam 216 may be bent, such that pistons may be placed at angles to each other, as shown in FIGS. 5C and 5D.

Referring now to FIGS. 2-4 and FIGS. 7A-7B, in some embodiments of the coupling assembly, the coupling assemblies 212 and 210, may include a flexible link rod that is axially stiff but flexible in the rocking beam 216 plane of motion between link rods 226 and 230, and pistons 204 and 202, respectively. In this embodiment, at least one portion, the flexure (shown as 700 in FIGS. 7A and 7B), of link rods 226 and 230 is elastic. The flexure 700 acts as a coupling means between the piston rod and the link rod. The flexure 700 may absorb the crank-induced side loads of the pistons more effectively, thus allowing its respective piston to maintain linear longitudinal movement inside the piston's cylinder. This flexure 700 allows small rotations in the plane of the rocking beam 216 between the link rods 226 and 230 and pistons 204 or 202, respectively. Although depicted in this embodiment as flat, which increases the elasticity of the link rods 226 and 230, the flexure 700, in some embodiments, is not flat. The flexure 700 also may be constructed near to the lower portion of the pistons or near to the distal end of the link rods 226 and 230. The flexure 700, in one embodiment, may be made of #D2 Tool Steel Hardened to 58-62 RC. In some embodiments, there may be more than one flexure (not shown) on the link rod 226 or 230 to increase the elasticity of the link rods.

Figure 5C:
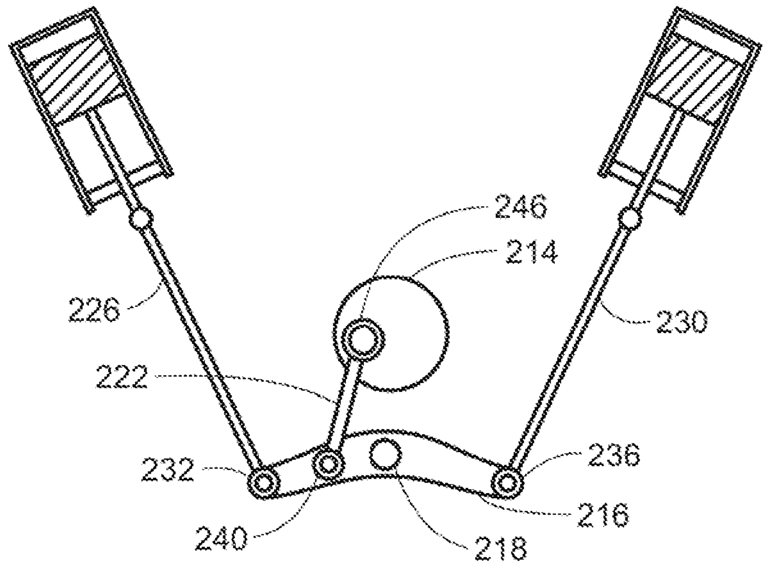
Figure 5D:
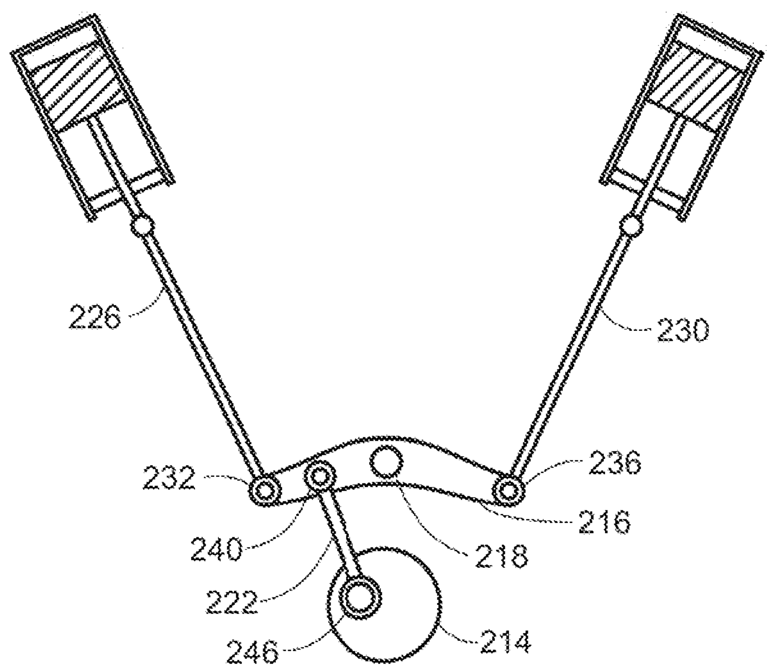

In alternate embodiment, the axes of the pistons in each cylinder housing may extend in different directions, as depicted in FIGS. 5C and 5D. In the exemplary embodiment, the axes of the pistons in each cylinder housing are substantially parallel and preferably substantially vertical, as depicted in FIGS. 2-4, and FIGS. 5A and 5B. FIGS. 5A-5D include various embodiments of the rocking beam drive mechanism including like numbers as those shown and described with respect to FIGS. 2-4. It will be understood by those skilled in that art that changing the relative position of the connecting pivot 240 along the rocking beam 216 will change the stroke of the pistons.

Accordingly, a change in the parameters of the relative position of the connecting pivot 240 in the rocking beam 216 and the length of the piston rods 224 and 228, link rods 230 and 226, rocking beam 216, and the position of rocker pivot 218 will change the angular deviation of the link rods 226 and 230, the phasing of the pistons 204 and 202, and the size of the device 300 in a variety of manner. Therefore, in various embodiments, a wide range of piston phase angles and variable sizes of the engine may be chosen based on the modification of one or more of these parameters. In practice, the link rods 224 and 228 of the exemplary embodiment have substantially lateral movement within from −0.5 degree to +0.5 degree from the longitudinal axis of the pistons 204 and 202. In various other embodiments, depending on the length of the link rod, the angle may vary anywhere from approaching 0 degrees to 0.75 degrees. However, in other embodiments, the angle may be higher including anywhere from approaching 0 to the approximately 20 degrees. As the link rod length increases, however, the crankcase/overall engine height increases as well as the weight of the engine.

One feature of the exemplary embodiment is that each piston has its link rod extending substantially to the attached piston rod so that it is formed as a coupling assembly. In one embodiment, the coupling assembly 212 for the piston 204 includes a piston rod 224, a link rod 226, and a coupling means 234 as shown in FIG. 2. More specifically, one proximal end of piston rod 224 is attached to the lower portion of piston 204 and the distal end piston rod 224 is connected to the proximate end of the link rod 226 by the coupling means 234. The distal end of the link rod 226 extends vertically to the end pivot 232 of the rocking beam 216. As described above, the coupling means 234 may be, but is not limited to, a joint, hinge, coupling, or flexure or other means known in the art. In this embodiment, the ratio of the piston rod 224 and the link rod 226 may determine the angular deviation of the link rod 226 as mentioned above.

Figure 8:
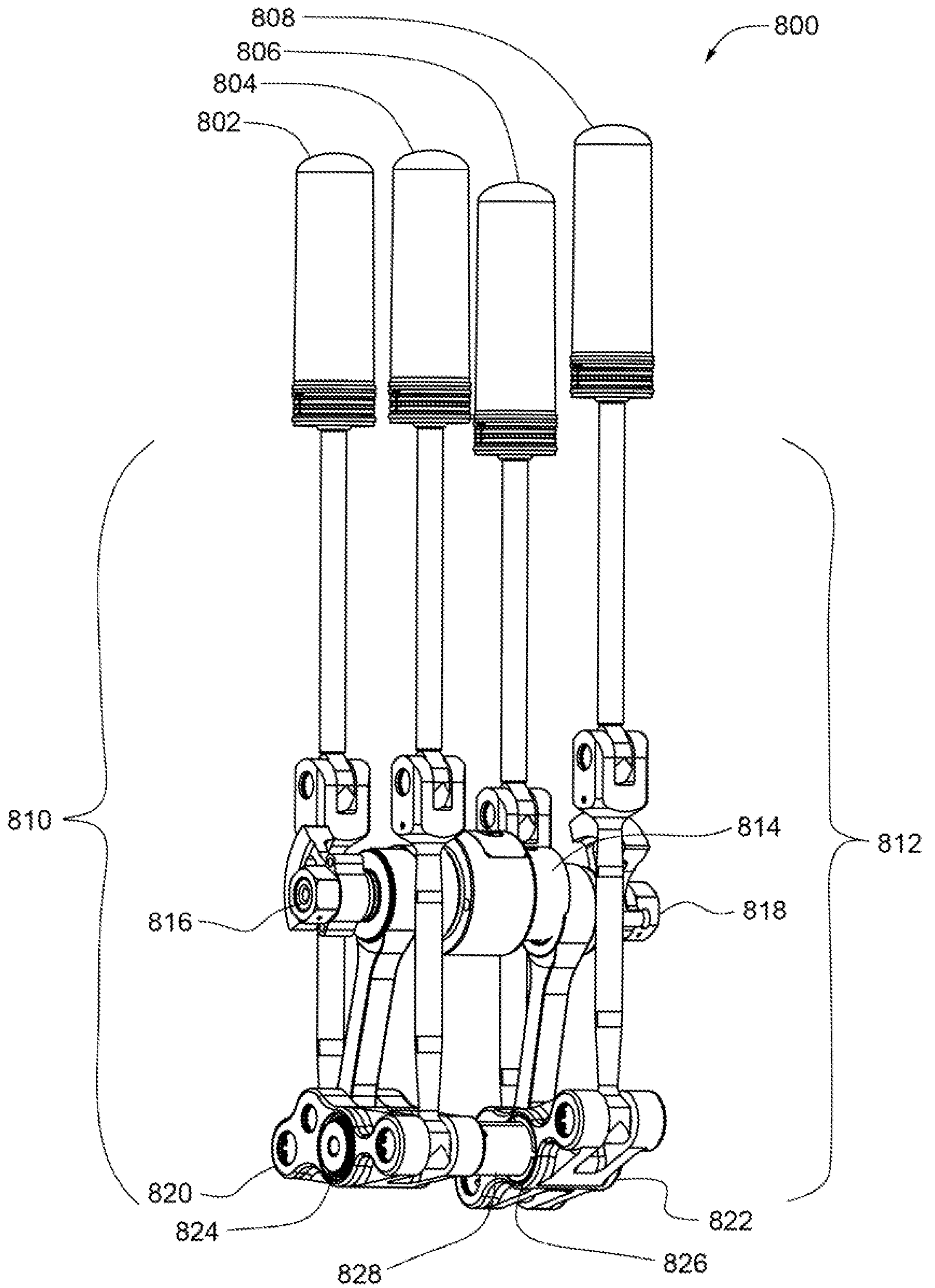
FIG. 8 shows a four cylinder double rocking beam drive arrangement in accordance with one embodiment.

In one embodiment of the machine, an engine, such as a Stirling engine, employs more than one rocking beam drive on a crankshaft. Referring now to FIG. 8, an unwrapped "four cylinder" rocking beam drive mechanism 800 is shown. In this embodiment, the rocking beam drive mechanism has four pistons 802, 804, 806, and 808 coupled to two rocking beam drives 810 and 812. In the exemplary embodiment, rocking beam drive mechanism 800 is used in a Stirling engine comprising at least four pistons 802, 804, 806, and 808, positioned in a quadrilateral arrangement coupled to a pair of rocking beam drives 810 and 812, wherein each rocking beam drive is connected to crankshaft 814. However, in other embodiments, the Stirling cycle engine includes anywhere from 1-4 pistons, and in still other embodiments, the Stirling cycle engine includes more than 4 pistons. In some embodiments, rocking beam drives 810 and 812 are substantially similar to the rocking beam drives described above with respect to FIGS. 2-4 (shown as 210 and 212 in FIGS. 2-4). Although in this embodiment, the pistons are shown outside the cylinders, in practice, the pistons would be inside cylinders.

Still referring to FIG. 8, in some embodiments, the rocking beam drive mechanism 800 has a single crankshaft 814 having a pair of longitudinally spaced, radially and oppositely directed crank pins 816 and 818 adapted for being journalled in a housing, and a pair of rocking beam drives 810 and 812. Each rocking beam 820 and 822 is pivotally connected to rocker pivots 824 and 826, respectively, and to crankpins 816 and 818, respectively. In the exemplary embodiment, rocking beams 820 and 822 are coupled to a rocking beam shaft 828.

In some embodiments, a motor/generator may be connected to the crankshaft in a working relationship. The motor may be located, in one embodiment, between the rocking beam drives. In another embodiment, the motor may be positioned outboard. The term "motor/generator" is used to mean either a motor or a generator.

Figure 9:
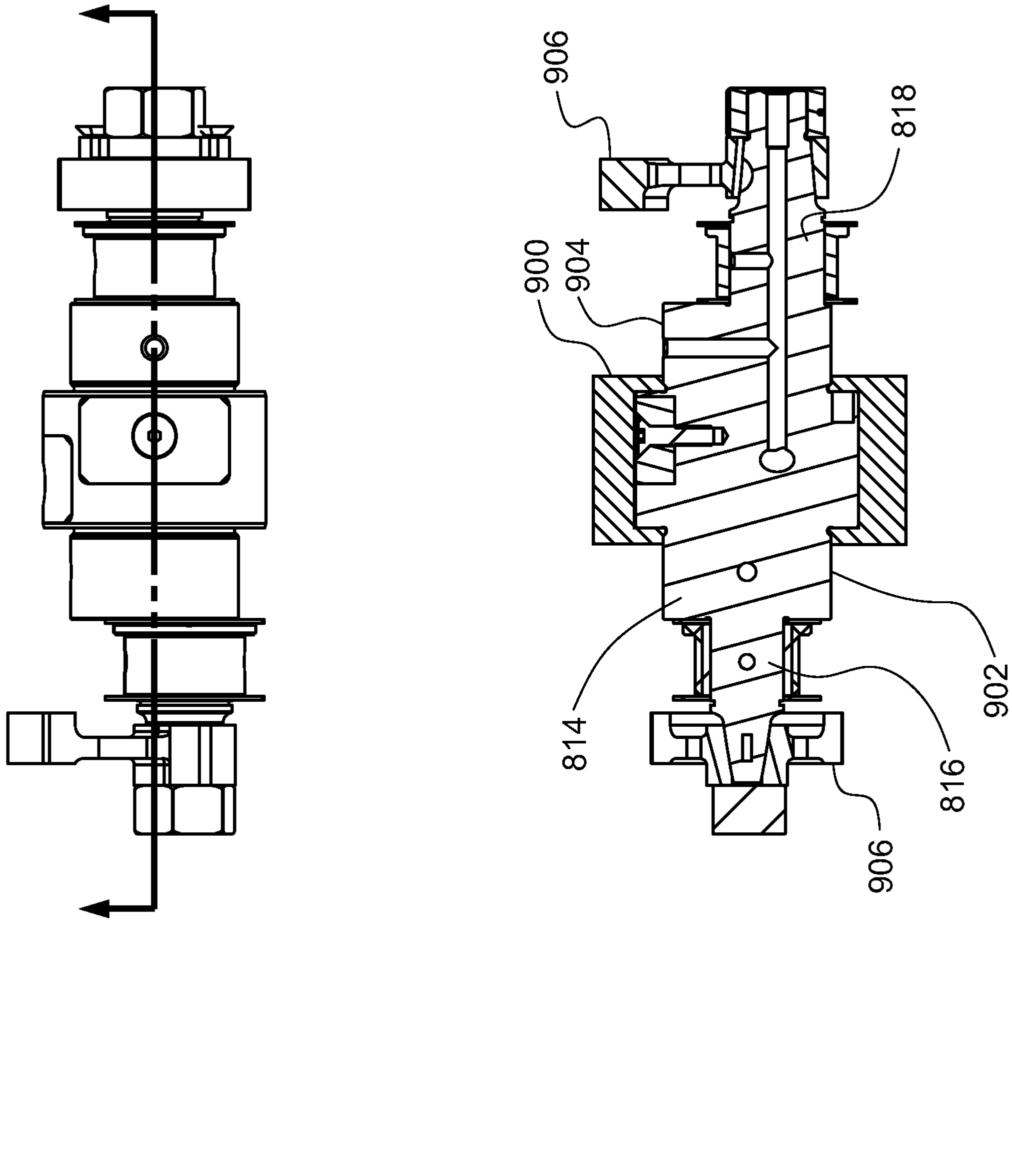
FIG. 9 shows a cross section of a crankshaft in accordance with one embodiment.

FIG. 9 shows one embodiment of crankshaft 814. Positioned on the crankshaft is a motor/generator 900, such as a Permanent Magnetic ("PM") generator. Motor/generator 900 may be positioned between, or inboard of the rocking beam drives (not shown, shown in FIG. 8 as 810 and 812), or may be positioned outside, or outboard of, rocking beam drives 810 and 812 at an end of crankshaft 814, as depicted by numeral 1000 in FIG. 10A.

When motor/generator 900 is positioned between the rocking beam drives (not shown, shown in FIG. 8 as 810 and 812), the length of motor/generator 900 is limited to the distance between the rocking beam drives. The diameter squared of motor/generator 900 is limited by the distance between the crankshaft 814 and the rocking beam shaft 828. Because the capacity of motor/generator 900 is proportional to its diameter squared and length, these dimension limitations result in a limited-capacity "pancake" motor/generator 900 having relatively short length, and a relatively large diameter squared. The use of a "pancake" motor/generator 900 may reduce the overall dimension of the engine, however, the dimension limitations imposed by the inboard configuration result in a motor/generator having limited capacity.

Placing motor/generator 900 between the rocking beam drives exposes motor/generator 900 to heat generated by the mechanical friction of the rocking beam drives. The inboard location of motor/generator 900 makes it more difficult to cool motor/generator 900, thereby increasing the effects of heat produced by motor/generator 900 as well as heat absorbed by motor/generator 900 from the rocking beam drives. This may lead to overheating, and ultimately failure of motor/generator 900.

Referring to both FIGS. 8 and 9, the inboard positioning of motor/generator 900 may also lead to an unequilateral configuration of pistons 802, 804, 806, and 808, since pistons 802, 804, 806, and 808 are coupled to rocking beam drives 810 and 812, respectively, and any increase in distance would also result in an increase in distance between pistons 802, 804, and pistons 806 and 808. An unequilateral arrangement of pistons may lead to inefficiencies in burner and heater head thermodynamic operation, which, in turn, may lead to a decrease in overall engine efficiency. Additionally, an unequilateral arrangement of pistons may lead to larger heater head and combustion chamber dimensions.

Figure 10A:
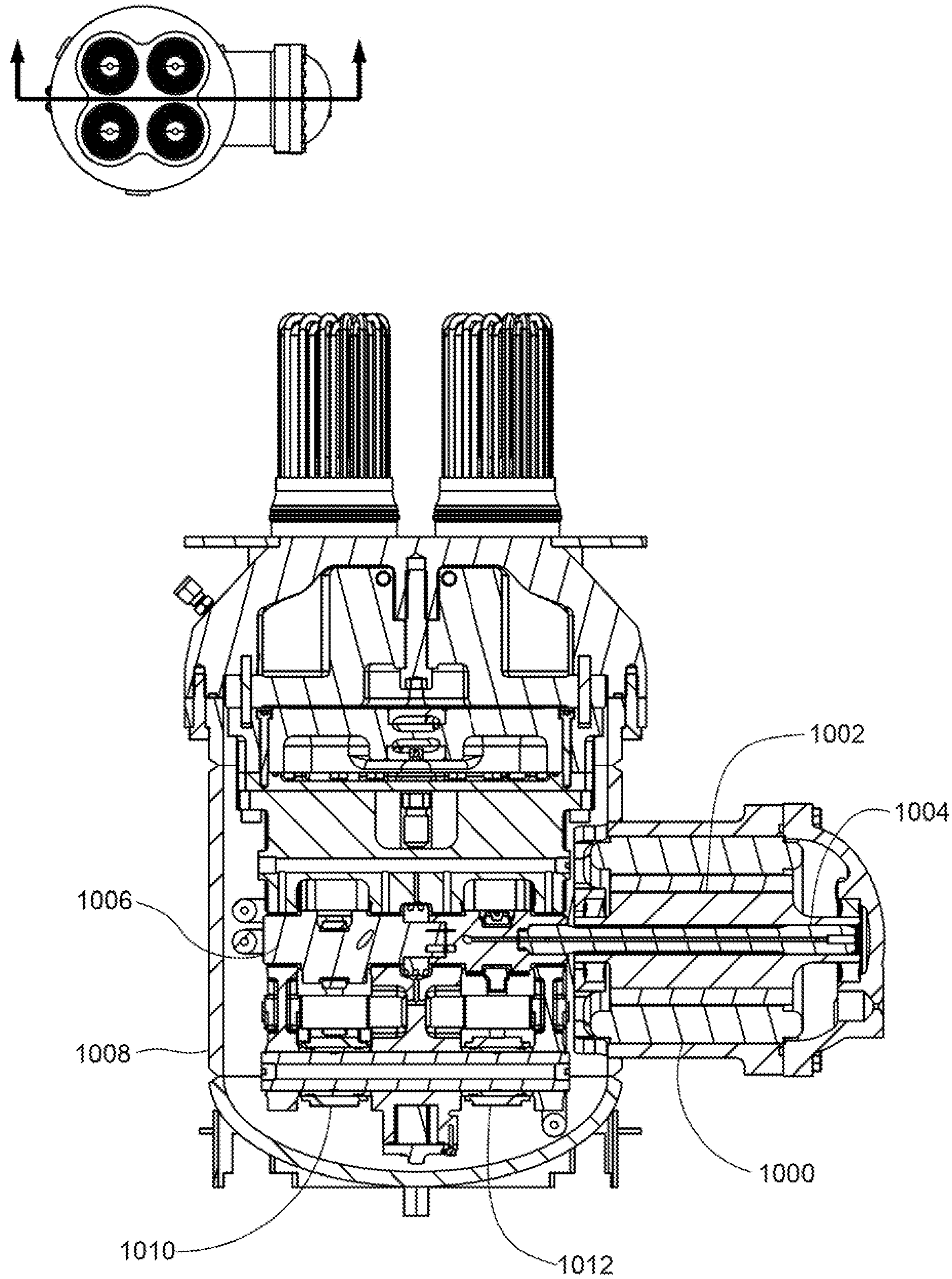
FIG. 10A shows a view of an engine in accordance with one embodiment.
Figure 10B:
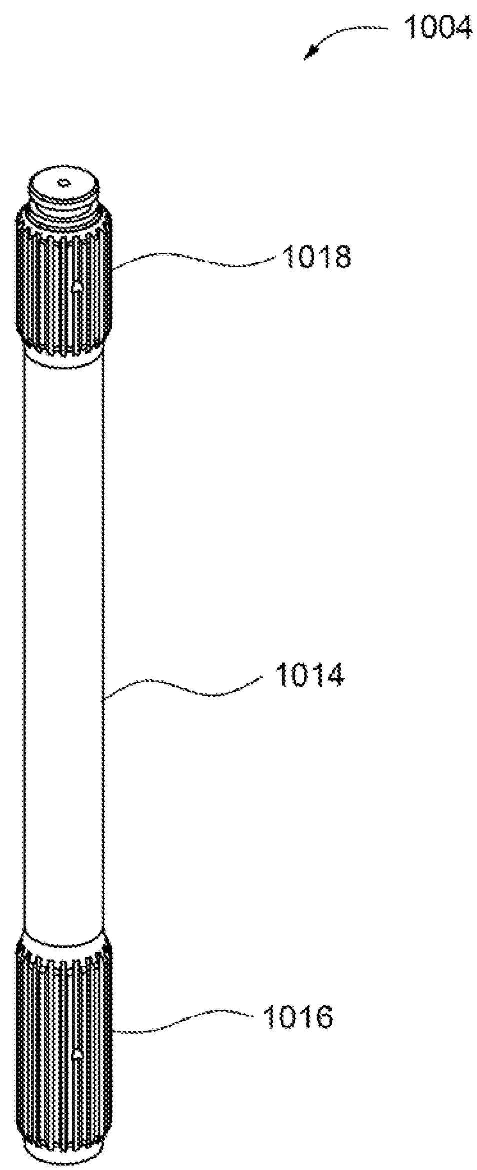
FIG. 10B shows a crankshaft coupling in accordance with one embodiment.
Figure 10C:
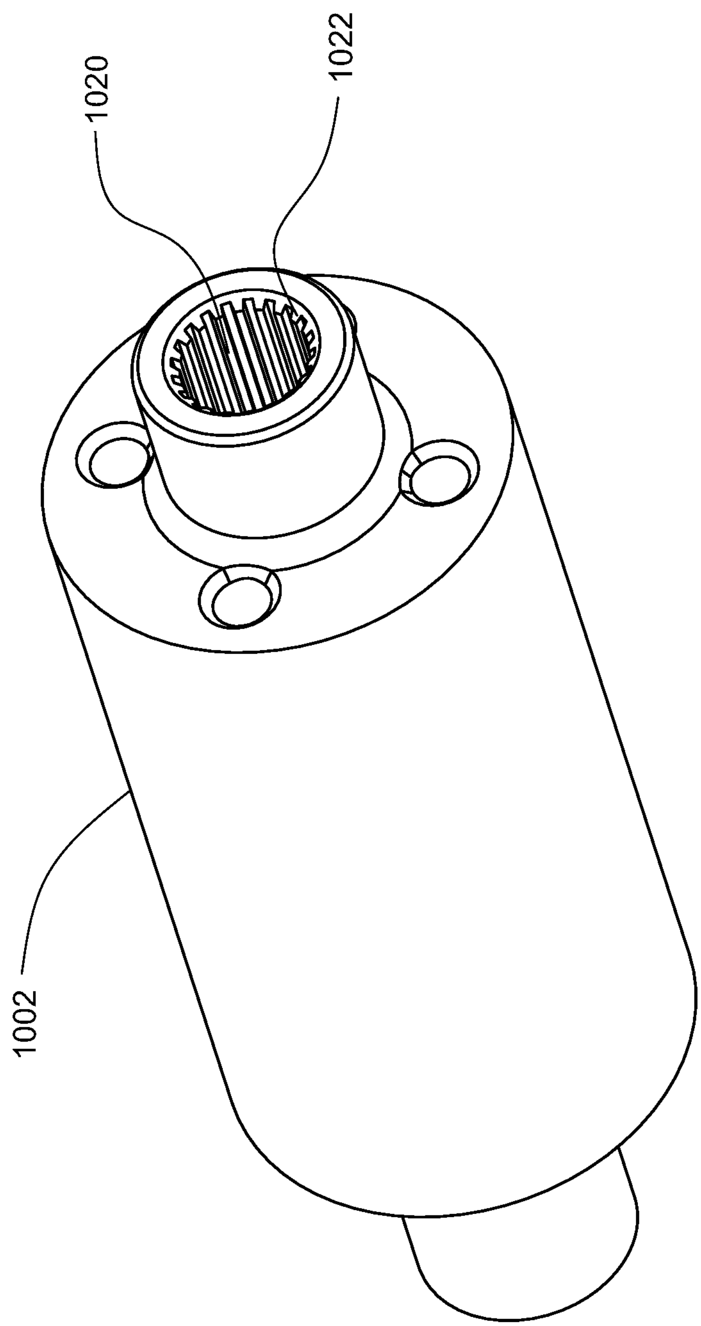
FIG. 10C shows a view of a sleeve rotor in accordance with one embodiment.
Figure 10D:
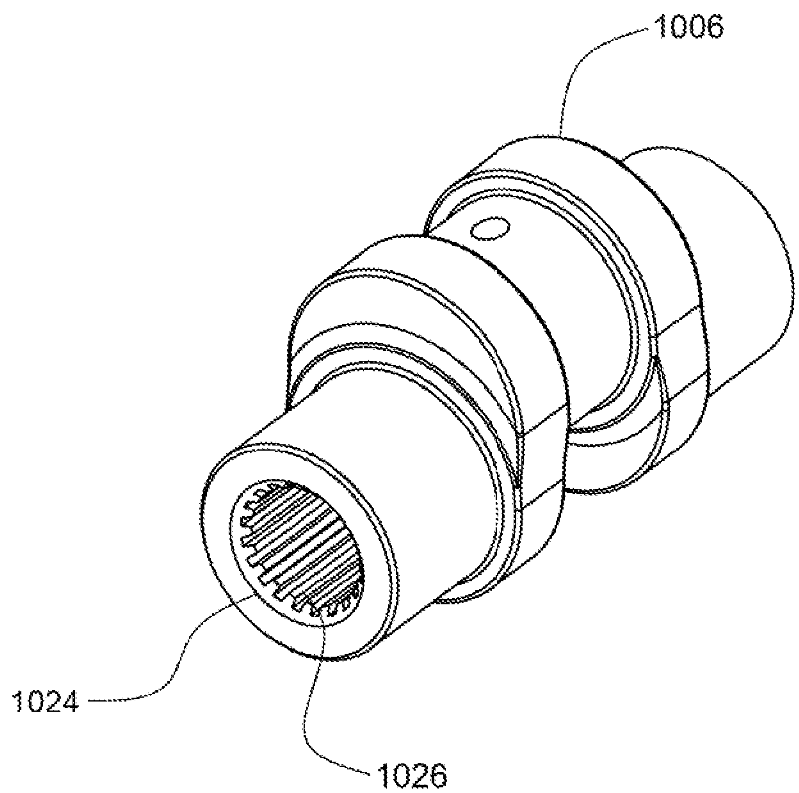
FIG. 10D shows a view of a crankshaft in accordance with one embodiment.

The exemplary embodiment of the motor/generator arrangement is shown in FIG. 10A. As shown in FIG. 10A, the motor/generator 1000 is positioned outboard from rocking beam drives 1010 and 1012 (shown as 810 and 812 in FIG. 8) and at an end of crankshaft 1006. The outboard position allows for a motor/generator 1000 with a larger length and diameter squared than the "pancake" motor/generator described above (shown as 900 in FIG. 9). As previously stated, the capacity of motor/generator 1000 is proportional to its length and diameter squared, and since outboard motor/generator 1000 may have a larger length and diameter squared, the outboard motor/generator 1000 configuration shown in FIG. 10A may allow for the use of a higher capacity motor/generator in conjunction with engine.

By placing motor/generator 1000 outboard of drives 1010 and 1012 as shown in the embodiment in FIG. 10A, motor/generator 1000 is not exposed to heat generated by the mechanical friction of drives 1010 and 1012. Also, the outboard position of motor/generator 1000 makes it easier to cool the motor/generator, thereby allowing for more mechanical engine cycles per a given amount of time, which in turn allows for higher overall engine performance.

Also, as motor/generator 1000 is positioned outside and not positioned between drives 1010 and 1012, rocking beam drives 1010 and 1012 may be placed closer together thereby allowing the pistons which are coupled to drives 1010 and 1012 to be placed in an equilateral arrangement. In some embodiments, depending on the burner type used, particularly in the case of a single burner embodiment, equilateral arrangement of pistons allows for higher efficiencies in burner and heater head thermodynamic operation, which in turn allows higher overall engine performance. Equilateral arrangement of pistons also advantageously allows for smaller heater head and combustion chamber dimensions.

Referring again to FIGS. 8 and 9, crankshaft 814 may have concentric ends 902 and 904, which in one embodiment are crank journals, and in various other embodiments, may be, but are not limited to, bearings. Each concentric end 902, 904 has a crankpin 816, 818 respectively, that may be offset from a crankshaft center axis. At least one counterweight 906 may be placed at either end of crankshaft 814 (shown as 1006 in FIG. 10A), to counterbalance any instability the crankshaft 814 may experience. This crankshaft configuration in combination with the rocking beam drive described above allows the pistons (shown as 802, 804, 806, and 808 in FIG. 8) to do work with one rotation of the crankshaft 814. This characteristic will be further explained below. In other embodiments, a flywheel (not shown) may be placed on crankshaft 814 (shown as 1006 in FIG. 10A) to decrease fluctuations of angular velocity for a more constant speed.

Still referring to FIGS. 8 and 9, in some embodiments, a cooler (not shown) may be also be positioned along the crankshaft 814 (shown as 1006 in FIG. 10A) and rocking beam drives 810 and 812 (shown as 1010 and 1012 in FIG. 10A) to cool the crankshaft 814 and rocking beam drives 810 and 812. In some embodiments, the cooler may be used to cool the working gas in a cold chamber of a cylinder and may also be configured to cool the rocking beam drive. Various embodiments of the cooler are discussed in detail below.

FIGS. 10A-10G depict some embodiments of various parts of the machine. As shown in this embodiment, crankshaft 1006 is coupled to motor/generator 1000 via a motor/generator coupling assembly. Since motor/generator 1000 is mounted to crankcase 1008, pressurization of crankcase with a charge fluid may result in crankcase deformation, which in turn may lead to misalignments between motor/generator 1000 and crankshaft 1006 and cause crankshaft 1006 to deflect. Because rocking beam drives 1010 and 1012 are coupled to crankshaft 1006, deflection of crankshaft 1006 may lead to failure of rocking beam drives 1010 and 1012. Thus, in one embodiment of the machine, a motor/generator coupling assembly is used to couple the motor/generator 1000 to crankshaft 1006. The motor/generator coupling assembly accommodates differences in alignment between motor/generator 1000 and crankshaft 1006 which may contribute to failure of rocking beam drives 1010 and 1012 during operation.

Still referring to FIGS. 10A-10G, in one embodiment, the motor/generator coupling assembly is a spline assembly that includes spline shaft 1004, sleeve rotor 1002 of motor/generator 1000, and crankshaft 1006. Spline shaft 1004 couples one end of crankshaft 1006 to sleeve rotor 1002. Sleeve rotor 1002 is attached to motor/generator 1000 by mechanical means, such as press fitting, welding, threading, or the like. In one embodiment, spline shaft 1004 includes a plurality of splines on both ends of the shaft. In other embodiments, spline shaft 1004 includes a middle spline less portion 1014, which has a diameter smaller than the outer diameter or inner diameter of splined portions 1016 and 1018. In still other embodiments, one end portion of the spline shaft 1016 has splines that extend for a longer distance along the shaft than a second end portion 1018 that also includes splines thereon.

In some embodiments, sleeve rotor 1002 includes an opening 1020 that extends along a longitudinal axis of sleeve rotor 1002. The opening 1020 is capable of receiving spline shaft 1004. In some embodiments, opening 1020 includes a plurality of inner splines 1022 capable of engaging the splines on one end of spline shaft 1004. The outer diameter 1028 of inner splines 1022 may be larger than the outer diameter 1030 of the splines on spline shaft 1004, such that the fit between inner splines 1022 and the splines on spline shaft 1004 is loose (as shown in FIG. 10E). A loose fit between inner splines 1022 and the splines on spline shaft 1004 contributes to maintain spline engagement between spline shaft 1004 and rotor sleeve 1002 during deflection of spline shaft 1004, which may be caused by crankcase pressurization. In other embodiments, longer splined portion 1016 of spline shaft 1004 may engage inner splines 1022 of rotor 1002.

Figure 10F:
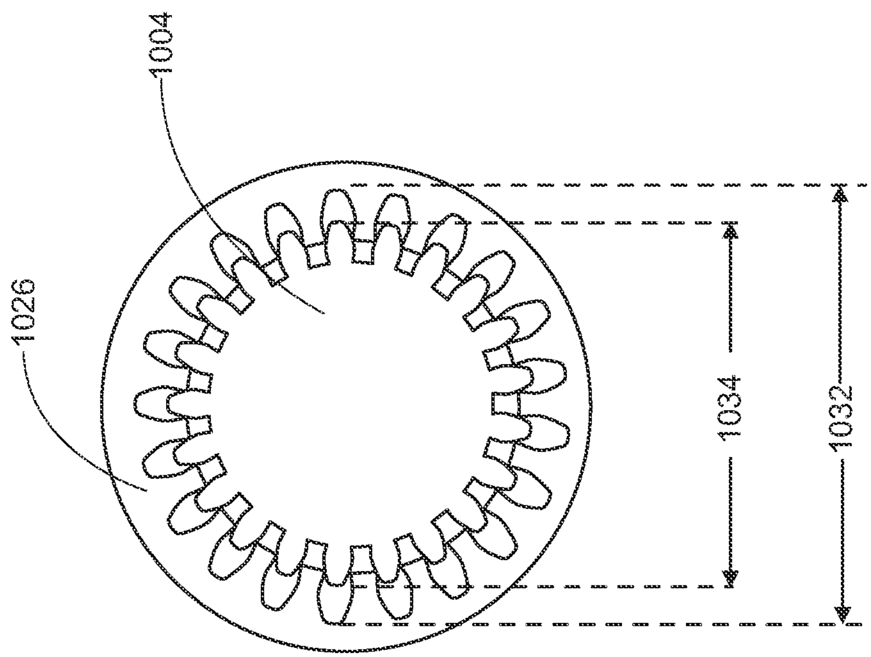
FIG. 10F is a cross section of the crankshaft and the spline shaft in accordance with one embodiment.
Figure 10E:
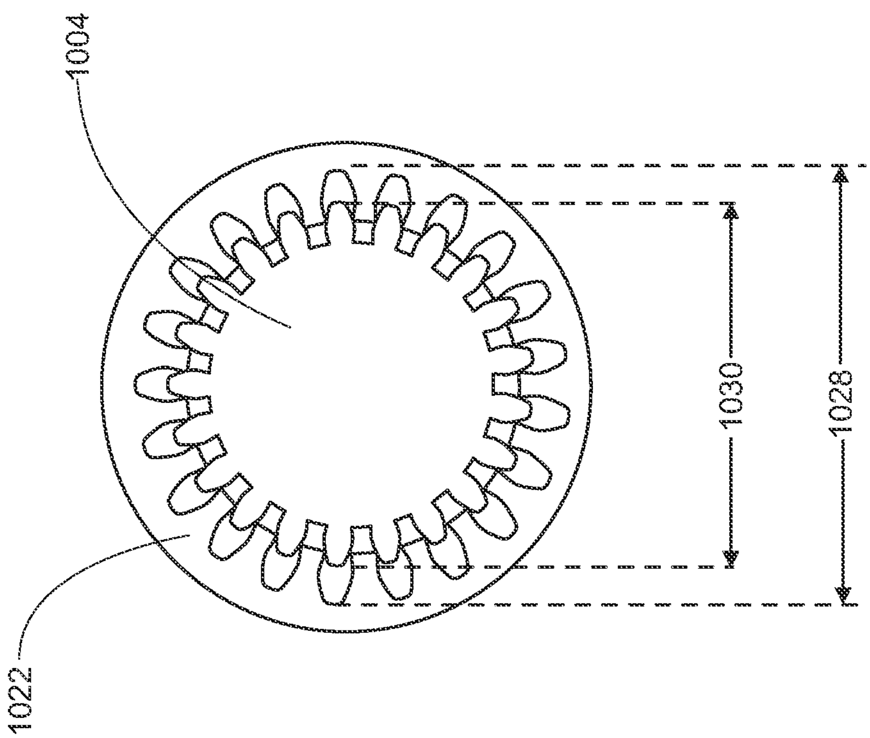
FIG. 10E is a cross section of the sleeve rotor and spline shaft in accordance with one embodiment.
Figure 10G:
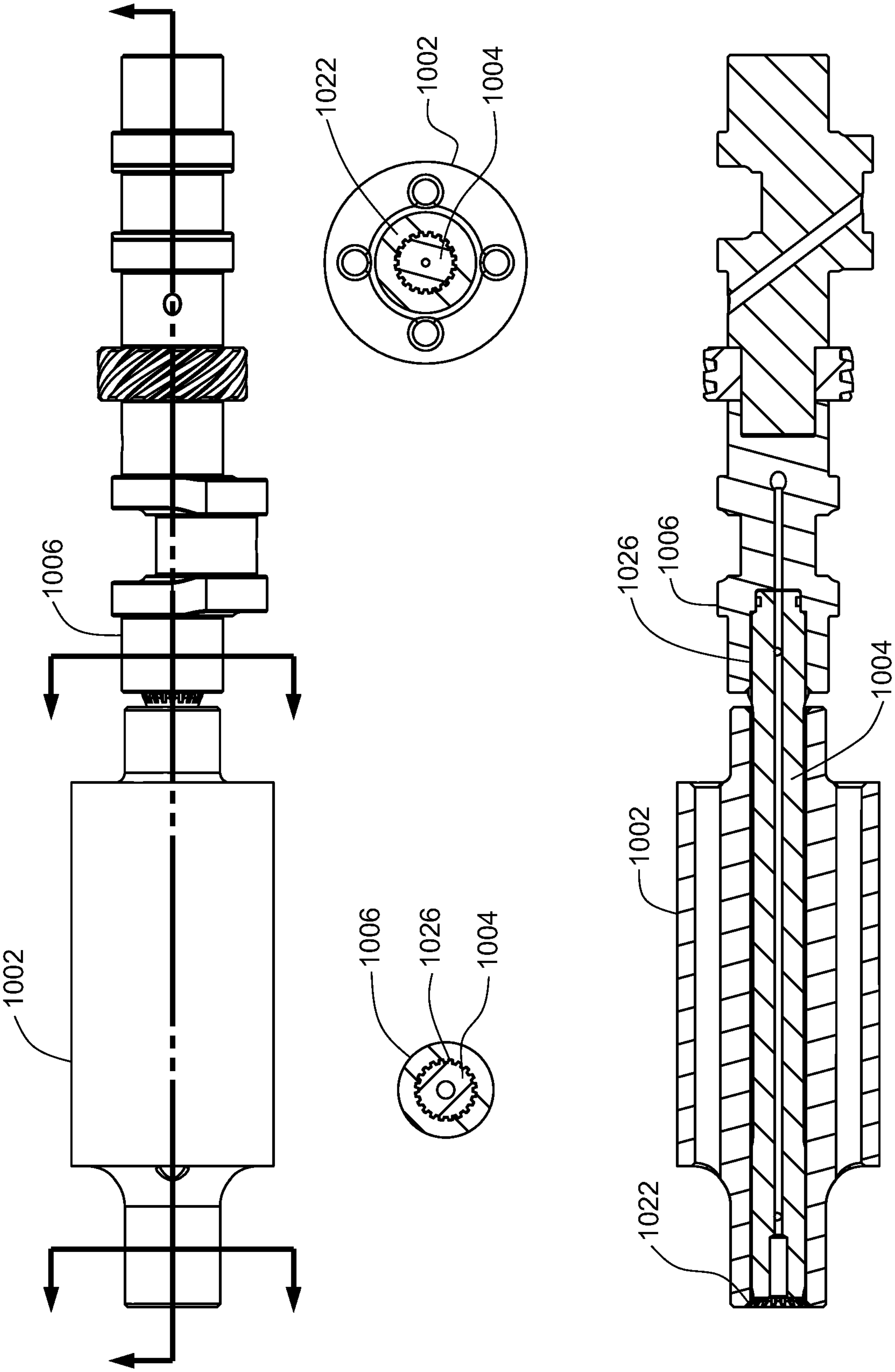
FIG. 10G are various views a sleeve rotor, crankshaft and spline shaft in accordance with one embodiment.

Still referring to FIGS. 10A-10G, in some embodiments, crankshaft 1006 has an opening 1024 on an end thereof, which is capable of receiving one end of spline shaft 1004. Opening 1024 preferably includes a plurality of inner splines 1026 that engage the splines on spline shaft 1004. The outer diameter 1032 of inner splines 1026 may be larger than the outer diameter 1034 of the splines on spline shaft 1004, such that the fit between inner splines 1026 and the splines on spline shaft 1004 is loose (as shown in FIG. 10F). As previously discussed, a loose fit between inner splines 1026 and the splines on spline shaft 1004 contributes to maintain spline engagement between spline shaft 1004 and crankshaft 1006 during deflection of spline shaft 1004, which may be caused by crankcase pressurization. The loose fit between the inner splines 1026 and 1022 on the crankshaft 1006 and the sleeve rotor 1002 and the splines on the spline shaft 1004 may contribute to maintain deflection of spline shaft 1004. This may allow misalignments between crankshaft 1006 and sleeve rotor 1002. In some embodiments, shorter splined portion 1018 of spline shaft 1004 may engage opening 1024 of crankshaft 1006 thus preventing these potential misalignments.

In some embodiments, opening 1020 of sleeve rotor 1002 includes a plurality of inner splines that extend the length of opening 1020. This arrangement contributes to spline shaft 1004 being properly inserted into opening 1020 during assembly. This contributes to proper alignment between the splines on spline shaft 1004 and the inner splines on sleeve rotor 1002 being maintained.

Figure 56A:
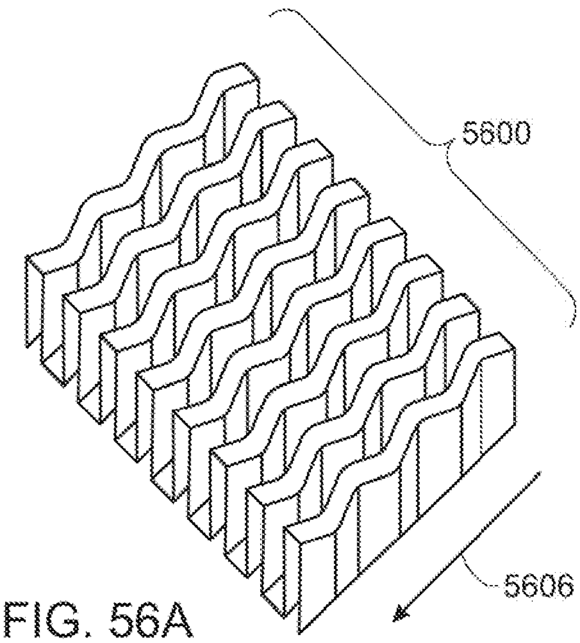
FIGS. 56A-56C show various configurations of a heat exchanger in accordance with various embodiments.
Figure 56B:
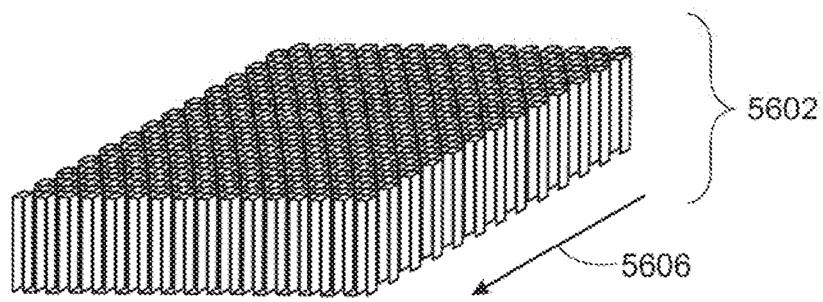
Figure 56C:
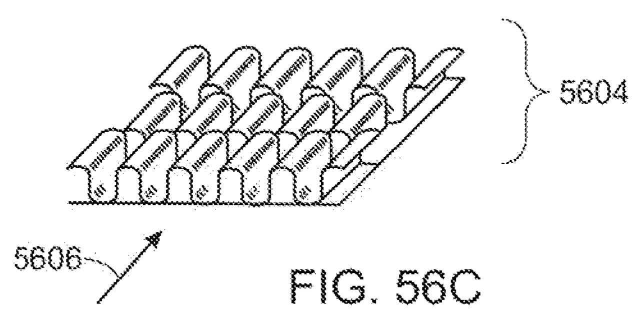

Referring now to FIG. 4, one embodiment of the engine is shown. Here the pistons 202 and 204 of engine 300 operate between a hot chamber 404 and a cold chamber 406 of cylinders 206 and 208 respectively. Between the two chambers there may be a regenerator 408. The regenerator 408 may have variable density, variable area, and, in some embodiments, is made of wire. The varying density and area of the regenerator may be adjusted such that the working gas has substantially uniform flow across the regenerator 408. Various embodiments of the regenerator 408 are discussed in detail below, and in U.S. Pat. No. 6,591,609, issued Jul. 17, 2003, to Kamen et al., and U.S. Pat. No. 6,862,883, issued Mar. 8, 2005, to Kamen et al., which are herein incorporated by reference in their entireties. When the working gas passes through the hot chamber 404, a heater head 410 may heat the gas causing the gas to expand and push pistons 202 and 204 towards the cold chamber 406, where the gas compresses. As the gas compresses in the cold chamber 406, pistons 202 and 204 may be guided back to the hot chamber to undergo the Stirling cycle again. The heater head 410 may be a pin head (as shown in FIGS. 52A through 53B), a fin head (as shown in FIGS. 56A through 56C), a folded fin head (as shown in FIGS. 56A through 56C), heater tubes as shown in FIG. 4 (also shown as 2904 in FIG. 29), or any other heater head embodiment known, including, but not limited to, those described below. Various embodiments of heater head 410 are discussed in detail below, and in U.S. Pat. No. 6,381,958, issued May 7, 2002, to Kamen et al., U.S. Pat. No. 6,543,215, issued Apr. 8, 2003, to Langenfeld et al., U.S. Pat. No. 6,966,182, issued Nov. 22, 2005, to Kamen et al, and U.S. Pat. No. 7,308,787, issued Dec. 18, 2007, to LaRocque et al., which are herein incorporated by reference in their entireties.

In some embodiments, a cooler 412 may be positioned alongside cylinders 206 and 208 to further cool the gas passing through to the cold chamber 406. Various embodiments of cooler 412 are discussed in detail in the proceeding sections, and in U.S. Pat. No. 7,325,399, issued Feb. 5, 2008, to Strimling et al, which is herein incorporated by reference in its entirety.

In some embodiments, at least one piston seal 414 may be positioned on pistons 202 and 204 to seal the hot section 404 off from the cold section 406. Additionally, at least one piston guide ring 416 may be positioned on pistons 202 and 204 to help guide the pistons' motion in their respective cylinders. Various embodiments of piston seal 414 and guide ring 416 are described in detail below, and in U.S. patent application Ser. No. 10/175,502, filed Jun. 19, 2002, published Feb. 6, 2003 (now abandoned), which is herein incorporated by reference in its entirety.

In some embodiments, at least one piston rod seal 418 may be placed against piston rods 224 and 228 to prevent working gas from escaping into the crankcase 400, or alternatively into airlock space 420. The piston rod seal 418 may be an elastomer seal, or a spring-loaded seal. Various embodiments of the piston rod seal 418 are discussed in detail below.

In some embodiments, the airlock space may be eliminated, for example, in the rolling diaphragm and/or bellows embodiments described in more detail below. In those cases, the piston rod seals 224 and 228 seal the working space from the crankcase.

In some embodiments, at least one rolling diaphragm/bellows 422 may be located along piston rods 224 and 228 to prevent airlock gas from escaping into the crankcase 400. Various embodiments of rolling diaphragm 422 are discussed in more detail below.

Although FIG. 4 shows a cross section of engine 300 depicting only two pistons and one rocking beam drive, it is to be understood that the principles of operation described herein may apply to a four cylinder, double rocking beam drive engine, as designated generally by numeral 800 in FIG. 8.

Piston Operation

Figure 11:
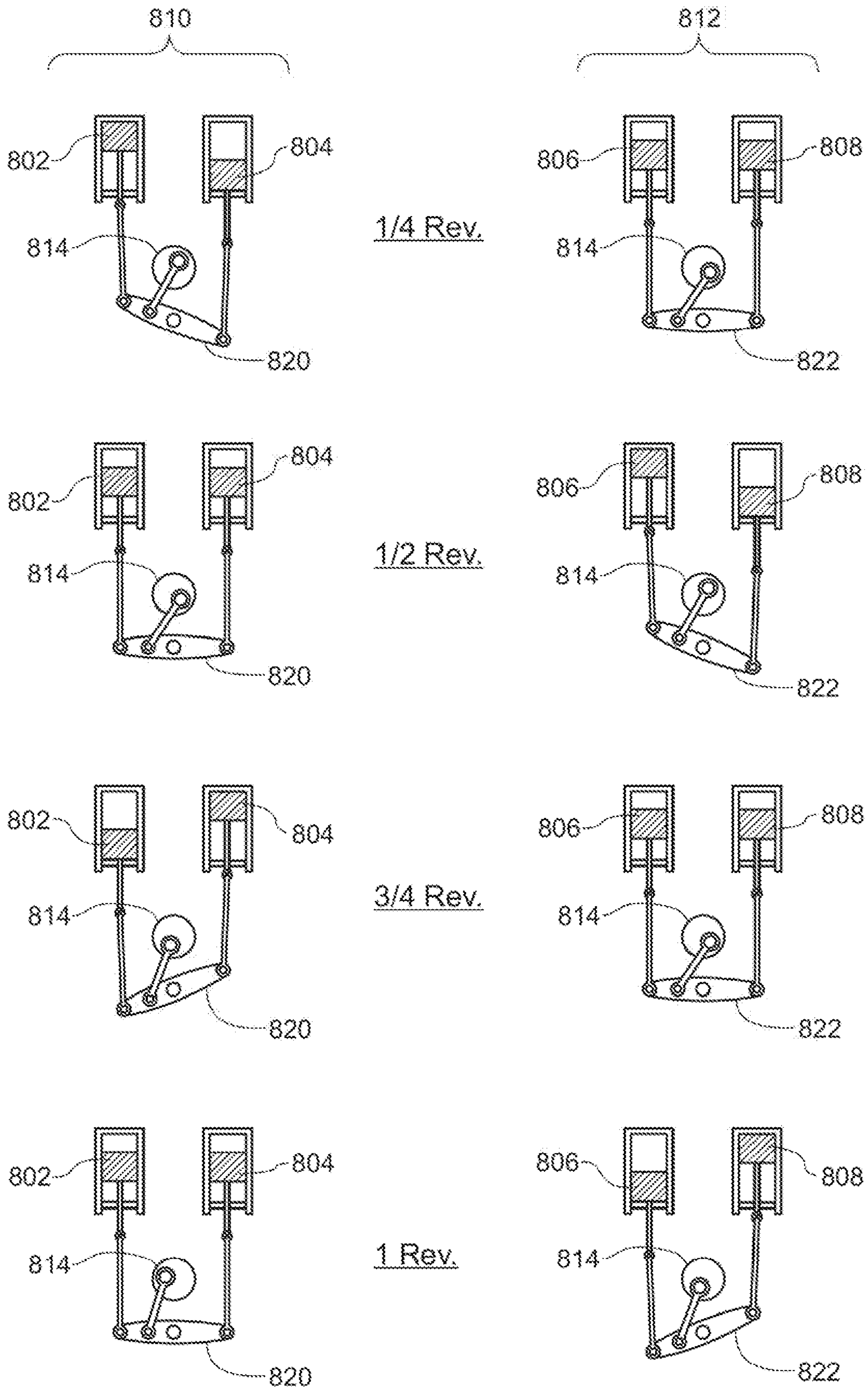
FIG. 11 shows the operation of pistons of an engine in accordance with one embodiment.
Figure 12A:
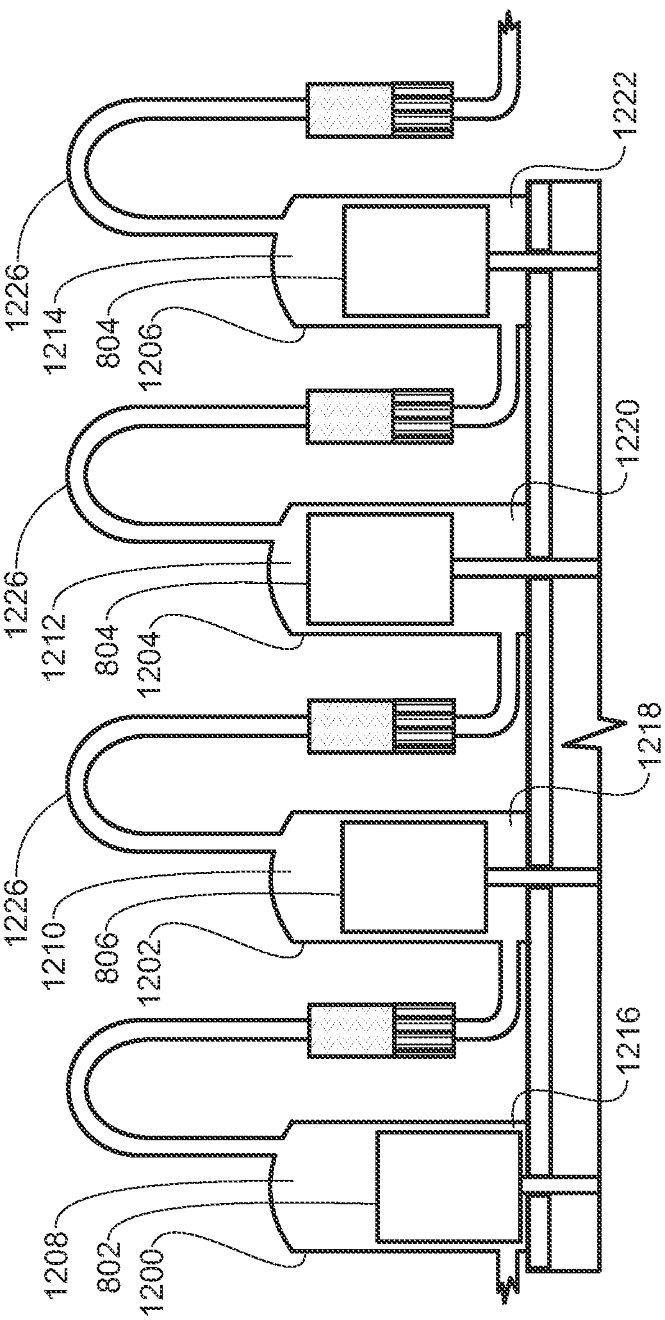
FIG. 12A shows an unwrapped schematic view of a working space and cylinders in accordance with one embodiment.

Referring now to FIGS. 8 and 11, FIG. 11 shows the operation of pistons 802, 804, 806, and 808 during one revolution of crankshaft 814. With a ¼ revolution of crankshaft 814, piston 802 is at the top of its cylinder, otherwise known as top dead center, piston 806 is in upward mid-stroke, piston 804 is at the bottom of its cylinder, otherwise known as bottom dead center, and piston 808 is in downward mid-stroke. With ½ revolution of crankshaft 814, piston 802 is in downward mid-stroke, piston 806 is at top dead center, piston 804 is in upward mid-stroke, and piston 808 is at bottom dead center. With ¾ revolution of crankshaft 814, piston 802 is at bottom dead center, piston 806 is in downward mid-stroke, piston 804 is at top dead center, and piston 808 is in upward midstroke. Finally, with a full revolution of crankshaft 814, piston 802 is in upward midstroke, piston 806 is at bottom dead center, piston 804 is in downward mid-stroke, and piston 808 is at top dead center. During each ¼ revolution, there is a 90 degree phase difference between pistons 802 and 806, a 180 degree phase difference between pistons 802 and 804, and a 270 degree phase difference between pistons 802 and 808. FIG. 12A illustrates the relationship of the pistons being approximately 90 degrees out of phase with the preceding and succeeding piston. Additionally, FIG. 11 shows the exemplary embodiment machine means of transferring work. Thus, work is transferred from piston 802 to piston 806 to piston 804 to piston 808 so that with a full revolution of crankshaft 814, all pistons have exerted work by moving from the top to the bottom of their respective cylinders.

Figure 12B:
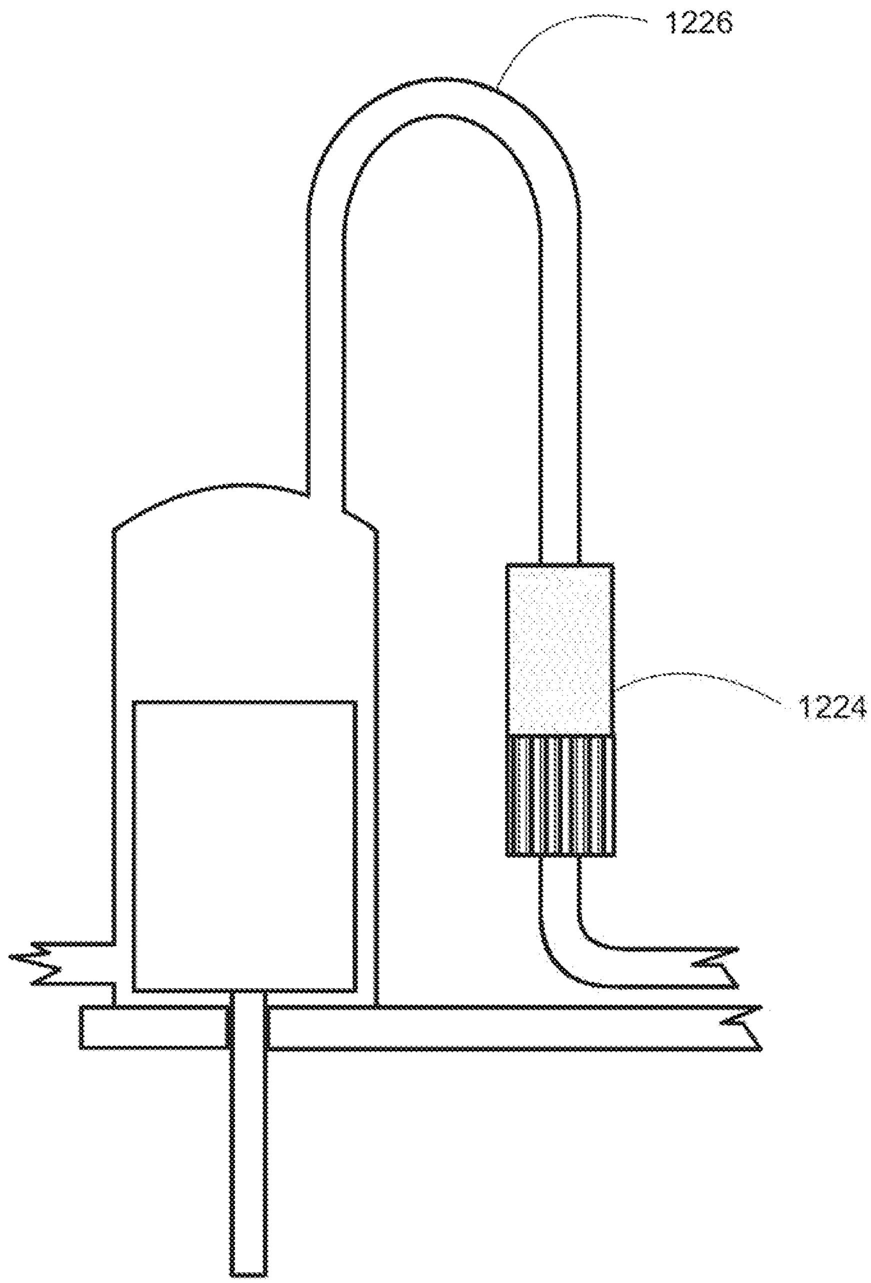
FIG. 12B shows a schematic view of a cylinder, heater head, and regenerator in accordance with one embodiment.
Figure 12C:
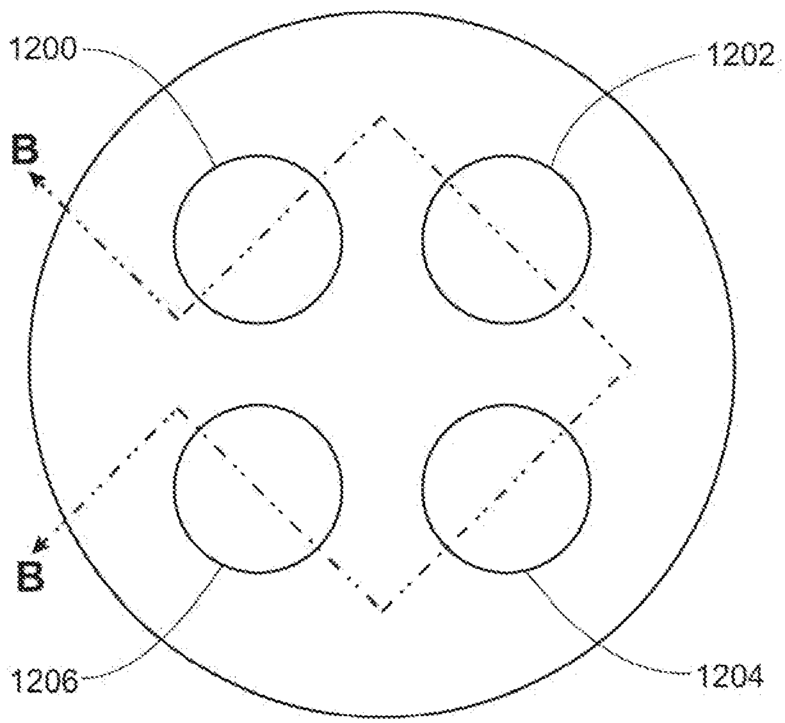
FIG. 12C shows a view of a cylinder head in accordance with one embodiment.

Referring now to FIG. 11, together with FIGS. 12A-12C, illustrate the 90 degree phase difference between the pistons in the exemplary embodiment. Referring now to FIG. 12A, although the cylinders are shown in a linear path, this is for illustration purposes only. In the exemplary embodiment of a four cylinder Stirling cycle machine, the flow path of the working gas contained within the cylinder working space follows a figure eight pattern. Thus, the working spaces of cylinders 1200, 1202, 1204, and 1206 are connected in a figure eight pattern, for example, from cylinder 1200 to cylinder 1202 to cylinder 1204 to cylinder 1208, the fluid flow pattern follows a figure eight. Still referring to FIG. 12A, an unwrapped view of cylinders 1200, 1202, 1204, and 1206, taken along the line B-B (shown in FIG. 12C) is illustrated. The 90 degree phase difference between pistons as described above allows for the working gas in the warm section 1212 of cylinder 1204 to be delivered to the cold section 1222 of cylinder 1206. As piston 802 and 808 are 90 degrees out of phase, the working gas in the warm section 1214 of cylinder 1206 is delivered to the cold section 1216 of cylinder 1200. As piston 802 and piston 806 are also 90 degrees out of phase, the working gas in the warm section 1208 of cylinder 1200 is delivered to the cold section 1218 of cylinder 1202. And as piston 804 and piston 806 are also 90 degrees out of phase, so the working gas in the warm section 1210 of cylinder 1202 is delivered to the cold section 1220 of cylinder 1204. Once the working gas of a warm section of a first cylinder enters the cold section of a second cylinder, the working gas begins to compress, and the piston within the second cylinder, in its down stroke, thereafter forces the compressed working gas back through a regenerator 1224 and heater head 1226 (shown in FIG. 12B), and back into the warm section of the first cylinder. Once inside the warm section of the first cylinder, the gas expands and drives the piston within that cylinder downward, thus causing the working gas within the cold section of that first cylinder to be driven through the preceding regenerator and heater head, and into the cylinder. This cyclic transmigration characteristic of working gas between cylinders 1200, 1202, 1204, and 1206 is possible because pistons 802, 804, 806, and 808 are connected, via drives 810 and 812, to a common crankshaft 814 (shown in FIG. 11), in such a way that the cyclical movement of each piston is approximately 90 degrees in advance of the movement of the proceeding piston, as depicted in FIG. 12A.

Rolling Diaphragm, Metal Bellows, Airlock, and Pressure Regulator

In some embodiments of the Stirling cycle machine, lubricating fluid is used. To prevent the lubricating fluid from escaping the crankcase, a seal is used.

Figure 13A:
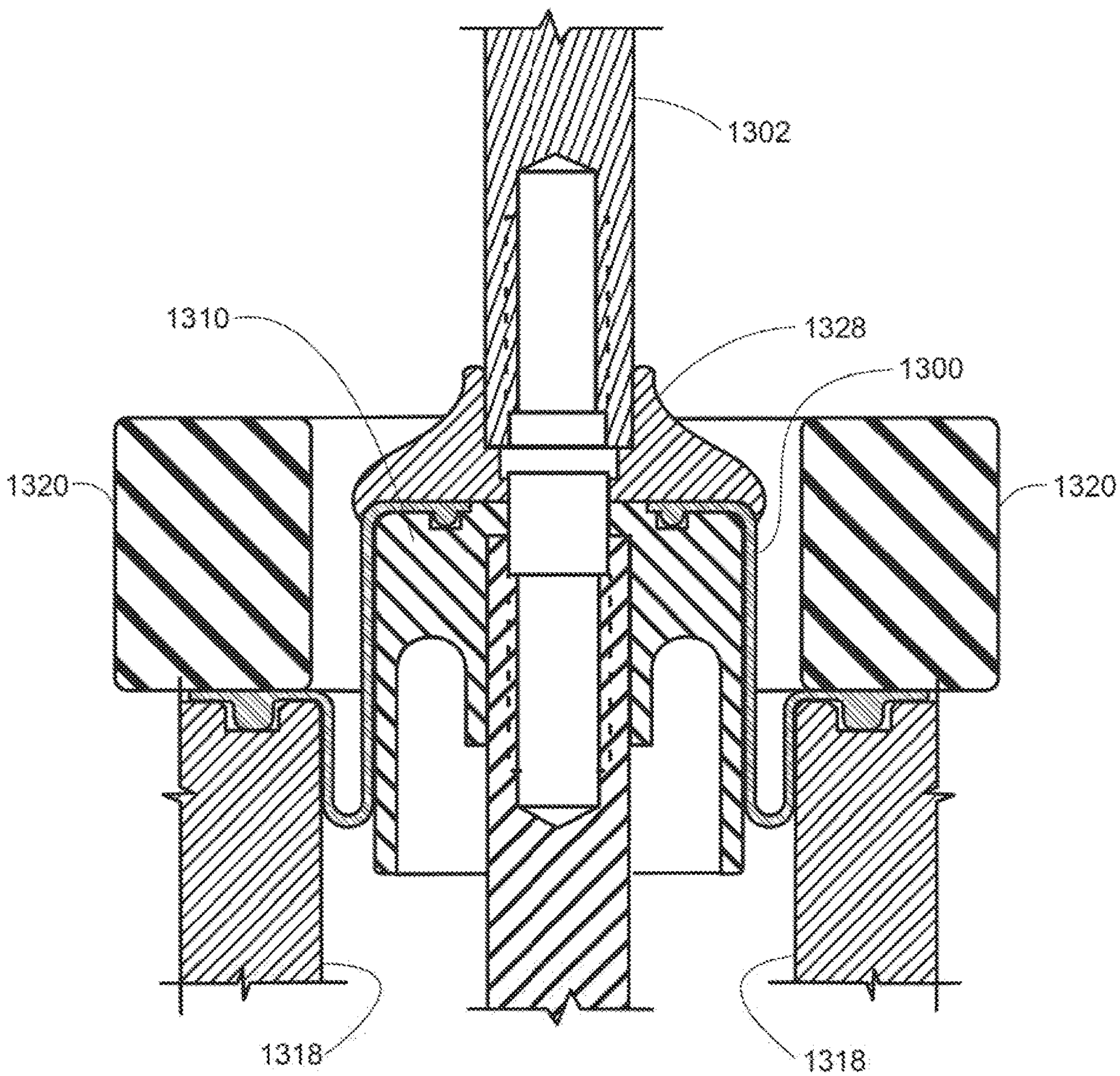
FIG. 13A shows a view of a rolling diaphragm, along with supporting top seal piston and bottom seal piston, in accordance with one embodiment.
Figure 13B:
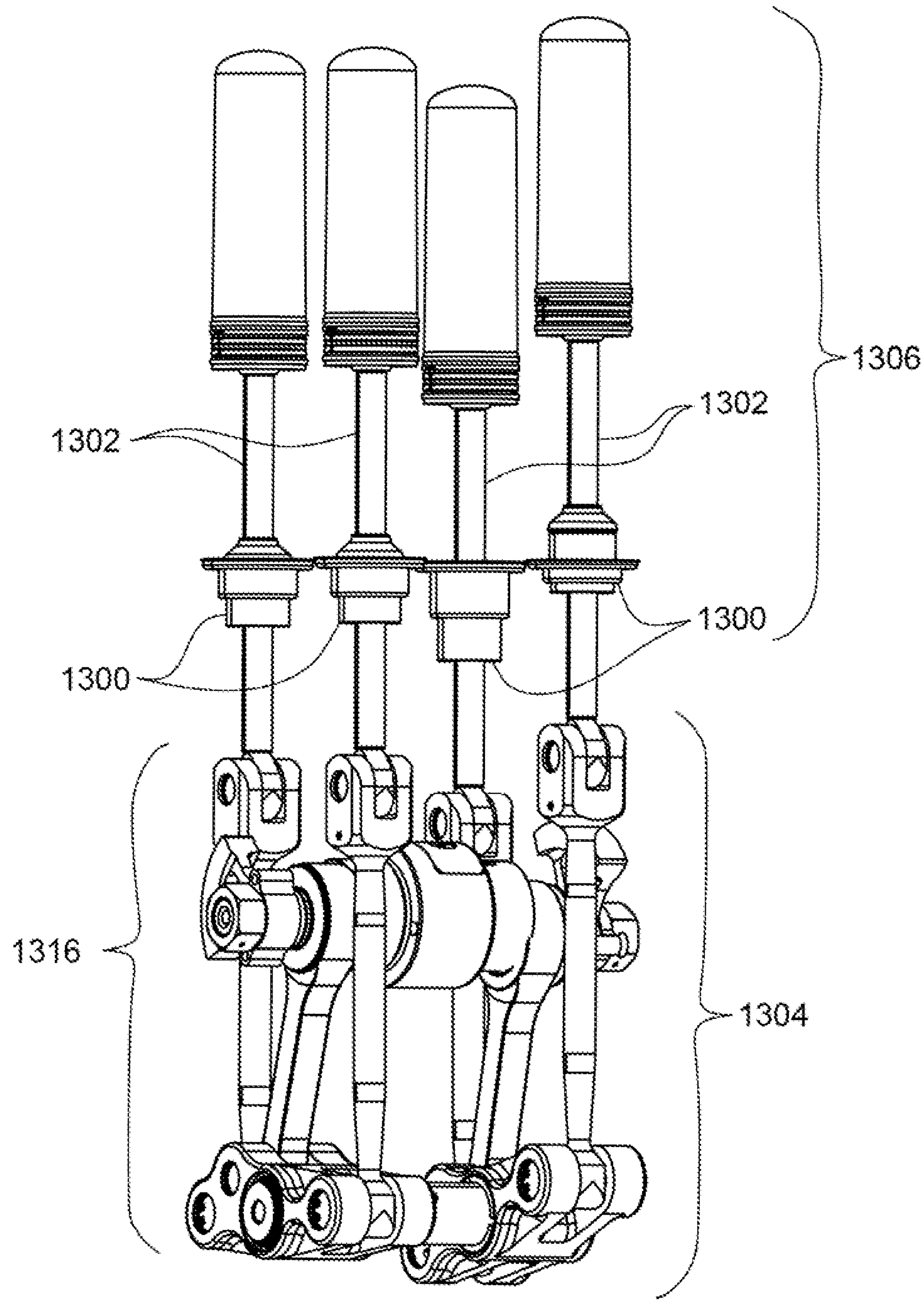
FIG. 13B shows an exploded view of a rocking beam driven engine in accordance with one embodiment.

Referring now to FIGS. 13A-15, some embodiments of the Stirling cycle machine include a fluid lubricated rocking beam drive that utilizes a rolling diaphragm 1300 positioned along the piston rod 1302 to prevent lubricating fluid from escaping the crankcase, not shown, but the components that are housed in the crankcase are represented as 1304, and entering areas of the engine that may be damaged by the lubricating fluid. It is beneficial to contain the lubricating fluid for if lubricating fluid enters the working space, not shown, but the components that are housed in the working space are represented as 1306, it would contaminate the working fluid, come into contact with the regenerator 1308, and may clog the regenerator 1308. The rolling diaphragm 1300 may be made of an elastomer material, such as rubber or rubber reinforced with woven fabric or non-woven fabric to provide rigidity. The rolling diaphragm 1300 may alternatively be made of other materials, such as fluorosilicone or nitrile with woven fabric or non-woven fabric. The rolling diaphragm 1300 may also be made of carbon nanotubes or chopped fabric, which is non-woven fabric with fibers of polyester or KEVLAR®, for example, dispersed in an elastomer. In the some embodiments, the rolling diaphragm 1300 is supported by the top seal piston 1328 and the bottom seal piston 1310. In other embodiments, the rolling diaphragm 1300 as shown in FIG. 13A is supported via notches in the top seal piston 1328.

In some embodiments, a pressure differential is placed across the rolling diaphragm 1300 such that the pressure above the seal 1300 is different from the pressure in the crankcase 1304. This pressure differential inflates seal 1300 and allows seal 1300 to act as a dynamic seal as the pressure differential ensures that rolling diaphragm maintains its form throughout operation. FIG. 13A, and FIGS. 13C-13H illustrate how the pressure differential effects the rolling diaphragm. The pressure differential causes the rolling diaphragm 1300 to conform to the shape of the bottom seal piston 1310 as it moves with the piston rod 1302, and prevents separation of the seal 1300 from a surface of the piston 1310 during operation. Such separation may cause seal failure. The pressure differential causes the rolling diaphragm 1300 to maintain constant contact with the bottom seal piston 1310 as it moves with the piston rod 1302. This occurs because one side of the seal 1300 will always have pressure exerted on it thereby inflating the seal 1300 to conform to the surface of the bottom seal piston 1310. In some embodiments, the top seal piston 1328 'rolls over' the corners of the rolling diaphragm 1300 that are in contact with the bottom seal piston 1310, so as to further maintain the seal 1300 in contact with the bottom seal piston 1310. In the exemplary embodiment, the pressure differential is in the range of 10 to 15 PSI. The smaller pressure in the pressure differential is preferably in crankcase 1304, so that the rolling diaphragm 1300 may be inflated into the crankcase 1304. However, in other embodiments, the pressure differential may have a greater or smaller range of value.

The pressure differential may be created by various methods including, but not limited to, the use of the following: a pressurized lubrication system, a pneumatic pump, sensors, an electric pump, by oscillating the rocking beam to create a pressure rise in the crankcase 1304, by creating an electrostatic charge on the rolling diaphragm 1300, or other similar methods. In some embodiments, the pressure differential is created by pressurizing the crankcase 1304 to a pressure that is below the mean pressure of the working space 1306. In some embodiments the crankcase 1304 is pressurized to a pressure in the range of 10 to 15 PSI below the mean pressure of the working space 1306, however, in various other embodiments, the pressure differential may be smaller or greater. Further detail regarding the rolling diaphragm is included below.

Figure 13C:
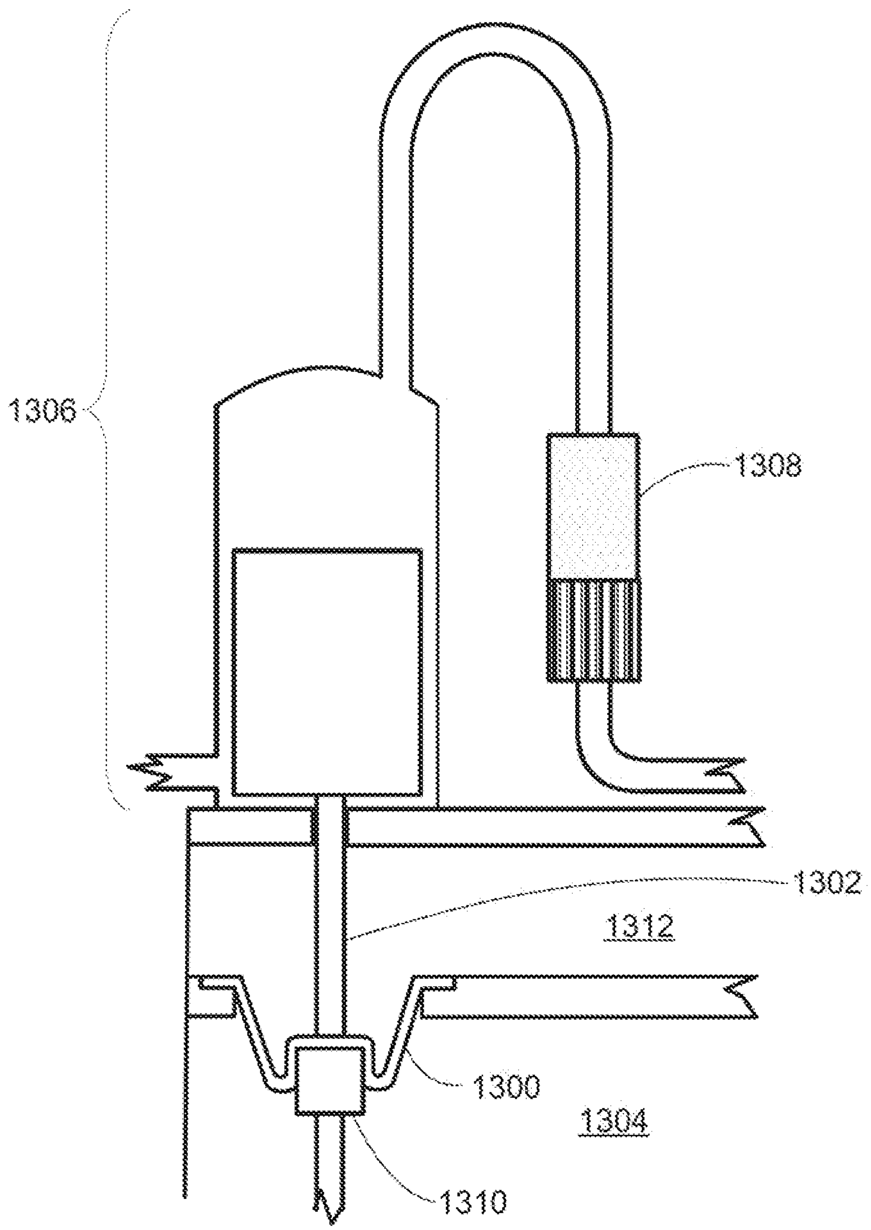
FIG. 13C shows a view of a cylinder, heater head, regenerator, and rolling diaphragm, in accordance with one embodiment.
Figure 13D:
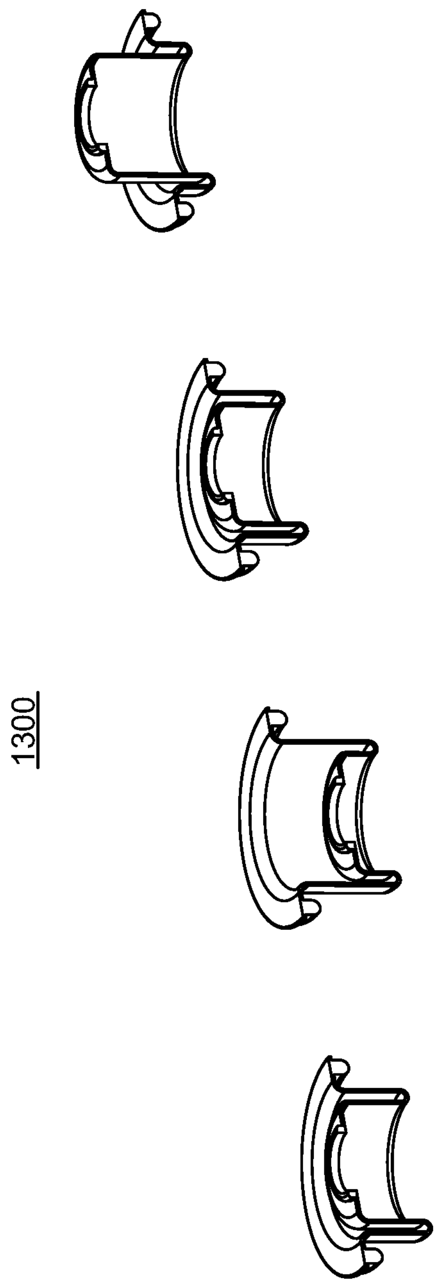
FIGS. 13D-13E show various views of a rolling diaphragm during operation, in accordance with one embodiment.
Figure 13E:
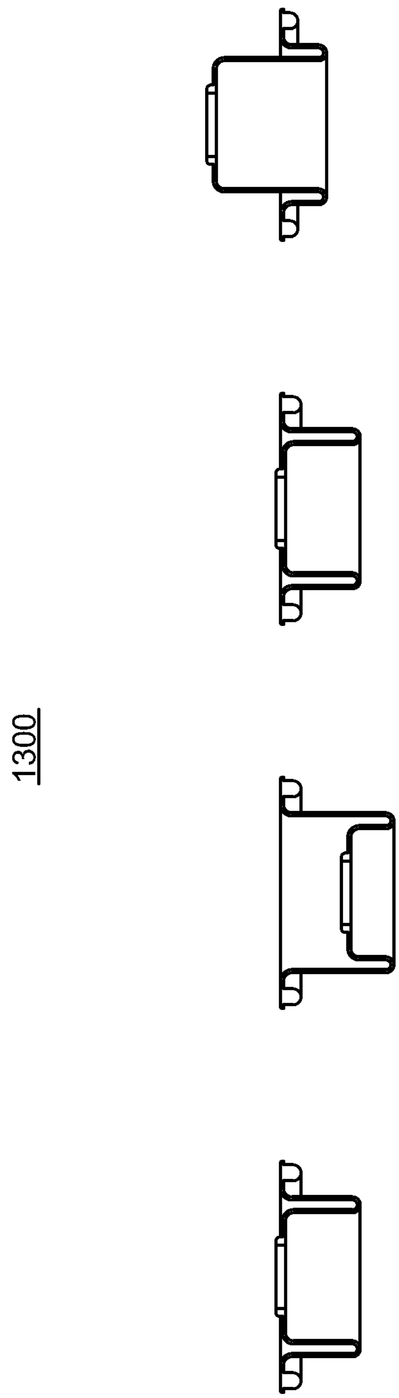
Figure 13F:
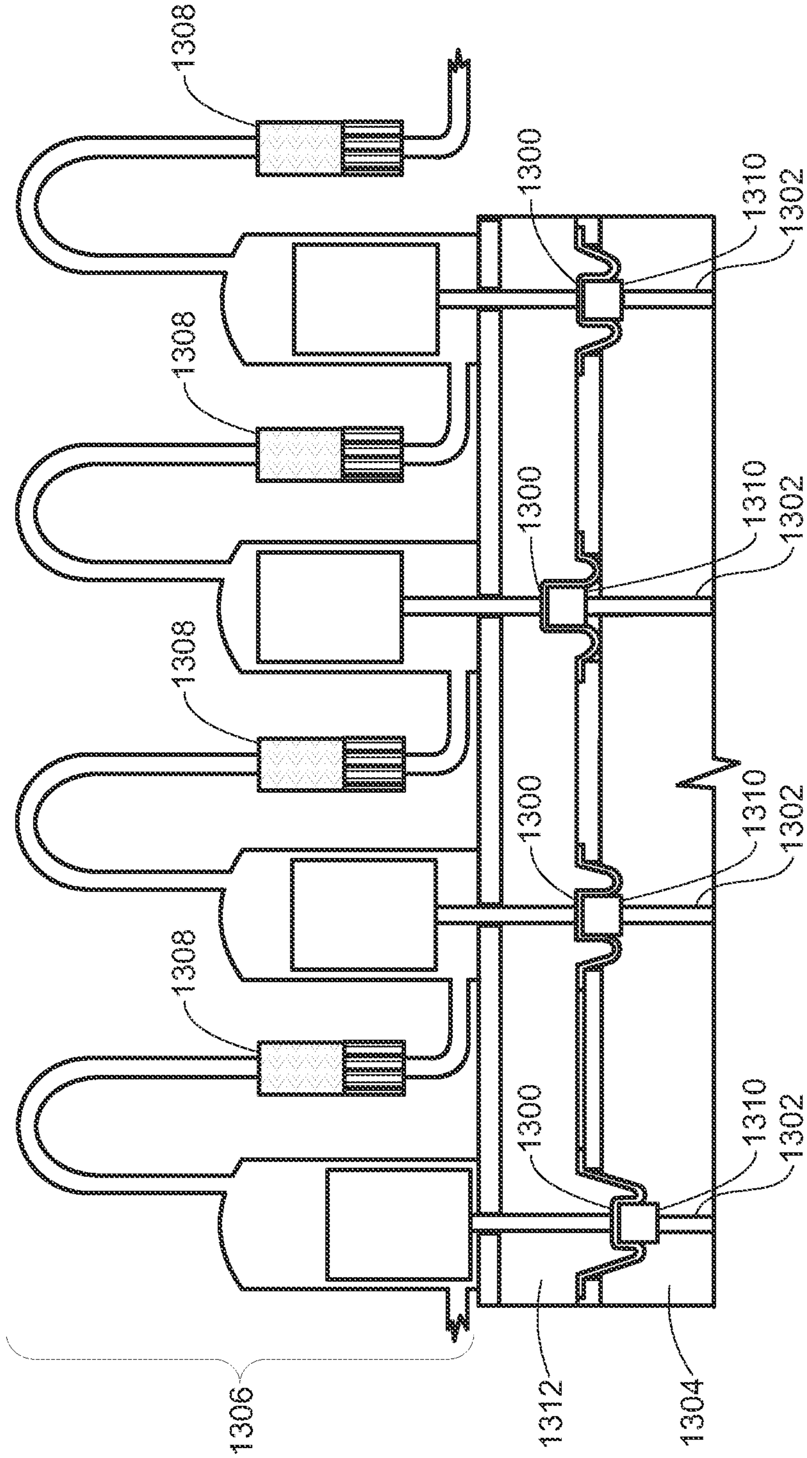
FIG. 13F shows an unwrapped schematic view of a working space and cylinders in accordance with one embodiment.
Figure 13G:
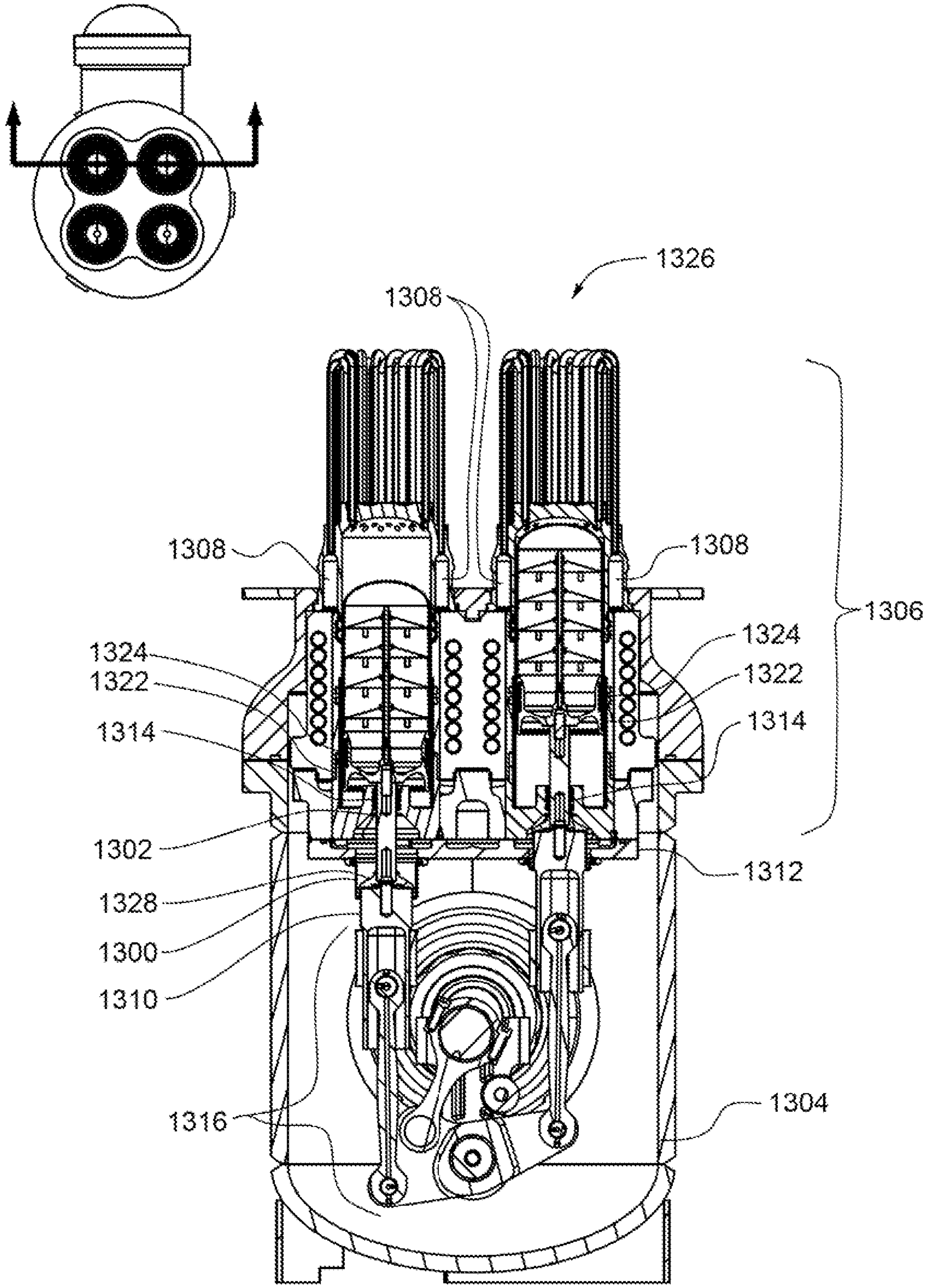
FIG. 13G shows a view of an external combustion engine in accordance with one.

Referring now to FIGS. 13C, 13G, and 13H, however, another embodiment of the Stirling machine is shown, wherein airlock space 1312 is located between working space 1306 and crankcase 1304. Airlock space 1312 maintains a constant volume and pressure necessary to create the pressure differential necessary for the function of rolling diaphragm 1300 as described above. In one embodiment, airlock 1312 is not absolutely sealed off from working space 1306, so the pressure of airlock 1312 is equal to the mean pressure of working space 1306. Thus, in some embodiments, the lack of an effective seal between the working space and the crankcase contributes to the need for an airlock space. Thus, the airlock space, in some embodiments, may be eliminated by a more efficient and effective seal.

During operation, the working space 1306 mean pressure may vary so as to cause airlock 1312 mean pressure to vary as well. One reason the pressure may tend to vary is that during operation the working space may get hotter, which in turn may increase the pressure in the working space, and consequently in the airlock as well since the airlock and working space are in fluid communication. In such a case, the pressure differential between airlock 1312 and crankcase 1304 will also vary, thereby causing unnecessary stresses in rolling diaphragms 1300 that may lead to seal failure. Therefore, some embodiments of the machine, the mean pressure within airlock 1312 is regulated so as to maintain a constant desired pressure differential between airlock 1312 and crankcase 1304, and ensuring that rolling diaphragms 1300 stay inflated and maintains their form. In some embodiments, a pressure transducer is used to monitor and manage the pressure differential between the airlock and the crankcase, and regulate the pressure accordingly so as to maintain a constant pressure differential between the airlock and the crankcase. Various embodiments of the pressure regulator that may be used are described in further detail below, and in U.S. Pat. No. 7,310,945, issued Dec. 25, 2007, to Gurski et al., which is herein incorporated by reference in its entirety.

A constant pressure differential between the airlock 1312 and crankcase 1304 may be achieved by adding or removing working fluid from airlock 1312 via a pump or a release valve. Alternatively, a constant pressure differential between airlock 1312 and crankcase 1304 may be achieved by adding or removing working fluid from crankcase 1304 via a pump or a release valve. The pump and release valve may be controlled by the pressure regulator. Working fluid may be added to airlock 1312 (or crankcase 1304) from a separate source, such as a working fluid container, or may be transferred over from crankcase 1304. Should working fluid be transferred from crankcase 1304 to airlock 1312, it may be desirable to filter the working fluid before passing it into airlock 1312 so as to prevent any lubricant from passing from crankcase 1304 into airlock 1312, and ultimately into working space 1306, as this may result in engine failure.

In some embodiments of the machine, crankcase 1304 may be charged with a fluid having different thermal properties than the working fluid. For example, where the working gas is helium or hydrogen, the crankcase may be charged with argon. Thus, the crankcase is pressurized. In some embodiments, helium is used, but in other embodiments, any inert gas, as described herein, may be used. Thus, the crankcase is a wet pressurized crankcase in the exemplary embodiment. In other embodiments where a lubricating fluid is not used, the crankcase is not wet.

In the exemplary embodiments, rolling diaphragms 1300 do not allow gas or liquid to pass through them, which allows working space 1306 to remain dry and crankcase 1304 to be wet sumped with a lubricating fluid. Allowing a wet sump crankcase 1304 increases the efficiency and life of the engine as there is less friction in rocking beam drives 1316. In some embodiments, the use of roller bearings or ball bearings in drives 1316 may also be eliminated with the use of lubricating fluid and rolling diaphragms 1300. This may further reduce engine noise and increase engine life and efficiency.

FIGS. 14A-14E show cross sections of various embodiments of the rolling diaphragm (shown as 1400, 1410, 1412, 1422 and 1424) configured to be mounted between top seal piston and bottom seal piston (shown as 1328 and 1310 in FIGS. 13A and 13H), and between a top mounting surface and a bottom mounting surface (shown as 1320 and 1318 in FIG. 13A). In some embodiments, the top mounting surface may be the surface of an airlock or working space, and the bottom mounting surface may be the surface of a crankcase.

Figure 14A:
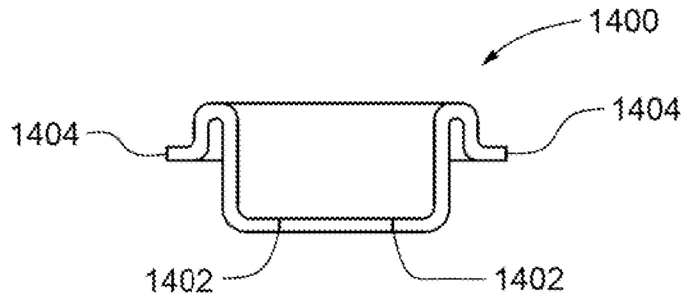
FIGS. 14A-14E show views of various embodiments of a rolling diaphragm.
Figure 14B:
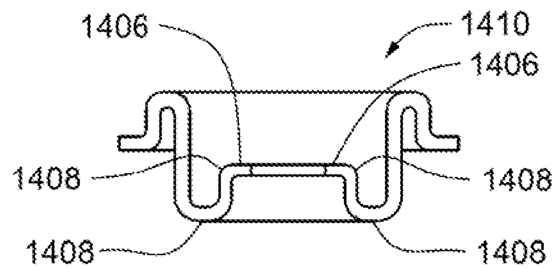
Figure 14C:
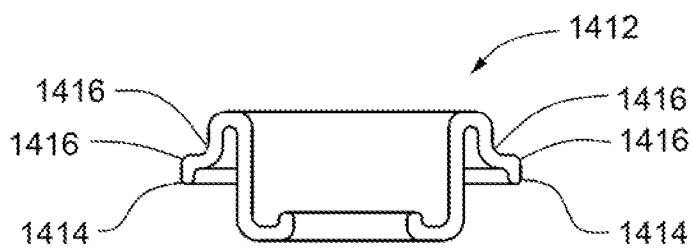

FIG. 14A shows one embodiment of the rolling diaphragm 1400, where the rolling diaphragm 1400 includes a flat inner end 1402 that may be positioned between a top seal piston and a bottom seal piston, so as to form a seal between the top seal piston and the bottom seal piston. The rolling diaphragm 1400 also includes a flat outer end 1404 that may be positioned between a top mounting surface and a bottom mounting surface, so as to form a seal between the top mounting surface and the bottom mounting surface. FIG. 14B shows another embodiment of the rolling diaphragm, wherein rolling diaphragm 1410 may include a plurality of bends 1408 leading up to flat inner end 1406 to provide for additional support and sealing contact between the top seal piston and the bottom seal piston. FIG. 14C shows another embodiment of the rolling diaphragm, wherein rolling diaphragm 1412 includes a plurality of bends 1416 leading up to flat outer end 1414 to provide for additional support and sealing contact between the top mounting surface and the bottom mounting surface.

Figure 14D:
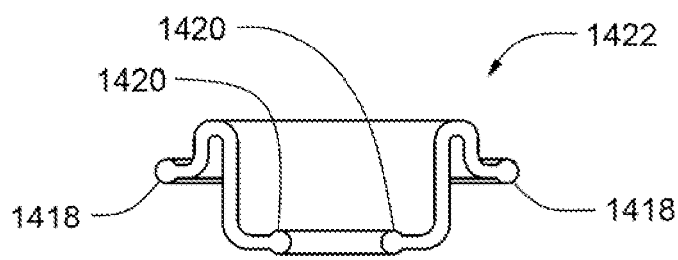
Figure 14E:
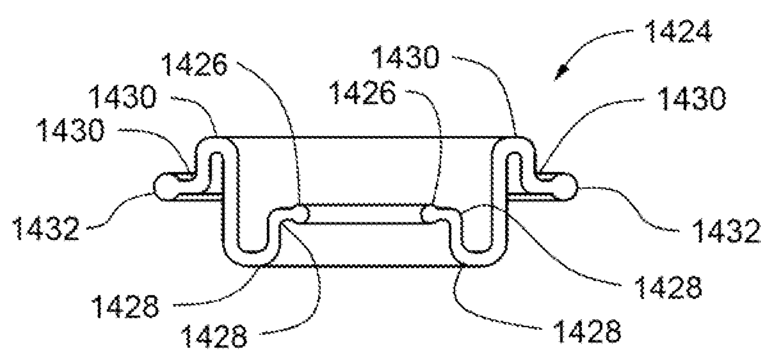

FIG. 14D shows another embodiment of the rolling diaphragm where rolling diaphragm 1422 includes a bead along an inner end 1420 thereof, so as to form an 'o-ring' type seal between a top seal piston and a bottom seal piston, and a bead along an outer end 1418 thereof, so as to form an 'o-ring' type seal between a bottom mounting surface and a top mounting surface. FIG. 14E shows another embodiment of the rolling diaphragm, wherein rolling diaphragm 1424 includes a plurality of bends 1428 leading up to beaded inner end 1426 to provide for additional support and sealing contact between the top seal piston and the bottom seal piston. Rolling diaphragm 1424 may also include a plurality of bends 1430 leading up to beaded outer end 1432 to provide for additional support and sealing contact between the top seal piston and the bottom seal piston.

Although FIGS. 14A through 14E depict various embodiments of the rolling diaphragm, it is to be understood that rolling diaphragms may be held in place by any other mechanical means known in the art.

Referring now to FIG. 15A, a cross section shows one embodiment of the rolling diaphragm embodiment. A metal bellows 1500 is positioned along a piston rod 1502 to seal off a crankcase (shown as 1304 in FIG. 13G) from a working space or airlock (shown as 1306 and 1312 in FIG. 13G). Metal bellows 1500 may be attached to a top seal piston 1504 and a stationary mounting surface 1506. Alternatively, metal bellows 1500 may be attached to a bottom seal piston (not shown), and a top stationary mounting surface. In one embodiment the bottom stationary mounting surface may be a crankcase surface or an inner airlock or working space surface, and the top stationary mounting surface may be an inner crankcase surface, or an outer airlock or working space surface. Metal bellows 1500 may be attached by welding, brazing, or any mechanical means known in the art.

Figure 15E:
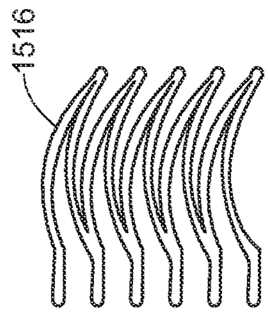
FIGS. 15E-15G show a view of metal bellows in accordance with various embodiments.
Figure 15F:
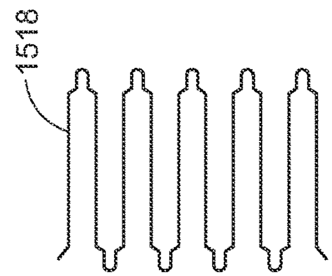
Figure 15G:
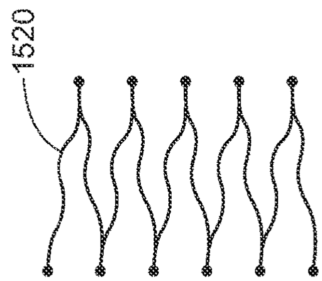
Figure 15B:
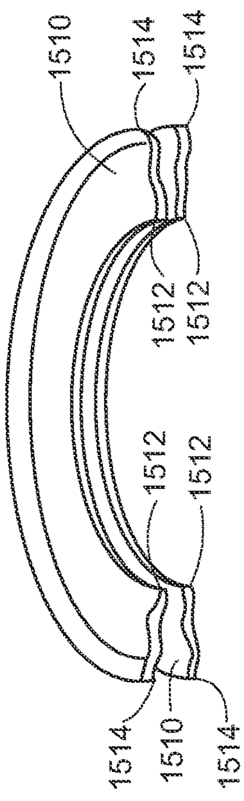
FIGS. 15B-15D show views of metal bellows diaphragms, in accordance with one embodiment.
Figure 15C:
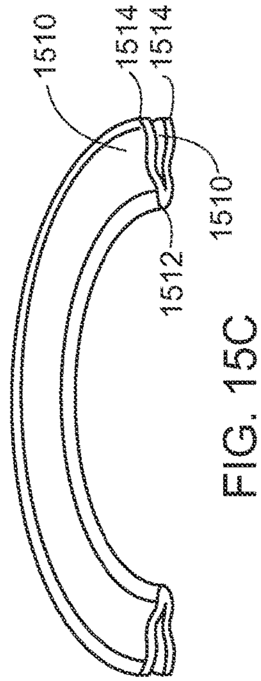
Figure 15D:
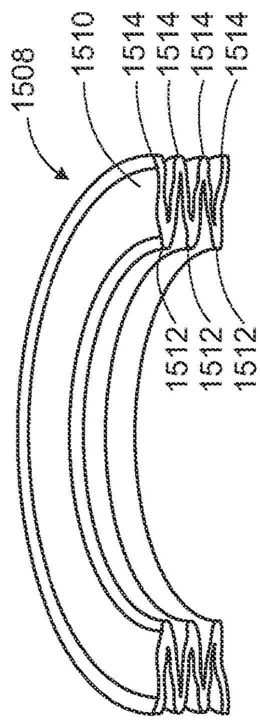

FIGS. 15B-15G depict a perspective cross sectional view of various embodiments of the metal bellows, wherein the metal bellows is a welded metal bellows 1508. In some embodiments of the metal bellows, the metal bellows is preferably a micro-welded metal bellows. In some embodiments, the welded metal bellows 1508 includes a plurality of diaphragms 1510, which are welded to each other at either an inner end 1512 or an outer end 1514, as shown in FIGS. 15C and 15D. In some embodiments, diaphragms 1510 may be crescent shaped 1516, flat 1518, rippled 1520, or any other shape known in the art.

Additionally, the metal bellows may alternatively be formed mechanically by means such as die forming, hydroforming, explosive hydroforming, hydramolding, or any other means known in the art.

The metal bellows may be made of any type of metal, including but not limited to, steel, stainless steel, stainless steel 374, AM-350 stainless steel, Inconel, Hastelloy, Haynes, titanium, or any other high-strength, corrosion-resistant material.

In one embodiment, the metal bellows used are those available from Senior Aerospace Metal Bellows Division, Sharon, MA, or American BOA, Inc., Cumming, GA Rolling Diaphragm and/or Bellows Embodiments Various embodiments of the rolling diaphragm and/or bellows, which function to seal, are described above. Further embodiments will be apparent to those of skill in the art based on the description above and the additional description below relating to the parameters of the rolling diaphragm and/or bellows.

In some embodiments, the pressure atop the rolling diaphragm or bellows, in the airlock space or airlock area (both terms are used interchangeably), is the mean-working-gas pressure for the machine, which, in some embodiments is an engine, while the pressure below the rolling diaphragm and/or bellows, in the crankcase area, is ambient/atmospheric pressure. In these embodiments, the rolling diaphragm and/or bellows is required to operate with as much as 3000 psi across it (and in some embodiments, up to 1500 psi or higher). In this case, the rolling diaphragm and/or bellows seal forms the working gas (helium, hydrogen, or otherwise) containment barrier for the machine (engine in the exemplary embodiment). Also, in these embodiments, the need for a heavy, pressure-rated, structural vessel to contain the bottom end of the engine is eliminated, since it is now required to simply contain lubricating fluid (oil is used as a lubricating fluid in the exemplary embodiment) and air at ambient pressure, like a conventional internal combustion ("IC") engine.

Figure 15H:
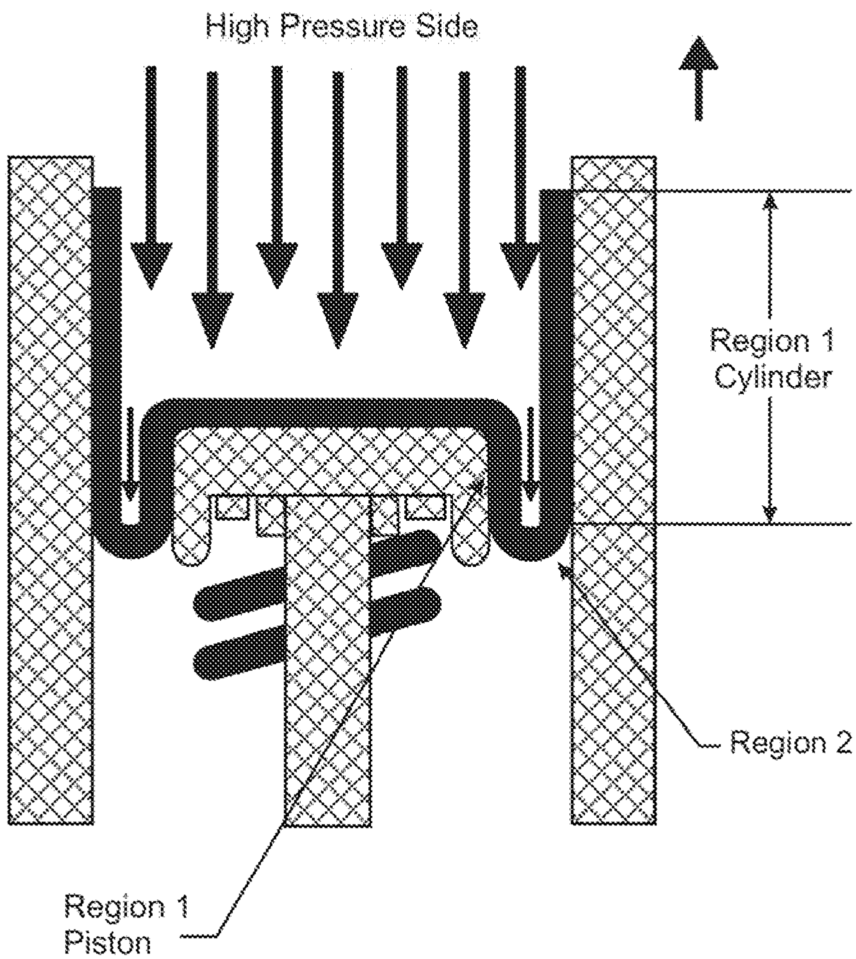
FIG. 15H shows a schematic of a rolling diaphragm identifying various load regions.
Figure 15I:
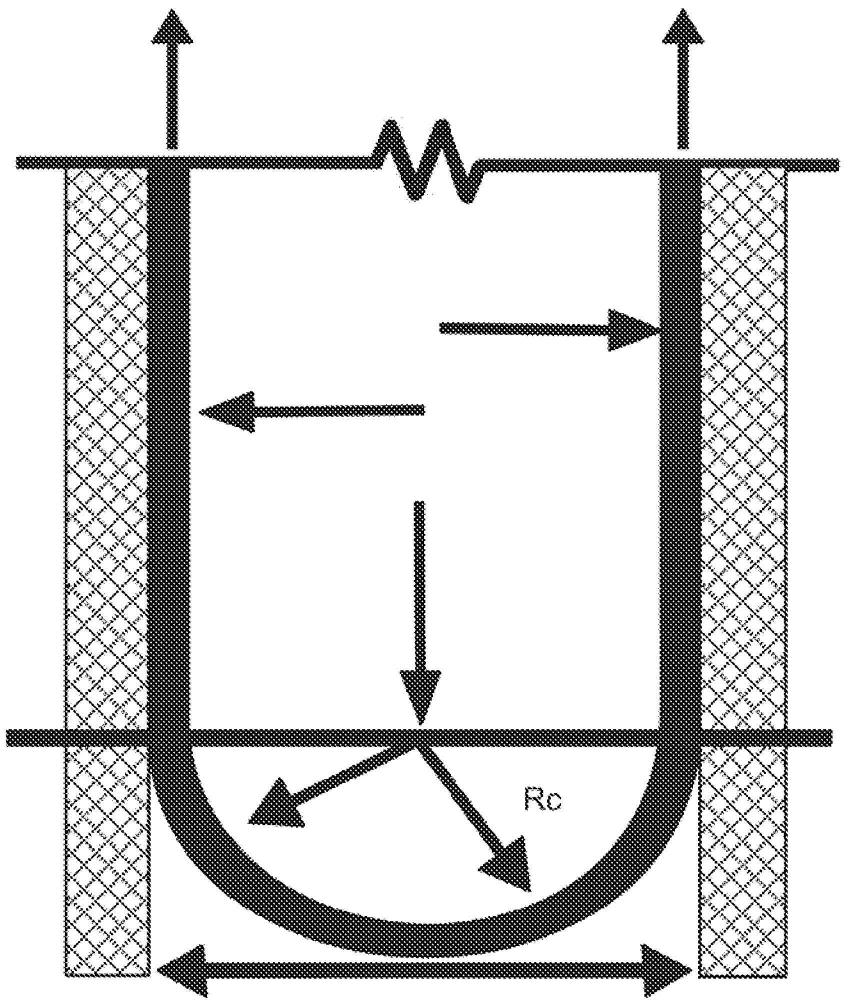
FIG. 15I shows a schematic of the rolling diaphragm identifying the convolution region.

The capability to use a rolling diaphragm and/or bellows seal with such an extreme pressure across it depends on the interaction of several parameters. Referring now to FIG. 15H, an illustration of the actual load on the rolling diaphragm or bellows material is shown. As shown, the load is a function of the pressure differential and the annular gap area for the installed rolling diaphragm or bellows seal.

Region 1 represents the portions of the rolling diaphragm and/or bellows that are in contact with the walls formed by the piston and cylinder. The load is essentially a tensile load in the axial direction, due to the pressure differential across the rolling diaphragm and/or bellows. This tensile load due to the pressure across the rolling diaphragm and/or bellows can be expressed as:

$$L_t=P_d*A_a$$

Where $L_t$=Tensile Load and $P_d$=Pressure Differential $A_a$=Annular Area and $$A_a=p/4*(D^2-d^2)$$

Where

D=Cylinder Bore and d=Piston Diameter

The tensile component of stress in the bellows material can be approximated as:

$$S_t=L_t/(p*(D+d)*t_b)$$

Which reduces to:

$$S_t=P_d/4*(D-d)/tb$$

Later, we will show the relationship of radius of convolution, $R_c$, to Cylinder bore (D) and Piston Diameter (d) to be defined as:

$$R_c=(D-d)/4$$

So, this formula for St reduces to its final form:

$$S_t=P_d*R_c/t_b$$

Where $t_b$=thickness of bellows material

Still referring to FIG. 15H, Region 2 represents the convolution. As the rolling diaphragm and/or bellows material turns the corner, in the convolution, the hoop stress imposed on the rolling diaphragm and/or bellows material may be calculated. For the section of the bellows forming the convolution, the hoop component of stress can be closely approximated as:

$$S_h=P_d*R_c/t_b$$

The annular gap that the rolling diaphragm and/or bellows rolls within is generally referred to as the convolution area. The rolling diaphragm and/or bellows fatigue life is generally limited by the combined stress from both the tensile (and hoop) load, due to pressure differential, as well as the fatigue due to the bending as the fabric rolls through the convolution. The radius that the fabric takes on during this 'rolling' is defined here as the radius of convolution, Rc.

$$R_c=(D-d)/4$$

The bending stress, Sb, in the rolling diaphragm and/or bellows material as it rolls through the radius of convolution, Rc, is a function of that radius, as well as the thickness of the materials in bending. For a fiber-reinforced material, the stress in the fibers themselves (during the prescribed deflection in the exemplary embodiments) is reduced as the fiber diameter decreases. The lower resultant stress for the same level of bending allows for an increased fatigue life limit. As the fiber diameter is further reduced, flexibility to decrease the radius of convolution Rc is achieved, while keeping the bending stress in the fiber under its endurance limit. At the same time, as Rc decreases, the tensile load on the fabric is reduced since there is less unsupported area in the annulus between the piston and cylinder. The smaller the fiber diameter, the smaller the minimum Rc, the smaller the annular area, which results in a higher allowable pressure differential.

For bending around a prescribed radius, the bending moment is approximated by:

$$M=E*I/R$$

Where:

M=Bending Moment

E=Elastic Modulus

I=Moment of Inertia

R=Radius of Bend

Classical bending stress, $S_b$, is calculated as:

$$S_b=M*Y/I$$

Where:

Y=Distance above neutral axis of bending

Substituting yields:

$$S_b=(E*I/R)*Y/I$$

$$S_b=E*Y/R$$

Assuming bending is about a central neutral axis:

$$Y_{max}=t_b/2$$

$$S_b=E*t_b/(2*R)$$

In some embodiments, rolling diaphragm and/or bellows designs for high cycle life are based on geometry where the bending stress imposed is kept about one order of magnitude less than the pressure-based loading (hoop and axial stresses). Based on the equation: Sb=E*tb/(2*R), it is clear that minimizing tb in direct proportion to Rc should not increase the bending stress. The minimum thickness for the exemplary embodiments of the rolling diaphragm and/or bellows material or membrane is directly related to the minimum fiber diameter that is used in the reinforcement of the elastomer. The smaller the fibers used, the smaller resultant Rc for a given stress level.

Another limiting component of load on the rolling diaphragm and/or bellows is the hoop stress in the convolution (which is theoretically the same in magnitude as the axial load while supported by the piston or cylinder). The governing equation for that load is as follows:

$$Sh=Pd*Rc/tb$$

Thus, if Rc is decreased in direct proportion to tb, then there is no increase of stress on the membrane in this region. However, if this ratio is reduced in a manner that decreases Rc to a greater ratio than tb then parameters must be balanced. Thus, decreasing tb with respect to Rc requires the rolling diaphragm and/or bellows to carry a heavier stress due to pressure, but makes for a reduced stress level due to bending. The pressure-based load is essentially constant, so this may be favorable—since the bending load is cyclic, therefore it is the bending load component that ultimately limits fatigue life.

For bending stress reduction, tb ideally should be at a minimum, and Rc ideally should be at a maximum. E ideally is also at a minimum. For hoop stress reduction, Rc ideally is small, and tb ideally is large.

Thus, the critical parameters for the rolling diaphragm and/or bellows membrane material are:

E, Elastic Modulus of the membrane material;

tb, membrane thickness (and/or fiber diameter);

Sut, Ultimate tensile strength of the rolling diaphragm and/or bellows; and

Slcf, The limiting fatigue strength of the rolling diaphragm and/or bellows.

Thus, from E, tb and Sut, the minimum acceptable Rc may be calculated. Next, using Rc, Slcf, and tb, the maximum Pd may be calculates. Rc may be adjusted to shift the bias of load (stress) components between the steady state pressure stress and the cyclic bending stress. Thus, the ideal rolling diaphragm and/or bellows material is extremely thin, extremely strong in tension, and very limber in flexion.

Thus, in some embodiments, the rolling diaphragm and/or bellows material (sometimes referred to as a "membrane"), is made from carbon fiber nanotubes. However, additional small fiber materials may also be used, including, but not limited to nanotube fibers that have been braided, nanotube untwisted yarn fibers, or any other conventional materials, including but not limited to KEVLAR, glass, polyester, synthetic fibers and any other material or fiber having a desirable diameter and/or other desired parameters as described in detail above.

Piston Seals and Piston Rod Seals

Figure 16:
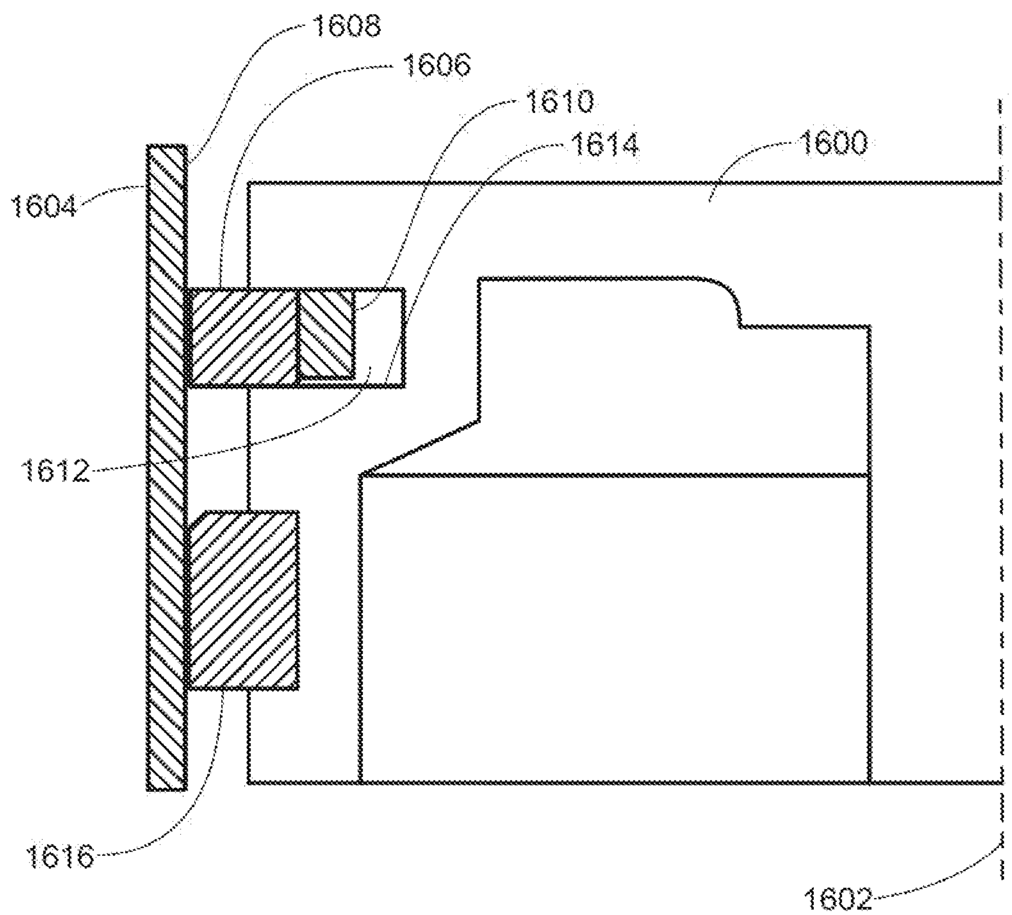
FIG. 16 shows a view of a piston and piston seal in accordance with one embodiment.

Referring now to FIG. 13G, an embodiment of the machine is shown wherein an engine 1326, such as a Stirling cycle engine, includes at least one piston rod seal 1314, a piston seal 1324, and a piston guide ring 1322, (shown as 1616 in FIG. 16). Various embodiments of the piston seal 1324 and the piston guide ring 1322 are further discussed below, and in U.S. patent application Ser. No. 10/175,502 (now abandoned), which, as mentioned before, is incorporated by reference.

FIG. 16 shows a partial cross section of the piston 1600, driven along the central axis 1602 of cylinder, or the cylinder 1604. The piston seal (shown as 1324 in FIG. 13G) may include a seal ring 1606, which provides a seal against the contact surface 1608 of the cylinder 1604. The contact surface 1608 is typically a hardened metal (preferably 58-62 RC) with a surface finish of 12 RMS or smoother. The contact surface 1608 may be metal which has been case hardened, such as 8260 hardened steel, which may be easily case hardened and may be ground and/or honed to achieve a desired finish. The piston seal may also include a backing ring 1610, which is sprung to provide a thrust force against the seal ring 1606 thereby providing sufficient contact pressure to ensure sealing around the entire outward surface of the seal ring 1606. The seal ring 1606 and the backing ring 1610 may together be referred to as a piston seal composite ring. In some embodiments, the at least one piston seal may seal off a warm portion of cylinder 1604 from a cold portion of cylinder 1604.

Figure 17:
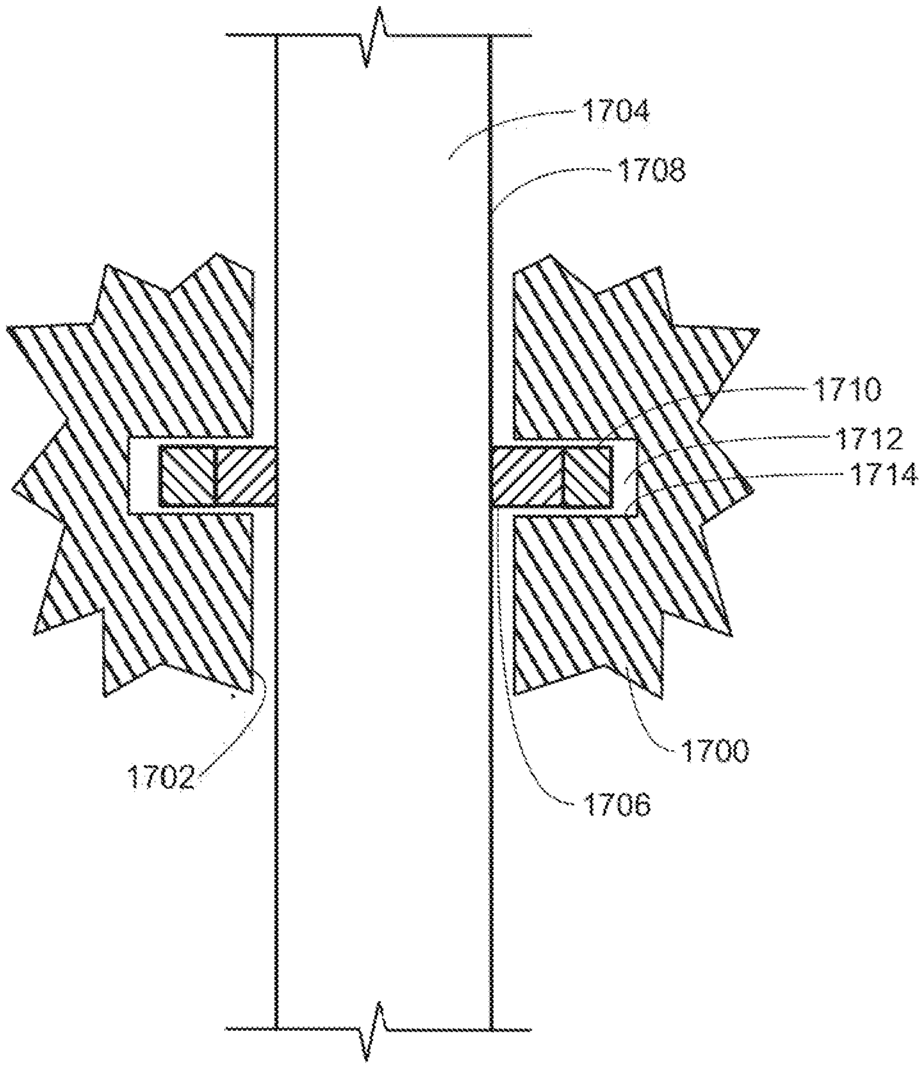
FIG. 17 shows a view of a piston rod and piston rod seal in accordance with one embodiment.

Referring now to FIG. 17, some embodiments include a piston rod seal (shown as 1314 in FIG. 13G) mounted in the piston rod cylinder wall 1700, which, in some embodiments, may include a seal ring 1706, which provides a seal against the contact surface 1708 of the piston rod 1604 (shown as 1302 in FIG. 13G). The contact surface 1708 in some embodiments is a hardened metal (preferably 58-62 RC) with a surface finish of 12 RMS or smoother. The contact surface 1708 may be metal which has been case hardened, such as 8260 hardened steel, which may be easily case hardened and may be ground and/or honed to achieve a desired finish. The piston seal may also include a backing ring 1710, which is sprung to provide a radial or hoop force against the seal ring 1706 thereby providing sufficient contact hoop stress to ensure sealing around the entire inward surface of seal ring 1706. The seal ring 1706 and the backing ring 1710 may together be referred to as a piston rod seal composite ring.

In some embodiments, the seal ring and the backing ring may be positioned on a piston rod, with the backing exerting an outward pressure on the seal ring, and the seal ring may come into contact with a piston rod cylinder wall 1702. These embodiments require a larger piston rod cylinder length than the previous embodiment. This is because the contact surface on the piston rod cylinder wall 1702 will be longer than in the previous embodiment, where the contact surface 1708 lies on the piston rod itself. In yet another embodiment, piston rod seals may be any functional seal known in the art including, but not limited to, an o-ring, a graphite clearance seal, graphite piston in a glass cylinder, or any air pot, or a spring energized lip seal. In some embodiments, anything having a close clearance may be used, in other embodiments, anything having interference, for example, a seal, is used. In the exemplary embodiment, a spring energized lip seal is used. Any spring energized lip seal may be used, including those made by BAL SEAL Engineering, Inc., Foothill Ranch, CA In some embodiments, the seal used is a BAL SEAL Part Number X558604.

The material of the seal rings 1606 and 1706 is chosen by considering a balance between the coefficient of friction of the seal rings 1606 and 1706 against the contact surfaces 1608 and 1708, respectively, and the wear on the seal rings 1606 and 1706 it engenders. In applications in which piston lubrication is not possible, such as at the high operating temperatures of a Stirling cycle engine, the use of engineering plastic rings is used. The embodiments of the composition include a nylon matrix loaded with a lubricating and wear-resistant material. Examples of such lubricating materials include PTFE/silicone, PTFE, graphite, etc. Examples of wear-resistant materials include glass fibers and carbon fibers. Examples of such engineering plastics are manufactured by LNP Engineering Plastics, Inc. of Exton, PA Backing rings 1610 and 1710 is preferably metal.

The fit between the seal rings 1606 and 1706 and the seal ring grooves 1612 and 1712, respectively, is preferably a clearance fit (about 0.002"), while the fit of the backing rings

1610 and 1710 is preferably a looser fit, of the order of about 0.005" in some embodiments. The seal rings 1606 and 1706 provide a pressure seal against the contact surfaces 1608 and 1708, respectively, and also one of the surfaces 1614 and 1714 of the seal ring grooves 1612 and 1712, respectively, depending on the direction of the pressure difference across the rings 1606 and 1706 and the direction of the piston 1600 or the piston rod 1704 travel.

Figure 18A:
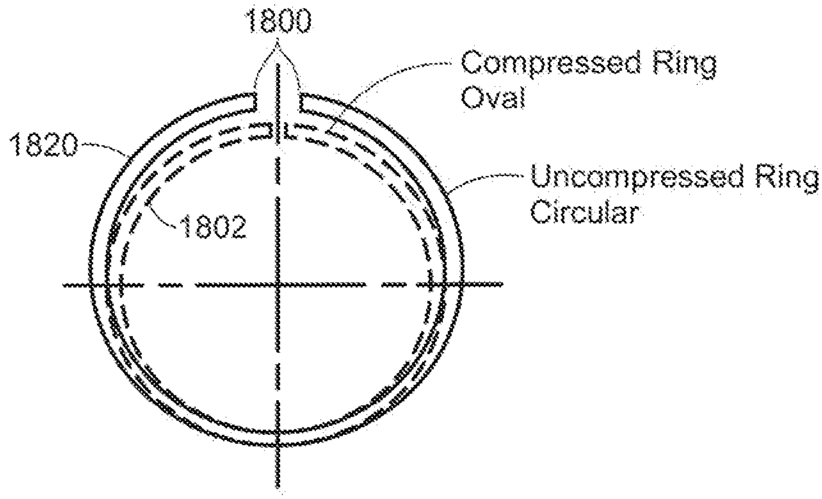
FIG. 18A shows a view of a piston seal backing ring in accordance with one embodiment.
Figure 18B:
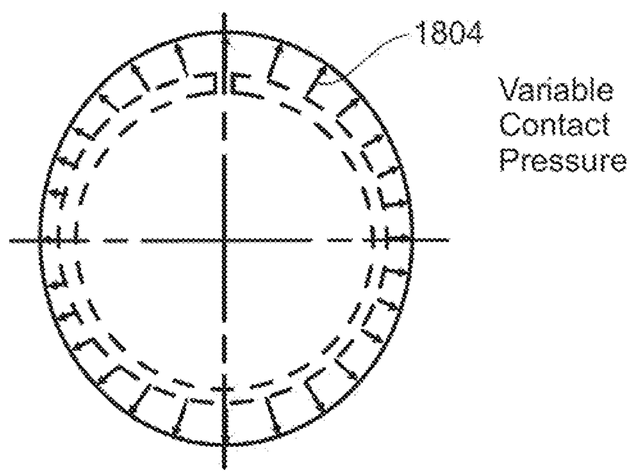
FIG. 18B shows a pressure diagram for a backing ring in accordance with one embodiment.

FIGS. 18A and 18B show that if the backing ring 1820 is essentially circularly symmetrical, but for the gap 1800, it will assume, upon compression, an oval shape, as shown by the dashed backing ring 1802. The result may be an uneven radial or hoop force (depicted by arrows 1804) exerted on the seal ring (not shown, shown as 1606 and 1706 in FIGS. 16 and 17), and thus an uneven pressure of the seal rings against the contact surfaces (not shown, shown as 1608 and 1708 in FIGS. 16 and 17) respectively, causing uneven wear of the seal rings and in some cases, failure of the seals.

Figure 18C:
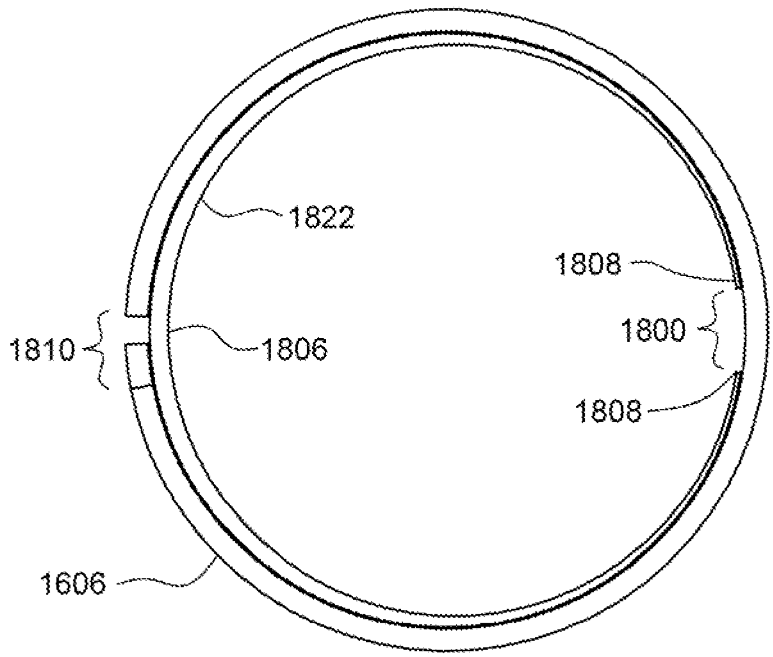
FIGS. 18C and 18D show a piston seal in accordance with one embodiment.
Figure 18D:
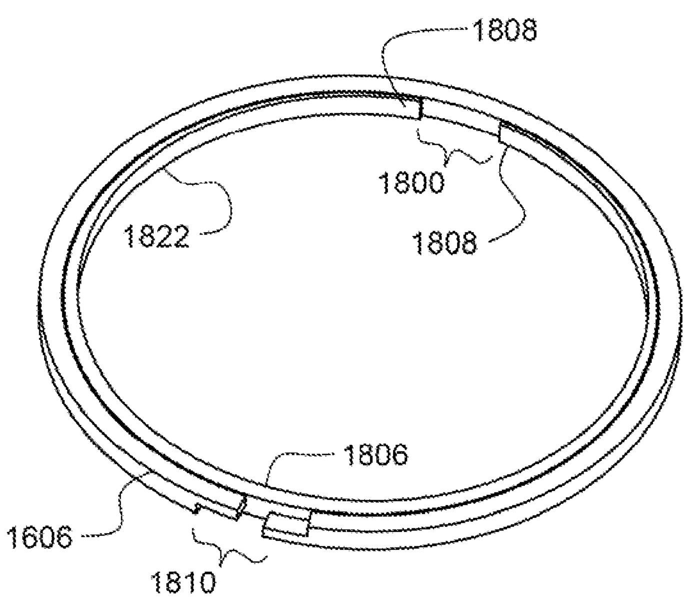

A solution to the problem of uneven radial or hoop force exerted by the piston seal backing ring 1820, in accordance with an embodiment, is a backing ring 1822 having a cross-section varying with circumferential displacement from the gap 1800, as shown in FIGS. 18C and 18D. A tapering of the width of the backing ring 1822 is shown from the position denoted by numeral 1806 to the position denoted by numeral 1808. Also shown in FIGS. 18C and 18D is a lap joint 1810 providing for circumferential closure of the seal ring 1606. As some seals will wear significantly over their lifetime, the backing ring 1822 should provide an even pressure (depicted by numeral 1904 in FIG. 19B) of a range of movement. The tapered backing ring 1822 shown in FIGS. 18C and 18D may provide this advantage.

Figure 19A:
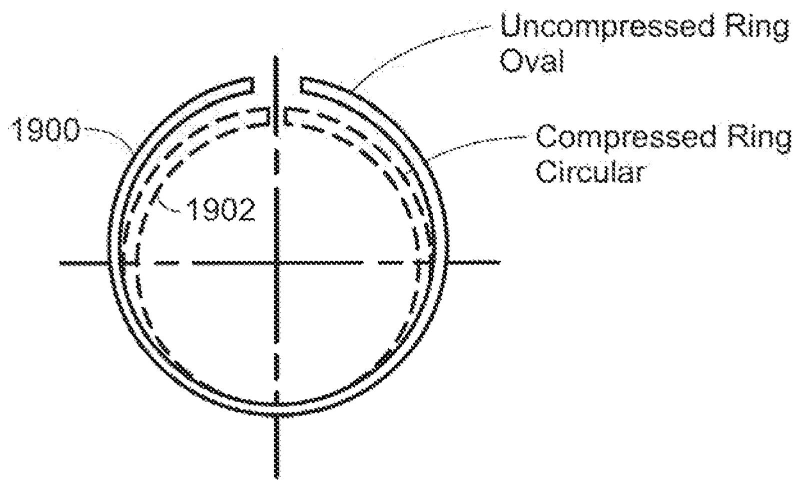
FIG. 19A shows a view of a piston seal backing ring in accordance with one embodiment.
Figure 19B:
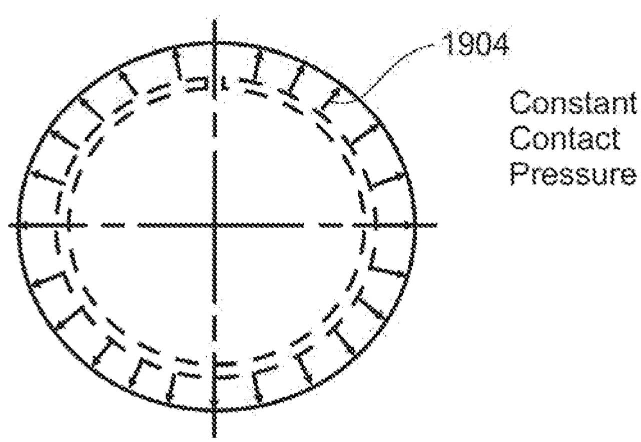
FIG. 19B shows a pressure diagram for a piston seal backing ring in accordance with one embodiment.

FIGS. 19A and 19B illustrate another solution to the problem of uneven radial or hoop force of the piston seal ring against the piston cylinder, in accordance with some embodiments. As shown in FIG. 19A, backing ring 1910 is fashioned in an oval shape, so that upon compression within the cylinder, the ring assumes the circular shape shown by dashed backing ring 1902. A constant contact pressure between the seal ring and the cylinder contact surface may thus be provided by an even radial force 1904 of backing ring 1902, as shown in FIG. 19B.

Figure 18E:
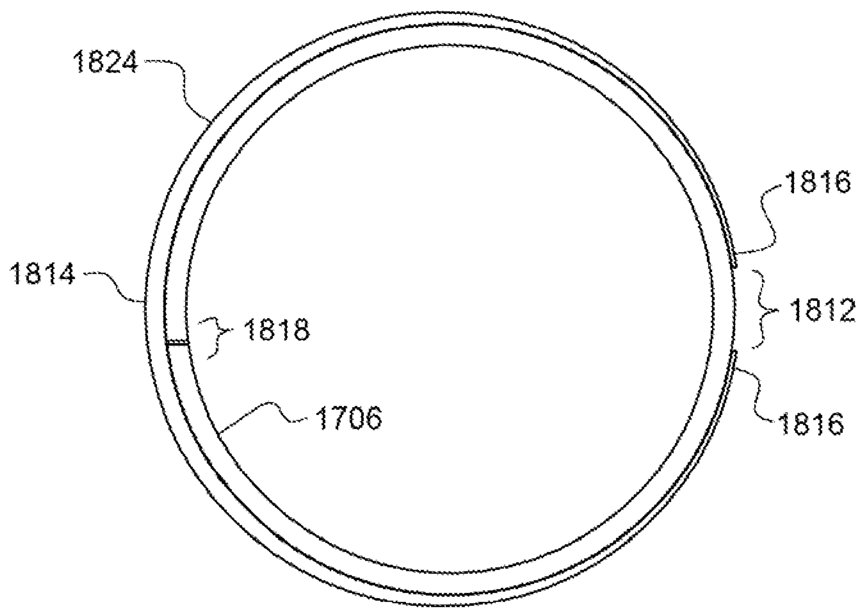
FIGS. 18E and 18F show a piston rod seal in accordance with one embodiment.
Figure 18F:
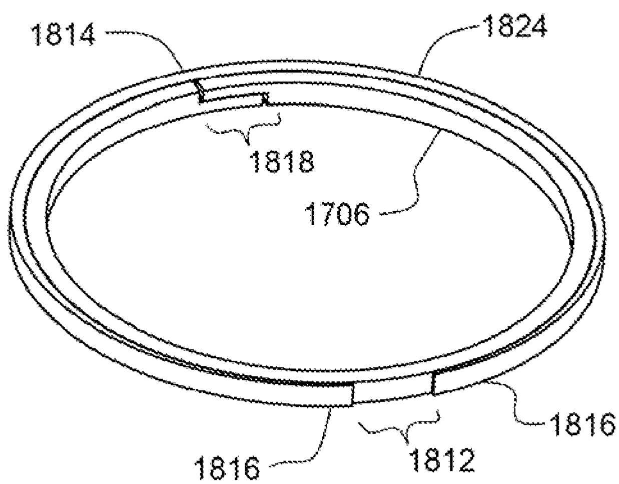

A solution to the problem of uneven radial or hoop force exerted by the piston rod seal backing ring, in accordance with some embodiments, is a backing ring 1824 having a cross-section varying with circumferential displacement from gap 1812, as shown in FIGS. 18E and 18F. A tapering of the width of backing ring 1824 is shown from the position denoted by numeral 1814 to the position denoted by numeral 1816. Also shown in FIGS. 18E and 18F is a lap joint 1818 providing for circumferential closure of seal ring 1706. As some seals will wear significantly over their lifetime, backing ring 1824 should provide an even pressure (depicted by numeral 2004 in FIG. 20B) of a range of movement. The tapered backing ring 1824 shown in FIGS. 18E and 18F may provide this advantage.

Figure 20A:
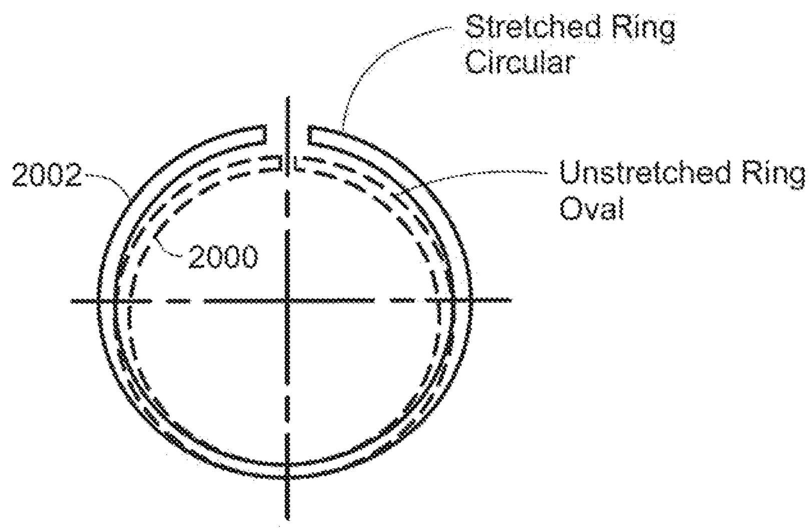
FIG. 20A shows a view of a piston rod seal backing ring in accordance with one embodiment.
Figure 20B:
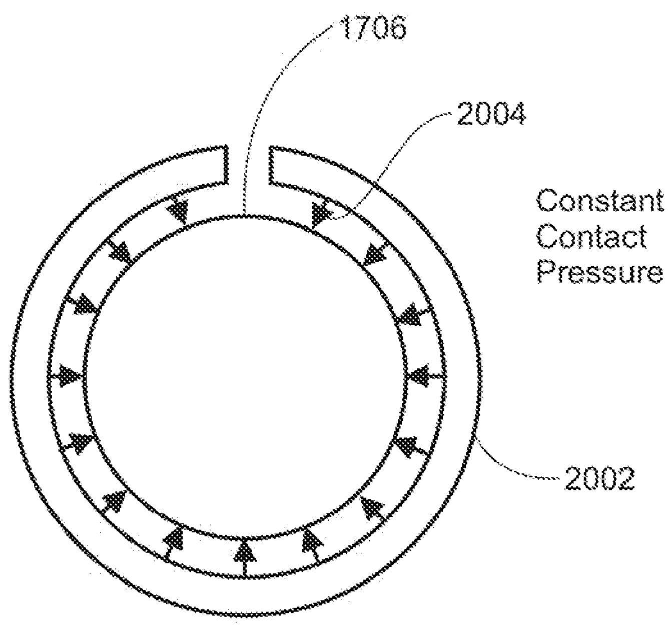
FIG. 20B shows a pressure diagram for a piston rod seal backing ring in accordance with one embodiment.

FIGS. 20A and 20B illustrate another solution to the problem of uneven radial or hoop force of the piston rod seal ring against the piston rod contact surface, in accordance with some embodiments. As shown in FIG. 20A, backing ring (shown by dashed backing ring 2000) is fashioned as an oval shape, so that upon expansion within the cylinder, the ring assumes the circular shape shown by backing ring 2002. A constant contact pressure between the seal ring 1706 and the cylinder contact surface may thus be provided by an even radial thrust force 2004 of backing ring 2002, as shown in FIG. 20B.

Figure 21:
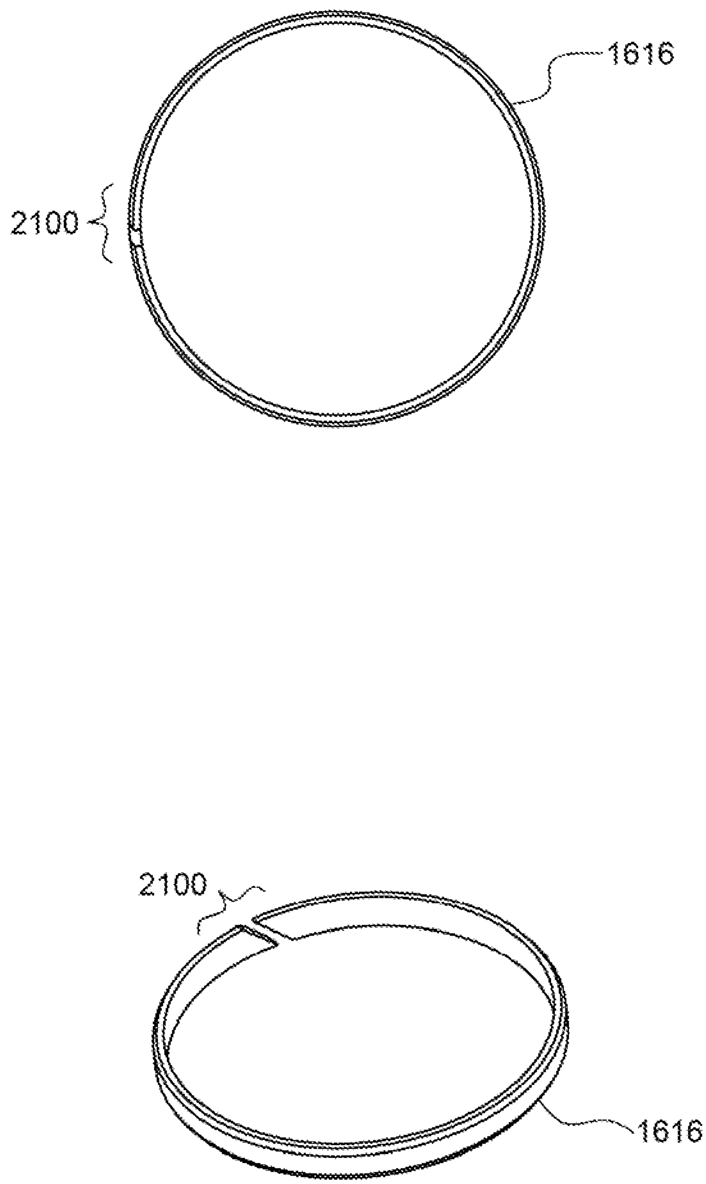
FIG. 21 shows views of a piston guide ring in accordance with one embodiment.

Referring again to FIG. 16, at least one guide ring 1616 may also be provided, in accordance with some embodiments, for bearing any side load on piston 1600 as it moves up and down the cylinder 1604. Guide ring 1616 is also preferably fabricated from an engineering plastic material loaded with a lubricating material. A perspective view of guide ring 1616 is shown in FIG. 21. An overlapping joint 2100 is shown and may be diagonal to the central axis of guide ring 1616.

Lubricating Fluid Pump and Lubricating Fluid Passageways

Figure 22:
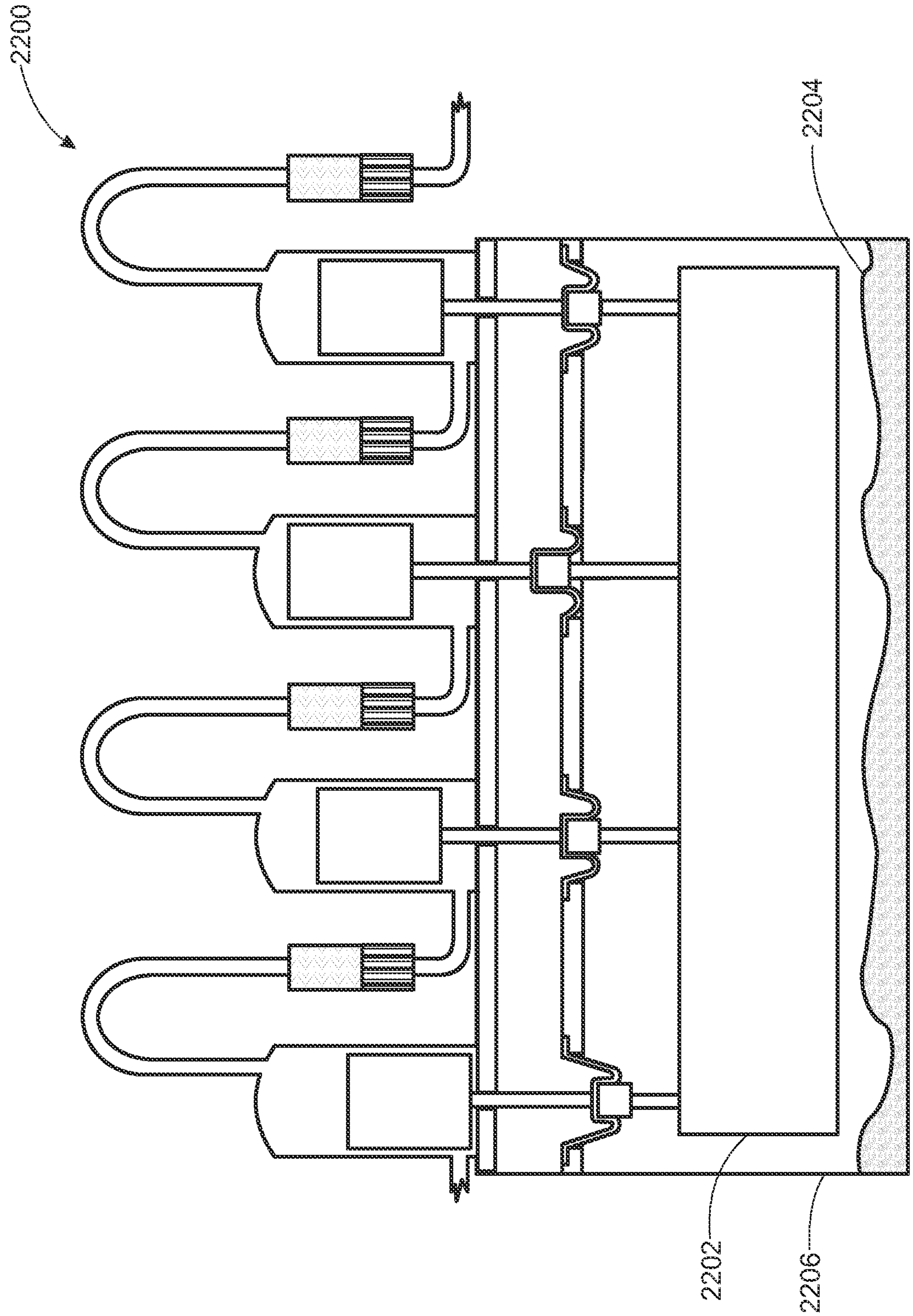
FIG. 22 shows an unwrapped schematic illustration of a working space and cylinders in accordance with one embodiment.

Referring now to FIG. 22, a representative illustration of one embodiment of the engine 2200 for the machine is shown having a rocking beam drive 2202 and lubricating fluid 2204. In some embodiments, the lubricating fluid is oil. The lubricating fluid is used to lubricate engine parts in the crankcase 2206, such as hydrodynamic pressure fed lubricated bearings. Lubricating the moving parts of the engine 2200 serves to further reduce friction between engine parts and further increase engine efficiency and engine life. In some embodiments, lubricating fluid may be placed at the bottom of the engine, also known as an oil sump, and distributed throughout the crankcase. The lubricating fluid may be distributed to the different parts of the engine 2200 by way of a lubricating fluid pump, wherein the lubricating fluid pump may collect lubricating fluid from the sump via a filtered inlet. In the exemplary embodiment, the lubricating fluid is oil and thus, the lubricating fluid pump is herein referred to as an oil pump. However, the term "oil pump" is used only to describe the exemplary embodiment and other embodiments where oil is used as a lubricating fluid, and the term shall not be construed to limit the lubricating fluid or the lubricating fluid pump.

Figure 23B:
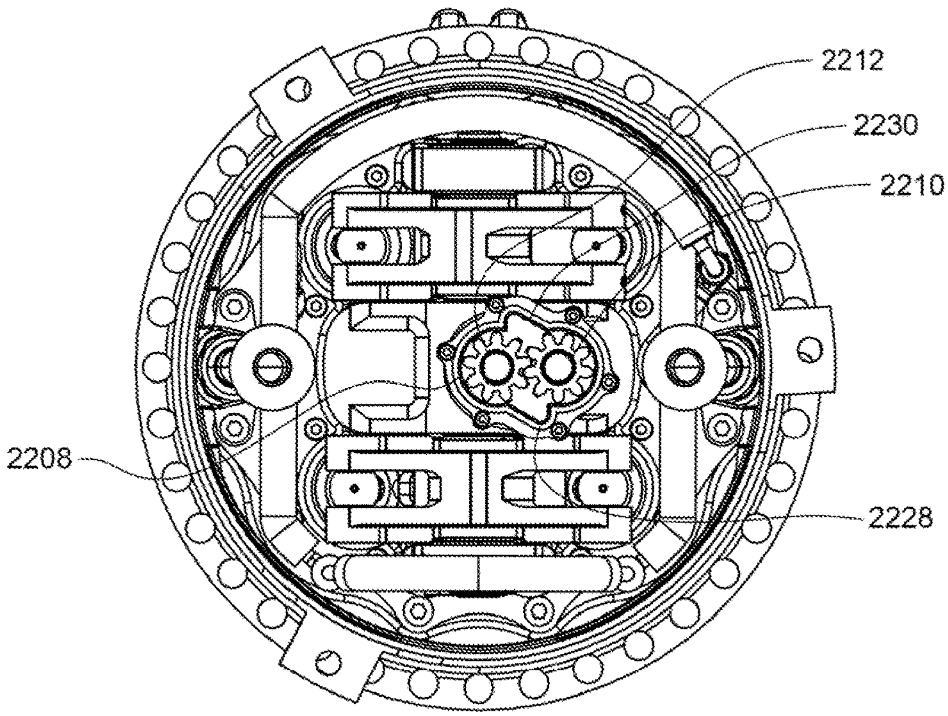
FIG. 23B shows a view of an engine in accordance with one embodiment.
Figure 24:
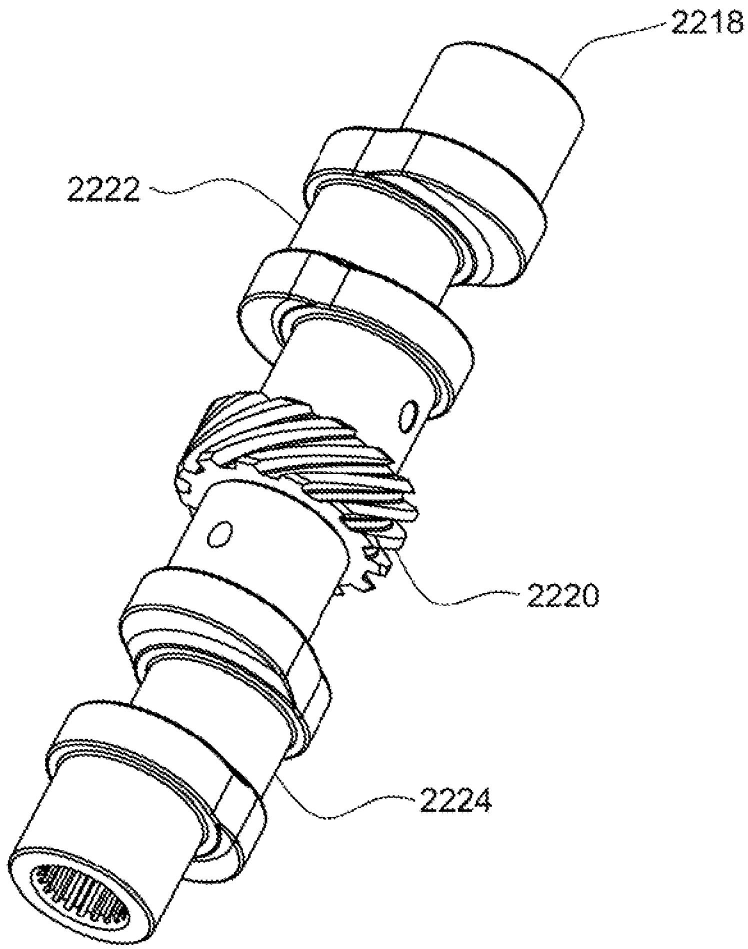
FIG. 24 shows a view of a crankshaft in accordance with one embodiment.

Referring now to FIGS. 23A and 23B, one embodiment of the engine is shown, wherein lubricating fluid is distributed to different parts of the engine 2200 that are located in the crankcase 2206 by a mechanical oil pump 2208. The oil pump 2208 may include a drive gear 2210 and an idle gear 2212. In some embodiments, the mechanical oil pump 2208 may be driven by a pump drive assembly. The pump drive assembly may include a drive shaft 2214 coupled to a drive gear 2210, wherein the drive shaft 2214 includes an intermediate gear 2216 thereon. The intermediate gear 2216 is preferably driven by a crankshaft gear 2220, wherein the crankshaft gear 2220 is coupled to the primary crankshaft 2218 of the engine 2200, as shown in FIG. 24. In this configuration, the crankshaft 2218 indirectly drives the mechanical oil pump 2208 via the crankshaft gear 2220, which drives the intermediate gear 2216 on the drive shaft 2214, which, in turn, drives the drive gear 2210 of the oil pump 2208.

The crankshaft gear 2220 may be positioned between the crankpins 2222 and 2224 of crankshaft 2218 in some embodiments, as shown in FIG. 24. In other embodiments, the crankshaft gear 2220 may be placed at an end of the crankshaft 2218, as shown in FIGS. 25A—25C.

For ease of manufacturing, the crankshaft 2218 may be composed of a plurality of pieces. In these embodiments, the crankshaft gear 2220 may be to be inserted between the crankshaft pieces during assembly of the crankshaft.

Figure 25A:
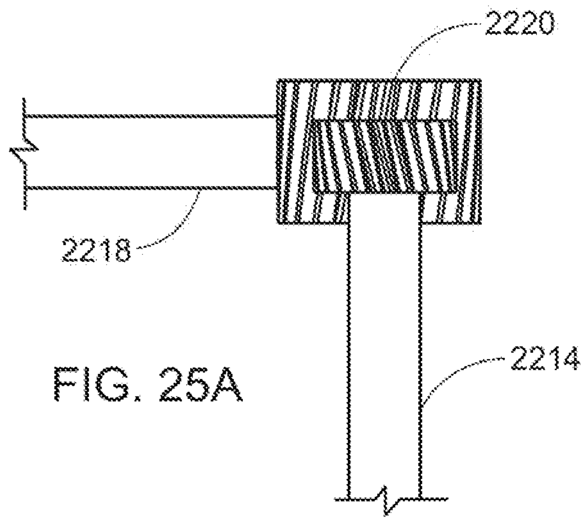
FIGS. 25A-25C show various configurations of pump drives in accordance with various embodiments.
Figure 25B:
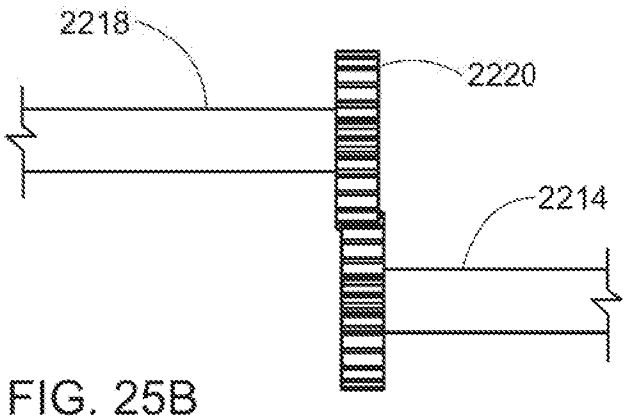

The drive shaft 2214, in some embodiments, may be positioned perpendicularly to the crankshaft 2218, as shown in FIGS. 23A and 25A. However, in some embodiments, the drive shaft 2214 may be positioned parallel to the crankshaft 2218, as shown in FIGS. 25B and 25C.

Figure 25C:
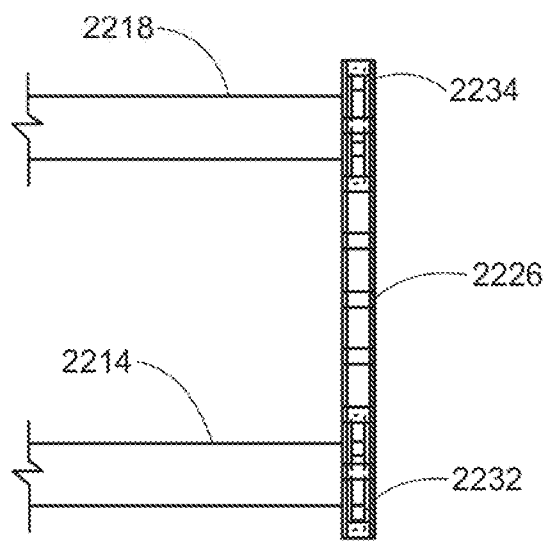
Figure 26A:
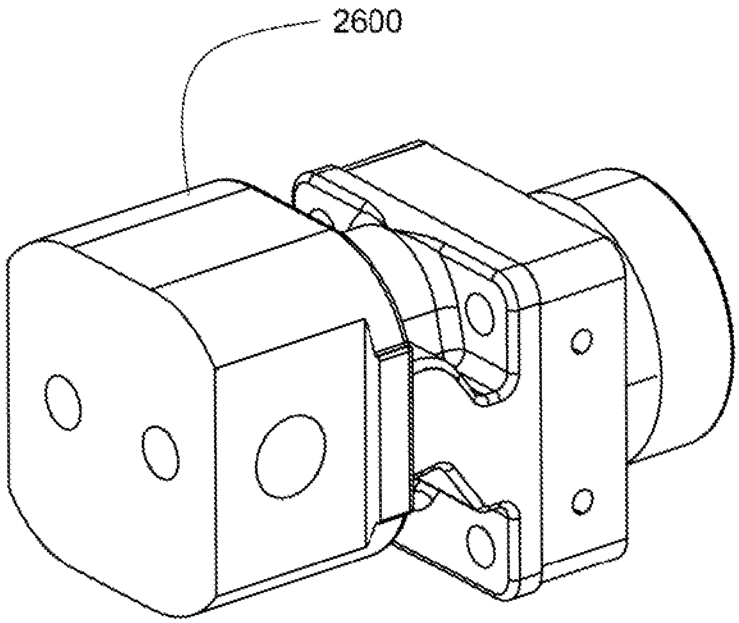
FIG. 26A show various views of an oil pump in accordance with one embodiment.
Figure 26B:
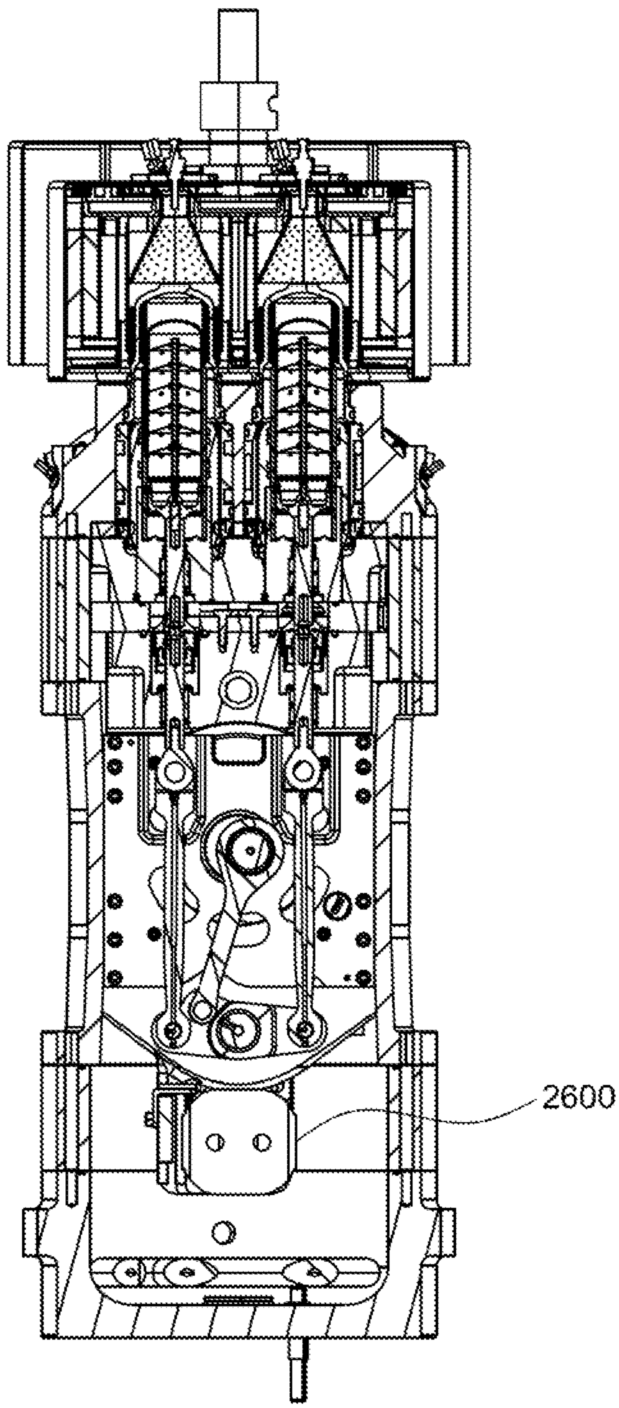
FIG. 26B shows a view of an engine in accordance with one embodiment.
Figure 26C:
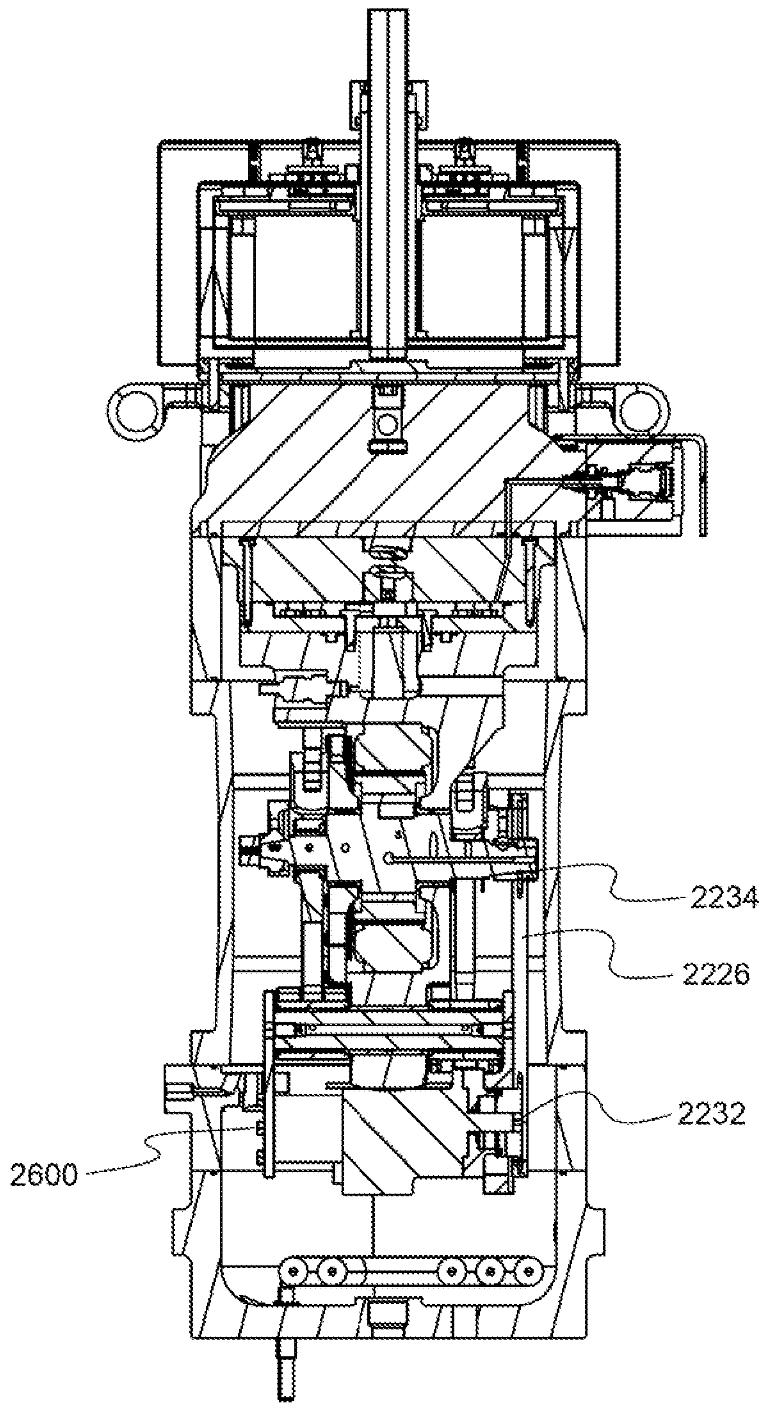
FIG. 26C shows another view of the engine depicted in FIG. 26B.
Figure 27A:
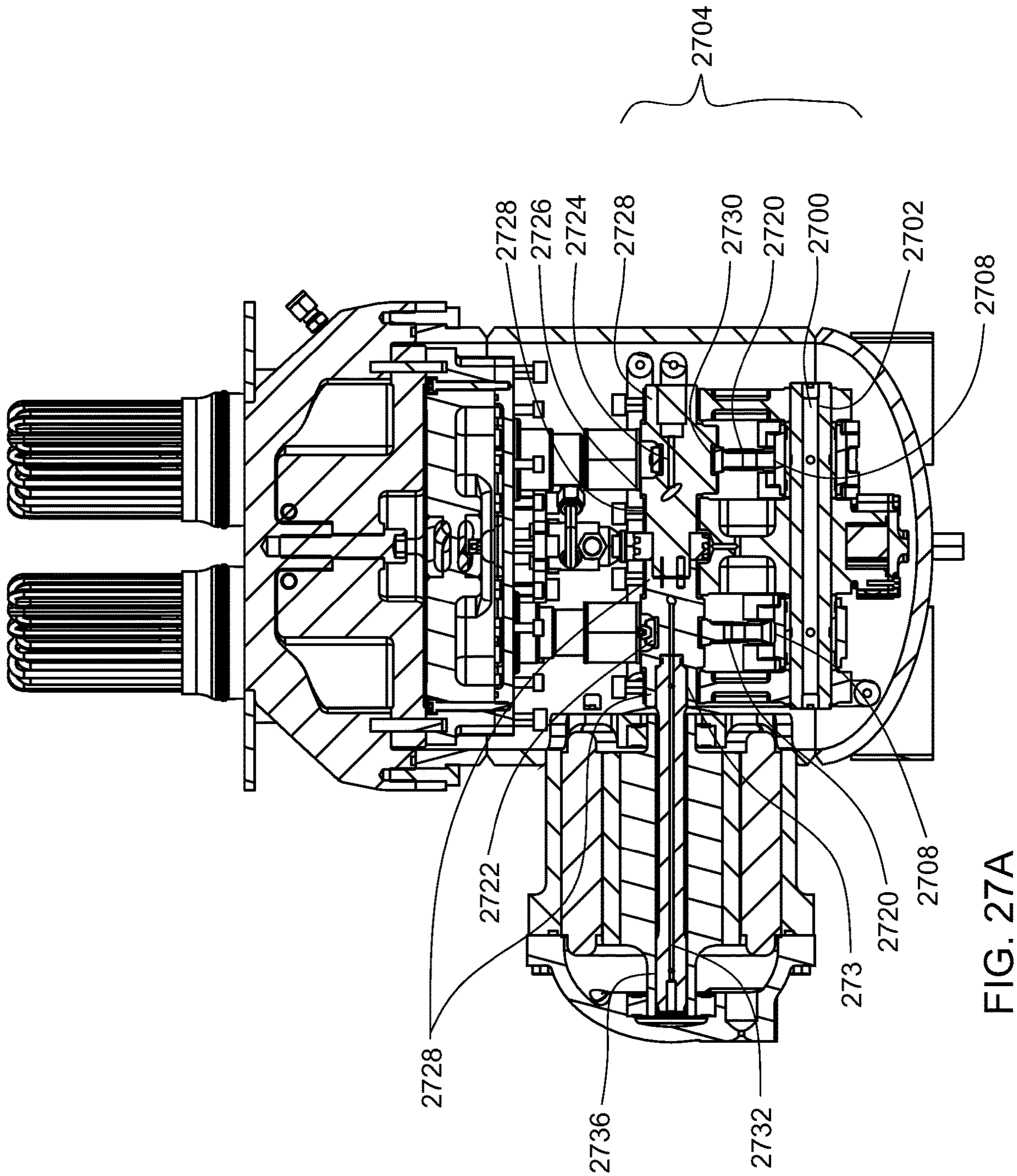
FIGS. 27A and 27B show views of an engine in accordance with one embodiment.
Figure 27B:
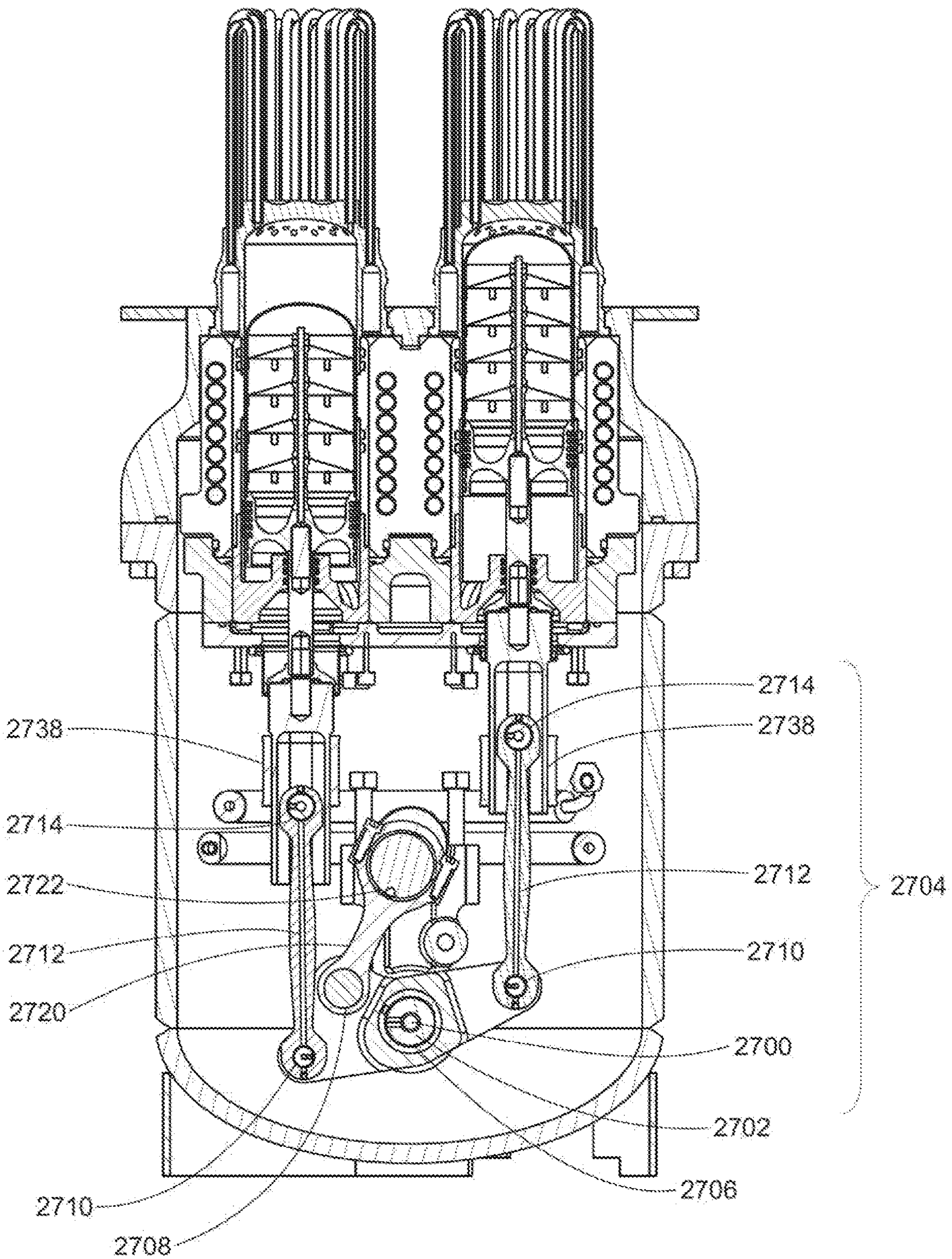
Figure 27C:
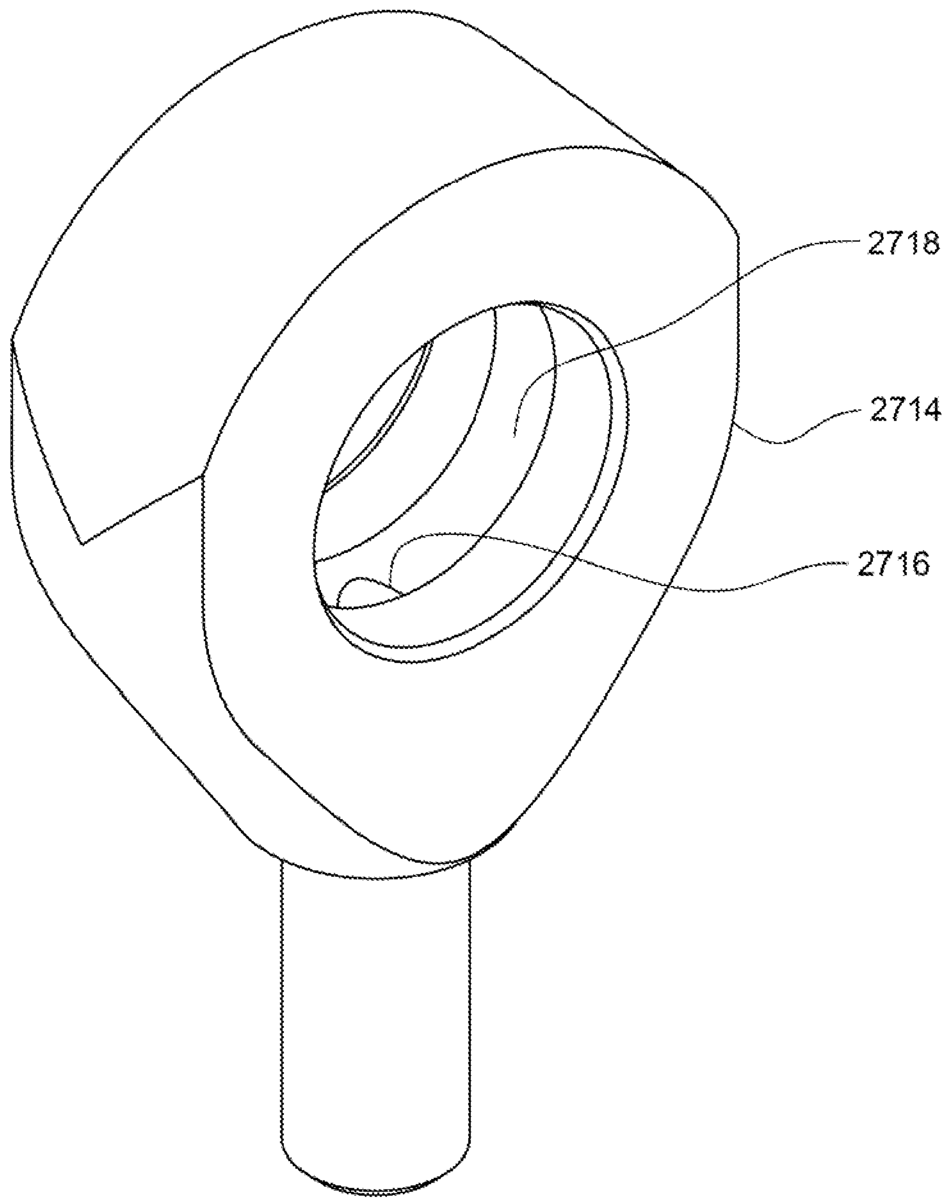
FIG. 27C shows a view of a coupling joint in accordance with one embodiment.
Figure 27D:
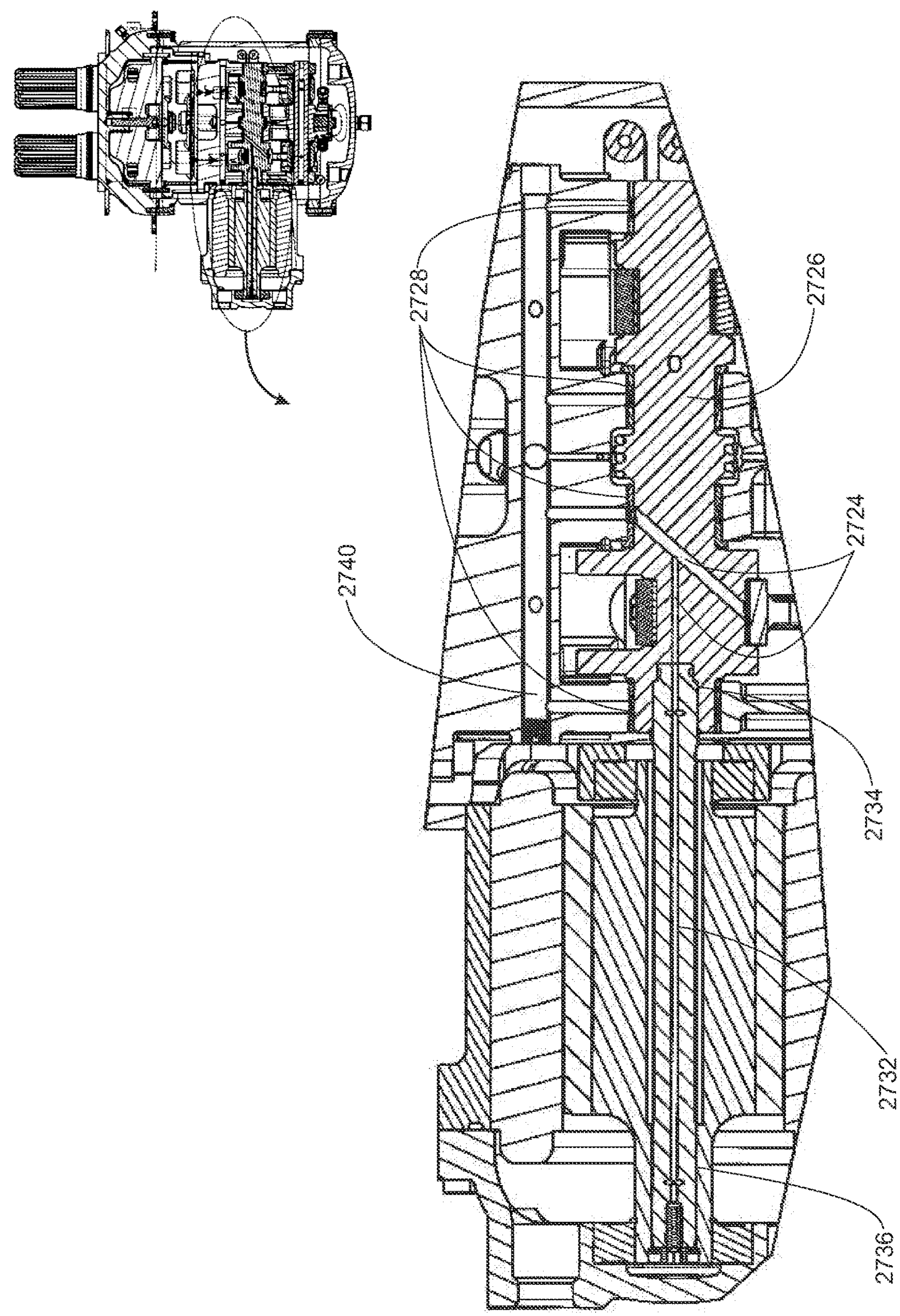
FIG. 27D shows a view of a crankshaft and spline shaft of an engine in accordance with one embodiment.

In some embodiments, the crankshaft gear 2234 and the intermediate gear 2232 may be sprockets, wherein the crankshaft gear 2234 and the intermediate gear 2232 are coupled by a chain 2226, as shown in FIGS. 25C and 26C. In such an embodiments, the chain 2226 is used to drive a chain drive pump (shown as 2600 in FIGS. 26A through 26C).

In some embodiments, the gear ratio between the crankshaft 2218 and the drive shaft 2214 remains constant throughout operation. In such an embodiment, it is important to have an appropriate gear ratio between the crankshaft and the drive shaft, such that the gear ratio balances the pump speed and the speed of the engine. This achieves a specified flow of lubricant required by a particular engine RPM (revolutions per minute) operating range.

In some embodiments, lubricating fluid is distributed to different parts of an engine by an electric pump. The electric pump eliminates the need for a pump drive assembly, which is otherwise required by a mechanical oil pump.

Referring back to FIGS. 23A and 23B, the oil pump 2208 may include an inlet 2228 to collect lubricating fluid from the sump and an outlet 2230 to deliver lubricating fluid to the various parts of the engine. In some embodiments, the rotation of the drive gear 2212 and the idle gear 2210 cause the lubricating fluid from the sump to be drawn into the oil pump through the inlet 2228 and forced out of the pump through the outlet 2230. The inlet 2228 preferably includes a filter to remove particulates that may be found in the lubricating fluid prior to its being drawn into the oil pump. In some embodiments, the inlet 2228 may be connected to the sump via a tube, pipe, or hose. In some embodiments, the inlet 2228 may be in direct fluid communication with the sump.

In some embodiments, the oil pump outlet 2230 is connected to a series of passageways in the various engine parts, through which the lubricating fluid is delivered to the various engine parts. The outlet 2230 may be integrated with the passageways so as to be in direct communication with the passageways, or may be connected to the passageways via a hose or tube, or a plurality of hoses or tubes. The series of passageways are preferably an interconnected network of passageways, so that the outlet 2230 may be connected to a single passageway inlet and still be able to deliver lubricating fluid to the engine's lubricated parts.

FIGS. 27A-27D show one embodiments, wherein the oil pump outlet (shown as 2230 in FIG. 23B) is connected to a passageway 2700 in the rocker shaft 2702 of the rocking beam drive 2704. The rocker shaft passageway 2700 delivers lubricating fluid to the rocker pivot bearings 2706, and is connected to and delivers lubricating fluid to the rocking beam passageways (not shown). The rocking beam passageways deliver lubricating fluid to the connecting wrist pin bearings 2708, the link rod bearings 2710, and the link rod passageways 2712. The link rod passageways 2712 deliver lubricating fluid to the piston rod coupling bearing 2714. The connecting rod passageway (not shown) of the connecting rod 2720 delivers lubricating fluid to a first crank pin 2722 and the crankshaft passageway 2724 of the crankshaft 2726. The crankshaft passageway 2724 delivers lubricating fluid to the crankshaft journal bearings 2728, the second crank pin bearing 2730, and the spline shaft passageway 2732. The spline shaft passageway 2732 delivers lubricating fluid to the spline shaft spline joints 2734 and 2736. The oil pump outlet (not shown, shown in FIG. 23B as 2230) in some embodiments is connected to the main feed 2740. In some embodiments, an oil pump outlet may also be connected to and provide lubricating fluid to the coupling joint linear bearings 2738. In some embodiments, an oil pump outlet may be connected to the linear bearings 2738 via a tube or hose, or plurality of tubes or hoses. Alternatively, the link rod passageways 2712 may deliver lubricating fluid to the linear bearings 2738.

Thus, the main feed 2740 delivers lubricating fluid to the journal bearings surfaces 2728. From the journal bearing surfaces 2728, the lubricating fluid is delivered to the crankshaft main passage. The crankshaft main passage delivers lubricating fluid to both the spline shaft passageway 2732 and the connecting rod bearing on the crank pin 2724.

Lubricating fluid is delivered back to the sump, preferably by flowing out of the aforementioned bearings and into the sump. In the sump, the lubricating fluid will be collected by the oil pump and redistributed throughout the engine.

Tube Heat Exchanger

Figure 28:
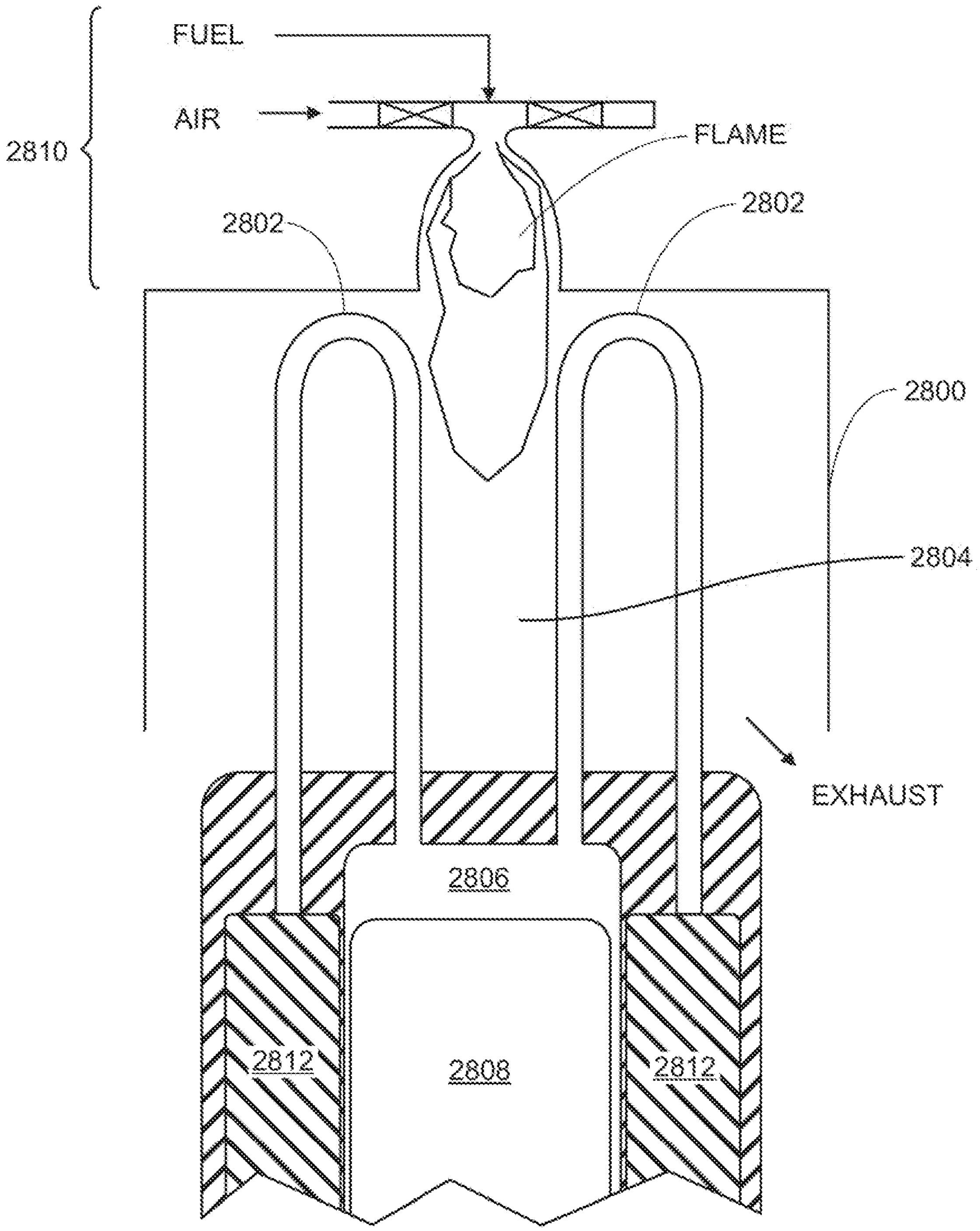
FIG. 28 shows a view of a heater exchanger and burner for an engine in accordance with one embodiment.

External combustion engines, such as, for example, Stirling cycle engines, may use tube heater heads to achieve high power. FIG. 28 is a cross-sectional view of a cylinder and tube heater head of an illustrative Stirling cycle engine. A typical configuration of a tube heater head 2800, as shown in FIG. 28, uses a cage of U-shaped heater tubes 2802 surrounding a combustion chamber 2804. A cylinder 2806 contains a working fluid, such as, for example, helium. The working fluid is displaced by the piston 2808 and driven through the heater tubes 2802. A burner 2810 combusts a combination of fuel and air to produce hot combustion gases that are used to heat the working fluid through the heater tubes 2802 by conduction. The heater tubes 2802 connect a regenerator 2812 with the cylinder 2806. The regenerator 2812 may be a matrix of material having a large ratio of surface to area volume which serves to absorb heat from the working fluid or to heat the working fluid during the cycles of the engine. Heater tubes 2802 provide a high surface area and a high heat transfer coefficient for the flow of the combustion gases past the heater tubes 2802. Various embodiments of tube heater heads are discussed below, and in U.S. Pat. Nos. 6,543,215 and 7,308,787, which are, as previously mentioned, incorporated by reference in their entireties.

Figure 29:
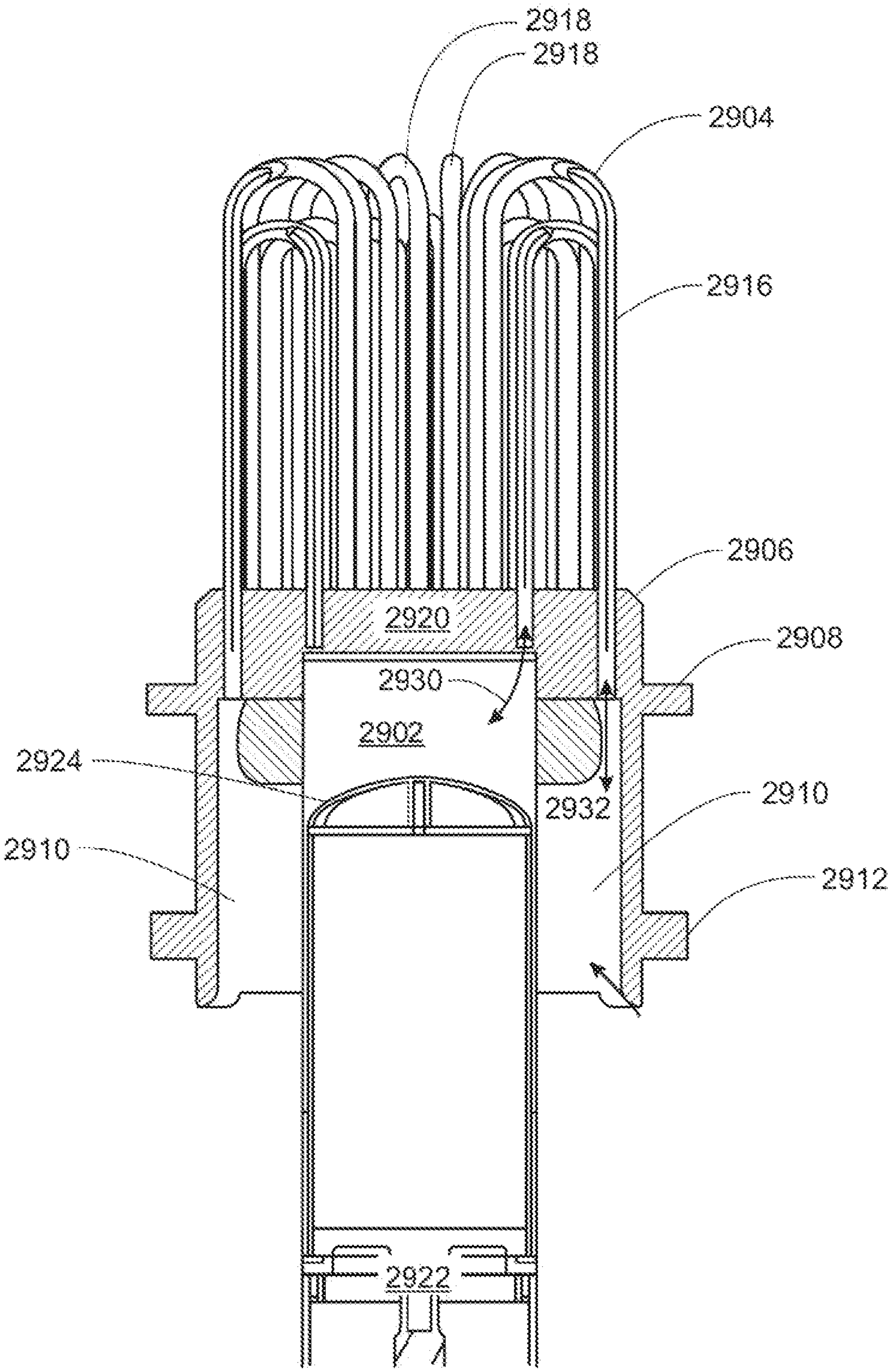
FIG. 29 shows a view of a tube heat exchanger in accordance with one embodiment.

FIG. 29 is a side view in cross section of a tube heater head and a cylinder. The heater head 2906 is substantially a cylinder having one closed end 2920 (otherwise referred to as the cylinder head) and an open end 2922. Closed end 2920 includes a plurality of U-shaped heater tubes 2904 that are disposed in a burner 3036 (shown in FIG. 30). Each U-shaped tube 2904 has an outer portion 2916 (otherwise referred to herein as an "outer heater tube") and an inner portion 2918 (otherwise referred to herein as an "inner heater tube"). The heater tubes 2904 connect the cylinder 2902 to regenerator 2910. Cylinder 2902 is disposed inside heater head 2906 and is also typically supported by the heater head 2906. A piston 2924 travels along the interior of cylinder 2902. As the piston 2924 travels toward the closed end 2920 of the heater head 2906, working fluid within the cylinder 2902 is displaced and caused to flow through the heater tubes 2924 and regenerator 2910 as illustrated by arrows 2930 and 2932 in FIG. 29. A burner flange 2908 provides an attachment surface for a burner 3036 (shown in FIG. 30) and a cooler flange 2912 provides an attachment surface for a cooler (not shown).

Figure 30:
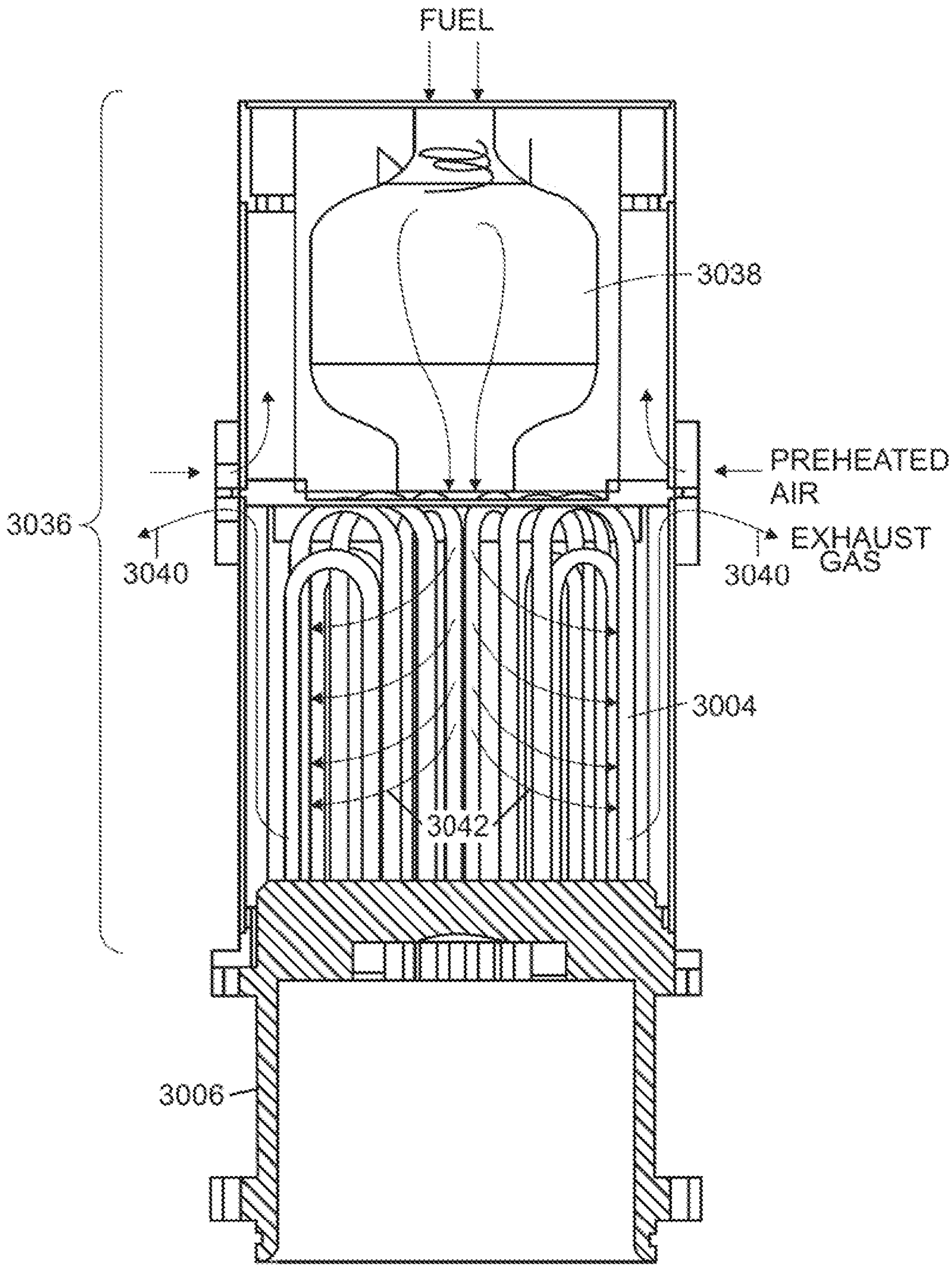
FIG. 30 shows a view of a tube heat exchanger in accordance with one embodiment.

Referring to FIG. 30, as mentioned above, the closed end of heater head 3006, including the heater tubes 3004, is disposed in a burner 3036 that includes a combustion chamber 3038. Hot combustion gases (otherwise referred to herein as "exhaust gases") in combustion chamber 3038 are in direct thermal contact with heater tubes 3004 of heater head 3006. Thermal energy is transferred by conduction from the exhaust gases to the heater tubes 3004 and from the heater tubes 3004 to the working fluid of the engine, typically helium. Other gases, such as nitrogen, for example, or mixtures of gases, may be used, with a preferable working fluid having high thermal conductivity and low viscosity. Non-combustible gases are used in various embodiments. Heat is transferred from the exhaust gases to the heater tubes 3004 as the exhaust gases flow around the surfaces of the heater tubes 3004. Arrows 3042 show the general radial direction of flow of the exhaust gases. Arrows 3040 show the direction of flow of the exhaust gas as it exits from the burner 3036. The exhaust gases exiting from the burner 3036 tend to overheat the upper part of the heater tubes 3004 (near the U-bend) because the flow of the exhaust gases is greater near the upper part of the heater tubes than at the bottom of the heater tubes (i.e., near the bottom of the burner 3036).

The overall efficiency of an external combustion engine is dependent in part on the efficiency of heat transfer between the combustion gases and the working fluid of the engine.

Returning to FIG. 29, in general, the inner heater tubes 2918 are warmer than the outer heater tubes 2916 by several hundred degrees Celsius. The burner power and thus the amount of heating provided to the working fluid is therefore limited by the inner heater tube 2918 temperatures. The maximum amount of heat will be transferred to the working gas if the inner and outer heater tubes are nearly the same temperature. Generally, embodiments, as described herein, either increase the heat transfer to the outer heater tubes or decrease the rate of heat transfer to the inner heater tubes.

Figure 31:
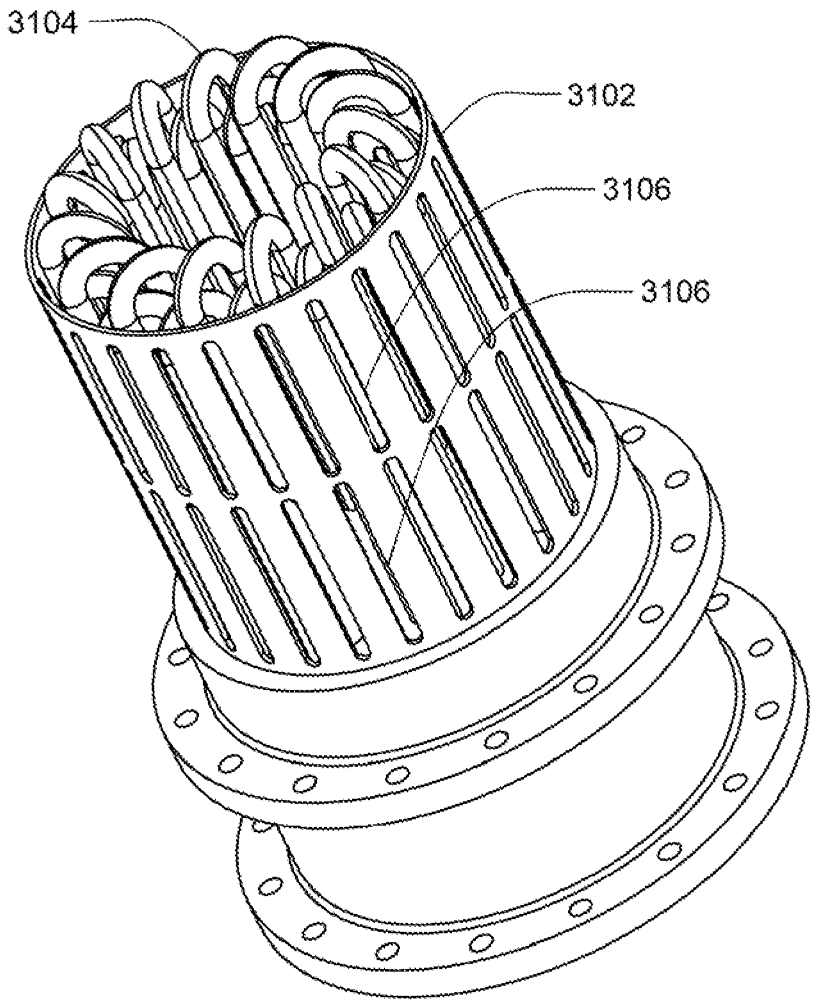
FIG. 31 shows a view of a tube heat exchanger in accordance with one embodiment.

FIG. 31 is a perspective view of an exhaust flow concentrator and a tube heater head in accordance with one embodiment. Heat transfer to a cylinder, such as a heater-tube, in cross-flow, is generally limited to only the upstream half of the tube. Heat transfer on the back side (or downstream half) of the tube, however, is nearly zero due to flow separation and recirculation. An exhaust flow concentrator 3102 may be used to improve heat transfer from the exhaust gases to the downstream side of the outer heater tubes by directing the flow of hot exhaust gases around the downstream side (i.e. the back side) of the outer heater tubes. As shown in FIG. 31, exhaust flow concentrator 3102 is a cylinder placed outside the bank of heater tubes 3104. The exhaust flow concentrator 3102 may be fabricated from heat resistant alloys, preferably high nickel alloys such as Inconel 600, Inconel 625, Stainless Steels 310 and 316 and more preferably Hastelloy X. Openings 3106 in the exhaust flow concentrator 3102 are lined up with the outer heater tubes. The openings 3106 may be any number of shapes such as a slot, round hole, oval hole, square hole etc. In FIG. 31, the openings 3106 are shown as slots. In some embodiments, the slots 3106 have a width approximately equal to the diameter of a heater tube 3104. The exhaust flow concentrator 3102 is preferably a distance from the outer heater tubes equivalent to one to two heater tube diameters.

Figure 32:
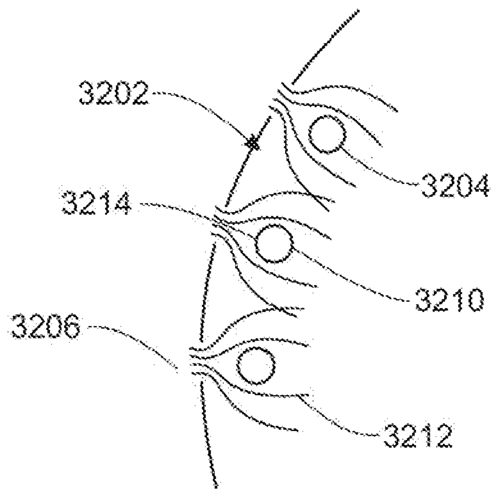
FIG. 32 shows a view of heater tubes of a heat exchanger in accordance with one embodiment.

FIG. 32 illustrates the flow of exhaust gases using the exhaust flow concentrator as shown in FIG. 31. As mentioned above, heat transfer is generally limited to the upstream side 3210 of a heater tube 3204. Using the exhaust flow concentrator 3202, the exhaust gas flow is forced through openings 3206 as shown by arrows 3212. Accordingly, as shown in FIG. 32, the exhaust flow concentrator 3202 increases the exhaust gas flow 3212 past the downstream side 3214 of the heater tubes 3204. The increased exhaust gas flow past the downstream side 3214 of the heater tubes 3204 improves the heat transfer from the exhaust gases to the downstream side 3214 of the heater tubes 3204. This in turn increases the efficiency of heat transfer to the working fluid which can increase the overall efficiency and power of the engine.

Figure 33:
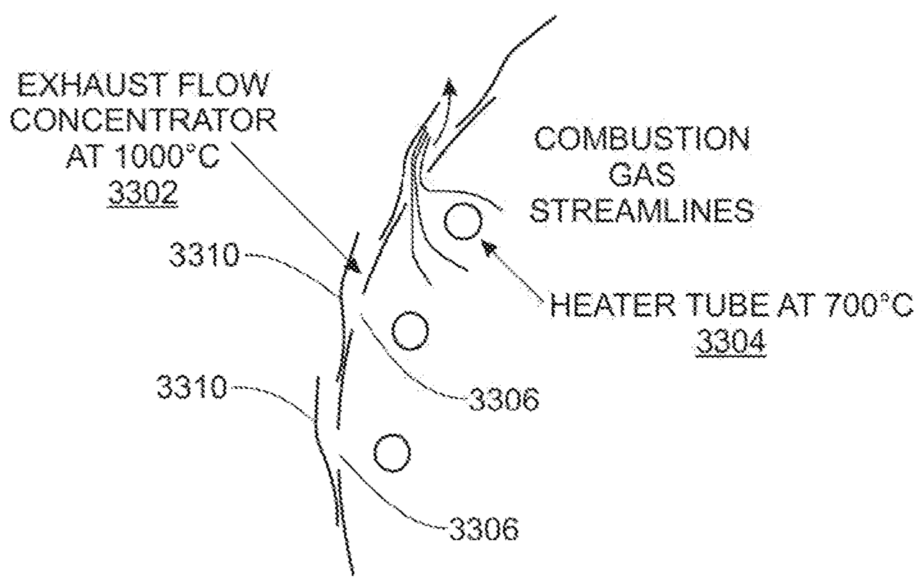
FIG. 33 shows a view of heater tubes of a heat exchanger in accordance with one embodiment.

Returning to FIG. 31, the exhaust flow concentrator 3102 may also improve the heat transfer to the downstream side of the heater tubes 3104 by radiation. Referring to FIG. 33, given enough heat transfer between the exhaust gases and the exhaust flow concentrator, the temperature of the exhaust flow concentrator 3302 will approach the temperature of the exhaust gases. In a some embodiments, the exhaust flow concentrator 3302 does not carry any load and may therefore, operate at 1000.degree. C. or higher. In contrast, the heater tubes 3304 generally operate at 700.degree. C. Due to the temperature difference, the exhaust flow concentrator 3302 may then radiate thermally to the much cooler heater tubes 3304 thereby increasing the heat transfer to the heater tubes 3304 and the working fluid of the engine. Heat transfer surfaces (or fins) 3310 may be added to the exhaust flow concentrator 3302 to increase the amount of thermal energy captured by the exhaust flow concentrator 3302 that may then be transferred to the heater tubes by radiation. Fins 3310 are coupled to the exhaust flow concentrator 3302 at positions outboard of and between the openings 3306 so that the exhaust gas flow is directed along the exhaust flow concentrator, thereby reducing the radiant thermal energy lost through each opening in the exhaust flow concentrator. The fins 3310 are preferably attached to the exhaust flow concentrator 3302 through spot welding. Alternatively, the fins 3310 may be welded or brazed to the exhaust flow concentrator 3302. The fins 3310 should be fabricated from the same material as the exhaust flow concentrator 3302 to minimize differential thermal expansion and subsequent cracking. The fins 3310 may be fabricated from heat resistant alloys, preferably high nickel alloys such as Inconel 600, Inconel 625, Stainless Steels 310 and 316 and more preferably Hastelloy X.

Figure 34:
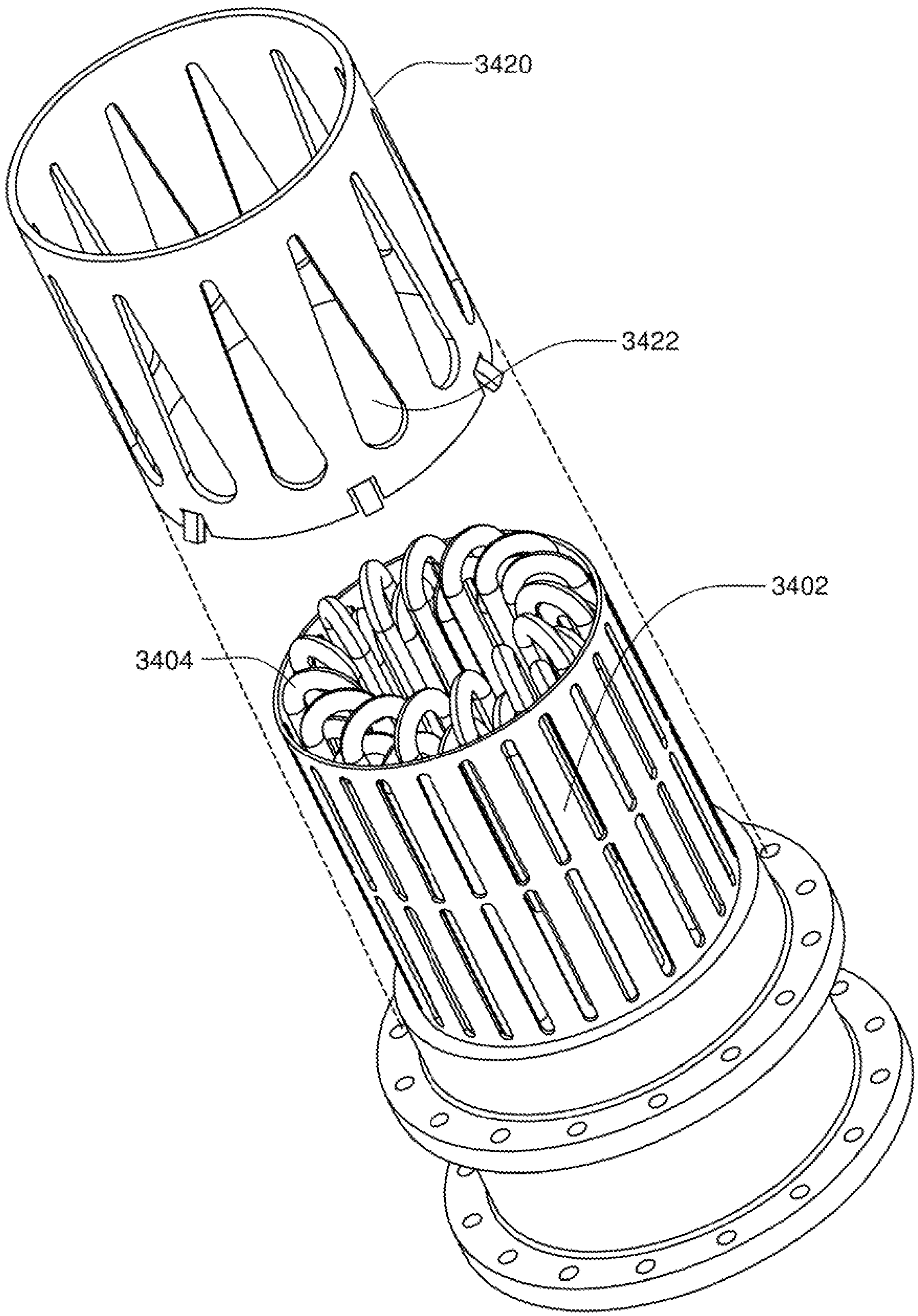
FIG. 34 shows a view of a tube heat exchanger in accordance with one embodiment.

As mentioned above with respect to FIG. 30, the radial flow of the exhaust gases from the burner is greatest closest to the exit of the burner (i.e., the upper U-bend of the heater tubes). This is due in part to the swirl induced in the flow of the exhaust gases and the sudden expansion as the exhaust gases exit the burner. The high exhaust gas flow rates at the top of the heater tubes creates hot spots at the top of the heater tubes and reduces the exhaust gas flow and heat transfer to the lower sections of the heater tubes. Local overheating (hot spots) may result in failure of the heater tubes and thereby the failure of the engine. FIG. 34 is a perspective view of an exhaust flow axial equalizer in accordance with an embodiment. The exhaust flow axial equalizer 3420 is used to improve the distribution of the exhaust gases along the longitudinal axis of the heater tubes 3404 as the exhaust gases flow radially out of the tube heater head. (The typical radial flow of the exhaust gases is shown in FIG. 30.) As shown in FIG. 34, the exhaust flow axial equalizer 3420 is a cylinder with openings 3422. As mentioned above, the openings 3422 may be any number of shapes such as a slot, round hole, oval hole, square hole etc. The exhaust flow axial equalizer 3420 may be fabricated from heat resistant alloys, preferably high nickel alloys including Inconel 600, Inconel 625, Stainless Steels 310 and 316 and more preferably Hastelloy X.

In some embodiments, the exhaust flow axial equalizer 3420 is placed outside of the heater tubes 3404 and an exhaust flow concentrator 3402. Alternatively, the exhaust flow axial equalizer 3420 may be used by itself (i.e., without an exhaust flow concentrator 3402) and placed outside of the heater tubes 3404 to improve the heat transfer from the exhaust gases to the heater tubes 3404. The openings 3422 of the exhaust flow axial equalizer 3420, as shown in FIG. 34, are shaped so that they provide a larger opening at the bottom of the heater tubes 3404. In other words, as shown in FIG. 34, the width of the openings 3422 increases from top to bottom along the longitudinal axis of the heater tubes 3404. The increased exhaust gas flow area through the openings 3422 of the exhaust flow axial equalizer 3420 near the lower portions of the heater tubes 3404 counteracts the tendency of the exhaust gas flow to concentrate near the top of the heater tubes 3404 and thereby equalizes the axial distribution of the radial exhaust gas flow along the longitudinal axis of the heater tubes 3404.

Figure 35:
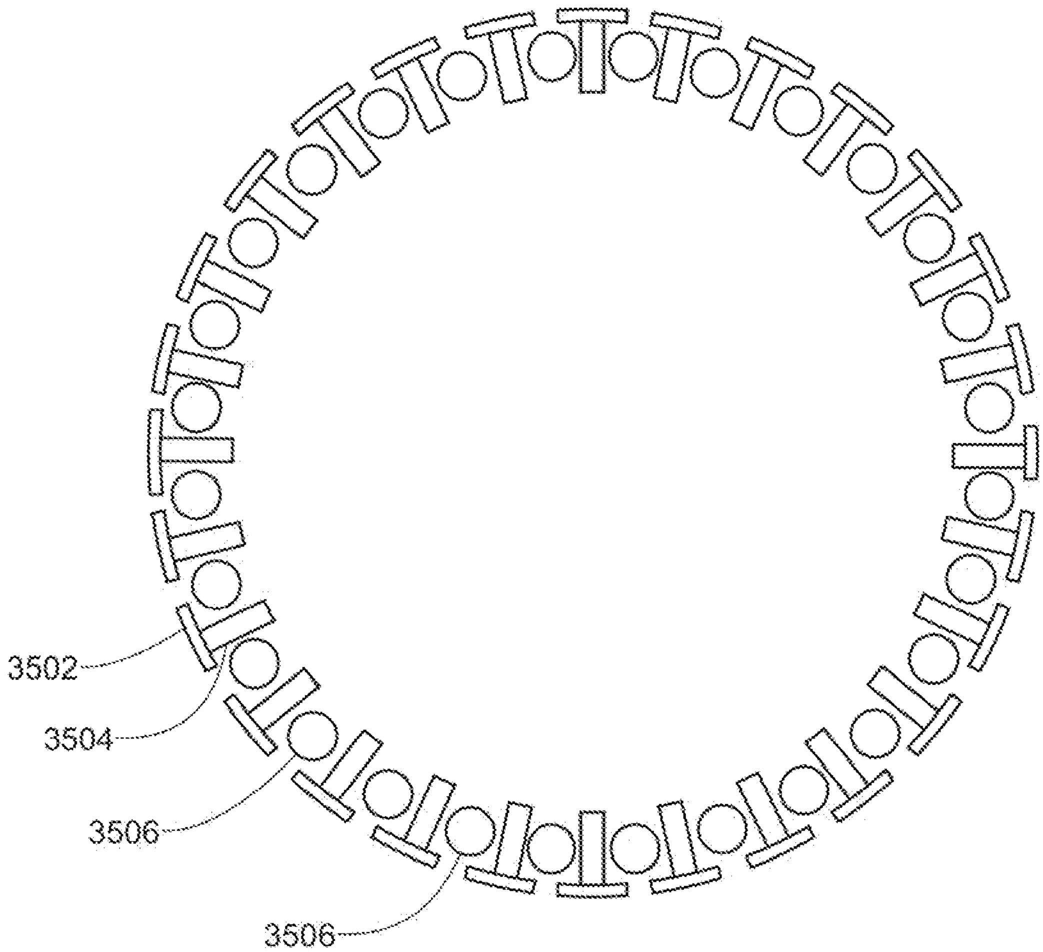
FIG. 35 shows a view of a tube heat exchanger in accordance with one embodiment.

In another embodiment, as shown in FIG. 35, spacing elements 3504 may be added to an exhaust flow concentrator 3502 to reduce the spacing between the heater tubes 3506. Alternatively, the spacing elements 3504 could be added to an exhaust flow axial equalizer 3520 (shown in FIG. 34) when it is used without the exhaust flow concentrator 3504. As shown in FIG. 35, the spacing elements 3504 are placed inboard of and between the openings. The spacers 3504 create a narrow exhaust flow channel that forces the exhaust gas to increase its speed past the sides of heater tubes 3506. The increased speed of the combustion gas thereby increases the heat transfer from the combustion gases to the heater tubes 3506. In addition, the spacing elements may also improve the heat transfer to the heater tubes 3506 by radiation.

Figure 36:
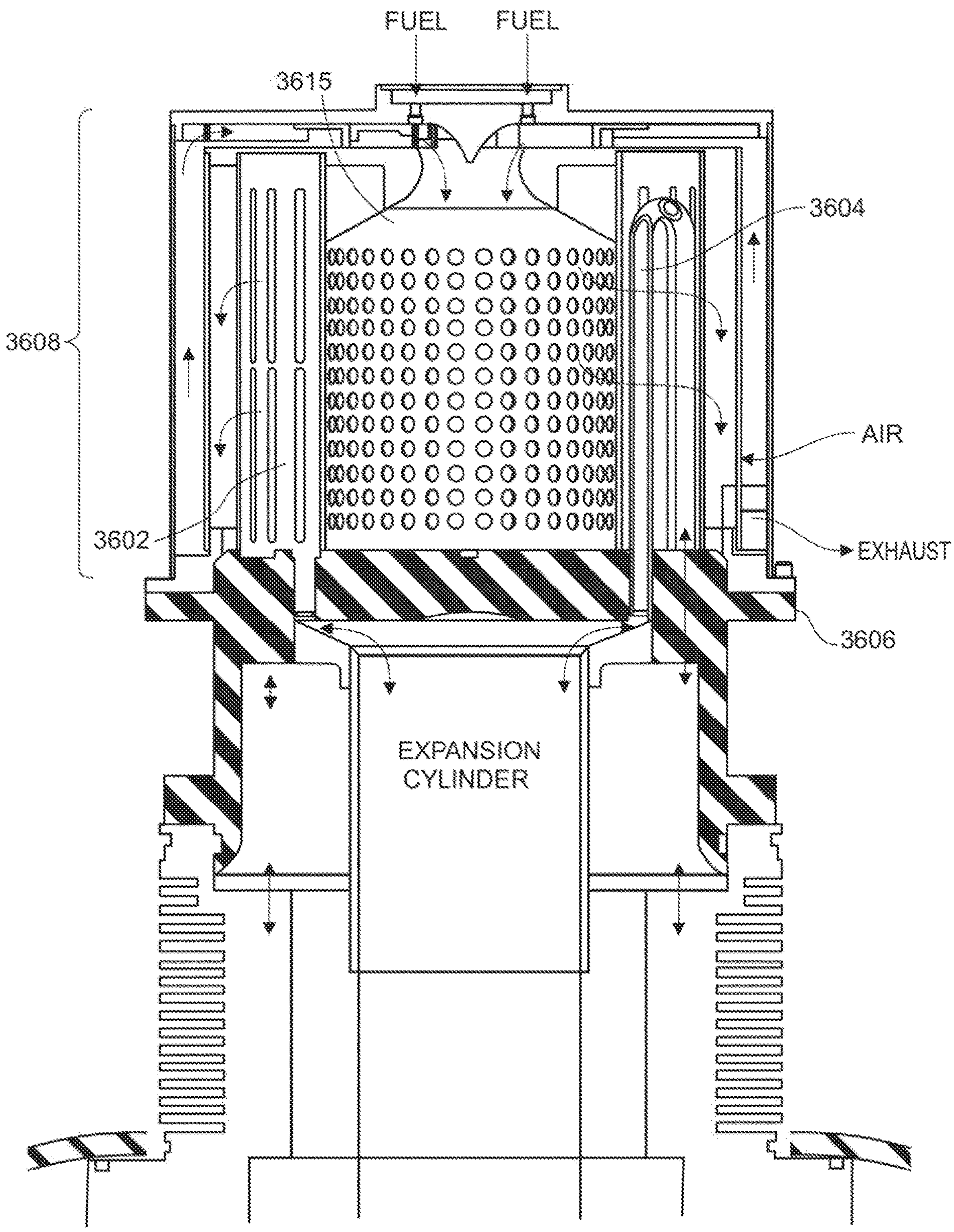
FIG. 36 shows a view of a heater head of an engine in accordance with one embodiment.

FIG. 36 is a cross-sectional side view, of a tube heater head 3606 and burner 3608 in accordance with an alternative embodiment. In this embodiment, a combustion chamber of a burner 3608 is placed inside a set of heater tubes 3604 as opposed to above the set of heater tubes 3604 as shown in FIG. 30. A perforated combustion chamber liner 3615 is placed between the combustion chamber and the heater tubes 3604. Perforated combustion chamber liner 3615 protects the inner heater tubes from direct impingement by the flames in the combustion chamber. Like the exhaust flow axial equalizer 3420, as described above with respect to FIG. 34, the perforated combustion chamber liner 3615 equalizes the radial exhaust gas flow along the longitudinal axis of the heater tubes 3604 so that the radial exhaust gas flow across the top of the heater tubes 3604 (near the U-bend) is roughly equivalent to the radial exhaust gas flow across the bottom of the heater tubes 3604. The openings in the perforated combustion chamber liner 3615 are arranged so that the combustion gases exiting the perforated combustion chamber liner 3615 pass between the inner heater tubes 3604. Diverting the combustion gases away from the upstream side of the inner heater tubes 3604 will reduce the inner heater tube temperature, which in turn allows for a higher burner power and a higher engine power. An exhaust flow concentrator 3602 may be placed outside of the heater tubes 3604. The exhaust flow concentrator 3602 is described above with respect to FIGS. 31 and 32.

Figure 37:
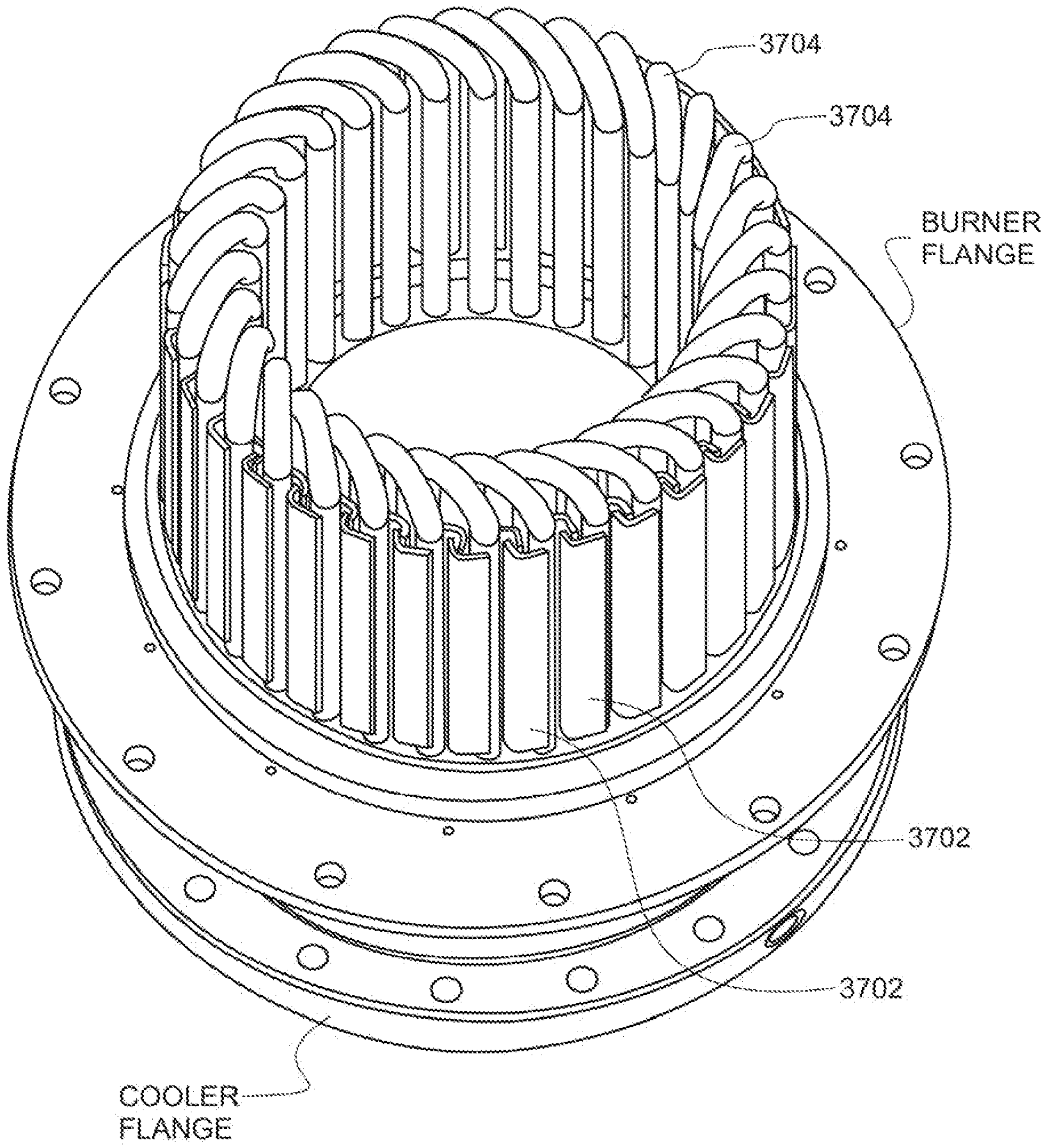
FIG. 37 shows a view of a tube heat exchanger in accordance with one embodiment.

Another method for increasing the heat transfer from the combustion gas to the heater tubes of a tube heater head so as to transfer heat, in turn, to the working fluid of the engine is shown in FIG. 37. FIG. 37 is a perspective view of a tube heater head including flow diverter fins in accordance with an embodiment. Flow diverter fins 3702 are used to direct the exhaust gas flow around the heater tubes 3704, including the downstream side of the heater tubes 3704, in order to increase the heat transfer from the exhaust gas to the heater tubes 3704. Flow diverter fin 3702 is thermally connected to a heater tube 3704 along the entire length of the flow diverter fin. Therefore, in addition to directing the flow of the exhaust gas, flow diverter fins 3702 increase the surface area for the transfer of heat by conduction to the heater tubes 3704, and thence to the working fluid.

Figure 38:
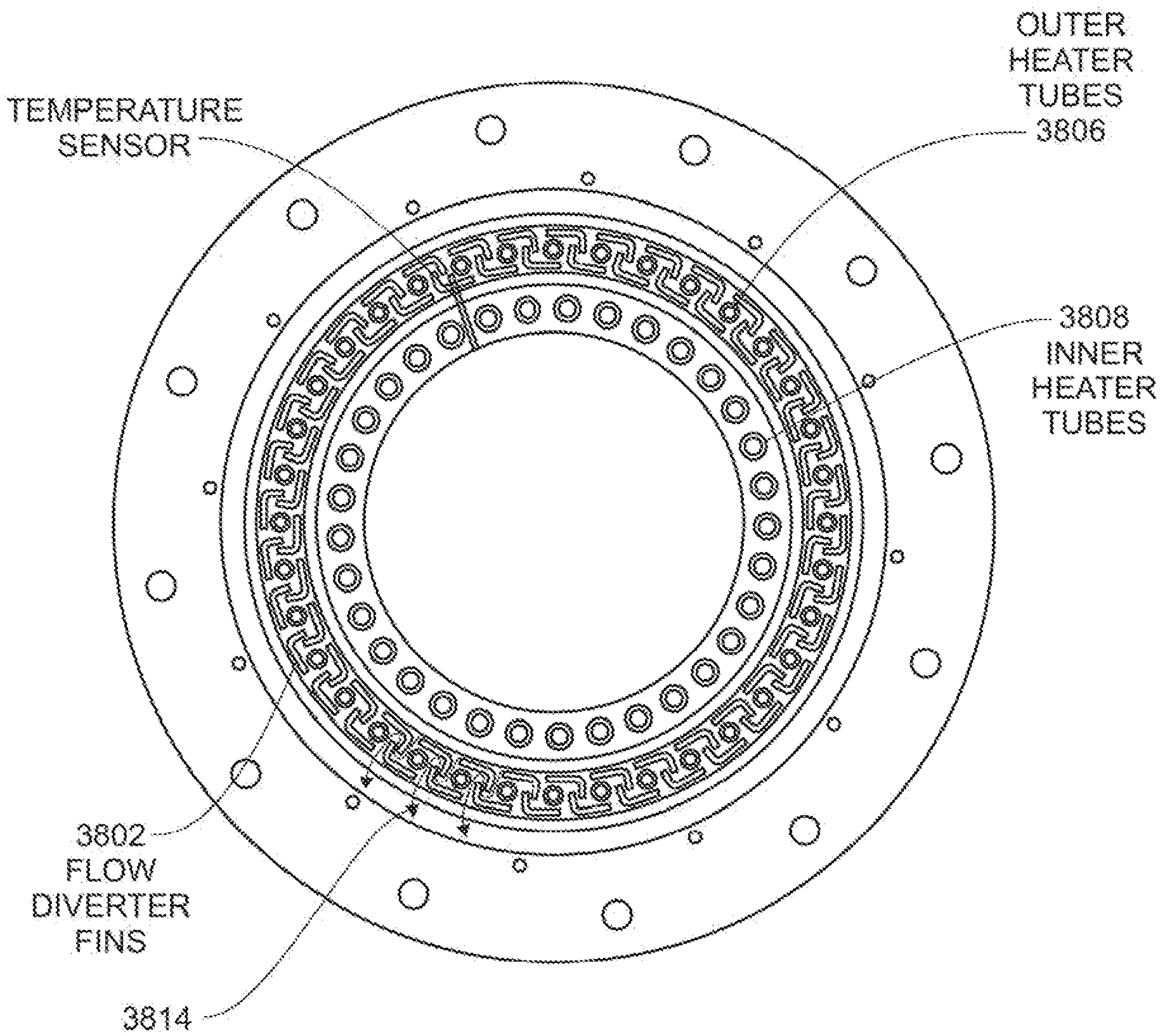
FIG. 38 shows a view of a tube heat exchanger in accordance with one embodiment.

FIG. 38 is a top view in cross-section of a tube heater head including flow diverter fins in accordance with an embodiment. Typically, the outer heater tubes 3806 have a large inter-tube spacing. Therefore, some embodiments as shown in FIG. 38, the flow diverter fins 3802 are used on the outer heater tubes 3806. In an alternative embodiment, the flow diverter fins could be placed on the inner heater tubes 3808 (also shown in FIG. 39 as 3908). As shown in FIG. 38, a pair of flow diverter fins is connected to each outer heater tube 3806. One flow diverter fin is attached to the upstream side of the heater tube and one flow diverter fin is attached to the downstream side of the heater tube. In some embodiments, the flow diverter fins 3802 are "L" shaped in cross section as shown in FIG. 38. Each flow diverter fin 3802 is brazed to an outer heater tube so that the inner (or upstream) flow diverter fin of one heater tube overlaps with the outer (or downstream) flow diverter fin of an adjacent heater tube to form a serpentine flow channel. The path of the exhaust gas flow caused by the flow diverter fins is shown by arrows 3814. The thickness of the flow diverter fins 3802 decreases the size of the exhaust gas flow channel thereby increasing the speed of the exhaust gas flow. This, in turn, results in improved heat transfer to the outer heater tubes 3806. As mentioned above, with respect to FIG. 37, the flow diverter fins 3802 also increase the surface area of the outer heater tubes 3806 for the transfer of heat by conduction to the outer heater tubes 3806.

Figure 39:
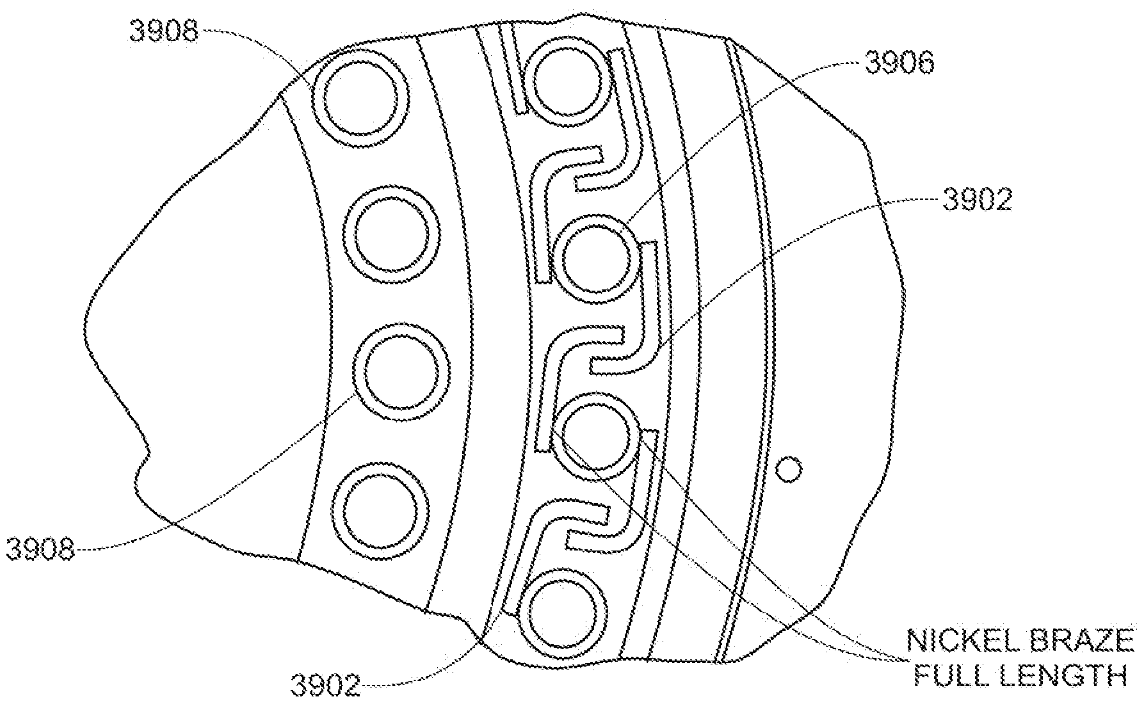
FIG. 39 shows a portion of a cross section of a tube heat exchanger in accordance with one embodiment.

FIG. 39 is a cross-sectional top view of a section of the tube heater head of FIG. 37 in accordance with an embodiment. As mentioned above, with respect to FIG. 38, a pair of flow diverter fins 3902 is brazed to each of the outer heater tubes 3906. In some embodiments, the flow diverter fins 3902 are attached to an outer heater tube 3906 using a nickel braze along the full length of the heater tube. Alternatively, the flow diverter fins could be brazed with other high temperature materials, welded or joined using other techniques known in the art that provide a mechanical and thermal bond between the flow diverter fin and the heater tube.

Figure 40:
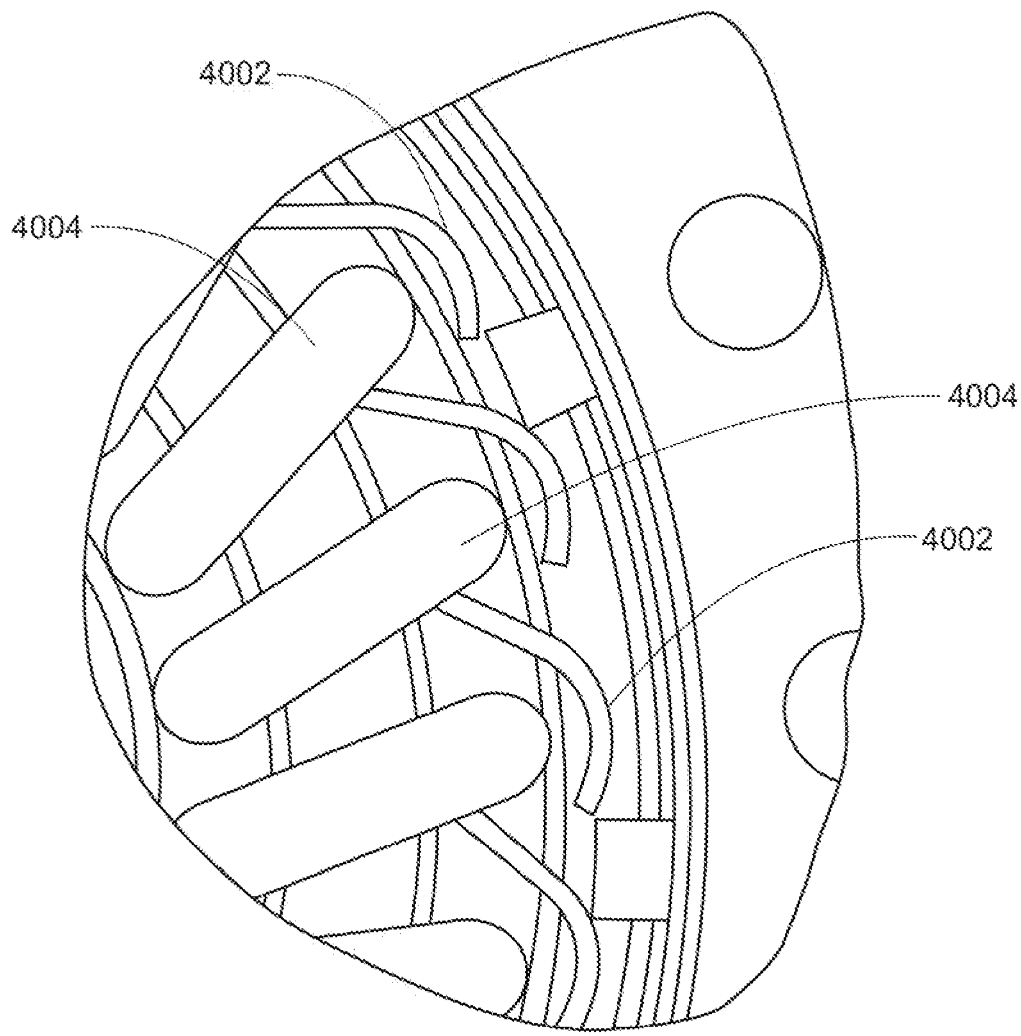
FIG. 40 shows a view of a tube heat exchanger in accordance with one embodiment.

An alternative embodiment of flow diverter fins is shown in FIG. 40. FIG. 40 is a top view of a section of a tube heater head including single flow diverter fins in accordance with an embodiment. In this embodiment, a single flow diverter fin 4002 is connected to each outer heater tube 4004. In some embodiments, the flow diverter fins 4002 are attached to an outer heater tube 4004 using a nickel braze along the full length of the heater tube. Alternatively, the flow diverter fins may be brazed with other high temperature materials, welded or joined using other techniques known in the art that provide a mechanical and thermal bond between the flow diverter fin and the heater tube. Flow diverter fins 4002 are used to direct the exhaust gas flow around the heater tubes 4004, including the downstream side of the heater tubes 4004. In order to increase the heat transfer from the exhaust gas to the heater tubes 4004, flow diverter fins 4002 are thermally connected to the heater tube 4004. Therefore, in addition to directing the flow of exhaust gas, flow diverter fins 4002 increase the surface area for the transfer of heat by conduction to the heater tubes 4004, and thence to the working fluid.

Figure 41:
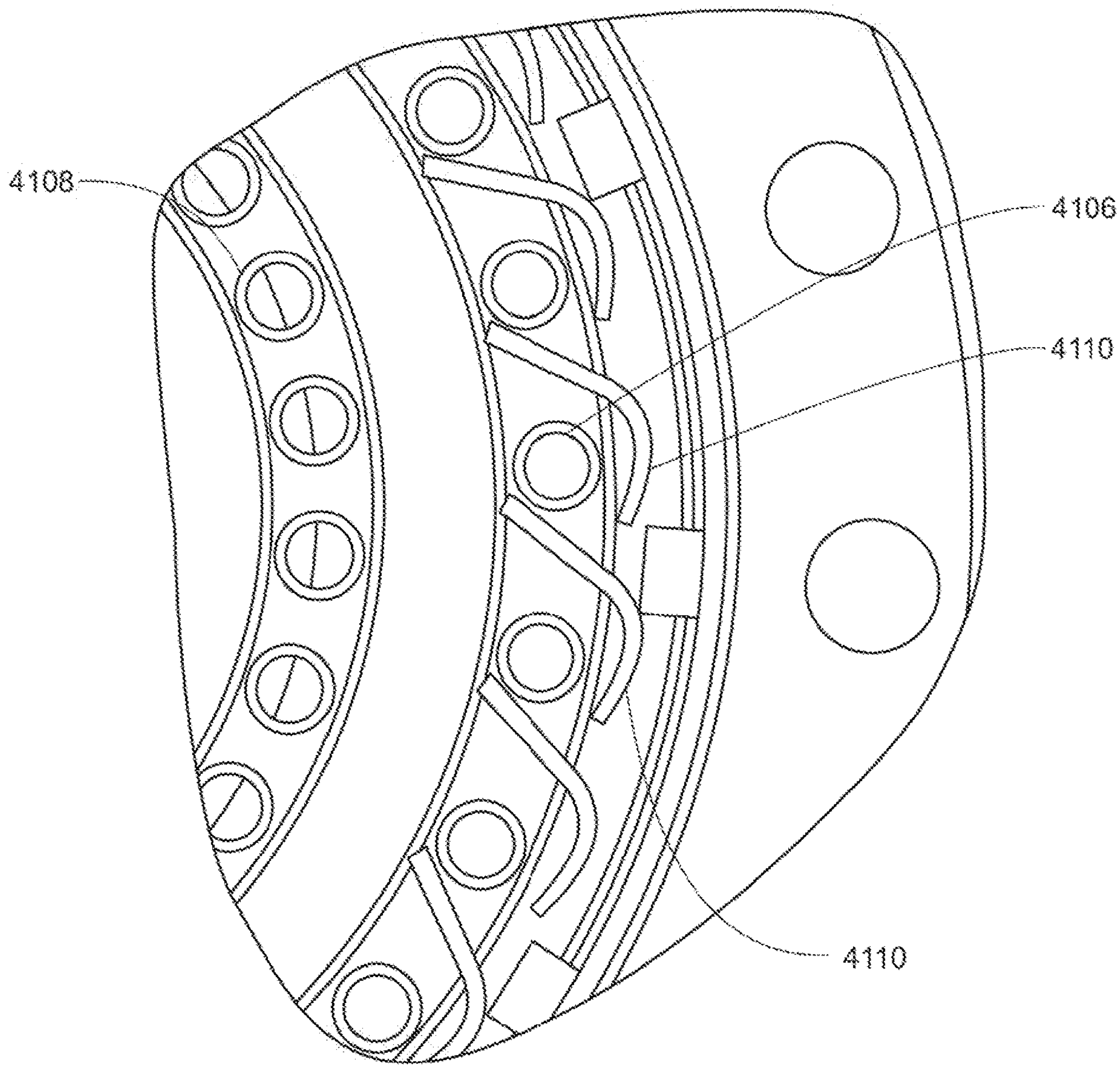
FIG. 41 shows a portion of a cross section of a tube heat exchanger in accordance with one embodiment.

FIG. 41 is a top view in cross-section of a section of a tube heater head including the single flow diverter fins as shown in FIG. 40 in accordance with an embodiment. As shown in FIG. 41, a flow diverter fin 4110 is placed on the upstream side of a heater tube 4106. The diverter fin 4110 is shaped so as to maintain a constant distance from the downstream side of the heater tube 4106 and therefore improve the transfer of heat to the heater tube 4106. In an alternative embodiment, the flow diverter fins could be placed on the inner heater tubes 4108.

Engine performance, in terms of both power and efficiency, is highest at the highest possible temperature of the working gas in the expansion volume of the engine. The maximum working gas temperature, however, is typically limited by the properties of the heater head. For an external combustion engine with a tube heater head, the maximum temperature is limited by the metallurgical properties of the heater tubes. If the heater tubes become too hot, they may soften and fail resulting in engine shut down. Alternatively, at too high of a temperature the tubes will be severely oxidized and fail. It is, therefore, important to engine performance to control the temperature of the heater tubes. A temperature sensing device, such as a thermocouple, may be used to measure the temperature of the heater tubes. The temperature sensor mounting scheme may thermally bond the sensor to the heater tube and isolate the sensor from the much hotter combustion gases. The mounting scheme should be sufficiently robust to withstand the hot oxidizing environment of the combustion-gas and impinging flame that occur near the heater tubes for the life of the heater head. One set of mounting solutions include brazing or welding thermocouples directly to the heater tubes. The thermocouples would be mounted on the part of the heater tubes exposed to the hottest combustion gas. Other possible mounting schemes permit the replacement of the temperature sensor. In one embodiment, the temperature sensor is in a thermowell thermally bonded to the heater tube. In another embodiment, the mounting scheme is a mount, such as a sleeve, that mechanically holds the temperature sensor against the heater tube.

Figure 42:
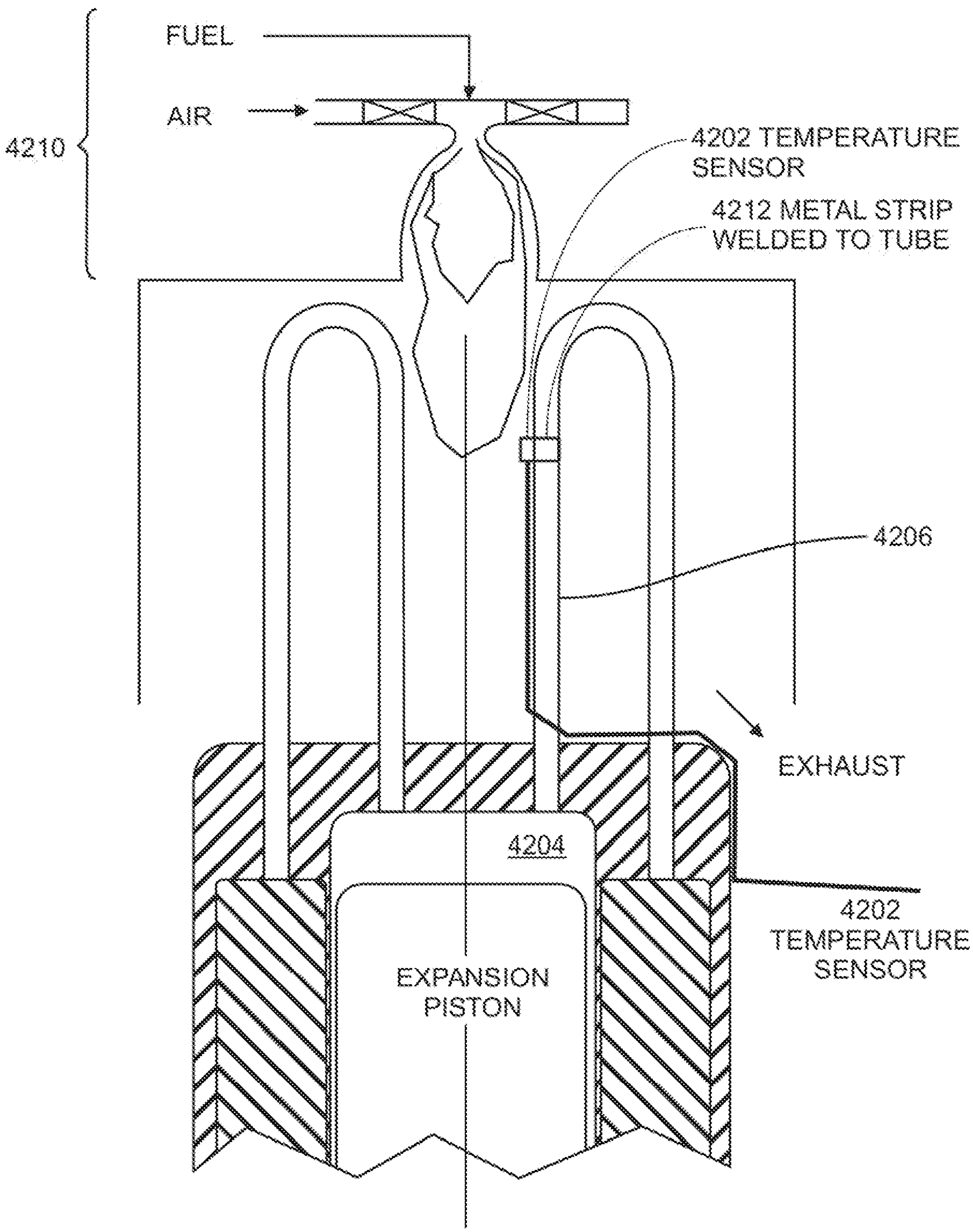
FIG. 42 shows a view of a heater head of an engine in accordance with one embodiment.

FIG. 42 is a side view in cross section of a cylinder 4204 and a burner 4210. A temperature sensor 4202 is used to monitor the temperature of the heater tubes and provide feedback to a fuel controller (not shown) of the engine in order to maintain the heater tubes at the desired temperature. In some embodiments, the heater tubes are fabricated using Inconel 625 and the desired temperature is 930.degree. C. The desired temperature will be different for other heater tube materials. The temperature sensor 4202 should be placed at the hottest, and therefore the limiting, part of the heater tubes. Generally, the hottest part of the heater tubes will be the upstream side of an inner heater tube 4206 near the top of the heater tube. FIG. 42 shows the placement of the temperature sensor 4202 on the upstream side of an inner heater tube 4206. In some embodiments, as shown in FIG. 42, the temperature sensor 4202 is clamped to the heater tube with a strip of metal 4212 that is welded to the heater tube in order to provide good thermal contact between the temperature sensor 4202 and the heater tube 4206. In one embodiment, both the heater tubes 4206 and the metal strip 4212 may be Inconel 625 or other heat resistant alloys such as Inconel 600, Stainless Steels 310 and 316 and Hastelloy X. The temperature sensor 4202 should be in good thermal contact with the heater tube, otherwise it may read too high a temperature and the engine will not produce as much power as possible. In an alternative embodiment, the temperature sensor sheath may be welded directly to the heater tube.

Figure 43A:
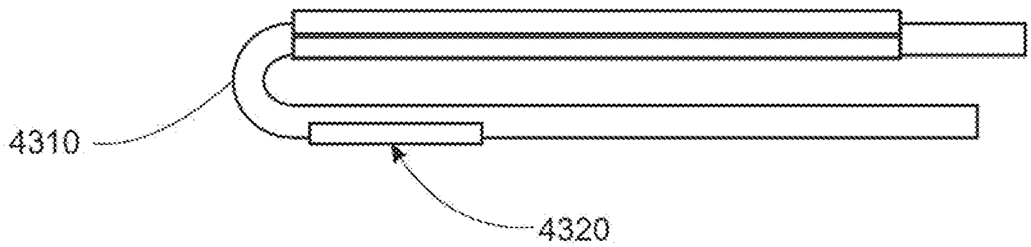
FIG. 43A shows a view of a tube heat exchanger in accordance with one embodiment.
Figure 43B:
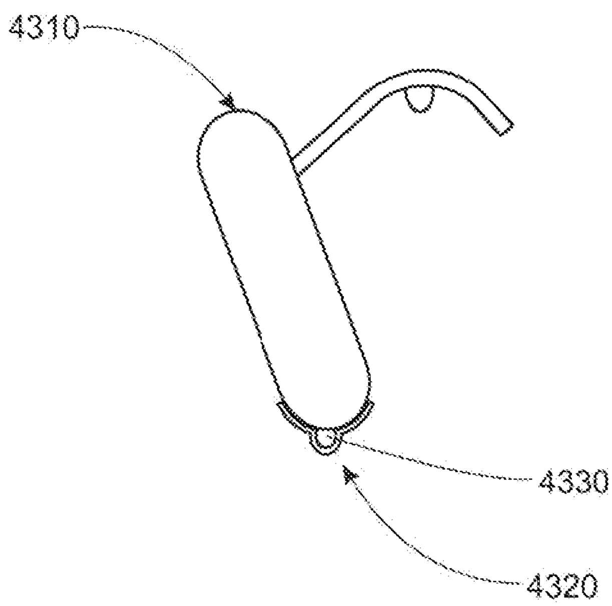
FIG. 43B shows a view of a tube heat exchanger in accordance with one embodiment.

In another embodiment, as shown in FIG. 43A-B, a temperature sensor mount 4320 is created with a formed strip or sheath of a refractory or high temperature resistant metal such as Inconel that is bonded to the exterior of the heater tube 4310. The sensor mount sheath 4320 is formed or shaped into a channel that when attached to the heater tube creates a void that accommodates a device. In a specific embodiment, the channel is V-shaped to accommodate the insertion of a thermal sensor such as a thermocouple device. The shaped channel is then bonded to the exterior of a heater tube 4310 as shown in FIG. 43A.

FIG. 43A shows a side view of the sensor mount sheath 4320 on the heater tube 4310, while FIG. 43B is a view along the axis of the sensor mount sheath 4320. The metal should be thin enough to form, yet thick enough to survive for the rated life of the heater head. In some embodiments, the metal is approximately between 0.005" and 0.020" thick. The metal may be bent such that the bend is along the length of the strip. This "V-channel" sheath 4320 is then affixed to the exterior of the heater tube by high temperature brazing. Prior to brazing, the sheath may be tack welded in several places to insure that the sheath does not move during the brazing process, as shown in FIG. 43A. Preferably, the braze compound used during brazing is typically a high nickel alloy; however, any compound which will withstand the brazing temperature will work. Alternatively the sheath may be bonded to the heater tube by electron beam or laser welding.

Now referring to FIG. 43B, a cavity 4330 is formed by affixing the sheath to the heater tube. This cavity 4330 is formed such that it may accept a device such as a thermocouple. When formed and brazed, the cavity may advantageously be sized to fit the thermocouple. Preferably, the fit is such that the thermocouple is pressed against the exterior of the heater tube. Preferably, the sheath is thermally connected to the heater tube. If the sheath is not thermally connected to the heater tube, the sheath may not be "cooled" by the working gas. The lack of cooling may cause the sheath to operate at or near the combustion gas temperatures, which are typically high enough to eventually burn through any metal. Brazing the sensor mount to the heater tube leads to a good thermal contact. Alternatively, the sensor mount sheath 4320 could be continuously welded along both sides to provide sufficient thermal connection.

Figure 44A:
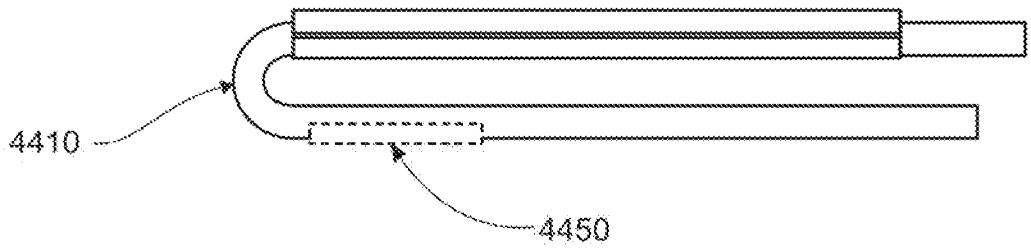
FIG. 44A shows a view of a tube heat exchanger in accordance with one embodiment.
Figure 44B:
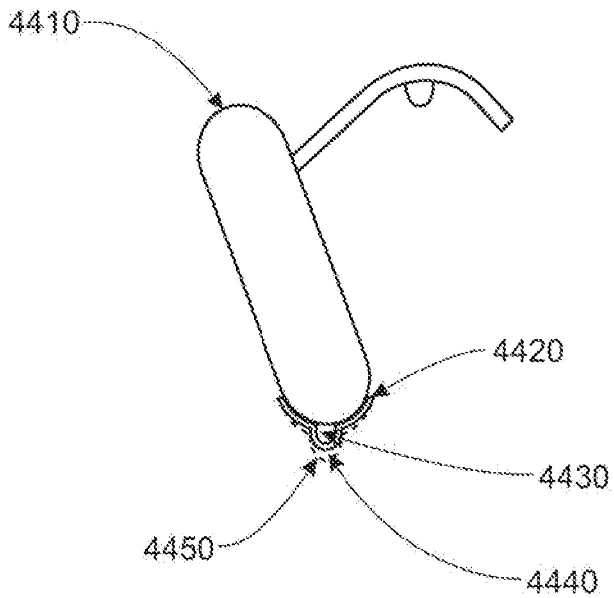
FIG. 44B shows a view of a tube heat exchanger in accordance with one embodiment.

In another embodiment, as shown in FIGS. 44A-B, a second strip of metal can be formed to create a shield 4450 over the sensor mount 4420. The shield 4420 may be used to improve the thermal connection between the temperature sensor, in cavity 4430, and the heater tube 4410. The shield insulates the sensor mount sheath 4420 from the convective heating of the hot combustion gases and thus improves the thermal connection to the heater tube. Furthermore, there is preferably an insulating space 4440 to help further insulate the temperature sensor from the hot combustion gases as shown in FIG. 44B.

Figure 45A:
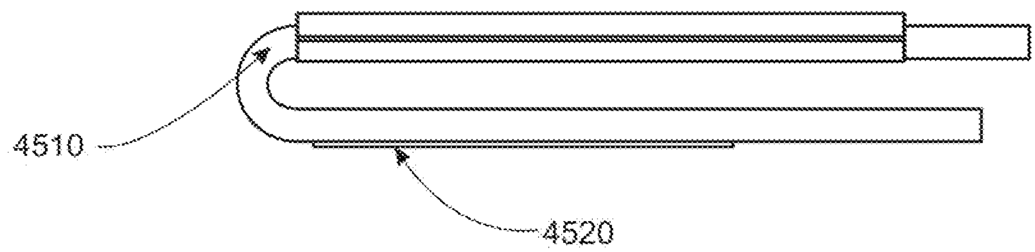
FIG. 45A shows view of a tube heat exchanger in accordance with one embodiment.
Figure 45B:
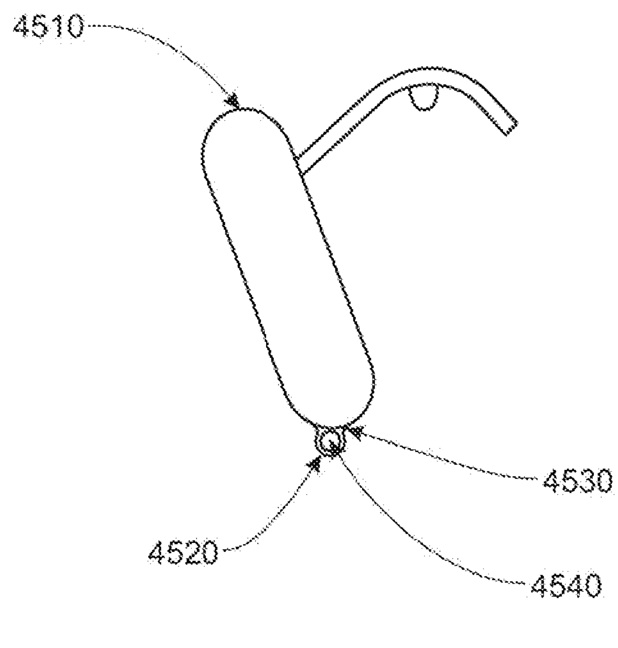
FIG. 45B shows a view of a tube heat exchanger in accordance with one embodiment.

In another specific embodiment, as shown in FIGS. 45A and 45B, the temperature sensor mount 4520 can be a small diameter tube or sleeve 4540 joined to the leading edge of the heater tube 4510. FIG. 45A shows a side view of the mount on the heater tube 4510, while FIG. 45B is a view along the axis of the tube 4540 or sleeve. The sensor tube 4540 is preferably brazed to the heater tube with a substantial braze fillet 4530. The large braze fillet 4530 will maximize the thermal bond between the heater tube and the sensor mount. In another embodiment, the tube or sleeve 4540 may have a shield. As described supra, an outer shield cover may help insulate the temperature sensor mount 4520 from convective heat transfer and improve the thermal connection to the heater tube.

In an alternative embodiment of the tube heater head, the U-shaped heater tubes may be replaced with several helical wound heater tubes. Typically, fewer helical shaped heater tubes are required to achieve similar heat transfer between the exhaust gases and the working fluid. Reducing the number of heater tubes reduces the material and fabrication costs of the heater head. In general, a helical heater tube does not require the additional fabrication steps of forming and attaching fins. In addition, a helical heater tube provides fewer joints that could fail, thus increasing the reliability of the heater head.

Figure 46A:
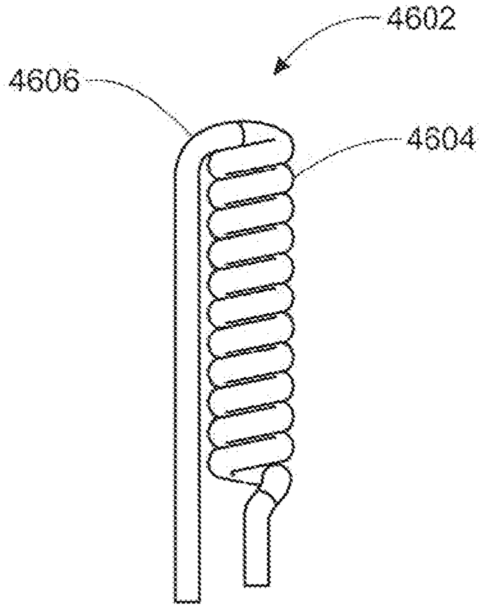
FIGS. 46A-46D show various configurations of a tube heat exchanger in accordance with various embodiments.
Figure 46B:
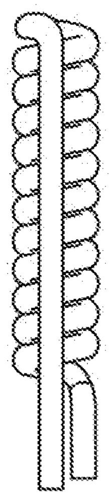
Figure 46C:
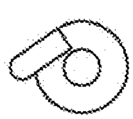
Figure 46D:
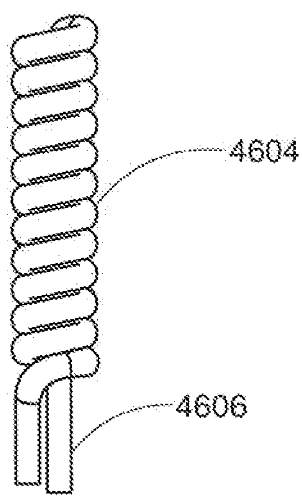
Figure 47:
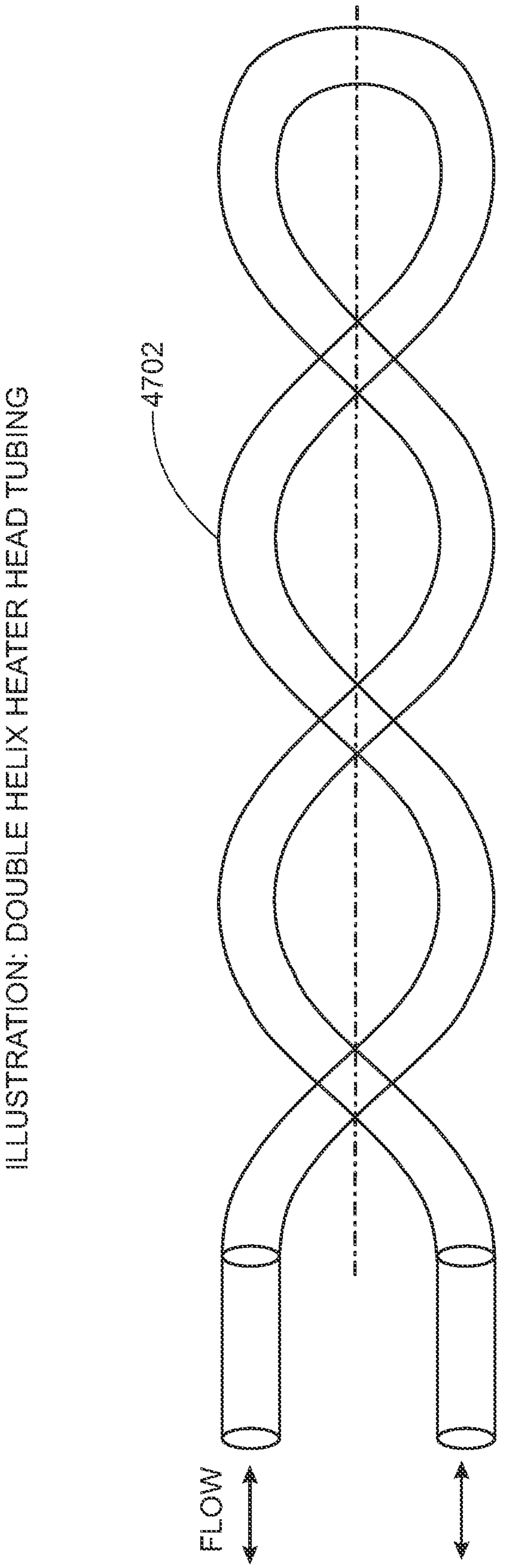
FIG. 47 shows a view of a tube heat exchanger in accordance with one embodiment.

FIGS. 46A-46D are perspective views of a helical heater tube in accordance some embodiments. The helical heater tube, 4602, as shown in FIG. 46A, may be formed from a single long piece of tubing by wrapping the tubing around a mandrel to form a tight helical coil 4604. The tube is then bent around at a right angle to create a straight return passage out of the helix 4606. The right angle may be formed before the final helical loop is formed so that the return can be clocked to the correct angle. FIGS. 46B and 46C show further views of the helical heater tube. FIG. 46D shows an alternative embodiment of the helical heater tube in which the straight return passage 4606 goes through the center of the helical coil 4604. FIG. 47 shows a helical heater tube in accordance with one embodiment. In FIG. 47, the helical heater tube 4702 is shaped as a double helix. The heater tube 4702 may be formed using a U-shaped tube wound to form a double helix.

Figure 48:
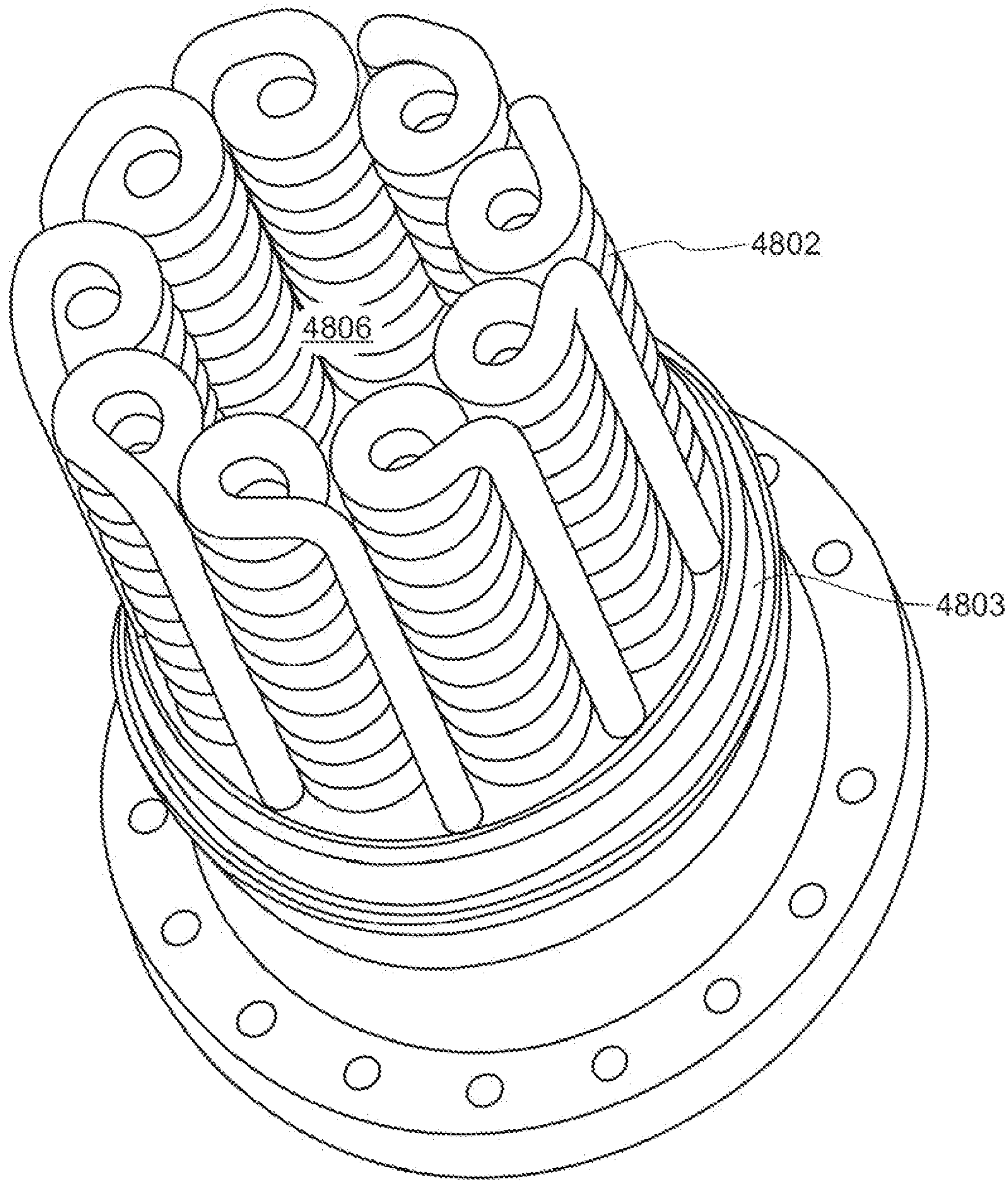
FIG. 48 shows a view of a tube heat exchanger in accordance with one embodiment.

FIG. 48 is a perspective view of a tube heater head with helical heater tubes (as shown in FIG. 46A) in accordance with one embodiment. Helical heater tubes 4802 are mounted in a circular pattern on the top of a heater head 4803 to form a combustion chamber 4806 in the center of the helical heater tubes 4802. The helical heater tubes 4802 provide a significant amount of heat exchange surface around the outside of the combustion chamber 4806.

Figure 49:
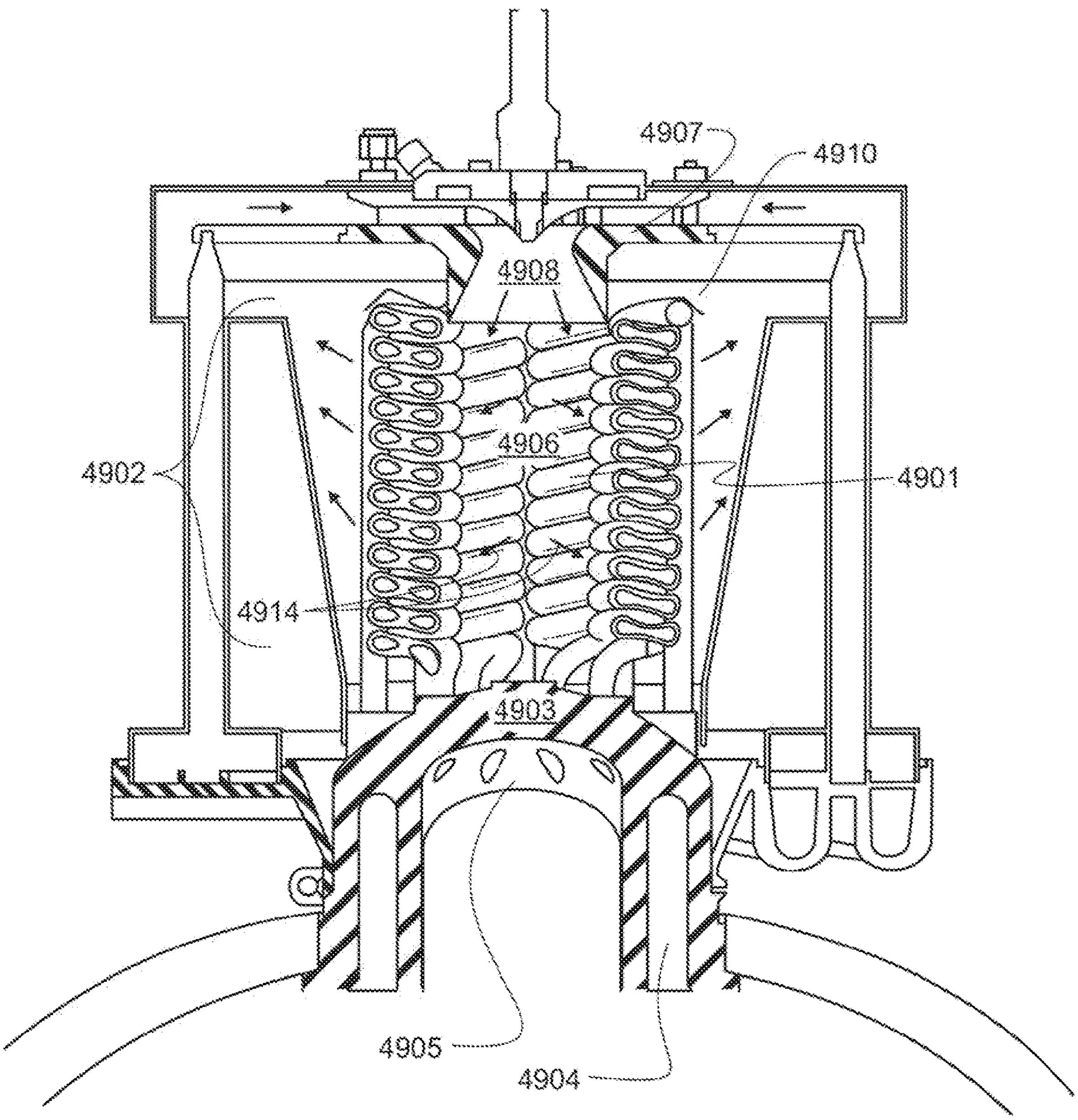
FIG. 49 shows a view of a heater head of an engine in accordance with one embodiment.

FIG. 49 is a cross sectional view of a burner and a tube heater head with helical heater tubes in accordance with some embodiments. Helical heater tubes 4902 connect the hot end of a regenerator 4904 to a cylinder 4905. The helical heater tubes 4902 are arranged to form a combustion chamber 4906 (also shown in FIG. 50 as 5006) for a burner 4907 that is mounted coaxially and above the helical heater tubes 4902. Fuel and air are mixed in a throat 4908 of the burner 4907 and combusted in the combustion chamber 4906. The hot combustion (or exhaust) gases flow, as shown by arrows 4914, across the helical heater tubes 4902, providing heat to the working fluid as it passes through the helical heater tubes 4902.

In one embodiment, the heater head 4903 (also shown in FIG. 50 as 5003) further includes a heater tube cap 4910 at the top of each helical coiled heater tubes 4902 to prevent the exhaust gas from entering the helical coil portion 4901 (also shown in FIG. 50 as 5001) of each heater tube and exiting out the top of the coil. In another embodiment, an annular shaped piece of metal covers the top of all of the helical coiled heater tubes. The heater tube cap 4910 prevents the flow of the exhaust gas along the heater head axis to the top of the helical heater tubes between the helical heater tubes. In one embodiment, the heater tube cap 4910 may be Inconel 625 or other heat resistant alloys such as Inconel 600, Stainless Steels 310 and 316 and Hastelloy X.

In another embodiment, the top of the heater head 4903 under the helical heater tubes 4902 is covered with a moldable ceramic paste. The ceramic paste insulates the heater head 4903 from impingement heating by the flames in the combustion chamber 4906 as well as from the exhaust gases. In addition, the ceramic blocks the flow of the exhaust gases along the heater head axis to the bottom of the helical heater tubes 4902 either between the helical heater tubes 4902 or inside the helical coil portion 4901 of each heater tube.

Figure 50:
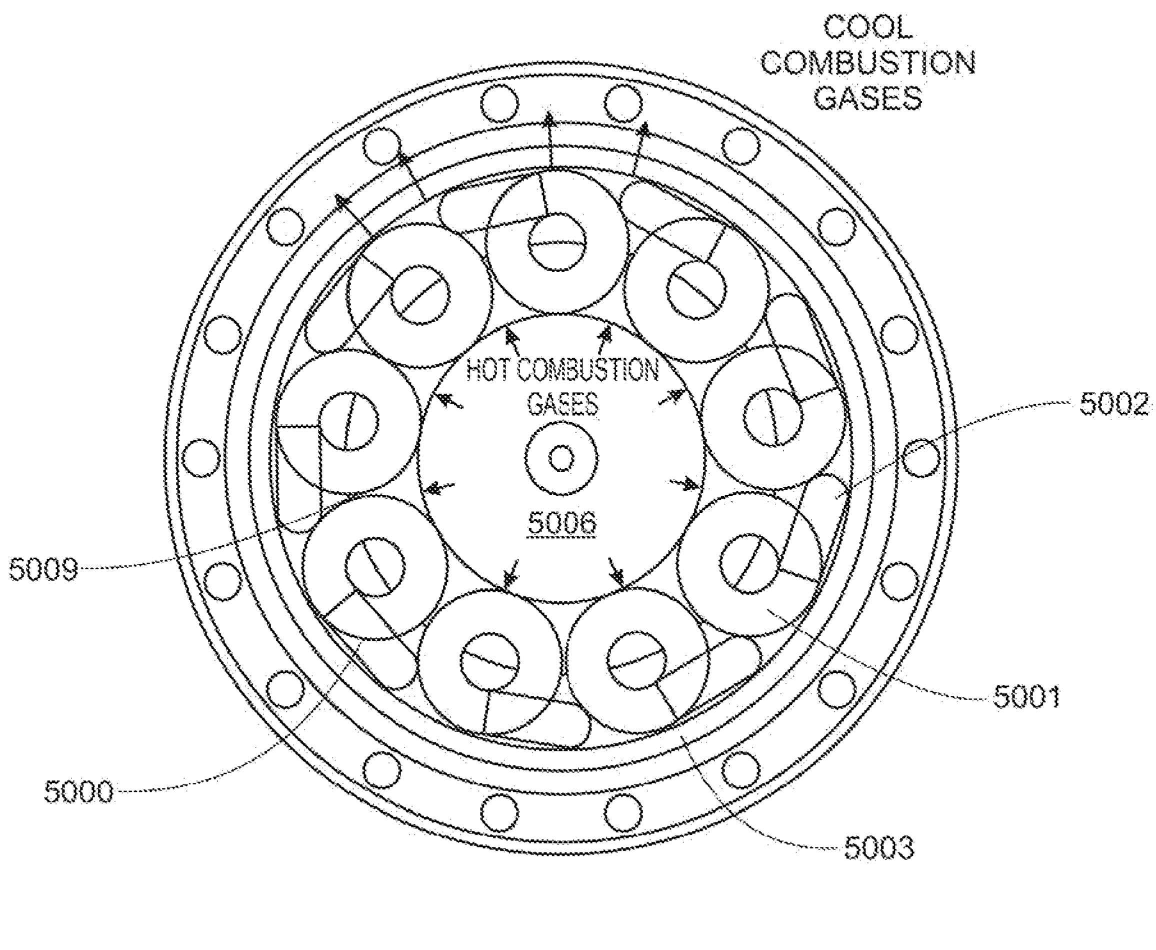
FIG. 50 shows a view of a tube heat exchanger in accordance with one embodiment.

FIG. 50 is a top view of a tube heater head with helical heater tubes in accordance with one embodiment. As shown in FIG. 50, the return or straight section 5002 of each helical heater tube 5000 is advantageously placed outboard of gap 5009 between adjacent helical heater tubes 5000. It is important to balance the flow of exhaust gases through the helical heater tubes 5000 with the flow of exhaust gases through the gaps 5009 between the helical heater tubes 5000. By placing the straight portion 5002 of the helical heater tube outboard of the gap 5009, the pressure drop for exhaust gas passing through the helical heater tubes is increased, thereby forcing more of the exhaust gas through the helical coils where the heat transfer and heat exchange area are high. Exhaust gas that does not pass between the helical heater tubes will impinge on the straight section 5002 of the helical heater tube, providing high heat transfer between the exhaust gases and the straight section. Both FIGS. 49 and 50 show the helical heater tubes placed as close together as possible to minimize the flow of exhaust gas between the helical heater tubes and thus maximize heat transfer. In one embodiment, the helical coiled heater tubes 4901 may be arranged so that the coils nest together.

Pin or Fin Heat Exchanger

Figure 51A:
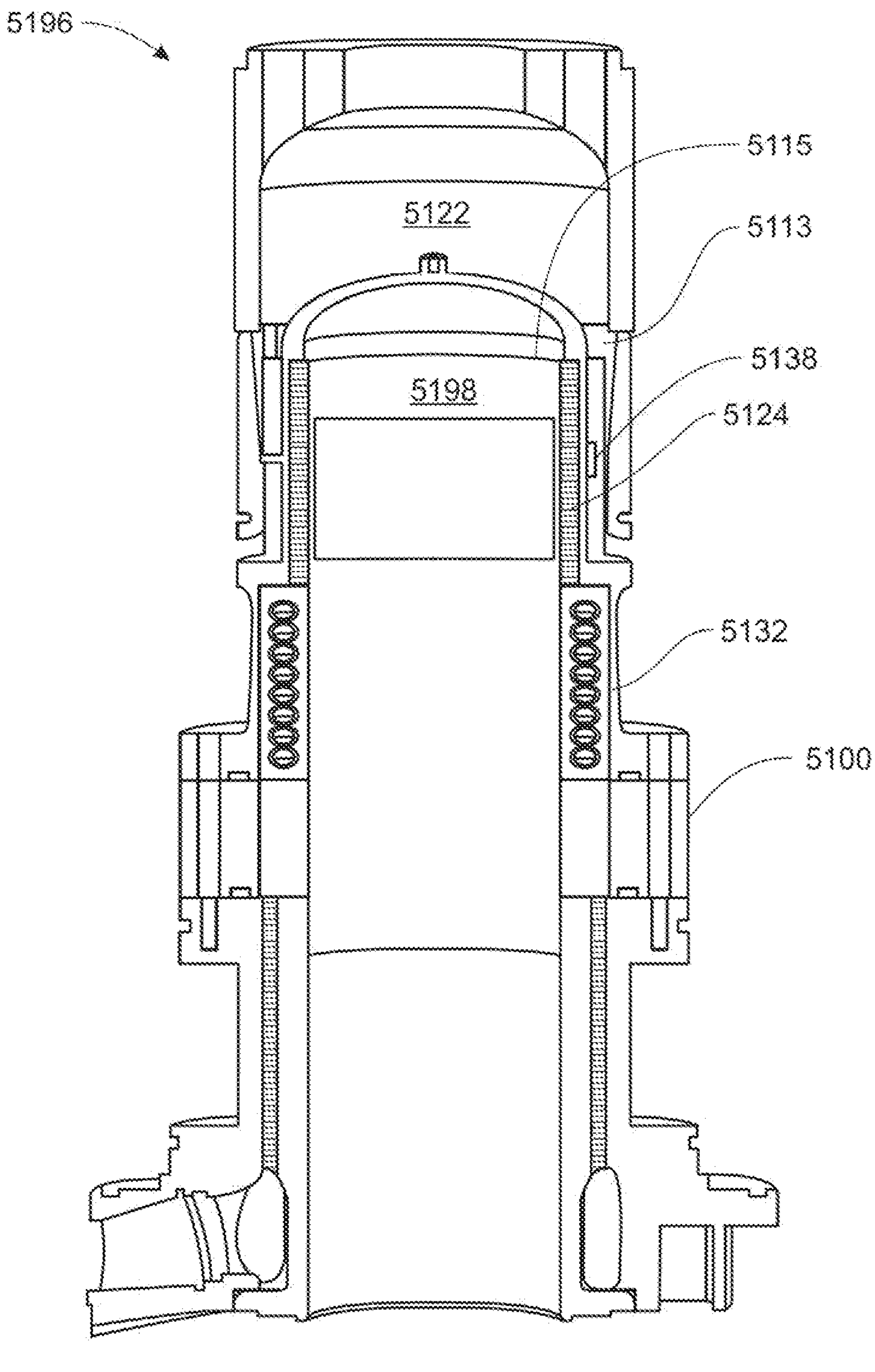
FIGS. 51A and 51B show views of heat exchangers of an engine in accordance with various embodiments.
Figure 51B:
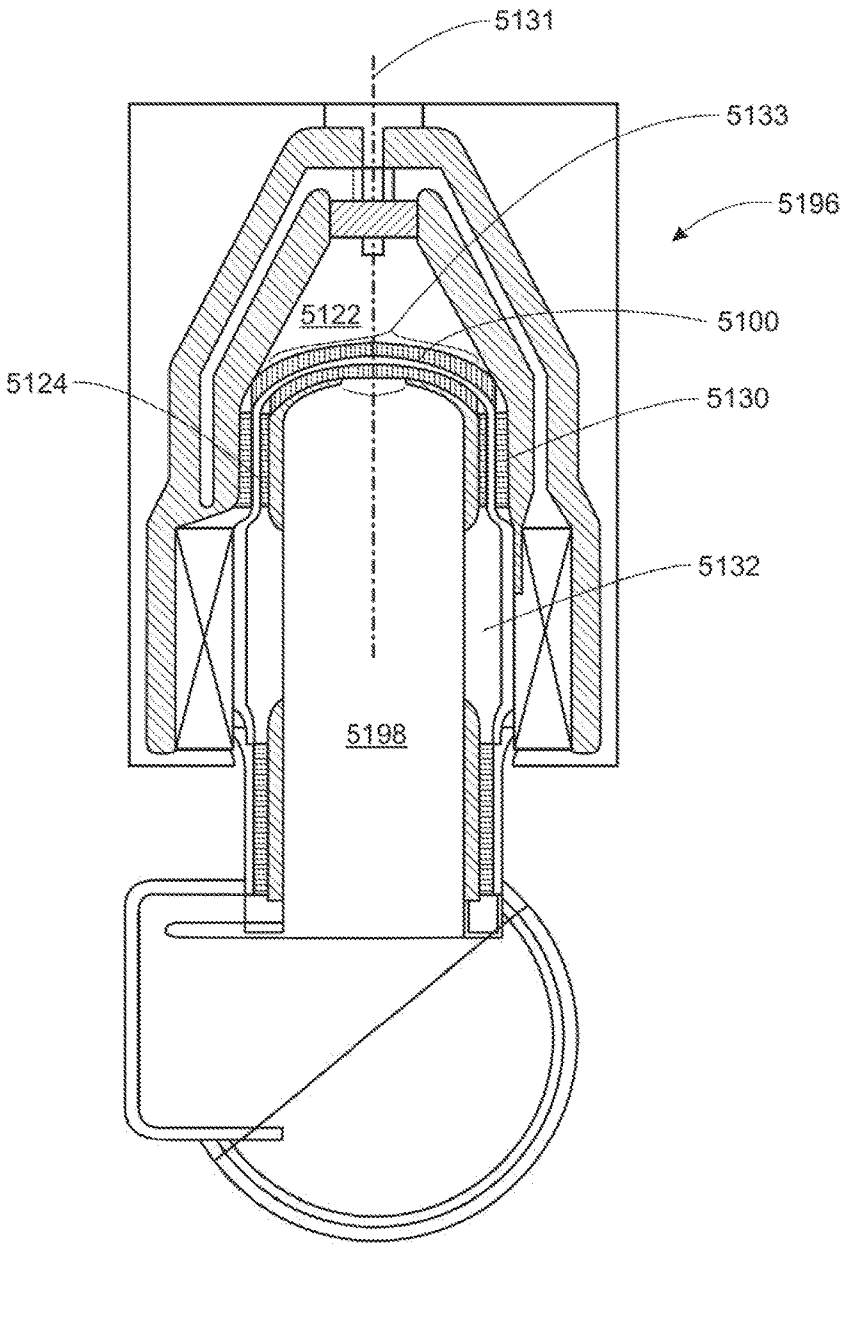

Now referring to FIGS. 51A and 51B, fins or pins may alternatively be used to increase the interfacial area between the hot fluid combustion products and the solid heater head so as to transfer heat, in turn, to the working fluid of the engine. Heater head 5100 may have heat transfer pins 5124, here shown on the interior surface of heater head 5100, in the space between the heater head and expansion cylinder liner 5115. Additionally, as shown in FIG. 51B in a cross section of Stirling cycle engine 5196 taken along a different diameter of expansion volume 5198 from that of FIG. 51A, heat transfer pins 5130 may also be disposed on the exterior surface of heater head 5100 so as to provide a large surface area for the transfer of heat by conduction to heater head 5100, and thence to the working fluid, from combustion gases flowing from combustor 5122 past the heat transfer pins. Dashed line 5131 represents the longitudinal axis of the expansion cylinder. FIG. 51B also shows heat transfer pins 5133 lining the interior and exterior surfaces of the top of heater head 5100, in accordance with one embodiment. Interior-facing heat transfer pins 5124 serve to provide a large surface area for the transfer of heat by conduction from heater head 5100 to working fluid displaced from expansion volume 5198 by the expansion piston and driven through regenerator chamber 5132. Additional embodiments of heater head 5100 are disclosed in U.S. Pat. Nos. 6,381,958, and 6,966,182, which, as previously mentioned, are incorporated by reference in their entireties.

Depending on the size of heater head 5100, hundreds or thousands of inner transfer pins 5124 and outer heat transfer pins 5130 may be desirable.

One method for manufacturing heater head 5100 with heat transfer pins 5124 and 5130 includes casting the heater head and pins (or other protuberances) as an integral unit.

Casting methods for fabricating the heater head and pins as an integral unit include, for example, investment casting, sand casting, or die casting.

While the use of pin fins is known for improving heat transfer between a surface and a fluid, the integral casting of radial pin fins on the cylindrical heater head of a Stirling engine has not been practiced nor suggested in the art, despite the fact that casting the heater head and it's heat exchange surfaces in a single step is one of the most cost effective methods to produce a heater head. The difficulty encountered in integral casting of radial pin fins is discussed further below. A pin fin that could be cast as part of cylindrical wall would allow the inexpensive fabrication of a highly effective heater head and/or cooler for a Stirling engine.

Castings are made by creating negative forms of the desired part. All forms of production casting (sand, investment and injection) involves forming extended surfaces and details by injecting material into a mold and then removing the mold from the material leaving the desired negative or positive form behind. Removing the mold from the material requires that all the extended surfaces are at least parallel. In fact, good design practice requires slight draft on these extended surfaces so that they release cleanly. Forming radial pins on the outside or inside of a cylinder would require the molds to contain tens or hundreds of parts that pull apart in different directions. Such a mold would be cost prohibitive.

Figure 52A:
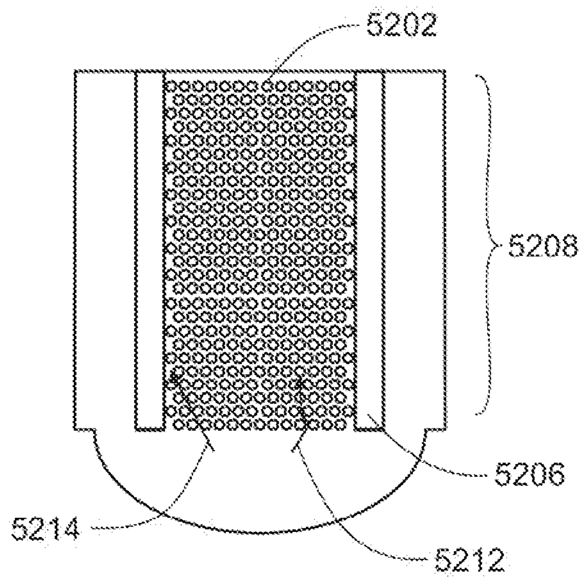
FIGS. 52A-52C show various views of a heat exchanger in accordance with one embodiment.
Figure 52B:
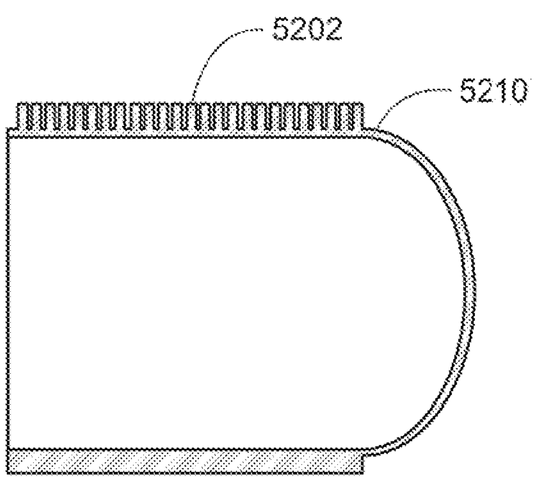
Figure 52C:
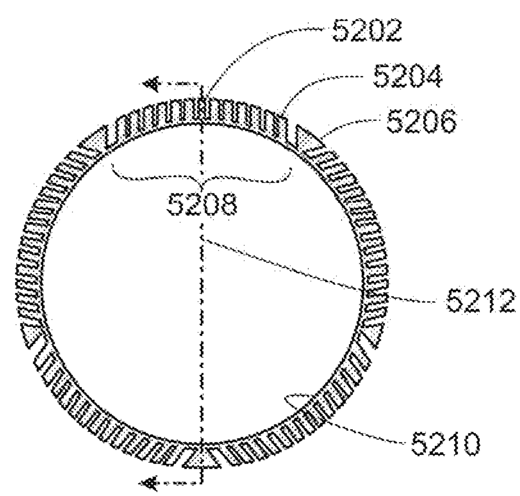
Figure 52D:
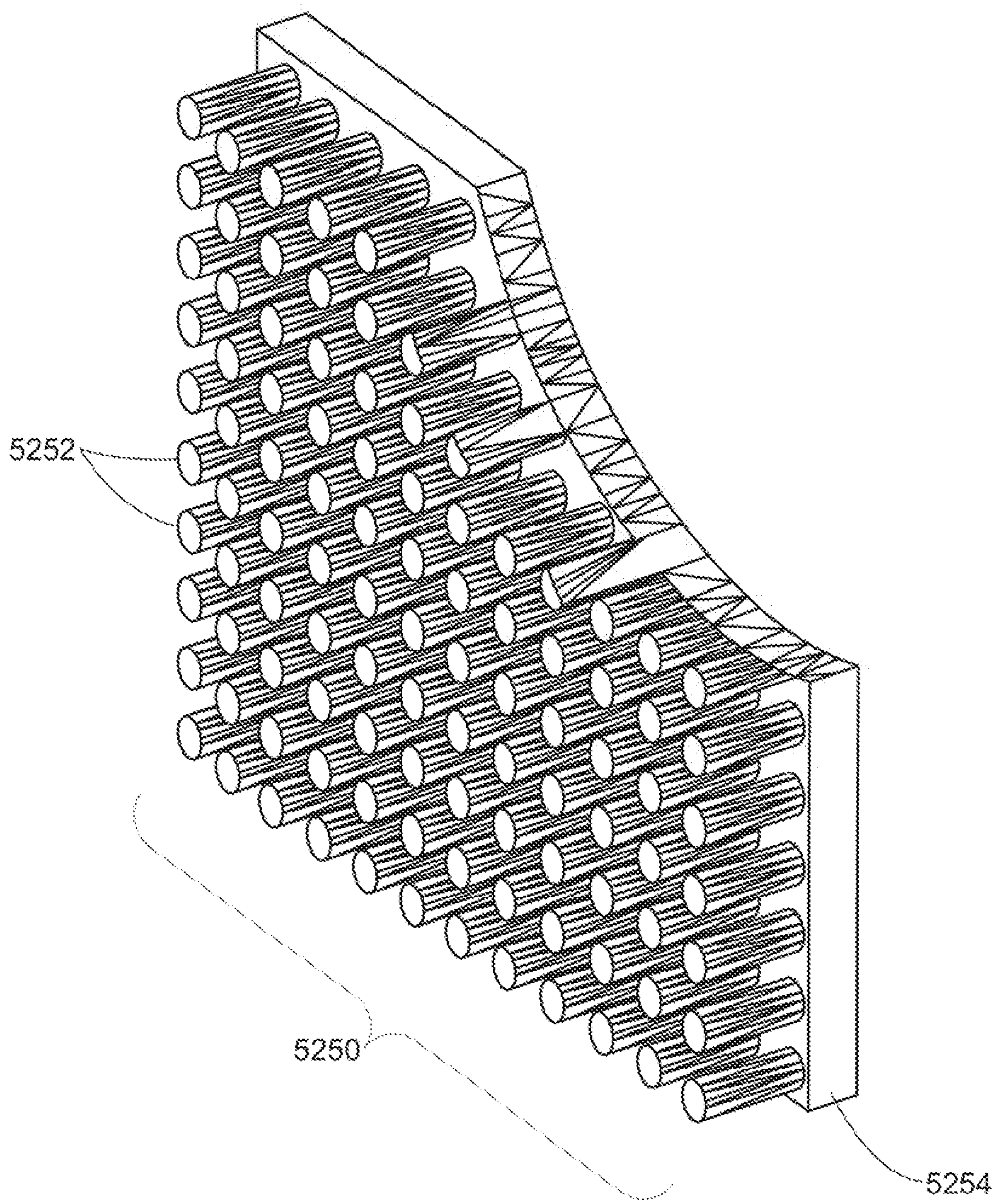
FIG. 52D shows a view of a heat exchanger in accordance with one embodiment.

In accordance various embodiments, pins or fins may be cast onto the inside and outside surface of Stirling heat exchangers using production sand, investment or metal injection casting methods. Referring to FIGS. 52A-52D and 53D, and, first, to FIG. 52A, pins 5202 are arranged into several groups 5208 of parallel pins 5202 around cylindrical wall 5210 of heater head 5100, shown in cross section parallel to the central axis in FIG. 52B and in cross section transverse to the central axis, in FIG. 52C. It should be noted that the technology herein described may advantageously be applied more generally in any other heat exchanger application. All the pins 5202 in each group 5208 are parallel to each other. Only the pins 5202 in the center of the group are truly radial. The pins on the outside of the group, such as those designated by numeral 5204 in FIGS. 52C and 53D, are angled inward from a local radius such as to be substantially parallel to a radial line 5212 toward the center of the group. In addition, the pins on the outside of the group are preferably longer, typically by a small amount, than pins closer to the center of the group. However, the heat transfer only changes only slightly from the center of the group to the outside in the embodiment depicted in FIGS. 52A-52C, and 53D in which 5 groups 5208 of parallel pins provide approximately radial pin fins around cylinder 5210.

In the casting process in accordance with some embodiments, positive or negative molds of each group of parallel fins are formed in a single piece. Several mold pieces are then assembled to form the negative form for a sand casting. In investment mold casting, the wax positive can be formed in an injection mold with only a handful of separate parts that pull apart in different directions. The resulting mold is formed at an acceptable cost, thereby making production of a pin fin heater head economically practical.

Casting of a heater head having protuberances, such as pins, extending to the interior and exterior of a part with cylindrical walls may be achieved, in accordance with various embodiments, by investment, or lost-wax, casting, as well as by sand casting, die casting, or other casting processes. The interior or exterior protuberances, or both, may be integrally cast as part of the head.

While typically more cheaply accomplished than machining or assembly of the pin arrays, casting pin arrays may still have attendant difficulties and substantial costs. Additionally, the casting process may result in a heater head that is less than fully densely populated with pins, thus increasing the fraction of gases failing to collide with the heater head surface and reducing the efficiency of heat transfer.

One embodiment of the method for populating the surfaces of heater head 5100 with heat transfer pins entails fabrication of heater 5100 and arrays of heat transfer pins in separate fabrication processes. An array 5250 (also shown in FIG. 53B as 5350) of heat transfer pins 5252 may be cast or injection molded with panel 5254 resulting in an integral backing panel structure shown in FIG. 52D. Pin arrays 5250, after casting or molding, are mounted to the inner and outer surfaces of the heater head by a high temperature braze. Thus, a more densely populated head with a resultant low rate of gas leakage past the pins may advantageously be achieved. In other embodiments, panels 5254 may be secured by various mechanical means to the heater head.

Transient liquid-phase (TLP) bonding, as described, for example, in the Aerospace Structural Metals Handbook, Code 4218, p. 6 (1999) is particularly advantageous for brazing the panels to the head, since nickel based superalloys, typically employed for fabrication of the head, is difficult to weld by conventional processes, and operates in a high stress and high temperature environment. Advantages of TLP bonding in this application are that the parts braced by TLP are effectively welded using the parent material and have nearly the same tensile strength properties as integrally cast parts. TLP bonds do not remelt at elevated temperatures, whereas typical brazes will remelt at the brazing temperature. This is of particular significance in the case of continuous operation at elevated temperatures where temperature excursions may occur, as in the present application.

The panels 5254 of pins may be attached to the interior or exterior of either the heater head or the cooler by other means. In one alternative embodiment, the panel may be mechanically attached into slots at its lateral edges. The slots are provided in dividers 5306 (described in the following discussion). In another embodiment, the panels are attached to the heater head or cooler by brazing. In yet another embodiment, the panels are attached to the heater head or cooler by sintering the panels to the cylindrical walls of the heater head or cooler.

Figure 53A:
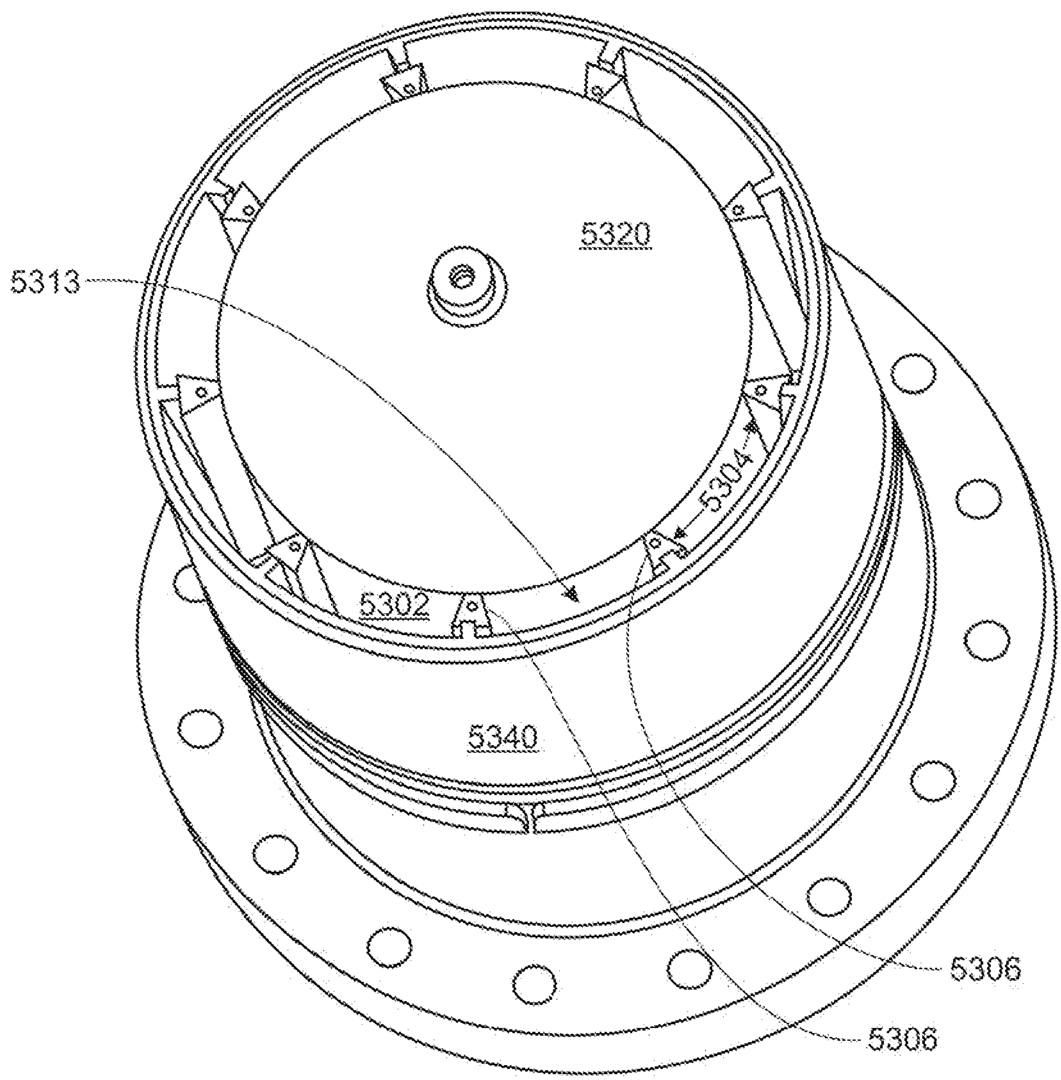
FIGS. 53A and 53B show views of a heat exchanger in accordance with one embodiment.
Figure 53B:
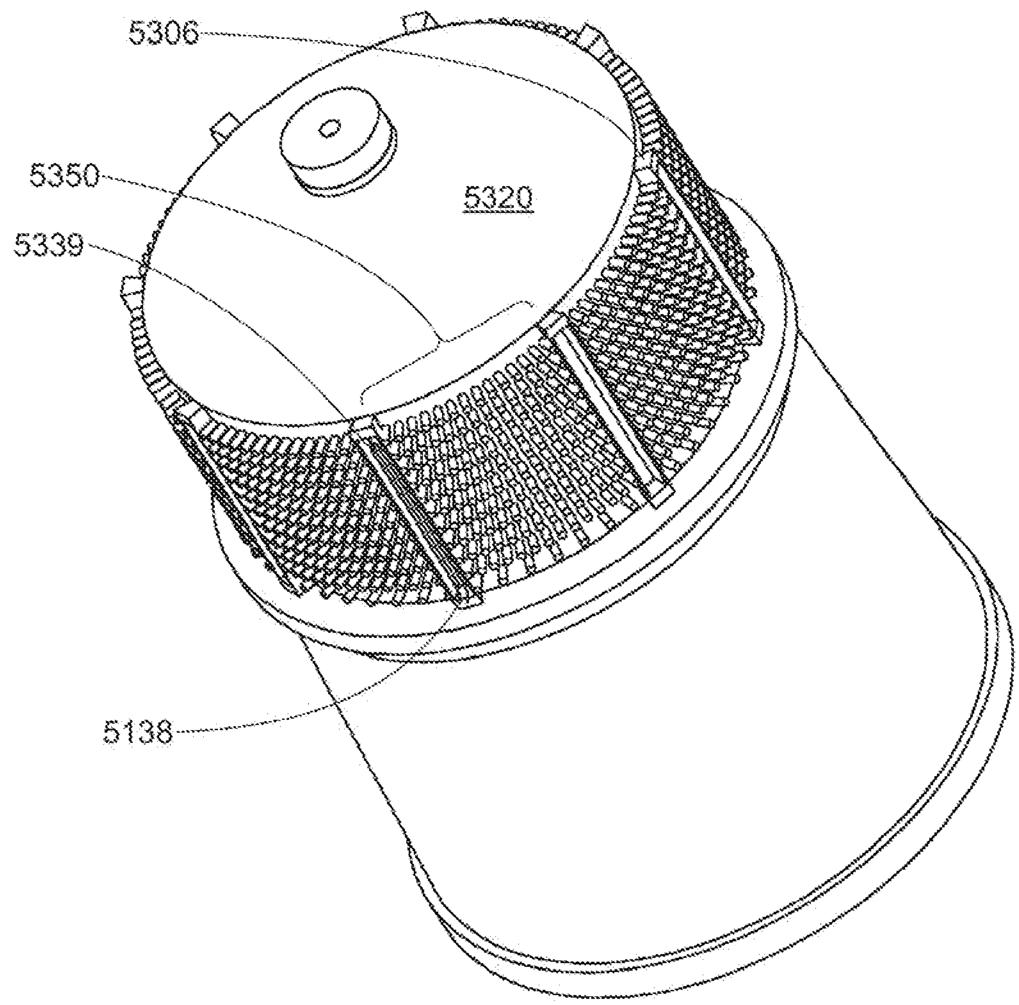

Dividers 5306, as shown in FIGS. 52C, 53A, and 53B, may advantageously improve the heat transfer rate of the pin fin panels. Additionally, they may provide a convenient location for locating temperature sensors. Lastly, the dividers may advantageously provide a convenient structure to which to attach panels of pins to the heater head, in one embodiment, and a parting line for casting operations, in accordance with a further embodiment.

Dividers 5306 may serve to improve the thermal effectiveness of the pin fin arrays in the following manner. Referring, once again, to FIG. 52A, the rate of heat transfer for a fluid flowing through staggered pin fins is significantly higher than for fluid flowing through aligned pin fins. Fluid approaching a staggered pin array 5208 would travel at a 45-degree angle to an axial path along the length of the cylinder, with the skew direction designated by numeral 5214. In order to provide for improved thermal transfer, dividers 5206, 5306 are provided, in accordance some embodiments, to force the fluid flow through the staggered array of pin fins along a path designated by numeral 5212.

In addition to forcing the flow to travel axially, the dividers provide convenient interfaces and joining planes for the casting molds described above.

In certain embodiments, individual arrays 5250, each with its associated panel segment 5254, comprise arcuate fractions of the circumferential distance around the heater head. This is apparent in the top view of the heater head assembly shown in perspective in FIG. 53A. Cylinder head 5320 is shown, as is exterior surface 5302 of the heater head. Backer segments supporting arrays of heat transfer pins are not shown but are inserted, during assembly, in spaces 5304 surrounding exterior surface 5302 of the heater head. Between successive heat transfer pin array segments are trapezoidal dividers 5306 which are baffled to block the flow of exhaust gases in a downward direction through any path other than past the heat transfer pins.

In one embodiment, flow dividers 5306 include structures for mechanically retaining the panel segments 5254 during assembly, before brazing, or simply to mechanically retain the panels 5254 against heater head 5302.

In order to maximize engine power, the hottest part of the heater head is preferably at the highest temperature allowed, considering the metallurgical creep and tensile strength, stress, and appropriate factors of safety. Maintaining the hottest part of the heater head at the highest temperature requires measuring the temperature of the hottest part of the heater head. The dividers provide a convenient location and routing for temperature sensors on the heater had to any axial location along the pin fin arrays. Hot gas flow path 5313 (shown also in FIG. 51A), is defined, on the outside, by gas flow channel cover 5340. Since exhaust gases do not flow through dividers 5306, a temperature sensor, such as thermocouple 5138 (shown in FIGS. 51A and 53C) is advantageously disposed in divider 5306 in order to monitor the temperature of heater head 5100 with which the temperature sensor is in thermal contact. The position of pin arrays 5250 and temperature sensor 5138 mounted within divider 5306 is shown more clearly in the view of FIG. 53B in which the pin backer has been removed.

Figure 53C:
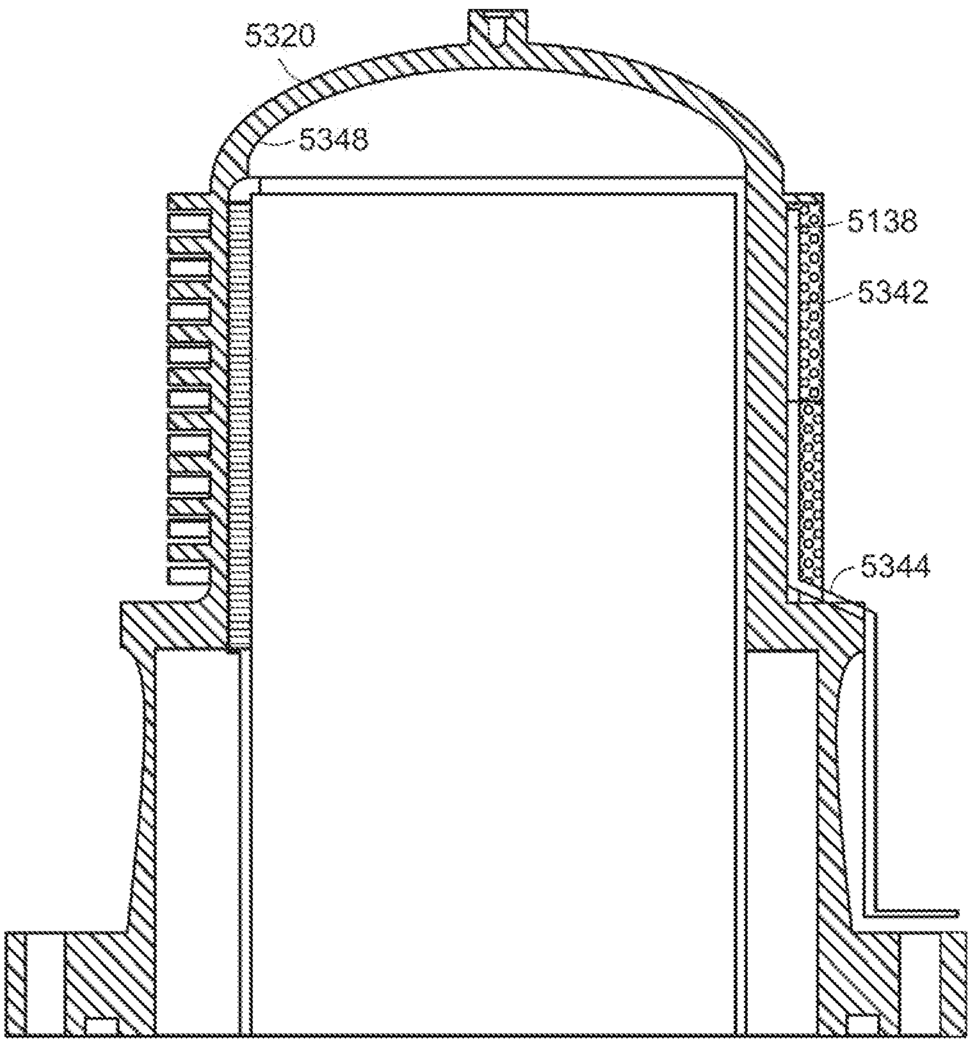
FIG. 53C shows a view of a heat exchanger of an engine in accordance with one embodiment.
Figure 53D:
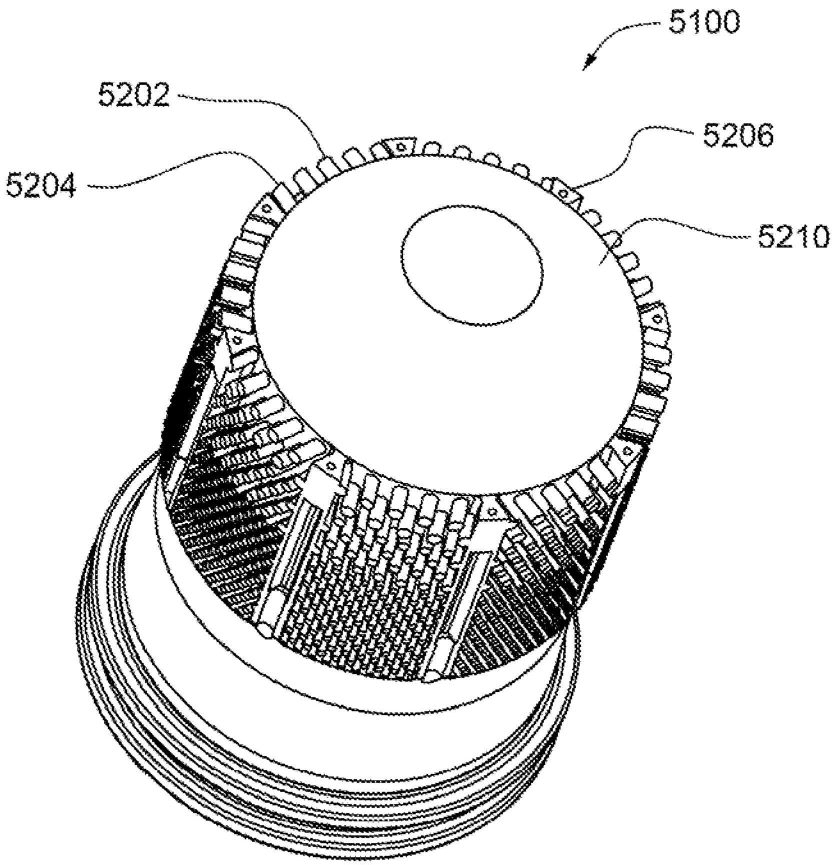
FIGS. 53D-53F show views of a heat exchanger of an engine in accordance with one embodiment.
Figure 53E:
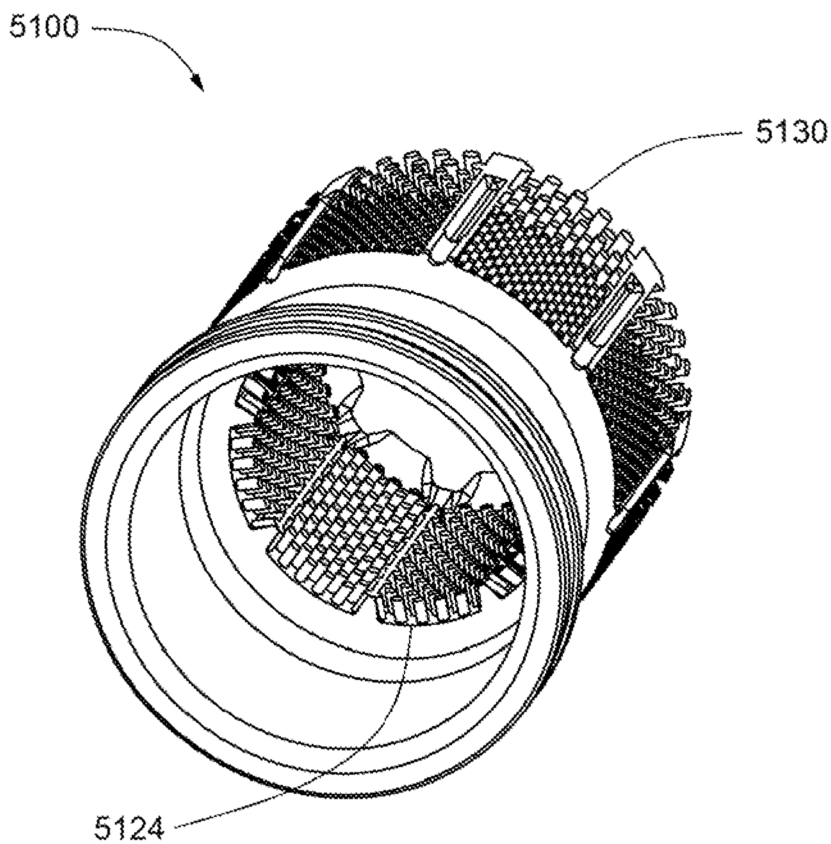
Figure 53F:
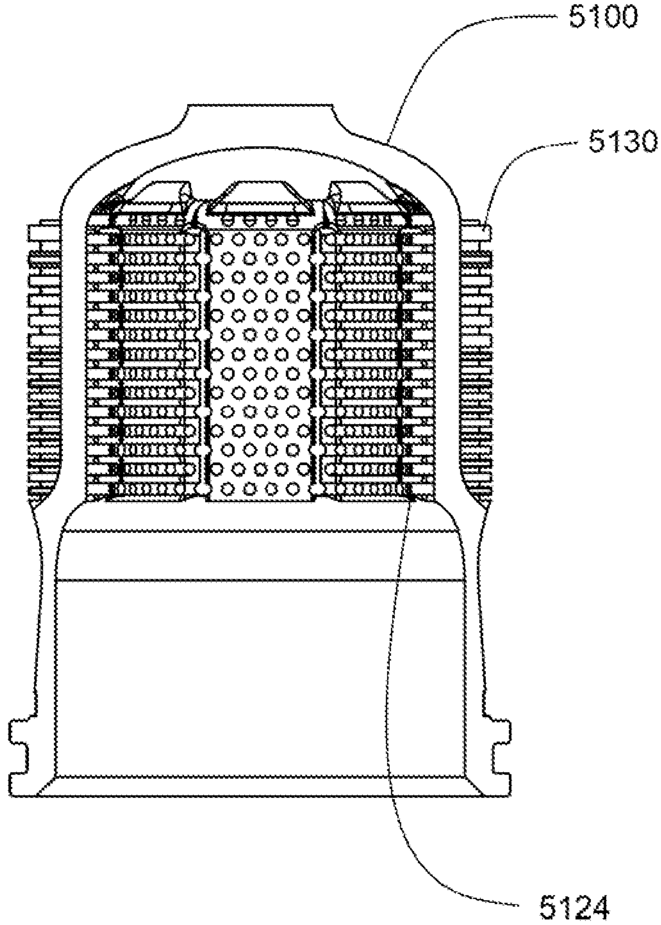

Temperature sensing device 5138 is preferably disposed within divider 5306 as depicted in FIG. 53B. More particularly, temperature sensing tip 5339 of temperature sensor 5138 is preferably located in the slot corresponding to divider 5306 as nearly as possible to cylinder head 5320 in that this area is typically the hottest part of the heater head. Alternatively, temperature sensor 5138 may be mounted directly to cylinder head 5320, however location of the sensor in the slot, as described, is used in some embodiments. Engine performance, in terms of both power and efficiency, is highest at the highest possible temperature, yet the maximum temperature is typically limited by metallurgical properties. Therefore, sensor 5138 should be placed to measure the temperature of the hottest, and therefore the limiting, part of the heater head. Additionally, temperature sensor 5138 should be insulated from combustion gases and walls of divider 5306 by ceramic insulation 5342, as shown in FIG. 53C. The ceramic can also form an adhesive bond with the walls of the divider to retain the temperature sensor in place. Electrical leads 5344 of temperature sensor 5138 should also be electrically insulated.

Although the burner is designed to have circumferential symmetry, hot spots may develop on heater head 5320. Adding to the problem, the alloys typically employed for fabrication of the heater head, on account of their high melting point, have relatively poor thermal conductivity. Once hot spots form, they are apt to endure because the gas flow outside the head is axial rather than circumferential, since dividers 5306 (shown in FIG. 53A) impede any circumferential flow. Additionally, heating may increase local gas viscosity thereby redirecting more flow to other channels. In order to even out the temperature distribution on the heater head, a layer of highly thermally conductive metal, such as copper, of thickness greater than 0.001 in. and preferably about 0.005 in. is applied to interior surface 5348 of heater head 5320, by deposition or plating, or other application method. Alternatively, a similar coating may be applied to the exterior surface, in accordance with another embodiment.

In order to keep the size of the Stirling cycle engine small, it is important to maximize the heat flux from the combustion gas through the heater head. Whereas prior art employed loops of pipe in which heat transfer to the working fluid is achieved, loops engender both low reliability (since the loops are mechanically vulnerable) and higher cost, due to the more complicated loop geometry and extra materials. The limiting constraint on the heat flux are the thermo-mechanical properties of the heater head material that must be able to withstand the high temperatures of the combustion chamber while maintaining the structural integrity of the pressurized head. The maximum design temperature is determined by the hottest point on the heater head which is typically at the top of the wall. Ideally, the entire heater wall hot section would be at this maximum temperature, as may be controlled, for example, by controlling the fuel flow.

As combustion gases travel past the heater head in gas flow channels 5113, 5313 (shown in FIG. 51A), the gas temperature decreases as heat is transferred from the gas to the heater head. As a result, the maximum allowed heater head temperature at the top of the gas flow channel must be set by the material used for the heater head. The material is preferably chosen from the family of high nickel alloys, commonly known as super alloys, such as Inconel 600 (having a maximum temperature T.sub.max=800.degree. C. before softening), Inconel 625 (T.sub.max=900.degree. C.), Inconel 754 (T.sub.max=1080.degree. C.), or Hastelloy GMR 235 (T.sub.max=935.degree. C.). The gas in gas channel 5113, 5313 may cool by as much as 350.degree. C. on transit through the channel, resulting in underheating of the bottom of the hot zone.

In accordance with some embodiments, the temperature profile of the heater wall is controlled by means of heat transfer geometry, as now described. One method for controlling the geometry is by means of providing a variable cross-section gas flow channel 5113, 5313 (shown in FIGS. 51A and 54A). The radial dimension (perpendicular to the wall of the heater head), and thus the cross-section of the channel, is large at the top of the heater wall, thereby allowing much of the gas to bypass the pin array at the top of the wall. The bypass allows hotter gas to reach the pin array at the bottom of the wall thereby allowing the bottom pin array to operate closer to its maximum temperature. The temperature gradient from the top of the heater to the bottom of the hot section (before regenerator volume 5132, shown in FIG. 51A) has been reduced from as much as 350.degree. C. to 100.degree. C. using a variable cross-section gas flow channel.

A second method for controlling the geometry is by varying the population density and the geometry of the pin array as a function of position along the gas flow channel. The geometry of the pins may be adjusted by varying the height/diameter (H/D) ratio of the pins. If a casting process is used to form the pin array, the range of H/D rations may be limited by the process. If pin rings are used, the range of H/D ratios may be extended.

Figure 54A:
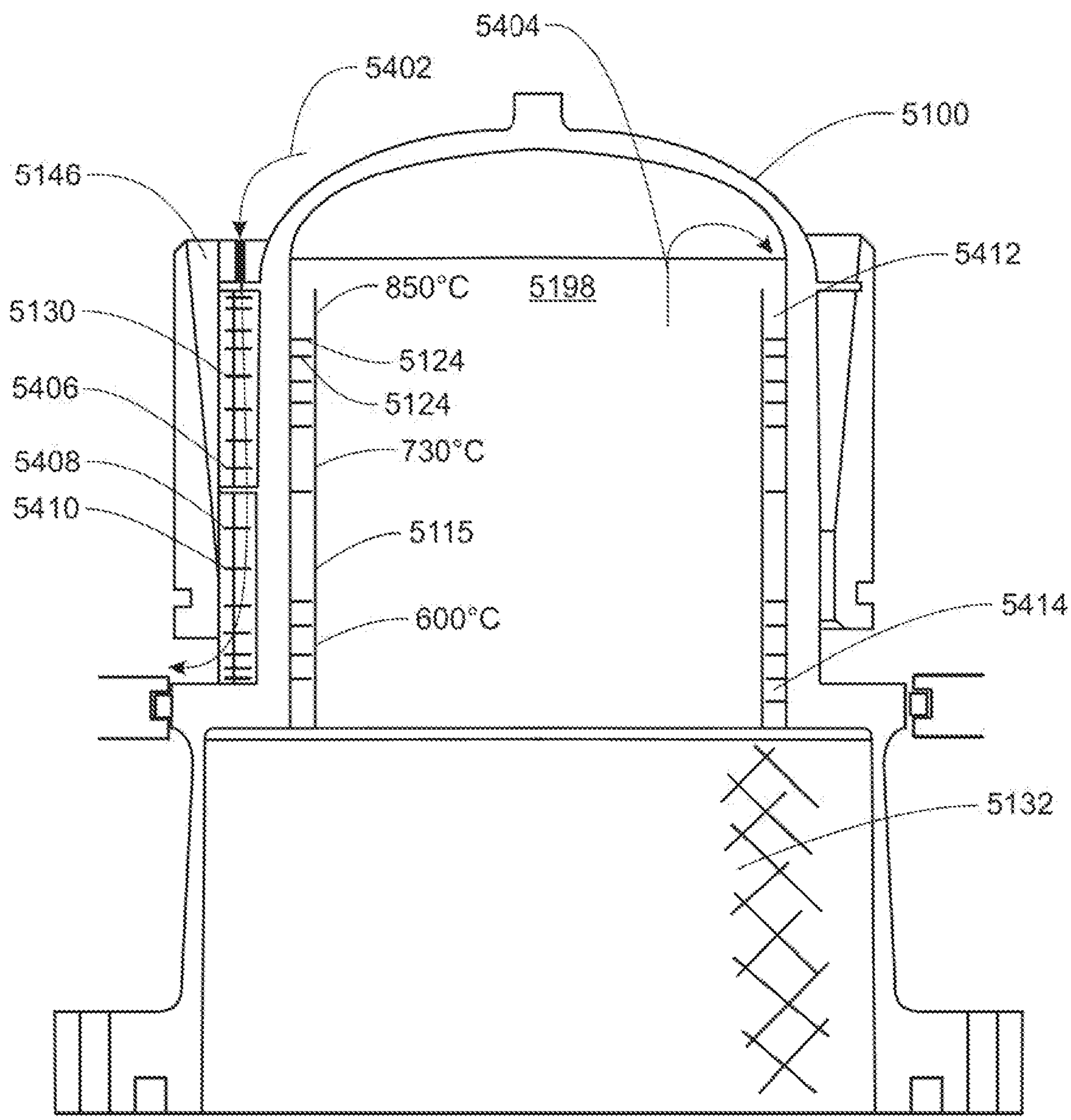
FIGS. 54A and 54B show views of a heat exchanger of an engine in accordance with one embodiment.
Figure 54B:
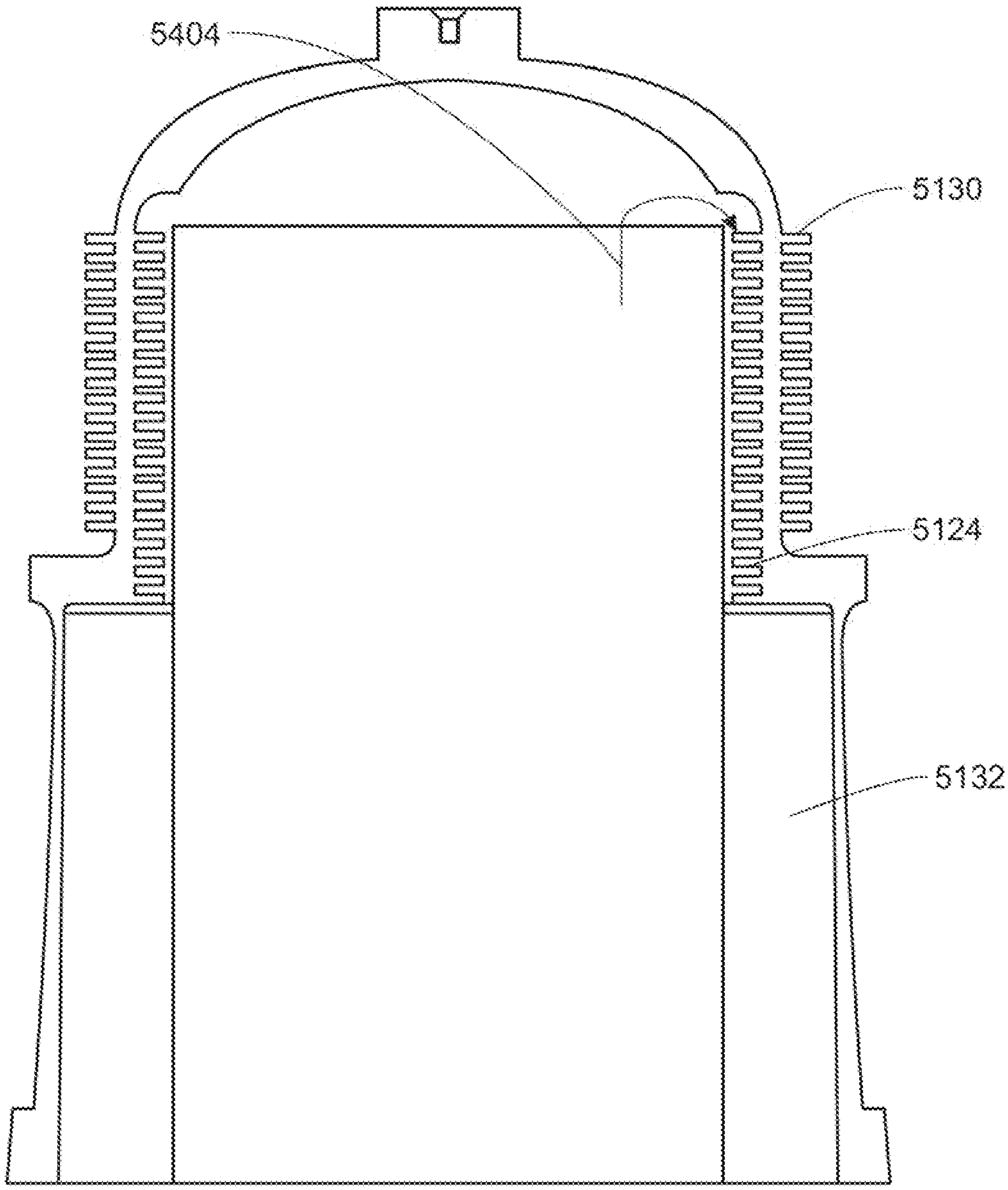

Referring now to FIGS. 53E, 53F, 54A and 54B, arrow 5402 designates the path of heated exhaust gases past heater head 5100. Outer heat transfer pins 5130 intercept the heated exhaust gases and transfer heat via heater head 5100 and inner heat transfer pins 5124 to the working fluid that is driven from expansion cylinder 5115 along path 5404. (For clarity, heat transfer pins 5130 and 5124 are shown schematically in FIG. 54A. Additional heat transfer pins 5130 and 5124 had been depicted, not to scale, in the view of FIGS. 53E, 53F, and 54B.) Successive heat transfer pins 5406, 5408, and 5410, for example, present a progressively larger cross section to the flow of exhaust gas along path 5402. Thus, while the exhaust gas has transferred some fraction of its heat prior to arrival at the lower pins, heat is extracted there with a greater conduction rate, thereby reducing the temperature gradient between the top 5412 and bottom 5414 of the path of working fluid between expansion volume 5198 and regenerator volume 5132. Typical temperatures of the surface of expansion cylinder 5115 are indicated in FIG. 54A: 850.degree. C. at the top of the cylinder, 750.degree. C. at the center of the cylinder, and 600.degree. C. at the end of the cylinder closest to the regenerator volume.

Another method for achieving more even distribution of heat from the exhaust gases to the heater head is to create a tapered divider on the outside diameter of the heater head by means of concentric tapered pin backer 5146, as shown in FIG. 54A. The cross-sectional view of FIG. 54A shows how tapered pin backer 5146 allows some of the hottest exhaust gas to bypass the pins near the top of the heater head. Pin backer 5146 creates a narrowing annular gap on the outside of the pins that progressively forces more and more of the exhaust gases into the pin heat exchanger.

Figure 55A:
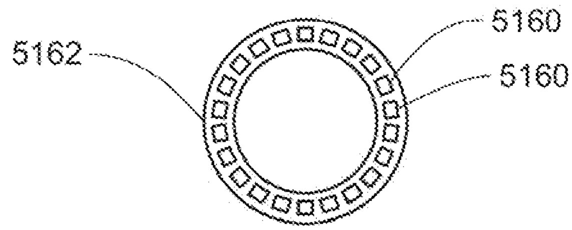
FIGS. 55A-55D show various views of a heat exchanger in accordance with one embodiment.
Figure 55B:
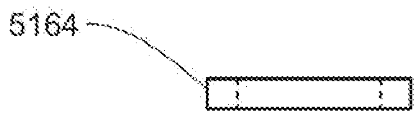
Figure 55C:
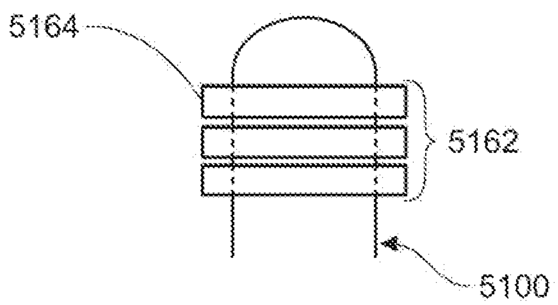
Figure 55D:
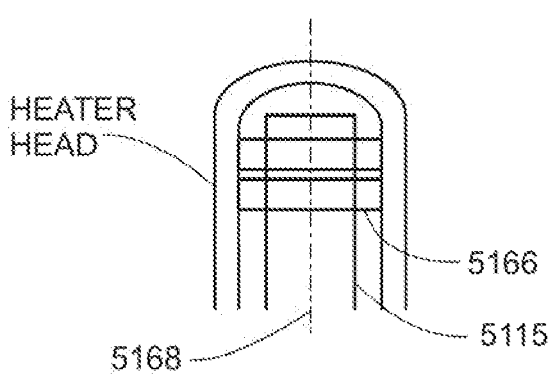

Another method for increasing the surface area of the interface between a solid such as heater head 5100 and a fluid such as combustion gases as discussed above is now described with reference to FIGS. 55A-55D. An effect analogous to that of fabricating heat transfer pins by casting or otherwise may be obtained by punching holes 5160 into a thin annular ring 5162 shown in top view in FIG. 55A and in side view in FIG. 55B. The thickness of ring 5162, which may be referred to as a 'heat transfer pin ring' is comparable to the thickness of the heat transfer pins discussed above, and is governed by the strength of the heat-conductive material at the high temperature of the combustion gases traversing holes 5160. The shape and disposition of holes 5160 within each ring is a matter of design for a particular application, indeed, holes 5160 may not be surrounded by solid material. The material of rings 5162 is preferably an oxidation-resistant metal such as Inconel 625 or Hastelloy GMR 235, though other heat-conducting materials may be used. Rings 5162 may be produced inexpensively by a metal stamping process. Rings 5162 are then mounted and brazed, or otherwise bonded, to the outer surface heater head 5100, as shown with respect to outer pin rings 5164 in FIG. 55C, and with respect to inner pin rings 5166 in FIG. 55D. Additional rings may be interspersed between the pin rings to control the vertical spacing between the pins. Expansion cylinder liner 5115 is shown in the interior of inner pin rings 5166.

Heat transfer rings 5162 may be advantageously applied to the interior of the heater head as well as to both the exterior and interior of the cooler of a thermal cycle engine. In these applications, the rings need not be oxidation resistant. Materials including copper and nickel are preferably used on the interior of the heater head, while the rings for the cooler are preferably made of one of various high thermal conductivity materials including aluminum, copper, zinc, etc.

The total cross sectional area of the heat transfer pins taken in a slice perpendicular to cylinder axis 5168 need not be constant, indeed, it is advantageously varied, as discussed in detail above, in reference to FIG. 54.

Referring to FIGS. 56A through 56C, the interior or exterior heat exchange surfaces may also be formed from various folded fin structures 5600, 5602, or 5604. The folded fin structures may be made of material similar to that of the heater head pressure dome or of high thermal conductivity materials such as copper which may provide improved fin efficiency. Fins fabricated from high melting-point materials such as that of the heater head 5100 (shown in FIG. 51A) may be continuous from the top to the bottom of the heater head. Folded fins may be fabricated from sheet metal and brazed to the interior surface of the heater head. Three folded fin configurations are shown by way of example: wavy fins 5600, lanced fins 5602, and offset fins 5604. In each case, the gas flow direction is indicated by an arrow designated by numeral 5606.

Fins formed from a dissimilar metal to that of heater head 5100 are attached in axial segments to avoid differential thermal expansion from breaking the brazed joint between the fins and the head. The offset fin configuration of FIG. 56C advantageously provides a superior heat transfer coefficient to that of plain fins.

The use of high thermal conductivity metal for the folded fins may advantageously allow the fins to be made longer, thereby improving heat transfer and reducing resistance to flow of the gas and improving engine efficiency.

Heater Head Support Ribs

The walls of the heater head must be sufficiently strong, at operating temperatures, to withstand the elevated pressure of the working gas. It is typically desirable to operate Stirling cycle engines at as high a working gas pressure as possible, thus, enabling the head to withstand higher pressures is highly advantageous. In designing the heater head, it must be borne in mind that increasing the pressure at a given operating temperature typically requires increasing the heater head wall thickness in direct proportion. On the other had, thickening the heater head wall results in a longer thermal conduction path between the exterior heat source and the working gas.

Moreover, thermal conduction increases with heat exchanger surface area, thus thermal efficiency is increased by increasing the diameter of the heater head. Stress in the wall, however, is substantially proportional to the diameter of the head, thus increasing the head diameter, at a given temperature and interior gas pressure, requires increasing the wall thickness in direct proportion.

Figure 57A:
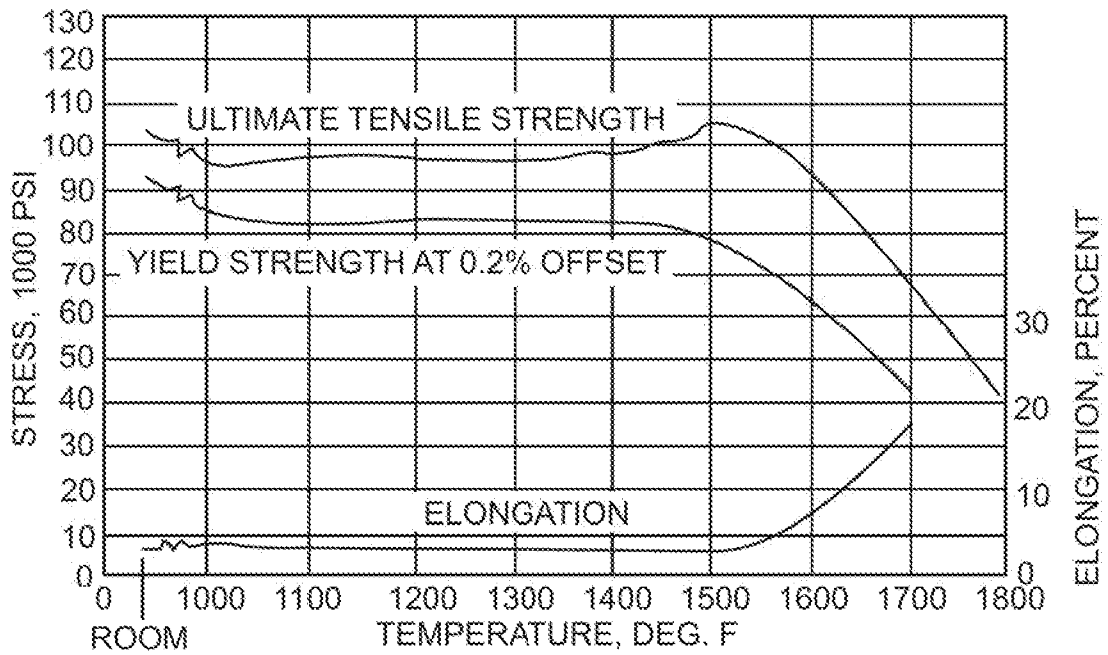
FIGS. 57A and 57B show various diagrams depicting physical properties of a heat exchanger in accordance with one embodiment.
Figure 57B:
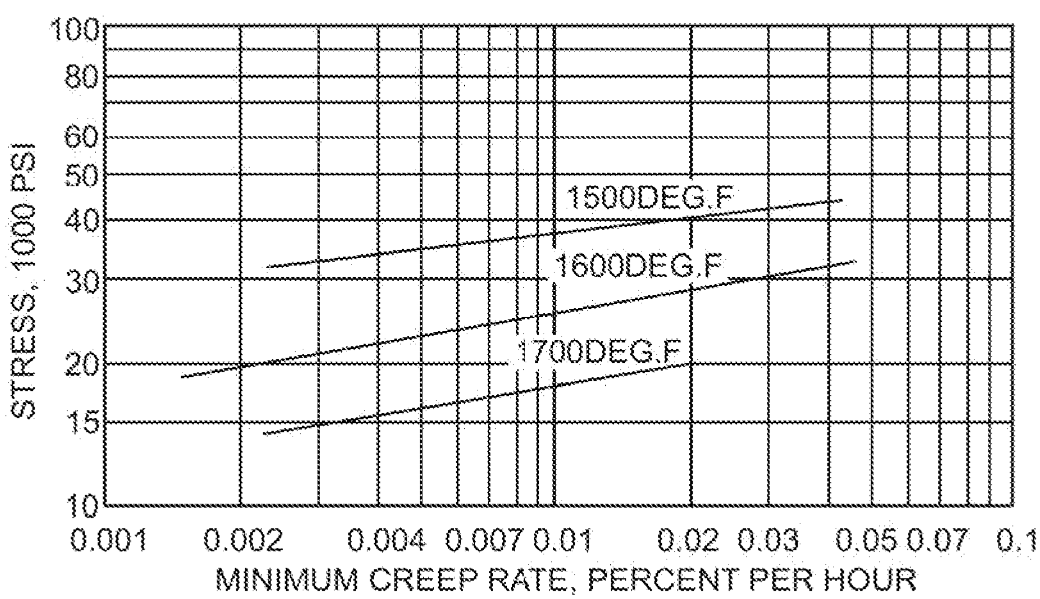

The strength considerations are tantamount at typical Stirling engine head temperatures, in fact, they drive the maximum operating temperature, since, as discussed, efficiency increases with temperature. Both creep and ultimate tensile strengths of materials tend to fall off precipitously when specified elevated temperatures are reached. Referring to FIG. 57A, the yield strength at 0.2% offset and ultimate tensile strength are shown for the GMR 235 nickel alloy in typical representation of the qualitative behavior of nickel alloys. Similarly, in FIG. 57B, it can be seen that the 0.01% per hour creep rate strength of GMR 235 falls from 40 ksi to half as the temperature rises from 1500.degree. F. to 1700.degree. F.

Figure 58:
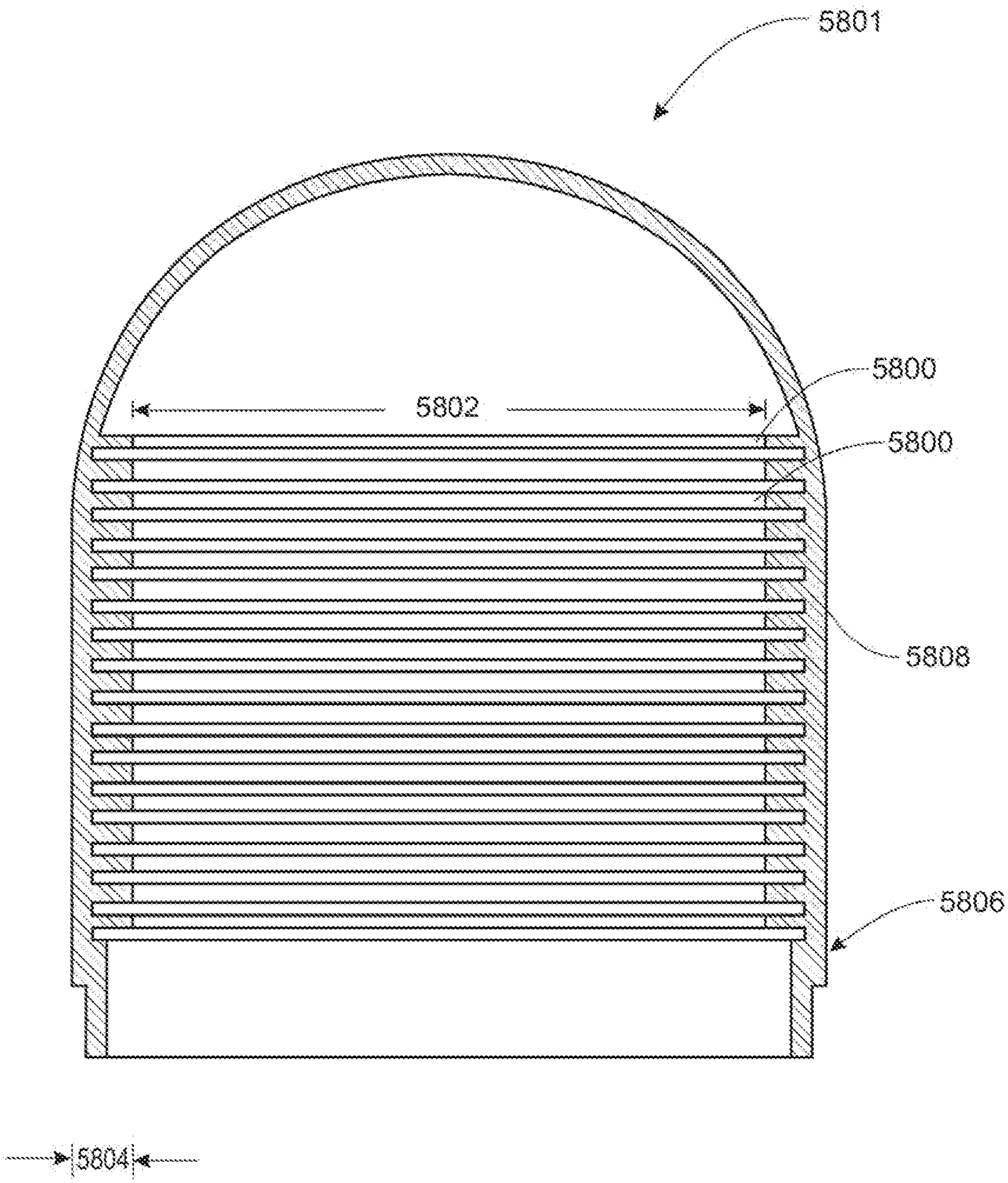
FIG. 58 shows a view of a heater head in accordance with one embodiment.

Some embodiments provide interior ribs (or hoops) 5800, such as those disclosed in U.S. Pat. Nos. 6,381,958, and 6,966,182, that enhance structural support of heater head 5801, as shown in cross-section in FIG. 58. Ribs 5800 are characterized by an interior bore 5802. The creep strength and rupture strength of heater head 5801 is thus determined predominantly by an effective thickness 5804 of the heater head and the interior bore diameter 5802. Heat conduction through the heater head is not limited by thickness 5804 since intervening segments 5806 of the head are narrower and provide enhanced heat conduction. Ribs 5800 not only relieve hoop stresses on outer wall 5808 of head 5801 but additionally provide supplemental surface area interior to the heater head and thus advantageously enhance heat transfer to the working fluid.

Further advantages of providing ribs 5800 interior to the heater head include reducing the temperature gradient across the head wall 5808 for a given rate of heat transfer, as well as allowing operation at higher hot end working temperatures. Additionally, by reducing the stress requirements on the outer wall, alternative materials to nickel based superalloys may be used, advantageously providing superior conductivity at reduced cost.

Figure 59:
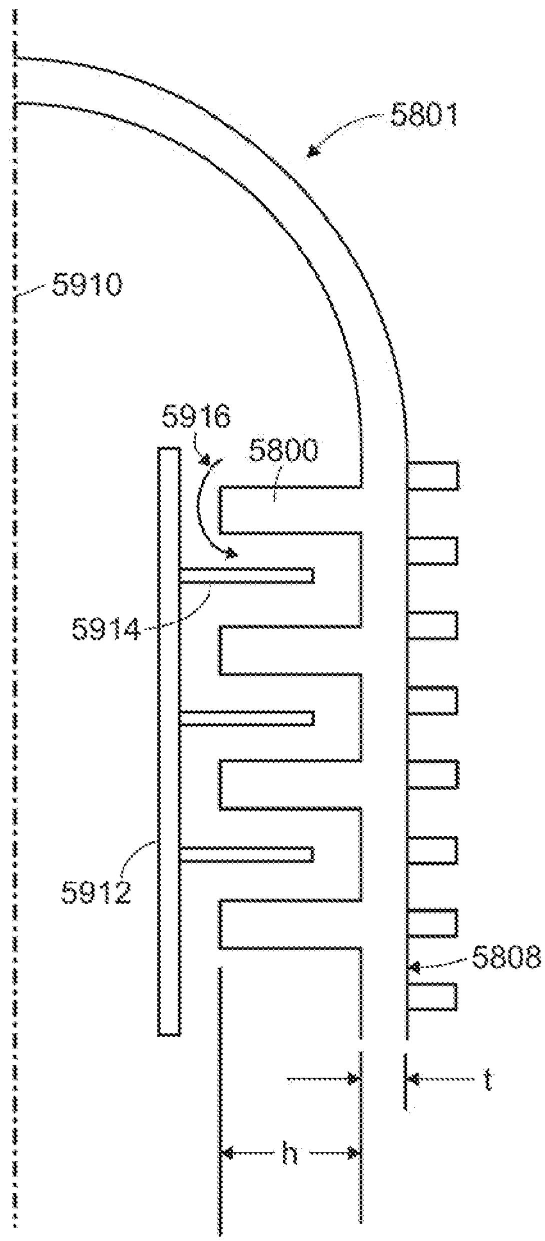
FIG. 59 shows a view of a heater head in accordance with one embodiment.

A cross section of heater head 5801 with ribs 5800 is further shown in FIG. 59. Dashed line 5910 designates the central longitudinal axis of the expansion cylinder. In accordance with various embodiments expansion cylinder hot sleeve 5912 may have transverse flow diverters 5914 for directing the flow of working gas, represented by around 5916, around circumferential ribs 5800 for enhancing heat transfer to the working gas. The additional width h of ribs 5800 contributes to the hoop strength of heater head 5101, whereas heat transfer is governed predominantly by the narrower thickness t of outer heater head wall 5808. In typical Stirling engine applications, while the heater head exterior may be run as hot as 1800.degree. F., ribs 5800 that provide structure strength typically run no hotter than 1300.degree. F.

Figure 60A:
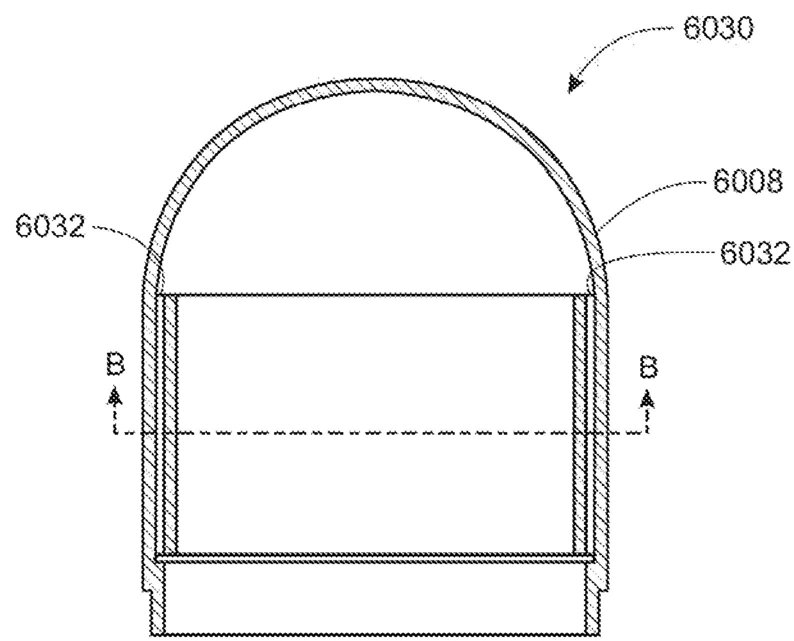
FIGS. 60A and 60B show views of a heater head in accordance with one embodiment.
Figure 60B:
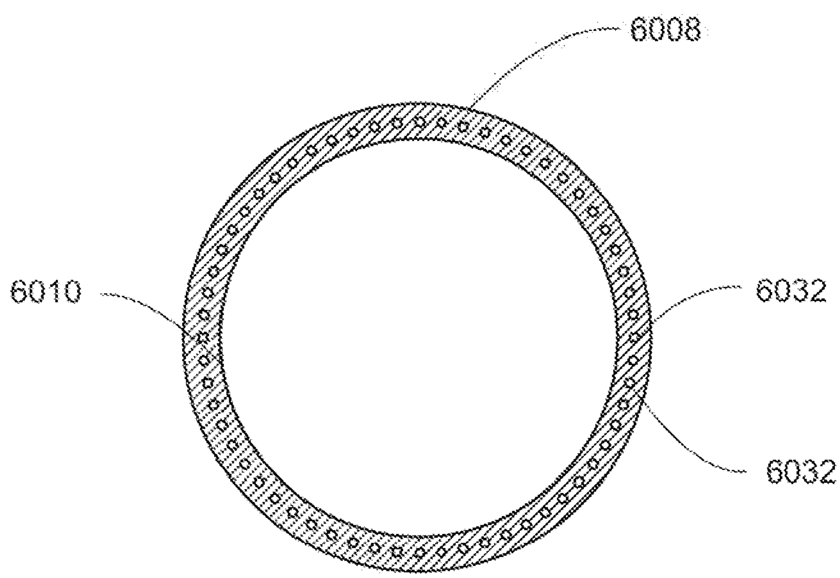

Advantages of enhanced hoop strength concurrent with enhanced thermal conductivity, as discussed above with reference to FIG. 58 may additionally be obtained in accordance with several alternate embodiments. Referring to FIGS. 60A and 60B, cross sections are shown of a heater head 6030, wherein tubular openings 6032 run parallel to heater head wall 6008. As shown in the cross sectional view of FIG. 60B, taken along line AA, tubes 6032 allow working gas to pass down the wall, enhancing heat transfer from outside the head to the working gas. Additionally, the wall 6008 may be thicker, for the same rate of heat transfer, thus providing additional strength. Moreover, the thick wall section 6010 (also shown in FIG. 61B as 6110) interior to passages 6032 remains cooler than would otherwise be the case, providing further additional strength. Heater head 6030 is preferably cast with tubular passages 6032 which may be round in cross section or of other shapes.

Figure 61A:
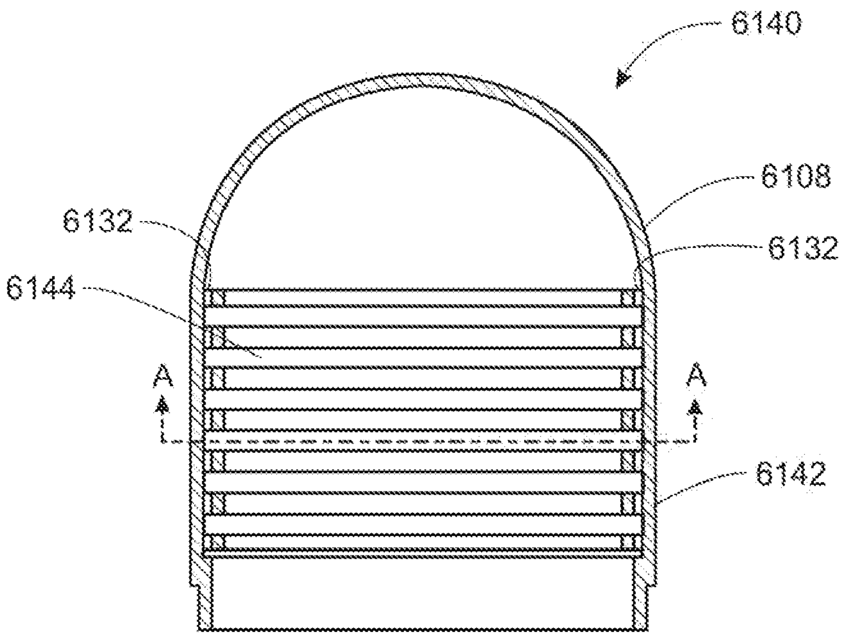
FIGS. 61A and 61B show views of a heater head in accordance with one embodiment.
Figure 61B:
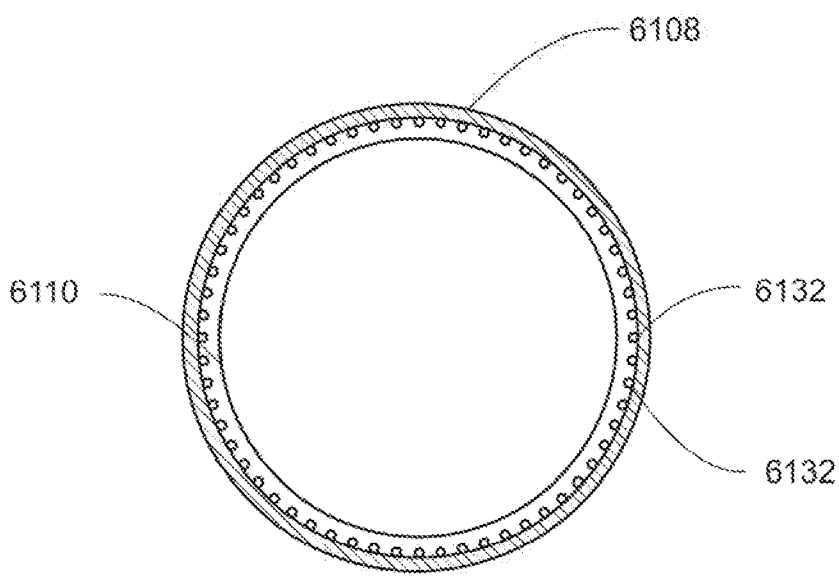

FIG. 61A shows a further heater head 6140 wherein tubular openings 6132 run parallel to heater head wall 6108 and are interrupted by openings that run out to thinner sections 6142 of the heater head wall. As shown in the cross sectional view of FIG. 62B, taken along line AA, tubes 6132 allow working gas to pass down the wall, enhancing heat transfer from outside the head to the working gas to a degree substantially enhanced over that of the straight tube design shown in FIGS. 62A and 62B. Additionally, openings 6144 provide additional area for removal of ceramic cores used in the casting process to create such long, thin holes. Increased access to the holes allows faster chemical leaching of the core in the course of the manufacturing process.

Figure 62A:
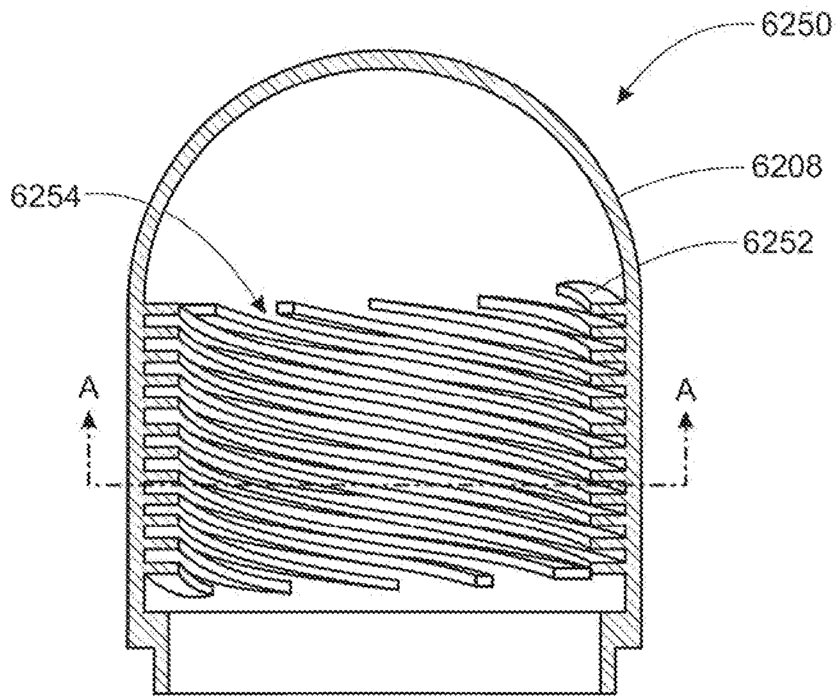
FIGS. 62A and 62B show views of a heater head in accordance with one embodiment.
Figure 62B:
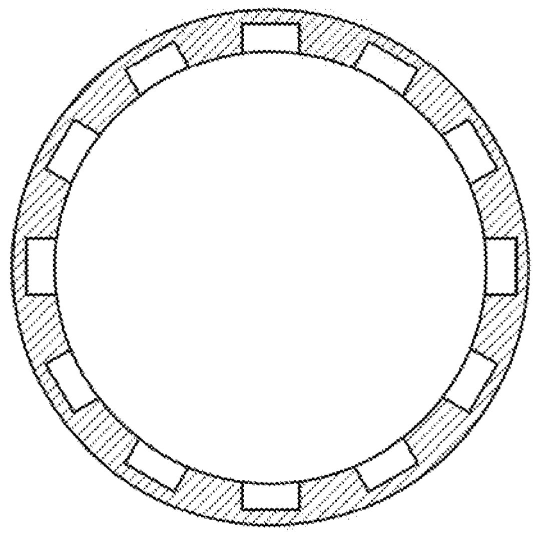

FIG. 62B shows yet another heater head 6250, wherein ribs 6252 are disposed in a helix within heater head wall 6208, thereby providing the wall with enhanced rigidity in both the circumferential and axial directions. The working gas flows through the spiral 6254 on a path between the expansion piston and the heater head, on its way to the regenerator. FIG. 62B shows a transverse cross section of the heater head of FIG. 62A taken along line AA. Various embodiments include employing a linear, or other, approximation to spiral 6254, to obtain comparable advantages of stiffening and heat transfer.

Figure 62C:
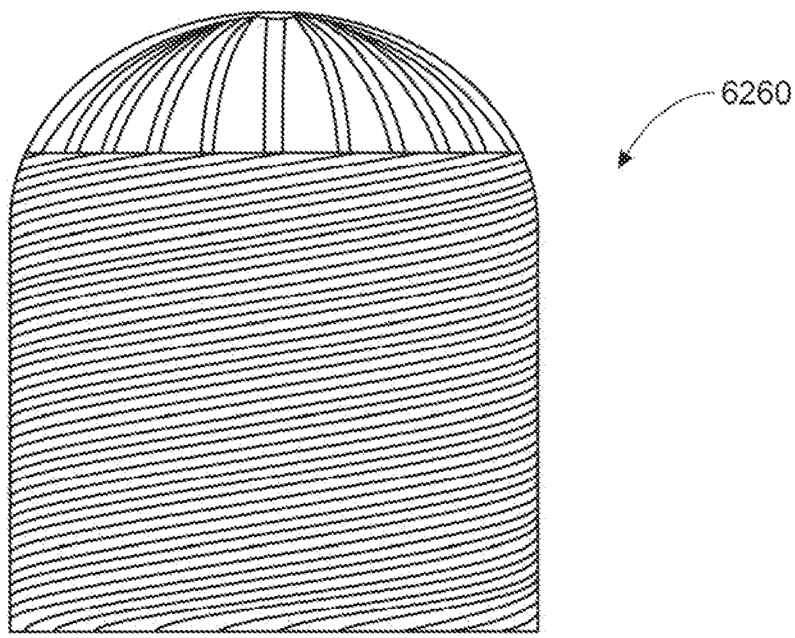
FIG. 62C shows a views of a heater head in accordance with one embodiment.
Figure 62D:
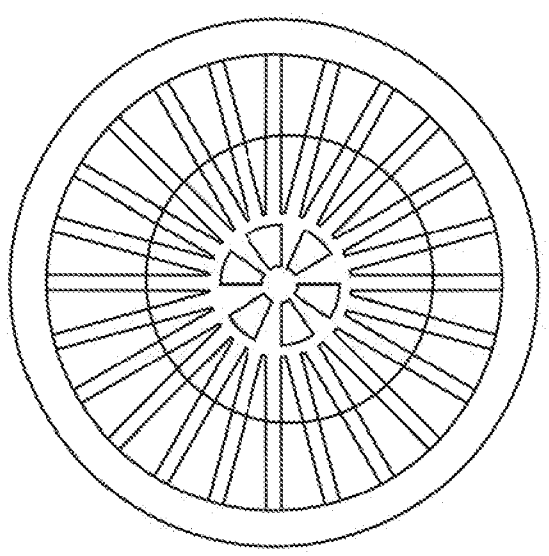
FIG. 62D shows a view of a heater head in accordance with one embodiment.
Figure 62E:
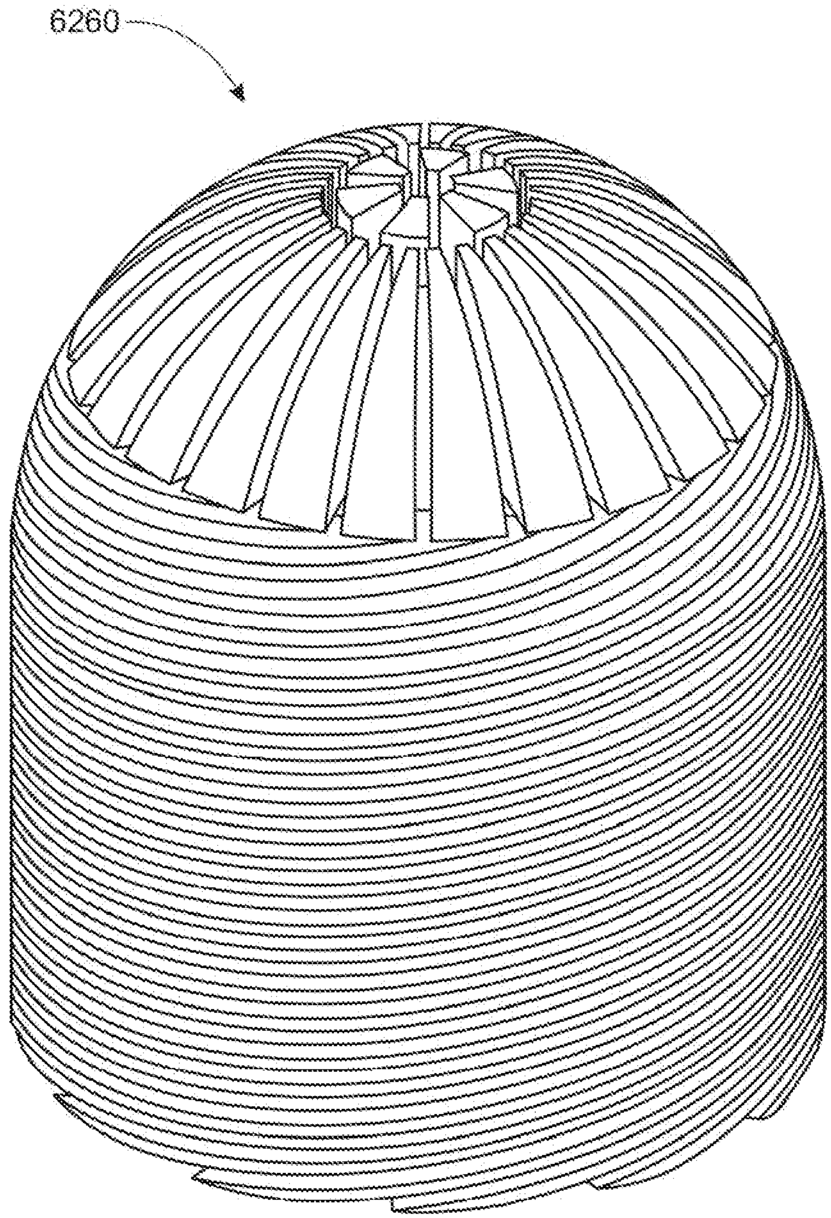
FIG. 62E shows a view of a heater head in accordance with one embodiment.

Heater head 6250 of FIGS. 62A and 62B is preferably fabricated by casting. A side view of core assembly 6260 for use in the casting process is shown in FIG. 62C. It is additionally advantageous to provide ribs for internal support of the dome of the heater head and to provide additional heat exchange on the dome, thereby cooling the inner surface of the dome. The complementary core structure of the dome is shown in FIG. 62D, and, in cross section, as viewed from the top, in FIG. 62D. A perspective view of core assembly 6260 is shown in FIG. 62E.

It is to be understood that the various heater head embodiments and methods for their manufacture described herein may be adapted to function in a multiple heater head configuration.

Regenerator

A regenerator is used in a Stirling cycle machine, as discussed above and as described in U.S. Pat. Nos. 6,591,609, and 6,862,883, to add and remove heat from the working fluid during different phases of the Stirling cycle. The regenerator used in a Stirling cycle machine must be capable of high heat transfer rates which typically suggests a high heat transfer area and low flow resistance to the working fluid. Low flow resistance also contributes to the overall efficiency of the engine by reducing the energy required to pump the working fluid. Additionally, a regenerator must be fabricated in such a manner as to resist spalling or fragmentation because fragments may be entrained in the working fluid and transported to the compression or expansion cylinders and result in damage to the piston seals.

One regenerator design uses several hundred stacked metal screens. While exhibiting a high heat transfer surface, low flow resistance and low spalling, metal screens may suffer the disadvantage that their cutting and handling may generate small metal fragments that must be removed before assembling the regenerator. Additionally, stainless steel woven wire mesh contributes appreciably to the cost of the Stirling cycle engine.

Figure 63A:
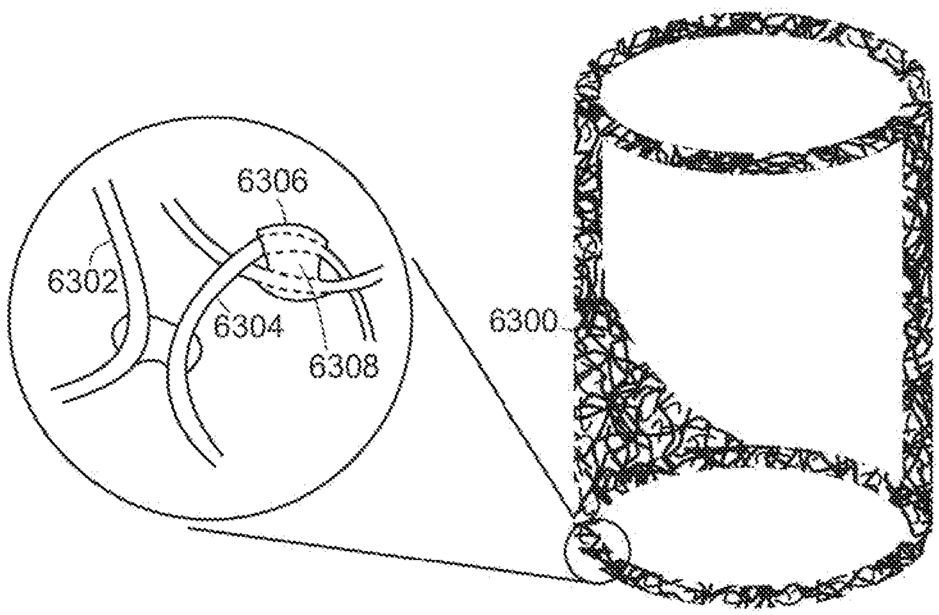
FIGS. 63A and 63B show a regenerator of a Stirling cycle engine in accordance with one embodiment.

A three dimensional random fiber network, such as stainless steel wool or ceramic fiber, for example, may be used as the regenerator, as now described with reference to FIG. 63A. Stainless steel wool regenerator 6300 advantageously provides a large surface area to volume ratio, thereby providing favorable heat transfer rates at low fluid flow friction in a compact form. Additionally, cumbersome manufacturing steps of cutting, cleaning and assembling large numbers of screens are advantageously eliminated. The low mechanical strength of steel wool and the tendency of steel wool to spall may both be overcome as now described. In some embodiments, the individual steel wires 6302 and 6304 are “cross-linked” into a unitary 3D wire matrix.

Figure 63B:
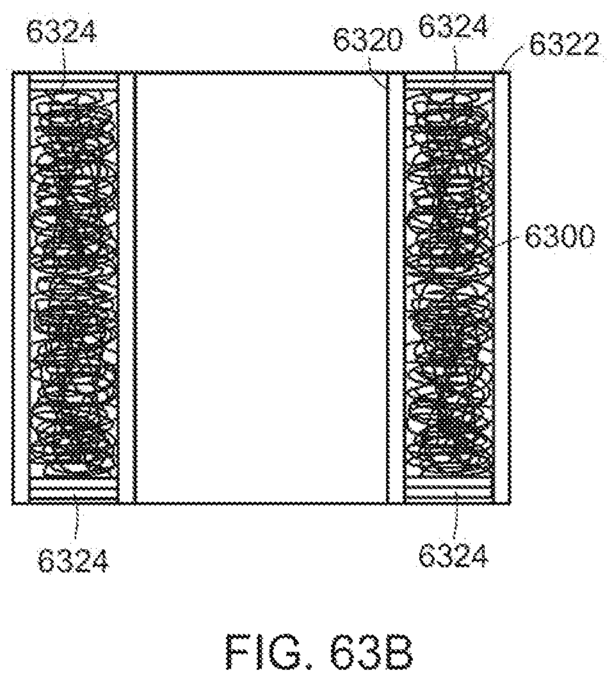

The starting material for the regenerator may be fibrillose and of random fiber form such as either steel or nickel wool. The composition of the fiber may be a glass or a ceramic or a metal such as steel, copper, or other high temperature materials. The diameter of the fiber is preferably in the range from 10 micrometers to 1 millimeter depending on the size of the regenerator and the properties of the metal. The starting material is placed into a form corresponding to the final shape of the regenerator which is depicted in cross-section in FIG. 63B. Inner canister cylindrical wall 6320, outer canister cylindrical wall 6322, and regenerator network 6300 are shown. The density of the regenerator is controlled by the amount of starting material placed in the form. The form may be porous to allow fluids to pass through the form.

In some embodiments, unsintered steel wool is employed as regenerator network 6300. Regenerator network 6300 is then retained within the regenerator canister by regenerator retaining screens 6324 or other filter, thereby comprising a "basket" which may advantageously capture steel wool fragments.

In one embodiment, applicable to starting material that is electrically conducting, the starting material is placed in a porous form and placed in an electrolyte bath. The starting material may be a metal, such as stainless steel, for example. An electrical connection is made with the starting material thereby forming an electrode. Cross-linking of the individual fibers in the starting material is accomplished by electrically depositing a second material 6306 onto the starting material. The selection of the starting material will depend on such factors as the particular deposition technique chosen and the chemical compatibility of the first and second materials, as known to one of ordinary skill in the electrochemical art. During deposition, the second material will build up on the starting material and form bridges 6308 between the individual fibers of the starting material in places where the individual fibers are in close proximity to each other. The deposition is continued until the bridges have grown to a sufficient size to hold the two individual fibers rigidly in place.

The deposition duration depends on the particular deposition process and is easily determined by one of ordinary skill in the art. After the deposition is completed, the regenerator is removed from the bath and the form and is cleaned.

In another embodiment the starting material is placed in a form that may be porous or not. The form containing the starting material is placed in a furnace and is partially sintered into a unitary piece. The selection of the sintering temperature and sintering time is easily determined by one of ordinary skill in the sintering art.

In another embodiment the starting material is placed in a porous form. The form containing the starting material is placed in a chemical bath and a second material, such as nickel, is chemically deposited to form bridges between the individual fibers.

In another embodiment the starting material is a silica glass fiber which is placed into a porous form. The glass fiber and form is dipped in a solution of tetraethylorthosilicate (TEOS) and ethanol so that the fiber is completely wetted by the solution. The fiber and form are removed from the solution and allowed to drain in a humid atmosphere. The solution will form meniscoidal shapes bridging fibers in close proximity to each other. The humidity of the atmosphere will start the hydrolysis-condensation reaction that converts the TEOS to silica forming a cross link between the two fibers. The fiber and form may be heat treated at a temperature less than 1000° C., most preferably less than 600° C., to remove the reactant products and form a silica bridge between the fibers.

In another embodiment a ceramic slurry is deposited onto a reticulated foam having the shape of the regenerator. The slurry is dried on the reticulated foam and heat treated to burn off the foam and sinter the ceramic. The ceramic may be composed of an oxide ceramic such as cordierite, alumina, or zirconia. The composition of the ceramic slurry and the heat treatment profile is easily specified by one of ordinary skill in the ceramic processing art.

Figure 64A:
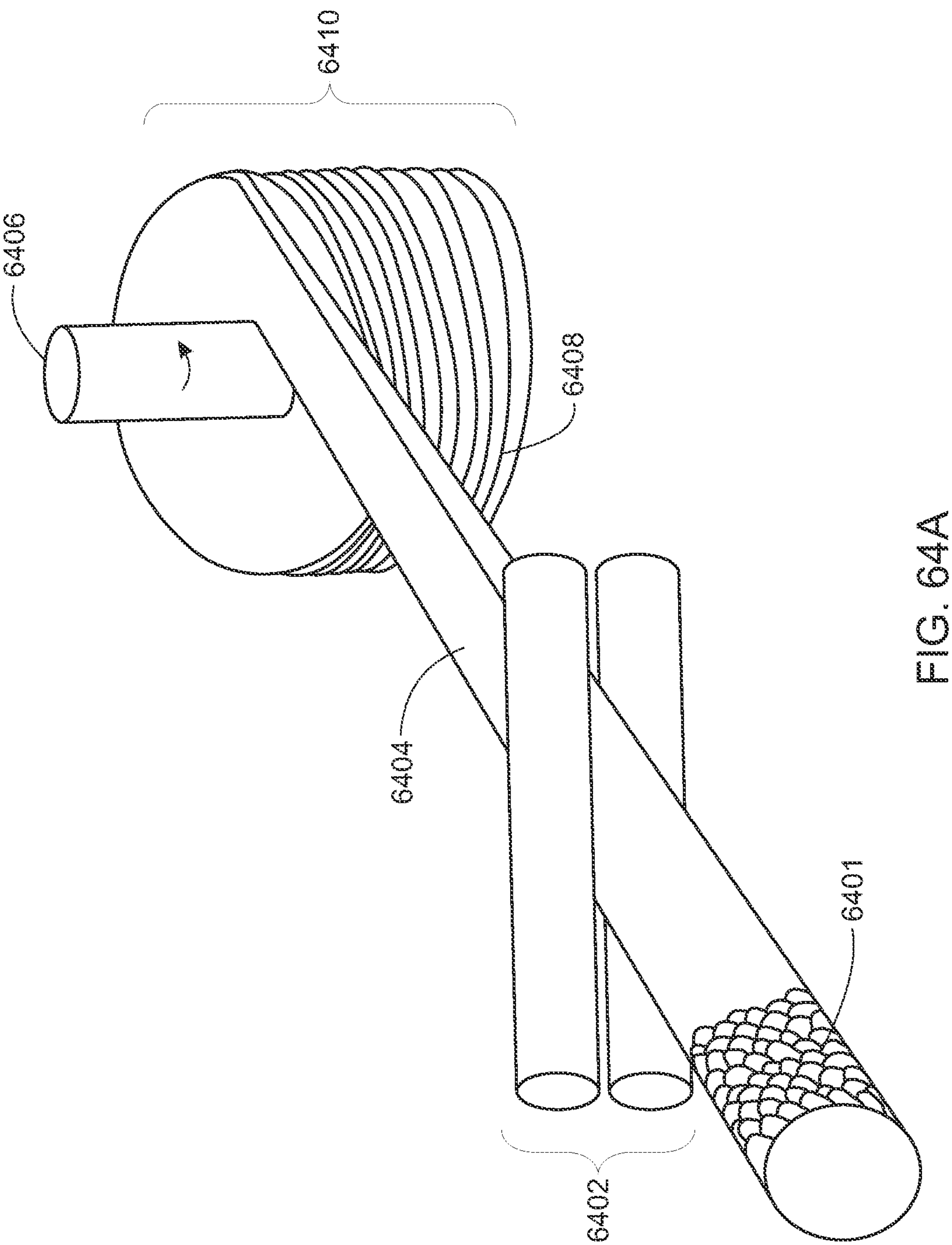
FIGS. 64A-64E show various configurations of a regenerator of a Stirling cycle engine in accordance with various embodiments.

In yet other embodiments, knit or woven wire is employed in fabrication of a regenerator as now described with reference to FIG. 64A. In accordance with these embodiments, knit or woven wire tube 6401 is flattened by rollers 6402 into tape 6404, in which form it is wound about mandrel 6406 into annular layers 6408. Stainless steel is advantageously used for knit wire tube 6401 because of its ability to withstand elevated temperature operation, and the diameter of the wire used is typically in the range of 1-2 mils, however other materials and gauges may be used in various embodiments. Alternatively, a plurality, typically 5-10, of the stainless steel wires may be loosely wound into a multi-filament thread prior to knitting into a wire tube. This process advantageously strengthens the resulting tube 6401. When mandrel 6406 is removed, annular assembly 6410 may be used as a regenerator in a thermal cycle engine.

Figure 64B:
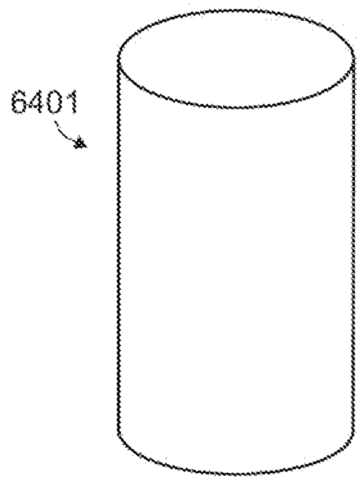
Figure 64C:
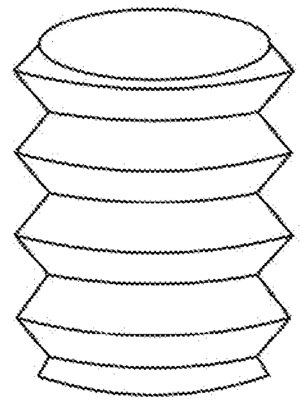
Figure 64D:
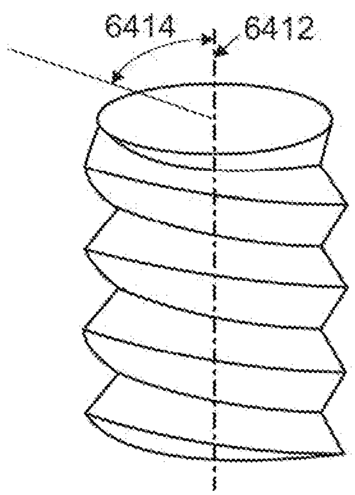
Figure 64E:
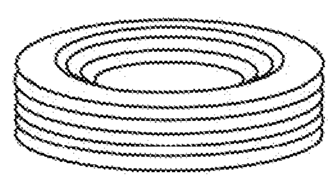

Still another embodiment is now described with reference to FIGS. 64B through 64E. Knit or woven wire tube 6401, shown in its right cylindrical form in FIG. 64B, is shown scored and partially compressed in FIG. 64C. Alternatively, the scoring may be at an angle 6414 with respect to the central axis 6412 of the tube, as shown in FIG. 64D. Tube 6401 is then axially compressed along central axis 6412 to form the bellows form 6416 shown in FIG. 64E that is then disposed as a regenerator within the regenerator volume 408 (shown in FIG. 4) of a Stirling cycle engine.

It is to be understood that the various regenerator embodiments and methods for their manufacture described herein may be adapted to function in a multiple cylinder configuration.

Coolant Penetrating Cold-End Pressure Vessel

Figure 65A:
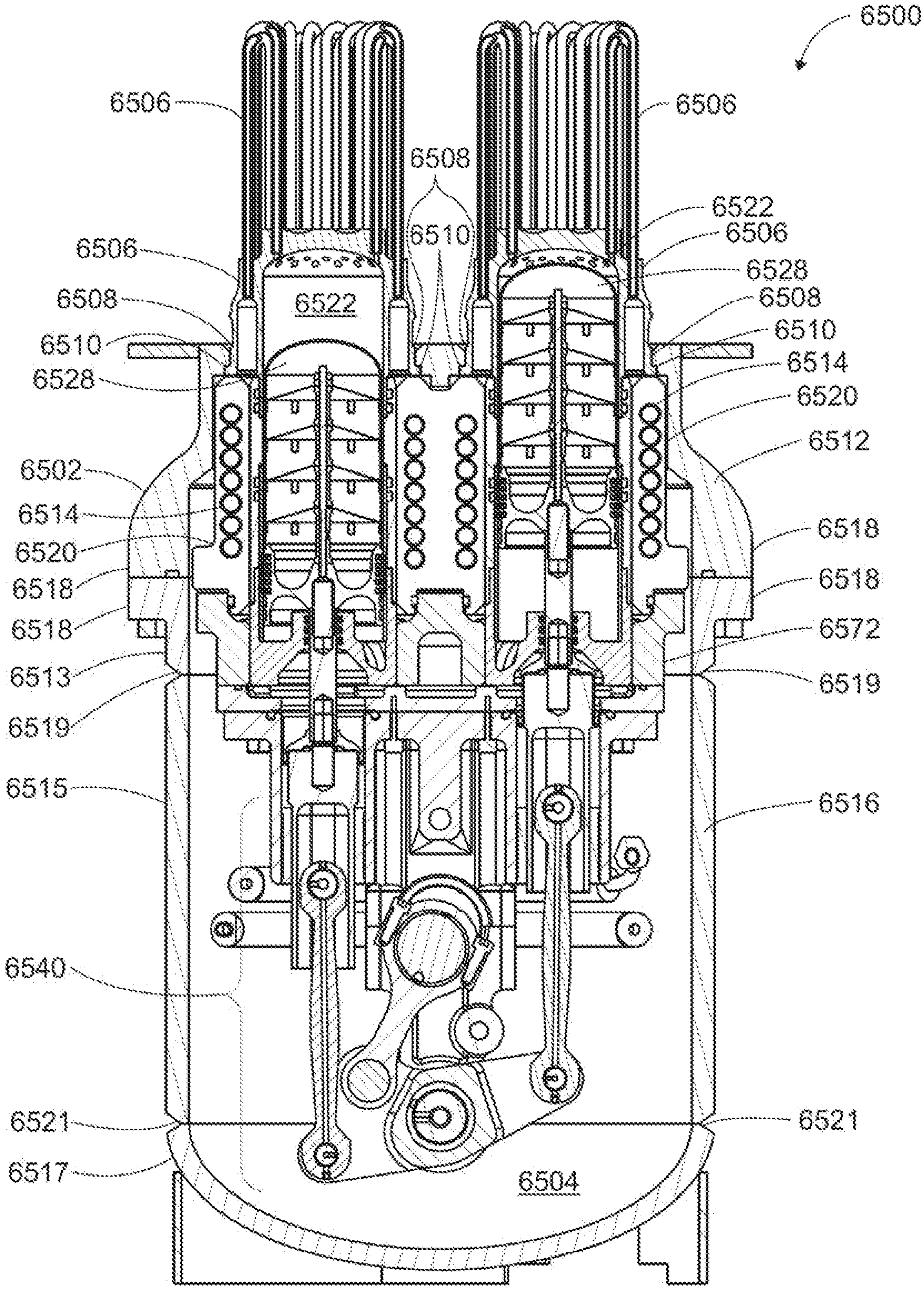
FIGS. 65A-65G show various views of an engine in accordance with several embodiments.
Figure 65B:
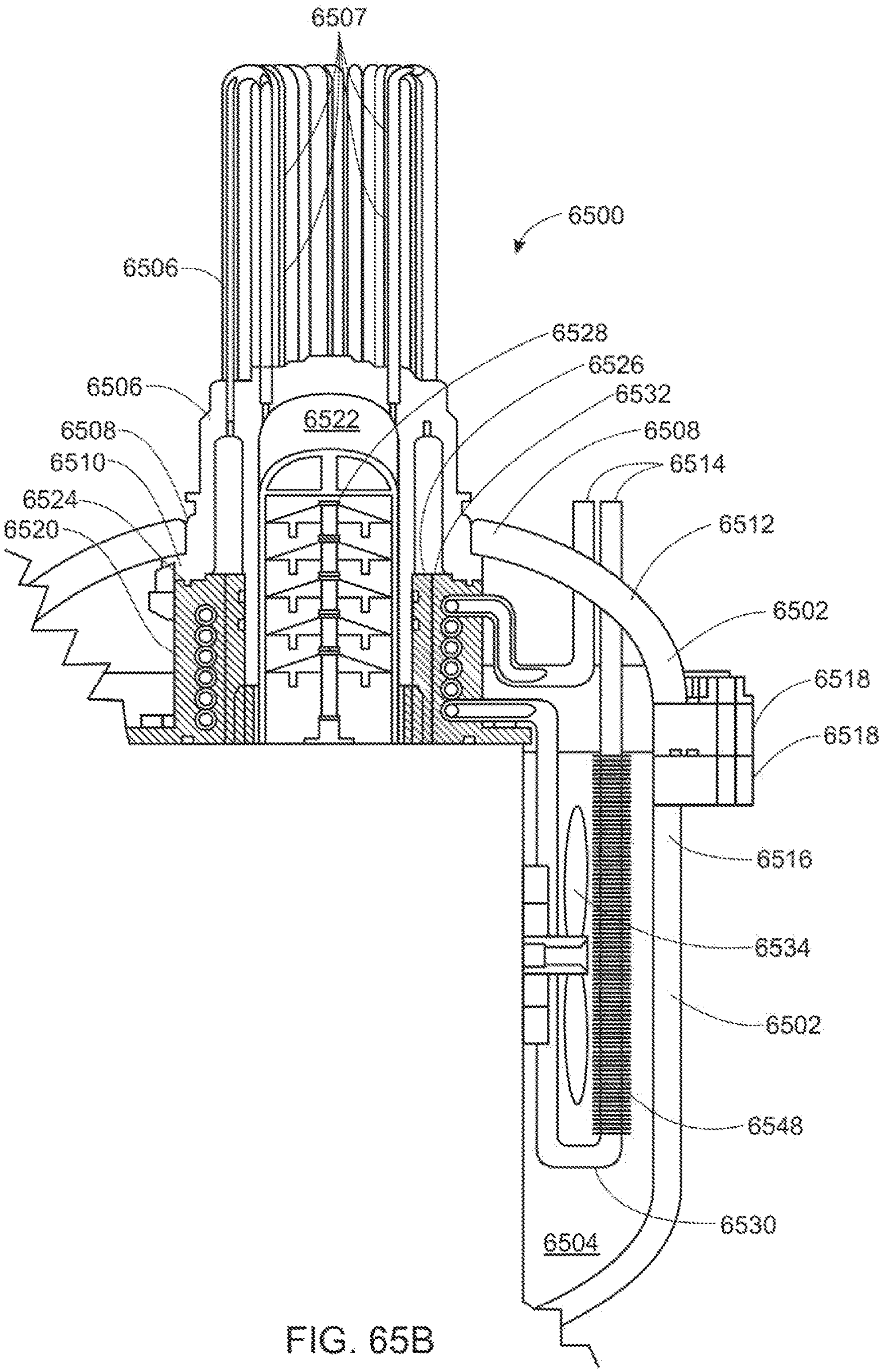
Figure 65C:
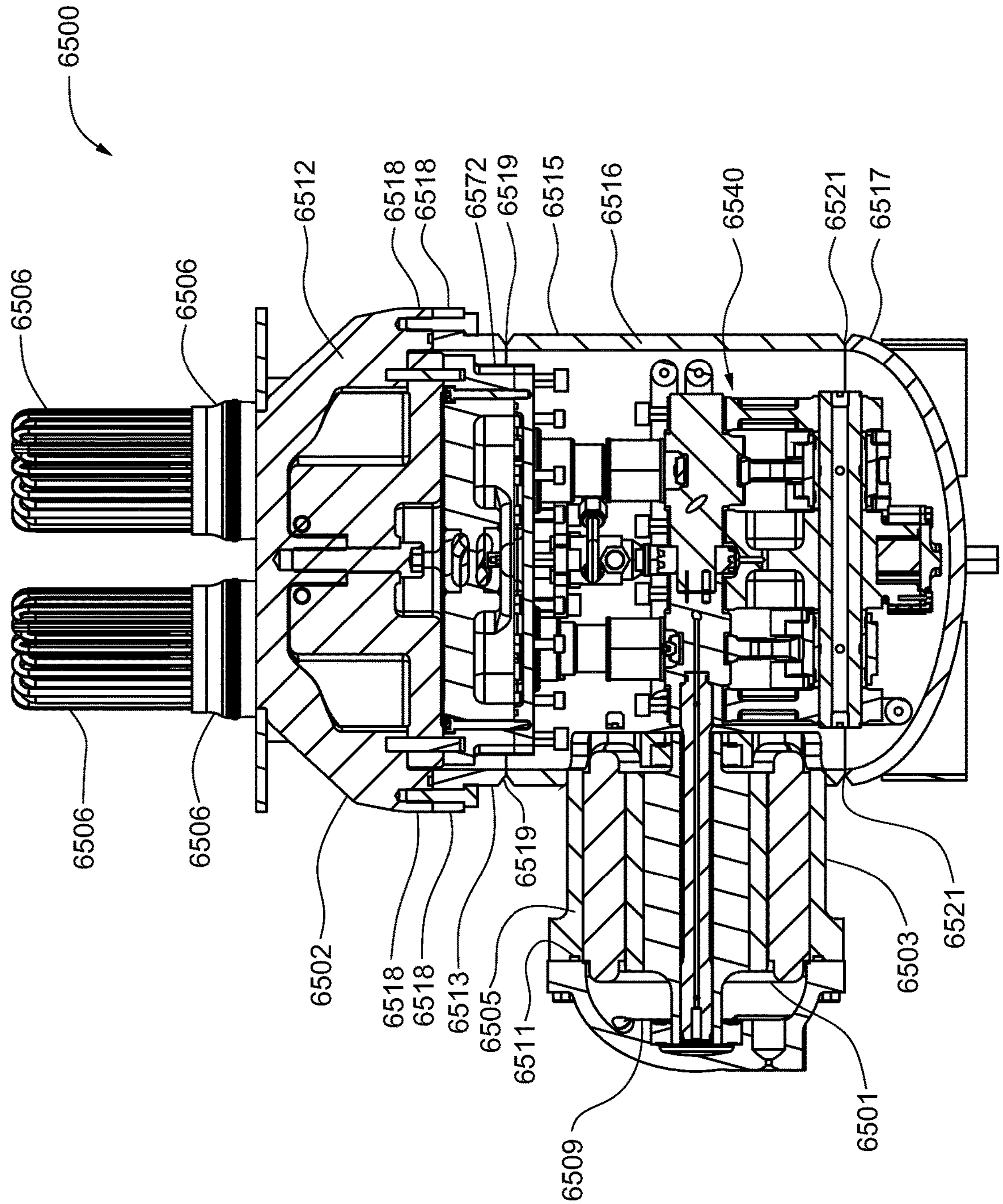
Figure 67A:
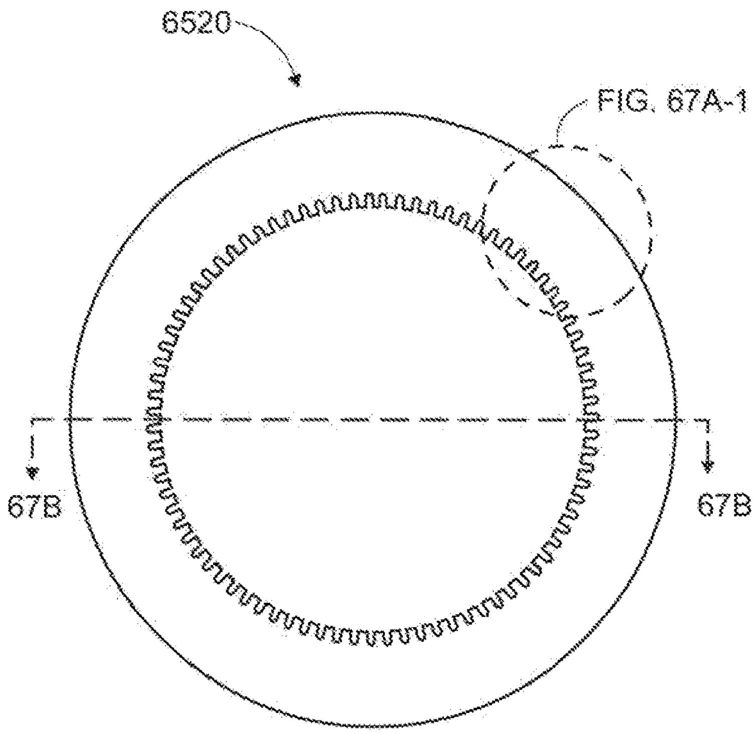
FIG. 67A shows a view of a cooler for an engine in accordance with one embodiment.
Figures 1, 67A:
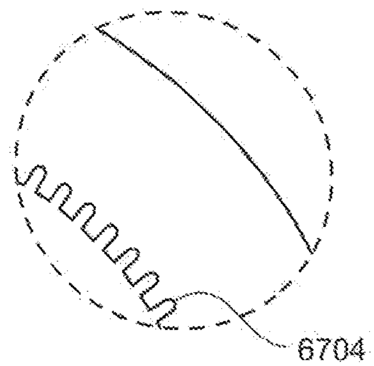

Referring now to FIGS. 65A-C, various cross-sections of an engine, such as a Stirling cycle engine, are shown in accordance with some embodiments. Engine 6500 is hermetically sealed. A crankcase 6502 serves as the cold-end pressure vessel and contains a charge gas in an interior volume 6504. Crankcase 6502 can be made arbitrarily strong without sacrificing thermal performance by using sufficiently thick steel or other structural material. A heater head 6506 serves as the hot-end pressure vessel and is preferably fabricated from a high temperature super-alloy such as Inconel 625, GMR-235, etc. Heater head 6506 is used to transfer thermal energy by conduction from an external thermal source (not shown) to the working fluid. Thermal energy may be provided from various heat sources such as solar radiation or combustion gases. For example, a burner, as previously discussed, may be used to produce hot combustion gases (shown as 6507 in FIG. 65B) that are used to heat the working fluid. An expansion area of cylinder (or warm section) 6522 is disposed inside the heater head 6506 and defines part of a working gas volume as discussed above with respect to FIG. 1. A piston 6528 is used to displace the working fluid contained in the expansion area of cylinder 6522.

In accordance with an embodiment, crankcase 6502 is welded directly to heater head 6506 at joints 6508 to create a pressure vessel that can be designed to hold any pressure without being limited, as are other designs, by the requirements of heat transfer in the cooler. In an alternative embodiment, the crankcase 6502 and heater head 6506 are either brazed or bolted together. The heater head 6506 has a flange or step 6510 that axially constrains the heater head and transfers the axial pressure force from the heater head 6506 to the crankcase 6502, thereby relieving the pressure force from the welded or brazed joints 6508. Joints 6508 serve to seal the crankcase 6502 (or cold-end pressure vessel) and bear the bending and planar stresses. In an alternative embodiment, the joints 6508 are mechanical joints with an elastomer seal. In yet another embodiment, step 6510 is replaced with an internal weld in addition to the exterior weld at joints 6508.

Crankcase 6502 is assembled in two pieces, an upper crankcase 6512 and a lower crankcase 6516. The heater head 6506 is first joined to the upper crankcase 6512. Second, a cooler 6520 is installed with a coolant tubing (shown as 6514 in FIG. 65B) passing through holes in the upper crankcase 6512. Third, the double acting pistons 6528 and drive components (designated generally as numeral 6540 in FIGS. 65A and 65C, not shown in FIG. 65B) are installed. In one embodiment, lower crankcase 6516 is assembled in three pieces, an upper section 6513, a middle section 6515, and a lower section 6517, as shown in FIGS. 65A and 65C. Middle section 6515 is may be connected to upper and lower sections 6513 and 6517 at joints 6519 and 6521, respectively, by any mechanical means known in the art, or by welding.

The lower crankcase 6516 is then joined to the upper crankcase 6512 at joints 6518. Preferably, the upper crankcase 6512 and the lower crankcase 6516 are joined by welding. Alternatively, a bolted flange may be employed (as shown in FIGS. 65B and 65C).

In some embodiments a motor/generator (shown as 6501 in FIG. 65C), such as a PM generator, may be installed into motor/generator housing (shown as 6503 in FIG. 65C), which is attached to the lower crankcase 6516, as shown in FIG. 65C. Motor/generator housing 6503 may be attached to lower crankcase 6516 by any mechanical means known in the art, or may be welded to lower crankcase 6516. Motor/generator housing 6503 may assembled in two pieces, a front section 6505, which is attached to lower crankcase 6516, and a rear section 6509, which may be welded or bolted to front section 6505. In one embodiment a seal 6511 may be positioned between the rear section 6509 and the front section 6505 of the motor/generator housing 6503. In some embodiments rear section 6509 is removable attached to front section 6505, which serves, among other functions, to allow for easy removal and installation of motor/generator 6501 during engine 6500 assembly.

In order to allow direct coupling of the heater head 6506 to the upper crankcase 6512, the cooling function of the thermal cycle is performed by a cooler 6520 that is disposed within the crankcase 6502, thereby advantageously reducing the pressure containment requirements placed upon the cooler. By placing the cooler 6520 within crankcase 6502, the pressure across the cooler is limited to the pressure difference between the working gas in the working gas volume, and the charge gas in the interior volume 6504 of the crankcase. The difference in pressure is created by the compression and expansion of the working gas, and is typically limited to a percentage of the operating pressure. In one embodiment, the pressure difference is limited to less than 30% of the operating pressure.

Coolant tubing 6514 advantageously has a small diameter relative to the diameter of the cooler 6520. The small diameter of the coolant passages, such as provided by coolant tubing 6514, is key to achieving high heat transfer and supporting large pressure differences. The required wall thickness to withstand or support a given pressure is proportional to the tube or vessel diameter. The low stress on the tube walls allows various materials to be used for coolant tubing 6514 including, but not limited to, thin-walled stainless steel tubing or thicker-walled copper tubing.

An additional advantage of locating the cooler 6520 entirely within the crankcase 6502 (or cold-end pressure vessel) volume is that any leaks of the working gas through the cooler 6520 will only result in a reduction of engine performance. In contrast, if the cooler were to interface with the external ambient environment, a leak of the working gas through the cooler would render the engine useless due to loss of the working gas unless the mean pressure of working gas is maintained by an external source. The reduced requirement for a leak-tight cooler allows for the use of less expensive fabrication techniques including, but not limited to, powder metal and die casting.

Cooler 6520 is used to transfer thermal energy by conduction from the working gas and thereby cool the working gas. A coolant, either water or another fluid, is carried through the crankcase 6502 and the cooler 6520 by coolant tubing 6514. The feedthrough of the coolant tubing 6514 through upper crankcase 6512 may be sealed by a soldered or brazed joint for copper tubes, welding, in the case of stainless steel and steel tubing, or as otherwise known in the art.

The charge gas in the interior volume 6504 may also require cooling due to heating resulting from heat dissipated in the motor/generator windings, mechanical friction in the drive, the non-reversible compression/expansion of the charge gas, and the blow-by of hot gases from the working gas volume. Cooling the charge gas in the crankcase 6502 increases the power and efficiency of the engine as well as the longevity of bearings used in the engine.

In one embodiment, an additional length of coolant tubing (shown as 6530 in FIG. 65B) is disposed inside the crankcase 6502 to absorb heat from the charge gas in the interior volume 6504. The additional length of coolant tubing 6530 may include a set of extended heat transfer surfaces (shown as 6548 in FIG. 65B), such as fins, to provide additional heat transfer. As shown in FIG. 65B, the additional length of coolant tubing 6530 may be attached to the coolant tubing 6514 between the crankcase 6502 and the cooler 6520. In an alternative embodiment, the length of coolant tubing 6530 may be a separate tube with its own feedthrough of the crankcase 6502 that is connected to the cooling loop by hoses outside of the crankcase 6502.

In another embodiment the extended coolant tubing 6530 may be replaced with extended surfaces on the exterior surface of the cooler 6520 or the drive housing (shown as 6572 in FIGS. 65A and 65C). Alternatively, a fan (shown as 6534 in FIG. 65B) may be attached to the engine crankshaft (shown as 6542 in FIG. 65C) to circulate the charge gas in interior volume 6504. The fan 6534 may be used separately or in conjunction with the additional coolant tubing 6530 or the extended surfaces on the cooler 6520 or drive housing 6572 to directly cool the charge gas in the interior volume 6504.

Preferably, coolant tubing 6514 is a continuous tube throughout the interior volume 6504 of the crankcase and the cooler 6520. Alternatively, two pieces of tubing could be used between the crankcase and the feedthrough ports of the cooler. One tube carries coolant from outside the crankcase 6502 to the cooler 6520. A second tube returns the coolant from the cooler 6520 to the exterior of the crankcase 6502. In another embodiment, multiple pieces of tubing may be used between the crankcase 6502 and the cooler in order to add tubing with extended heat transfer surfaces inside the crankcase volume 6504 or to facilitate fabrication. The tubing joints and joints between the tubing and the cooler may be brazed, soldered, welded or mechanical joints.

Various methods may be used to join coolant tubing 6514 to cooler 6520. Any known method for joining the coolant tubing 6514 to the cooler 6520 may be used in various embodiments. In one embodiment, the coolant tubing 6514 may be attached to the wall of the cooler 6520 by brazing, soldering or gluing. Cooler 6520 is in the form of a cylinder placed around the cylinder 6522 and the annular flow path of the working gas outside of the cylinder 6522. Accordingly, the coolant tubing 6514 may be wrapped around the interior of the cooler cylinder wall and attached as mentioned above.

Figure 65D:
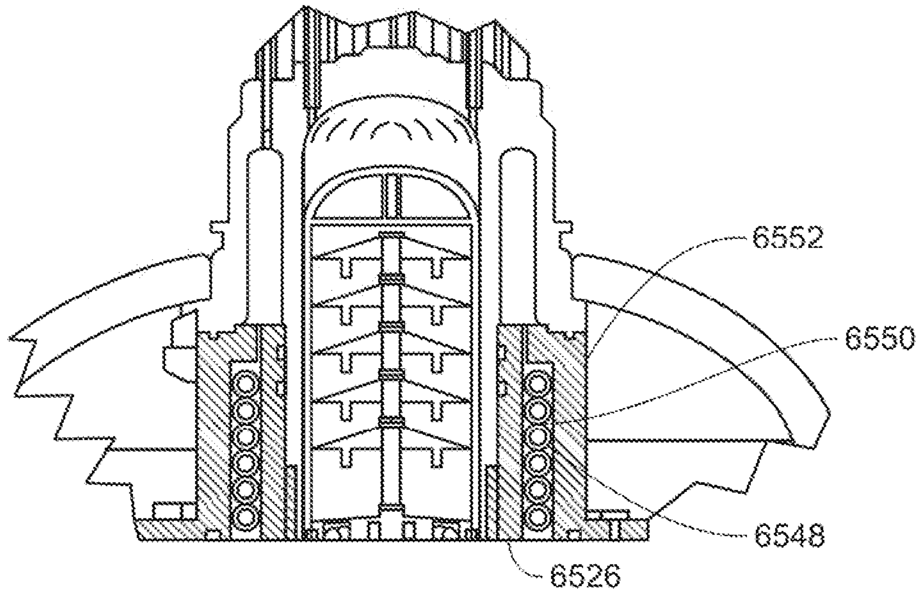
Figure 65E:
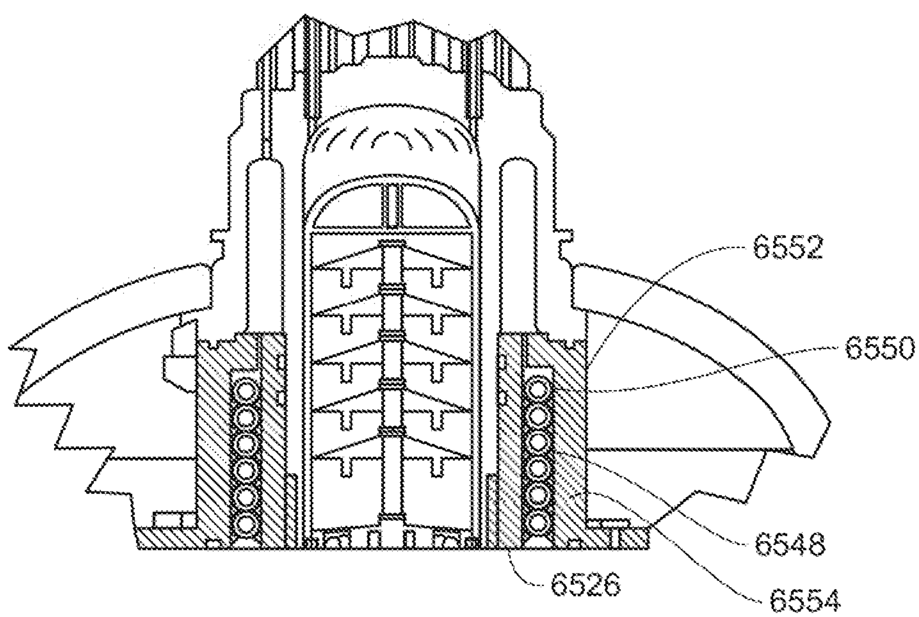

Alternative cooler configurations are presented in FIGS. 65D-65G that reduce the complexity of the cooler body fabrication. FIG. 65D shows one embodiment of a side view of a Stirling cycle engine including coolant tubing. In FIG. 65D, cooler 6552 includes a cooler working space 6550. Coolant tubing 6548 is placed within the cooler working space 6550, so that the working gas can flow over an outside surface of coolant tubing 6548. The working gas is confined to flow past the coolant tubing 6548 by the cooler body 6552 and a cooler liner 6526. The coolant tube passes into and out-of the working space 6550 through ports in either the cooler 6552 or the drive housing 6572 (shown in FIGS. 65A and 65C). The cooler casting process is simplified by having a seal around coolant lines 6548. In addition, placing the coolant line 6548 in the working space improves the heat transfer between the working fluid and the coolant fluid. The coolant tubing 6548 may be smooth or may have extended heat transfer surfaces or fins on the outside of the tubing to increase heat transfer between the working gas and the coolant tubing 6548. In another embodiment, as shown in FIG. 65E, spacing elements 6554 may be added to the cooler working space 6550 to force the working gas to flow closer to the coolant tubes 6548. The spacing elements are separate from the cooler liner 6526 and the cooler body 6552 to allow insertion of the coolant tube and spacing elements into the working space.

Figure 65F:
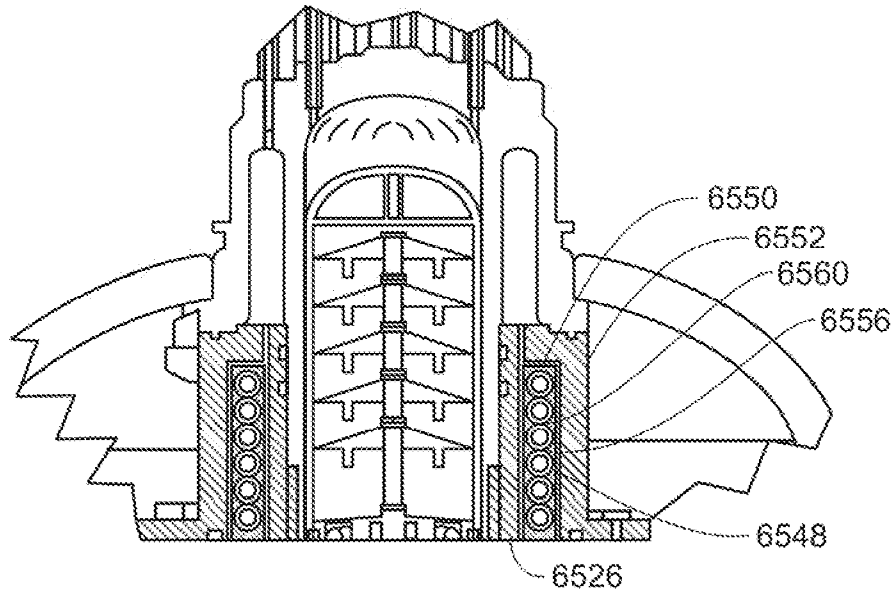
Figure 65G:
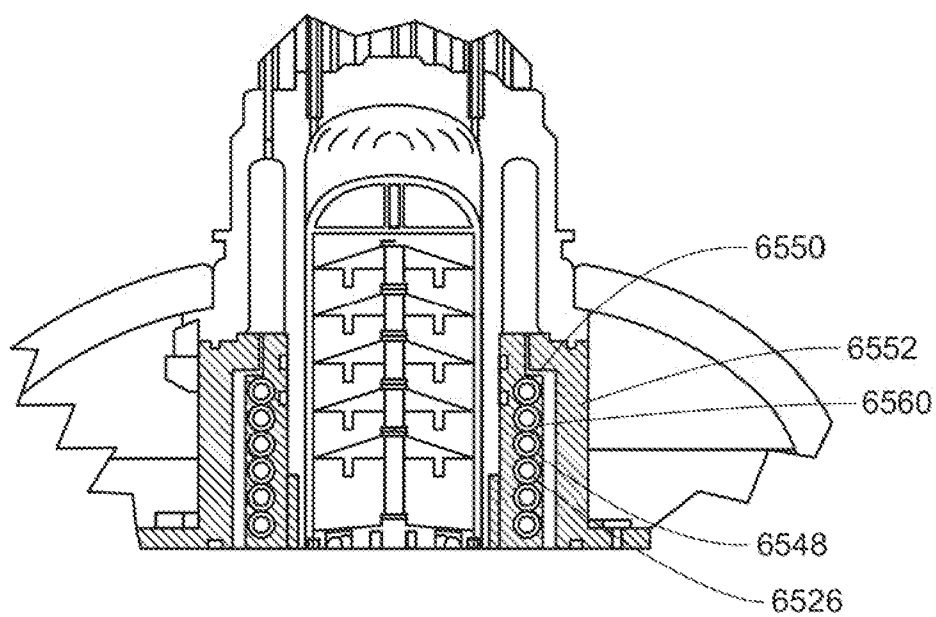

In another embodiment, as shown in FIG. 65F, coolant tubing 6548 is overcast to form an annular heat sink 6556 where the working gas can flow on both sides of the cooler body 6552. The annular heat sink 6556 may also include extended heat transfer surfaces on its inner and outer surfaces 6560. The body of the cooler 6552 constrains the working gas to flow past the extended heat exchange surfaces on heat sink 6556. The heat sink 6556 is typically a simpler part to fabricate than the cooler 6520 in FIGS. 65A and 65B. The annular heat sink 6556 provides roughly double the heat transfer area of cooler 6520 shown in FIGS. 65A and 65B. In another embodiment, as shown in FIG. 65G, the cooler liner 6526 can be cast over the coolant lines 6548. The cooler body 6552 constrains the working gas to flow past the cooler liner 6562. Cooler liner 6526 may also include extended heat exchange surfaces on a surface 6560 to increase heat transfer.

Returning to FIG. 65B, one method for joining coolant tubing 6514 to cooler 6520 is to overcast the cooler around the coolant tubing. This method is described, with reference to FIGS. 66A and 66B, and may be applied to a pressurized close-cycle machine as well as in other applications where it is advantageous to locate a cooler inside the crankcase.

Figure 66A:
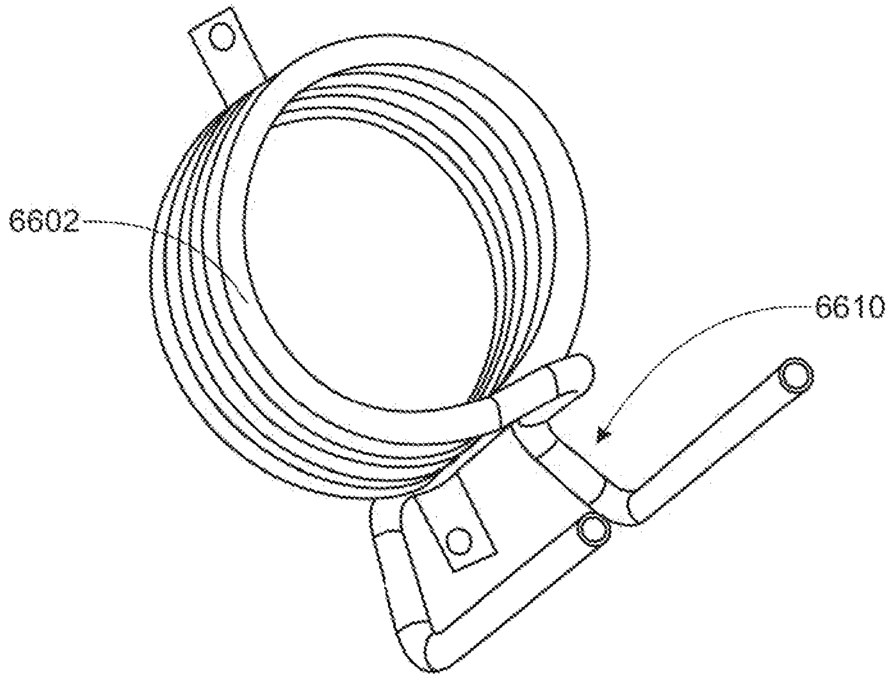
FIGS. 66A and 66B show views of a cooler for an engine in accordance with some embodiments.

Referring to FIG. 66A, a heat exchanger, for example, a cooler 6520 (shown in FIGS. 65A and 65B) may be fabricated by forming a high-temperature metal tubing 6602 into a desired shape. In one embodiment, the metal tubing 6602 is formed into a coil using copper. A lower temperature (relative to the melting temperature of the tubing) casting process is then used to overcast the tubing 6602 with a high thermal conductivity material to form a gas interface 6604 (and 6532 in FIG. 65B), seals 6606 (and 6524 in FIG. 65B) to the rest of the engine and a structure to mechanically connect the drive housing 6572 (shown in FIG. 2) to the heater head 6506 (shown in FIG. 65B. In one embodiment, the high thermal conductivity material used to overcast the tubing is aluminum. Overcasting the tubing 6602 with a high thermal conductivity metal assures a good thermal connection between the tubing and the heat transfer surfaces in contact with the working gas. A seal is created around the tubing 6602 where the tubing exits the open mold at 6610. This method of fabricating a heat exchanger advantageously provides cooling passages in cast metal parts inexpensively.

Figure 66B:
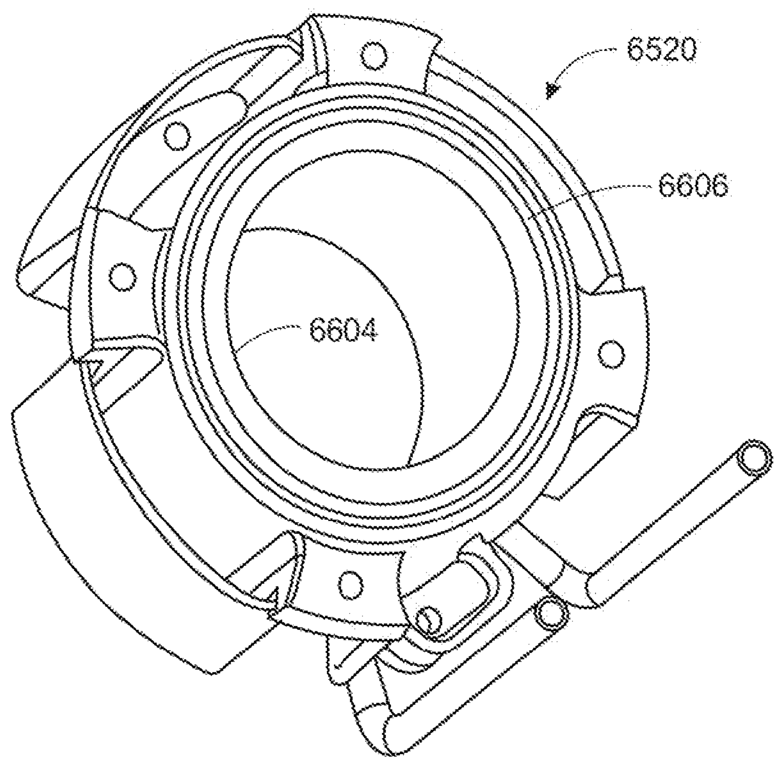

FIG. 66B is a perspective view of a cooling assembly cast over the cooling coil of FIG. 66A. The casting process can include any of the following: die casting, investment casting, or sand casting. The tubing material is chosen from materials that will not melt or collapse during the casting process. Tubing materials include, but are not limited to, copper, stainless steel, nickel, and super-alloys such as Inconel. The casting material is chosen among those that melt at a relatively low temperature compared to the tubing. Typical casting materials include aluminum and its various alloys, and zinc and its various alloys.

The heat exchanger may also include extended heat transfer surfaces to increase the interfacial area 6604 (and 6532 shown in FIG. 65B) between the hot working gas and the heat exchanger so as to improve heat transfer between the working gas and the coolant. Extended heat transfer surfaces may be created on the working gas side of the heat exchanger 6520 by machining extended surfaces on the inside surface (or gas interface) 6604. Referring to FIG. 65B, a cooler liner 6526 (shown in FIG. 65B) may be pressed into the heat exchanger to form a gas barrier on the inner diameter of the heat exchanger. The cooler liner 6526 directs the flow of the working gas past the inner surface of the cooler.

Figure 67B:
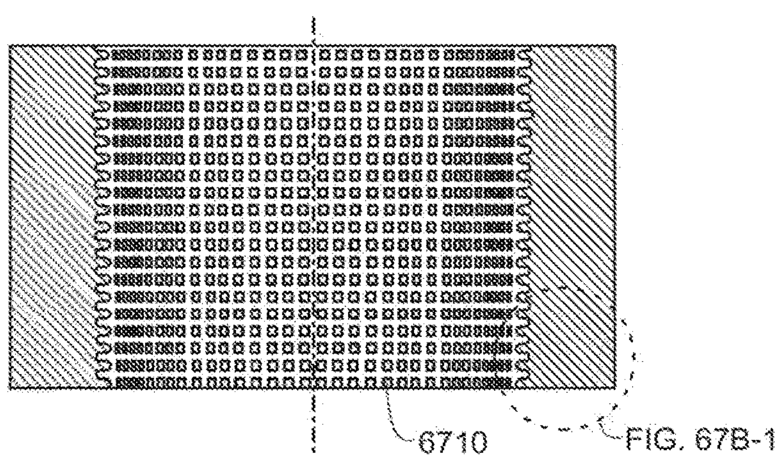
FIG. 67B shows a view of a cooler for an engine in accordance with one embodiment.
Figures 1, 67B:
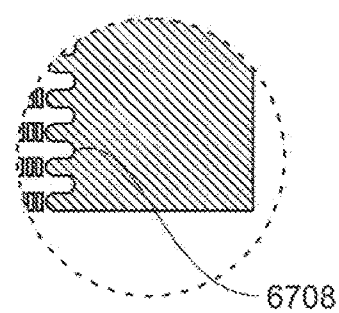
Figure 67C:
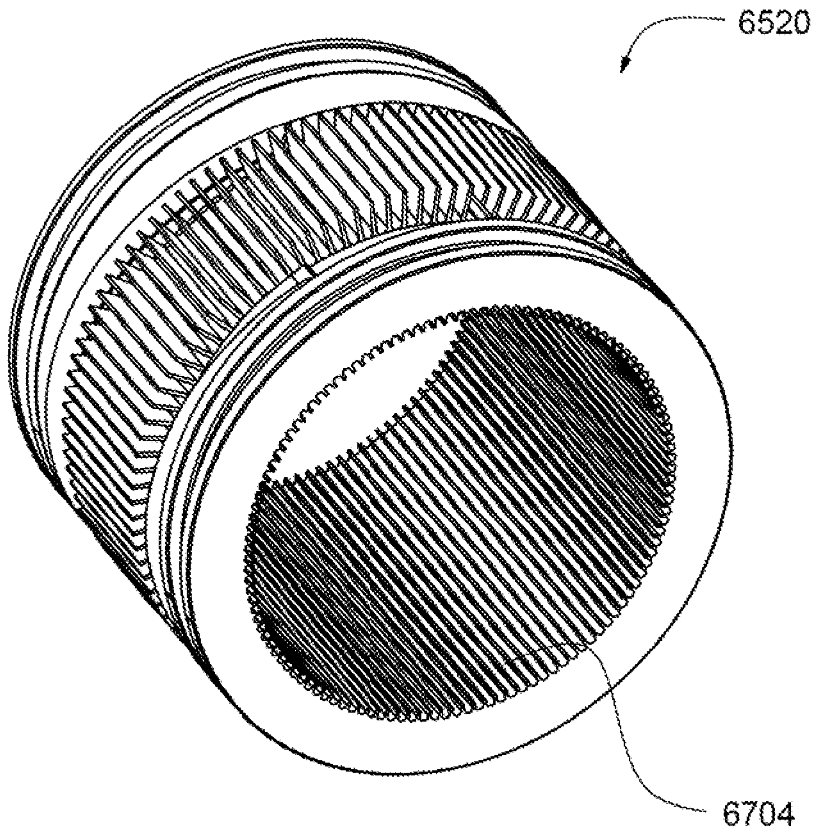
FIG. 67C shows a view of the embodiment of a cooler for an engine depicted in FIG. 67A.

The extended heat transfer surfaces can be created by any of the methods known in the art. In accordance some embodiments, longitudinal grooves 6704 are broached into the surface, as shown in detail in FIGS. 67A and 67C. Alternatively, lateral grooves 6708 (also shown in enlarged section view FIG. 67B-1) may be machined in addition to the longitudinal grooves 6704 (also shown in enlarged section view FIG. 67A-1) thereby creating aligned pins 6710 as shown in FIG. 67B. In some embodiments, grooves are cut at a helical angle to increase the heat exchange area.

In an alternative embodiment, the extended heat transfer surfaces on the gas interface 6604 (as shown in 66B) of the cooler are formed from metal foam, expanded metal or other materials with high specific surface area. For example, a cylinder of metal foam may be soldered to the inside surface of the cooler 6604. As discussed above, a cooler liner 6526 (shown in FIG. 65B) may be pressed in to form a gas barrier on the inner diameter of the metal foam. Other methods of forming and attaching heat transfer surfaces to the body of the cooler are described in U.S. Pat. No. 6,694,731, issued Feb. 24, 2004, entitled Stirling Engine Thermal System Improvements, which is herein incorporated by reference in its entirety.

Additional coolant penetrating cold-end pressure vessel embodiments are described in U.S. Pat. No. 7,325,399. It is to be understood that the various coolant penetrating cold-end pressure vessel embodiments referred to herein may be adapted to function in a multiple cylinder engine configuration.

Intake Manifold

Figure 68:
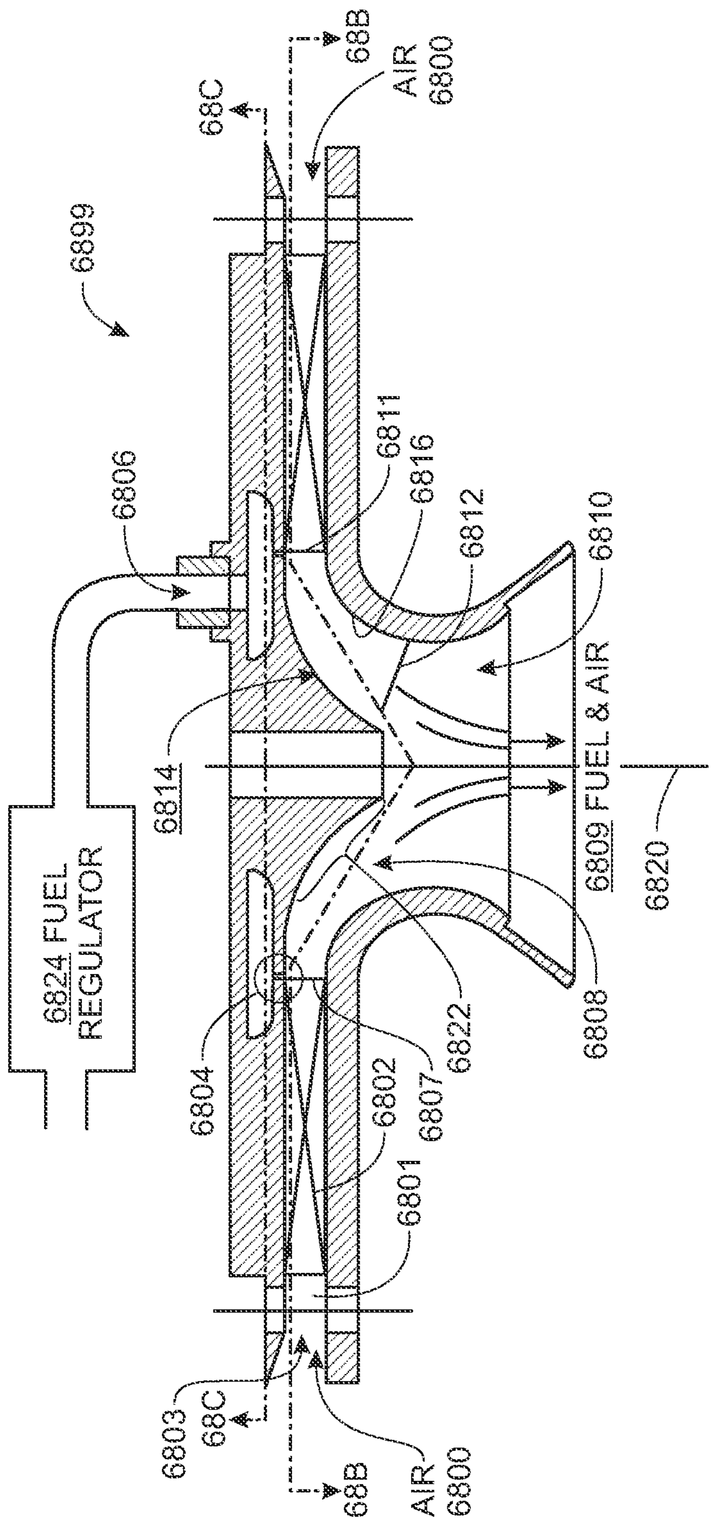
FIG. 68 shows a view of an intake manifold for an engine in accordance with one embodiment.
Figure 69A:
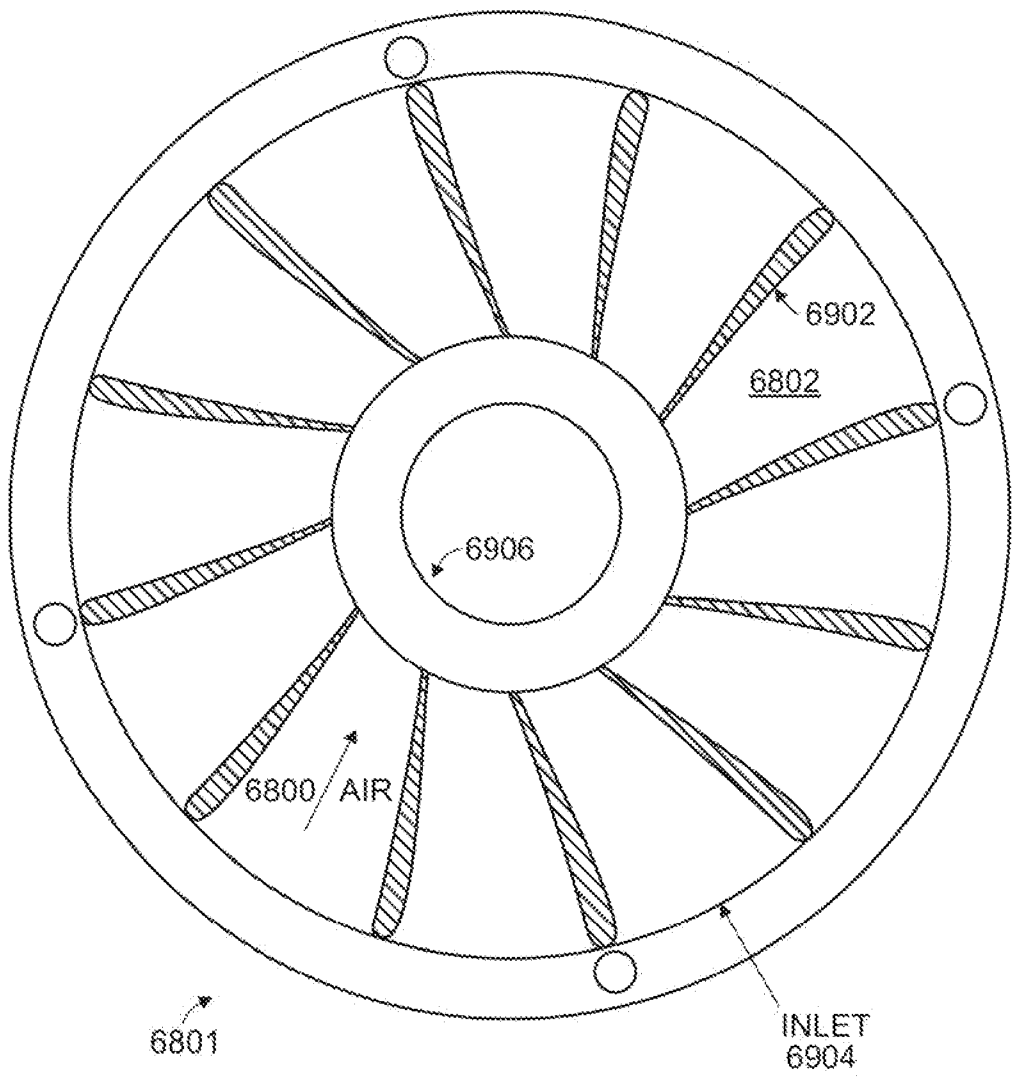
FIGS. 69A and 69B show various views of an intake manifold for an engine in accordance with one embodiment.
Figure 69B:
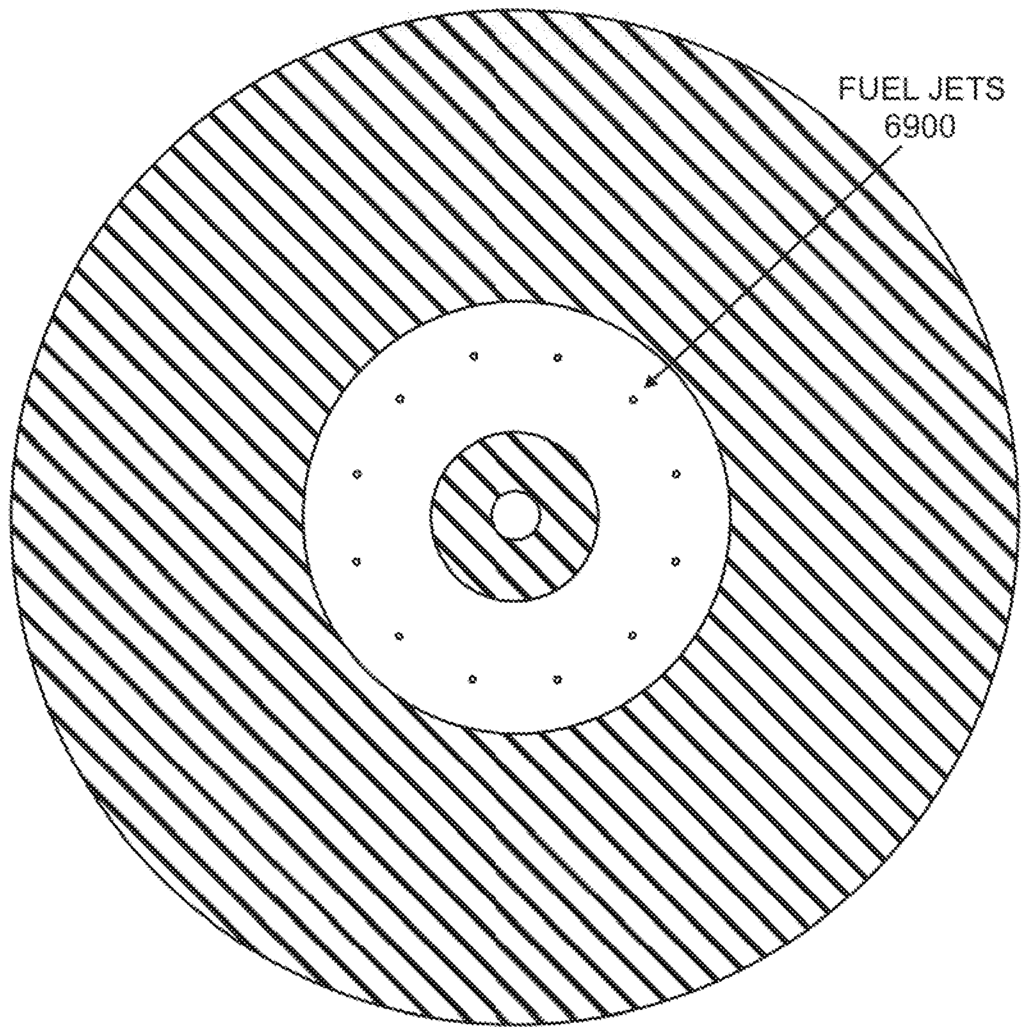

Referring now to FIGS. 68-69B, an intake manifold 6899, is shown for application to a Stirling cycle engine or other combustion application in accordance with some embodiments. Various embodiments of intake manifold 6899 are further disclosed in U.S. Pat. No. 6,381,958. In accordance with some embodiments, fuel is pre-mixed with air that may be heated above the fuel's auto-ignition temperature and a flame is prevented from forming until the fuel and air are well-mixed. FIG. 68 shows one embodiment including an intake manifold 6899 and a combustion chamber 6810. The intake manifold 6899 has an axisymmetrical conduit 6801 with an inlet 6803 for receiving air 6800. Air 6800 is pre-heated to a temperature, typically above 900 K, which may be above the auto-ignition temperature of the fuel. Conduit 6801 conveys air 6800 flowing inward radially with respect to combustion axis 6820 to a swirler 6802 disposed within the conduit 6801.

FIG. 69A shows a cross sectional view of the conduit 6801 including swirler 6802 in accordance with some embodiments. In the embodiment of FIG. 69A, swirler 6802 has several spiral-shaped vanes 6902 for directing the flow of air 6800 radially inward and imparting a rotational component on the air. The diameter of the swirler section of the conduit decreases from the inlet 6904 to the outlet 6906 of swirler 6802 as defined by the length of the swirler section conduit 6801. The decrease in diameter of swirler vanes 6902 increases the flow rate of air 6800 in substantially inverse proportion to the diameter. The flow rate is increased so that it is above the flame speed of the fuel. At outlet 6906 of swirler 6802, fuel 6806, which in a one embodiment is propane, is injected into the inwardly flowing air.

In some embodiments, fuel 6806 is injected by fuel injector 6804 through a series of nozzles 6900 as shown in FIG. 69B. More particularly, FIG. 69B shows a cross sectional view of conduit 6801 and includes the fuel jet nozzles 6900. Each of the nozzles 6900 is positioned at the exit of the swirler vanes 6902 and is centralized between two adjacent vanes. Nozzles 6900 are positioned in this way for increasing the efficiency of mixing the air and fuel. Nozzles 6900 simultaneously inject the fuel 6806 across the air flow 6800. Since the air flow is faster than the flame speed, a flame will not form at that point even though the temperature of the air and fuel mixture is above the fuel's auto-ignition temperature. In some embodiments, where propane is used, the preheat temperature, as governed by the temperature of the heater head, is approximately 900 K.

Referring again to FIG. 68, the air and fuel, now mixed, referred to hereafter as "air-fuel mixture" 6809, is transitioned in direction through a throat 6808 which has a contoured fairing 6822 and is attached to the outlet 6807 of the conduit 6801. Fuel 6806 is supplied via fuel regulator 6824.

Throat 6808 has an inner radius 6814 and an outer dimension 6816. The transition of the air-fuel mixture is from a direction which is substantially transverse and radially inward with respect to combustion axis 6820 to a direction which is substantially parallel to the combustion axis. The contour of the fairing 6822 of throat 6808 has the shape of an inverted bell such that the cross sectional area of throat 6808 with respect to the combustion axis remains constant from the inlet 6811 of the throat to outlet 6812 of the throat. The contour is smooth without steps and maintains the flow speed from the outlet of the swirler to the outlet of the throat 6808 to avoid separation and the resulting recirculation along any of the surfaces. The constant cross sectional area allows the air and fuel to continue to mix without decreasing the flow speed and causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved in practice. Thus, the parasitic power drain of the combustion air fan may be minimized.

Outlet 6812 of the throat flares outward allowing the air-fuel mixture 6809 to disperse into the chamber 6810 slowing the air-fuel mixture 6809 thereby localizing and containing the flame and causing a toroidal flame to form. The rotational momentum generated by the swirler 6802 produces a flame stabilizing ring vortex as well known in the art.

Figure 70:
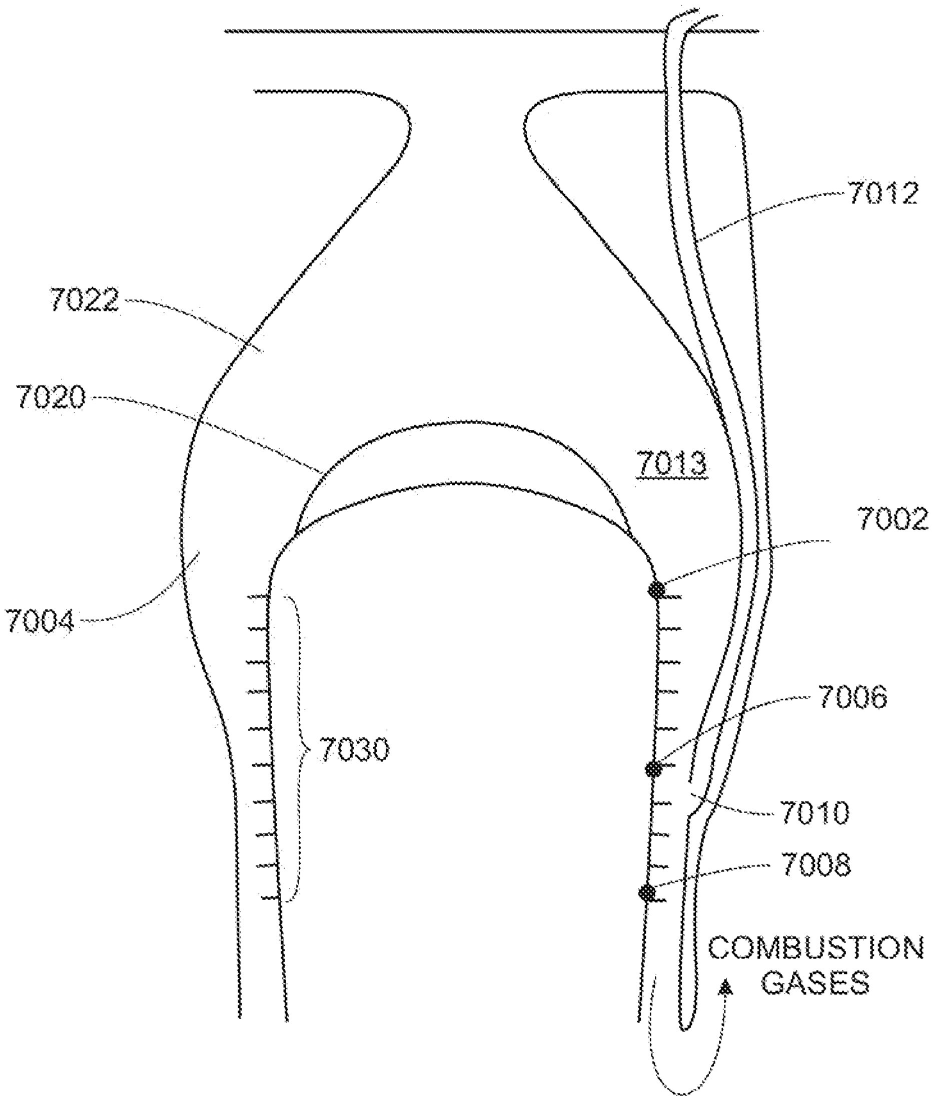
FIG. 70 shows a view of a heater head of an engine in accordance with yet another embodiment of the invention.

Referring to FIG. 70, a cross-section is shown of combustor 7022 and exhaust gas flow path 7013, as described above in reference to earlier figures. In accordance with another embodiment it is recognized that the combustion exhaust gases remain above the temperature of combustion of the fuel well beyond the region of combustor 7022, and that, since the fuel/air mixture is typically exceedingly lean, adequate oxidant remains for recombustion of the exhaust gases.

FIG. 70 further illustrates the use of a temperature sensor 7002, typically a thermocouple, to monitor the temperature of heater head 7020 at the top of external pin array 7030 and thereby to control the fuel flow such as to maintain the temperature at sensor 7002 below a temperature at which the heater head significantly loses strength. The temperature at sensor 7002 is preferably maintained approximately 50.degree. C. below the melting temperature of the heater head material.

In the configuration depicted in FIG. 70, the use of a variable-cross-section gas flow bypass channel 7004 is illustrated, as described above. The taper of the bypass channel is greatly exaggerated for clarity of depiction. Even where a bypass channel is employed, the temperature profile as a function of distance from the top of the heater head is not flat, as would be preferable. Two additional temperature sensors, 7006 and 7008, are shown at the middle and bottom, respectively, of external pin array 7030, whereby the temperature of the exhaust gas may be monitored.

In accordance some embodiments, additional fuel is added to the exhaust gases at nozzle 7010 via afterburner fuel line 7012. Nozzle 7010 may be a ring burner, circumferentially surrounding heater head 7020 and facing external pin array 7030 between the positions designated in FIG. 70 by temperature sensors 7002 and 7006. The fuel flow through afterburner fuel line 7012 may be controlled on the basis of the exhaust gas temperature measured by temperature sensor 7008. The precise position of temperature 7008 is preferably such as to measure the maximum temperature of the external pin array produced by the combustion of fuel exiting from afterburner nozzle 7010.

Figure 71A:
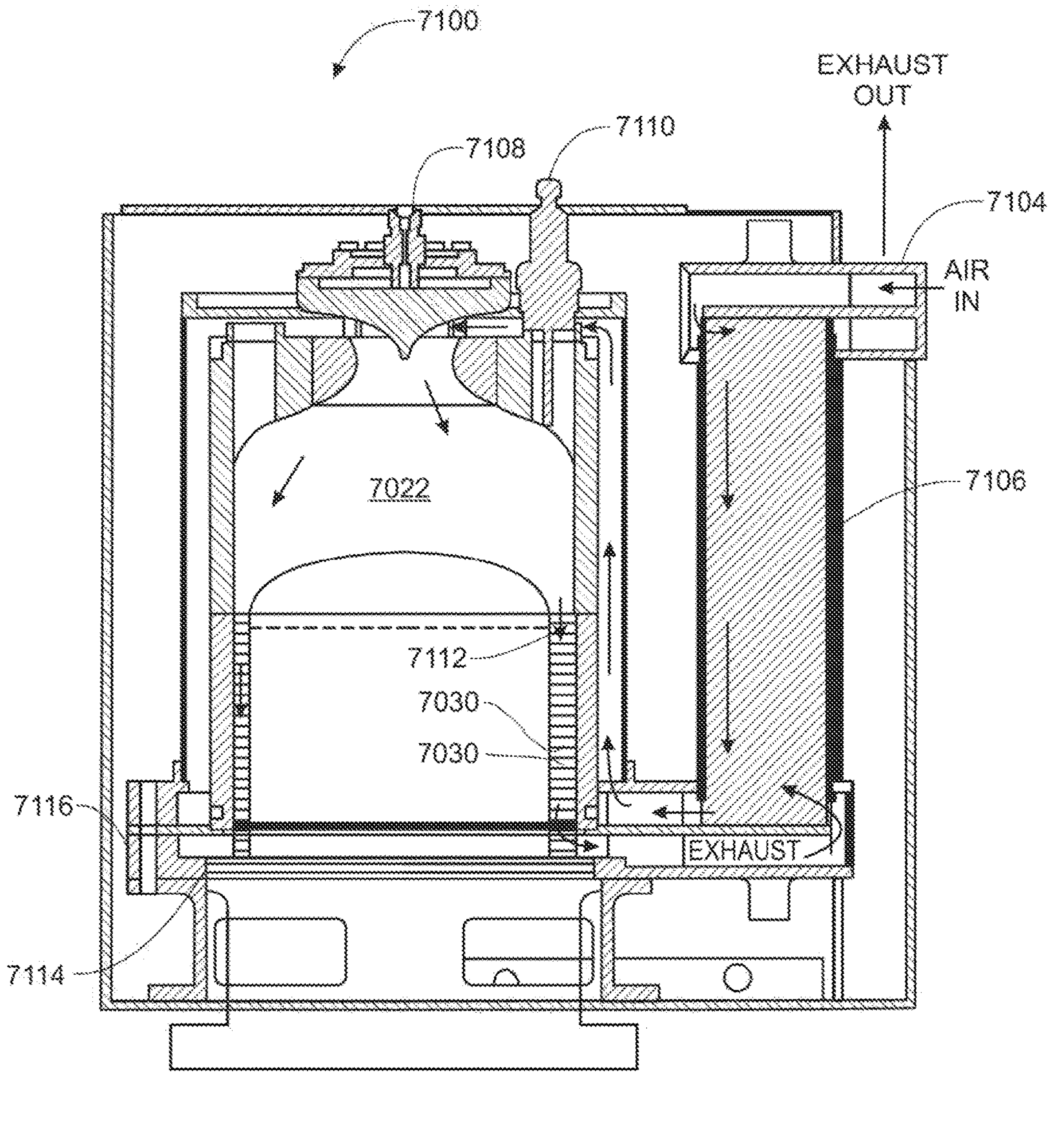
FIGS. 71A and 71B show views of a burner of an engine in accordance with one embodiment.
Figure 71B:
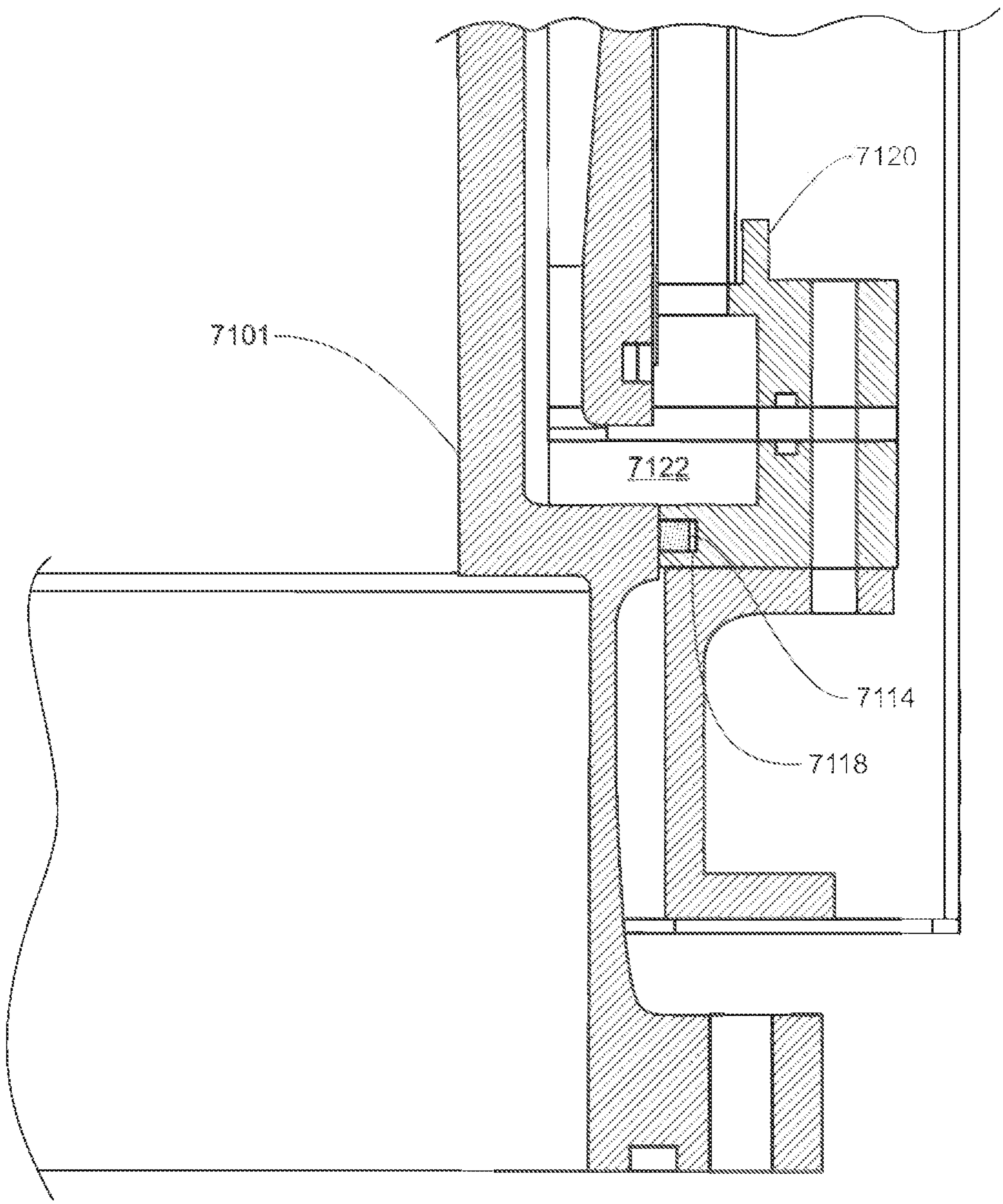

Referring to FIG. 71A, a side view is shown in cross section of a burner and heat recovery system, designated generally by numeral 7100, for a thermal cycle engine in accordance some embodiments. In the embodiment shown, heat is exchanged between hot exhaust gases, heated in combustor 7022, and air drawn in at air inlet 7104 in a heat exchanger 7106 that is external to the heater head assembly. Additionally shown is fuel inlet 7108 and igniter 7110 used to initiate ignition in the combustor. Exhaust stream 7112 traverses heat transfer pins 7030 before being channeled to heat exchanger 7106. A seal ring 7114 of copper, or other metal of sufficiently high melting temperature, forms a rod type seal on heater head flange 7116 just below the bottom row of heat transfer pins 7030. Copper ring 7114 fits tightly on heater head flange 7116 producing a labyrinth seal. The right-hand portion of the cross-sectional view of FIG. 71A, showing the region of the seal, is shown, enlarged, in FIG. 71B. Copper seal ring 7114 fits tightly on heater head 7101 and has a close fit within annular groove 7118 on the bottom surface of burner cover 7120. The configuration of ring 7114 in groove 7118 produces a labyrinth seal causing the exhaust gas, in exhaust plenum 7122 to travel a convoluted path around the back side of seal ring 7114 thereby limiting exhaust gas leakage. The tight fit of ring 7114 onto head 7101 limits exhaust gas leakage axially out of the burner.

It is to be understood that the various intake manifold embodiments described herein may be adapted to function in a multiple burner configuration.

Gaseous Fuel Burner

Definitions: As used in this section of the detailed description, the following terms shall have the meanings indicated, unless the context otherwise requires: Fuel-Air Equivalence ratio (.phi.)=Actual Fuel-Air Mass Ratio/Stoichiometric Fuel-Air Mass Ratio. The stoichiometric fuel-air mass ratio is defined as the mass ratio needed to balance the fuel+air chemical equation. The stoichiometric fuel-air mass ratio is well known for common fuels such as propane (0.0638 g fuel/g air) and calculable for gases such as biogas.

Figure 72:
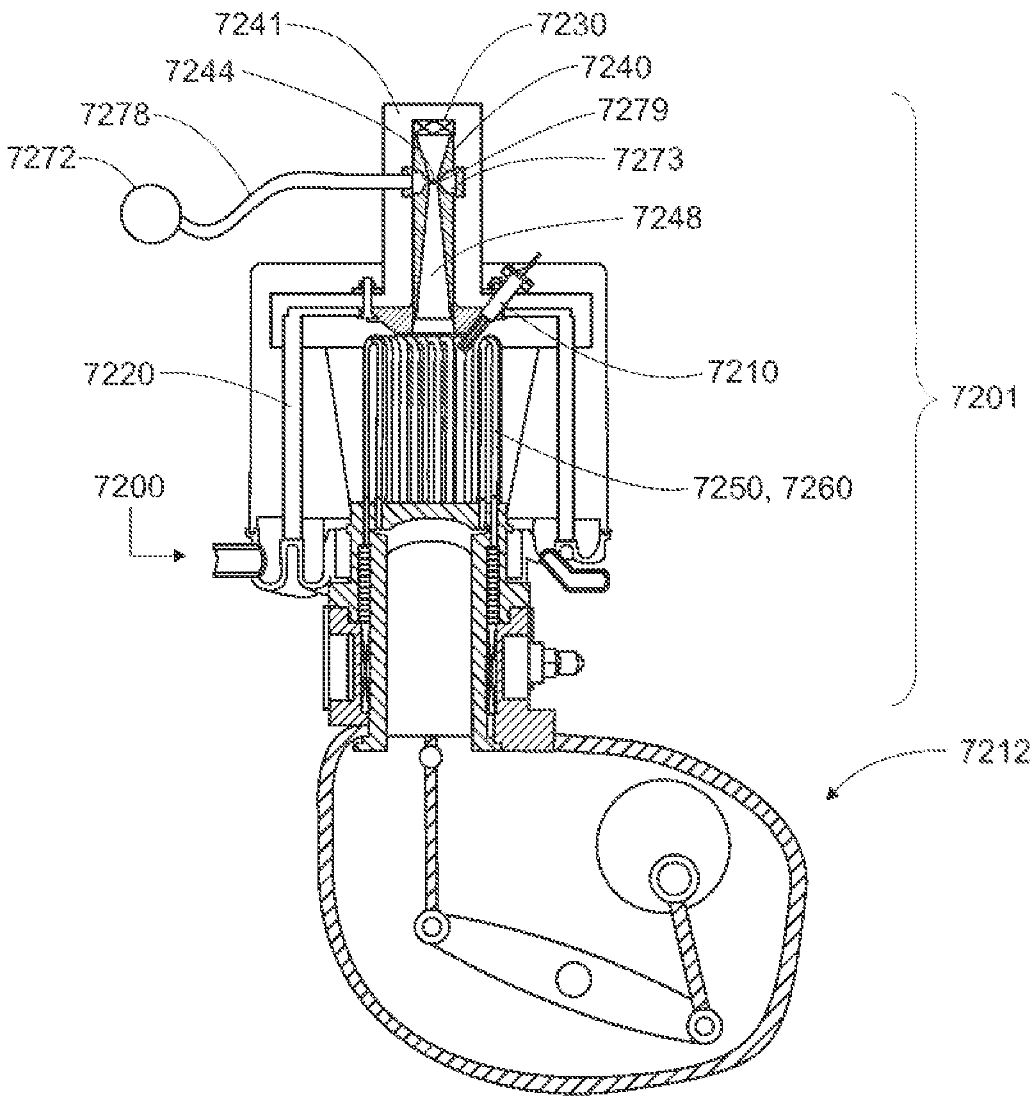
FIG. 72 is a gaseous fuel burner coupled to a Stirling cycle engine, where the ejector is a venturi, according to one embodiment.

FIG. 72 shows one embodiment of the engine 7212 embodiment having a gaseous fuel burner 7201. Various embodiments of the gaseous fuel burner 7201 are also disclosed in U.S. patent application Ser. No. 11/122,447, filed May 5, 2005, published Nov. 10, 2005, which is herein incorporated by reference in its entirety. This embodiment may be used in the context of a Stirling cycle engine, however, other embodiments of the machine are not limited to such applications. Those skilled in the art will appreciate that the present machine may have application in other systems, such as, with other types of external combustion engines.

The use of an ejector in a gaseous fuel burner advantageously can solve some of the challenges faced by the traditional gaseous fuel burners. First, using an ejector can eliminate the need for additional equipment, controls, and space, such as, a gaseous fuel pump, fuel control circuitry, and the associated components. Furthermore, using an ejector such as a venturi simplifies the fuel control system by eliminating the need for a separate fuel control scheme. Based on the corresponding rise of the vacuum with the airflow, and subsequently, an increased fuel flow, the burner power can be regulated by regulating the airflow. Accordingly, removing separate fuel control simplifies the development and implementation of automatic burner control in a gaseous fuel burner with an ejector.

Secondly, the corresponding rise of the vacuum with airflow also results in an approximately steady fuel-air ratio despite changes in temperature and airflow rates. The resulting steady fuel-air ratio simplifies the fuel control and operation of the burner, by eliminating the need for complex exhaust sensor/feedback fuel control mechanisms.

Figure 73A:
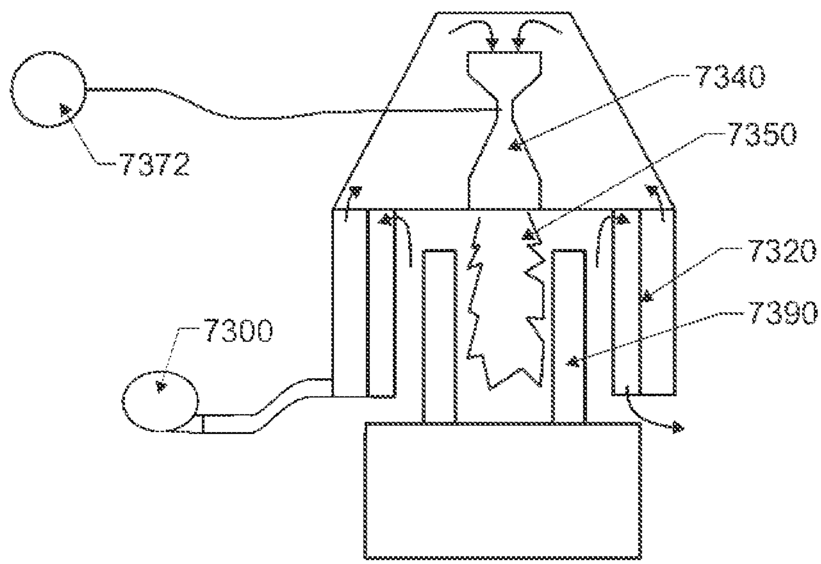
FIG. 73A is the burner of FIG. 72 showing the air and fuel flow paths.

Referring to FIG. 72, a gaseous fuel burner 7201 comprises an ejector 7240, a heat exchanger 7220, a combustion chamber 7250, and a blower 7200 (shown as 7300 in FIG. 73A). The term ejector as used here includes eductors, siphons, or any device that can use the kinetic energy of one fluid to cause the flow of another fluid. Ejectors are a reliable way of producing vacuum-based fuel flow systems with low initial cost, lack of moving parts, and simplicity of operation.

Referring again to FIG. 72, in a some embodiments, the ejector 7240 is a venturi. The venturi 7240 is positioned downstream of the outlet of the air preheater or heat exchanger 7220, in a venturi plenum 7241 and proximal to the combustion chamber 7250. A blower 7200 forces air through the venturi 7240. The flow of air through the venturi draws in a proportional amount of fuel through the fuel inlet ports 7279. The fuel inlet ports 7279 are placed at the venturi throat 7244 where the throat has the lowest pressure. The ports 7279 are sized to produce plumes of fuel across the airflow that promote good mixing within the venturi 7240. This fuel-air mixture exits the venturi 7240 and forms a swirl-stabilized flame in the combustion chamber 7250. The venturi 7240 draws in an amount of fuel that is substantially linearly proportional to the airflow regardless of airflow rates and temperature of the air entering the venturi 7240.

Figure 73B:
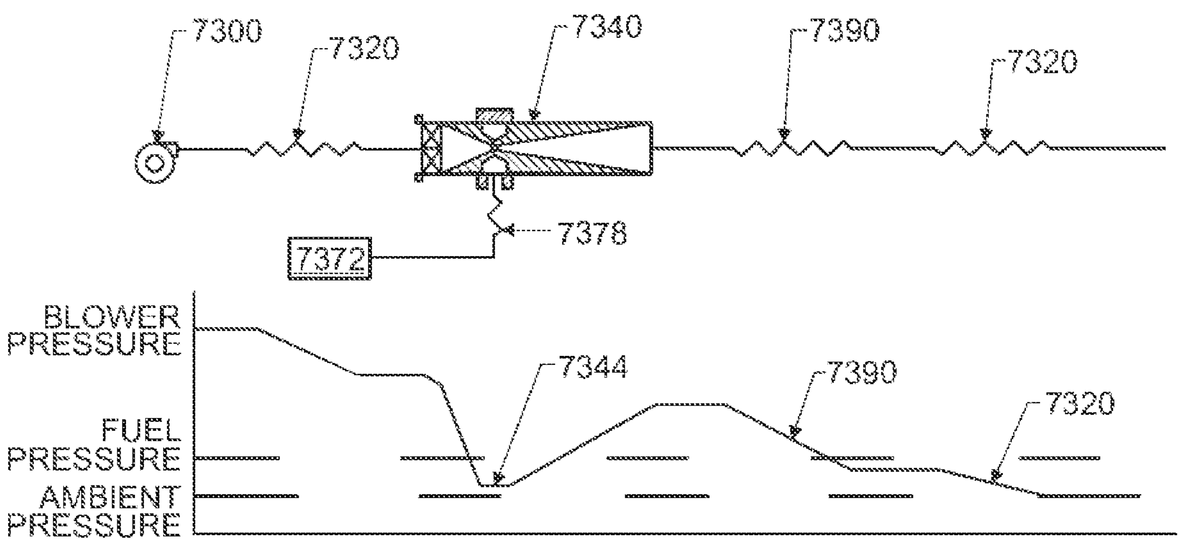
FIG. 73B is a graphical representation of the pressure across the burner.

In a some embodiments as shown in FIGS. 73A and 73B, placing the venturi 7340 between the air preheater 7320 and the combustion chamber 7350 promotes a substantially steady air-fuel ratio over a wide range of airflows and venturi temperatures. FIG. 73A is a schematic drawing of the burner including the components of the burner such as a blower 7300, a preheater 7320, a venturi 7340, and fuel supply 7372. The drawing also includes a load heat exchanger or heater head 7390 (also shown in FIGS. 76-78 as 7290). The load heat exchanger 7390 is the heat exchanger of the engine or process that absorbs the thermal power of the hot gases leaving the combustion chamber 7350 in the burner at some elevated temperature. The partially cooled burned gases then enter the exhaust side of the air preheater, where they are further cooled by incoming combustion air. FIG. 73B shows the pressure map of the same components arranged linearly. The air pressure supplied by the blower, the fuel supply pressure, and the ambient pressure are all indicated. The mass flow rate (m') of fuel into the burner is controlled by the difference between the fuel supply pressure at 7372 and the pressure in the venturi throat 7344 (shown in FIG. 72 as 7244) and the fuel temperature at the dominant restriction:

*m*'.sub.FUEL.varies.(*P*.sub.FUEL−*P*.sub.THROAT).sup.0.5/*T*.sub.FUEL.sup.0.5

The pressure in the throat (P.sub.THROAT) is set by the pressure drop through the exhaust side of the preheater 7320 plus the pressure drop through the heater head tubes 7390 minus the suction generated by the venturi throat 7344. The pressure drops 7320, 7390 and the throat suction pressure 7344 are all proportional to the airflow rate and the venturi temperature.

*P*.sub.THROAT.varies.*m*'.sub.AIR.sup.2**T*.sub.VENTURI

Combining these equations shows that the fuel flow will vary approximately linearly with the airflow:

*m*'.sub.FUEL.varies.[*P*.sub.FUEL−(*m*'.sub.AIR.sup.2**T*.sub.VENTURI)].sup.0.5/*T*.sub.FUEL.sup.0.5

Regulating the fuel pressure to near ambient pressure, the fuel flow is approximately linear with airflow.

m'.sub.FUEL.varies.m'.sub.AIR*(T.sub.VENTURI/T.sub.FUEL).sup.0.5

Thus, locating the dominant fuel restriction 7378 (shown as 7278 in FIG. 72) within the venturi plenum (shown as 7241 in FIG. 72) provides for an approximately steady fuel-air ratio over a wide range of airflow rates and venturi temperatures.

m'.sub.FUEL/m'.sub.AIR.varies.constant

Figure 74:
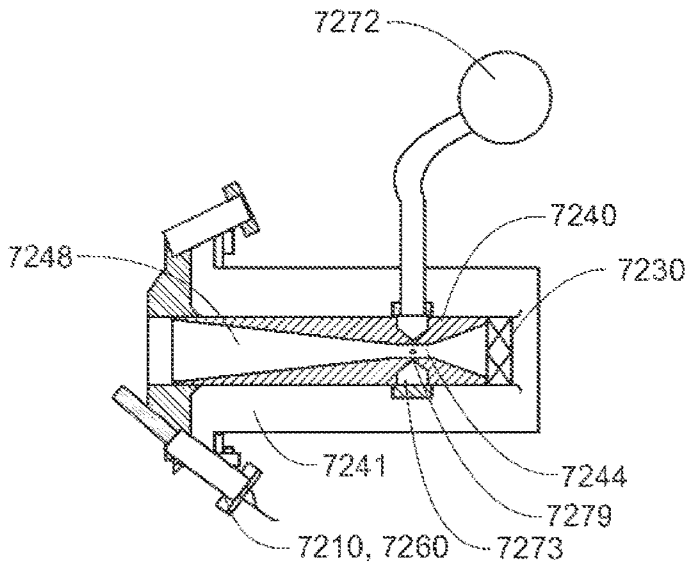
FIG. 74 shows a view of a venturi as shown in the burner of FIG. 72.

FIG. 74 shows one embodiment of the ejector such as the venturi. In this embodiment, the size of the opening of the venturi throat 7244 determines the amount of suction present at the throat 7244. In a specific embodiment, the venturi throat is approximately 0.24 inches in diameter. Referring back to FIGS. 72 and 74, fuel delivery means are coupled to the venturi 7240. The fuel delivery means may be manifolds, fuel lines or fuel tubes. The fuel delivery means may include other components such as a fuel restriction 7278, fuel inlet ports 7279 and fuel valves (not shown). Fuel supplied by a pressure regulator 7272 flows through a manifold 7273 and fuel inlet ports 7279 into the relatively lower pressure in the throat 7244. In one embodiment the fuel inlet ports 7279 provide the largest portion of the pressure drop in the fuel delivery means. Preferably, making the fuel inlet ports the largest restriction in the fuel delivery means assures that the restriction occurs at the venturi temperature and maximizes fuel-air mixing by producing the largest possible fuel plumes. Referring back to FIG. 72, the fuel and air flow into the divergent cone or diffuser 7248 of the venturi, where static pressure is recovered. In the diffuser 7248, the entrained fuel mixes with the air to form an ignitable fuel air mixture in the combustion chamber 7250. The ignitable fuel-air mixture then enters the combustion chamber 7250, where the igniter 7260 may ignite the mixture, and the tangential flow induced by a swirler 7230 creates a swirl-stabilized flame. Using an ejector 7240 to draw the gaseous fuel into the combustion chamber eliminates the need for a high-pressure gaseous fuel pump to deliver the fuel.

In one embodiment, the venturi 7240 is constructed from high temperature materials to withstand high temperatures and maintain its structural integrity. For the embodiment of FIG. 74, the dimensions of the venturi can be approximately 0.9 inches diameter inlet and outlets with an approximately 0.24 inches diameter throat. The half angles of the convergent cone and divergent cones can be 21.degree. and 7.degree. respectively and the throat can be 0.25 inches long. In this embodiment, the venturi can be constructed from Inconel 600. Alternatively, other high temperature metals could be used including, but not limited to Stainless Steels 310, 316L, 409 and 439, Hastalloy C76, Hastalloy X, Inconel 625 and other super alloys.

In one embodiment, as shown in FIG. 72, a swirler 7230 is located upstream of the venturi 7240 and advantageously creates a tangential flow of air through the venturi. As is well known in the art, the tangential flow from the swirler can create an annular vortex in the combustion chamber, which stabilizes the flame. Additionally, the swirler 7230 increases the suction pressure at the venturi throat 7244 by increasing the local air velocity over the fuel inlet ports 7279. Adding the swirler allows the venturi throat 7244 to be made larger for a given suction pressure. Furthermore, the swirling action induced by the swirler 7230 can suppress fluctuations in the combustion chamber pressure from propagating upstream to the venturi 7240. Such pressure fluctuations can temporarily slow or stop the flow of fuel gas into the venturi 7240. The swirler 7230 thereby facilitates a steady fuel-air ratio in the combustion chamber for steady airflows. The swirler 7230 may be a radial swirler.

Figure 75:
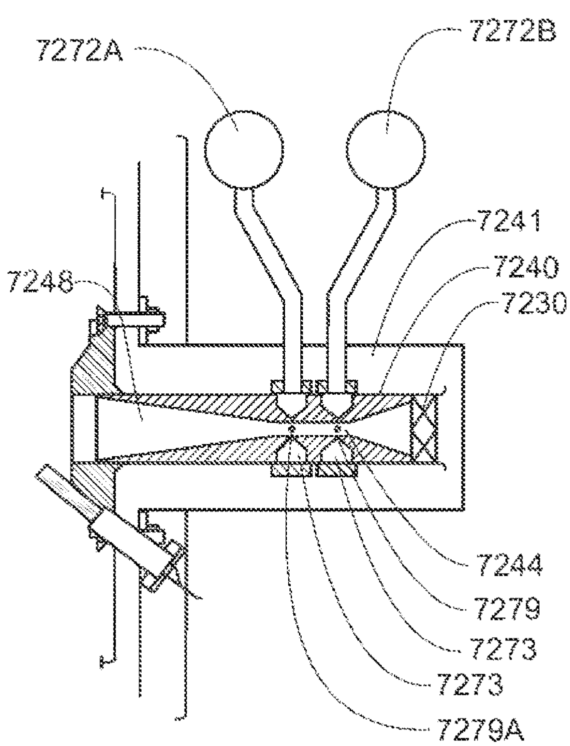
FIGS. 75 and 75A are embodiments of the venturi in FIG. 72.
Figure 75A:
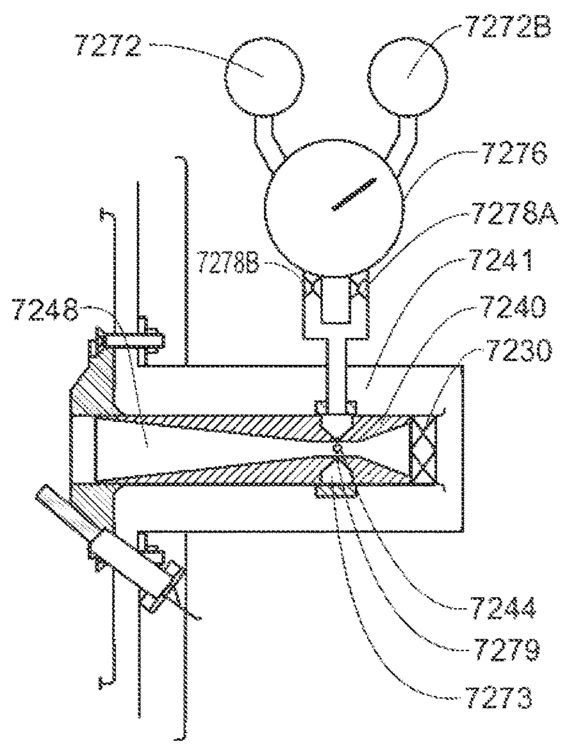
Figure 75B:
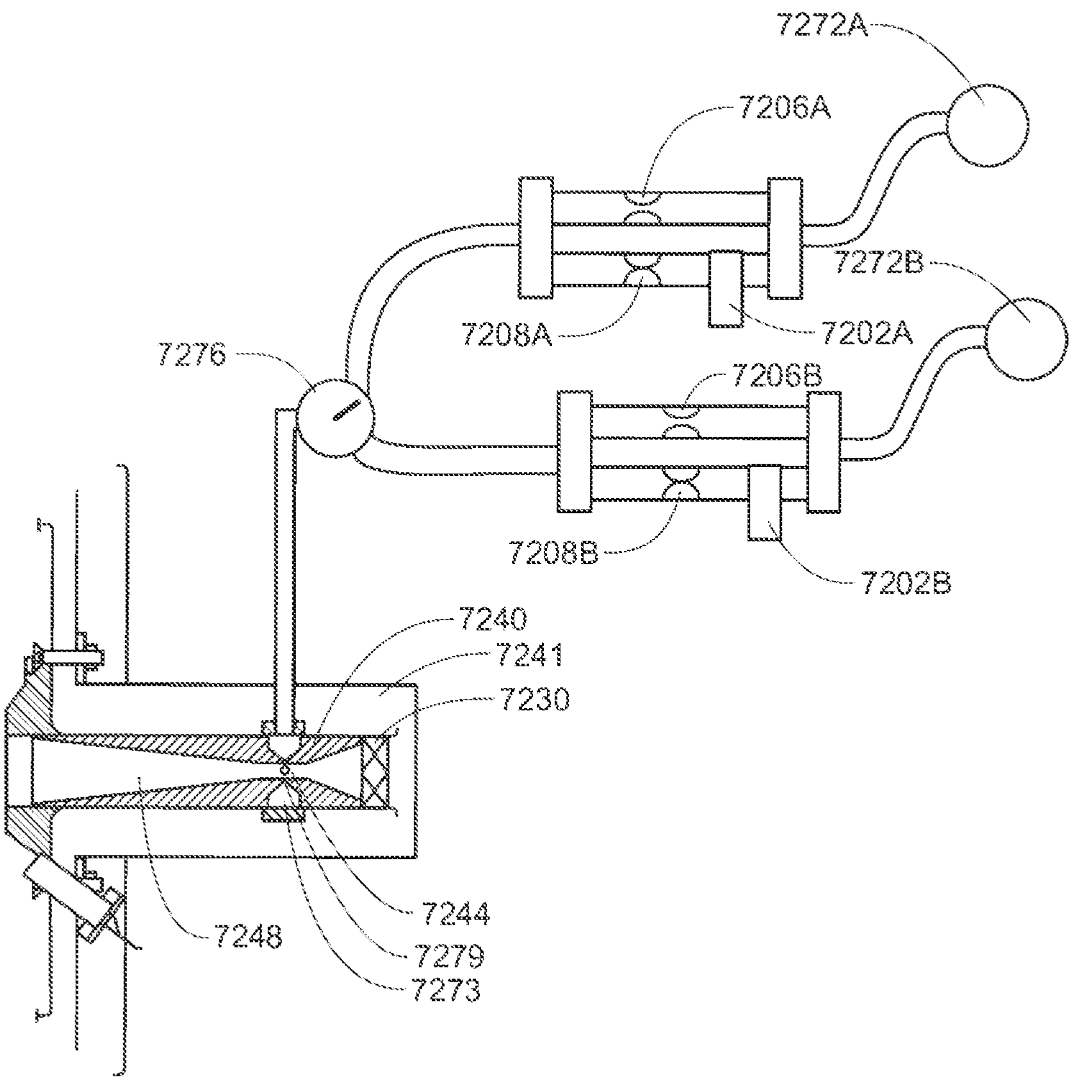
FIG. 75B shows a schematic of a multiple fuel system with multiple fuel restrictions and valves.

In other embodiments, the gaseous burner can be connected to multiple fuel sources. In this configuration, the burner may be fired, lit or ignited with a type of fuel and then run with a different type of fuel. The use of multiple fuel sources may require a fuel delivery means tuned for each fuel. FIGS. 75, 75A, and 75B show embodiments for two fuels with significantly different energy densities such propane and natural gas. In this embodiment, the fuel delivery means for the denser propane must be approximately three times more restrictive than the fuel delivery means for the less dense natural gas or methane. In the embodiment shown in FIG. 75, the venturi has different manifolds and fuel ports for each fuel. High-density fuels such as propane would require the more restrictive fuel inlet ports 7279, while a low-density fuel such as natural gas would require less restrictive fuel inlet ports 7279A. This configuration retains the highest resistance to fuel flow at the venturi temperature. However, the embodiment of the venturi in FIG. 75 may be more difficult to manufacture and have a higher-pressure loss drop due to the long narrow passage.

Another embodiment for a gaseous burner with multiple fuel sources is shown in FIG. 75A. In this embodiment, a fuel selector valve 7276 directs the fuel through an additional fuel restriction such as 7278A or 7278B for a dense gas or a less dense gas respectively. The multi-port valve 7276 allows any number of predefined gases to be burned by the same burner. Predefined gases such as natural gas, liquid petroleum gas (LPG) or biogas can be burned in the same burner by simply setting a selector valve to the corresponding fuel setting. Alternatively, other embodiments can have multiple settings for different qualities of biogas as the carbon dioxide fraction in biogas can vary from 50% to 20%. The fuel restrictors may be placed outside the burner as shown in FIG. 75A or alternatively they can be located in the entrances to the manifold 7273. If restrictions 7278 are placed outside of the burner, then significant part of the fuel-delivery-means pressure drop is not at the venturi temperature and thus the fuel-air ratio may vary with the venturi temperature. The burner will run initially leaner and get progressively richer as the hotter faster air flowing through the venturi exerts a stronger vacuum on the fuel. In addition, moving a significant part of the pressure drop from the fuel ports 7279, the fuel will not penetrate as far into the air stream. Nevertheless, locating multiple restrictors 7278 for different gases may make the fabrication of the part easier.

An alternative embodiment, that provides significant flexibility in the fuel-air ratio control and fuel gas usages, is shown in FIG. 75B. In this embodiment, the two fuel sources, 7272A and 7272B are regulated to their individual pressure and flows though separate fuel delivery means adjusted for each fuel. Each fuel delivery means includes two or more restrictions in parallel 7206A and 7208A, and 7206B and 7208B with one or more valves 7202A, and 7202B, respectively, to vary the pressure drop of the fuel delivery means. The valves may be manually or automatically actuated. Fuel selector 7276 connects fuel delivery means to the venturi, while closing the other fuel off.

The multiple restrictions 7206A and 7208A, and 7206B and 7208B and the valves 7202A and 7202B allow the pressure drop of the fuel delivery means to be adjusted during burner warm-up. Thus the fuel-air ratio can be roughly maintained as the suction pressure increases with increasing venturi temperature. The multiple restrictions can also adjust for changing fuel gas density. A changing fuel gas density may occur when the gaseous fuel burner is connected to biogas digester, wherein the biogas digester is the source of fuel. In a biogas digester embodiment, the carbon dioxide (CO.sub.2) content and therefore the energy density can vary weekly. In this embodiment, if the CO.sub.2 content increases, the pressure-drop through the fuel delivery means must be reduced to allow higher flows of the less energy dense fuel gas. In addition, the multiple restrictions can improve the ignition of the fuel gas by providing a richer fuel-air mixture for lighting. The richer mixture is provided by opening additional valves 7202A or 7202B, which also reduces the pressure-drop of the fuel delivery means. Once the burner is lit, the valve 7202A or 7202B may be closed to produce a leaner flame. As described supra, once the burner is lit, the burner may be run on a different fuel. A fuel selector may be used to switch the fuel types. Alternatively, an embodiment with a multiple fuel selector facilitates varying the fuel-air ratio during the operation of the burner.

Now referring to FIGS. 75A and 75B, the fuel selector 7276 may enable the burner to be lit on one fuel and run on a different type of fuel. This can be important if one fuel is too weak to ignite, but will burn in a warmed up burner. In one example, the burner may be lit on a higher density fuel such as propane. Once the burner is warmed up, the fuel selector 7276 is moved to draw in a low-density biogas.

Figure 76:
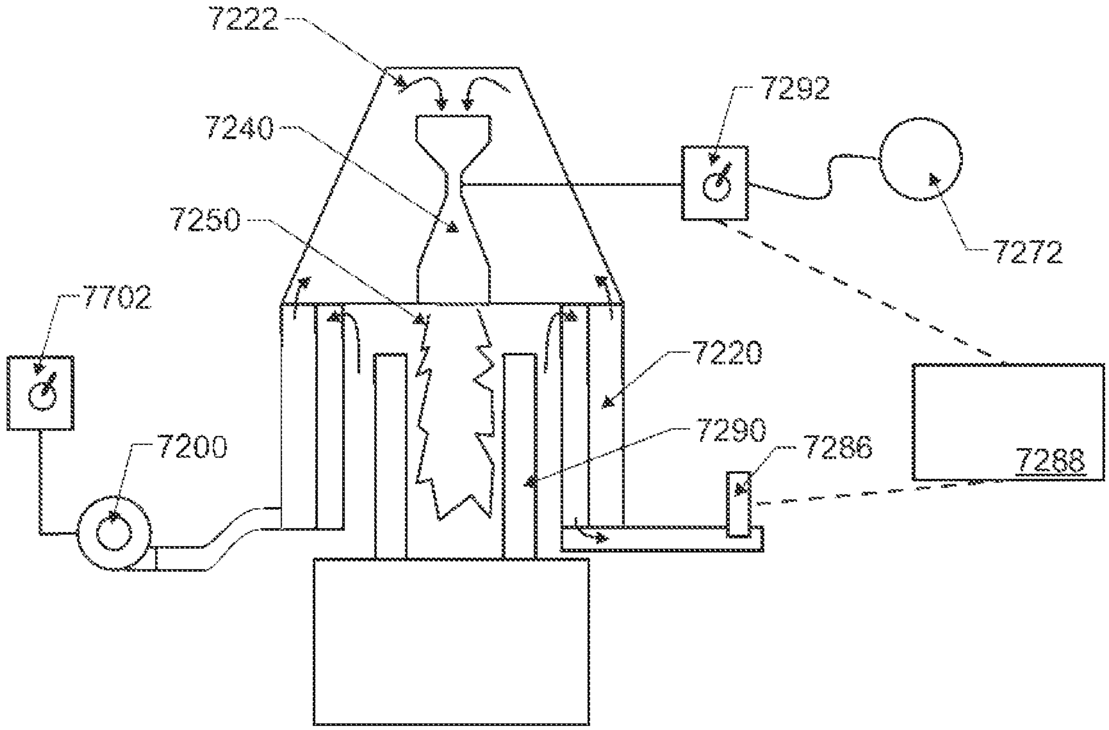
FIG. 76 shows a schematic of an embodiment of the burner with automated fuel control for variable fuel properties.

FIG. 76 depicts an embodiment where an automated controller 7288 adjusts a variable restriction 7292 such as a variable flow valve in the fuel delivery means to hold the exhaust oxygen constant as measured by a wide-range lambda sensor or UEGO 7286. In this embodiment, the automated scheme allows any fuel from biogas to propane to be connected to the burner and the control system can compensate for the changing fuel density. In this embodiment, the automated controller can restrict the fuel path for dense fuels such as propane and open up the fuel path for low-density fuels such as methane and biogas. Ignition would be accomplished by starting the variable restrictor 7292 in the fully open position, which will produce the richest mixture then closing it until the fuel-air mixture is ignited. After ignition, the controller can control the fuel flow to achieve the desired exhaust oxygen level. It is also envisioned that such an embodiment would allow the fuel air ratio to be adjusted during warm-up to optimize efficiency and burner stability.

Figure 77:
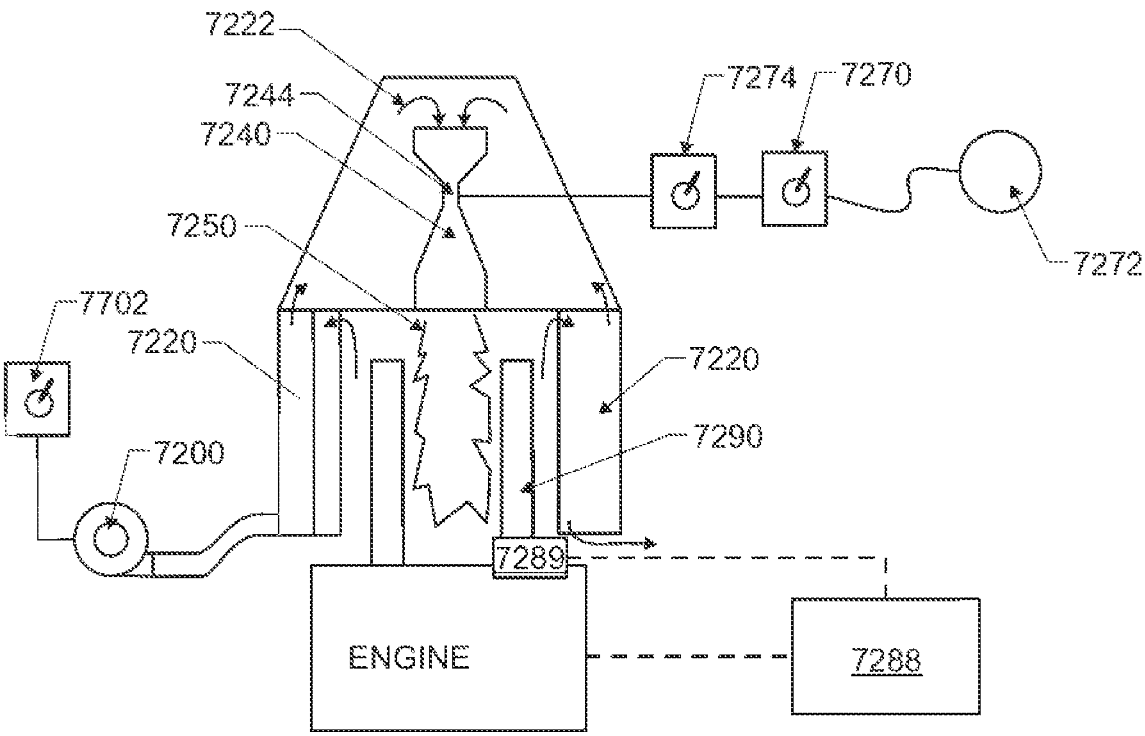

In another embodiment as shown in FIG. 77, the gaseous fuel burner is a high efficiency burner for an external combustion engine such as a Stirling cycle engine. The burner includes manual controls to control the burner. The manual controls include a ball valve 7270 to manually select a fuel type, a trim valve 7274 to adjust the fuel-air ratio and a rheostat 7702 to control the blower speed, and subsequently the airflow. The preheated air 7222 in the venturi 7240 draws in the fuel from a fuel source 7272. The fuel then mixes with the preheated air to create a fuel-air mixture. The fuel-air mixture flows into the combustion chamber 7250 where it burns. In this embodiment a microprocessor/controller 7288 holds the heater head temperature constant as measured by the temperature sensor 7289 by varying the engine speed. Furthermore, the blower-speed determines the burner power output and thus the engine power output. In an alternative embodiment, the fuel trim valve 7274 is not included.

Figure 78:
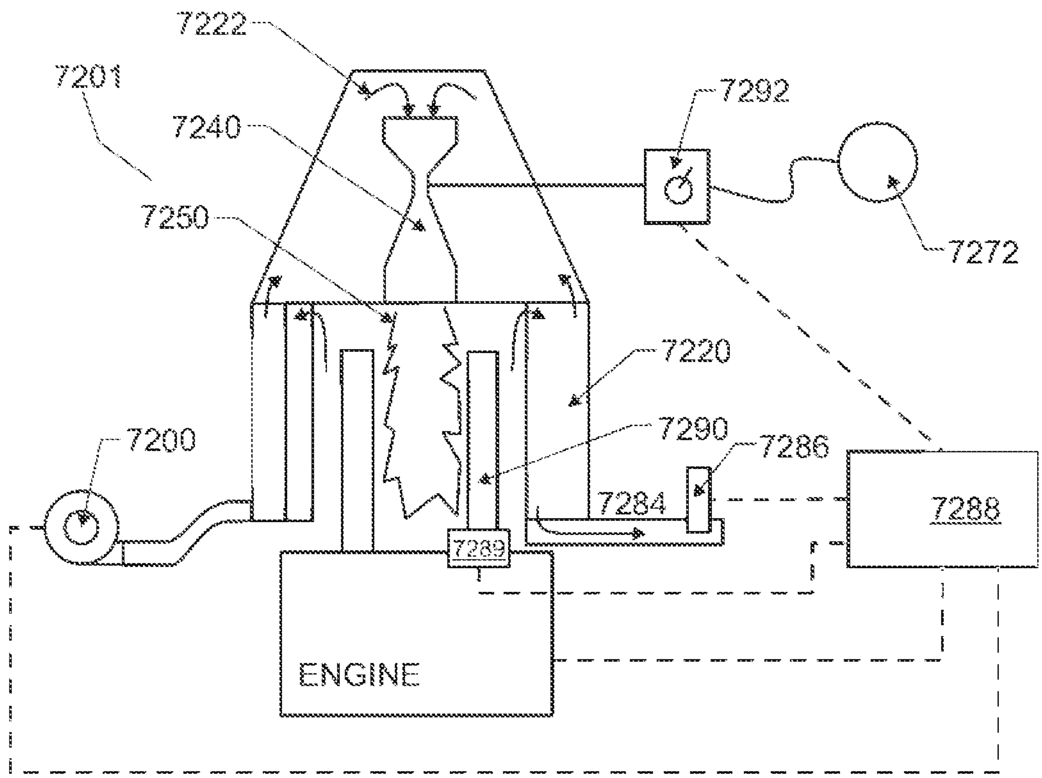

Referring now to FIG. 78 the gaseous fuel burner 7201 is a high efficiency burner for an external combustion engine such as a Stirling cycle engine. In this embodiment, the burner includes an oxygen sensor 7286 located in the exhaust stream 7284 and a microprocessor/controller 7288 to automatically restrict the fuel flow with the variable restrictor 7292. Additionally, the burner includes a blower controller (shown as 7702 in FIG. 77). The blower controller 7702 can be adjusted by the microprocessor/controller 7288 to match the Stirling engine power output with the load. In this embodiment, the burner temperature is held constant by varying the engine speed and the engine power output is automatically adjusted by setting the blower speed. Accordingly, in this embodiment, the burner can burn most gaseous fuels, including fuels without constant properties such as biogas.

Figure 79:
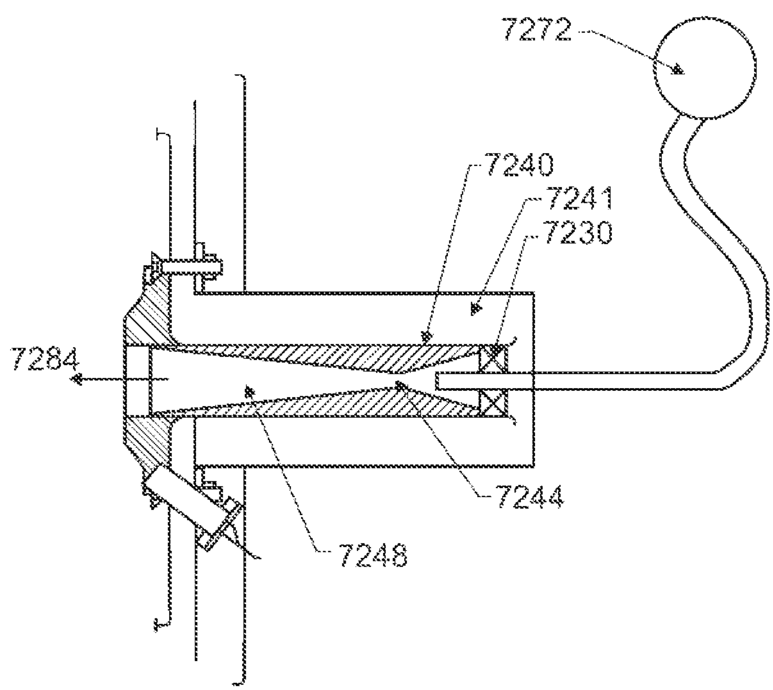

In another embodiment as shown in FIG. 79, fuel is delivered directly into the venturi at a point proximal to the venturi throat 7244. This embodiment includes a swirler 7230 to accommodate the fuel delivery means such as a fuel line or fuel tube. The swirler 7230 is preferably an axial swirler positioned in the venturi 7240 and upstream of the venturi throat 7244. In operation, the delivered fuel is entrained with the motive air to form the fuel-air mixture. The exemplary manual or automatic control mechanisms are adaptable to this alternate fuel delivery embodiment.

Referring back to FIG. 74, the gaseous fuel burner further comprises an igniter 7260 and a flame-monitoring device 7210. Preferably, the igniter 7260 is an excitable hot surface igniter that may reach temperatures greater than 1150.degree. C. Alternatively, the igniter 7260 may be a ceramic hot surface igniter or an excitable glow pin.

With continuing reference to FIG. 74, other embodiments include a flame-monitoring device 7210. The flame-monitoring device 7210 provides a signal in the presence of a flame. For the safe operation of the any burner, it is important that the fuel be shut-off in the event of a flameout. The monitoring device for flame sensing is the flame rectification method using a control circuit and a flame rod.

Flame rectification, well known in the art, is one flame sensing approach for the small, high efficiency gas burners. The device uses a single flame rod to detect the flame. The flame rod is relatively smaller than the grounded heater head and it is positioned within the combustion flame. In this flame rectification embodiment, the control unit electronics are manufactured by Kidde-Fenwal, Inc., and the flame rod is commercially available from International Ceramics and Heating Systems Preferably, the flame-monitoring device uses the hot surface igniter as the flame rod. Alternatively, the flame-monitoring device may be either remote from the hot surface igniter, or packaged with the igniter as a single unit.

Alternatively, an optical sensor may be used to detect the presence of a flame. A preferred sensor is an ultraviolet sensor with a clear view of the flame brush through an ultraviolet transparent glass and a sight tube.

It is to be understood that the various fuel burner embodiments described herein may be adapted to function in a multiple burner configuration.

Fuel Pump

In accordance with some embodiments, a fuel flow to a pressurized combustion chamber of an engine, such as a Stirling engine, may be metered by varying the operating parameters of a fuel pump. Various embodiments of the fuel pump are described below and in U.S. Pat. No. 7,111,460, issued Sep. 26, 2006, to Jensen et al., and U.S. patent application Ser. No. 11/534,979, filed Sep. 25, 2006, published Feb. 8, 2007, which are herein incorporated by reference in their entireties. Desired performance may be achieved without the throttle plates or valves or other restrictive devices that are normally used to meter the fuel flow to the combustion chamber.

Figure 80:
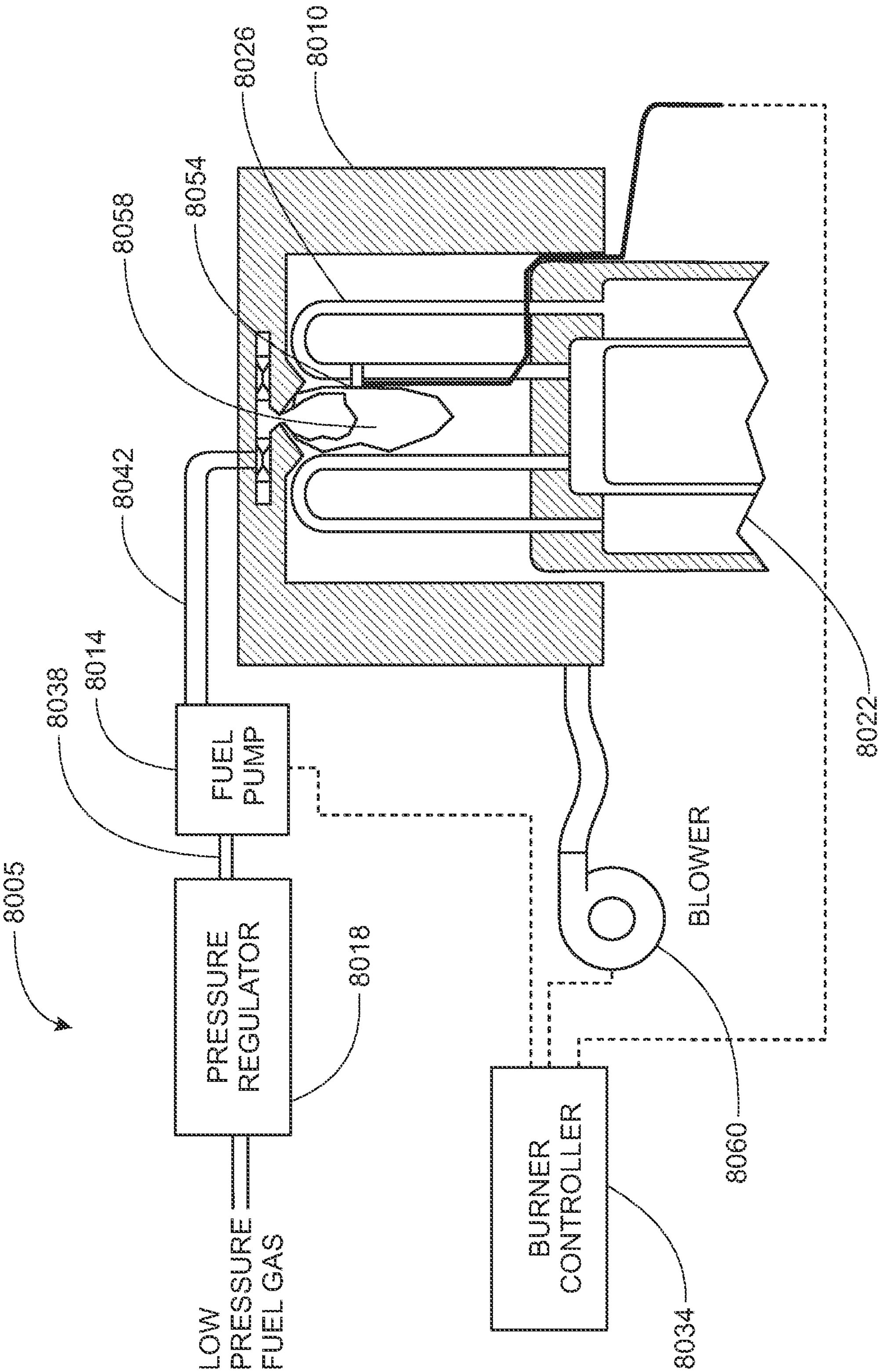

FIG. 80 shows a metering pump system providing gaseous fuel to a pressurized combustion chamber 8058 of an engine 8022 according to one embodiment. A gas train, labeled generally as 8005, includes a fuel pump 8014, interconnecting lines 8038, 8042 and may include a pressure regulator 8018. The fuel pump 8014 raises the fuel pressure in line 8038 to a higher pressure in line 8042. The gas train delivers fuel from the gas supply to the burner 8010, where it is mixed with air and burned in a combustion chamber 8058. The fuel pump is controlled by a controller 8034 that modulates the fuel flow rate by varying one or more parameters of an electrical signal sent to the fuel pump 8014. The controller may also regulate a blower 8060 that provides air to the combustion chamber 8058 and may receive signals from sensors that report engine-operating parameters.

In some embodiments the delivered fuel pressure in line 8038 is 6 to 13 inches water column for liquefied petroleum gas. Natural gas may be supplied in line 8038 at even lower pressures of 3 to 8 inches water column. Alternatively, pressure regulator 8018 can supply the fuel at lower pressures, even negative pressures. Typical fuel pressures in line 8042 may range from 0.5 to 5 PSIG.

Figure 81:
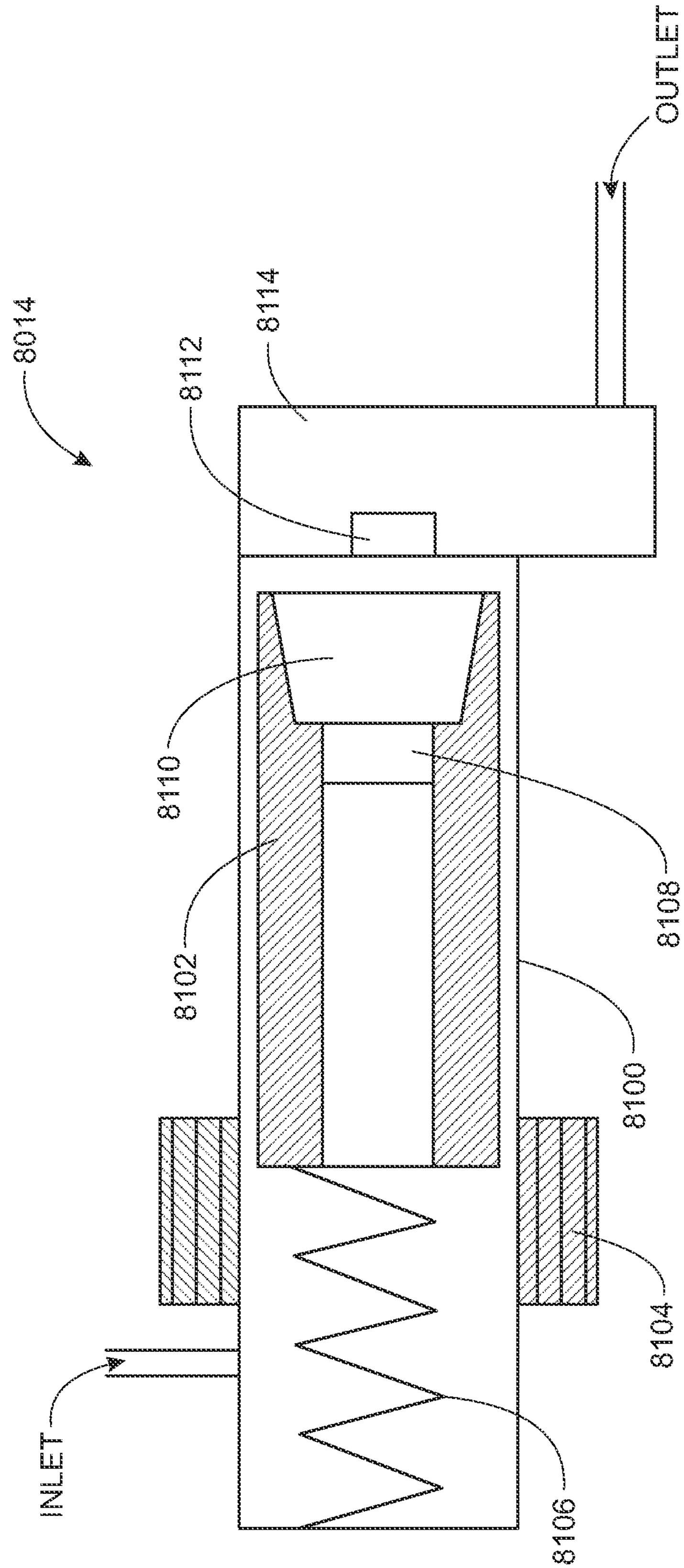

In some embodiments, fuel pump 8014 is a linear piston pump. A linear piston pump is shown in FIG. 81. The pump includes a cylinder 8100, a piston 8102, a winding 8104, a spring 8106 and check valves 8108, 8112. When an electrical signal is applied to winding 8104, the winding pulls the ferrous metal piston 8102 to the left, compressing the spring 8106. Check valve 8108 in the piston allows fuel to flow into compression volume 8110. When the electrical signal is turned off and the electromagnetic force on the piston begins to decrease, the piston 8102 is forced to the right by the spring 8106. Gas is forced out check valve 8112 into the receiver volume 8114 at a higher pressure.

Figure 82:
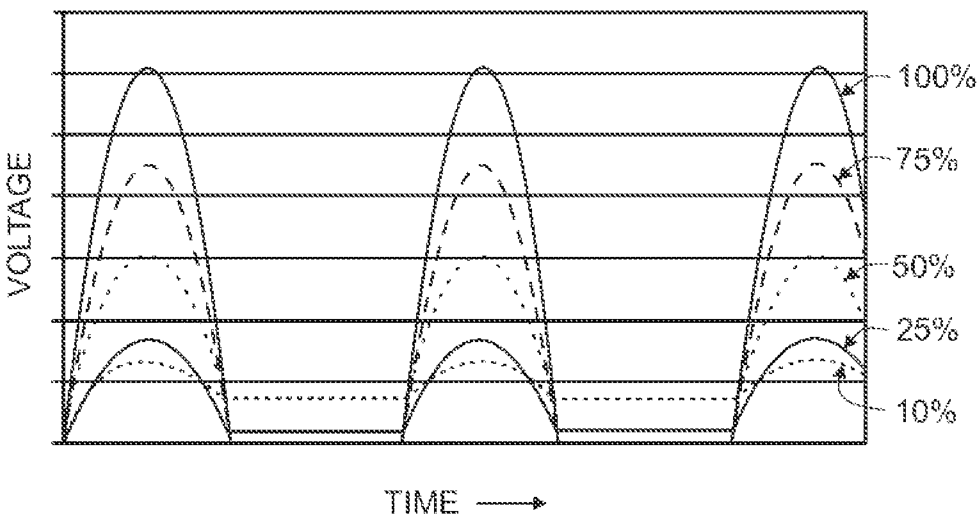

The flow rate of the pump can be modulated by varying the stroke of the piston 8102. In one embodiment the signal from the controller to the pump is a half-wave alternating current ("AC") signal, as shown in FIG. 82. Circuitry to produce this signal is well known in the art. The piston stroke and, thus, the flow rate increases as the amplitude of the AC signal increases. In some embodiments, low amplitude signals are biased slightly higher to improve repeatability and linearity of flow versus the driving signal. The force applied to the piston 8102 by the windings 8104 is inversely proportional to the distance from the windings to the piston. At low signal levels, the piston does not get very close to the windings and small changes in the friction and inertia of the piston will produce significant changes in the resulting piston stroke and flow. A bias voltage is applied to bring the resting-position of the piston closer to the windings, so that small changes in the controller signal that drives the piston dominate the frictional forces and the inertia of the piston. For example, the bias voltage added to the signal is highest at the lowest driving signal (10% signal in FIG. 82) and may drop to zero before the drive signal reaches 50%. The bias is reduced at higher flow levels to take advantage of the full pump stroke.

Figure 83:
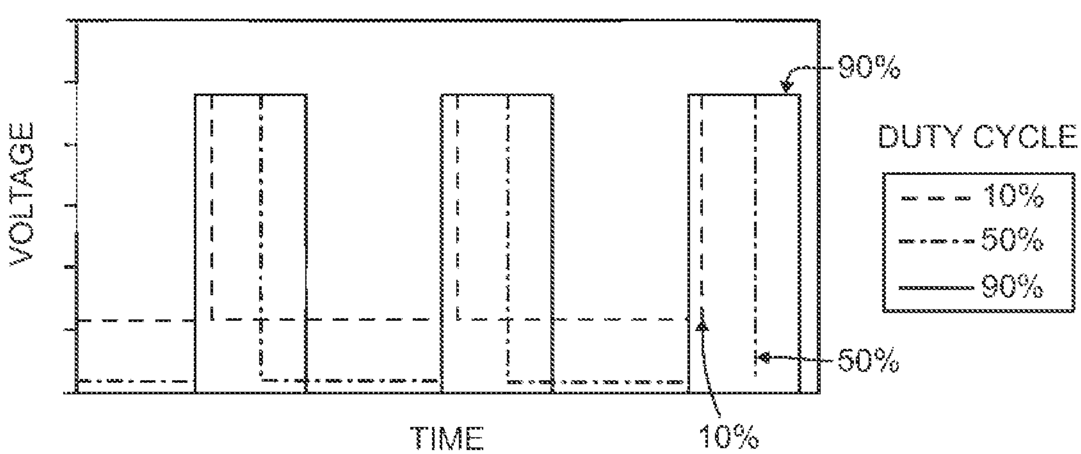

In another embodiment, the controller signal that drives the pump is a pulse-width-modulated ("PWM") direct current ("DC") voltage signal. FIG. 83 shows an exemplary DC waveform that may be used to drive the pump. Circuitry to generate the PWM DC signal in FIG. 83 is well known in the art. Three different drive signals are plotted versus time. These signal modulations correspond to 10%, 50% and 90% duty cycles, which are shown for purposes of illustration and not for limitation. Applying the rectangular wave voltages of FIG. 83 to the windings 8104 of FIG. 81 will cause the piston 8102 to move to the left and compress the spring 8106. The stroke and, therefore, the flow will be roughly proportional to the voltage times the duration of the signal. The lower signals, 10% and 50%, include bias voltages between signal pulses. As in the case of the AC drive signal, the bias voltage moves the piston closer to the windings to provide greater piston response to small changes in the signal and overcome the frictional and inertia forces of the piston. This bias voltage may be varied with the duration of the drive signal. The bias voltage is highest at the minimum drive signal duration and may drop to zero before the drive voltage pulse duty cycle reaches 50%.

Other embodiments may use different controller signal waveforms to drive the piston. In another embodiment, the piston pump of FIG. 81 can be driven without the bias voltages shown in FIGS. 82 and 83.

In another embodiment both the frequency and the duration of the PWM DC controller signal modulating the pump can be varied to linearize the flow through the pump with changes in the driving signal.

Figure 84:
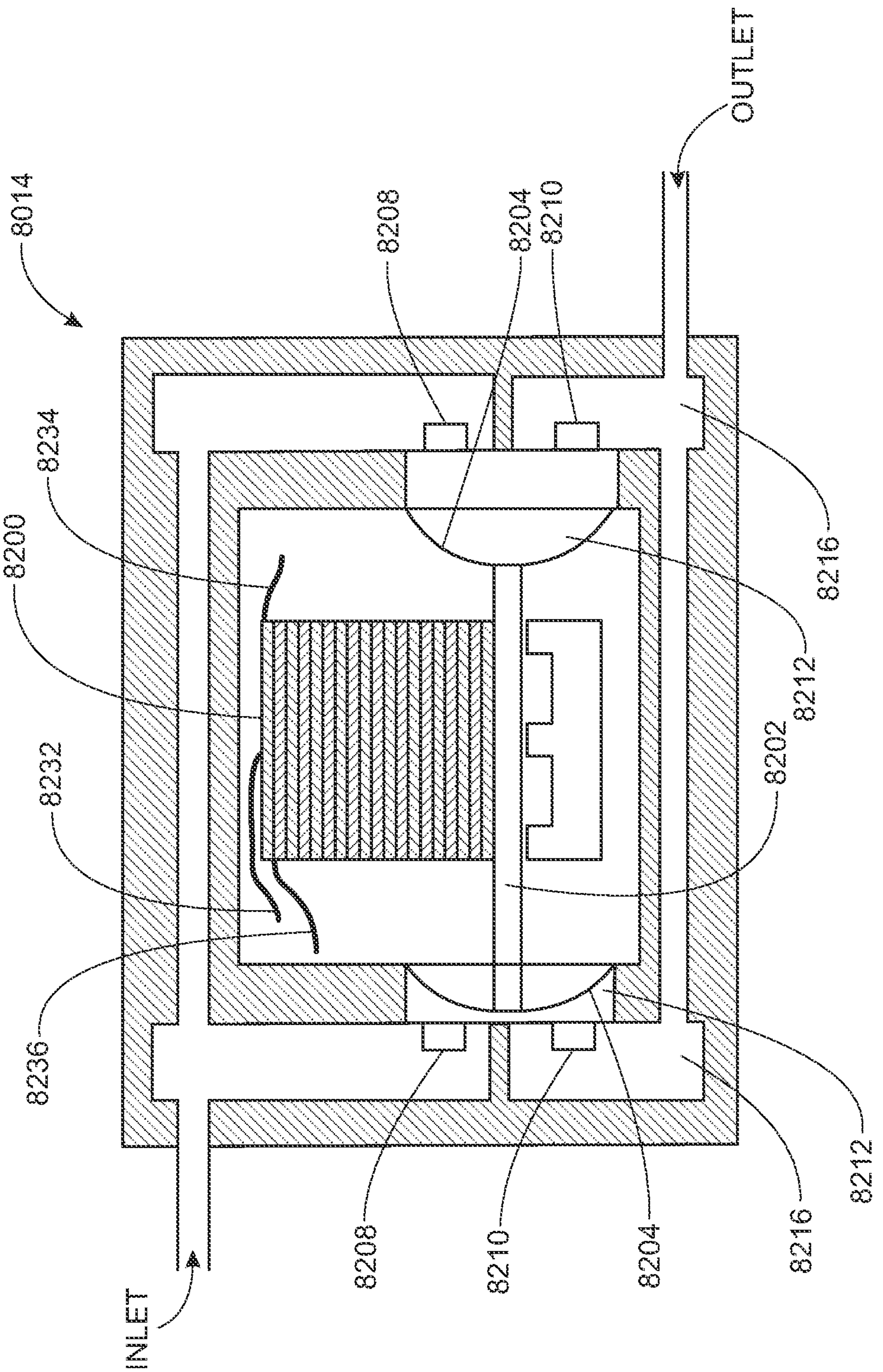

In further embodiments, pump 8014 is a diaphragm pump as shown in FIG. 84. In the diaphragm pump, one or more solenoidal coils 8200 drive the shaft of the pump 8202 back and forth. The shaft 8202 deflects two diaphragms 8204 that alternatively pull gas into the chambers 8212 and then expel it. The two wire coil is driven with an AC signal connected to wires (8234, 8236) that drives the piston 8202 back and forth by reversing the flow of current through the coil 8200. The solenoid has a permanent magnet so that a reversing magnetic field can drive the solenoid in opposite directions. The pumping force on the two chambers 8212 is phased 180 degrees apart so that as one chamber is filled, the companion chamber is emptied. Check valves 8208 upstream of the pumping chambers 8212 allow gas flow in, while the downstream valves 8210 allow flow out of the chambers and into the receiver volume 8216. The solenoidal coil 8200 can be driven with a full wave AC signal. In similar fashion to the piston pump, varying the amplitude of the AC signal will vary the stroke and, therefore, the fuel flow through the diaphragm pump.

In another embodiment, the electrical coil 8200 in the diaphragm pump 8014 of FIG. 84 can be center-tapped by adding a third wire 8232 to the center of the coil 8200. Wires (8234 and 8236) connect to each end of the coil. This three wire connection allows the piston 8202 to be driven back and forth with a DC source. The DC source connects to the center wire 8232 and the other connecting wires (8234 and 8236) are alternately connected to ground or a negative voltage, causing current to flow in one half-coil or the other.

Figure 85:
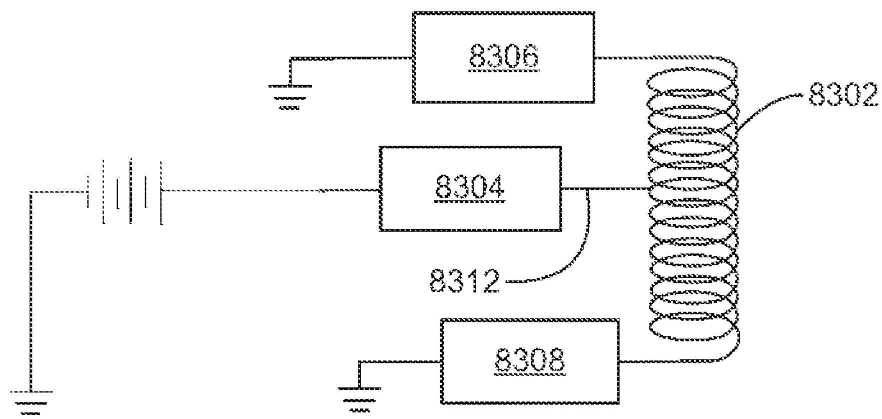
Figure 86A:
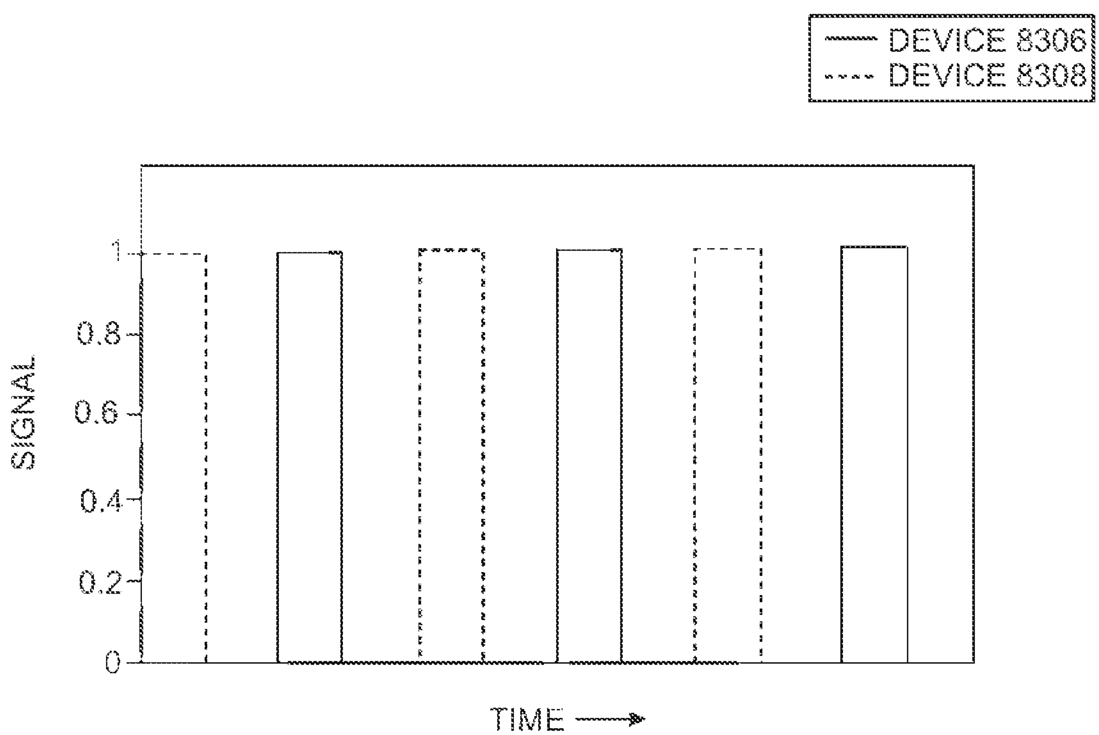

A three-wire coil 8302 and devices (8304, 8306, 8308) to control the DC current flow to the coil are shown schematically in FIG. 85. The coil may be used to drive a diaphragm pump solenoid, as in FIG. 85. Devices (8304, 8306, 8308) may be relays, field effect transistors ("FET"), bipolar transistors or other similar devices. The controller can vary the flow of fuel through the diaphragm pump by varying the amplitude of applied DC voltage signal 8312 using device 8304. Devices 8306, 8308 can be driven as shown in FIG. 86A, where first one device is closed, then opened and then the other device is closed and then opened. The vertical axis of the figure corresponds to a normalized driving voltage, where a signal equal to "1" means a device is closed (i.e., shorted). Control strategies using PWM signals, as illustrated in FIG. 83, albeit without the bias described previously for the piston pump and with suitable phasing, can be applied to each of devices 8306, 8308 in FIG. 85.

Figure 86B:
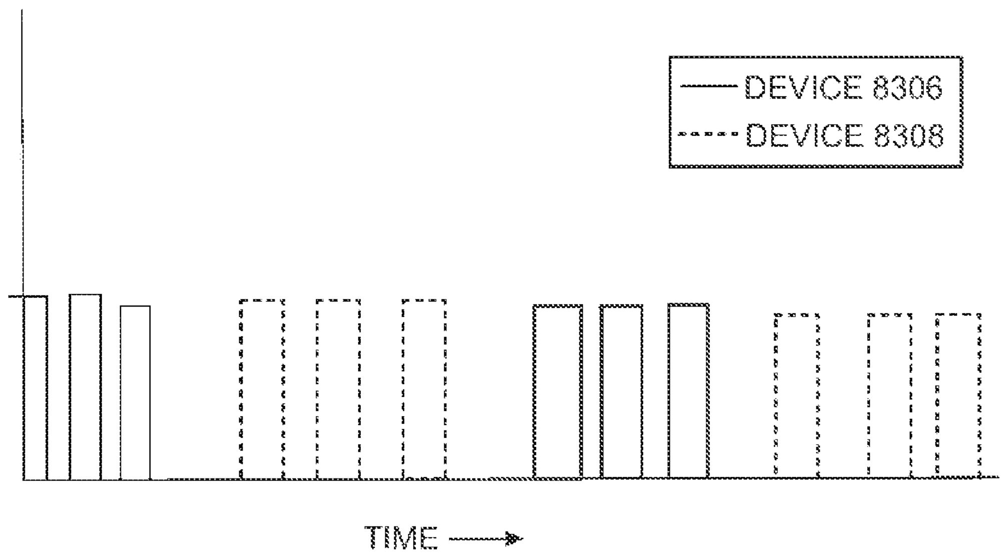

In another embodiment the amplitude and frequency of the diaphragm pump stroke of FIG. 84 can be controlled using the three devices (8302, 8304, 8306) shown in FIG. 85. The amplitude of the pump stroke is controlled by the average voltage at wire 8312. This voltage can be modulated by fast pulse-width-modulating device 8304. The stroke frequency may be controlled as before by devices 8306 and 8308. Alternatively, device 8304 can be eliminated and switches 8306 and 8308 can be pulse-width modulated at a high frequency during their "on" state, as illustrated in FIG. 86B. In other embodiments the center-tapped coil can be replaced by a full bridge or a half-bridge, as known to those skilled in the art.

Figure 87A:
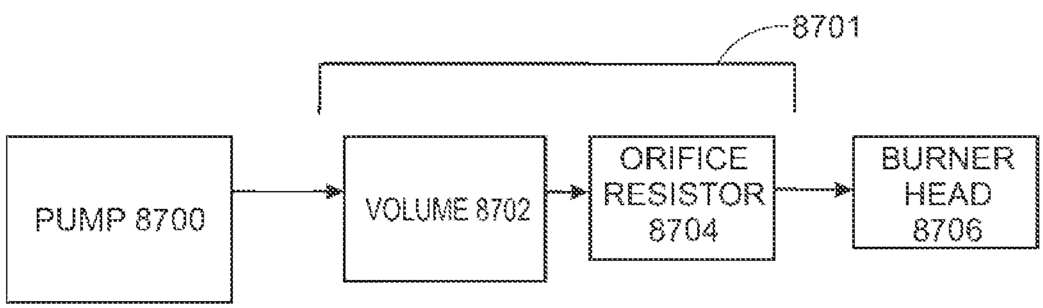

In other embodiments for use in applications where a constant flow of fuel is important, a filter 8701 may be added between pump 8700 and burner head 8706, where the fuel is mixed with the combustion air, as shown in FIG. 87A. One embodiment of the filter 8701 is an RC filter comprising a capacitance (volume) 8702 and an orifice 8704. The volume and orifice are sized to allow the required fuel flow and reduce fluctuations in flow to a desired level. Mathematical techniques that are well known in the art may be used to determine these filter parameters.

Figure 87B:
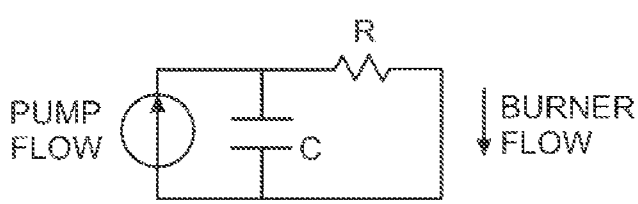

An acoustic filter using a volume and an orifice restrictor has the electrical circuit analog shown in FIG. 87B. The analog of gas flow is electrical current, the analog of gas pressure is electrical voltage, the analog of volume is electrical capacitance, the analog of flow resistance is electrical resistance and the analog of gas inertia is electrical inductance. The orifice restrictor does not translate directly into this model because the orifice flow resistance is proportional to the gas flow squared (non-linear) instead of being proportional to the gas flow as the model suggests. The model can be used through the process of linearization of flow resistance for small signals. The pump gas flow ripple is attenuated by the factor of 1/(1+2.pi.fRC). Where "f" is the frequency component of the gas flow entering the filter from the pump. Due to the orifice restrictor non-linear characteristics, the acoustic filter has a lower attenuation at low flow causing a high burner flow ripple as a percentage of average flow. The higher ripple can cause flame instability and higher emissions of pollutants. This non-linearity also causes a high resistance to average gas flow at the higher flow rates reducing the pump maximum flow capability.

Figure 87C:
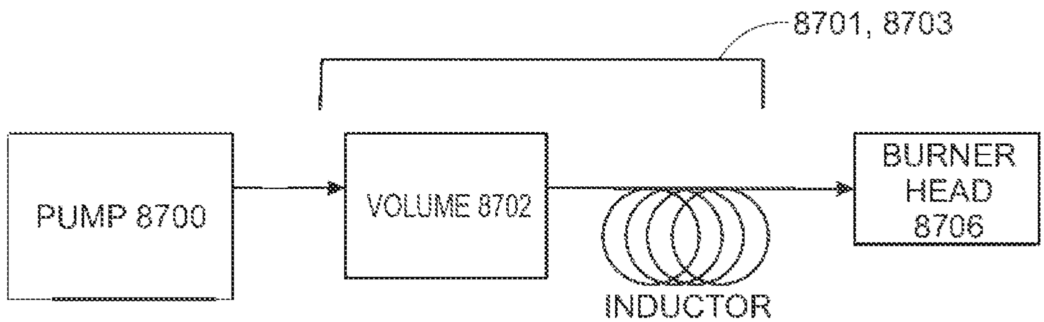
Figure 87D:
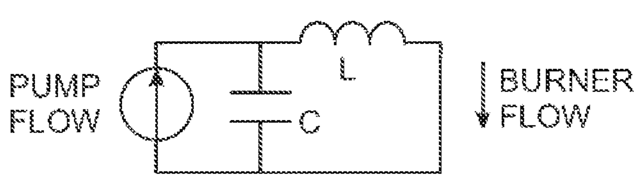
Figure 88:
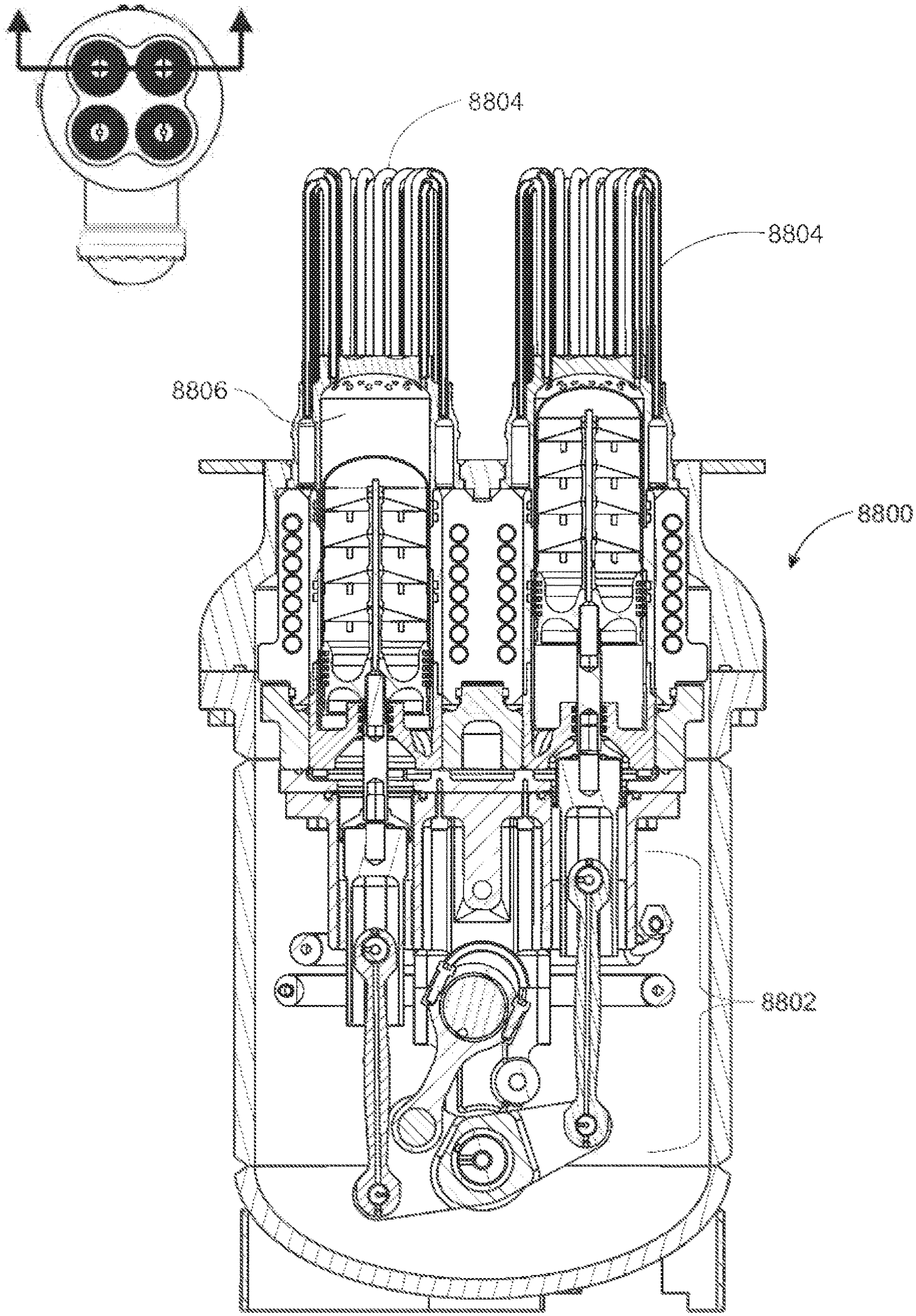

The addition of a long thin tube 8703 to the acoustic filter provides ripple attenuation through the gas mass acceleration, as shown in FIG. 87C. The diagram for the electrical analog is shown in FIG. 87D. The pump gas flow ripple is attenuated by the factor of 1/[1+(LC)(2.pi.f).sup.2]. Since L and C are not a function of flow, the filter attenuation is not affected by the flow rate and does not have the disadvantages of the filter of FIG. 87A. Attenuation of the ripple also increases the pump's flow rate.

Referring again to FIG. 80, in another embodiment, controller 8034 modulates the output of the fuel pump 8014 to control the temperature of the heater tubes 8026 of the engine. The temperature of the heater tube 8026 may be measured with a temperature sensor 8054, such as a thermocouple, that is attached to a heater tube 8026. When the engine increases speed, the engine draws more thermal energy from the heater tubes 8026. The tubes cool and the thermocouple 8054 reports this temperature drop to the controller 8034, which in turn increases the fuel flow until the measured temperature is restored to a specified level. Any of the devices and methods for metering the fuel through the fuel pump, as described above, may be employed in this embodiment of the machine. Various fuel pump types including rotary vane pumps, piezoelectric pumps, crank driven piston pumps, etc., may be employed. In other embodiments, various operating parameters of a system, of which the pressurized chamber is a part, may be controlled by controlling the fuel pump to meter the fuel flow to the chamber. For example, the speed of an internal combustion engine or the power output of an engine may be determined by the controller. Alternatively, a fuel/air mixture ratio to a burner may be maintained by the controller.

It is to be understood that the various fuel pump embodiments described herein may be adapted to function in a multiple burner configuration.

Single Burner Multiple Piston Engine

Referring now to FIGS. 88, 89A-89C, various embodiments is shown wherein an engine 8800, such as a Stirling cycle engine, having a rocking beam drive 8802 (also shown as 810 and 812 in FIG. 8) and a plurality of pistons (also shown in FIG. 8 as 802, 804, 806, and 808), includes a single burner (shown as 8900 in FIGS. 89A and 89B) to heat heater heads 8804 of the pistons. Heater heads 8804 may be one of the various embodiments disclosed in the preceding section, including, but not limited to, tube heater heads, as designated by numeral 8902 in FIG. 89A (also shown as 9116 in FIGS. 91C and 91D), or pin or fin heater heads, as designated by numeral 8904 in FIG. 89C (and also shown as 5100 in FIGS. 53D through 53F). FIG. 89B included a pin heater head 8904 having a heater head lining 8926 fitted around the heater head 8904. Burner 8900 may be one of any of the various embodiments disclosed in the preceding sections and in U.S. Pat. No. 6,971,235, issued Dec. 6, 2005, to Langenfeld et al., which is herein incorporated by reference in its entirety.

In one embodiment a combustion chamber 8906 is positioned above the heater heads 8900, as shown in FIGS. 89A-89C. A prechamber 8901 may connect the combustion chamber 8906 to a burner head 8903 via a prechamber nozzle 8908, wherein prechamber nozzle 502 may be a simple nozzle, a swirler nozzle, or a pressure swirl nozzle. The burner head 8903 may house a UV window 8910 for flame detection, a fuel injector 8912, which may be an air-assist fuel injector such as a Delevan siphon nozzle, and a hot surface igniter 8914. Also connected to the burner head 8903 are a first inlet 8916 and a second inlet 8918. One of these inlets may be a liquid fuel inlet, and the other inlet may be an atomizing inlet.

The prechamber 8901 is a centrally located fuel preparation stage located upstream from the combustion chamber 8906. The prechamber 8901 is where the fuel is ignited to form a diffusion flame. In one embodiment where liquid fuel is used, the liquid fuel passes through the first inlet 8916. Atomizer passes through the second inlet 8918 to atomize the liquid fuel and mix with the liquid fuel in the prechamber 8901. As the atomizer and liquid fuel enter the prechamber 8901 via fuel injector 8912, it is ignited by the hot surface igniter 8914. Air may also pass through an intake 8920 and be preheated by a preheater 8922 before it travels into the prechamber 8901, where it will mix with the atomizer and the liquid fuel. Once the mixture is preheated and formed into a diffusion flame, it travels through the prechamber nozzle 8908 into the combustion chamber 8906 to form a PPV (premixed prevaporized) flame. When the diffusion flame leaves the prechamber 8901, evaporation may occur in the prechamber 8901 which may allow the diffusion flame to be relit more easily, should it get flamed out or burned out.

Once the flame is in the combustion chamber 8901, the heat from the flame is used to heat the heater heads 8804. The heated gas from the combustion chamber 8901 evenly flows over the surface of each of the heater heads 8804, wherein heater heads 8804 transfer the heat contained in the heated gas to a working fluid contained in the working space (shown as 8806 in FIG. 88) of the engine (shown as 8800 in FIG. 88). The combustion chamber 8901 may have apertures 8924 in its surface to further assist in distributing the PPV flame evenly across each of the heater heads 8804.

As described above in the current and preceding sections, the heater heads 8804 may be a pin heater head, a folded fin heater head, or may be heater tubes. In an embodiment using a pin or fin heater head, the heater head may include a heater head lining 8926 as shown in FIG. 89B (and also shown as 5340 in FIG. 53A). The heater head lining 8926 may be a sleeve that is fitted around the heater head 8904 or it may be a sleeve that is heated and expanded and then fit around the heater head such that when the sleeve cools it contracts and creates a snug fit around the heater head. The heater head lining 8926 ensures uniform flow of the heated gas. Uniform flow prevents uneven temperature distribution around the heater heads 8804 and ensures thermal efficiency, as discussed in detail in the preceding sections. Resultant exhaust from the burner may exit the burner through an exhaust 8928.

Because the burner may reach very high temperatures, the metal sued to form the burner may expand. Expansion of certain burner surfaces 8930 may interfere with the efficiency of the engine or may damage the heater heads 8804. In an alternative embodiment a compliant member may be positioned between the heater heads 8804, or, should it be used, the heater head lining 8926 and the burner surface 8930. The compliant member acts as a buffer against the expanding metal burner surface 8930 so that the burner surface 8930 does not expand into the heater heads 8804.

In an alternative embodiment a gaseous fuel, such as propane may be used. In such an embodiment the burner may include a burner head 8903 and a combustion chamber 8906. The burner head 8903 may house the UV window 8910 for flame detection, a fuel injector 8912, which may be an air-assist fuel injector such as a Delevan siphon nozzle, and a hot surface igniter 8914. The gaseous fuel may enter the combustion chamber 8906 via the fuel injector 8912. Upon exiting the fuel injector 8912, the gaseous fuel would be ignited by the hot surface igniter 8914, thereby creating a flame inside the combustion chamber 8906. Combustion of gaseous fuels is described in detail in the preceding sections.

In yet another embodiment burner 8900 may use both gaseous and liquid fuels. Similar to the exemplary embodiment described earlier, and various other embodiments described in preceding sections, the burner 8900 would include a combustion chamber 8906, a prechamber 8901, and a burner head 8903. The combustion chamber 8906 may be positioned above the heater heads 8804. A prechamber 8901 may connect the combustion chamber 8906 to a burner head 8903 via a prechamber nozzle 8908, wherein prechamber nozzle 8908 may be a simple nozzle, a swirler nozzle, or a pressure swirl nozzle. The burner head 8903 may house a UV window 8910 for flame detection, a fuel injector 8912, which may be an air-assist fuel injector such as a Delevan siphon nozzle, and a hot surface igniter 8914. Also connected to the burner head 8903 are a first inlet 8916 and a second inlet 8918. One of these inlets may be a liquid fuel inlet and the other inlet may be an atomizing inlet. A switch may be positioned between the first inlet 8916 and the second inlet 8918 so that when gaseous fuel is used, the gaseous fuel would flow through the second inlet 8918, instead of the atomizer as described above. When liquid fuel is used, the switch would be configured such that liquid fuel would flow through the first inlet 8916 and atomizer would flow through the second inlet 8918.

In a further embodiment of the burner, a blower may be coupled to burner 8900.

Multiple Burner Multiple Piston Engine

Referring now to FIGS. 90 through 91B, another embodiment is shown wherein each heater head 9002 of engine 9000 may be heated by an individual burner 9004, as shown in FIG. 90. Heater heads 9002 may be any of the various embodiments described in the preceding sections, including, but not limited to, tube heater heads, as designated by numeral 9116 in FIGS. 91B-91D, or pin or fin heater heads, as designated by numeral 9118 in FIG. 91A (and also shown as 5100 in FIGS. 53D through 53F). Burner 9004 may be any one of the various embodiments disclosed in the preceding sections and in U.S. Pat. No. 6,971,235.

Each burner 9004 includes a burner head 9100. Similar to previous disclosed burner embodiments, the burner head 9100 has an igniter 9101, a fuel injector 9108, and a UV window (shown as 9107 in FIG. 91B) for flame detection. Fuel passes through a first inlet 9106, where it is heated by the igniter 9101 and formed into a flame. Preheated air, heated by the preheater 9102, may be mixed with the fuel in the combustion chamber 9103. The heated fuel mixture forms a flame inside the combustion chamber 9103 and heats the heater head 9002. Any exhaust from the burner may exit the burner via an exhaust 9105. In an alternative embodiment of the burner, an atomizer may be combined with the fuel via a second inlet 9110. In another embodiment of the burner, a blower may be incorporated to maintain an average air ration amongst the individual burners 9004.

Yet another embodiment may include a prechamber 9111, as shown in FIG. 91B. In this embodiment, the burner may include a combustion chamber 9103, a prechamber 9111, and a burner head 9100. Combustion chambers 9103 may be positioned above the heater heads 9002. A prechamber 9111 may connect the combustion chamber 9103 to a burner head 9100 via a prechamber nozzle 9112, such as a simple nozzle, a swirler nozzle, or a pressure swirl nozzle. The burner head 9100 may house the UV window 9107 for flame detection, a fuel injection 9108, which may be an air-assist fuel injector such as a Delevan siphon nozzle, and a hot surface igniter 9101. Also connected to the burner head 9100 are a first inlet 9106 and a second inlet 9110. One of these inlets may be a liquid fuel inlet and the other inlet may be an atomizing inlet.

The prechamber 9111 is a centrally located fuel preparation stage located upstream from the combustion chamber 9103. The prechamber 9111 is where the fuel is ignited to form a diffusion flame. In one embodiment, where liquid fuel is used, the liquid fuel passes through the first inlet 9106. Atomizer passes through the second inlet 9110 to atomize the liquid fuel and mix with the liquid fuel in the prechamber 9111. As the atomizer and liquid fuel enter the prechamber 9111 via fuel injector 9108, it is ignited by the hot surface igniter 9101. Air may also pass through an intake and be preheated by a preheater 9102 before it travels into the prechamber 9111, where it will mix with the atomizer and the liquid fuel. Once the mixture is preheated and formed into a diffusion flame, it travels through the prechamber nozzle 9112 into the combustion chamber 9103 to form a PPV (premixed prevaporized) flame. When the diffusion flame leaves the prechamber 9111, evaporation may occur in the prechamber 9111 which may allow the diffusion flame to be relit more easily, should it get flamed out or burned out.

Once the flame is in the combustion chamber 9103, the heat from the flame is used to heat the heater heads 9002. The heated gas from the combustion chamber 9103 evenly flows over the surface of each of the heater heads 9002, wherein heater heads 9002 transfer the heat contained in the heated gas to a working fluid contained in the working space of the engine (shown as 9000 in FIG. 90). The combustion chamber 9103 may have apertures (shown as 9114 in FIG. 91A) in its surface to further assist in distributing the PPV flame evenly across each of the heater heads 8804.

The principles of the present invention may be applied to all types of engines, include Stirling engines, and may be applied to other piston machines utilizing cylinders such as internal combustion engines, compressors, and refrigerators. However, the present invention may not be limited to the double-acting four-cylinder Stirling engine.

Referring now to FIG. 92, a cross section of an engine 9200 is shown. The engine 9200 is similar to the one described above with respect to FIG. 4, however, includes another embodiment of the rocking drive mechanism. The engine 9200 shown in FIG. 92 includes a rocking drive mechanism including link rods 9210, 9210, a rocking beam 9214, a rocking pivot 9224, a connecting rod 9216, a connecting pivot 9218, end pivots 9220, 9222, and a crank-pin 9226. Although this engine 9200 is an example of another embodiment of the rocking drive mechanism as discussed above, the components function in a similar fashion however, this embodiment includes a number of additional benefits.

The configuration of the connecting rod 9216, rocking beam 9214, and connecting pivot 9218 limit the loads on the connecting rod. This configuration additionally allows for the use of larger bearings, including standard sized tri-metal bearings. Additionally, the increased distance between the rocking pivot 9224 and the connecting pivot 9218 increases the mechanical advantage of the rocking pivot 9224, thus reducing the loads on the connecting rod bearings In this embodiment of the engine 9200, the side loads on the link rods 9210, 9210 has been increased. However, as discussed above, the engine 9200 is an oil lubricated engine, thus, concern with limiting the side loads on the link rods 9210, 9210 has been reduced. Thus, in the embodiment shown in, for example, FIG. 4, the link rods are longer and the loads on the connecting rod are higher. In the embodiment shown in FIG. 92, the link rods 9210, 9210 are shorter and the load on the connecting rod 9216 is decreased.

In some embodiments, the oil pump is a Gerotor pump driven by the crankshaft through a spline connection. In some embodiments, the oil pump is driven by the crankshaft by a gear.

With respect to the heater tubes discussed above, in some embodiments, the heater tubes include an insert. The inserts increase the efficiency of the heat transfer between the outer wall and the inert gas. As hot gas flows around the heater tube, the insert pushes the inert gas, e.g., helium, to the wall of the heater tube. This increases the heat transfer by reducing the distance and increasing the speed of the helium. This also allows for better mixing of the fluids.

In some embodiments, the inset may act as an extended heat transfer surface similar to a fin. In some embodiments, the inserts may be in direct contact with the inner wall of the heater tubes. However, in some embodiments, the inserts may not directly touch the inner wall of the heater tube but may be in close relation to the inner wall of the heater tube. Less space between the insert and the tube wall increases the efficiency of the heat exchange. In some embodiments, the rods may be preformed with the heater tubes (i.e., through casting techniques, etc). The inserts also may provide increased heat transfer through transfer of heat from the tube wall, through the insert and into the dead volume to heat the helium gas in the tube. The insert occupies volume in the heater tube, i.e., decreases dead volume in the heater tube.

In manufacture, after forming the heater tubes either with the inserts already in the tubes, or, subsequent introduction of the rods into the heater tubes, in the process of bending the heater tubes, the inserts may eliminate or mitigate kinking which may be problematic in manufacture of the heater heads without inserts in the heater tubes.

Referring to FIGS. 93A-B, a heater tube with an insert is shown. The insert may take any shape, including but not limited to a rod, and in the exemplary embodiment, is made from gear stock (see FIGS. 95A-B). In some embodiments, as shown in FIGS. 94A-B, a helical twist may be put onto the gear stock. This helical twist exposes the gas to all sides of the heater tube which may increase the heat transfer or provide better overall heat transfer. The insert may be made of any material that will not melt, and as the inserts, in the exemplary embodiment, will only be exposed to inert gases, corrosion is not a factor. Thus, the rods may be made from any, but not limited to, the following materials: bronze, steel, copper, i.e., less expensive materials than the tube walls since the tubes will be exposed to non-inert gases. In the exemplary embodiment, steel is used.

Referring now to FIG. 96A, an embodiment of a Stirling cycle machine is shown in cross-section and designated generally by numeral 9600. While the Stirling cycle machine 9600 will be described generally with reference to the embodiment shown in FIGS. 96A and 96B, it is to be understood that many types of machines and engines, including but not limited to refrigerators and compressors may similarly benefit from various embodiments and improvements which are described herein, including but not limited to, external combustion engines and internal combustion engines. In particular, the present embodiment of the Stirling cycle machine is directed to improving the efficiency and operation of a 10 Kilowatt (Kw) Stirling cycle machine, although any other power output level are certainly contemplated and encompassed within the following disclosure of a machine or engine, that achieves high efficiency, long durability and low cost targets based on simultaneously utilizing optimized mechanical and operational control systems with existing Stirling cycle machine platforms.

The engine 9600 shown in cross-section in FIG. 96A includes generally a crankcase 9610 housing the drive components of the engine and a work space 9620 containing the working gas and/or fluid and gas and/or fluid compression and expansion related components. Inside the crankcase 9610 is an embodiment of a rocking beam drive mechanism 9601 (the term "rocking beam drive" is used synonymously with the term "rocking beam drive mechanism") for an engine, such as a Stirling engine, having linearly reciprocating pistons 9602 and 9604 housed within cylinders 9606 and 9608, respectively. As discussed previously, rocking beam drive 9601 converts linear motions of pistons 9602 and 9604 into the rotary motion of a crankshaft 9614. Rocking beam drive 9601 has a rocking beam 9616, rocker pivot 9618, a first coupling assembly 9619, and a second coupling assembly 9621. Pistons 9602 and 9604 are coupled to rocking beam drive 9601, respectively, via first coupling assembly 9619 and second coupling assembly 9621. The rocking beam drive 9601 is coupled to and drives crankshaft 9614 via a connecting rod 9622.

This embodiment shown in FIGS. 96A and 96B is an inverted rocking beam design similar to that disclosed in FIG. 92 and incorporates the same advantages and benefits as discussed therein. An important advantage of the inverted rocking beam arrangement having the crankshaft 9614 located relatively below the rocking beam mechanism 9601 of the machine ensures that the structural arrangement and alignment of the piston rods 9624 and cross-head coupling means 9634 which connect the piston rods 9624 to the rocking beam drive 9601 do not have to account for the size of the crankshaft 9614 and related components. This arrangement facilitates a larger load carrying capacity con-rod bearing 9615 on the connecting rod 9622, better mechanical advantage developed by the rocking beam 9616 and space for such larger conrod bearings 9615. The arrangement also relieves space constraints of the pistons 9602 and 9604, piston rods 9624 and cylinders 9606 and 9608 which can occur with the crankshaft located above the rocking beam drive and between the piston shafts 9624. With the rocking beam 9616 now located above the crankshaft 9614, there are no longer space restrictions around the crankshaft rocking beam 9616 and a larger wrist pin bearing 9628 can be provided to better support the connecting rod 9622 and rocking beam connection 9601.

Also, with the inverted design, the rocking beam 9616 can be designed to reduce the load on the connecting rod 9622 wrist pin bearing 9628 and conrod bearing 9615 by adjusting the lever arm ratio A and B seen in FIGS. 97A and 97B between the rocking shaft pivot 9718, the connecting rod wrist pin bearing 9728 and between the rocker shaft pivot 9718 and the lever arm of the piston acting at 9729. For example, as seen in FIG. 97A, the bearing load on the connection rod 9728 is greater where the conrod bearing ratio A/B is 1.6 relative to the piston connection. In FIG. 97B, the rocking beam 9616 is shown having a 1.0 ratio which essentially equates the distances of the two connection points 9728' and 9729 about the rocking shaft pivot 9718 and therefore correspondingly balances the load on the crankshaft 9614 to be the same or similar to that developed by the piston shaft 9624 and significantly lower than the load transmitted with the bearing ratio A/B of 1.6. It is to be appreciated that other embodiments of a rocking beam drive besides the inverted rocking beam drive may also incorporate the benefits of the disclosed rocking beam 9616 as well.

As shown in FIG. 98A, an oil pump 9840 is shown for pumping oil to the bearings in the machine is driven in one embodiment by a helical drive gear (not shown) formed on the crankshaft 9614, and a 90 degree gear set to drive the gear pump 9840. In another embodiment shown in FIG. 98B, a Gerotor displacement pumping unit is driven by the crankshaft 9814. The Gerotor pump uses an inner rotor 9844 having one less gear tooth 9846 than the surrounding outer rotor 9848. During part of the rotation cycle, the area between the inner and outer rotor increases, creating a vacuum that draws fluid through an intake. The area between the rotors then decreases, causing compression allowing oil to be pumped out to the mechanical parts of the engine. The Gerotor pump is driven coaxially and directly from the crankshaft 9814 without the transmission losses of the helical drive gear, making the engine construction and assembly more efficient and less expensive than the construction and components of the helical drive gear to the gear pump. The construction and assembly is easier because the Gerotor pump is directly driven by the crankshaft 9814, whereas there are significant mechanical losses associated with the previous gear pump. In other embodiments different pumps besides a Gerotor pump may be used, which include but are not limited to, gear pumps, piston pumps, rotary gear pumps, hydraulic pumps and diaphragm pumps for example and that other embodiments of a rocking beam drive besides the inverted rocking beam drive may incorporate the benefits of the Gerotor pump or similar direct drive pump.

Returning to FIGS. 96A-E, the alignment of the pistons 9602 and 9604, piston rods 9624 and cylinders 9606 and 9608 in conjunction with the crankcase 9610 is of critical importance for power transmission through the pistons 9602 and 9604 and piston rods 9624, providing for reduced wear on the piston rings and to the dynamic alignment and reciprocating nature of the piston rods and high pressure piston rod bearings 9630. The crankcase 9610 contains most of the rocking beam drive 9601 and is positioned below the cylinder housing 9631. The crankcase 9610 defines a space to permit operation of rocking beam drive 9601 having the crankshaft 9614 located below rocking beam 9616, a connecting rod 9622, and first and second coupling assemblies 9619 and 9621. Pistons 9602 and 9604 reciprocate in respective cylinders 9606 and 9608 as also shown in FIG. 96 and cylinders 9606 and 9608 extend above crankcase 9610, through the cylinder housing 9631, and into the heater heads.

The cross-heads 9634 and cross-head bores 9635 have a tolerance that is difficult to align with that of the mating cylinder liners in the cylinder housing 9631 during what is referred to as "stack up" i.e. the joining of the separate parts of the vessel, and therefore any difference in concentricity between these two elements when they are assembled together, creates a potential for misalignment, where potentially, the piston rod 9624 could sit askew, or at an angle and therefore the piston may reciprocate non-coaxially to the cross-heads 9634. The cylinder liner bores 9606, 9608, the cylinder gland locating diameter and the cross-head locating diameter of the cross-head bore 9635 all must be in alignment. To alleviate this issue and potential for misalignment, all three of these diameters are bored together in the same set-up and essentially simultaneously in the same operation resulting in very close tolerances of the diameters and the concentricity of these elements is maintained as closely as possible based on machining tolerances. These elements may also be manufactured and bored in other ways as well including but not limited to with alignment jigs and separate boring process that can produce the requisite tolerances to ensure that any angular deviation of the piston is maintained within an acceptable range.

Also as shown in another embodiment in FIG. 96B, to improve the concentricity of the piston and piston rod 9624, each piston rod 9624 is provided with a tapered end 9625 at each end of the rod 9624 to wedge the first end of the piston rod into the cross-head 9634. The tapered end 9625 facilitates the location, resting and clamping (L,R,C) between all elements for a proper location of the piston rod 9624 with the diameter doing the locating, the taper 9625 doing the resting, and a nut 9633 of the end doing the clamping. In the wedge connection provided by the taper, the wedge can lock itself in place because of the loads developed by the piston. The wedge or tapers on the ends of the piston rods are essentially jammed more and more firmly into the cross-heads 9634 at the lower end of the piston rods 9624 and correspondingly into the piston at the upper end of the piston rod. A nut 9633 may be used to facilitate the connection with the cross-head 9634 in case the rod comes loose, but in almost every case the wedge will maintain the appropriate connection of the piston rod 9624 to the piston above, and the cross-head 9634 below.

To facilitate the assembly of the tapered piston rods 9624 where the taper is essentially a reduction in diameter of the ends of the piston rod 9624 along a portion of the piston rod, the piston 9602, 9604 is manufactured from two separate parts, a piston base 9643, and a piston shell 9645 better shown in FIGS. 96C, D and E. The piston base and shell can be matingly threaded where the piston base 9643 defines a threaded inner diameter surface wall 9647 corresponding to a threaded outer surface wall 9649 of the piston shell 9645. Other connection arrangements between the base and shell are possible as well to facilitate the connection of the two piston elements. The piston base 9643 is provided with a receiving bore 9651 which may be a constant diameter bore, or a tapered bore to receive the tapered end of the piston rod 9624. To assemble these elements, the tapered piston rod 9624 is inserted into the piston base 9643, clamped in place with a desired pre-load, and then the shell 9645 is threaded onto the base 9643 to complete the assembly. The reason for the two-part piston is that to appropriately clamp and pre-load the piston rod 9624 to the base 9643, the assembly process necessitates access to the inside of the piston, and hence the two-part shell and based design facilitates the clamping process. Other manufacturing techniques may also be used to appropriately attach the tapered piston rod 9624 and piston 9602, 9604 without the necessity for a two-part piston as described above.

Another important aspect of the present embodiment is an increased volume of the combustion space in the heater head. To provide more volume for the combustion of the burner to take place and heat the tubes, an upper most portion 9655 of the cylinders 9606, 9608 is provided with a larger diameter than the remainder lower portion of the cylinders, giving the cylinders 9606, 9608 to some extent a mushroom-shaped profile. The benefit of this includes but is not limited to the ability to move the heater tubes 9659 farther out from an axial center of the cylinders 9606, 9608, thereby increasing the diameter and combustion volume above the cylinder inside the heater tubes 9659 and/or to accommodate a larger diameter tube to handle more working gas and fluid through the heater tubes 9659.

The heater tubes 9659 which absorb the heat from the burner are critical to the thermal transfer between the burner and the working fluid inside the heater tubes 9659. The burner and the flame generated by the burner extend essentially in the axial center A of the heater tubes 9659 of each heater head. Because of this arrangement, the inside surface walls 9661 of the heater tubes 9659 are heated more directly and to a substantially higher degree than the outside wall portions of the heater tubes causing uneven heating of the working gas and/or fluid in the heater tubes 9659. To facilitate a more even heating of the working fluid and/or gas, an insert 9663 as shown in FIG. 96F is provided inside the heater tube 9659 which has a star-shaped radial cross-section and may be, in certain embodiments, twisted in a helical fashion along its longitudinal axis. Other radial cross-sections could also be contemplated which facilitate channeling of the working fluid/gas so that contact with varying inner and outer surfaces of the heater tube 9659 are accomplished.

The introduction of the insert 9663 into the heater tube defines a series of substantially separate channels 9665 for directing and evenly heating the working gas as the working gas passes through the heater tube(s). The channels 9665 in turn define a straight or helical path as the case may be for the working gas/fluid through the volume of the heater tube 9659 and along the longitudinal axis of the heater tube 9659. As the working gas and/or fluid flows through and along the helical path or channel 9665 in the heater tube 9659, the gas is heated more uniformly as it traverses essentially circumferentially around the entire circumference of the heater tube 9659 between the cooler back wall and the hotter inside surface wall 9661. Additionally, the insert 9663 provides a more direct heat transfer of the heat provided by the burner from the inside surface wall 9661 to the back wall of the heater tube 9659, and also around the entire circumference of the heater tube 9659 where the insert 9663 itself is a heat path or conduit for uniformly heating the entire circumference and length of the heater tube 9659.

Another benefit of using such an insert 9663 is the increased flow velocities of the working gas through the heater tubes 9659 which in turn leads to a better heat transfer to the working gas. The rate of conductive heat transfer can be understood as Q is equal to mass flow rate times the change in temperature T, so for any given temperature change, as the velocity increases through the smaller channels 9665 defined by the insert 9663 so does the heat transfer to the working gas.

The present embodiment of the Stirling cycle engine maintains the working space 9620 and the working gas and/or fluid at a relatively high pressure, generally in the range of 1200-1800 psi, and more preferably about 1500 psi. It is of course necessary to ensure that the working gas and/or fluid is essentially sealed in the working space 9620 so that it does not escape into the crankcase 9610 and the environment. A critical place for such leakage of working fluid to occur is around the piston rods 9624, which extend and reciprocate between the working space 9620 and the crankcase 9610. To minimize such leakage, a high pressure piston rod seal 9630 is provided below the respective cylinders 9606 and 9608 and between the working space 9620 and the crankcase 9610.

High Pressure Rod Seals

With a significantly higher pressure in the working space 9620 relative to the crankcase 9610, a certain amount of working gas is anticipated to leak through the high pressure rod seals 9630. However, it is imperative to minimize the leakage without significantly affecting the reciprocating efficiency of the pistons and the engine. Also, as will be discussed in further detail below, an airlock and working fluid recapture system may be used in conjunction with the high pressure seals to capture certain amounts of such leaking working gas and/or fluid. Any working gas which leaks into the air lock between the working space 9620 and the crankcase 9610 can be drawn into an accumulator and supplied back into the workspace when necessary. Before more completely discussing such an airlock and recapture of working fluid, the present discussion is focused on the use of the high pressure rod seals 9630 between the working space 9620 and the crankcase 9610 to ensure the most effective working fluid pressure and gas containment.

A mechanical embodiment of the high pressure rod seal 9930 is shown in a test rig assembly in FIG. 99A for purposes of clarity. It should be understood that such a rod seal is intended to be utilized not only in the Stirling engine embodiments described herein but also in other engines or mechanisms with similar reciprocating pistons. A rod seal cavity 9932 is defined in the test rig for housing the rod seal 9930. The high pressure wedge rod seal 9930 in FIG. 99A includes several critical components: a rod sleeve 9940, a rod lower seal support 9942 and a clamp spring 9950. The rod sleeve 9940 defines a passage through which the piston rod 9924 is inserted and frictionally slidably engages. The sleeve 9940 has an inner diameter sized similar as the outer diameter of the piston rod 9924 and is made of a low friction material so that the piston 9924 slides easily through the passage as it reciprocates. The rod sleeve 9940 is provided at one end with a wedge portion 9946, which is shaped to fit into and be springably maintained against a mating seat defined in the rod lower seal support 9942. The nature of the wedge portion 9946 of the sleeve 9940 in conjunction with the lower seal support 9942 aids in the self-alignment of the seal, even with the reciprocating rod 9924 in motion, so that initial manufacturing tolerances of the sleeve 9940 and lower seal support 9942 as a whole are less strict and a tight seal between the sleeve 9940 and piston rod 9924 is maintained over time. The lower seal support 9942 can include a series of fittings such as gaskets, washers or o-ring seals 9944, which seal the base against the supporting surfaces of the rod seal cavity 9932 to ensure neither working gas or pressure passes or escapes from, what in a working Sterling engine is defined as, the work space.

The sleeve 9940, and hence the wedge 9946, maintains its tight fitting contact with the mating seat in the lower seal support 9942 under the influence of a load applied by the clamp spring 9950 shown in FIG. 99A. The clamp spring 9950 influences the rod sleeve 9940 against the lower seal support 9942. The clamp spring 9950 as shown in FIG. 99A is comprised of an upper collar 9955 and a lower collar 9956 sandwiching a plurality of coil springs 9957 therebetween. The lower collar 9956 has a circumferential chamfered inner surface 9958, which bears on a mating surface on the wedge portion 9946 of the rod sleeve 9940. Based on a preload applied to the clamp spring 9950, the lower collar 9956 thus influences the rod sleeve 9940 into sealing contact with the lower seal support 9942 to ensure that significant leakage of working gas and pressure cannot escape from the working space 9620.

The clamp spring 9950 is designed to take up any play which occurs in the seal 9930 due to wear. The wedge portion 9946 of the sleeve 9940 will wear over time against the seat in the lower seal support 9942 and as these contact surfaces wear the clamp spring 9950 essentially extends due to the spring bias and continues to provide axial and radial forces against the wedge portion 9946. Clearance spaces are provided between the lower collar 9956 and the lower seal support 9942, so that as the wedge portion 9946 and lower seal support 9942 wear, the clamp spring 9950 can expand and still maintain appropriate axial and radial forces on the sleeve 9940.

In another mechanical embodiment of the high pressure piston rod seal 9930', shown in better detail in FIG. 99B, a substantially symmetrical hemispherical shaped piston sleeve 9960 is supported by an upper seal support 9965 and a lower seal support 9966 inside a seal cavity defined inside a seal housing 9951. The symmetry of this hemispherical shaped piston sleeve 9960 provides more consistent wear across the length of the sleeve 9960 as compared to the wedge rod seal 9930 described above which focuses the radial wear at one end of the sleeve. The hemispherical surface 9963 of the piston sleeve 9960 bears on an inner respective bearing surface of each of the upper and lower seal supports 9965, 9966. A wear support clamp 9967 is provided axially disposed above the upper seal support 9965 which forces the upper and lower seal supports 9965, 9966 into biased contact with the piston sleeve 9960. A gap G may be provided between the upper and lower seal supports 9965, 9966 to accommodate any wear that may occur on abutting surfaces in the seal. As wear occurs, the abutting surfaces in the seal may be reduced so that as the sleeve bearing wears, the upper and lower seal supports 9965, 9966 are biased towards one another by the support clamp 9967. The gap G permits the upper and lower seal supports 9965, 9966 to move closer to one another as the seal wears without interfering with one another and so maintaining contact with the hemispherical shaped outer surface 9963 of the piston sleeve 9960.

A still further embodiment of a high pressure rod seal shown in FIG. 100A includes a spring energized lip seal 10003 generally comprising a seal jacket, made from PTFE or graphite for example, and a spring (not shown) circumferentially secured within a groove or between lips 10007 of the seal 10003. When the spring energized lip seal 100003 is seated in the housing, the spring lip seal 10003 is under compression, forcing the jacket lips 10007 against the respective adjacent walls of the seal block 10011 and the surface of the reciprocating piston 10024, thereby creating a leak free seal. The lip seal 10003 provides permanent resilience to the seal jacket 10005 and compensates for jacket wear and hardware misalignment or eccentricity. System pressure also assists in energizing the seal jacket 10005. Spring loading assisted by system pressure provides effective sealing at both high and low pressures. Spring energized lip seals are highly durable and designed for static, rotary and reciprocating applications in temperatures from cryogenic to +600F as well as pressures from vacuum to 25,000 psi, and to survive most corrosive environments.

A spring cup retaining cylinder 10008 is set around the piston rod 10024 and supported on a lower collar 10006. The retaining cylinder 10008 maintains a circumferential space about the piston rod 10024 in which the lip seal 10003 is maintained. The lip seal 10003 can be a PTFE and graphite ring supported around an outer circumference by the retaining cylinder 10008 and frictionally slidably engages the piston rod 10024 to create the high pressure spring energized lip seal. The spring (not shown) inside the lip seal 10003, along with the higher pressure of the working space, forces the lip seal 10003 against the respective piston rod 10024 and retaining cylinder wall, and also maintains the lip seal 10003 set down in the retaining cylinder 10008 generally against the lower collar 10006.

A hydraulic embodiment of a high pressure piston rod seal can facilitate an efficient and long term seal between the working space and the airlock. FIG. 100B discloses a hydraulic high pressure piston rod seal 10021 set inside the rod seal cavity of a test rig. A rod seal sleeve 10023 circumferentially encompasses the piston rod 10024 and defines a pressure space 10025 between a wall of the test rig and an outer surface of the rod seal sleeve 10023. A hydraulic fluid pressure line 10027 communicates with pressure space 10025 to provide the appropriate fluid pressure to maintain the rod seal sleeve 10023 in sealing engagement with the piston rod 10024. A sensor (not shown), such as a piezo-electric pressure sensor, can be provided in the pressure space 10025 and on the rod seal sleeve 10023 to ensure that the appropriate pressure and flexure is actuating the rod seal sleeve 10023 and providing the appropriate sealing pressure against the piston rod 10024. The inner surface of the rod seal sleeve 10023 slidably engages along the piston rod 10024 as the rod reciprocates and the rod seal sleeve 10023 is influenced radially inwards by the hydraulic pressure fluid in the pressure space 10025. As the rod seal sleeve 10023 wears, the hydraulic fluid pressure in the pressure space 10025 can be increased to ensure that the rod seal sleeve 10023 is motivated radially towards the piston rod 10024 to maintain slidable engagement with the piston rod.

It is to be appreciated that the above disclosed embodiment of high pressure rod seals are intended only as examples and that the machines described herein are not limited to these examples, and that other embodiments of high pressure rod seals may also be used to ensure that the high pressures used in Stirling engines, or any other engine for that matter, are maintained in the appropriate working space, crankcase and other engine compartments as necessary.

Rolling Diaphragm Seal

Turning to FIGS. 101A and 101B, and referring back also to FIGS. 13 A-G, in certain embodiments of the present invention a rolling diaphragm 10190 is used in conjunction with the piston rods 10124 to prevent the escape of lubricating fluid from the crankcase 10110 up past the rods 10124 and into the working space 10120 and regenerator. If the lubricating fluid necessary for the rocking drive can bypass the piston rod seals, it can potentially damage the working space, clog the regenerator and contaminate the working fluid or gas of the engine in the cylinders.

To facilitate the appropriate rolling and flexing of the diaphragm 10190, a pressure differential is maintained across the rolling diaphragm 10190 so that preferably the pressure above the diaphragm 10190 is slightly greater than the pressure in the crankcase. The seal is thus essentially inflated into the crankcase, which facilitates the diaphragm 10190 maintaining its desired form as it rolls and flexes with the reciprocating piston rod 10124. This alleviates stresses on the circumferential sealing points so the seal is not compromised. It is generally necessary to place a differential of approximately 15 PSI across the diaphragm 10124 to properly inflate the seal so that it conforms to the shape of the bottom seal piston 10195 as it moves with the piston rod 10124. It is to be appreciated that the pressure differential maintained across the rolling diaphragm 10190 is not limited to 15 PSI. Rolling diaphragms made of stronger materials or having a particular shape may be able to sustain a higher differential or operate at a lower differential as the case may be. In embodiments of the stirling cycle engine where the working space 10120 is at a relatively high pressure 1500 PSI-1800 PSI, the crankcase 10110 must be charged with a pressure for instance of 1485 PSI, which is approximately 10-15 PSI less than that of the working space at 1500 PSI. Although it is possible to regulate these larger pressures to maintain the 10-15 PSI difference across the diaphragm, it is difficult and adds to the complexity of the machine.

The rolling diaphragm 10190 may be manufactured by injection molding or hot compression molding. In hot compression molding of the rolling diaphragm 10190, it can be more difficult to control material properties but injection molded diaphragms have shown in testing a better transition of dynamic stresses across the profile of the rolling diaphragm 10190 as it transitions and rolls with the reciprocation of the piston rod 10124. Testing on the materials used to fabricate the rolling diaphragm 10190 indicate chopped fiber is most successful for example but not limited to, nitrile with Kevlar fiber or Fab-Air®.

FIGS. 101A and 101B disclose an embodiment of the rolling seal or diaphragm 10190 having a profile which facilitates the dynamic rolling translation of the diaphragm. As discussed in previously herein, and incorporated herein by reference in its entirety in the present discussion, the pressure differential that is placed across the seal allows the seal to act dynamically to ensure that the rolling diaphragm 10190 maintains its form throughout its dynamic range of motion. As previously discussed, the pressure differential causes the rolling diaphragm 10190 to conform to the shape of the bottom seal piston 1310 with reference to FIG. 13A as it moves with the piston rod 10124, and prevents separation of the diaphragm 10190 from the surface of the piston rod 10324 during operation. It is desirable to lower the amount of inflation of the rolling diaphragm 10190 without the diaphragm buckling or separating, i.e., deviating from a consistent dynamic axial and radial rolling of the diaphragm 10190 along the diaphragm profile with the axial reciprocation of the piston rod 10124. As discussed above, the inflation of the diaphragm is provided by the pressure differential across the rolling diaphragm 10190. To accomplish this, it has been found that particular structural profiles facilitate the conservation of material and consistent rolling of the diaphragm.

The cross-section in FIG. 101A-B shows a profile view of the molded form of the diaphragm of the present embodiment about a diaphragm axis L. For purposes of describing the diaphragm structure the inner edge 10192 as being the top 10194 of the diaphragm and the outer edge 10193 is the bottom of the diaphragm as shown in the figures. The diaphragm has a lateral wall 10190 extending axially and radially relative to axis L from the inner edge 10192 to the outer edge 10193; the lateral wall is composed of several sections. A top fillet section 10198 turns the material approximately 90 degrees from the top of the diaphragm 10190 as shown, to a sidewall section 10196 substantially parallel to the piston rod 10124 and axis L. The sidewall section 10196 in turn then turns towards the outer edge 10193. Before reaching the outer edge 10193, the sidewall section merges contiguously into a chamfer section 10199, which while still depending axially from the sidewall section 10196, extends from the sidewall 10190 in a greater radial degree relative to axis L to connect with the outer edge of the diaphragm 10193. The sidewall section 10196 may be parallel to the axis L or may also have a radial component which slightly angles the sidewall section 10196 radially away from the axis L. In either case the chamfer section 10199 extends to a greater radial degree from axis L than the sidewall section 10196. A bottom fillet 10197 connects to the outer edge 10193 defining the bottom of the diaphragm as drawn. The outer edge 10193 like the inner edge 10192 is provided with a thickened circumferential lip, which can be secured inside a matching groove formed in the vessel joint.

The cross-section shown in FIGS. 102A and 102B is a profile view of the molded form of another embodiment of the rolling diaphragm 10290 of the present embodiment about a diaphragm axis L. Like reference numbers for this embodiment correspond to the same or similar elements in the previous rolling diaphragm embodiment. For purposes of describing the diaphragm structure, the inner edge 10292 is the top of the diaphragm and the outer edge 10293 is the bottom of the diaphragm 10290 as shown in the figures. The diaphragm 10290 has a lateral wall 10296 extending axially and radially relative to axis L from the inner edge 10292 to the outer edge 10293; the lateral wall here is again composed of several sections. A top fillet 10294 section turns the material approximately 90 degrees from the top of the diaphragm 10290 as shown, to the sidewall section 10296, which depends both axially and radially outwards towards the bottom of the diaphragm along the axis L. Before reaching the outer edge 10293, the sidewall section 10296 merges contiguously into a bottom fillet 10299 to extend towards the outer edge 10293 of the bottom of the diaphragm as drawn. An outer lip 10197 similar to the thickened circumferential lip 10295 of the inner edge 10192 is provided, which are secured inside a matching groove formed in the vessel or crankcase joint which secures and seals the outer edge 10293 of the diaphragm.

The injection molding of the diaphragm is important because the gating methods and other molding techniques, characteristics, methods and specifications can affect the fiber alignment and molecular alignment of the diaphragm material during the molding process. These material characteristics are important because this can affect the hoop stress of the diaphragm. For example, if the material is gated at one end and overruns an opposing end of the mold, the fibers can be aligned in a particular direction to optimize the hoop strength of the diaphragm while potentially enhancing the flexible and rolling characteristics of the final diaphragm element.

It is very important in the dynamic rolling actuation of the diaphragms 10190, 10290 that no imperfections or particles including fluid particles such as oil droplets are disposed on the surfaces of the bottom seal piston or on the adjacent vessel wall surrounding the bottom seal piston. Such fluid particles, most likely oil, are detrimental to the rolling actuation of the diaphragm against the respective crankcase surfaces, because they cause stress points on the diaphragm.

Turning to FIG. 103 another embodiment of the rolling diaphragm includes a first and second rolling diaphragm 10391, 10393 to make what is essentially a double bellows system 10392. A double bellows system 10392 can facilitate the elimination of the 10-15 PSI pressure differential between working space and airlock and/or crankcase by providing the appropriate expansion pressure between the double bellows themselves. The double bellows include first and second rolling diaphragms 10391, 10393 which are oppositely and axially aligned along the piston rod, and define a space therebetween with a light oil contained between the diaphragms and pressure charged between the double bellows. The incompressible oil prestresses the diaphragms and facilitates the consistent rolling of the diaphragm as the piston rod 10324 reciprocates along its axis.

Airlock and Working Fluid Recapture System

The power, life and value of a Stirling engine can be maximized by building an oil lubricated drive and sealing the work-space from the oil. Oil lubricated drives allow high powers and are inexpensive compared to drives based on rolling elements. It is essential to isolate the oil in the drive from the workspace. Even oil mist will migrate to the hot end of the working space, where the oil will breakdown and the resulting carbon will clog the heat exchanger. Flexible membranes or bellows such as the rolling diaphragms discussed above that attach to the moving piston rod and the structure provide an oil and gas tight seal between the oil filled crankcase and the workspace, ensuring that the lubricant is maintained in the crankcase. In order to function for thousands and millions of cycles, a small pressure difference must be maintained across the bellows.

An important aspect of the rolling diaphragm and oil lubricated crankcase relates to the use of an airlock 10401 and an airlock pressure regulation system 10411 as shown in FIGS. 104A and 104B. The airlock pressure regulation system 10411 provides the benefit of ensuring working gas escaping from the working space 10403 is returned to the working space, provided that the working gas does not leak into the environment or atmosphere, which would require replenishment of the working gas, and that an appropriate pressure differential is maintained across the rolling diaphragms as described above. The airlock pressure regulation system 10411 permits an easily serviceable bottom end i.e. crankcase 10410 if, as in the embodiment disclosed in FIG. 105, the crankcase is intended to be maintained essentially at atmospheric pressure.

As shown in FIG. 104A relating to a pressurized crankcase 10410 at approximately 1485 PSI, in order to maintain an appropriate working space pressure and airlock pressure regulation, an airlock space 10401 is provided between the working space 10403 and the crankcase 10410 at a pressure of, for example 1500 PSI, so that the substantially greater pressures in the working space 10403 should not significantly influence the air lock space 10401 and any pressure and working gas leaking from the working space 10403 into the air lock can be captured and accumulated as described below with respect to the airlock pressure regulator and returned to the airlock and working space and not merely escape into the crankcase and environment.

It is to be understood that airlock space 10401 is intended to maintain a constant volume and pressure necessary to create the pressure differential necessary for the function of rolling diaphragm 10490 as previously described. In the present embodiment the airlock 10401 may or may not be sealed off from working space 10403 with high pressure rod seals 10430. In any case, the pressure of airlock space is desired to be maintained at essentially 1500 PSI and equal to the mean pressure of working space 10403. The pressure in the working space 10403 may vary at least +/−300 PSI so the intention of the airlock space 10401 is to insulate the diaphragms from such fluctuations and maintain itself at around the necessary pressure, by way of example here 1500 PSI, relative to the 1485 PSI charged in the crankcase 10410. To facilitate the equalization of pressures between the working space 10403 and the airlock space 10401, a small opening or pressure equalization orifice 10404 communicates between the working space 10403 and the airlock space 10401. The crankcase 10410 must be charged to 1485 PSI, and be maintained at approximately 15 PSI less than the airlock space 10401 so that the appropriate pressure is applied to the rolling diaphragm 10490 to ensure the proper dynamic movement of the diaphragm.

In this pressurized crankcase 10410 embodiment an airlock pressure regulator 10411, a pump 10412 and relief valve system is provided between the crankcase 10410 and the air lock space 10401 to maintain the exemplary 15 PSI pressure differential therebetween. Other predetermined pressure differentials may also be maintained depending on the diaphragm material and the design of the entire airlock pressure regulation system. In its most general form, an uptake line 10416 communicates from the pressurized crankcase 10410 to a filter 10418, a pump 10412 (having a check valve on its outlet), and a pressure regulator 10413 in parallel with the pump 10412 and filter 10418 for returning pressurized working gas back to the air lock 10401 and so maintains the pressure differential between the airlock space 10401 and the crankcase 10410 and consequently across the rolling diaphragm 10490. This airlock pressure regulator system 10411 is described more completely with respect to FIG. 104B.

The airlock pressure regulator 10411 regulates the pressure difference between the airlock 10401 and the crankcase 10410. When the engine is turning, the airlock pressure regulator 10411 keeps the airlock pressure preferably 10 to 14 PSI above the crankcase pressure although a range of 5 to 20 PSI is possible and other pressure differentials can be accomplished by the regulator as well. When the engine is off, the airlock pressure regulator 10411 keeps the airlock pressure preferably less than 15 PSI above the crankcase pressure and not more than 5 PSI below crankcase pressure. It is permissible to have a greater fluctuation of pressure differential when the engine is off since there is little or no dynamic forces being applied to the rolling diaphragms 10490 via moving pistons.

The airlock pressure regulator 10411 performs several important functions. The airlock pressure regulator 10411 uses a pump 10412 to move pressurized gas from the lower pressure crankcase 10410 into the airlock 10401, thereby maintaining the airlock 10401 at a higher pressure. The airlock pressure regulator 10411 relieves excess pressure between the airlock 10401 and crankcase 10410 volumes. A bidirectional regulator 10413 vents some of the airlock gas into the crankcase 10410, when the airlock pressure is preferably 15 PSI above the crankcase and vents in the opposite direction, venting gas from the crankcase 10410 to airlock 10401, when the airlock pressure is more than 5 PSI below the crankcase pressure. Also, a filter 10418 in the airlock pressure regulator 10411 filters out the oil from the crankcase gas before it enters the airlock volume.

The components of the preferred embodiment are the mechanical pump 10412, the bidirectional pressure regulator 10413, an oil filter 10418, a pump pressure switch 10417 to control the pump 10412 and a controller pressure switch 10419 to signal the engine controller C. An example of the mechanical pump is the Linear AC 0410A pump by Medo. Other pumps could certainly be used as well. The important qualities of the pump are the ability to operate in a high pressure inert environment, long life, no maintenance and quiet. Solberg Mfg. produces a line of oil-mist eliminators, i.e. filters, that are compact, effective and can hold enough oil for several thousand hours of operation. In a preferred embodiment, the bidirectional regulator 10413 allows pressure flow when the design pressure difference has been exceeded in either direction. Pump pressure switch 10417 operates the pump when the pressure difference between the airlock 10401 and the crankcase 10410 is preferably less than 10 PSI for example. Pump pressure switch 10417 includes a predetermined dead band, or range, that keeps the pump 10412 on until the airlock pressure is for example 14 PSI above the crankcase pressure. Controller pressure switch 10419 signals to the controller C that the airlock pressure is at least 5 PSI, for example, above the crankcase pressure. This insures that the engine will not turn until the airlock pressure is sufficiently greater than the crankcase pressure. The rolling diaphragms 10490 could tear if moved without such pressure difference across them. A fill source 10414 may be connected with the airlock to replenish the pressurized vessel charging and working gas/fluid if necessary.

FIG. 104C is a specific embodiment of the bidirectional regulator 10413 showing the pump 10412, oil filter 10418 and a spool valve 10441 which operates between an airlock port 10449, a crankcase port 10451 and a pump port 10453 according to the pressure differentials between the crankcase pressure and airlock pressure. In this case, alternative to the pressure switches 10417, 10419 described above a proximity sensor 10425 for determining location of the spool 10441 via a target magnet 10426 is used to control the pump 10412 and if necessary to signal the engine controller C. The spool valve 10441 is biased by a primary spring 10443 against the airlock over-pressure and an underpressure relief valve 10445 is biased by an inner spool spring 10447. Observing FIG. 104D (1)-(5) the spool is shown in certain positions: in (1) is shown the spool influenced open by the spring where the airlock pressure is low so that the airlock port 10449 now communicates to pump port 10453 to receive pressurized gas from the pump 10412, in (2) the spool 10441 is shown where the airlock pressure is within normal limits so the airlock port 10449 is closed by spool 10441 and the spool is still displaced enough according to the proximity sensor 10425 to cause operation of the pump 10412, even without flow from the pump to the airlock. In (3) the spool 10441 is shown where the airlock pressure is again within normal limits so the airlock port 10449 is closed by spool 10441 and the spool is now displaced so that the proximity sensor 10425 does not turn on the pump. Either one or two proximity sensors 10425 are shown in FIGS. 104C-D, however any desired number and type of proximity sensors may be used in normal operation in other embodiments. In (4) the spool 10441 is shown with the airlock pressure is high so that the airlock port 10449 is connected to crankcase port 10451 and pump is disabled while airlock pressure is reduced. (5) is a case where the engine is shut down so there is no power to the pump and the airlock pressure is extremely low and to keep the diaphragms from being damaged, the airlock port 10449 is connected directly to the crankcase through the underpressure relief valve 10445 which opens to provide direct pressure relief through the spool 10441 so that the crankcase pressure and airlock pressure are at least equalized.

In another embodiment of the pressure regulator 10401 shown in FIG. 104E, the bidirectional regulator 10413 is replaced with a back pressure regulator 10431 which provides for one way pressure flow from the airlock 10401 into the crankcase 10410 should the pressure differential exceed for instance 15 PSI. To accommodate flow in the other direction from the crankcase to the airlock, a check valve, or pair of check valves 10433, 10435 can be provided in a separate path. This ensures that the crankcase will not be pressurized higher than the airlock. In FIG. 105, the crankcase 10510 is intended to be maintained at atmospheric pressure. This is a critical improvement of the present invention as it provides for a more easily serviceable lower unit on the vessel without the need to recharge the crankcase 10510 should work need to be done inside the crankcase 10510 and also provides that a significantly lighter crankcase housing is necessary to contain the drive components. In this embodiment of the airlock pressure regulator system 10511 the airlock space 10501 is maintained essentially at atmospheric plus 15 PSI and therefore any pressurized working gas which escapes from the working space 10503 into the airlock 10501 needs to be removed from the airlock 10501 and returned to the working space 10503. To accomplish this, in its simplest form a first relief valve 10520 means is provided in an uptake line 10522 communicating with the airlock space 10501 so that any pressure greater than 15 PSI is relieved from the airlock 10501 and passed via a pump 10512 into an accumulator 10523 outside the working space 10503, airlock space 10501 and crankcase 10510. From the accumulator 10523 a return line 10525 includes a second relief valve 10521 means which opens to permit recharging of the working space 10503 with pressurized gas from the accumulator 10523 should the pressurized working gas in the working space 10503 fall below 1500 PSI. It is to be appreciated that the balancing of this pressurized system may include other pressure considerations across the first and second relief valves 10520, 10521, particularly with respect to the variation which can occur in the working space 10503 where the pressure can swing plus or minus 300 PSI during the Stirling cycle itself.

When the engine is running, a mechanical pump 10612 defined by a cavity 10608 in the piston rod may be utilized to reduce the load and work done by the above described airlock pressure regulator system. As seen in FIG. 106, the mechanical pump 10612 of the piston rod 10624 is added to the airlock pressure regulation system to reduce the load on the electrical system during operation. A check valve 10605 receives crankcase pressure through an intermediate passage 10607 from the crankcase. The check valve 10605 opens when the airlock pressure has dropped too low relative to the crankcase pressure and pressurized gas from the crank case is drawn into the piston cavity 10608 as the piston rod 10624 reciprocates. The piston rod cavity 10608 is defined by a reduced diameter portion of the piston rod which essentially defines the mechanical pump 10612 itself. As the piston rod 10624 reciprocates the piston rod cavity 10608 is reduced in size as shown by the right-hand piston, pumping the pressurized gas into the airlock space 10609. In this way during engine operation the airlock can be efficiently replenished with sufficient pressurized gas should its pressure drop too low. An outlet check valve 10611 is provided between the airlock and the crankcase so that pressure in the airlock which exceeds the desired differential can be reduced from the airlock space 10609 into the crankcase. The mechanical pump 10612 defined by movement of the piston rod 10624 does not operate at engine startup because there is no mechanical operation of the engine, however the airlock pressure regulator system must be operational during startup operations.

Cooler Liner Diameter Reduction

As explained previously with respect to FIGS. 65D-E, the heater tubes communicate with a heat exchanger which circumferentially surrounds each cylinder. The heat exchanger of the present embodiment described in FIGS. 18A and 18B provides cooling for the working gas/fluid during the appropriate portion of the stirling cycle. The heat exchanger 10705 is supplied with cooling water through coolant tubing which communicates with a heat sink such as the environment via a radiator (not shown). Generally, the coolant water picks up heat through the heat exchanger in the vessel from the hot working gas, and the coolant water then is pumped to the radiator where the heat is transferred to the environment.

The heat exchanger 10705 shown in FIG. 107A surrounding each respective cylinder is provided with a water jacket sleeve 10704 having an inner surface defining a channel to allow passage of the cooling water through an interfacial area 10706 between the inner surface of the water jacket sleeve 10704 and an outer surface of a cooler liner 10702. The cooler liner 10702 also has an inner surface 10708 which directs the flow of hot working gas along the inner surface to facilitate the transfer of the heat through the cooler liner 10702 to the coolant water in the interfacial area. A goal of the described structure is to increase the heat transfer surfaces within the interfacial area 10706 for absorbing heat from the hot working gas and the heat exchanger so as to improve heat transfer between the working gas and the coolant water.

The water jacket sleeve 10704 surrounds the cooler liner 10702 and forms the heat exchanger 10705 which cools the working fluid during the appropriate portion of the Stirling cycle. The cooler liner 10702 directs the flow of the working gas along the inner surface of the cooler liner 10702. An improvement of the presently described engine is an increased heat transfer surface area in the heat exchanger where the outer diameter of the cooler liner 10702 is reduced to increase the interfacial area 10706 with a plurality of extended surfaces, for instance, longitudinal arranged fins 10707, or pins, provided around the outside diameter of the cooler liner 10702 and extending into the interfacial area 10706 between the inner surface of the water jacket sleeve 10704 to increase the surface area of the heat exchanging surfaces and provide more efficient cooling of the working gas/fluid. The outer diameter of the cooler liner wall 10708 can be reduced to an extent so that the cooler liner wall 10708 is relatively thin, as compared to the radial length of the longitudinal fins 10707, or pins in the interfacial region 10706 between the cooler liner 10702 and the inner surface of the heat exchanger 10705. The inner wall 10708 of the cooler liner is generally maintained an appropriate diameter to accommodate the working gas flow from the heater head and cylinder. The inner diameter of the liner is provided with axially arranged fins 10707 to direct the flow of gas along the inner wall of the liner and facilitate the transfer of heat out of the working gas, through the cooler liner and into the coolant water. (Drawing of cross-section of cooler liner and water jacket sleeve??)

It is also important to ensure that the stationary seals utilized in the heat exchanger are to the extent possible redundant and not compromised, particularly where the water jacket sleeve 10704 and cooler liner 10702 should sufficiently maintain the coolant water in the interfacial region 10706 between these elements and the working fluid inside the coolant line 10702*r*. As shown in FIG. 107B, the heat exchanger 10705 in the present embodiment has an outer surface which abuts the inner surface of the vessel and is sealed with respect to the vessel by an upper stationary seal 10710 and a lower stationary seal 10711. Similarly the cooler liner 10702 inside the heat exchanger 10705 is sealed with respect to the inner surface of the heat exchanger by an upper seal 10713 and a lower seal 10715. A top surface of each of the cooler liner 10702 and the heat exchanger 10705 are formed and both support the base of the heater heads 10703 and provide the communicating interface for the working gas between the heater tubes 10709 and the heat exchanger 10705. An additional or redundant seal can be added at the intersection between the cooler liner 10702 and the heat exchanger 10705 adjacent the top surface of each element which supports the heater heads 10703. This redundant seal 10712, for example a 45 degree o-ring, is located axially spaced above the upper stationary cooler liner sealer 10710 and extends circumferentially around the entire joint between the heat exchanger 10705 and the cooler liner 10702. The addition of the heater head base as it is supported on the top surfaces of the liner 10702 and heat exchanger 10705 compresses the redundant seal into the joint and adds redundancy to the system to prevent the escape of cooling water and/or working gas/fluid from the working space.

In a further improvement to the drive system of the present invention a more easily constructed and easy to maintain connection between the link rod 10826 and the rocking beam 10816 is described. Referring now to FIG. 108A, a rocking beam drive mechanism 10801 is shown. In this embodiment, the rocking beam drive mechanism has pistons 10802 and 10804 coupled to two rocking beam drives 10801. In the exemplary embodiment shown more clearly in FIG. 108B, the link rod 10826 is coupled at a first end to the piston rod via a link rod upper pin 10832, and a second end of the link rod 10826 may be coupled to one end of a link rod lower pin 10832 attached to the yolk of the rocking beam 10816. The link rod lower pin 10832 had been previously accomplished by press fitting a pin 10823 into a passage of the link rod 10826, and with bearings provided on either side of the link rod 10826 and around the pin 10823, the second end of the link rod is secured to the rocking beam drive 10801 in a yolk 10825. The pin 10823 extends into respective pin passages in the yolk 10825 of the rocking beam 10816 in order to complete the link rod lower pin 10832 structure. A bearing is also provided between the pin passages in the rocking beam 10816 and the pin 10823 to facilitate the pivoting of the link rod and pin relative to the rocking beam 10816.

The present embodiment eliminates the need for a press fit of the pin into the passage in the second end of the link rod 10825. The press fit made it difficult to maintain, fix assemble and disassemble in any manner this end pivot structure during maintenance of the engine. As seen in FIG. 108B the link rod lower pin 10823 is provided to be inserted with a loose fit into and through the passage in the second end of the link rod 10826. A bearing 10822 may be provided around the link rod lower pin 10823 on either side of the link rod 10826, and the width of the bearing 10822 is reduced in order to fit a retaining ring 10828 onto the pin 10823 adjacent each bearing to retain the pin 10823 and bearings axially aligned in the passage of the link rod 10826 and in the yolk 10826. With the pin 10823 and bearings essentially axially fixed by the retaining rings 10828 to the link rod 10826, the pin 10823 and link rod passage can have a loose fit so that the pin 10823 can be easily removed from the link rod 10826, when disassembly is necessary, merely by removing the retaining rings 10828 and sliding the pin 10823 out of the link rod passage. A lubricating oil passage 10829 may be provided in the link rod lower pin 10823 to communicate with a oil passage 10838 in the link rod 10826 and provide oil to the bearings 10822 and the respective surface of these pivoting components.

The link rod upper pin 10832 is similarly arranged with a loose fit with the first or upper end of the link rod 10826. A bearing 10834 in this case is provided directly between the bearing surface of the upper pin 10832 and an inner surface of the upper link rod passage. A pair of retaining rings 10836 are applied to grooves in the ends of the upper pin 10832 to maintain the pin in its axial placement in the cross head 10840. The bearing 10834 and respective bearing surfaces can be supplied with lubricating oil via the oil passage 10838 in the link rod 10826

The arrangement of the Stirling machine discussed above is generally referred to and shown as having a vertical orientation, i.e. with the pistons reciprocating generally perpendicularly aligned relative to a horizontal support surface or ground surface. In another embodiment of the present Stirling cycle engine 10903 shown in FIGS. 109A and 109B the engine may be horizontally arranged, i.e. with the pistons 10905, piston rods 10907, heater heads 10911, cross heads 10913 etc., being arranged and reciprocating in a horizontal orientation relative to a ground support surface as opposed to the vertical orientation discussed above. One of the significant challenges in such a design is the arrangement and structure of the oil cooling system in the crankcase 10915 where it imperative to ensure that the mechanical elements of such a horizontal crankcase such as the cross heads 10913, rocking beam 10919 and other crankcase components and drive elements are sufficiently supplied with a free flow of oil through the crankcase and back to the oil sump and pump.

As seen in FIG. 109B and by way of general example, the oil cooling system comprises a central oil supply line 10921 disseminating a flow of oil directly to each of the cross head bores 10923 through radial oil passages 10925. Oil drains down by gravity in the crankcase 10915 into oil sump 10931 which can then be re-circulated back to the central oil supply line 10921 via a pump 10935 through main line 10937 which communicates eventually with central oil supply line 10921. It is to be appreciated that other oil supply arrangements and orientations can also be accomplished, and that the embodiment described with respect to FIGS. 109A-B and the horizontal arrangement of the engine and crankcase components is merely exemplary with respect to these figures.

In another embodiment of the engine it is also beneficial to cool the crankcase by cooling the oil in the crankcase. An oil cooler 10941 shown diagrammatically in FIG. 109B is designed to pick up a substantial amount of the heat generated in the crankcase, and with a co-axial (or a tube-in-tube) heat exchanger 11043 shown specifically in FIGS. 110A-B, oil from the crankcase passes through an outer oil channel 11045 over a series of fins 10947 positioned along the outer surface of a cooling tube 11049 containing flowing cooling water from a cool water source 11046. The fins 11047 can be radial fins or axially aligned fins relative to the cooling tube 11049 depending upon the necessity for a desired oil flow along the outer surface of the coolant tube. After taking up heat from the oil, the cooled oil returns to the main line 11037 and the heated water can be dumped to a heat sink 11051.

A manual pull-cord start and recoil pulley assembly may be added to the engine to assist in engine start-up in other embodiments. FIGS. 111A and B show a pull-cord start system 11193 including a recoil pulley 11195 coupled to a crankshaft 11197 supported preferably in a Stirling engine crankcase. A pull-cord 11115 is wound about the recoil pulley 11195 which is pulled by a user to rotate the recoil pulley and thereby the crankshaft 11197 at a speed sufficient to start the engine. The pulley is preferably surrounded by a stationary housing (not shown) for safety reasons and is coupled to the crankshaft via a pulley shaft 11109 and a one-way clutch 11119 that drives the crankshaft as the pull-cord 11115 is pulled and permits the crankshaft to freely rotate relative to the pulley 11195 when the engine is running.

When starting the engine, the operator manually grasps the handle H attached to the pull-cord 11115 and pulls the pull-cord 11115 outward from the recoil pulley 11195. This turns or rotates the pulley in either a counter-clockwise or clockwise direction as shown in FIG. 111A against the bias of the torsion spring (not shown) generally engaged between the pulley and the housing. The operator must pull the pull-cord 11115 with sufficient strength to overcome the bias of the torsion spring that would normally cause the pull-cord 11115 to rewind back into the housing and around the circumferential groove in the pulley. As the pull-cord 11115 is pulled outward the pulley 11195 engages through the pulley shaft and one-way clutch 11119 with the crankshaft 11197 of the engine causing the pistons (not shown) to reciprocate with sufficient speed to start the engine. When the pull-cord 11115 is released by the user, the recoil spring (not shown) causes the pulley 11195 to rotate counter-clockwise through a series of complete revolutions. Where the end of the pull-cord 11115 is connected to the pulley, when the user releases the handle H after pulling the pull-cord, the pull-cord 11115 travels or rewinds on the pulley 11195 and recoils back inside the housing placing the recoil start up assembly back into a recoiled state.

Alternatively as shown in FIGS. 111C and 111D an electric starter motor mounted externally to the engine housing may be used to start the Stirling engine. The electric motor 11196 may be a permanent magnet or a series-parallel wound direct current electric motor with a solenoid switch 11192. When current is applied to the solenoid 11192, a drive pinion or spur gear 11194 is pushed out along a driveshaft 11198 to mesh with a ring gear 11191 that is coupled to the crankshaft 11197. The driveshaft 11198 may be a helical Bendix drive that drives the pinion 11194 along the helix to engage with the ring gear 11191. When the engine starts, backdrive from the ring gear 11191 causes the drive pinion 11194 to exceed the rotative speed of the starter motor 11196 and force the drive pinion 11194 back down the helical shaft and thus out of the mesh of the ring gear 11191. The drive pinion 11194 may alternatively be clutched to its drive shaft through an overrunning sprag clutch which permits the pinion 11194 to transmit drive in only one direction. If the pinion 11194 remains engaged after the engine has started, the pinion 11194 will spin independently of its driveshaft 1119 preventing backdrive that causes the engine to drive the starter and possibly damage the starter motor 11196.

B-Burner

FIGS. 112-119 disclose a further embodiment of a burner 11201 for use in conjunction with a multiple heater head and piston engine described previously in FIGS. 90-91B. The present burner 11201 is specifically directed to the independent heating of multiple heater heads, in this case four (4) heater heads, each heated by an individual burner and flame and having a single air inlet 11223, single outer wall 11212, and two exhaust openings 11225.

Figure 113:
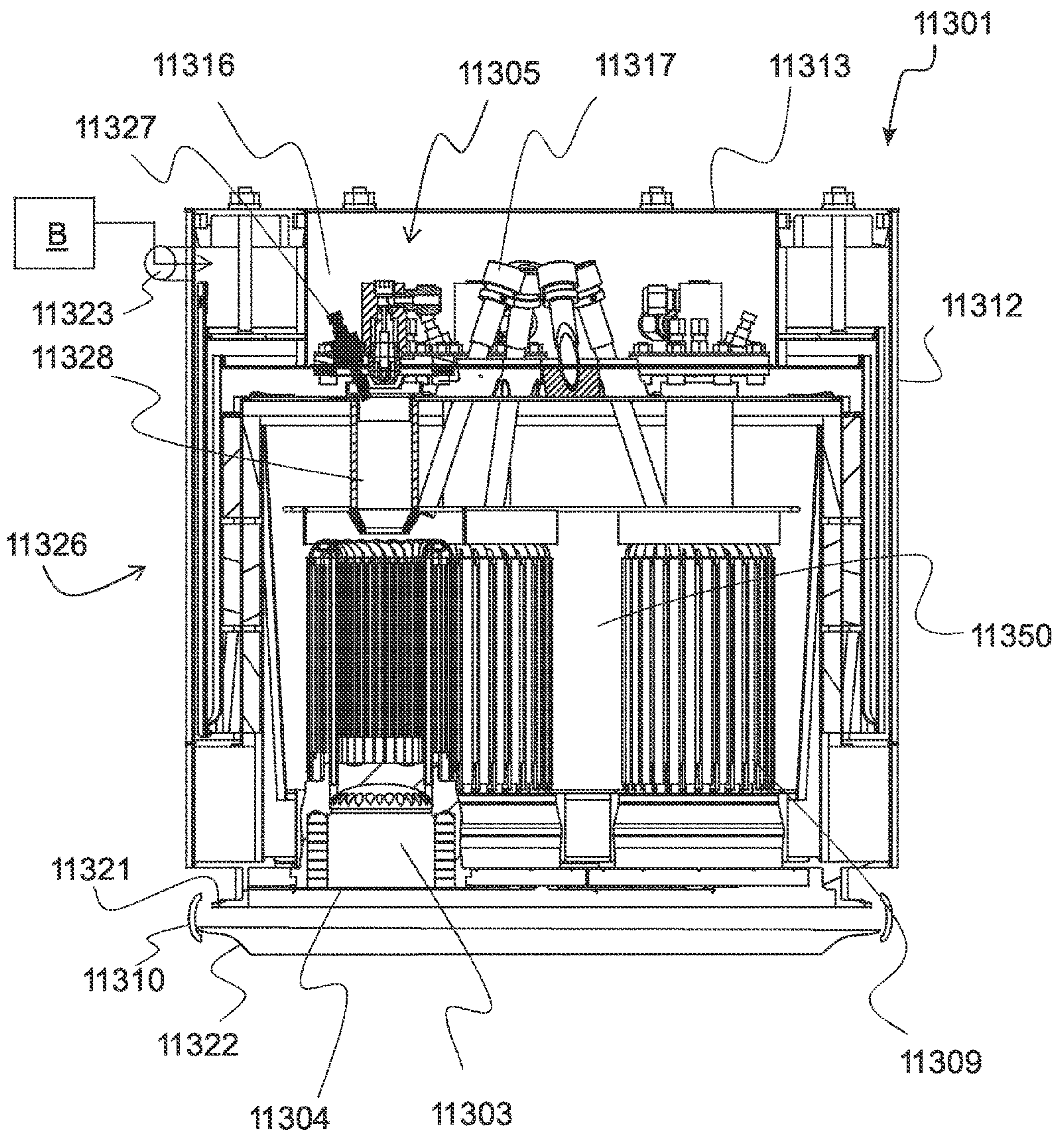

Turning to FIG. 113 the four burner design 11301 of the present embodiment includes a single blower B providing air for the fuel/air mixture in the ignition process of all the burner head assemblies 11305 as shown in FIG. 113. The heater heads 11303 as also discussed above, may be any of the various embodiments described in the preceding sections, including, but not limited to, tube heater heads, as designated by numeral 9116 in FIGS. 91B-91D, or pin or fin heater heads, as designated by numeral 9118 in FIG. 91A (and also shown as 5100 in FIGS. 53D through 53F). By way of example, the present embodiment is contemplated utilizing heater tubes 11309 through which flow the working gas, for example helium, which must be heated by the burner head assemblies 11305 during the appropriate portion of the Stirling cycle.

Figure 112:
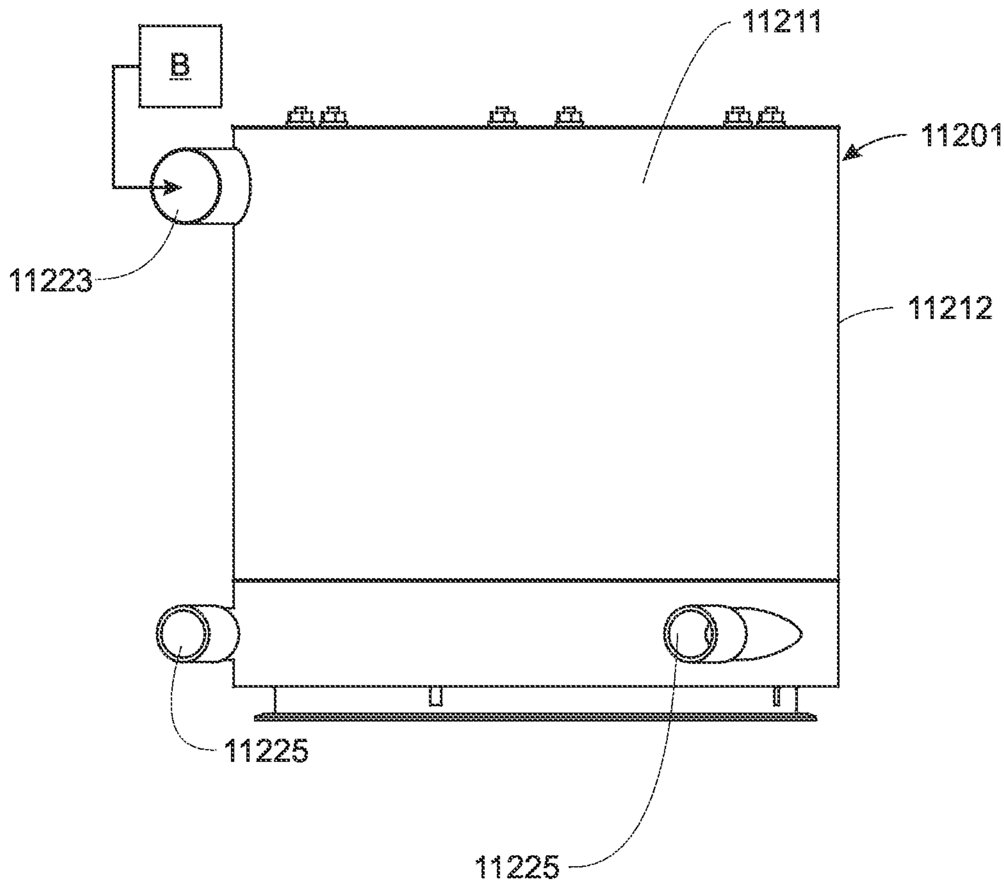

By way of more detailed description and referring back to FIG. 112 as well, the burner 11301 includes multiple burner head assemblies 11305, one for each of the heater heads 11303, in the case of the present embodiment there are four (4) heater heads and hence four (4) burner head assemblies 11305. The cross-section of FIG. B shows three (3) of the burner head assemblies 11305. Generally, the burner 11301 is defined by a burner housing as shown in FIG. 112 having a substantially cylindrical outer wall 11312, although other geometrical configurations could be imagined. The blower B pumps air into the burner 11301 through air intake 11223 for purposes of ignition and combustion, and exhaust gases are ejected from the burner via the two exhaust outlets 11225 adjacent the base of the burner.

Figure 114:
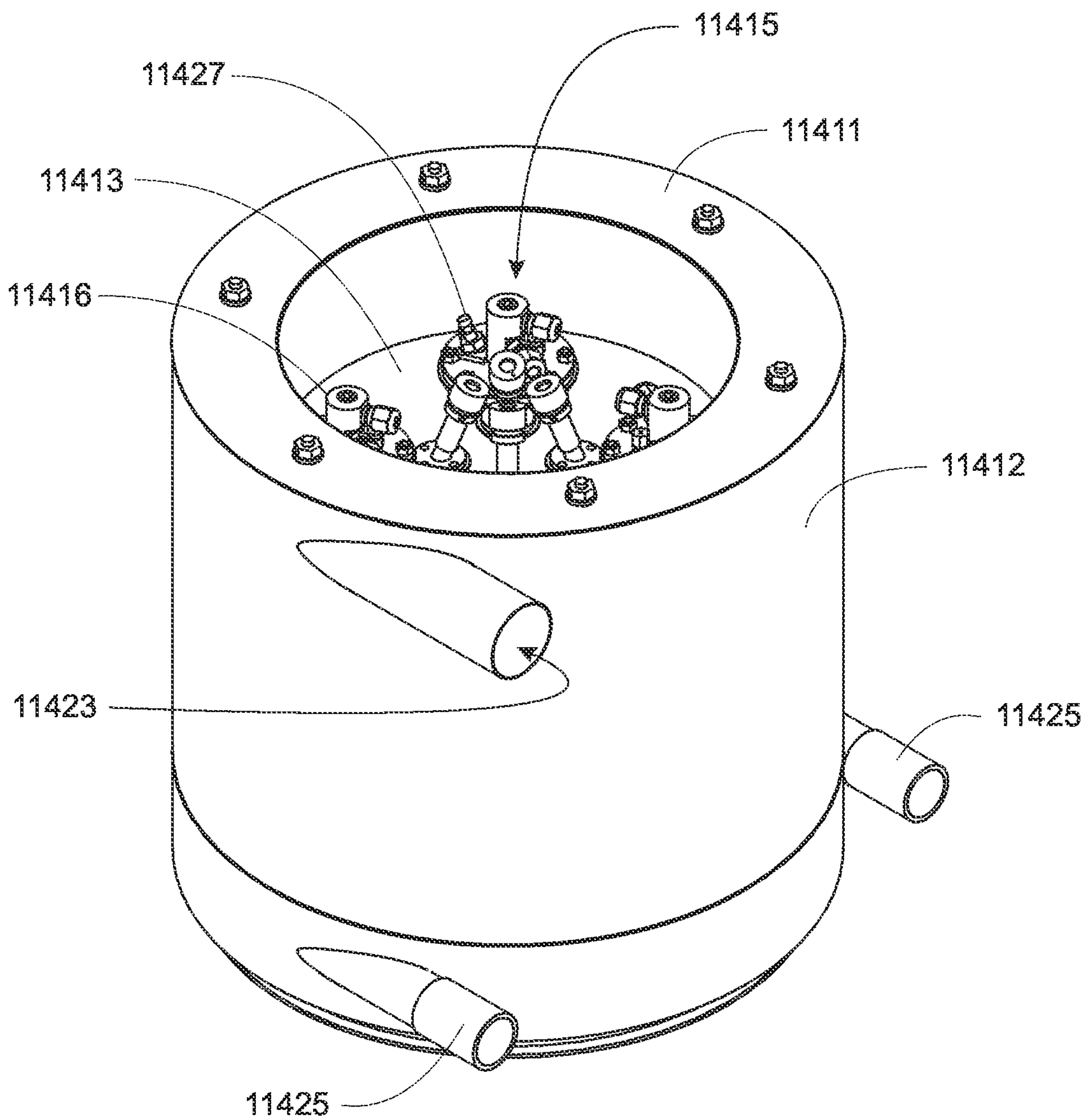
Figure 115:
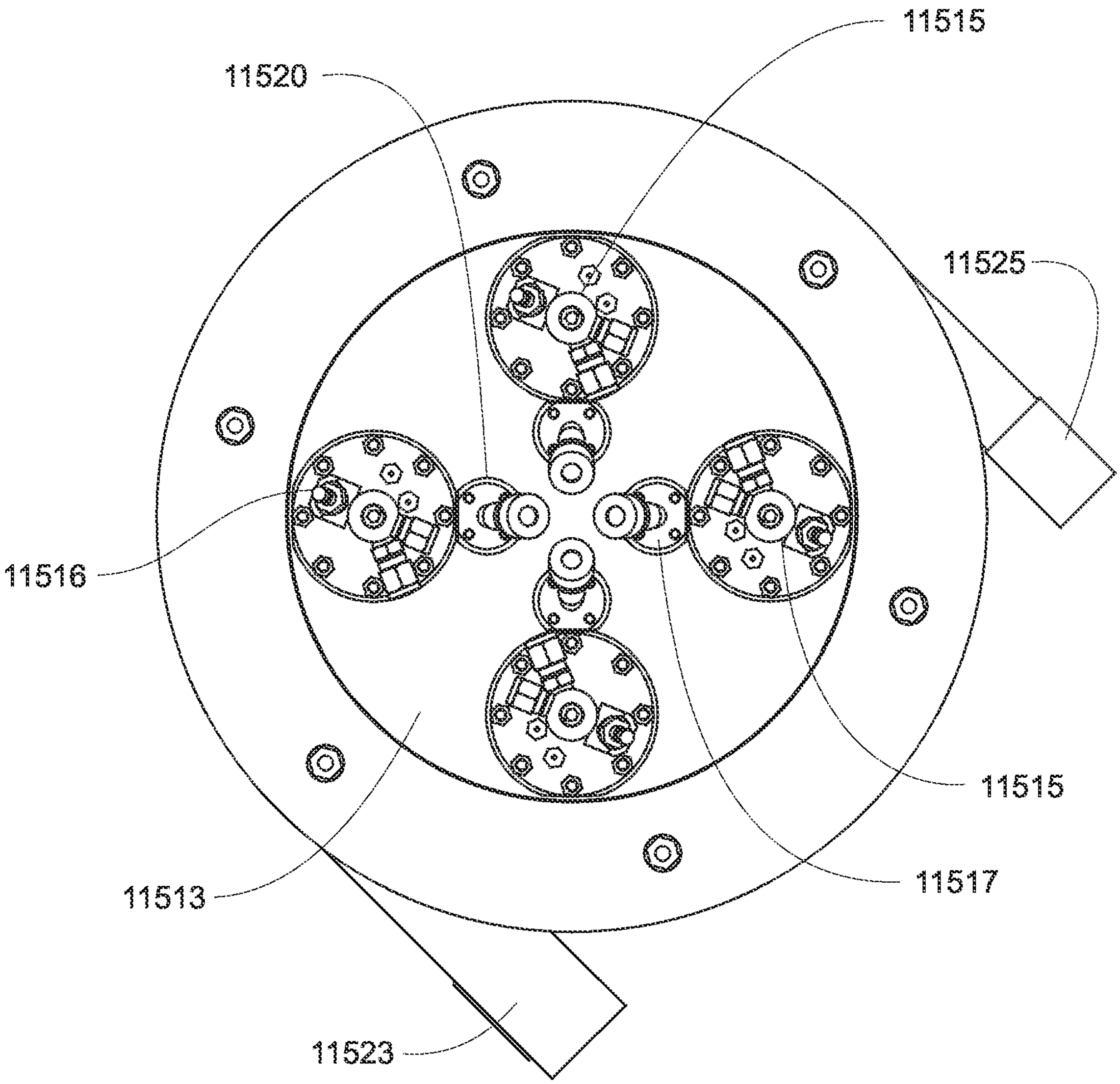

Turning to FIGS. 114 and 115 a top surface 11413 of the burner housing includes a number of ports 11415 for receiving fuel inputs 11416, igniters 11427, flame and possibly temperature sensors or flame viewing elements. The ports 11415 also facilitate access to a particular burner head 11405, as discussed in detail below, without having to remove the entire burner 11401 from the vessel stack-up for maintenance. As seen in FIG. 115, associated with each burner port 11515 on the top surface 11513 of the burner is a secondary port 11517 which can serve a number of purposes for instance a flame viewing element such as a viewing window for viewing the flame of the burner head, or alternatively a spark plug 11520 for igniting the fuel/air mixture and/or a sensor for sensing UV light used in flame detection.

Figure 116:
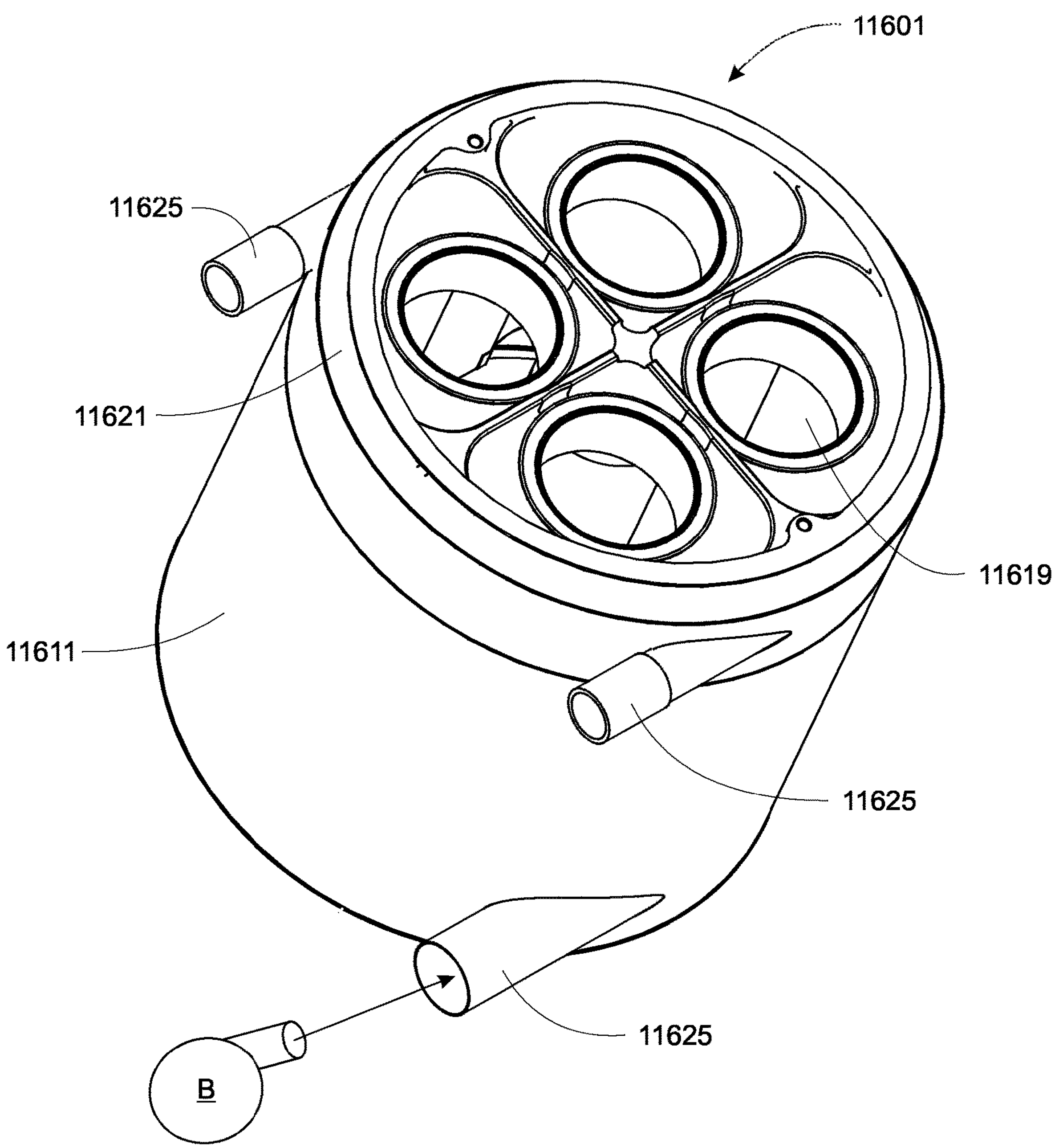
Figure 117:
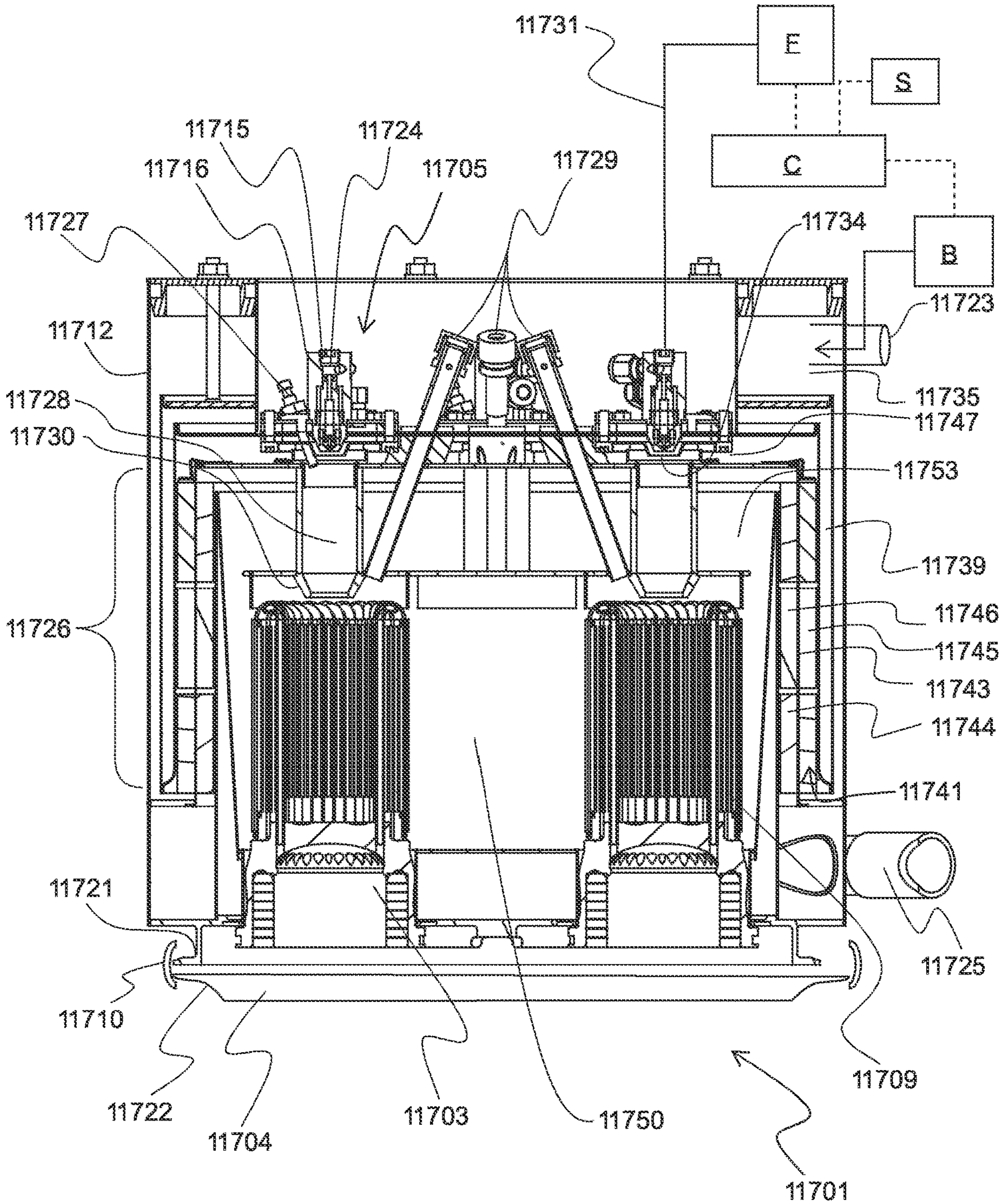

The base of the burner 11601 best seen in FIGS. 116 and 117, is provided with heater head openings 11619 to accommodate the entrance of the heater heads and respective heater tubes since the burner as a whole is set over and stacked up on a cooling plate 11604 of the vessel so that the heater heads 11603 are within and substantially sealed inside or encompassed by a lower region of the burner 11601. The base of the burner 11701 is secured to the mounting plate 11704 in the vessel stack-up by a circumferential band clamp 11710, such as a Marmon clamp, which is provided for securing and critically circumferentially centering the burner relative to the cooling plate and lower stack-up of the pressure vessel. The centering of each burner head assemblies 11705 relative to each of the associated heater heads 11703 is critical because if the flame from the burner head assembly is nearer one side of the heater heads 11703 and heater tubes 11709 than another, there will be not only inefficient heating of the working gas/fluid in the heater tubes 11709, where one set of heater tubes is heated to a higher temperature than other tubes.

The clamp 11710 extends circumferentially and radially around the entire base of the burner 11701 and provides both radial and axial compressive forces between the burner base plate and the mounting plate to ensure that there is both a critical axial sealing pressure to contain the hot exhaust gases in the burner and a radial circumferential alignment of the burner heads with the heater heads. The base of the burner housing 11711 may be provided in this regard with a circular sealing edge 11721 as shown in FIG. 117 which is angled relative to the vertical axial arrangement of the vessel stack-up to create the axial compressive force and for mateably engaging with an oppositely angled circular sealing edge 11722 of the mounting plate. The circumferential clamp 11710 and the mating angled circular sealing edges 11721,11722 of both the burner and the cooling plate ensure the critical circumferential, i.e. radial alignment of the burner housing 11711 and burner head assemblies 11705 with the mounting plate and heater heads 11703 in the vessel stack-up so that the burner head assemblies 11705 are appropriately aligned with the heater heads 11703 and there is sufficient axial force between the burner 11701 and cooling plate 11704 to contain the hot exhaust gas generated in the burner 11701. The circular sealing edge 11721 may include a graphite seal (not shown) between the burner and cooling plate to ensure that the hot gases which are at around 1000 C, where the flame temperature is around 1200 C, do not leak out between the burner 11701 and the mounting plate 11704.

The single blower B as shown in FIG. 117 provides air into the burner housing 11711 adjacent the top surface 11713 for the fuel/air mixture to the burner head assemblies. The air intake 11723 is provided at essentially a normal angle to the circular burner housing 11711 and provides air inside the burner 11701 for combustion as described in detail below. This arrangement of the air intake 11723 at a normal angle to the cylindrical burner housing 11711, better seen in FIG. 116, facilitates air entering the burner 11701 with a designed pressure drop which is important for incoming air to the burner to maintain a desired air velocity for maximizing heat transfer efficiencies as the air passes through the air intake manifold and into a preheater 11726 where the incoming (cold) air is warmed by the exiting (hot) exhaust gasses. A single blower B is placed in communication with the single air intake 11723 to provide air to all the burner head assemblies 11705 in the burner 11701. A pair of exhaust outlets 11725 are also connected normal to the substantially cylindrical burner 11701 and spaced approximately 180 degrees apart around the base of the burner 11701. Prior to exiting through the exhaust outlets 11725 the exiting exhaust from the burner 11701 preheats the incoming air in the preheater 11726 described in detail below, then exits the burner 11701 from one of the two exhaust outlets 11725.

Observing FIG. 117, each burner head assembly 11705 has a fuel injector 11724, an igniter 11727 of one kind or another, for instance a sparkplug or glow-plug, a flame detection device 11729 which may also be provided in the secondary port 11717 as shown. Fuel, either liquid fuel or gaseous fuel is fed to the fuel injector 11724 via a fuel line 11731 from a fuel source F and is dispersed as a fine mist or vapor by the nozzle 11734 of the fuel injector 11724 into a prechamber 11728 of the burner head assembly 11705. In the prechamber 11728 the dispersed fuel is combined with a desired volumetric flow of air from the preheater 11726, preferably preheated to a desired ignition temperature by the exhaust as discussed in detail below, to form a desirable fuel/air mixture for ignition. The fuel/air mixture then is ignited by the igniter 11727 and combusts at least partly inside the prechamber 11728, but more complete combustion may occur after the fuel/air mixture exits, or is pushed, from the prechamber 11728 through the prechamber nozzle 11730 of the prechamber 11728 to form a flame which extends from the prechamber 11728 and is directed into a center combustion chamber inside the heater tube arrangement of each respective heater head 11703. Exhaust from the combustion in the burner 11701 exits the burner via the preheater 11726 and exhaust manifold 11714 described in detail below.

In the present embodiment of the burner, the single blower B, shown here diagrammatically, may be incorporated to maintain a consistent average air ratio supplied to the burner 11701 and hence to each of the individual burner head assemblies 11705. The blower B pumps air at a desired velocity depending on instructions from a controller C for purposes of ignition, then once ignition has occurred, the desired air flow rate may be regulated by the controller C dependent on data received from sensors including but not limited to an oxygen sensor. A more complete description of the burner control algorithm is provided below. The single blower B is also controlled dependent on the data from individual burner head assemblies, for example in the case of at least one burner head assembly being extinguished or not igniting the controller may decrease the blower rate to facilitate ignition in the extinguished burner head assembly. The fuel input may be correspondingly controlled in the remaining burner head assemblies 11705 to accommodate such an air velocity decrease. In any event, the blower B is intended to provide a consistent flow rate to each of the multiple burner head assemblies 11705 in the burner after passing through the preheater 11726. An important aspect of the present embodiment is the consistent flow and velocity of cold air developed by the blower B and the efficient heating of the incoming air through the extraction of waste heat from in the preheater 11726, to raise the cold air temperature thereby improving the efficiency of combustion processes and the burner unit.

The blower B connects through the air intake 11723 in the outer wall 11712 of the burner housing into a cold air channel 11735 of the preheater 11726. The cold air channel 11735 extends circumferentially around the burner inside the outer wall 11712 of the burner 11701 and directs the cold air developed by the blower B down around an insulated intermediate baffle 11739 and up into the preheater. The intermediate baffle 11739 is insulated to protect the outer wall 11712 of the burner 11701, and anyone or thing that comes in contact with the outer wall, from the intense high temperatures inside the burner 11701. Also, the insulated baffle 11739 ensures that heat captured by the incoming air in the preheater 11726 is not lost directly to the outer wall 11712 of the housing 11711.

The preheater 11726 essentially begins where the cold air from the blower B drops down through the cold air channel 11735 and enters into a preheater channel 11741 in which the cold air is preheated in order to raise its mean temperature which increases the efficiency of the burner combustion. The preheater channel 11741 is defined by the intermediate baffle 11739 on one side, and on the inner side, an exhaust manifold wall 11743. The exhaust manifold wall 11743 directly separates the incoming cold air from the exhaust air exiting the burner and provides for the heat transfer from the exiting exhaust to the incoming cold air in the preheater channel 11741. The heat transfer efficiency through the manifold wall 11743 in the preheater 11726 is critical because the hotter the incoming cold air can be raised by the preheater 11726, the less fuel is necessary to get the gas up to desired ignition and combustion temperatures. The preheater channel 11741 also extends circumferentially around the entire burner 11701 which provides for a maximum surface are which in some embodiments may produce better heat exchange with the exhaust flowing out of the burner through an exhaust channel 11744. Inside the preheater channel 11741 are a series of radially extending fins 11745 which are directly connected to the exhaust manifold wall 11743 and assist in efficient heat transfer from the exiting exhaust air through the manifold wall 11743 into the air in the preheater channel 11741. Exhaust side fins 11746 may also be connected to the exhaust manifold wall 11743 extending into the exhaust channel 11744

The cold incoming air is preheated to a desired temperature, for example, but not limited to 600-750 C, in the preheater 11726 which facilitates ignition and combustion as the air is directed to the burner head assemblies. The amount of preheating which may be accomplished is primarily based on the efficiency of heat transfer from the exiting exhaust so that as the exhaust temperature is raised during operation of the engine, the incoming cold air can be accordingly preheated to a higher temperature. The preheated air exits the preheater channel 11741 and is directed radially into a hot air chamber 11747 which communicates with each of the multiple burner head assemblies 11705. It is to be appreciated that the preheated air enters the hot air chamber 11747 through a substantially 360 degree circumferential opening around the exit of the preheater channel 11741 so that a consistent flow rate of preheated air is delivered to each of the burner head assemblies 11705. While additional channels or passageways (not shown) may be provided in the hot air chamber 11747 to direct the preheated air in the hot air chamber to a specific burner head, the 360 degree output from the preheater channel of the present embodiment is important since there is only one blower B developing the air flow into the engine. In previous engines a multitude of blowers delivered a desired air flow to each of the burner head assemblies, for instance where there were four (4) burner head assemblies, there were four (4) blowers, one directed to each burner head. However, having a blower associated with each burner head 11705 on a multiple burner head engine is expensive and adds a significant amount of weight to the engine. In any event, a single preheater is much less expensive and less complicated from a control standpoint than separate preheaters of each heater head.

The preheated air is directed in the hot air chamber 11747 to the individual burner head assemblies 11705 and specifically to an intersection with a nozzle 11734 of each fuel injector 11724 in each burner head 11705 and an igniter 11727. The fuel injectors 11724 may use either liquid fuel or gaseous fuel but in either case the fuel is ejected from the injector into the prechamber 11728 where the fuel mixes with the preheated air to attain a desired fuel/air ratio or mixture for either ignition of the burner head 11705, or, combustion where the burner head 11705 is currently supporting a flame. The fuel injectors 00024 inject the fuel into the prechamber 11728 directly below the fuel injector 11724 and the preheated air is combined in the prechamber 11728 with the liquid or gaseous fuel. The fuel may be delivered as a mist or vapor, combined with the preheated air and ignited in the prechamber 11728 by the igniter 11727. While ignition of the fuel/air mixture may occur to some extent in the prechamber 11728, the flame derived from the ignition and combustion of fuel/air in the prechamber 11728 needs to be pushed out of the prechamber 11728 to be more efficient and provide the requisite thermal output. It is preferable that the constant combustion flame which heats the heater heads 11703 and heater tubes 11709 be pushed out of the prechamber 11728 and actually extend beyond the end cone 11730 of the prechamber 11728 and into the combustion chamber 11750. This is accomplished by providing appropriate adjustment to the fuel/air mixture by the controller and by the prechamber and nozzle geometry to properly control the shape of the flame.

The shape of the flame emanating from the prechamber 11728 is important to the efficiency of the engine. The exit cone 11730 and other aspects of the prechamber 11728 itself can be shaped, sized and arranged to control the shape of the flame emanating from the prechamber. It is important to attain a desired shape of the heating flame since an even heating of the heater tubes 11709 and heater heads 11703 is highly desirable. A preferred shape and dynamic motion to the flame is an axial rotation of the flame in the combustion chamber 11750 which develops an evenly distributed flame and heating of the heater tubes 11709 in the combustion chamber. To assist in obtaining an appropriate axial rotation of the flame a fuel/air dispersion element(s) can be provided in the prechamber. Such a dispersion element could be an insert like a fletching 11849 shown in FIGS. 118A-D, positioned inside the prechamber 11828, defining essentially fins, channels or baffles around an inside surface of the prechamber. Although other and different shapes are possible, the helical fletchings 11849 can be formed or attached for instance by welding on the inside wall of the prechamber 11828 as shown in FIG. 119. These fuel/air dispersion element(s) inside the prechamber 11828 help control the rotation of igniting gases and fuel in the prechamber 11828 in such a way as to attain a desired flame shape as it emanates from the prechamber 11828 and into proximity with the heater tubes 11809. The fletchings 11849 can be shaped in different ways and even two oppositely disposed fletchings can be affixed inside the prechamber to initiate and direct the axial rotation of the fuel/air mass in the prechamber 11828. The fuel/air flame shape is controlled by such fletchings 11849 for example to define the desired symmetrical shape and axial rotation of the output flame on the heater head. The more even and symmetrical the flame out of the prechamber 11828, the more efficient and even heat dispersion occurs and is accorded to the heater tubes on the heater heads.

Another aspect of the present embodiment shown in FIG. 119 is the prechamber support which extends around the outermost wall of the prechamber 11928 adjacent the exit cone 11930 and includes a heater head restrictor 11937 restricting the flame exhaust gases from passing over the heater head 11903. The restriction increases the pressure drop at the top of the heater head 11903 and improves heat transfer from the hot gas to the helium inside the heater tubes 11909 by encouraging the hot gas to flow through the heater tubes.

A substantial amount of the heat not used to heat the working fluid remains in the exhaust gases and thus the efficiency of the entire engine can be increased by using the excess exhaust gas heat to preheat the incoming air. After heating the heater head 11903 and heater tubes 11909 the hot combustion gases are forced out an exhaust inlet 11953 by newer combusted gases into the exhaust channel 11944 defined partly by an inner wall 11942 of the exhaust manifold. The exhaust passes down along the exhaust channel 11944 exchanging a substantial amount of heat through the preheater wall 11943 to the incoming cold air entering the preheater 11926 via the preheater channel 11941. The exhaust gases should flow as quickly as possible through the preheater 11926 as the heat transfer from the exhaust gases is dependent upon the velocity of the exhaust. Another aspect of the present embodiment limits the pressure drop of the exhaust gases by allowing the exhaust gases flow out from two exhaust outlets 11925, as opposed to one exhaust outlet, arranged around the bottom of the exhaust manifold 11914. The shorter flow path provided by the two exhaust outlets 11925 for the exhaust leaving the exhaust manifold 11914 lowers the pressure drop for the exhaust, the blower does not have to work as hard, and thus the blower load is reduced on the engine.

FIG. 119 also discloses the use of spark plugs 11960 in the secondary port 11917 (rather than a UV viewing window) through the burner housing. In certain cases a flame sensor may also be inserted through the secondary port 11917 which extends into the burner adjacent each of the prechamber nozzle so that flame detection can occur. In any event, the secondary port 11917 provides for access to the burner head 11905 so that a sensor or window, or ignition components for instance glo-plugs or spark plugs as shown here can be inserted down into the burner head 11905 to ignite different gases and fuels. Gaseous fuel use may necessitate the spark plug 11960 to ignite the fuel air mixture adjacent the nozzle of the prechamber whereas liquid fuel uses glow plugs and are generally located closer to the fuel injector itself. In the embodiment shown here a high voltage conductive element 11961 is encased within and insulative layer 11963 and a ground layer 11965 and inserted through the secondary port so that the exposed conductive element 11961 is exposed in the combustion chamber to ignite the fuel/air mixture exiting the prechamber 11928.

The ability to see and/or detect each flame is important so that each of the four individual burner head assemblies 11905 and respective flame can be appropriately adjusted by the controller. It is to be appreciated that such flame detection and viewing may be accomplished by many embodiments, including but not limited to an actual viewing window for example having appropriate lenses in the tube which allow a human operator to look through the tube and visually identify a flame within the range of visible wavelengths in the combustion chamber. Alternatively, the viewing window may include a camera or other image data receiving and recording device such as a UV light sensor and display for visually displaying a received representation of the flame in the combustion chamber. Other types of heat sensors including but not limited to thermocouples, infrared thermometers, and thermisters, may be used to identify and quantify the flame and flame characteristics in the combustion chamber.

With only a single blower providing air to four burner head assemblies 11905, generally a variable in addition to air, such as fuel, must be altered to obtain a desired flame quality. Keeping one blower providing air to all four burner heads is especially helpful for cost and for blower power consumption.

With liquid, diesel or other gaseous fuel, the UV viewing window will be compromised because the fuel vapor tends to absorb the UV radiation from the flame. Without the UV window as in the previous embodiment it may still be important to detect the flame and the temperatures in the combustion chamber. The electrode of the sparkplug may be utilized as a sensor in some cases to detect the flame. Such data can be forwarded to the controller to determine the flame and combustion disposition in the combustion chamber 11950. Another method of flame detection obtains temperatures with temperature sensors inside the heater head, for example a thermocouple attached on the walls of the heater tubes can provide data to the controller to alter the operational conditions of the engine. This temperature data is used to judge the temperature and/or flame quality based on temperature/flame data and helps the controller decide what operational mode, as discussed in further detail below, to set for each burner head 11905 and for the engine as a whole.

Burner Control

The burner may be operated in several modes as shown in FIG. 120, and referring in part to FIG. 119, according to predetermined electronics and software programs embodied in an electronic controller. The operation modes evaluated by the controller include at least a start-up mode 12002, normal operation mode 12004, shut-down mode 12006 and a stop mode 12008. The start-up mode includes the initial ignition of a richer fuel mixture in the prechamber 11928 to ease ignition as colder mixtures have a narrower ignition range of fuel/air ratio that are ignitable compared to the range of fuel/air ratios that maintain combustion. With a desired fuel/air ignition mixture present in the prechamber 11928, the igniter 11927 is actuated and the ignition mixture is ignited. A thermocouple (not shown) in the prechamber 11928 detects what is referred to as a diffusion flame in the prechamber 11928 and once the incoming air is hot enough from the preheater 11926, the flame is pushed out of the prechamber 11928 by either increasing the air flow from the blower B, or increasing fuel so the flame travels out of the prechamber 11928 and forms in the combustion area adjacent the heater head 11903.

Generally in the start-up mode 12002 as shown in FIG. 120 a user sets a desired blower speed 12003 and fuel/air ratio 12005 for a certain time period 12007, for example 30 seconds. After the predetermined time period the blower shuts off and resets 12011 the start-up phase which may include blowing out 12013 any remaining fuel in the engine and exhaust system so that there are no backfires or other damaging events from residual fuel. The start-up phase may also include for instance a number of ignition attempts 12009 before resetting and providing the user with an error A sensor (not shown) within the prechamber 11928 or a visual sensor using the secondary port 11917 detects if a flame 12010 is present within the prechamber 11928 or the combustion chamber 11950. If a flame is not detected the system is reset 12011 or if a flame is detected the temperature readings are taken 12015 from the heater head and oxygen levels are measured 12017 from the exhaust gases. The fuel/air ratio is then adjusted 12019 based on these readings.

Once the flame is supportable out of the prechamber 11928 and is heating the heater head 11903, the control system and operation mode 12004 include a number of failsafe triggers 12023 based on sensor data and controller evaluation algorithms which evaluate the system and determine if the system should be turned to the shut-down or stop mode. The operation mode 12004 monitors levels of heat, power and oxygen for example and perform shut-down or stopping of the engine, or other modifications to the system and engine if a temperature reading is too high, or exhaust oxygen level is too high or if engine speed exceeds a desired value, or the differential pressure within the air lock is too low. These are just exemplary triggers for starting shut-down or stop procedures, other triggers could be used as well or in combination with these examples.

During normal engine operation, the blower is operated at least partially by a control loop which measures the excess oxygen 12017 in the exhaust to determine blower speed. The failsafe triggers 12023 shown in the flowchart and operation analysis table 12021 in FIG. 120 include: Engine speed exceeds predetermined range; Oxygen levels in exhaust exceed a predetermined range; Generator temperature exceeds a predetermined range; Burner temperature exceeds a predetermined range; Cooler temperature exceeds a predetermined range; Flame/Ignition failure; repeatable Failure of flame ignition. It is to be appreciated that the described control method is not limited to the disclosed triggers 12023 and that other triggers, factors and variables may also be analyzed by the controller under the start-up and operation modes 12002 and 12004.

A failure of the engine in one of these failsafe triggers 12023 directs the controller C to adjust the fuel/air ratio 12019 and continue acquisition of sensor readings. A preset number of a repeated failure 12025 of the engine to run within a predetermined range for any of these triggers leads to a shutdown sequence with an immediate fuel turn off 12029. The engine however can continue to run in the shut-down mode 12006 in many cases. On the other hand, certain events may cause complete engine stoppage (i.e. shut-off as opposed to shut down) so that damage to the engine is minimized. A status check 12037 on system components is repeatedly run. These shut-off triggers 12034 are for example, low oil pressure, low airlock pressure differential, and low engine power levels will ensure complete engine stoppage to prevent damage.

During a shut-down mode 12006, the fuel and burner is turned off but the engine keeps running until the heater head 11903 is cooled to a desired temperature. A system shutdown may also be caused by excessive heat measurements in a number of components such as the Generator, the burner, or a cooler, or a system shut down may occur if there is a failure to ignite. A shut down due to system failure may trigger a safe mode where fuel is pumped out of the system. Any fault or system failure or trigger, will kill the fuel delivery immediately 00036, but the engine will continue to run to cool down the system. The engine runs until it reaches a predetermined power level 12035 in the shut down mode 12006, or in the event of the more dangerous fail safe triggers the engine is stopped 12008, i.e. the RPMs are set to 0. The shut-down mode helps engine efficiency since the engine, burner and heater heads remain hot for a while, even while there is no fuel supplied, the engine will continue to run producing power until the predetermined low power level is reached. This recovers some of the energy put in at start-up mode which improves efficiency.

C Burner

A still further embodiment of the present invention is a multiple piston engine with a single central burner as disclosed in FIGS. 121 and 122. From a process control standpoint the central burner 12101 facilitates control of the ignition, flame temperature and shape, pressure drop and fuel air ratio for a single burner, single blower, single fuel injector and flame. This can greatly simplify the above described burner controls, hardware and accessories. The single burner design depends in large part on an engine and system design which provides highly efficient and controllable transfer of heat from the central combustion chamber 12250 to multiple heating chambers 12118 where the heater heads 12203 are located so that the working fluid in the heater head tubes 12209 absorbs the appropriate heat.

The single burner 12101 embodiment of the presently described engine includes a single burner head, where the heat from one combustion process, i.e. one flame, is dispersed to all the heater heads within the heating chambers, for example to four (4) heater heads and best seen in FIG. 122. Structurally somewhat similar to the previously described embodiment, burner 12101 includes a burner housing 12111 having a substantially cylindrical outer wall 12112, although as noted above other geometrical configurations could be imagined, and a top surface 12113 defining a number of ports for receiving various other elements such as, air, fuel lines, flame and temperature sensors or flame viewing elements. A central port 12115 permits access to the central burner head and remaining ports 12116 facilitate access to a heating chamber.

In addition to the central port 12115, the top surface of the burner 12105 may have a secondary port 12117 which can serve a number of purposes for instance a viewing window for viewing the flame of the burner head and a spark plug for igniting the fuel/air mixture and/or a sensor for sensing heat and flame temperature. The secondary port 12117 may also include a tube for the addition of air/oxygen and/or a sensor such as a temperature sensor for sensing flame temperature. The heating chamber ports 12116 may have an air inlet passage 12132 to provide cooling air to the heater chambers 12118. As will be discussed below, cooling or additional air may be added to the heater chambers 12118 through the air inlet passages 12132 to help control the temperature of the heating chamber 12118 and the heater heads 12203 during engine operation.

Turning to FIG. 122, the prechamber 12228 is arranged above a combustion chamber 12250 that is positioned centrally between all the multiple heater heads 12203, i.e. the heater heads and tubes are outboard of the combustion chamber 12250. The heater heads 12203 and heater tubes 12209 are in the heating chambers 12218 external to the combustion chamber 12250 as will be described in detail below. The base of the burner 12201 is provided with openings 12219 to accommodate the entrance of the heater head 12203 and heater tubes 12209 since the burner as a whole is set over and stacked up on the cooling plate 12204 of the vessel so that the heater heads 12203 are within and substantially encompassed by a lower region of the burner 12201.

The base of the burner is secured to the cooling plate 12204 in the vessel stack-up by a circumferential band clamp 12210, such as a Marmon clamp, as described above for securing and critically circumferentially centering the burner 12201 relative to the cooling plate 12204 and lower stack-up of the pressure vessel. In centering the burner 12201, the combustion chamber 12250 of the single burner head 12205 is centered relative to each of the associated heater chambers 12218 and heater heads 12203. The centering of the combustion chamber 12250 is critical because the heat transfer from the hot exhaust gases from the combustion chamber 12250 to the heating chambers 12218 must not be nearer to one heater head 12203 than another within the heating chamber 12218, because heating of the working gas/fluid in the heater tubes 12209 must be even for better engine efficiency.

As described above, the clamp 12210 extends circumferentially and radially around the entire base of the burner 12201 and provides both radial and axial compressive forces between the burner housing 12211 and the cooling plate 12204 to ensure that there is both a critical axial sealing pressure to contain the hot ignition and exhaust gases in the burner 12201 and a radial circumferential alignment of the combustion chamber 12250 of the burner head 12205. The base of the burner housing as noted above may be provided in this regard with a circular sealing edge 12221 which is angled relative to the vertical axial arrangement of the vessel stack-up for mateably engaging with an oppositely angled circular sealing edge 12222 of the cooling plate 12204. The circumferential clamp 12210 and the mating angled circular sealing edge 12221 of both the burner 12201 and the cooling plate 12204 ensure the critical alignment of the burner housing 12211 with the cooling plate 12204 and heater heads 12203 in the vessel stack-up so that the combustion chamber 12250 of the burner head 12205 is appropriately aligned and there is sufficient axial force between the burner 12201 and cooling plate 12204 to contain the hot gas and exhaust generated in the burner 12201. The circular sealing 12221 edge may include a graphite seal between the burner 12201 and cooling plate 12204 to ensure that the hot gases which can be around 1000 C where the flame temperature is around 1200 C do not compromise the seal between the burner 12201 and the cooling plate 12204.

Similar to the multiple head burner described above, a single air intake 12223 is provided through the burner housing 12211 adjacent the top surface 12113 and the ports 12115, 12116 to deliver air for the fuel/air mixture to the burner head 12205. The air intake 12223 is connected to a blower B and defines an air intake passage 12235 that is provided at what is essentially a normal angle to the circular burner housing 12211. As noted above, this arrangement provides for the designed or desired pressure drop for incoming air to the burner 12205 as it passes through the air intake passage 12235 and into the preheater 12226 where the incoming air is preheated by the exiting exhaust air. The single blower B is placed in communication with the air intake 12223 to provide air to the central burner head 12205 in the burner 12201 and a pair of exhaust outlets 12225 are also connected normal and spaced approximately 180 degrees apart around the base of the burner 12201. The exiting exhaust from the burner 12205 preheats the incoming air from the blower B in the preheater 12226 as described above then exits the burner 12201 after combustion occurs from one of the two exhaust outlets 12225.

The burner head 12205 as shown in FIG. 122 has a single fuel injector 12224, an igniter 12227 of one kind or another for instance a sparkplug or glow-plug, and a flame detection device 12229. Fuel, either liquid fuel or gaseous fuel is fed to the fuel injector 12224 via a fuel line 12231 from a fuel source F and is dispersed as a fine mist or vapor by the nozzle 12234 of the fuel injector into a prechamber 12228. In the prechamber 12228 the dispersed fuel is combined with a desired volumetric flow of air from the blower B through the preheater 12226, preferably preheated to a desired temperature by the exhaust as discussed in detail above, to form a desirable fuel/air mixture for ignition. The fuel/air mixture is then ignited by the igniter 12227 and combusts at least partly inside the prechamber 12228 but more completely after exiting the prechamber 12228 through the exit cone 12230 of the prechamber 12228 to form a flame which extends into the center combustion chamber 12250. The top of the combustion chamber 12250 has outlet channels which direct the hot gas from the combustion into the heating chamber 12218. Exhaust from the heater chamber 12218 in the burner exits the burner via the exhaust inlet 12253 and exhaust manifold 12214 described in detail above. While a description of the present embodiment includes the central combustion chamber 12250 in the burner as provided above, it is to be appreciated that other embodiments contemplate additional burners for example a two burner head design with each burner heating a pair of heater heads where such an arrangement may not have centrally aligned burner head assemblies and combustion chambers relative to the burner itself.

In the present embodiment of the burner, the single blower B may be incorporated to maintain a consistent average fuel/air ratio to the burner head 12205. As noted above, the blower B pumps air at a desired rate depending on various data from the controller for purposes of ignition, then once ignition has occurred, the desired air flow rate may be dependent on the measured residual oxygen in the exhaust, however in some embodiments it may be dependent on at least the desired temperature of the burner and a desired power output of the machine. The single blower B is also controlled dependent on the data from burner head 12205 and the heating chamber 12218, for example in the case of the burner head being extinguished or not igniting the controller may increase or decrease the blower power to facilitate re-ignition.

The blower B is intended to provide a consistent air flow rate through the preheater 12226 to the burner head 12205. An important aspect of the preheater 12226 of the present embodiment is the channeling of the consistent flow and velocity of cold air developed initially by the blower B in the preheater channel 12226 across the exhaust manifold wall 12243. Because the blower inputs a consistent flow of cold air into the burner and through the preheater 12226, i.e. the heat exchanger, the efficiency of the burner is increased because more waste heat is extracted from the exhaust to heat the incoming cold air.

As described above, the blower connects through the air intake 12223 in the outer wall of the burner housing 12211 into a cold air channel 12235. The cold air channel 12235 essentially defines the entrance into the preheater 12226 and extends circumferentially around the burner inside the outer wall of the housing 12211 and directs the cold air developed by the blower B down around an insulated intermediate baffle 12239 and up into the preheater 12226. The intermediate baffle 12239 is insulated to protect the outer wall of the burner, and anyone or thing that comes in contact with the outer wall, from the intense high temperatures inside the burner. More importantly, the insulated baffle 12239 ensures that heat captured by the incoming air in the preheater 12226 is not lost directly to the outer wall of the housing. This also ensures that the incoming air is cold which improves the preheater efficiency The preheater 12226 of the burner 12201 has been described in detail above with respect to the previous burner embodiment and essentially incorporates the same or similar channels and baffles to direct cold air along the exhaust manifold wall 12243 to facilitate direct heating of the incoming air as previously described. The cold air is preheated to a desired temperature which facilitates ignition and combustion as it rises through the preheater channel 12241. The amount of preheating which can be accomplished is based on the heat transfer from the exiting exhaust so that as the exhaust temperature is raised during operation of the engine, the incoming cold air can be accordingly preheated to a higher temperature. The preheated air exits the preheater channel 12241 and is directed radially into a hot air chamber 12247 which communicates with the single burner head 12205. It is to be appreciated that the preheated air enters the hot air chamber through a substantially 360 degree circumferential opening around the exit of the preheater channel 12241 so that a consistent, uniform flow rate of preheated air is delivered to the burner head. Channels or fins (not shown) may be provided in the hot air chamber to direct the preheated air in the hot air chamber to the burner head.

The preheated air is directed in the hot air chamber 12247 to the burner head 12205 and specifically to an intersection with a nozzle 12234 of the fuel injector 12224 in the single burner head and an igniter 12227. As previously described, the fuel injector 12224 may deliver either liquid fuel or gaseous fuel but in either case the fuel is ejected from the injector into the prechamber 12228 where the fuel mixes with the preheated air to attain a desired fuel/air ratio or mixture for either ignition of the burner head or combustion where the burner is currently producing a flame. The fuel injector 12224 injects the fuel into the prechamber 12228 and the preheated air is combined in the prechamber 12228 with the liquid or gaseous fuel. Also as noted, the fuel may be delivered as a mist or vapor, combined with the preheated air and ignited in the prechamber 12228 by the igniter 12227. While ignition of the fuel/air mixture may occur to some extent in the prechamber 12228, the flame derived from the ignition and combustion of fuel/air in the prechamber 12228, it is preferable that the constant combustion flame which heats the heater chambers 12218 and heater heads 12203 and tubes 12209 be pushed out of the prechamber 12228 and actually extend beyond the end cone 12230 of the prechamber 12228 and into the combustion chamber 12250.

In the present embodiment with only a single burner 12205 and the center combustion chamber 12250 where the flame is not directly adjacent the tube heaters 12209 in the heater heads 12203, the shape and structure of the flame is not as critical where the flame is not in contact with the heater heads. Just like the previous embodiments though, the end cone 12230 and even other aspects of the prechamber 12228 itself can be shaped and sized and arranged to control the shape of the flame emanating from the prechamber 12228. It is still important to attain a desired shape to the heating flame since an even dispersal of heat from the combustion chamber 12250 to the heater chambers 12218 containing the heater tubes 12209 and heater heads 12203 is highly desirable. In other embodiments the inner combustion chamber may be used to recirculate and re-burn some of the exhaust gas to reduce emissions.

As in the previous embodiment it may be preferable to impart a predefined shape and dynamic motion to the flame for an axial rotation of the flame in the combustion chamber 12250 which develops an evenly distributed flame and heating of the heater tubes 12209 in the combustion chamber 12250. To assist in obtaining an appropriate axial rotation of the flame a fuel/air dispersion element(s) can be provided in the prechamber 12228. As previously discussed such a dispersion element could be a centrally positioned insert like the fletching shown in FIG. 118, defining essentially spiral fins or baffles or helical protrusions formed on the inside wall of the prechamber 12228 of the single burner head 12205 embodiment, just as shown in the multiple burner head embodiment of FIG. 119.

Following combustion in the combustion chamber 12250 the hot exhaust gases pass out of the combustion chamber 12250 and into a hot air, or gas, channel 12242 and into the heating chamber 12218 to heat the heater tubes 12209 of the heater heads 12205. The hot gas channel 12242 is also in communication with a cold air supply which communicates through a supplemental trim air passage 12240 extending through the top of the burner.

An important aspect of the single burner head embodiment is the ability to control the combustion of all or part of the fuel in the prechamber 12228 and the combustion chamber 12250 and provide an appropriate temperature gas to the heater chambers 12218 based on this control of the combustion process. To this end there are initially two methods of managing the combustion process in the single burner head design shown diagrammatically in FIGS. 123 and 124. The first method involves providing a higher relative percentage of fuel, i.e. a rich fuel mixture, which is ignited and burns in the combustion chamber but because there is not sufficient oxygen in such a rich mixture, the entire combustion process is not completed in the center combustion chamber and is to some extent cooler than if the combustion process was completed. The cooler partially un-combusted fuel is then circulated up into the hot gas channel where the remaining fuel mixes with additional air and can more fully complete the combustion process. This means that the gas in the center combustion chamber is not as hot where some percentage of the fuel is not combusted, but that an additional desired percentage of fuel can be combusted in the secondary combustion process to control the temperature of the hot gases being provided into the heater chamber. In other words there may not be complete combustion in the center combustion chamber so that the combusted gases are cooler, and the temperature can be raised if necessary by applying additional air in the hot gas channel so that further combustion is accomplished raising the gas temperature in the heater chambers. As shown in FIG. 123, a rich fuel mixture is added at step 123101, ignition occurs at step 123102, hot gases and uncombusted fuel are circulated to the heating chamber at step 103103, sensors measure temperatures in combustion and heater chambers at step 123104, and based on preset levels air is added to increase combustion at step 123105.

The second method shown in FIG. 124 involves providing a lower relative percentage of fuel, i.e. a normal fuel mixture which burns very hot in the combustion chamber and as it exits, the air provided via the air tubes, also called trim air, is used to manage e.g. cool the temperature of the hot gases entering into the heater chambers and provide some back pressure so that not as large a volume of hot combustion gases flow through a given hot gas channel into a specific heater chamber which is receiving additional trim air. The benefit of a richer combustion is that the cooler gases are less likely to damage the burner in the first method whereas in the second complete combustion method, there may be a decrease in efficiency because of the cold air input into the heater head center. In the second method shown in FIG. 124, a fuel mixture is added at step 124101, ignition occurs at step 124102, hot combusted gases are circulated to the heater chamber 124103, sensors measure temperatures in combustion and heater chambers at step 124104, trim air is added to cool heater head and create back pressure in the heater chamber at step 124105.

In either method, an important aspect of the invention is to maintain as equal a temperature across the four (4) heater heads 12203 with one flame, and hence in the heater chamber 12218, as possible. Referring back to FIG. 122, the control of the gas temperature entering each of the four (4) separate heater chambers 12218 of the burner 12205 can be individually controlled by directly controlling the temperature of the hot gas as in the second method, or controlling the combustion process as in the first method. The single burner is an important design because there is only a single flame, a single igniter, and few locations for a possible reliability issue.

Following heating of the heater heads 12203, a substantial amount of the heat not used to heat the working fluid remains in the exhaust gases and thus the efficiency of the entire engine can be increased by using the exhaust gas heat to preheat the incoming air. The hot combustion gases pass from the hot gas channel 12242 into the heater chambers and after heating the heater heads and heater tubes therein, the hot combustion gases are forced out an exhaust inlet 12253 into the exhaust channel 12244 which is defined by the exhaust manifold wall 12243. The exhaust passes down along the exhaust channel 12244 exchanging a substantial amount of heat through the manifold wall and into the incoming cold air entering the preheater 12226 via the preheater channel 12241.

An insulation layer 12246 can be added around the entire burner between the heater chambers 12242 and the preheater 12226 to keep heat from traveling out of the combustion chamber into the preheater 12226.

Restricting Flow

It is important to control the heat into each heater head to maximize the efficiency and power of the engine by maintaining the heads at very similar temperatures. Moreover it is important to recognize that the engine is limited to a highest operating temperature by the heater head material properties. In other words, the heater heads, or any particular heater head, cannot exceed the highest operating temperature. By way of example if one heater head is operating at the highest operating temperature, in the single burner embodiment described above the fuel flow cannot be increased to the engine to increase the temperature of the other heater heads. The hotter heater head must be cooled. The control of the flow of hot combustion gases past each heater head can be controlled by the methods using the rich and lean combustion and trim air described above. Alternatively, another method of controlling the gas temperature applied to the heater heads shown in FIGS. 125A, 125B and 126, provides a flow of non-combustion gas (e.g. air) through an air intake 12536 into the bottom of each heater head adjacent the cooler plate 12525.

There is a non-combustion gas supply for each heater head as shown in FIG. 125A. An inlet 12536 supplies the non-combustion cooling gas to a supply line 12538 brazed to the outside of the burner base assembly 12540 and includes an elbow 12542 to get around the corner while occupying minimal space. The supply line 12538 terminates at a flow diverter ring 12544 which is located at the base of the heater head 12503. The flow diverter ring 12544 has by way of example, twenty 0.100" diameter holes 12546 which create a restriction for any cooling gases supplied to the heater head to eventually escape toward the exhaust outlet (not shown) through the holes 12546. When the diverting air is supplied through the supply line 12538 to cool a heater head 12503, the hot combustion gases meet an increased resistance at that particular heater head and the remaining heads will experience a greater mass flow since they provide less resistance to the incoming hot combustion gases. As a result, the amount of heat transfer—and therefore temperature—is decreased for the particular heater head to which diverting air is supplied. The burner base assembly 12540 with cooling gas supplies lines 12538 is shown in FIG. 125B.

Additional flow of air or other non-combustion gas, i.e. the restricting flow, at the bottom of each heater head, although the flow can enter at other locations relative to the heater head as well, creates a back pressure in the heater chamber 12518 which restricts the amount of hot exhaust gases which can pass next to the heater head. The flow diverter ring 12544 directs the cooling gas into the heater chamber and essentially merges the colder restricting gas or air with the hot exhaust gases attempting to exit the heater chamber 12518 into the exhaust. As discussed above, the cool non-combustion gas provides the additional benefit of cooling the hot heater head in addition to providing a back pressure which restricts the amount of hot combustion gases entering into the heater chamber 12518.

When restricting non-combustion gas, or air for example is applied in this manner to the heater head 12503 which is too hot, the combustion gases meet an increased resistance at the particular head and the remaining heads will experience a greater flow of combustion gases since they provide less resistance. As a result, the one hot heater head decreases in temperature and the other heads will increase in temperature, thereby decreasing the difference in temperature between the heads and allowing an increase in fuel flow so a higher average temperature can be sustained. A suitable control system should allow a very close temperature tolerance between all the heads and provide maximum temperatures at each head to be essentially equal. As a result, efficiencies can be maximized.

A control scheme is shown in FIG. 126 for controlling the addition of restricting non-combustion gas to provide cooling and/or restrictive flow to the heater chambers 12518. A flow controller FC is modulated to control the hottest temperature heater head 1, 2, 3 and 4 to a predetermined target temperature. Valves 12669, in this case servo-operated pinch valves, although other types of valves could be used as well, are opened between an air source, for example blower B or another additional blower, and the heater chambers 12618 to allow the flow of cooling gas/air to the hottest of the heater heads 12603. As the certain heater head 12603 and/or heater chamber 12618 temperatures approaches a desired average temperature, the flow of cool gas/air is reduced by closing the valves 12669.

The servo-operated pinch valves 12669 in this example, are controlled by the flow controller FC for positioning of each servo between the full-open and full-closed valve state. With this control scheme in an exemplary trial, the following important observations were made:

As diverting air is applied to a single head to reduce its average temperature, the average temperature of each of the remaining heads will increase in temperature by approximately ⅓ the reduction of the first head;

The full effect of the diverting air has a response of approximately 2-3 minutes, however results are immediately apparent;

Once temperatures reach the desired level, the amount of diverting air applied typically should be reduced to maintain a stable temperature reading.

FIG. 127 represents a snapshot of data collected in an initial trial of the control scheme and pinch valves 12669. The total average head temperature increased by 43° C. from 893° C. to 936° C. while maintaining a maximum temperature of 980° C. Condition "B" represents the data collected while diverting air was applied but the fuel flow was unchanged. The end condition "C" was maintained with a total diverting mass flow of 1.45 g/s, or 15.4% of the total flow through the burner (7.9 g/s through the inlet of the burner for an exhaust oxygen level of ~7.3%). Fuel mass flow was increased from 0.303 g/s of Biodiesel to 0.324 g/s.

Data was recorded for points of increased engine speed and crankcase pressure (2000 rpm/600 psi, 2500/600, 3000/600, 2000/750, 2500/750, and 3000/750). For each set of conditions, the diverting air was changed to control all max head temperatures as close to 980 C as possible, thus bringing the overall average head temperature to a maximum. Note that as engine speed increases, it appeared to become increasingly difficult to cool a single very hot head (i.e. the temperature spread between the hottest/coolest head becomes larger, even with max diverting air applied).

FIG. 128 is a graphical representation of test results showing the beneficial effects of the above described restricting air apparatus and control scheme. The graph shows that for example when an appropriate diverting air flow was provided to at least heater head 2 (the hottest head), the average heater head 2 temperature fell from 962 C to 949 C. And while heater head 4 remained substantially the same, heater heads 1 and 3 raised their average temperatures from 829 C to 993 C and 860 C to 926 C. The net effect brings the heater heads into much closer temperature tolerances, max and avg. as seen in the graph, and thus greater engine efficiency and less likelihood of engine damaging from over-heating certain heater heads.

The effect of the diverting air on providing even head temperatures and the ability to possess individual head control in a single burner/four heater head engine has demonstrated significant success especially when compared to a four-burner/four heater head. With the above described restricting air apparatus and control scheme the additional hardware required for diverting air is much cheaper (stainless steel and silicone tubing and four valves for supplying non-combustible gas/air); and the required software controls are more or less the same. A single flame requires only one igniter, fuel injector, and flame detector (and allows for direct control of the fuel/air ratio), making it easier and cheaper to assemble.

The current results provide approximately a 60° C. reduction in temperature on a single head without exceeding much more than 25% of the total mass flow through the burner. The result will also raise the temperature of three cold heads by approximately 20° C., providing about 80° C. in difference from the burner/engine steady state. To provide this diverting air, the blower will of course consume additional energy and reduce the power out of the engine. However, the desired net result that the 10-40 watts required blower power will be on the order of 20% of the additional power that is then able to be produced by the engine with the greater efficiency.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A method for controlling a pressure difference between an airlock having a gas at an airlock pressure and a crankcase having a gas and liquid at a crankcase pressure, the crankcase containing a rotating crankshaft connected to a con-rod that drives a first piston via a piston rod to reciprocate 180 degrees out of phase with a second piston the method comprising:

measuring the pressure difference between the airlock pressure and the crankcase pressure;

preventing rotation of the crankshaft when the airlock pressure is less than a first predetermined value, above the crankcase pressure;

operating a compressor to draw gas across a filter from the crankcase, when the airlock pressure is less than a second predetermined value above the crankcase pressure;

fluidically coupling the airlock to an output of the compressor when the airlock pressure is less than a third predetermined value above the crankcase pressure;

fluidically coupling the airlock to the crankcase when the airlock pressure is more than a fourth predetermined value above the crankcase pressure.

2. The method of claim 1 further comprising fluidically coupling the airlock to the crankcase via the filter when the airlock pressure is less than a fifth predetermined value above the crankcase pressure, wherein the fifth predetermined value is less than the first predetermined value.

3. The method of claim 1, wherein the second predetermined value is greater than the first predetermined value.

4. The method of claim 1, where the third predetermined value is greater than the second predetermined value.

5. The method of claim 1, where the fourth predetermined value is greater than the third predetermined value.

6. The method of claim 1, wherein the compressor comprises a check valve to prevent flow from the compressor to the crankcase.

7. The method of claim 1, wherein a working space with an oscillating pressure is fluidly connected via a flow resistance to the airlock.

8. The method of claim 7, wherein the piston rod passes through the airlock and into the working space.

9. A method for controlling a pressure difference between a port of an airlock having a gas at an airlock pressure and a crankcase having a gas and liquid at a crankcase pressure, the crankcase containing a rotating crankshaft connected to a con-rod that drives a first piston via a piston rod to reciprocate 180 degrees out of phase with a second piston, a two way pressure regulator configured to fluidly connect the airlock to an outlet of a compressor, a crankcase workspace or a closed port, the two way pressure regulator comprising a spool valve, where a position of a spool is responsive to the pressure difference between the airlock pressure and the crankcase pressure, the airlock pressure entering the two way pressure regulator via the airlock port the method comprising:

preventing rotation of the crankshaft when the spool location is less than a first predetermined distance to the airlock port;

operating the compressor to draw gas across a filter from the crankcase to the airlock, when the spool location is less than a second predetermined distance to the airlock port;

fluidically coupling the airlock to an output of the compressor with the spool valve, when the spool is above a third predetermined distance to the airlock port;

fluidically coupling the airlock to the crankcase with the spool valve when the spool is greater than a fourth predetermined distance to the airlock port.

10. The method of claim 9 further comprising fluidically coupling the airlock to the crankcase via the filter with the spool valve when the spool valve is less than a fifth predetermined position, wherein the fifth predetermined position is less than the second predetermined distance to the airlock port.

11. The method of claim 9, wherein the compressor comprises a check valve to prevent flow from the compressor to the crankcase.

12. The method of claim 9, wherein a working space with an oscillating pressure is fluidly connected via a flow resistance to the airlock.

13. The method of claim 12, wherein the piston rod passes through the airlock and into the working space.

14. A method for controlling a pressure difference between an airlock having a gas at an airlock pressure and a crankcase having a gas and liquid at a crankcase pressure, the crankcase containing a rotating crankshaft connected to a con-rod that drives a first piston via a piston rod to reciprocate 180 degrees out of phase with a second piston, the method comprising:

measuring the pressure difference between the airlock pressure and the crankcase pressure;

preventing rotation of the crankshaft when the airlock pressure is less than a first predetermined value, above the crankcase pressure;

fluidically coupling the airlock to an output of a compressor when the airlock pressure is less than a second predetermined value above the crankcase pressure;

fluidically coupling the airlock to the crankcase when the airlock pressure is more than a third predetermined value above the crankcase pressure.

15. The method of claim 14 further comprising fluidically coupling the airlock to the crankcase via a filter when the airlock pressure is less than a fourth predetermined value above the crankcase pressure, wherein a fifth predetermined value is less than the second predetermined value.

16. The method of claim 14 further comprising fluidically coupling the airlock to the crankcase via a filter when the airlock pressure is less than a fourth predetermined value above the crankcase pressure, wherein a fifth predetermined value is less than the second predetermined value.

17. The method of claim 14, wherein the compressor comprises a check valve to prevent flow from the compressor to the crankcase.

* * * * *